US012736897B2

(12) United States Patent
Ozaki et al.

(10) Patent No.: US 12,736,897 B2
(45) Date of Patent: Sep. 15, 2026

(54) TONER CONTAINER AND IMAGE FORMING SYSTEM

(71) Applicant: CANON KABUSHIKI KAISHA, Tokyo (JP)

(72) Inventors: Goshi Ozaki, Kanagawa (JP); Hiroyuki Munetsugu, Kanagawa (JP); Teruhiko Sasaki, Shizuoka (JP); Tachio Kawai, Tokyo (JP); Akinobu Hirayama, Shizuoka (JP); Toshiki Fujino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 18/806,952

(22) Filed: Aug. 16, 2024

(65) Prior Publication Data

US 2024/0411245 A1 Dec. 12, 2024

Related U.S. Application Data

(60) Division of application No. 18/376,899, filed on Oct. 5, 2023, now Pat. No. 12,140,884, which is a division (Continued)

(30) Foreign Application Priority Data

Dec. 7, 2020 (JP) ................................ 2020-202977

(51) Int. Cl.
*G03G 15/08* (2006.01)

(52) U.S. Cl.
CPC ..... *G03G 15/0886* (2013.01); *G03G 15/0865* (2013.01); *G03G 15/087* (2013.01); *G03G 15/0874* (2013.01); *G03G 2215/0673* (2013.01); *G03G 2215/0682* (2013.01); *G03G 2215/0692* (2013.01)

(58) Field of Classification Search
CPC ........... G03G 15/0886; G03G 15/0865; G03G 15/087; G03G 15/0874; G03G 2215/0673; G03G 2215/0682; G03G 2215/0692; G03G 15/0877; G03G 21/1676; G03G 21/1647
See application file for complete search history.

(56) References Cited

U.S. PATENT DOCUMENTS 5,156,308 A 10/1992 Aoyama
5,345,297 A 9/1994 Katakabe et al.
(Continued)

FOREIGN PATENT DOCUMENTS

CN 1113575 A 12/1995
CN 1177125 A 3/1998
(Continued)

OTHER PUBLICATIONS

Apr. 28, 2025 Notice of Allowance in Chinese Patent Application No. 202310375549.8.
(Continued)

*Primary Examiner* — David J Bolduc
(74) *Attorney, Agent, or Firm* — Venable LLP

(57) ABSTRACT

An attachment for an image forming apparatus includes a projection having an inner peripheral surface centered on a central axis and projecting in a direction of the central axis outside the inner peripheral surface in a radial direction of an imaginary circle centered on the central axis.

23 Claims, 196 Drawing Sheets

Related U.S. Application Data of application No. 18/116,910, filed on Mar. 3, 2023, now Pat. No. 11,822,265, which is a division of application No. 17/900,039, filed on Aug. 31, 2022, now Pat. No. 11,662,673, which is a division of application No. 17/899,758, filed on Aug. 31, 2022, now Pat. No. 11,592,766, which is a continuation of application No. PCT/JP2021/045722, filed on Dec. 6, 2021.

(56) References Cited

U.S. PATENT DOCUMENTS

| | | | |
|---|---|---|---|
| 5,515,143 | A | 5/1996 | Shiotani |
| 5,848,338 | A | 12/1998 | Okada |
| 5,848,516 | A | 12/1998 | Bam |
| 5,983,059 | A | 11/1999 | Oka et al. |
| 6,032,013 | A | 2/2000 | Niizawa |
| 6,058,283 | A | 5/2000 | Okada |
| 6,298,885 | B1 | 10/2001 | Yoshino et al. |
| 6,332,065 | B1 | 12/2001 | Howard |
| 6,363,235 | B1 | 3/2002 | Chiesa et al. |
| 6,421,518 | B1 | 7/2002 | Floyd et al. |
| 7,457,569 | B2 | 11/2008 | Kawai |
| 8,270,876 | B2 | 9/2012 | Morioka et al. |
| 9,500,985 | B1 | 11/2016 | Li et al. |
| 10,558,165 | B2 | 2/2020 | Hirayama et al. |
| 10,635,047 | B2 | 4/2020 | Kamoshida et al. |
| 2003/0223782 | A1 | 12/2003 | Ban et al. |
| 2004/0223790 | A1 | 11/2004 | Hosokawa et al. |
| 2005/0025527 | A1 | 2/2005 | Matsumoto et al. |
| 2006/0099012 | A1 | 5/2006 | Kilta et al. |
| 2007/0140747 | A1 | 6/2007 | Kita et al. |
| 2007/0147902 | A1 | 6/2007 | Taguchi et al. |
| 2007/0183812 | A1 | 8/2007 | Takashima et al. |
| 2007/0242984 | A1 | 10/2007 | Takami |
| 2009/0129827 | A1 | 5/2009 | Ichikawa et al. |
| 2011/0188895 | A1 | 8/2011 | Eto |
| 2012/0114391 | A1 | 5/2012 | Horii et al. |
| 2012/0321341 | A1 | 12/2012 | Hori et al. |
| 2013/0272750 | A1 | 10/2013 | Matsumoto et al. |
| 2014/0241757 | A1 | 8/2014 | Kikuchi et al. |
| 2014/0270859 | A1 | 9/2014 | Hosokawa et al. |
| 2015/0063784 | A1 | 3/2015 | Oota |
| 2016/0004184 | A1 | 1/2016 | Kikuchi et al. |
| 2016/0033896 | A1 | 2/2016 | Morita |
| 2016/0124346 | A1 | 5/2016 | Yamabe et al. |
| 2016/0274535 | A1 | 9/2016 | Suzuki |
| 2017/0010564 | A1 | 1/2017 | Kikuchi et al. |
| 2017/0108799 | A1* | 4/2017 | Hosokawa ......... G03G 15/0865 |
| 2017/0227922 | A1 | 8/2017 | Takami et al. |
| 2017/0315473 | A1 | 11/2017 | Hosokawa et al. |
| 2018/0004121 | A1 | 1/2018 | Yamabe |
| 2018/0052407 | A1 | 2/2018 | Eto |
| 2020/0133173 | A1 | 4/2020 | Takai |
| 2020/0192241 | A1 | 6/2020 | Kobayashi et al. |
| 2020/0192272 | A1 | 6/2020 | Kobayashi et al. |
| 2020/0233371 | A1 | 7/2020 | Takami et al. |
| 2020/0292966 | A1 | 9/2020 | Umeda et al. |
| 2021/0240107 | A1 | 8/2021 | Lee et al. |
| 2021/0263446 | A1 | 8/2021 | Funatani et al. |
| 2022/0413414 | A1 | 12/2022 | Ozaki et al. |

FOREIGN PATENT DOCUMENTS

| | | | |
|---|---|---|---|
| CN | 1460901 | A | 12/2003 |
| CN | 101017349 | A | 8/2007 |
| CN | 202267823 | U | 6/2012 |
| CN | 202284007 | U | 6/2012 |
| CN | 103529678 | A | 1/2014 |
| CN | 104067180 | A | 9/2014 |
| CN | 104090471 | A | 10/2014 |
| CN | 104423213 | A | 3/2015 |
| CN | 105319903 | A | 2/2016 |
| CN | 107111266 | A | 8/2017 |
| CN | 107272370 | A | 10/2017 |
| CN | 107643663 | A | 1/2018 |
| CN | 108323188 | A | 7/2018 |
| CN | 110780563 | A | 2/2020 |
| CN | 111694246 | A | 9/2020 |
| CN | 112020680 | A | 12/2020 |
| CN | 116339093 | A | 3/2024 |
| EP | 0 689 104 | A | 12/1995 |
| EP | 0 701 181 | A | 3/1996 |
| EP | 0 854 394 | A | 7/1998 |
| EP | 0 854 395 | A | 7/1998 |
| EP | 1 209 537 | A | 5/2002 |
| EP | 1 655 640 | A | 5/2006 |
| JP | H07-168435 | A | 7/1995 |
| JP | H08-171281 | A | 7/1996 |
| JP | H09-6104 | A | 1/1997 |
| JP | H11-327273 | A | 11/1999 |
| JP | 2003-184902 | A | 7/2003 |
| JP | 2005-031209 | A | 2/2005 |
| JP | 2006-235046 | A | 9/2006 |
| JP | 2008-096855 | A | 4/2008 |
| JP | 2010-039376 | A | 2/2010 |
| JP | 2012-103519 | A | 5/2012 |
| JP | 2012-133394 | A | 7/2012 |
| JP | 2012-215792 | A | 11/2012 |
| JP | 2013-097246 | A | 5/2013 |
| JP | 5385479 | B1 | 1/2014 |
| JP | 5435380 | B1 | 3/2014 |
| JP | 2014-112189 | A | 6/2014 |
| JP | 2016-066037 | A | 4/2016 |
| JP | 2020-098280 | A | 6/2020 |
| KR | 2015-0026697 | A | 3/2015 |
| TW | 200707141 | A | 2/2007 |
| TW | 201232199 | A | 8/2012 |
| TW | 201331726 | A | 8/2013 |
| TW | 201403269 | A | 1/2014 |
| TW | 201437771 | A | 10/2014 |
| TW | 201706733 | A | 2/2017 |
| TW | 201933005 | A | 8/2019 |
| WO | 2015/151861 | A | 9/2015 |
| WO | 2016-021199 | A1 | 2/2016 |
| WO | 2020-100699 | A2 | 5/2020 |

OTHER PUBLICATIONS

Apr. 16, 2025 Office Action in Chinese Patent Application No. 202310372330.2.

Nov. 15, 2024 Office Action in Chinese Patent Application Pub. No. 202310375549.8 (with English translation).

Nov. 29, 2024 Notice of Allowance in Chinese Patent Application Pub. No. 202310376463.7.

Feb. 21, 2025 Notice of Allowance in Chinese Patent Application No. 202310372280.8.

Jul. 25, 2024, Office Action in Chinese Patent Application No. 202310382780.X (with English translation).

International Search Report and Written Opinion for International Patent Application No. PCT/JP2021/045722.

Mar. 13, 2023 Search Report in European Patent Application No. 22 199 746.3.

Mar. 13, 2023 Search Report in European Patent Application No. 22 199 743.0.

Mar. 6, 2023 Search Report in European Patent Application No. 22 199 745.5.

Mar. 27, 2023 Communication in European Patent Application No. 22 199 746.3.

Mar. 24, 2023 Communication in European Patent Application No. 22 199 741.4.

Mar. 27, 2023 Communication in European Patent Application No. 22 199 743.0.

Feb. 21, 2023 Search Report in European Patent Application No. 22 19 9745.5.

Feb. 14, 2023 Search Report in European Patent Application No. 22 19 9741.4.

Feb. 10, 2023 Search Report in European Patent Application No. 21 903 518.5.

(56) References Cited

OTHER PUBLICATIONS

Nov. 11, 2023 Office Action in Chinese Patent Application No. 202310376282.4 (with English translation).
Mar. 29, 2024 Office Action in Singapore Patent Application No. 11202303463V.
Apr. 15, 2024 Office Action in Taiwanese Patent Application No. 110145715.
May 30, 2024 Office Action in Chinese Patent Application No. 202310372280.8 (with English translation).
Jun. 4, 2024 Office Action in Chinese Patent Application No. 202310376463.7 (with English translation).
Aug. 21, 2025 Notice of Allowance in Chinese Patent Application No. 202310372330.2.
Sep. 30, 2024 Extended Search Report in European Patent Application No. 24 171 289.2.

* cited by examiner (a)

(b)

(a)

(b)

(a)

(b)

(a)

(b)

(a)

(b)

(c)

(a) (b) (c) (d)

(a)

(b)

(a)

(b)

(a)

(b)

(a)

(b)

(c)

TONER CONTAINER AND IMAGE FORMING SYSTEM

TECHNICAL FIELD

The present invention relates to a toner container which can be mounted to an image forming apparatus and relates to an image forming system.

BACKGROUND OF THE INVENTION

A structure using a dismountable toner container for an image forming apparatus is known in order to supply toner for the electrophotographic image forming apparatus to the image forming apparatus (WO2020100699A2).

SUMMARY OF THE INVENTION

Problems to be Solved

Recently, there are various types of usage of image forming apparatus demanded by users. It is an object of the present invention to provide a new form of a toner container which can be mounted to an image forming apparatus.

Means for Solving Problem

The first aspect of the present invention is a toner container comprising an accommodating portion configured to accommodate toner; a discharge portion configured to be provided with an opening for discharging the toner in the accommodating portion to an outside; a rotatable member rotatable about a central axis as a rotational axis relative to the discharge portion in a first rotational direction and a second rotational direction opposite to the first rotational direction; and a projection provided below the opening of the discharge portion and having an inner peripheral surface facing inward in a radial direction of an imaginary circle centered on the central axis, when the toner container is oriented in a predetermined direction in which the central axis extends in a direction of gravity and at least a part of the discharge portion is below the accommodating portion, wherein the opening of the discharge portion faces in the radial direction, wherein when the toner container is oriented in the predetermined direction, the projection has a first downward surface and a second downward surface which face downward, and an upward surface which faces upward, outside the inner peripheral surface and inside the opening of the discharge portion in the radial direction, the first downward surface and the second downward surface extend so as to go up as goes in the first rotational direction, and at least a part of the first downward surface is provided at a position which is closer to the central axis in the radial direction than the second downward surface is and which is different from a position at which the second downward surface is provided in a circumferential direction of the imaginary circle, and at least a part of the upward surface is above at least a part of the second downward surface.

The Effect of the Invention

According to the present invention, it is possible to provide a new form of a toner container which can be mounted to an image forming apparatus.

BRIEF DESCRIPTION OF THE DRAWING

FIG. 120 is an illustration showing a process of assembling the operation mechanism to the nozzle in Embodiment 4.

FIG. 121 is perspective views in a state in which portions are assembled to the nozzle, in Embodiment 4.

FIG. 122 is an illustration showing a state in which the pack-side shutter is in an open position and a closed position in a second position of the movement path in Embodiment 4.

FIG. 123 is an illustration showing the operation of the movement path by operating the operating member in Embodiment 4.

FIG. 124 is an illustration showing a process of inserting the toner pack into the mounting portion and operating the operation lever and the operating member according to Embodiment 4.

FIG. 125 is sectional views in which the toner pack is mounted to an attachment portion and the operation lever is in the open position, in Embodiment 4.

FIG. 126 is sectional views when the operating member is operated to move the movement path to the first position in Embodiment 4.

FIG. 127 is a perspective view of a toner pack according to Embodiment 5.

FIG. 128 is an exploded perspective view of the toner pack according to Embodiment 5.

FIG. 129 is a partially exploded perspective view of the toner pack according to Embodiment 5.

FIG. 130 is a partially exploded perspective view of the toner pack according to Embodiment 5.

FIG. 131 is a perspective view of a nozzle in Embodiment 5.

Figure 132:
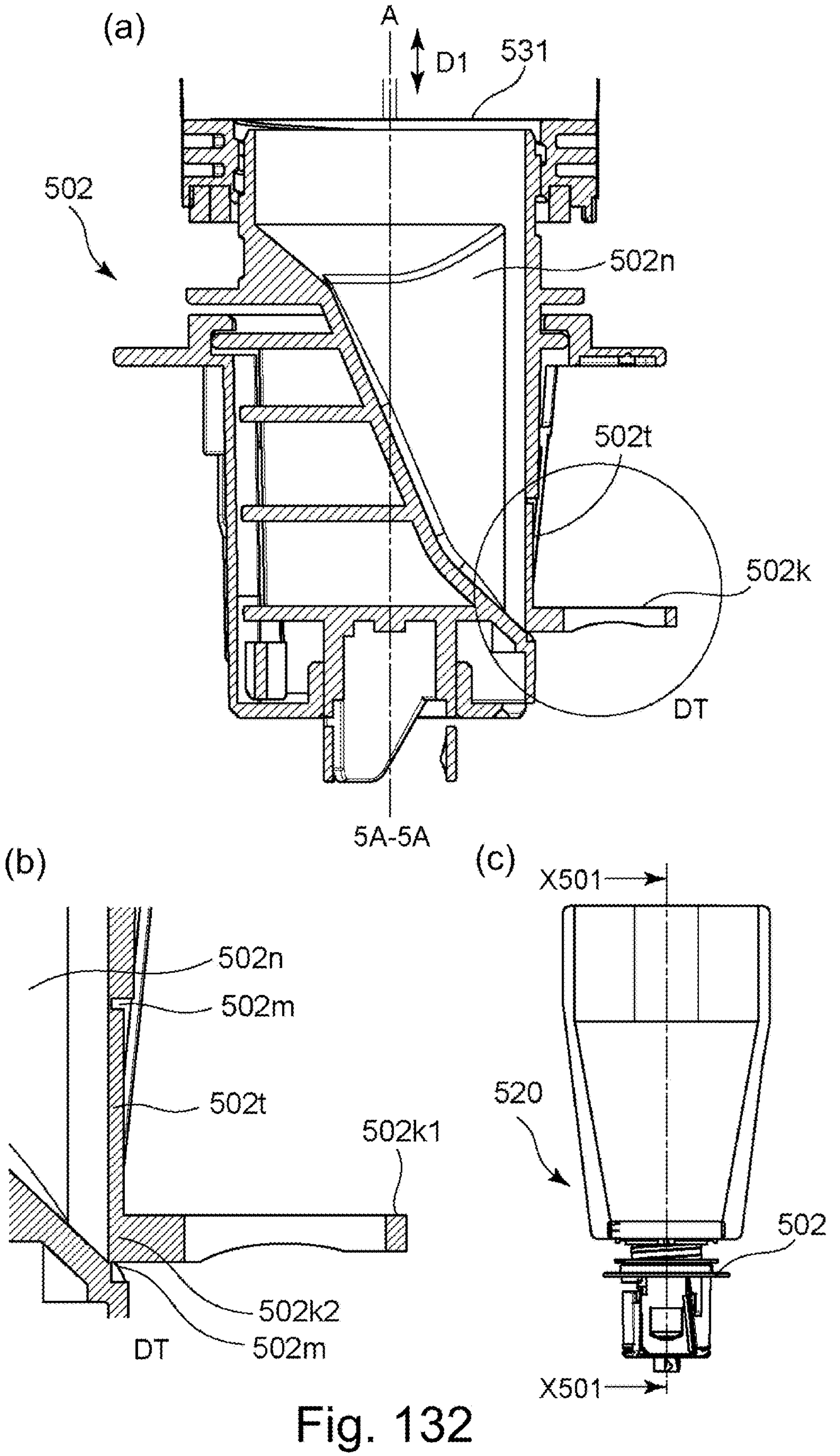

FIG. 132 is a sectional view and a side view of the nozzle in Embodiment 5.

Figure 133:
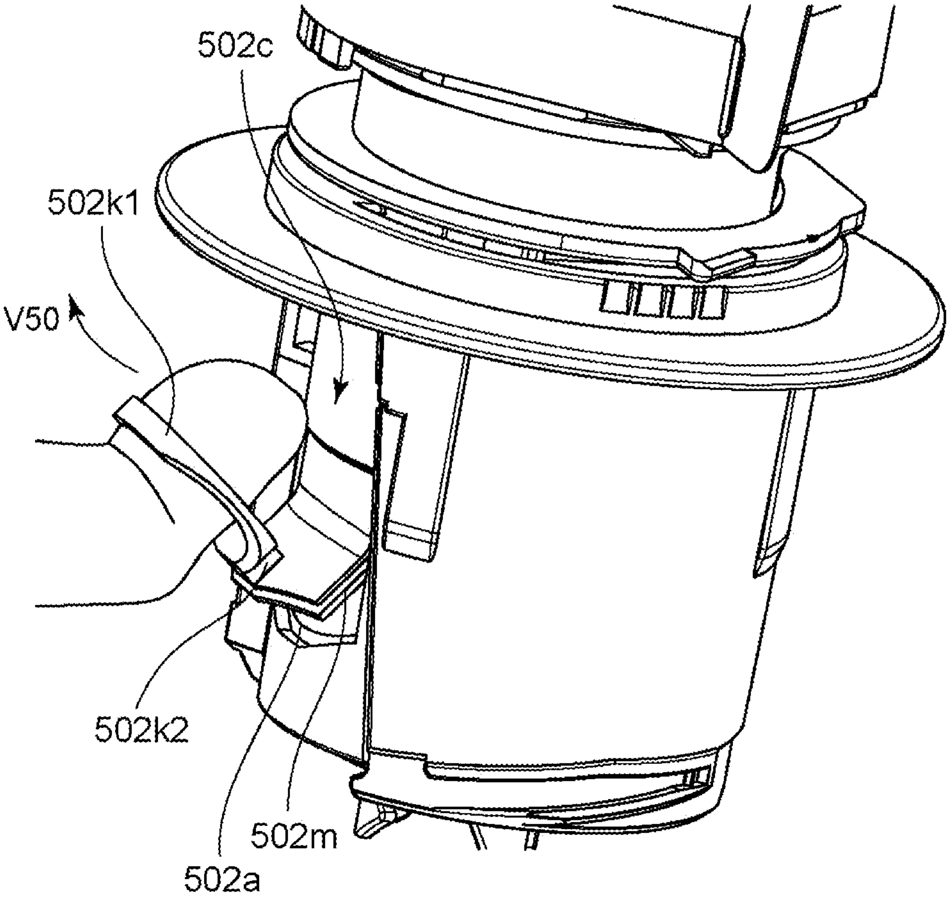

FIG. 133 is a schematic perspective view illustrating the first operation of the user in Embodiment 5.

Figure 134:
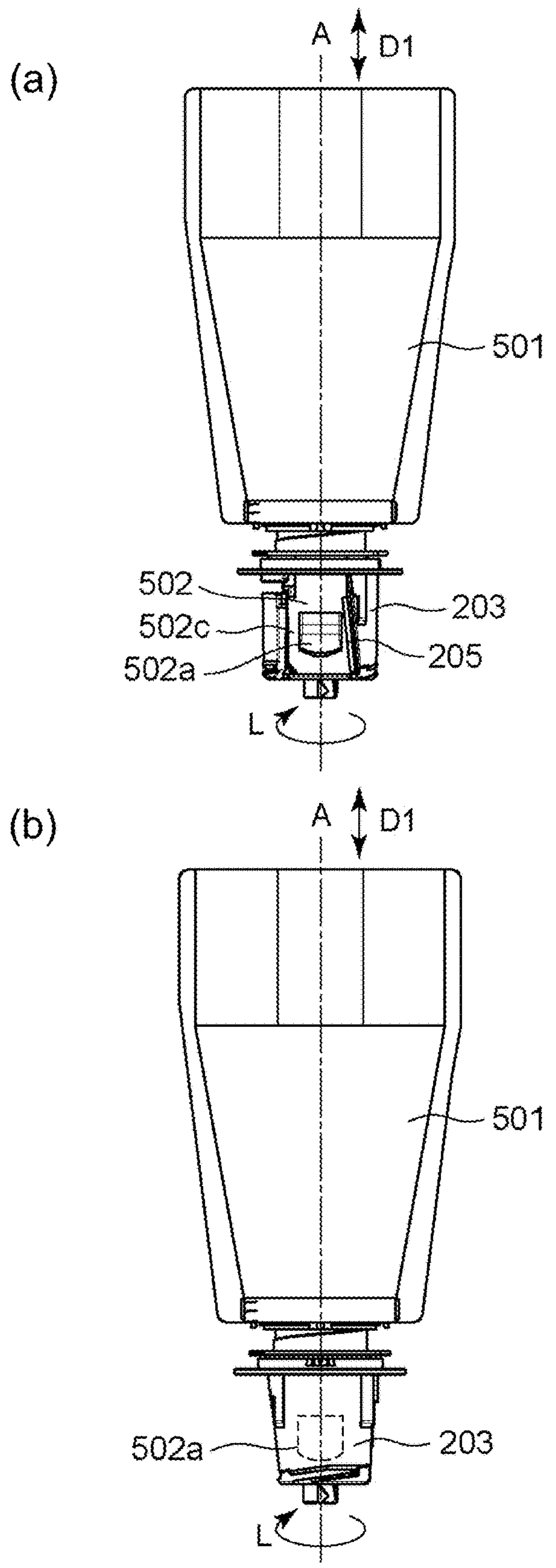

FIG. 134 is side views illustrating the second operation of the user in Embodiment 5.

Figure 135:
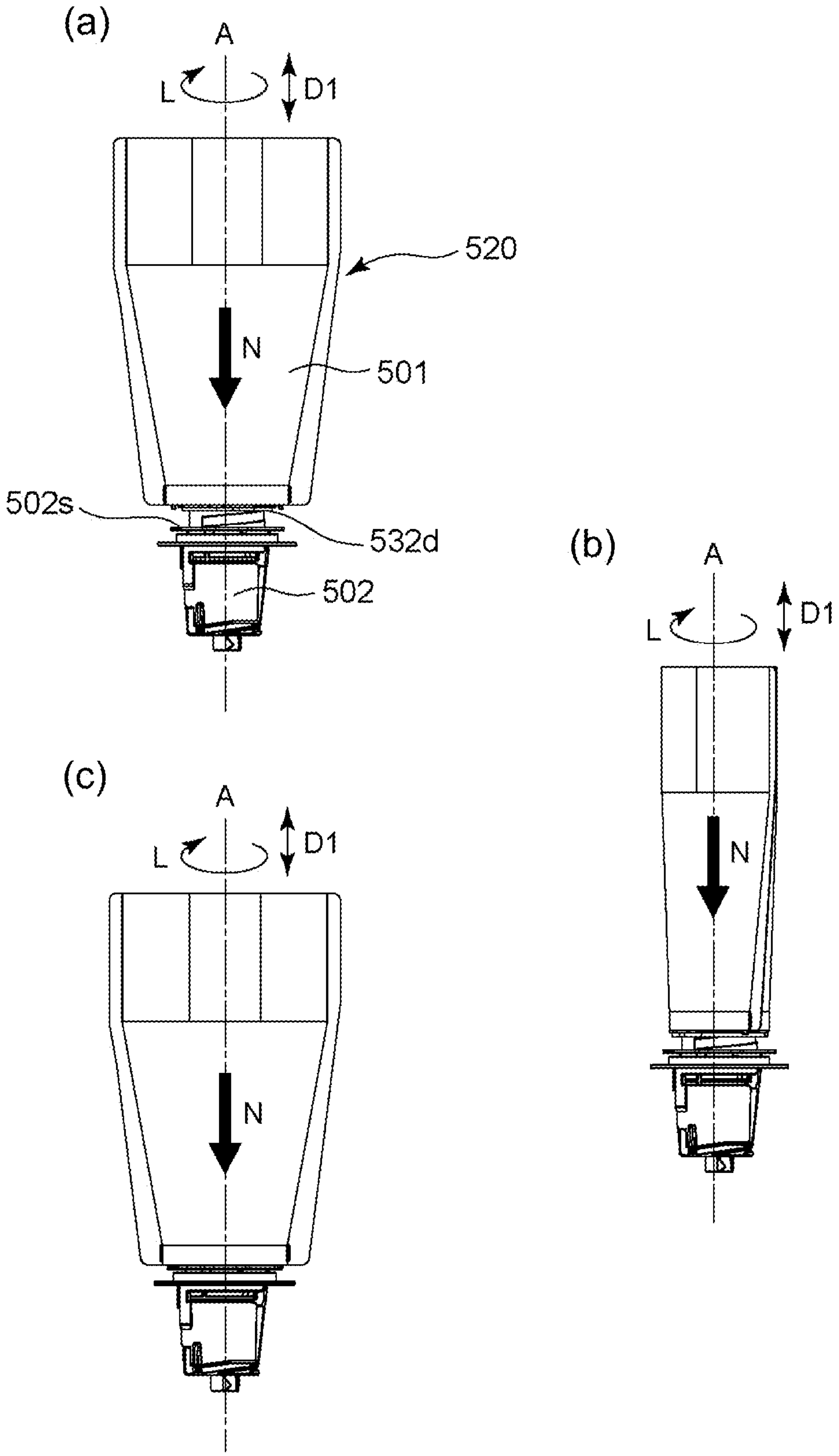

FIG. 135 is a side view illustrating a third operation of the user according to Embodiment 5.

Figure 136:
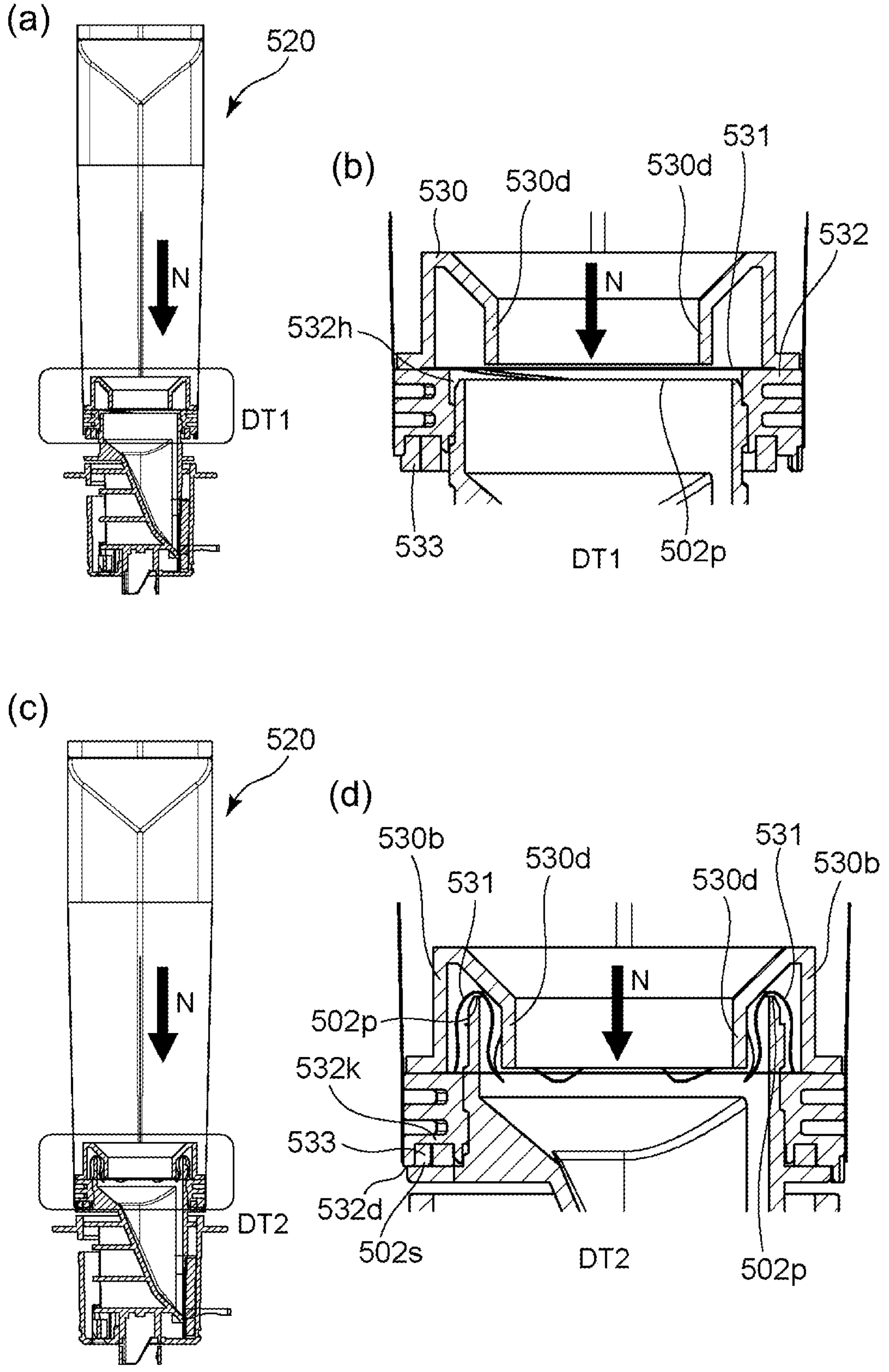

FIG. 136 is sectional views illustrating a third operation of the user in Embodiment 5.

Figure 137:
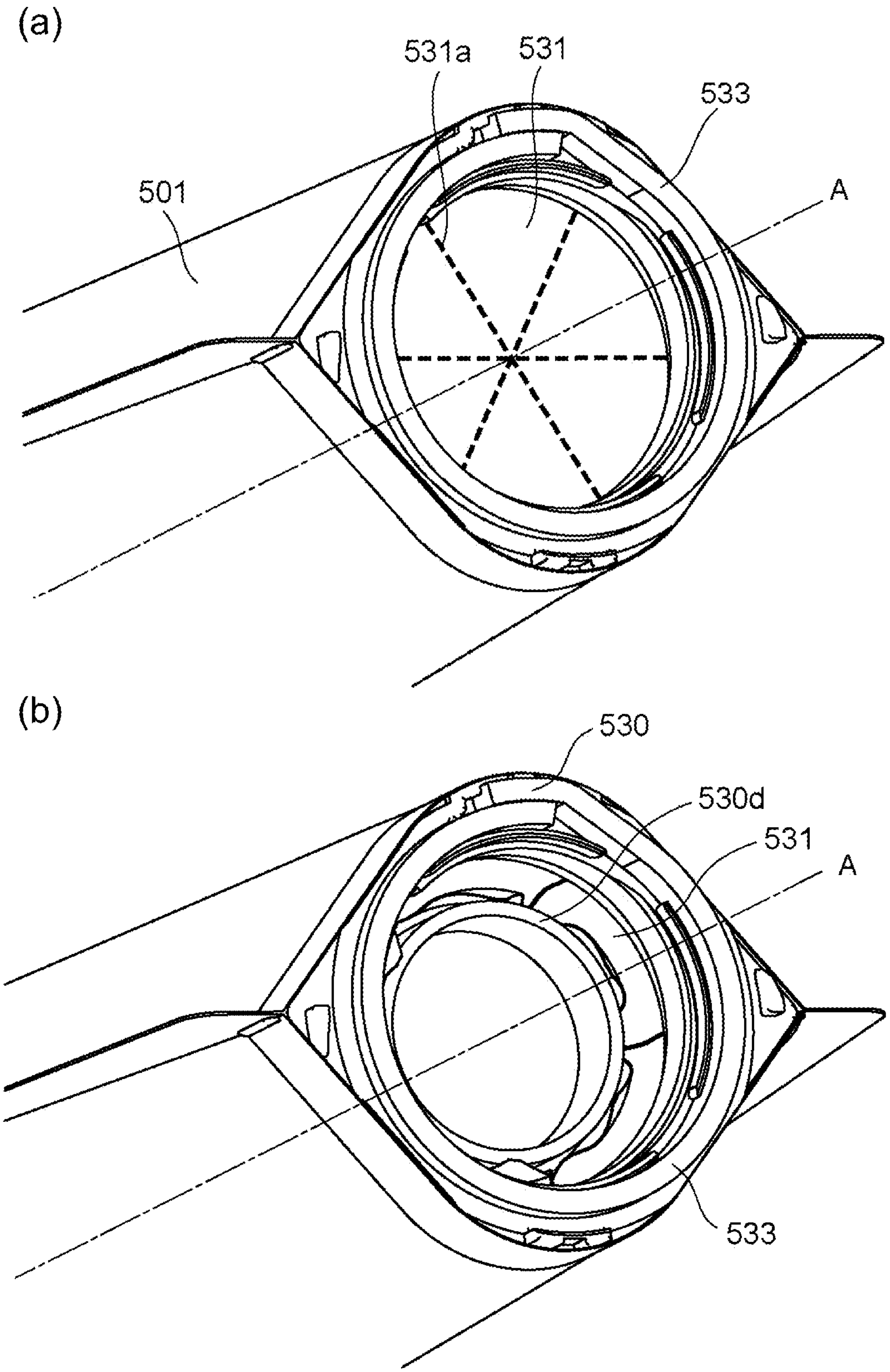

FIG. 137 is a perspective view illustrating states before and after a toner seal is broken in Embodiment 5.

Figure 138:
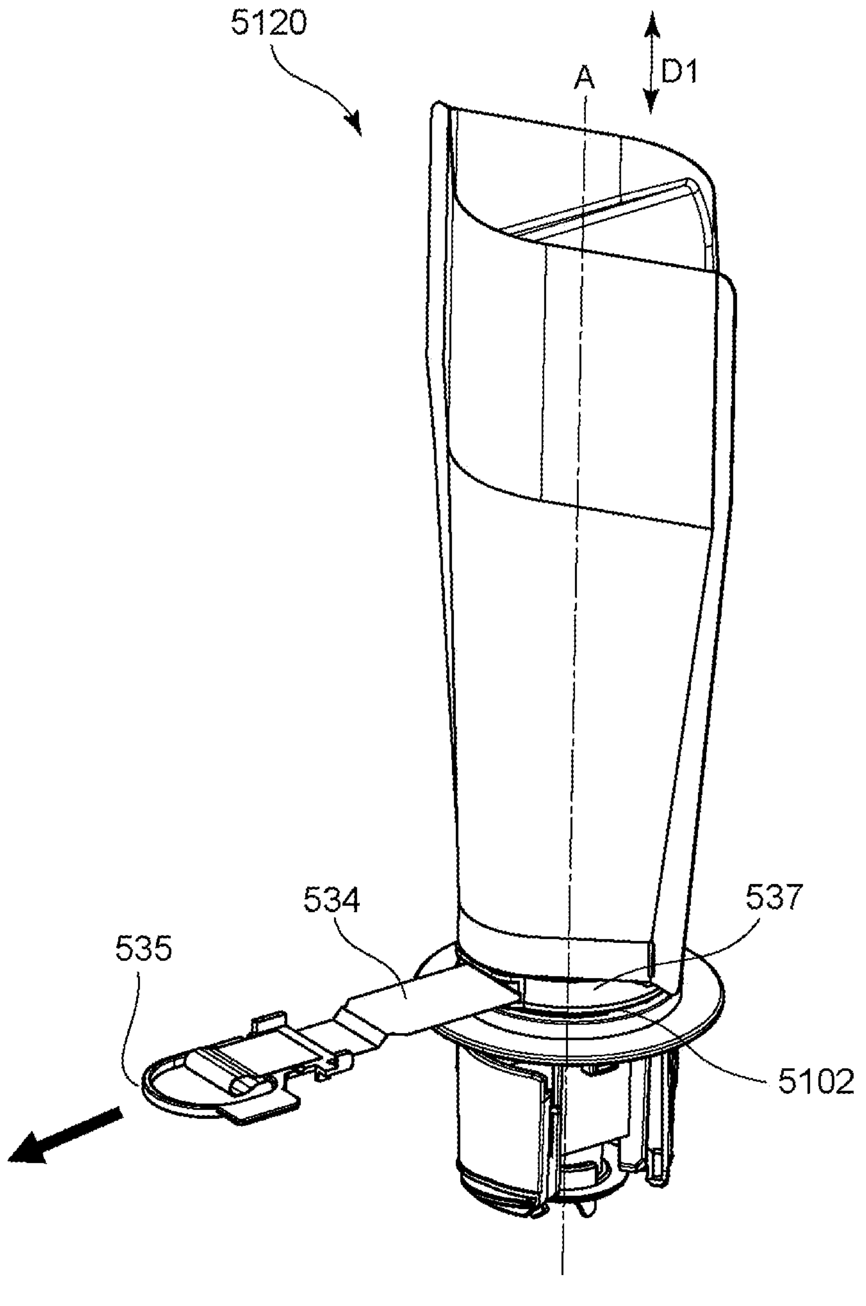

FIG. 138 is an external view of a toner pack having a structure in which the toner seal is pulled out, according to Embodiment 5.

Figure 139:
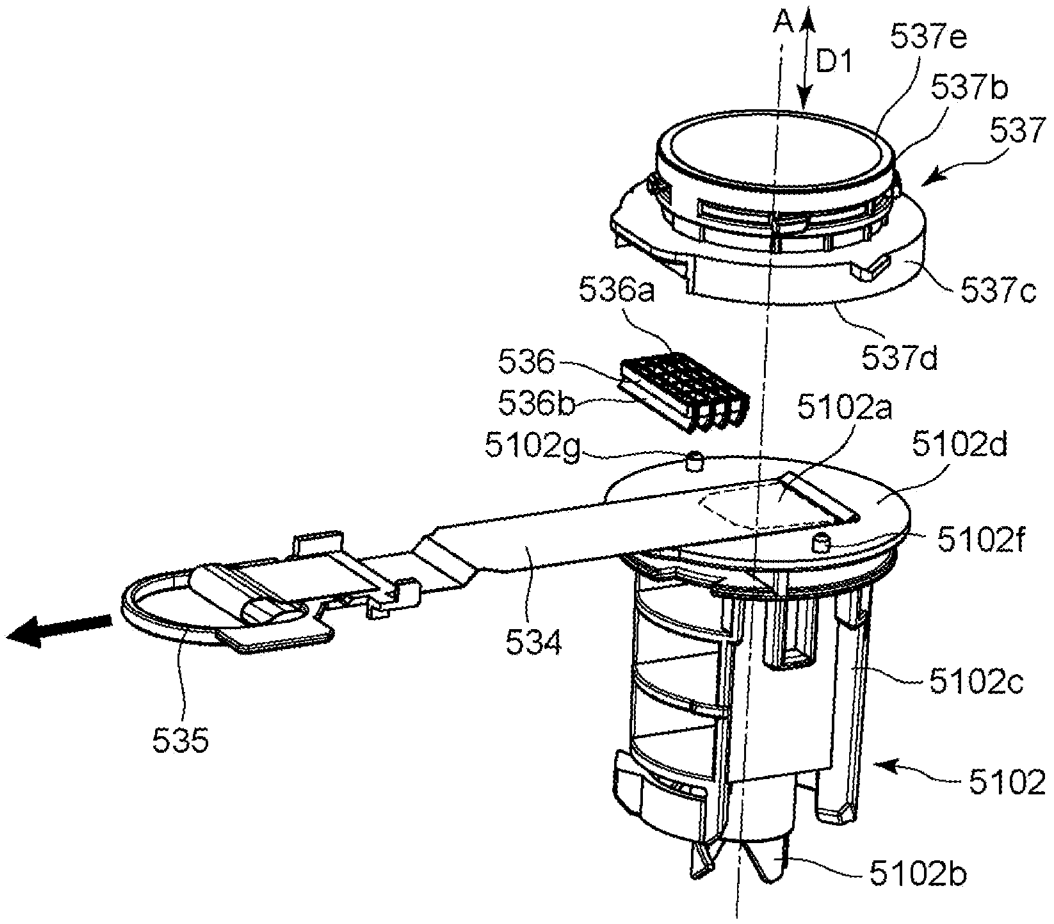

FIG. 139 is an exploded perspective view illustrating an attachment of a toner seal of the toner pack in Embodiment 5.

Figure 140:
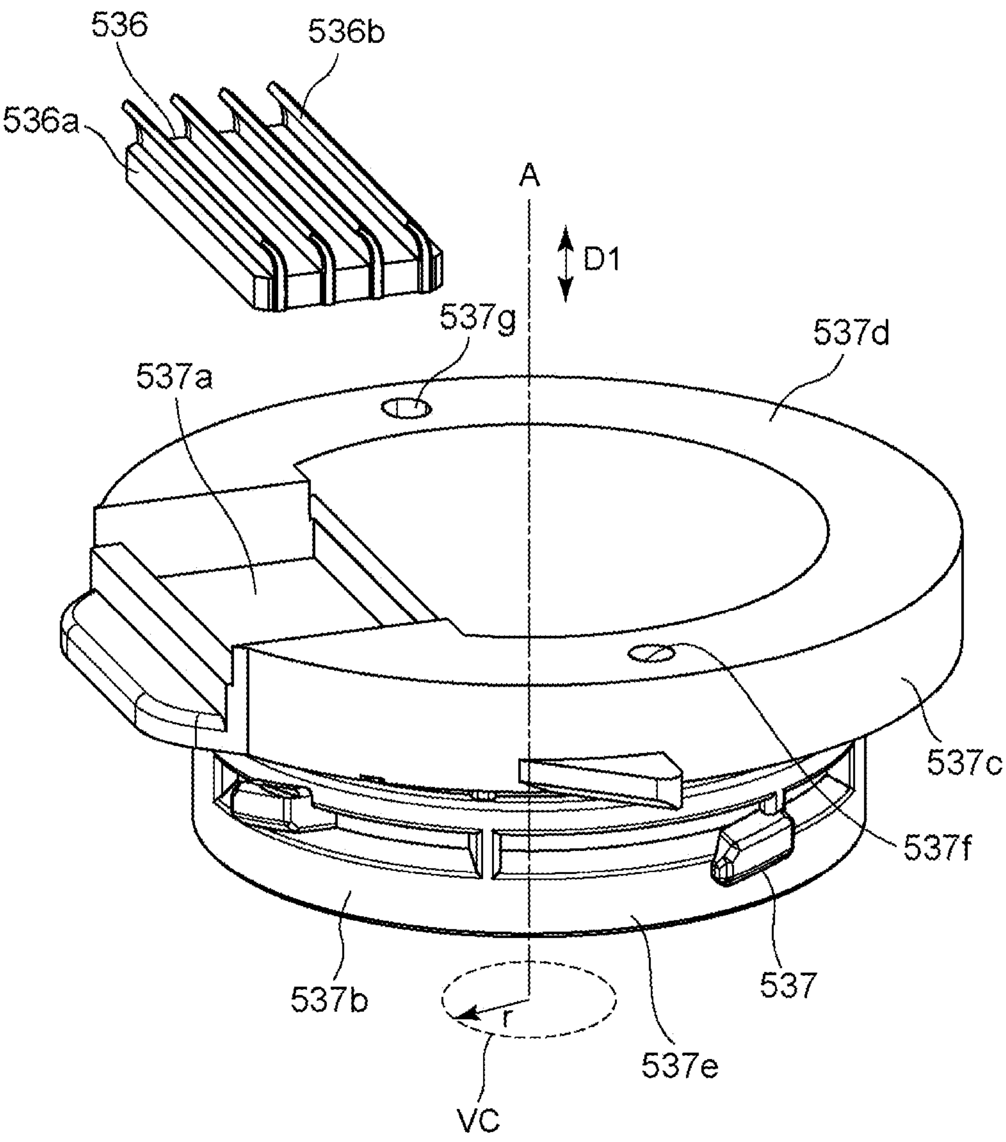

FIG. 140 is a partially exploded perspective view illustrating the mounting of the toner seal of the toner pack according to Embodiment 5.

Figure 141:
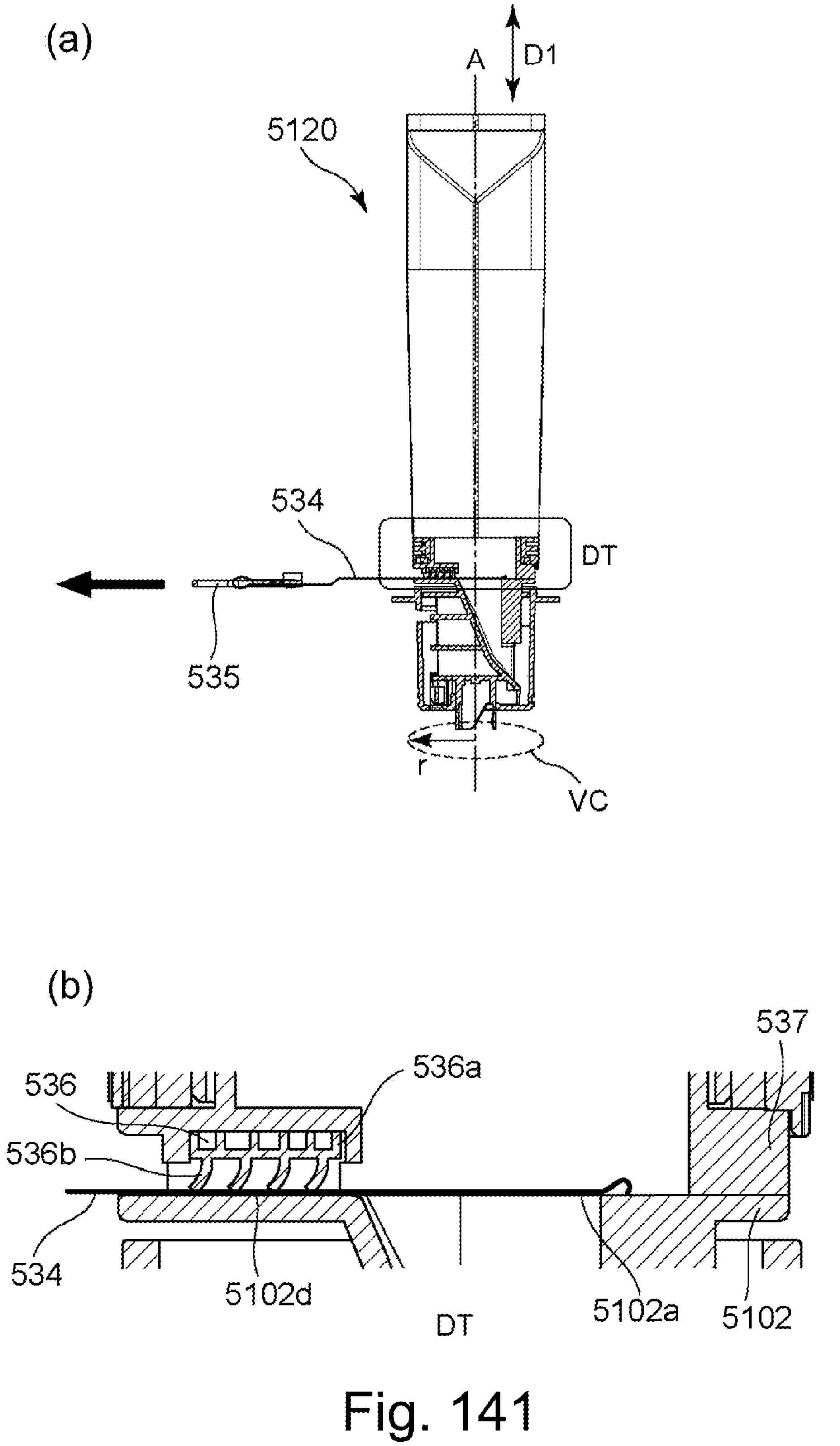

FIG. 141 is a sectional view of the toner pack according to Embodiment 5, which is structured to pull out the toner seal to the outside.

Figure 142:
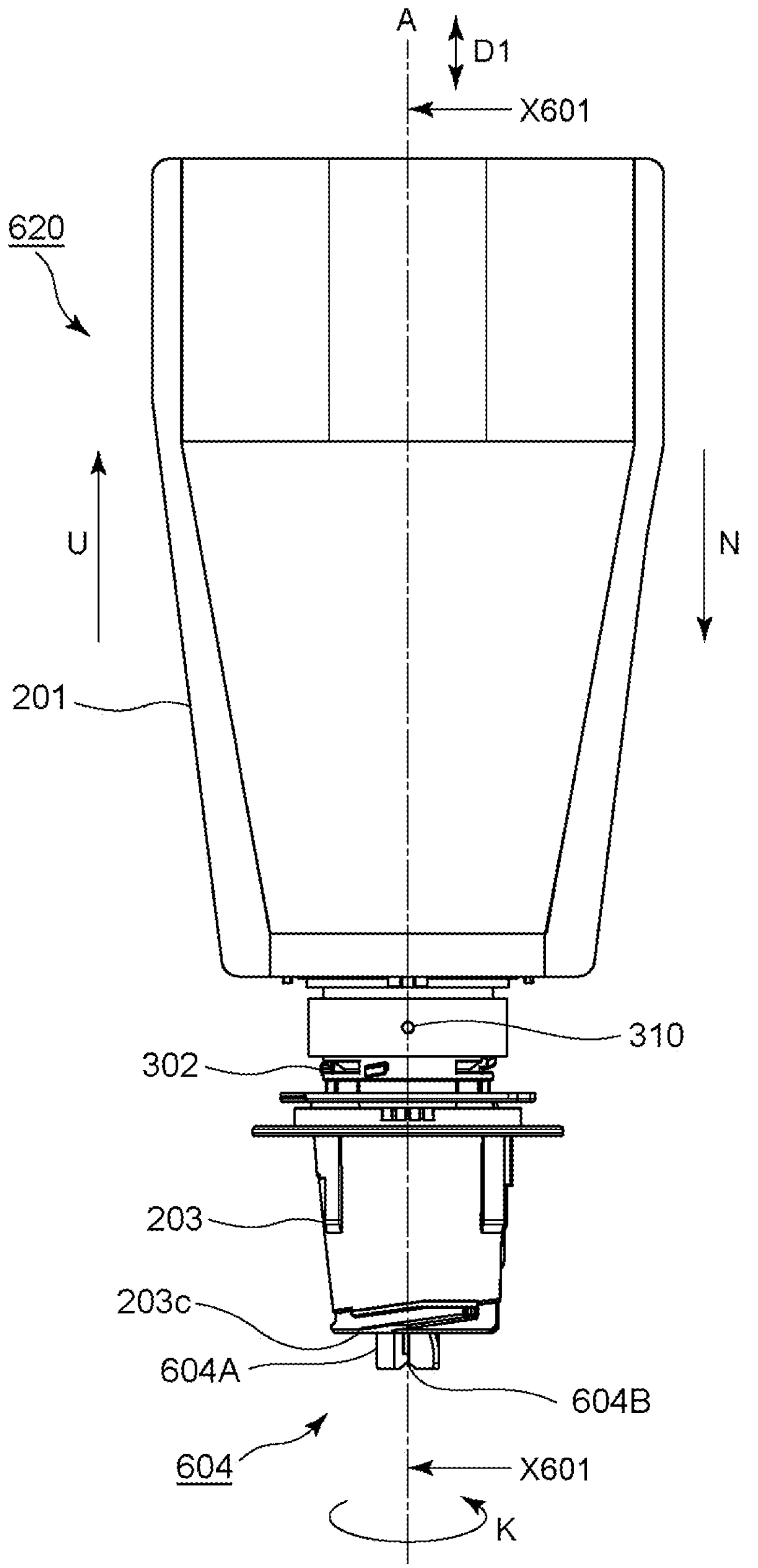

FIG. 142 is an illustration showing an entire toner pack according to Embodiment 6.

Figure 143:
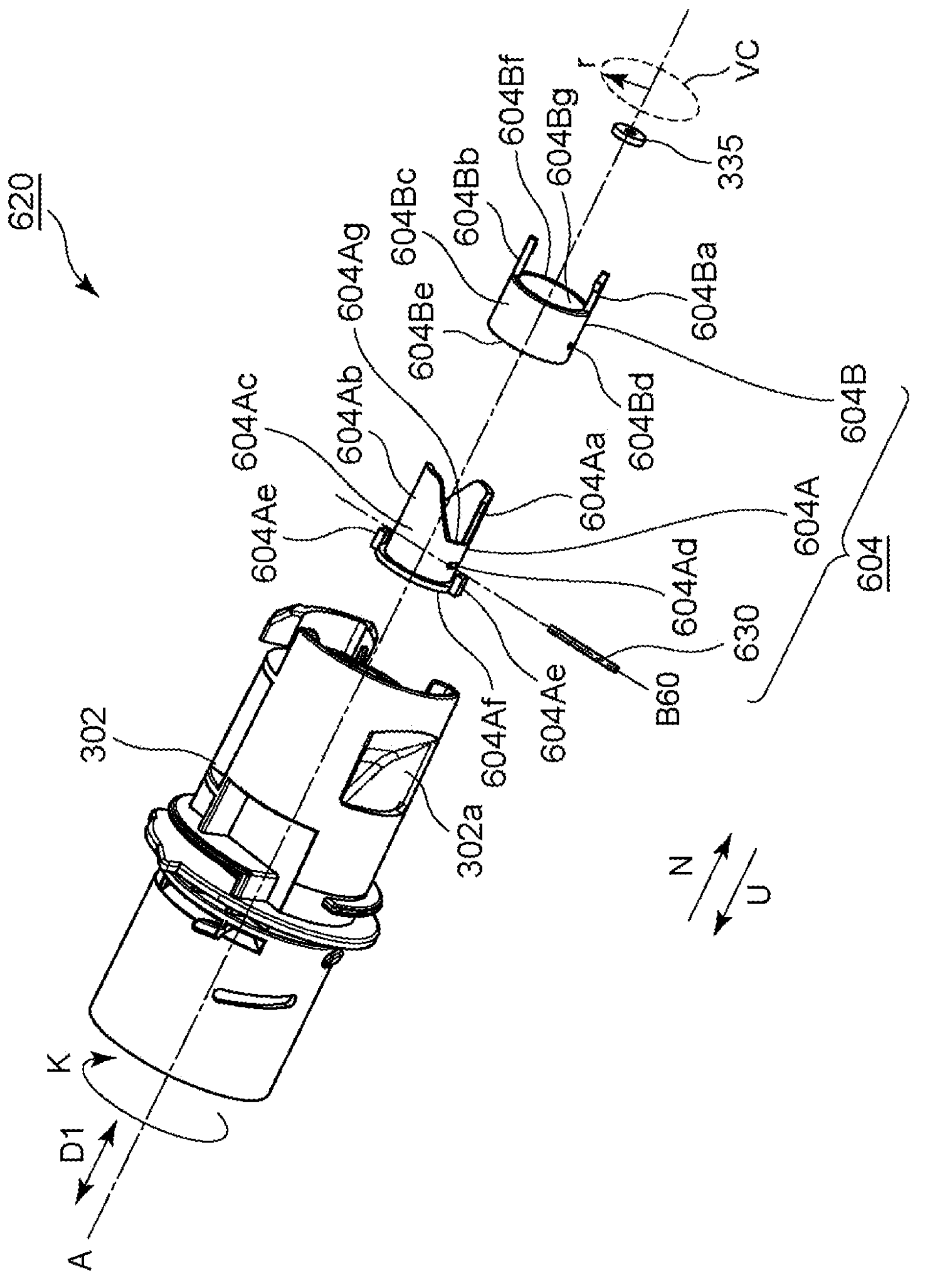

FIG. 143 is an exploded perspective view of the restriction releasing mechanism according to Embodiment 6.

Figure 144:
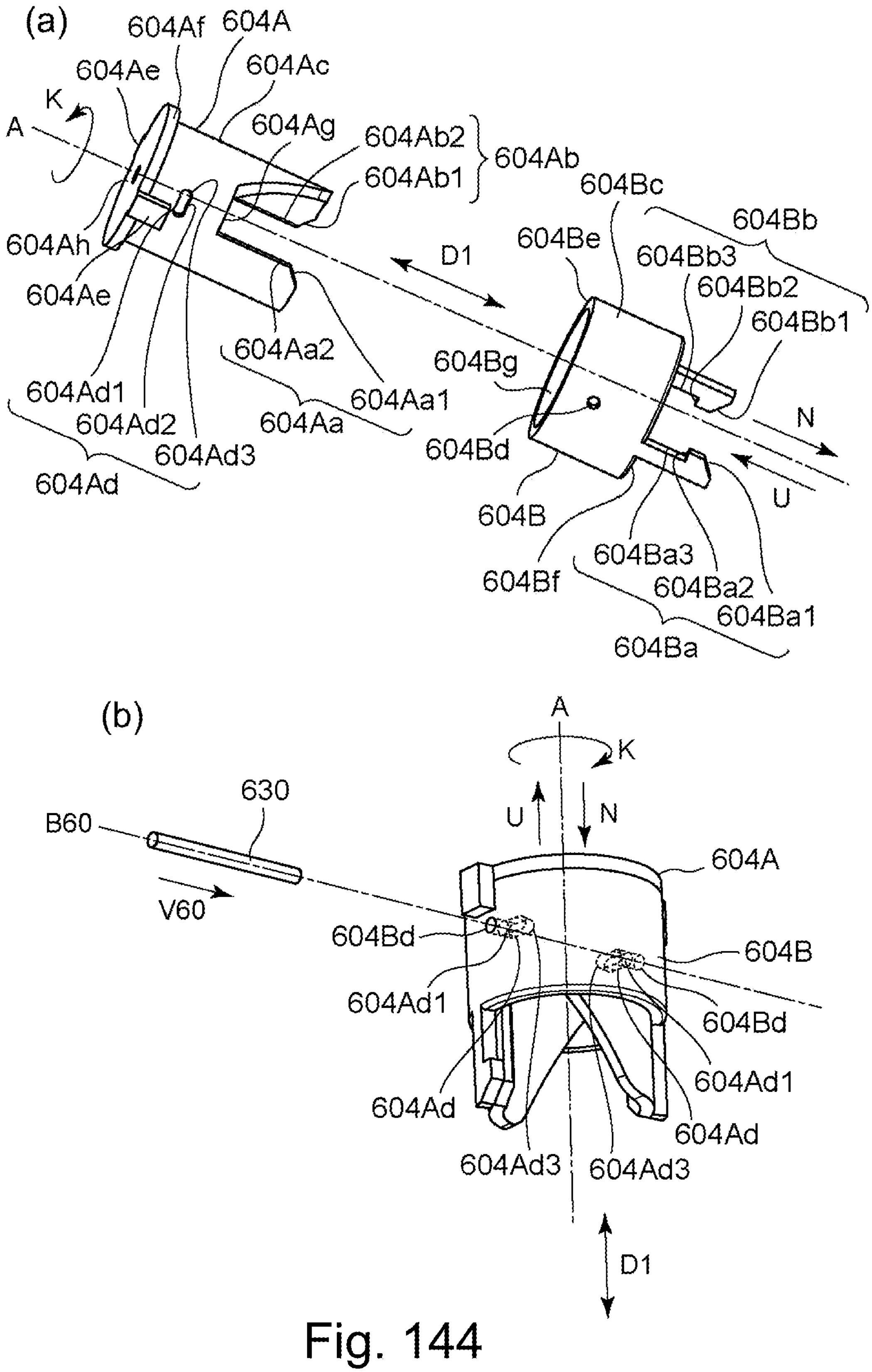

FIG. 144 is an illustration showing a detailed shape of the restriction releasing mechanism and a process of an assembling method in Embodiment 6.

Figure 145:
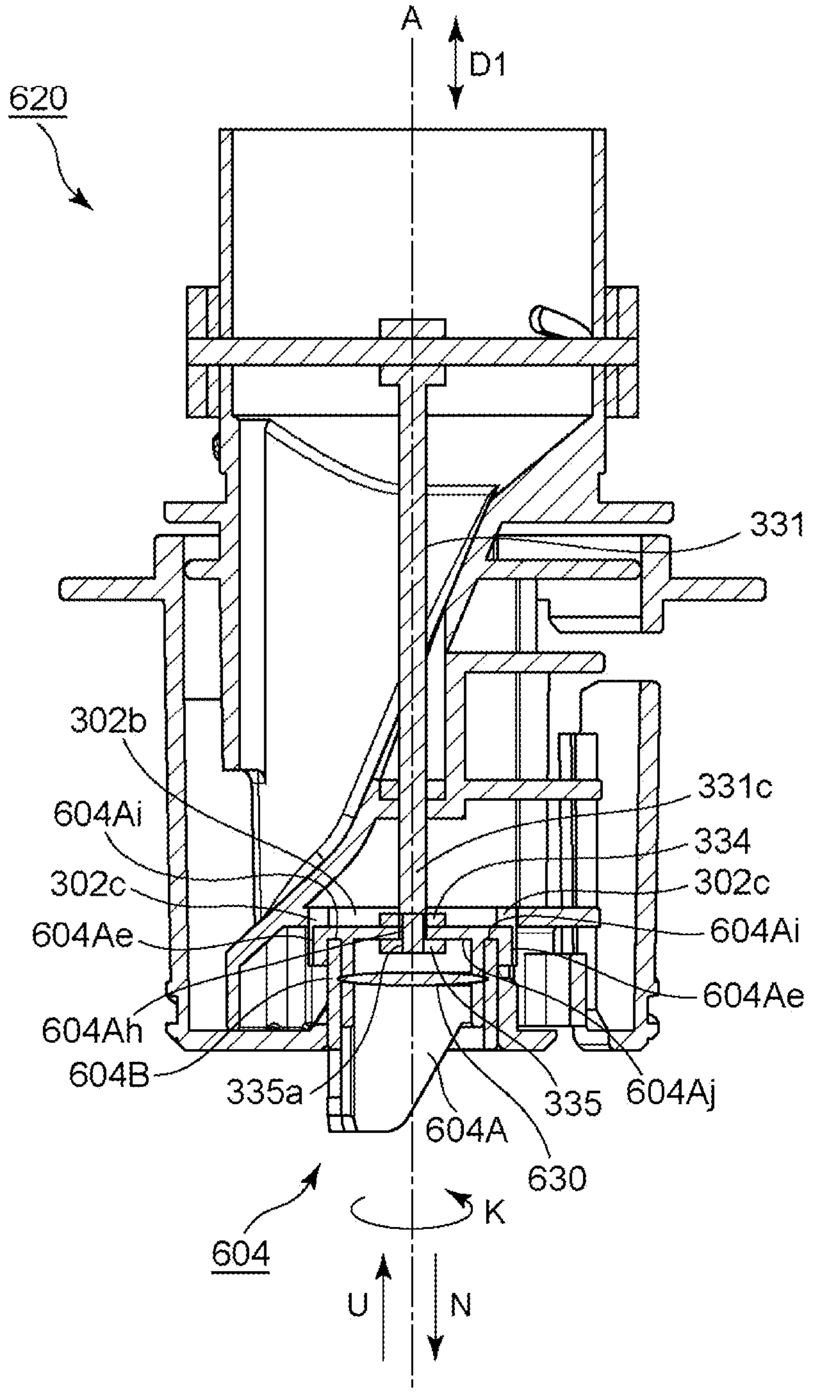

FIG. 145 is a sectional view of a toner pack according to Embodiment 6.

Figure 146:
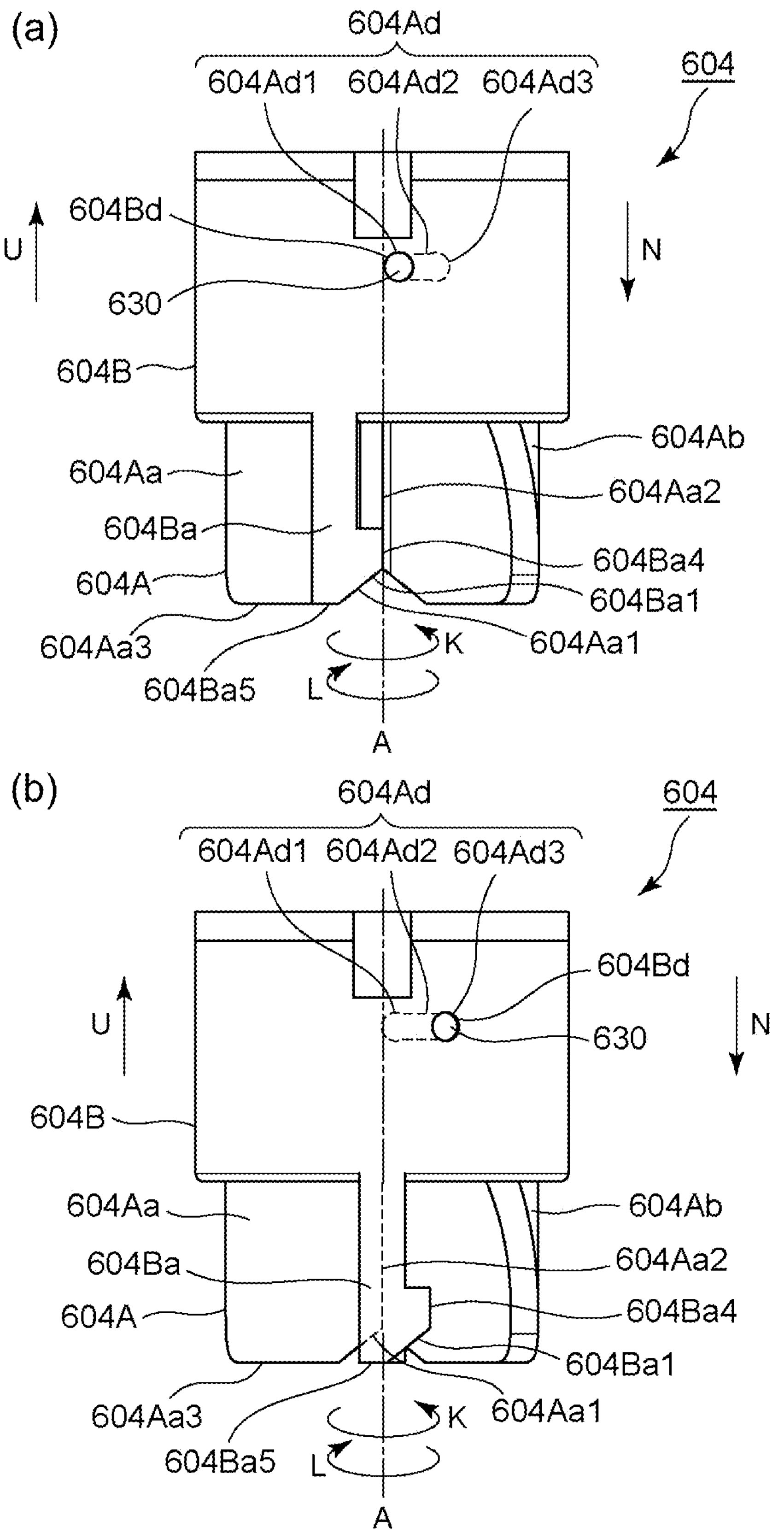

FIG. 146 is an illustration showing operation of a restriction releasing mechanism in Embodiment 6.

Figure 147:
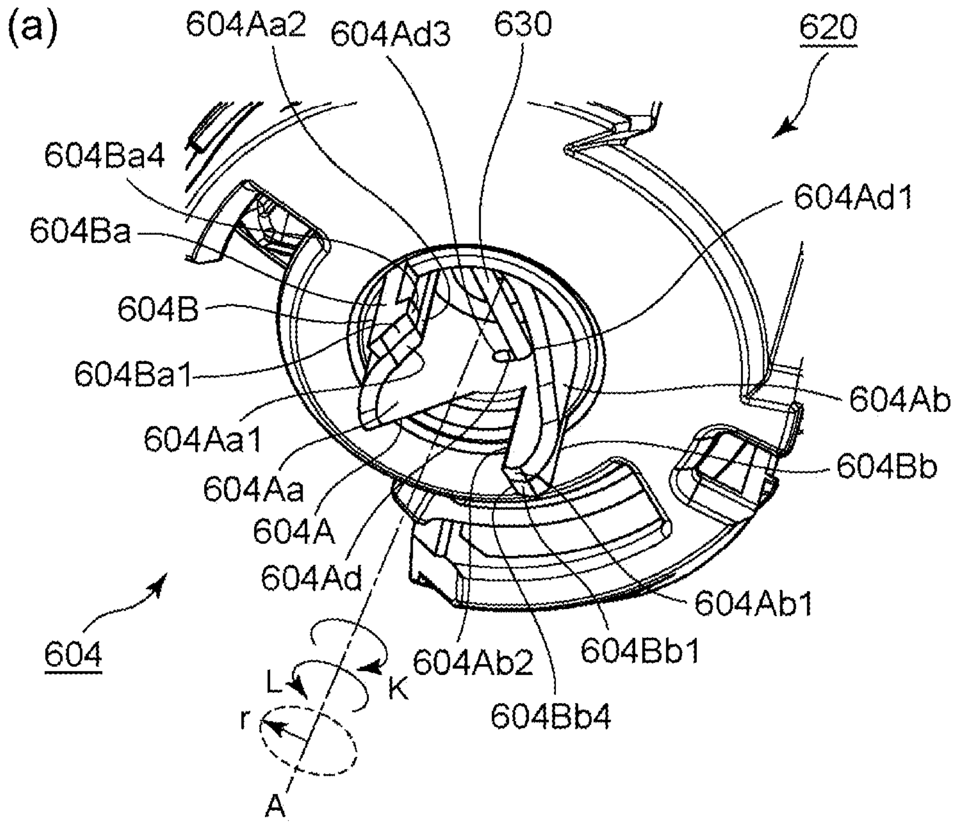
Figure 147:
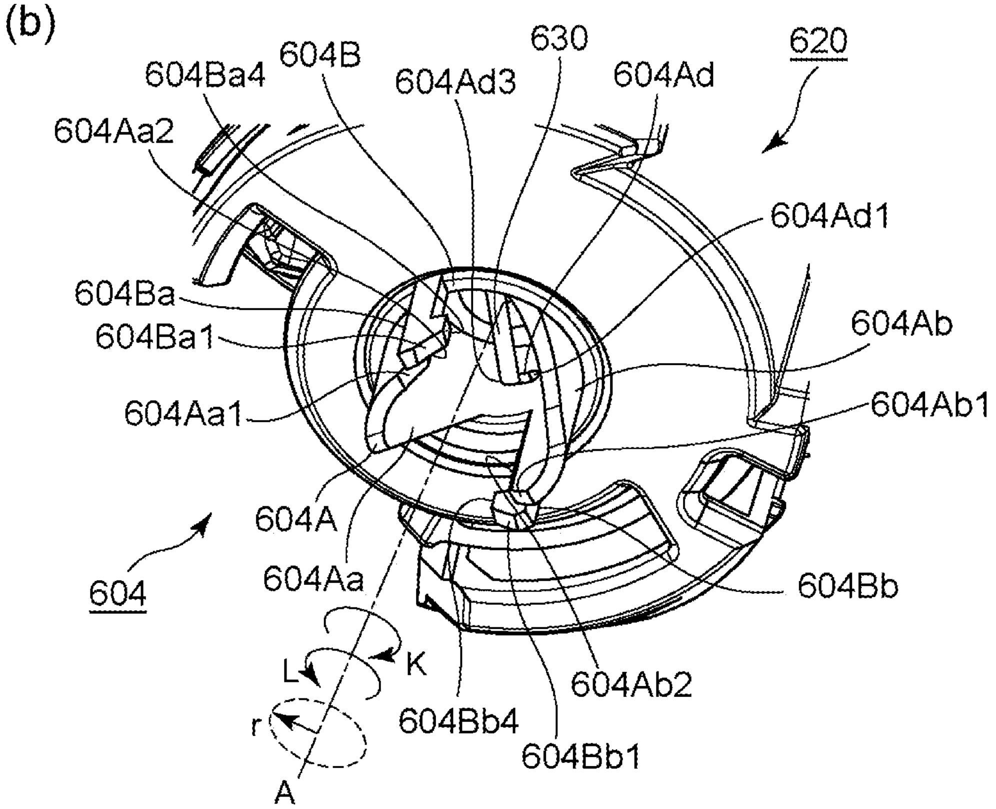

FIG. 147 is an enlarged perspective view of the neighborhood of a projecting portion of the toner pack according to Embodiment 6.

Figure 148:
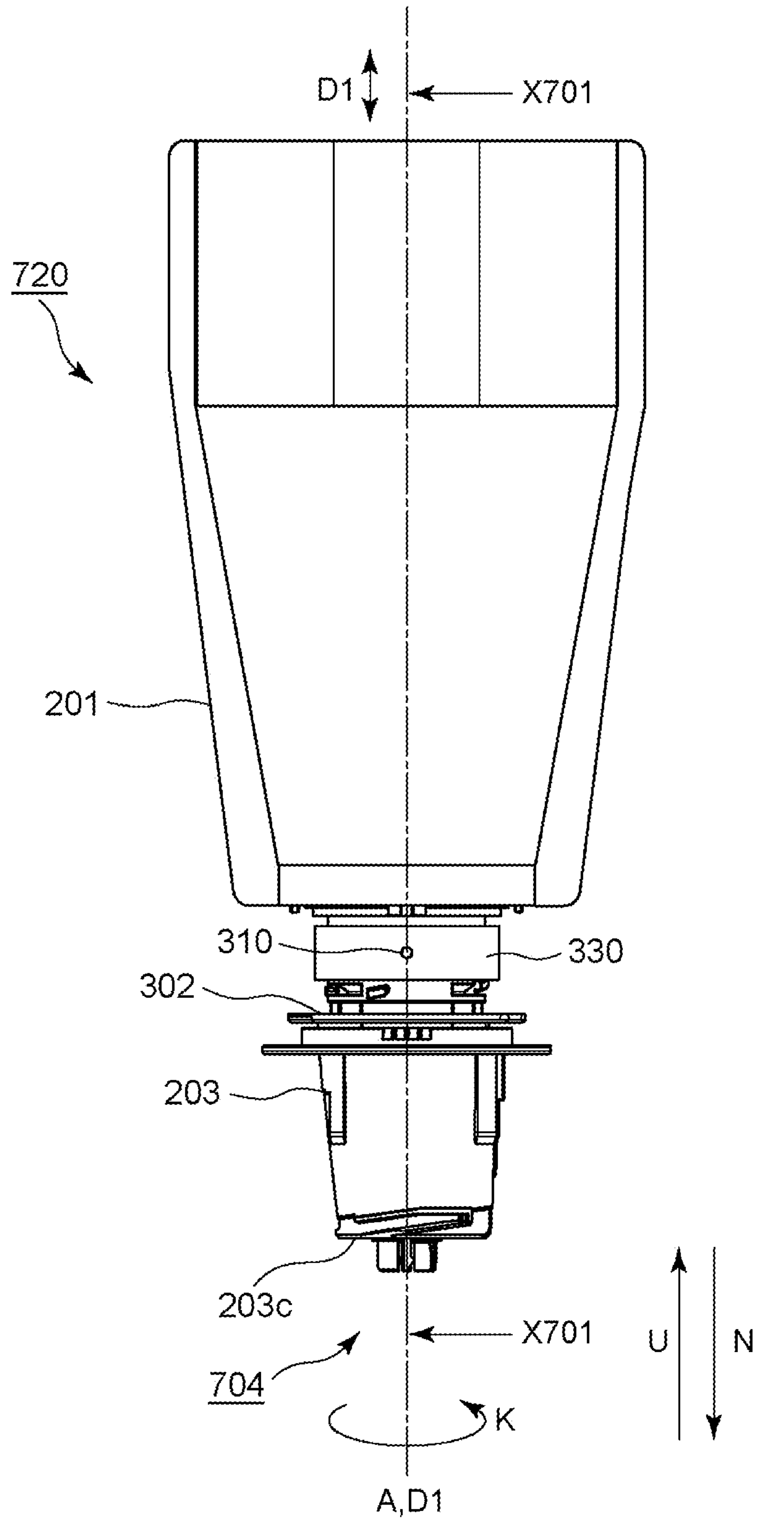

FIG. 148 is an illustration showing an entire toner pack according to Embodiment 7.

Figure 149:
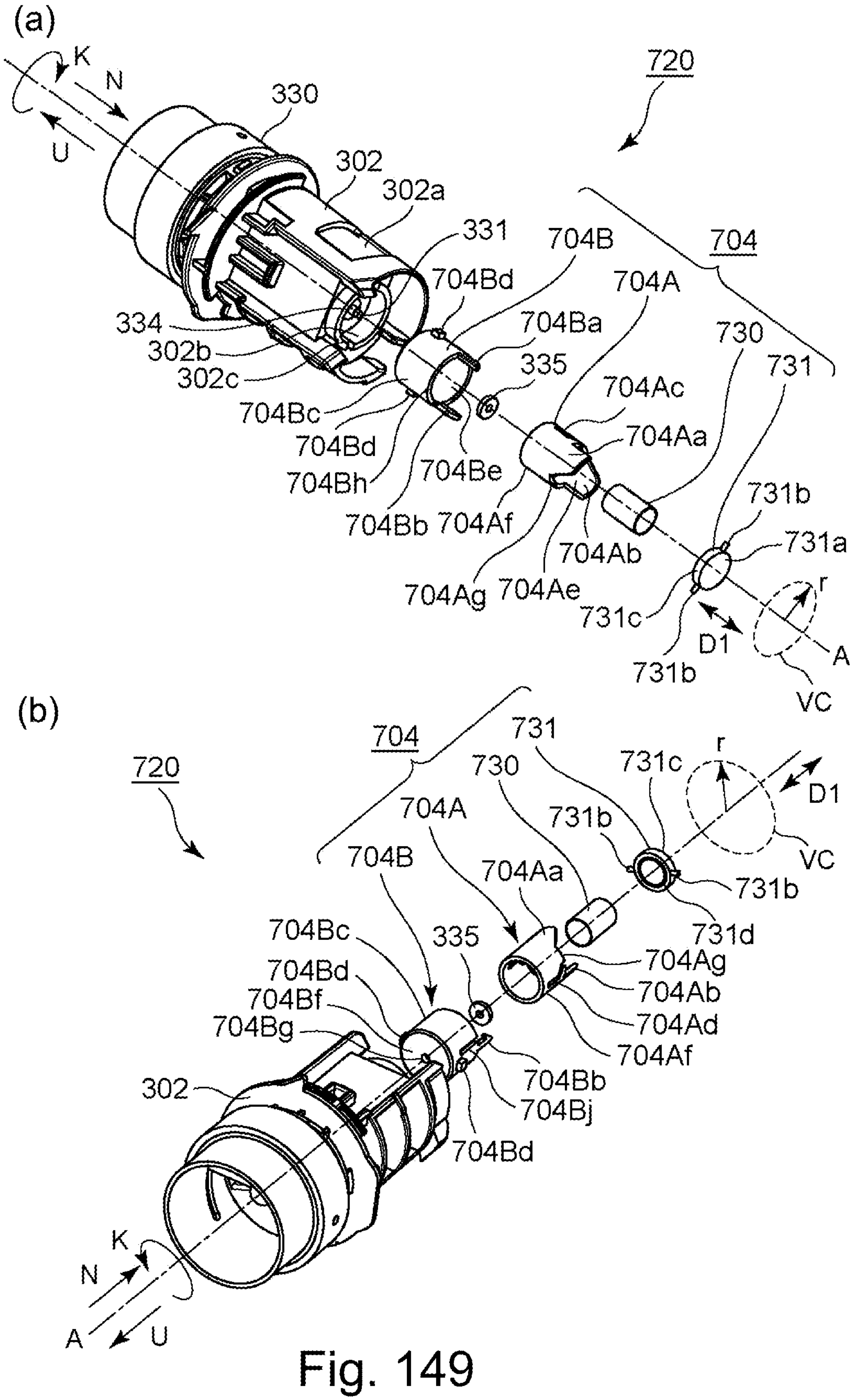

FIG. 149 is an exploded perspective view of a restriction releasing mechanism according to Embodiment 7.

Figure 150:
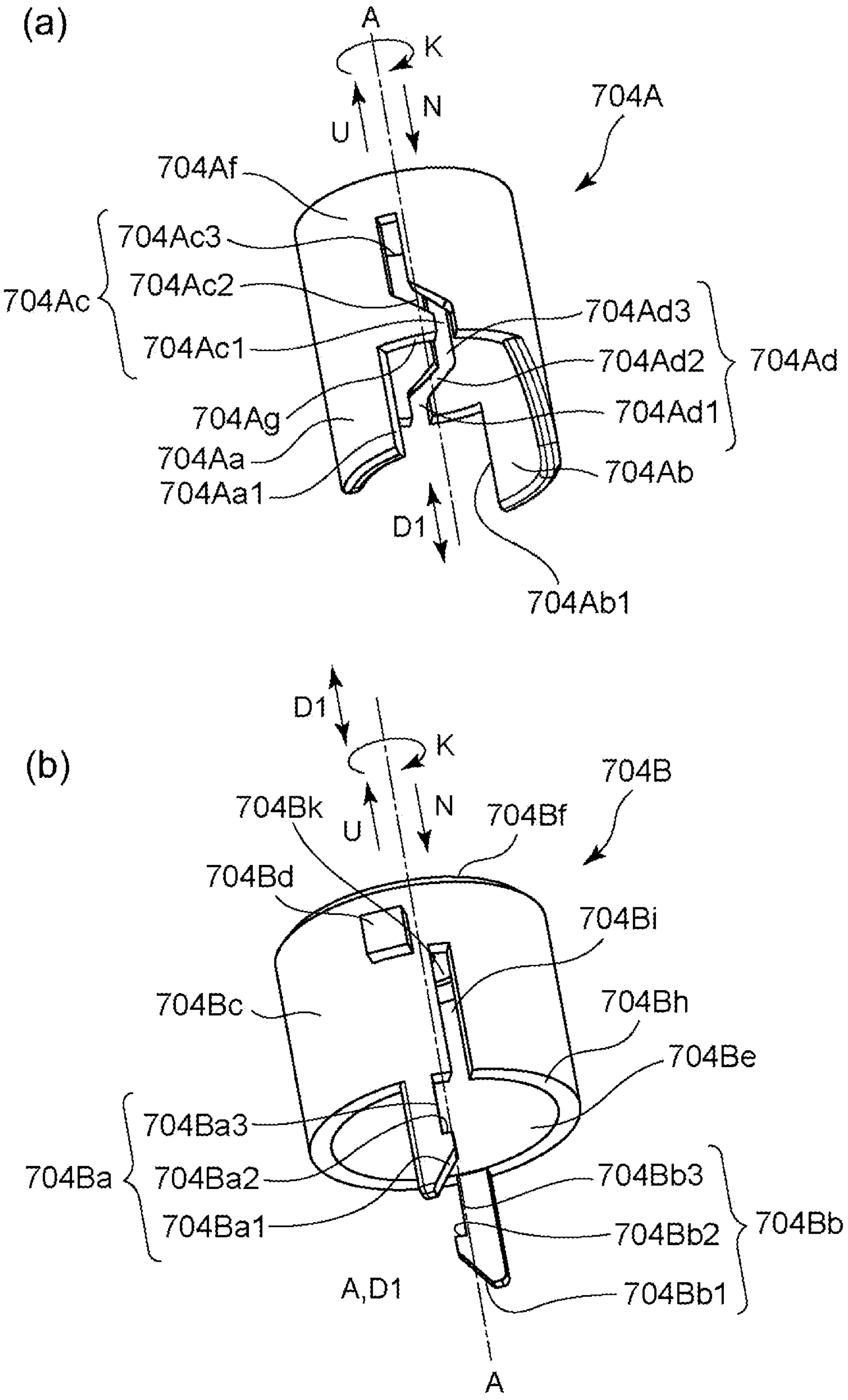

FIG. 150 is a detailed view of a first restriction releasing member and a second restriction releasing member in Embodiment 7.

Figure 151:
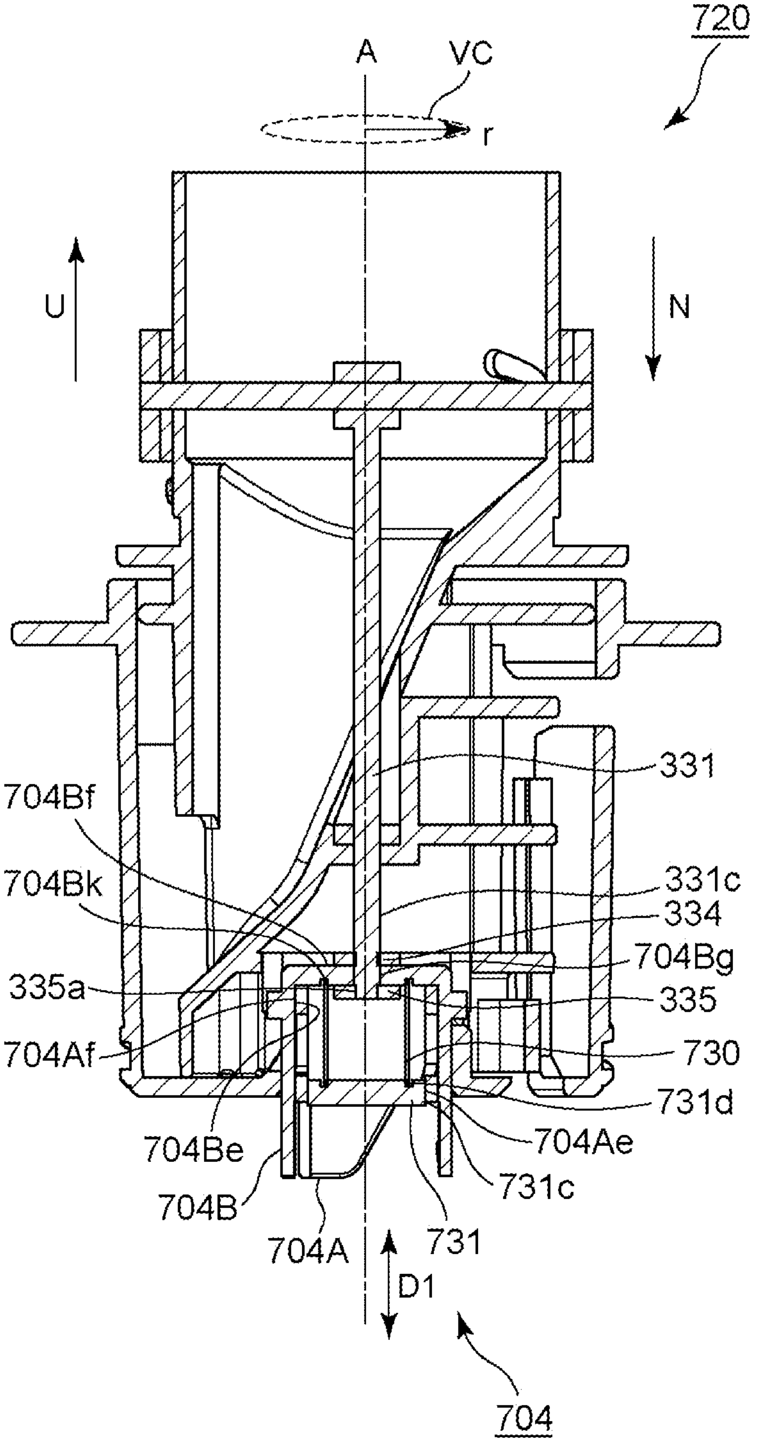

FIG. 151 is a sectional view of the toner pack according to Embodiment 7.

Figure 152:
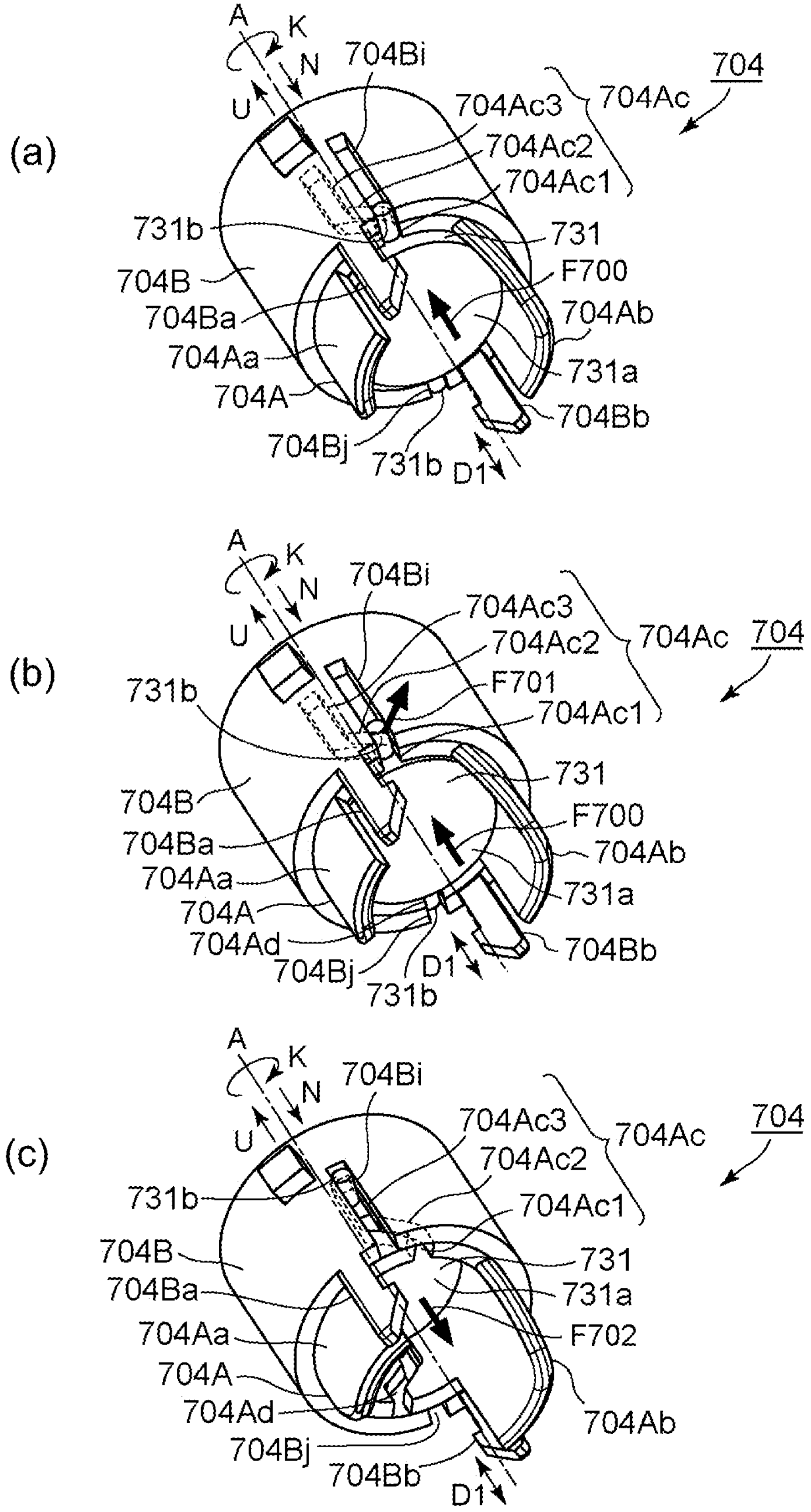

FIG. 152 is an illustration showing operation of the restriction releasing mechanism in Embodiment 7.

Figure 153:
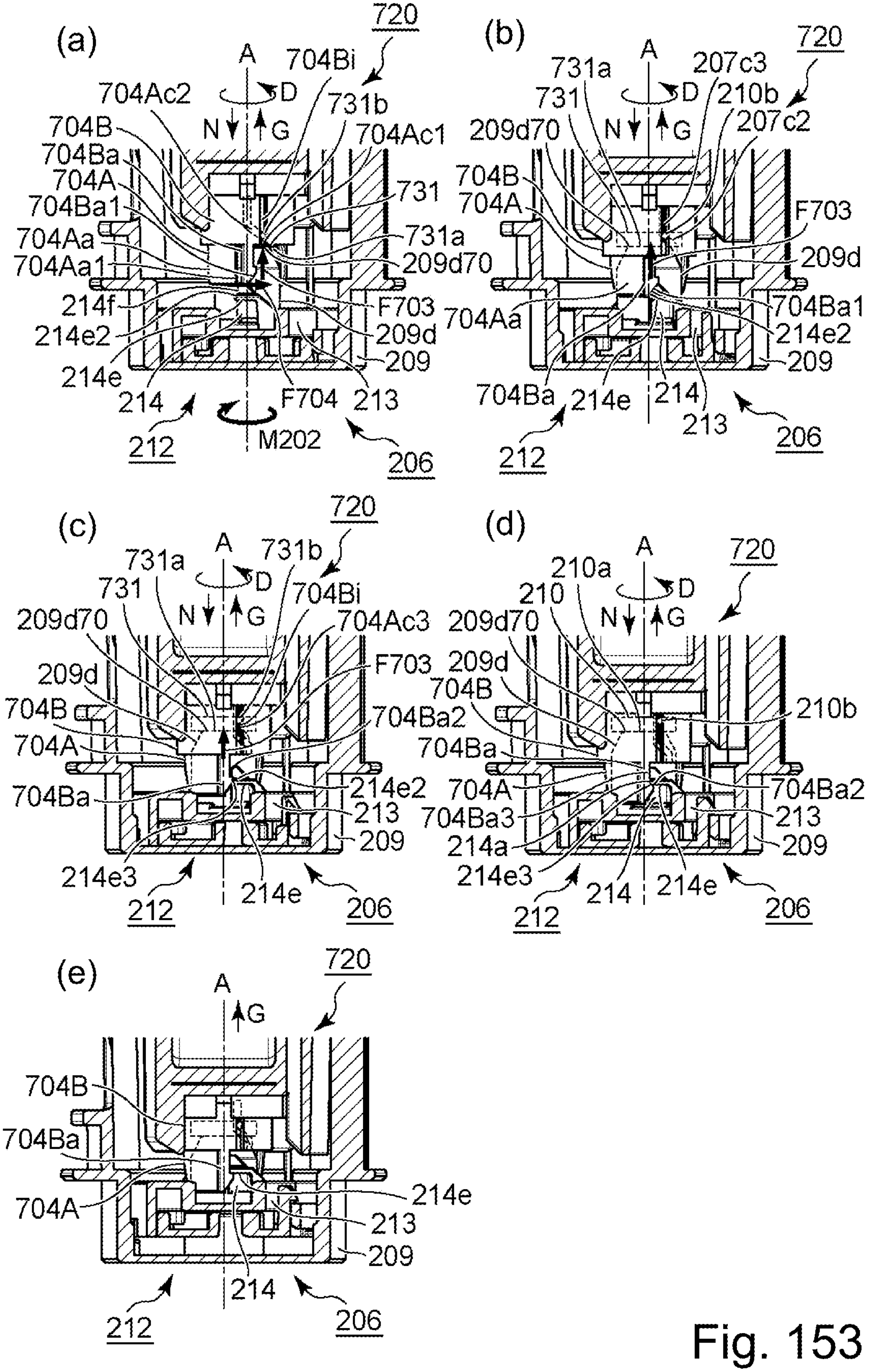

FIG. 153 is an illustration showing a process of releasing rotation restriction of a shutter on the apparatus-side by a rotation restriction mechanism of the mounting portion by mounting the toner pack, in Embodiment 7.

Figure 154:
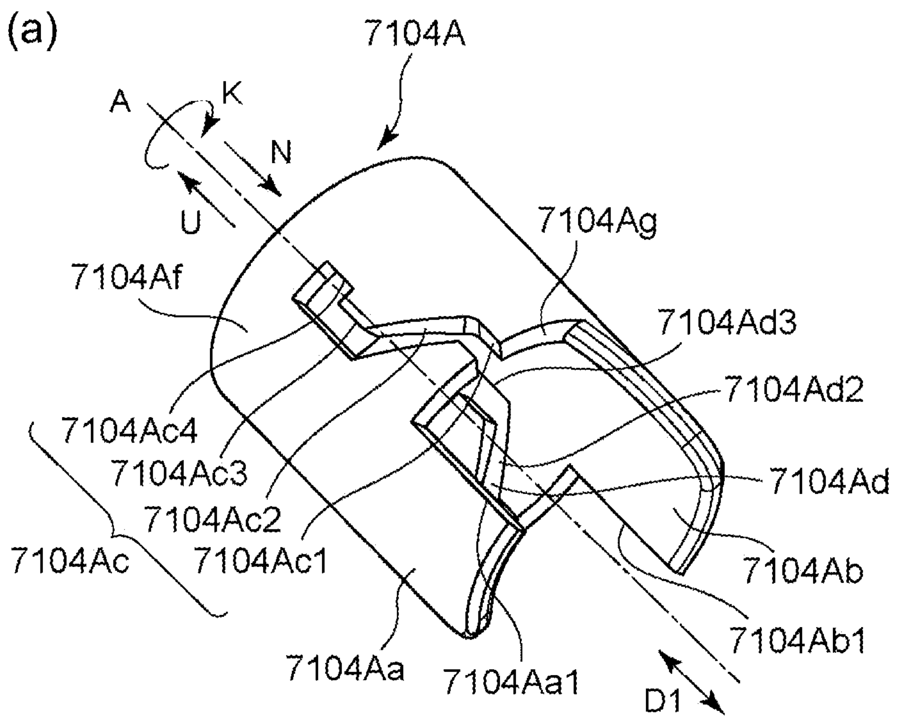
Figure 154:
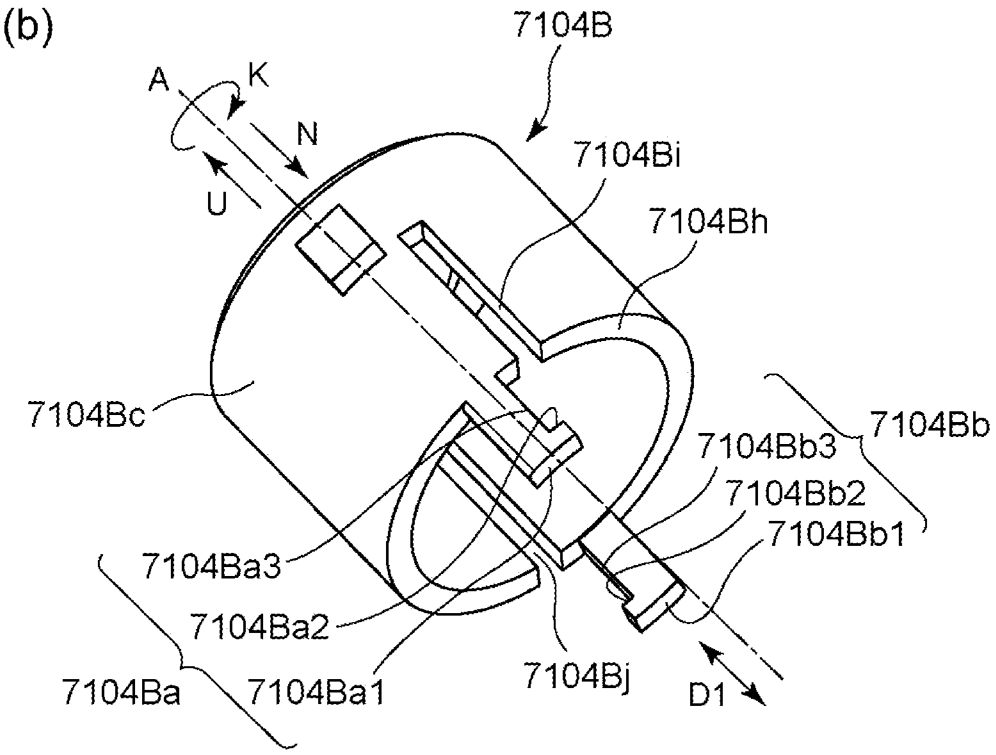

FIG. 154 is a detailed view of a first restriction releasing member and a second restriction releasing member in Modified Example 1 of Embodiment 7.

Figure 155:
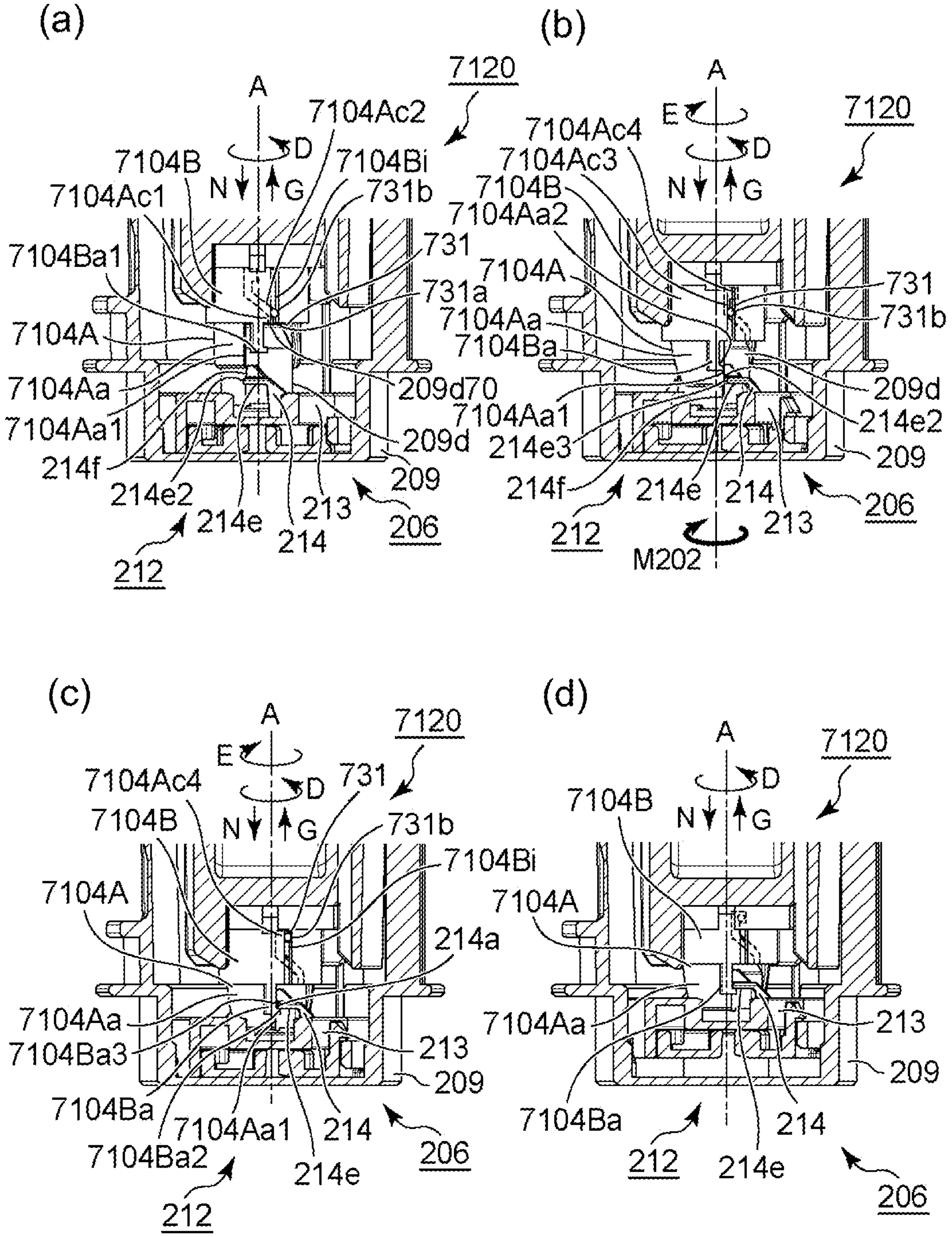

FIG. 155 is an illustration showing a process in which rotation restriction of a shutter on the apparatus-side by the rotation restriction mechanism of the mounting portion is released by mounting the toner pack in Modified Example 1 of Embodiment 7.

Figure 156:
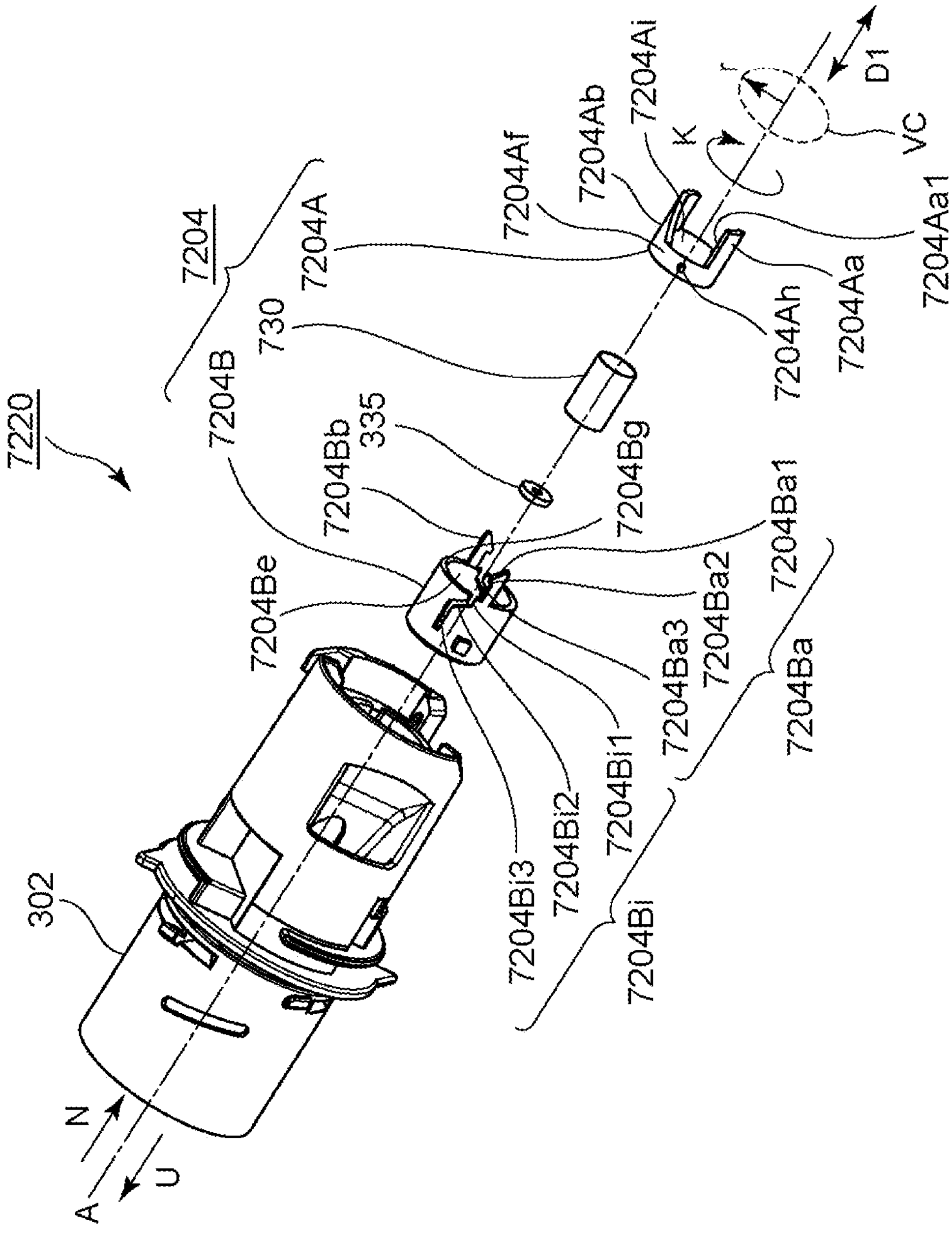

FIG. 156 is an exploded perspective view of a restriction releasing mechanism according to Modified Example 2 of Embodiment 7.

Figure 157:
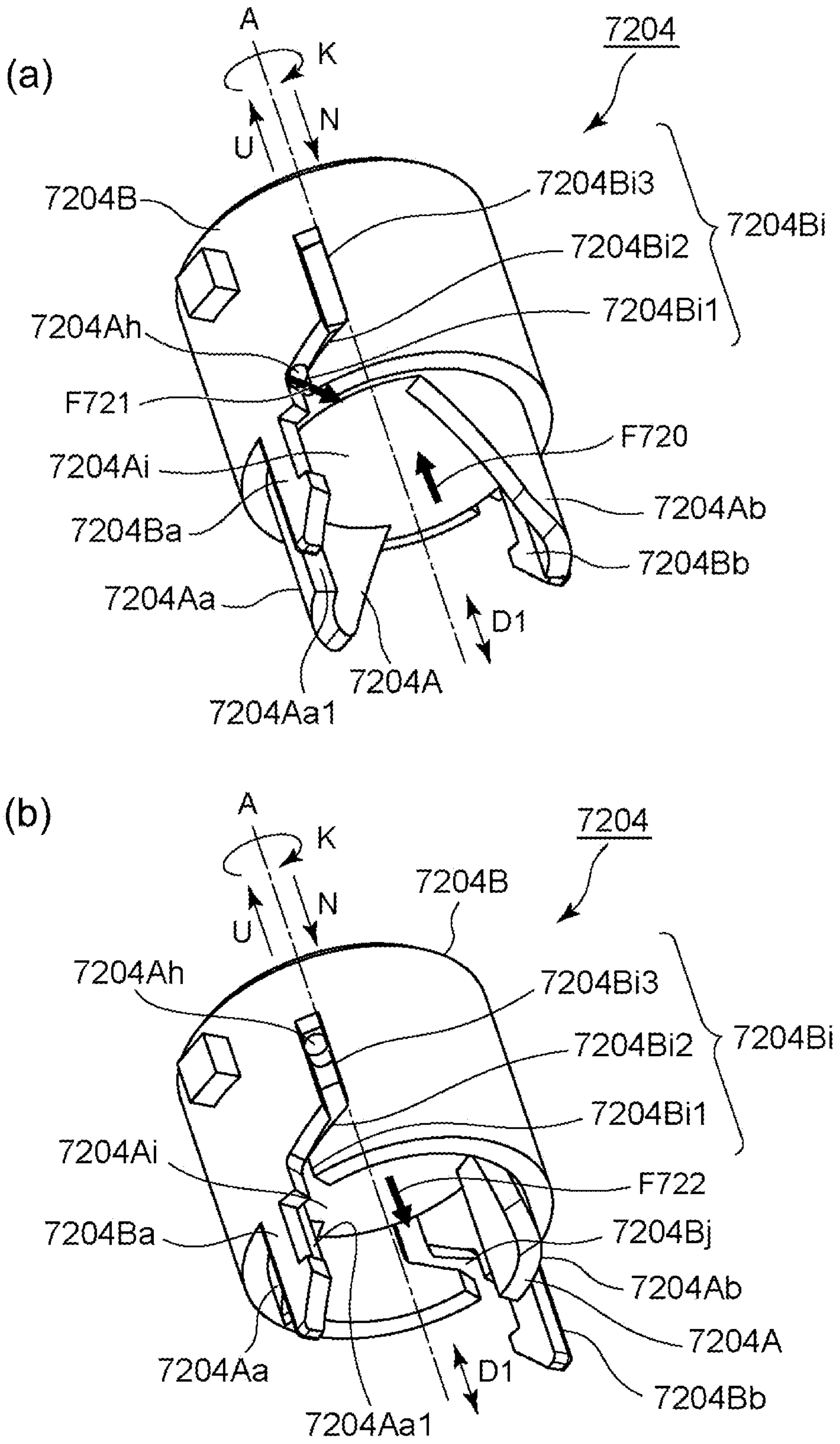

FIG. 157 is an illustration showing operation of the restriction releasing mechanism according to Modified Example 2 of Embodiment 7.

Figure 158:
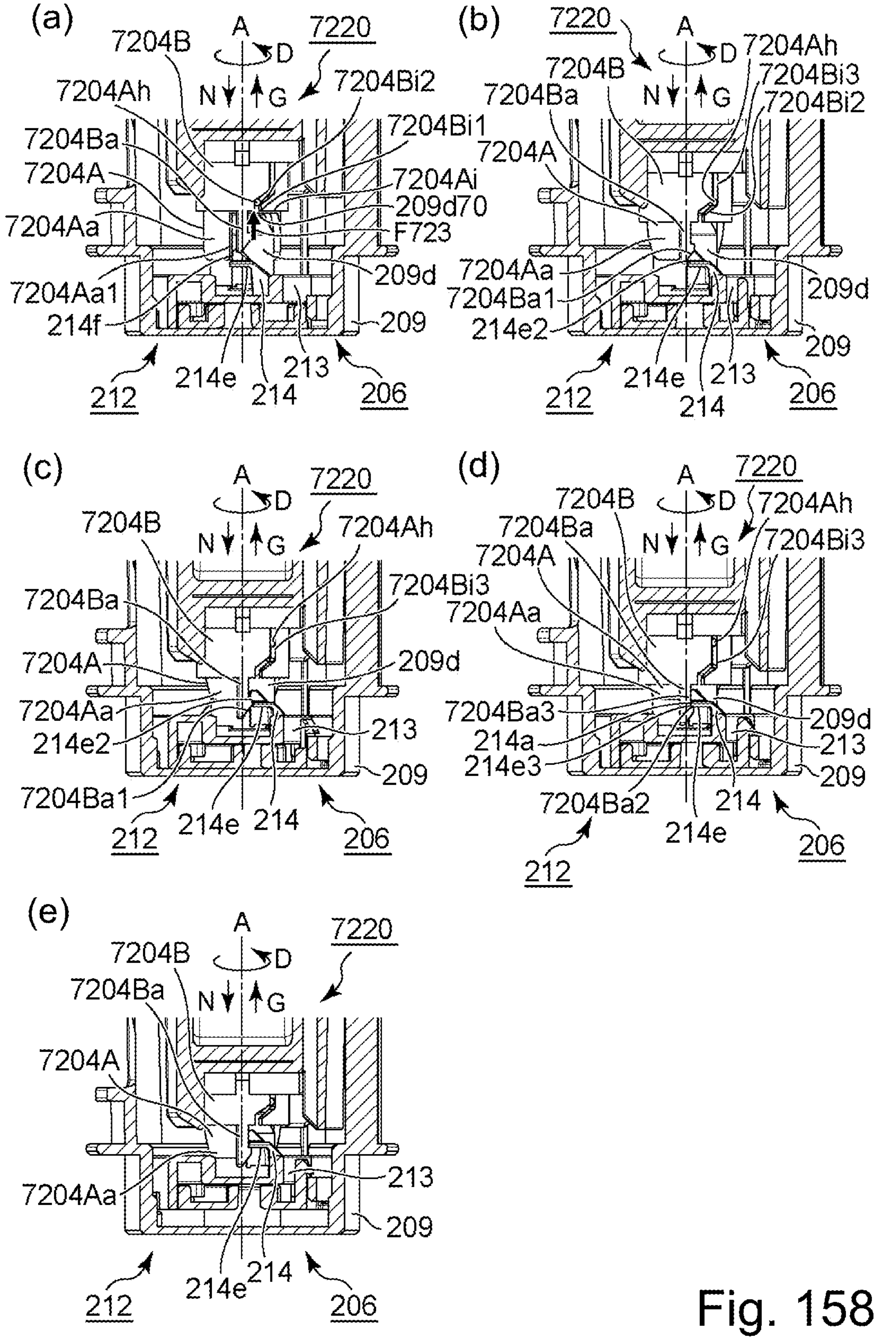

FIG. 158 is an illustration showing a process in which rotation restriction of the shutter on the apparatus-side by the rotation restriction mechanism of the mounting portion is released by mounting the toner pack in Modified Example 2 of Embodiment 7.

Figure 159:
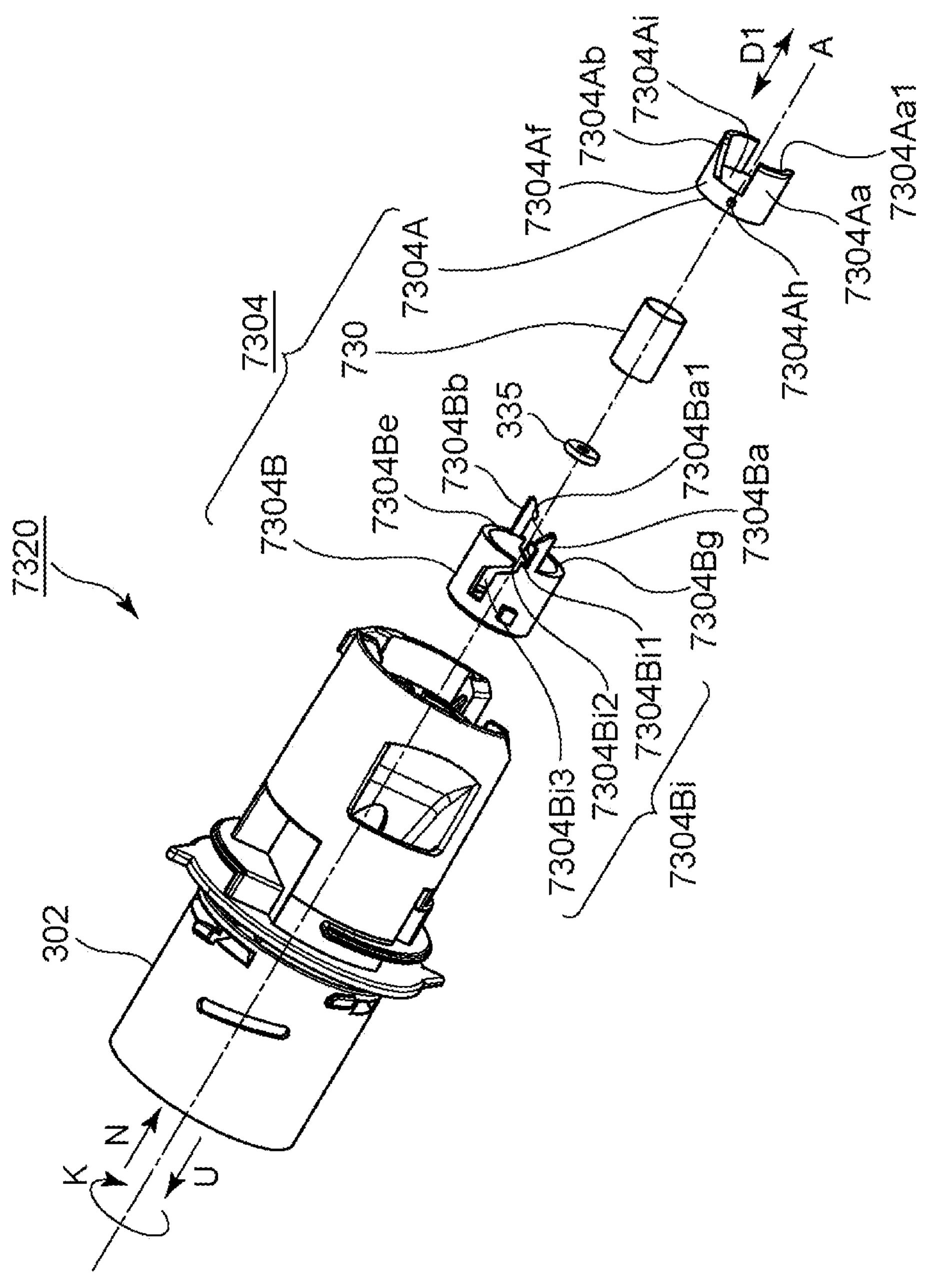

FIG. 159 is an exploded perspective view of the restriction releasing mechanism in Modified Example 3 of Embodiment 7.

Figure 160:
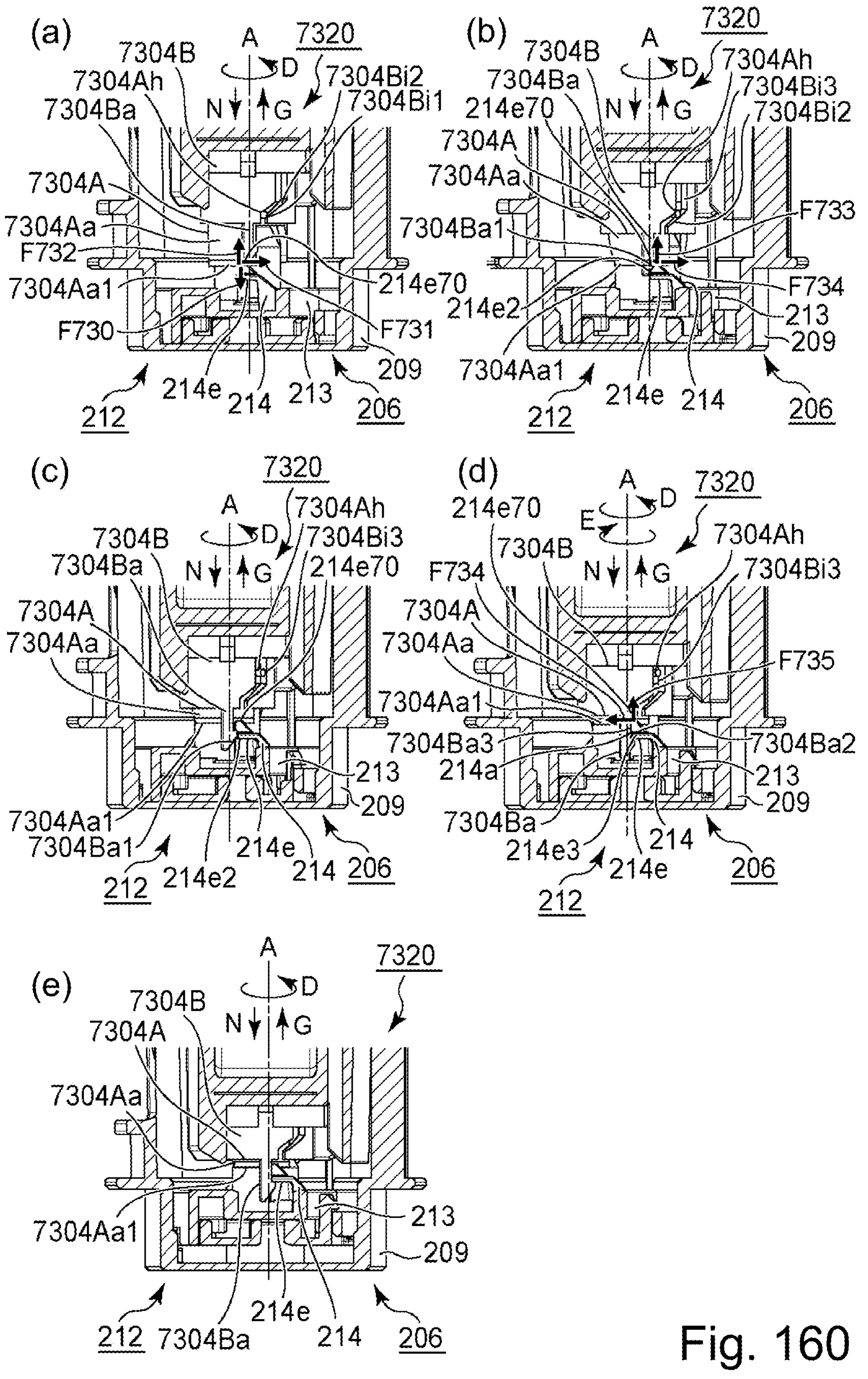

FIG. 160 is an illustration showing a process in which the rotation restriction of the shutter on the apparatus-side by the rotation restriction mechanism of the mounting portion is released by mounting the toner pack in Modified Example 3 of Embodiment 7.

Figure 161:
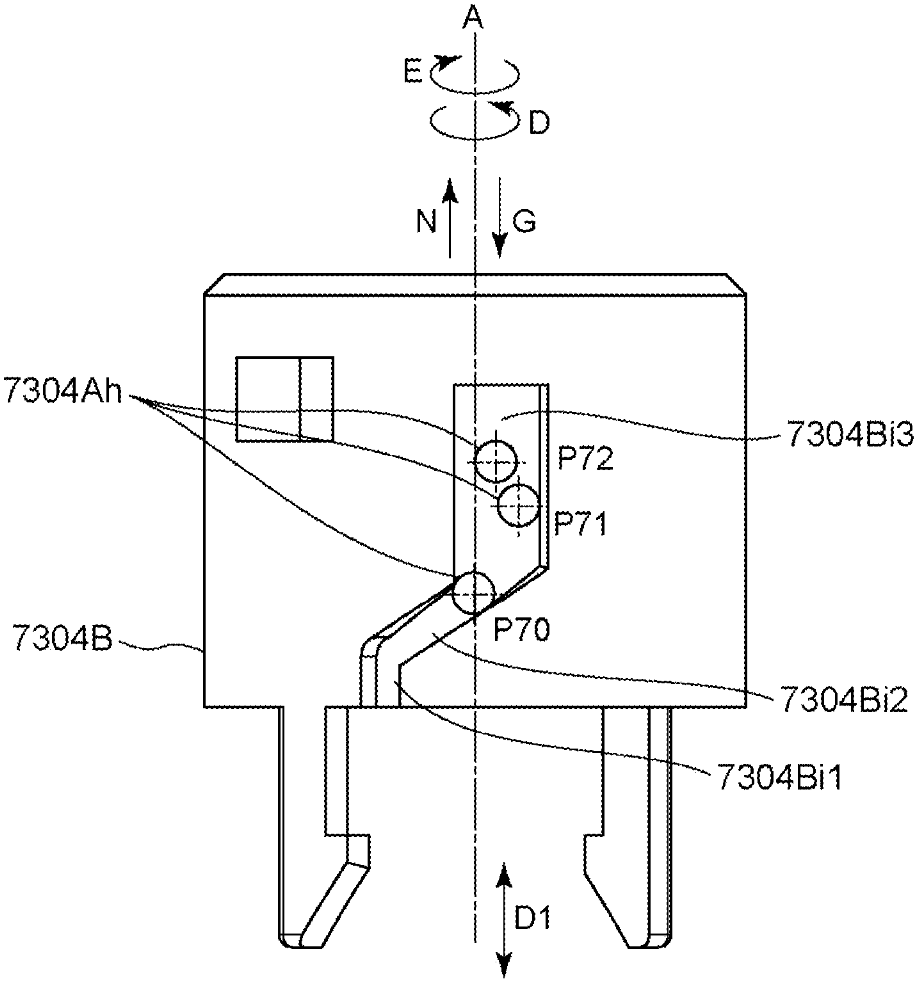

FIG. 161 is an illustration showing a position of a pin provided on a straight portion when the toner pack is mounted on the mounting portion in Modified Example 3 of Embodiment 7.

Figure 162:
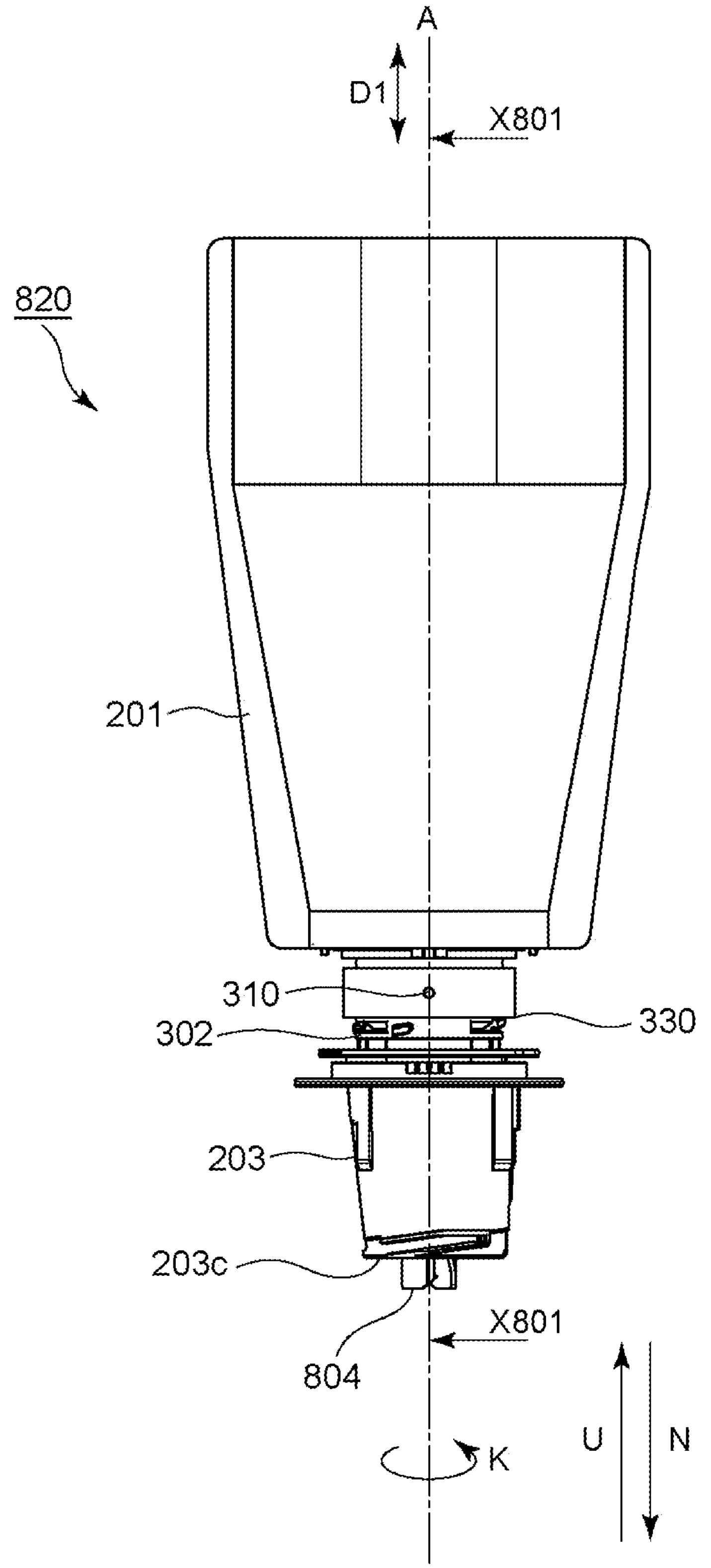

FIG. 162 is an illustration showing an entire toner pack according to Embodiment 8.

Figure 163:
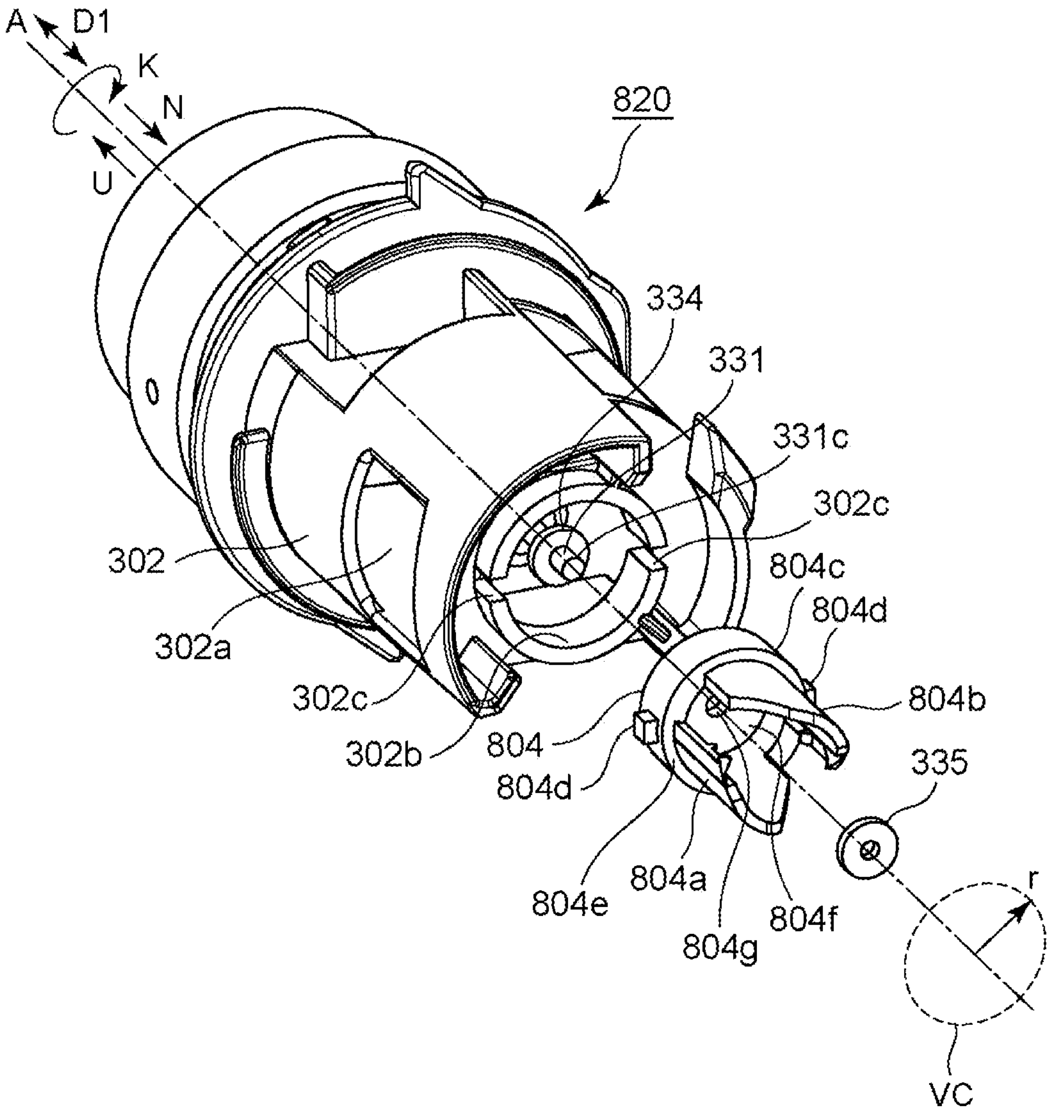

FIG. 163 is an exploded perspective view before a restriction releasing member and a shaft ring are assembled to the nozzle in Embodiment 8.

Figure 164:
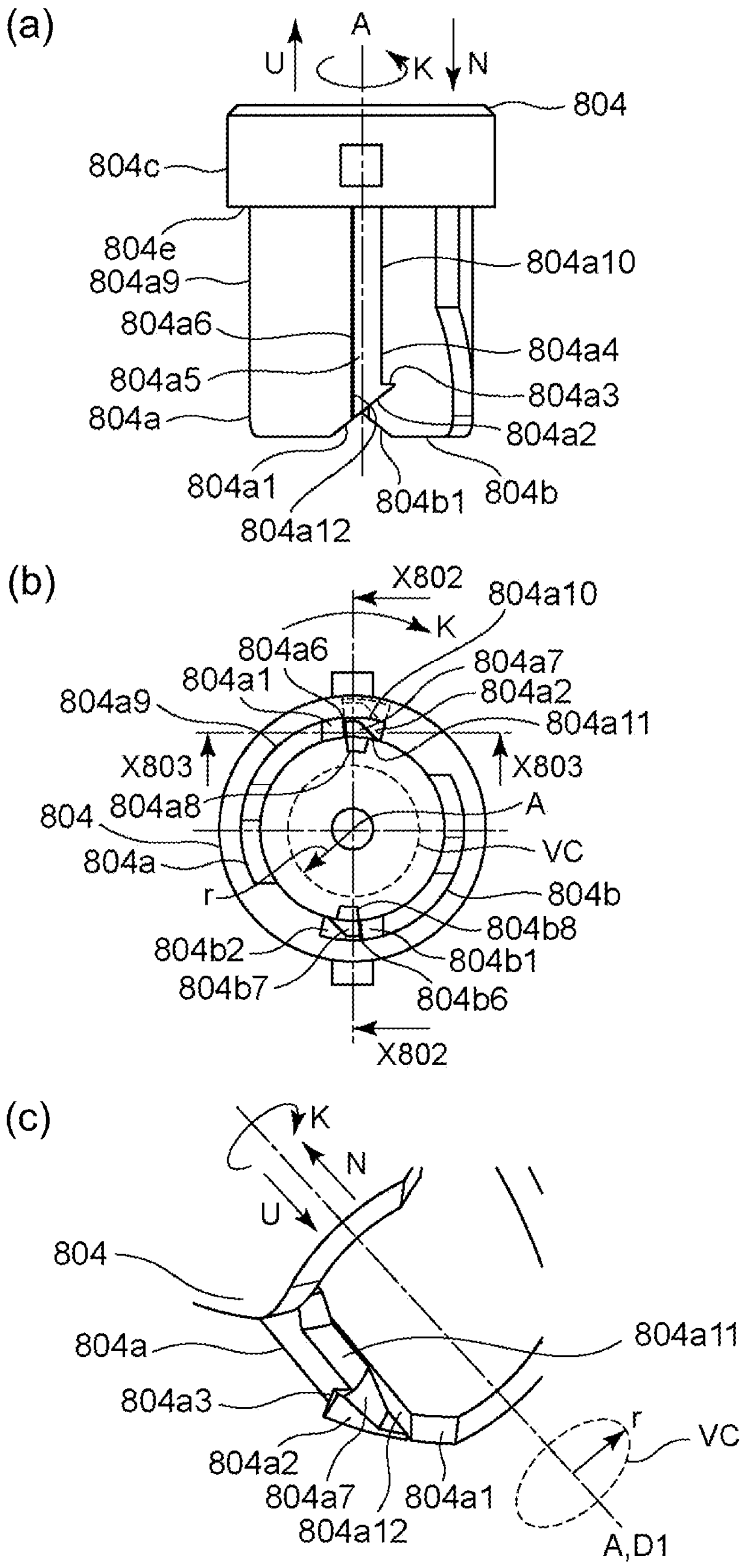

FIG. 164 is a detailed view of the restriction releasing member in Embodiment 8.

Figure 165:
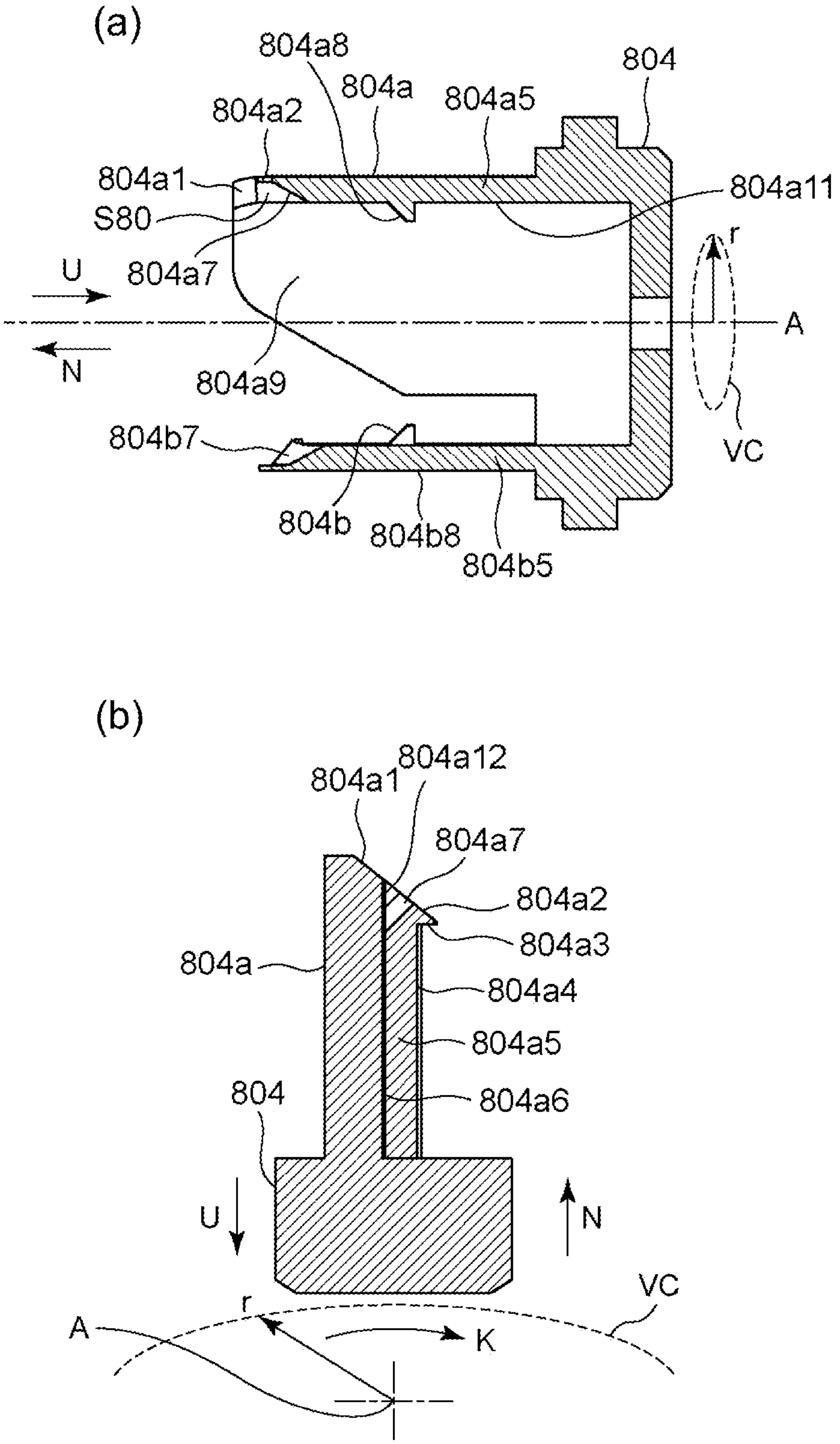

FIG. 165 is sectional views of the restriction releasing member in Embodiment 8.

Figure 166:
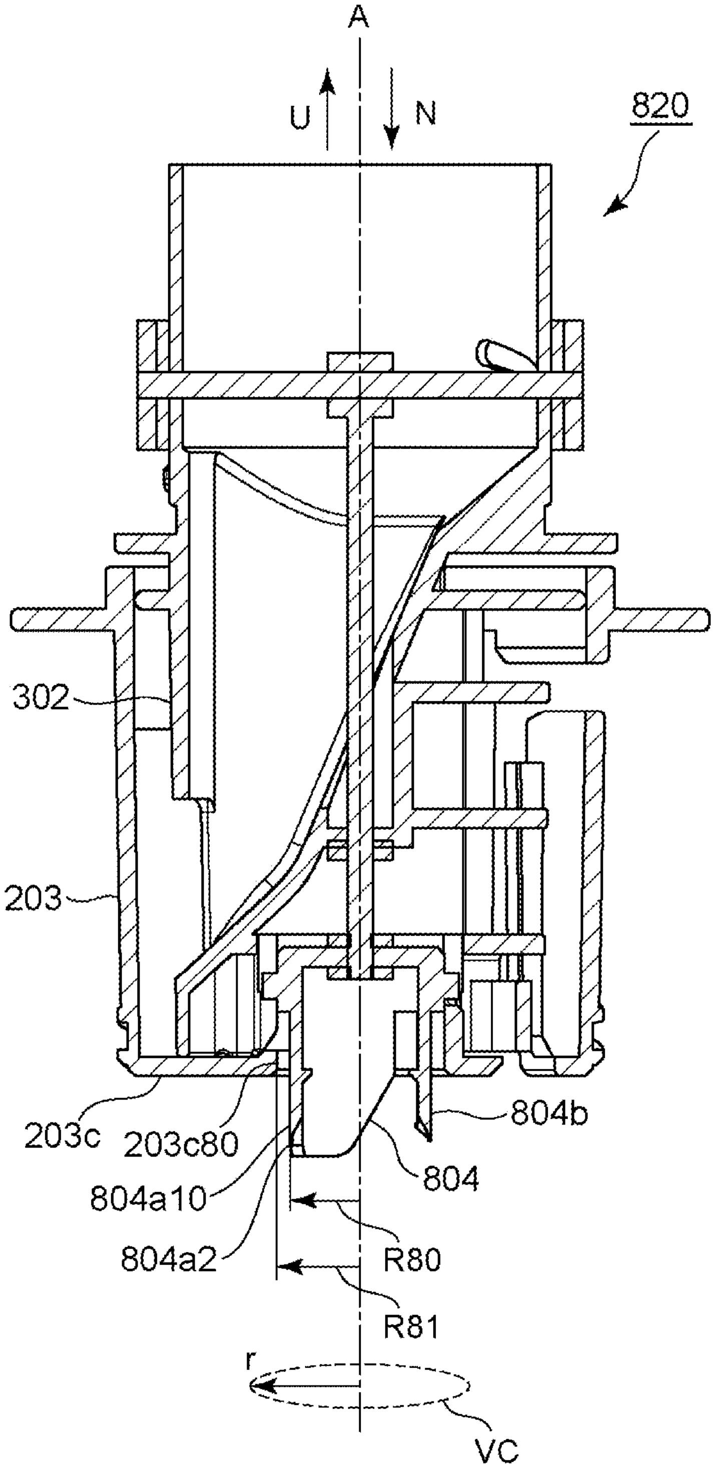

FIG. 166 is a sectional view of the toner pack according to Embodiment 8.

Figure 167:
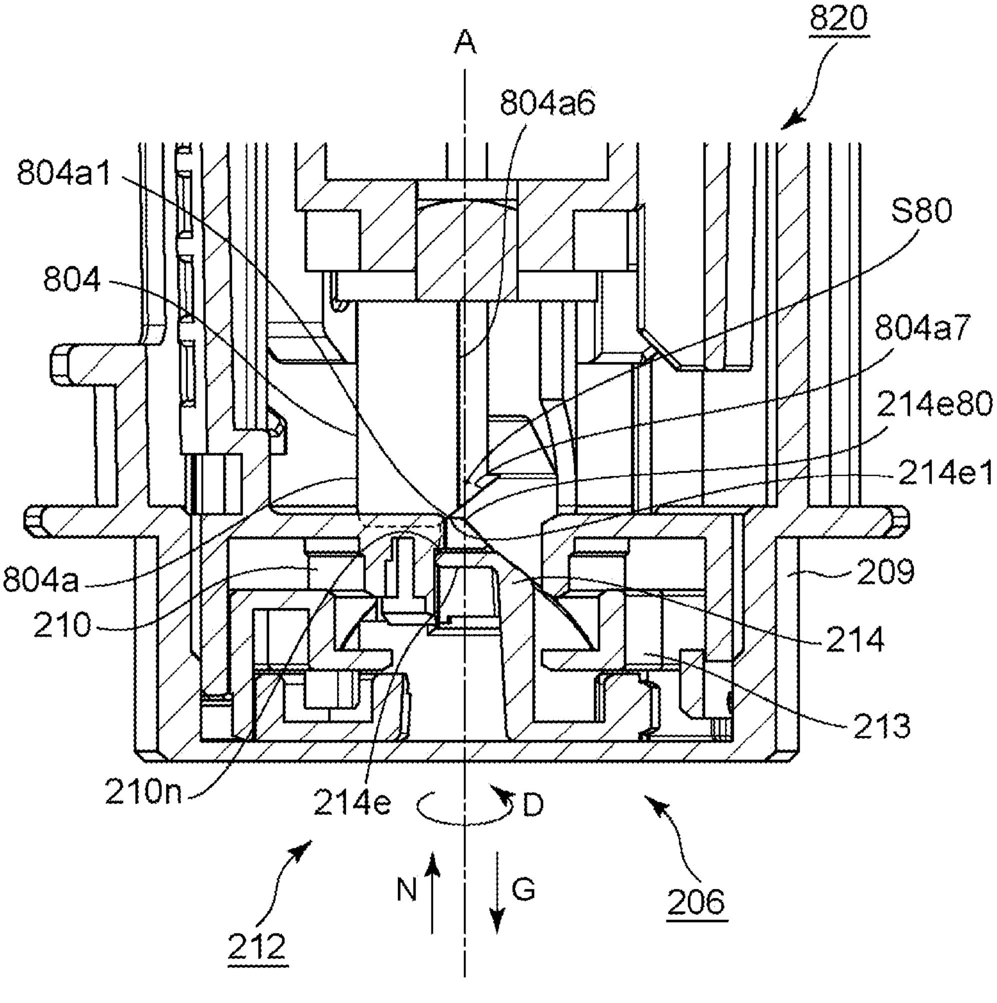

FIG. 167 is an illustration showing a process of releasing rotation restriction of a shutter on the apparatus-side by the rotation restriction mechanism of the mounting portion by mounting the toner pack, according to Embodiment 8.

Figure 168:
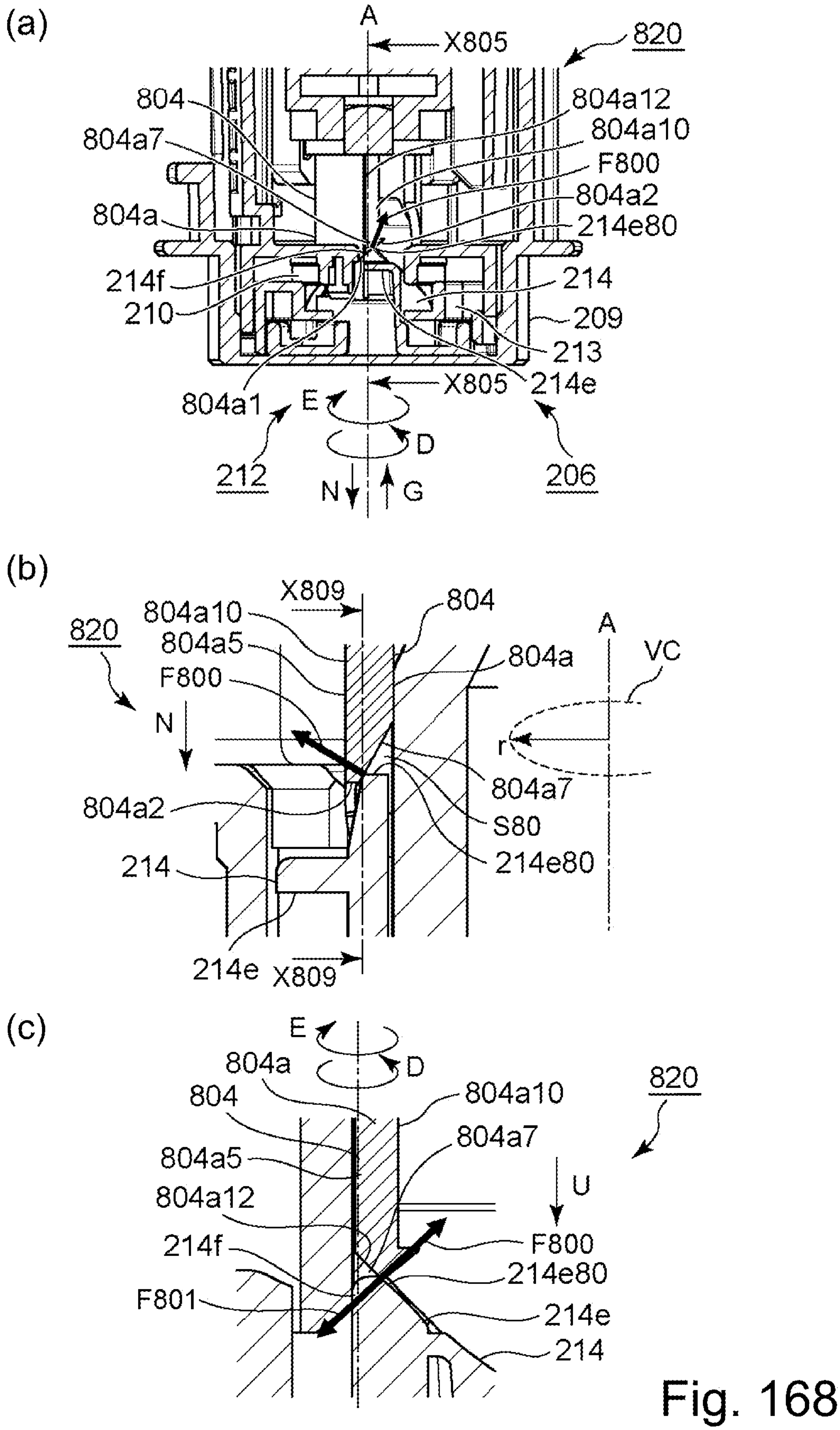

FIG. 168 is an illustration showing a process in which rotation restriction of the shutter on the apparatus-side by the rotation restriction mechanism of the mounting portion is released by mounting the toner pack, in Embodiment 8.

Figure 169:
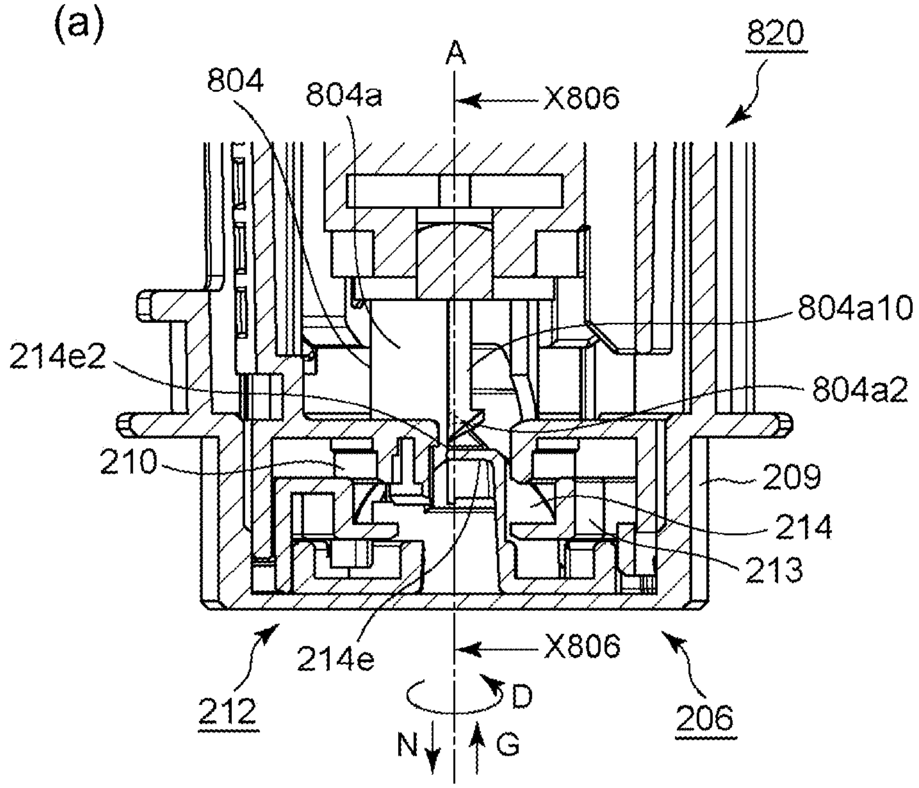
Figure 169:
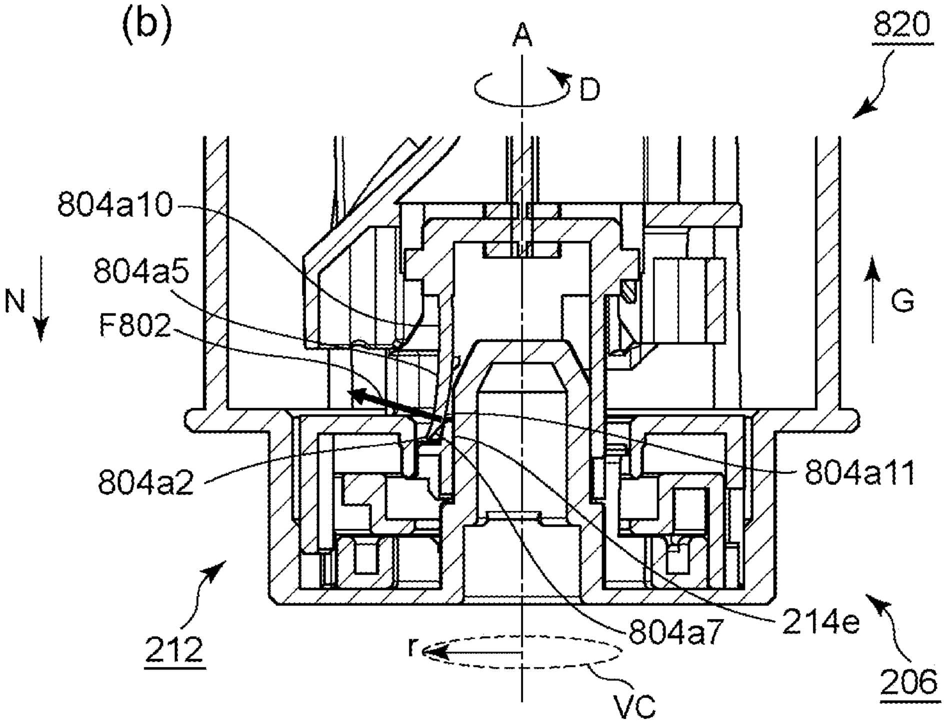

FIG. 169 is an illustration showing a process in which rotation restriction of the shutter on the apparatus-side by the rotation restriction mechanism of the mounting portion is released by mounting the toner pack, in Embodiment 8.

Figure 170:
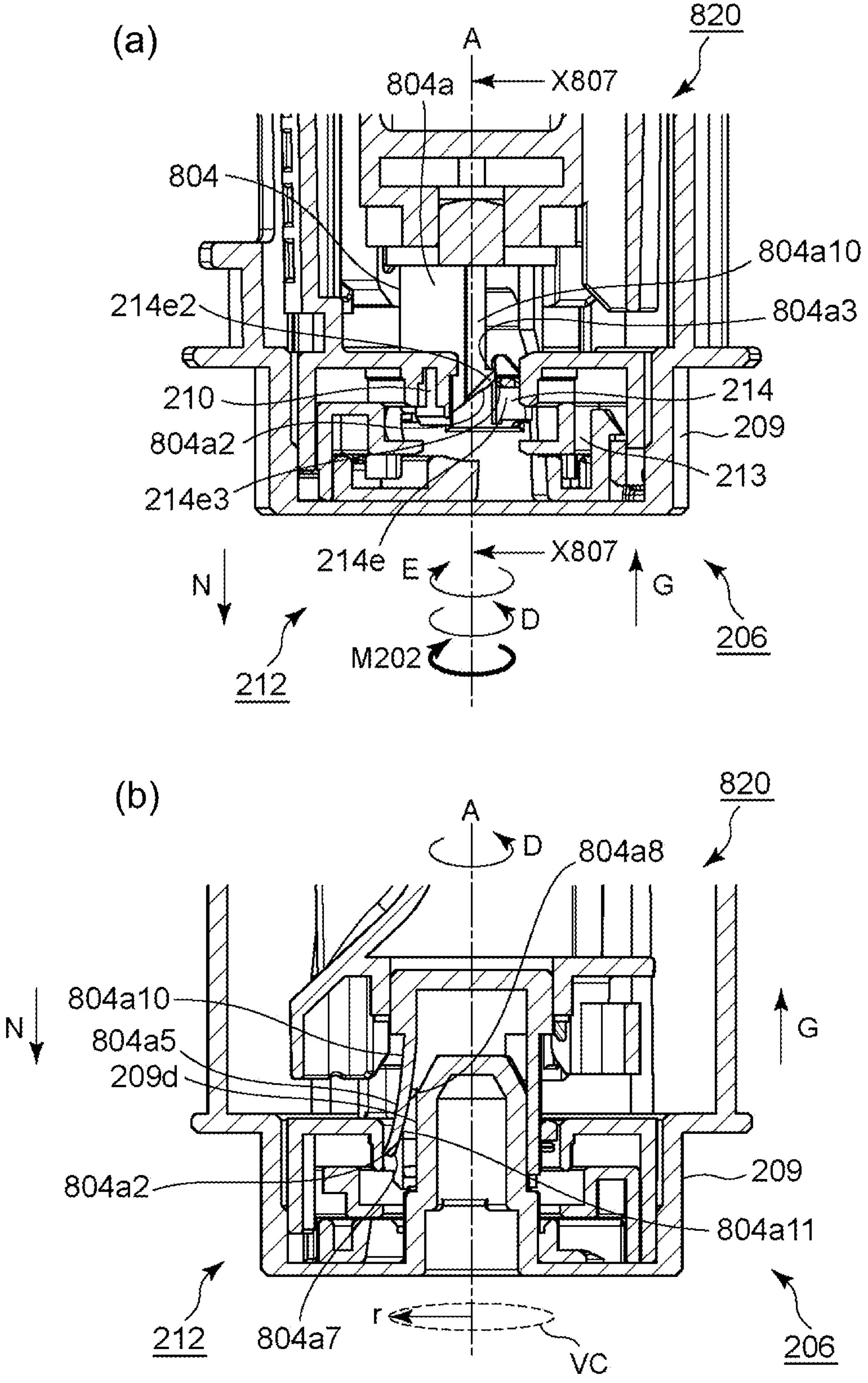

FIG. 170 is an illustration showing a process of releasing rotation restriction of the shutter on the apparatus-side by a rotation restriction mechanism of the mounting portion by mounting the toner pack, according to Embodiment 8.

Figure 171:
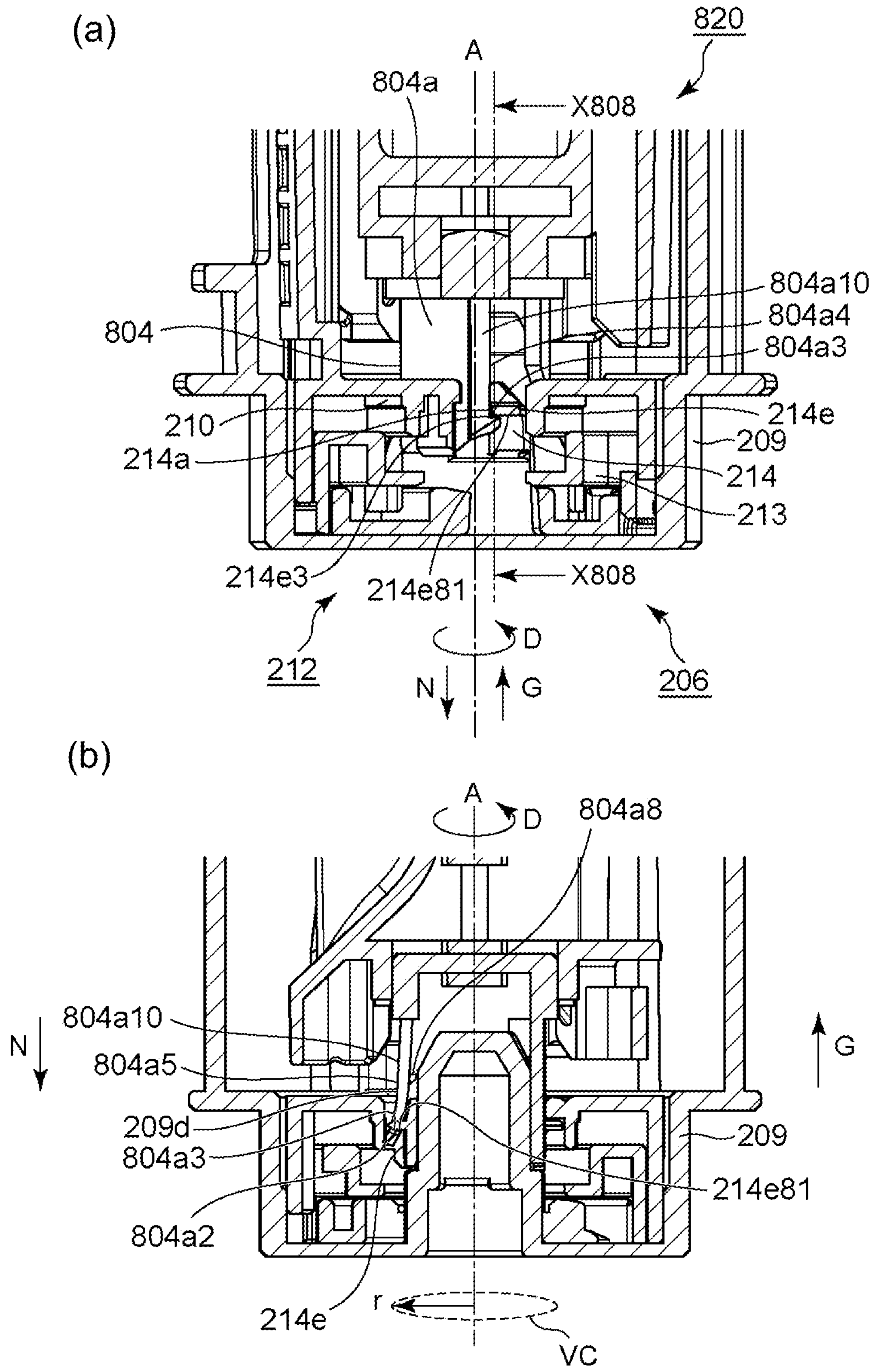

FIG. 171 is an illustration showing a process in which rotation restriction of the shutter on the apparatus-side by the rotation restriction mechanism of the mounting portion is released by mounting the toner pack, in Embodiment 8.

Figure 172:
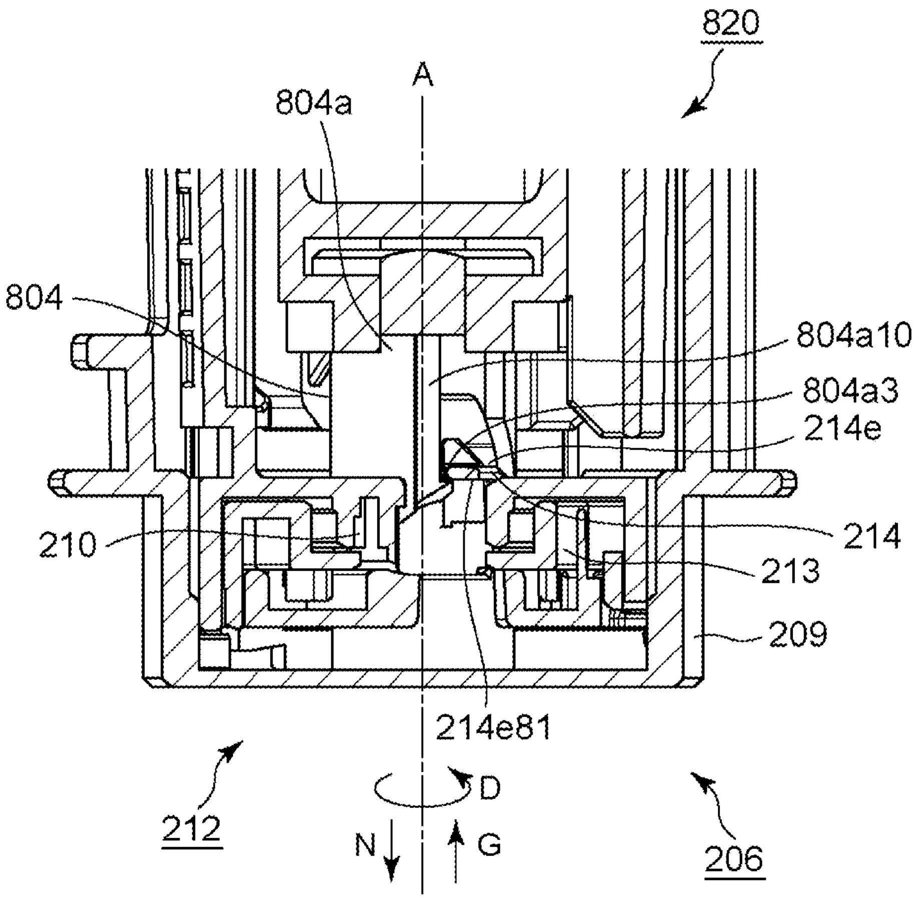

FIG. 172 is an illustration showing a process in which rotation restriction of the shutter on the apparatus-side by the rotation restriction mechanism of the mounting portion is released by mounting the toner pack, in Embodiment 8.

Figure 173:
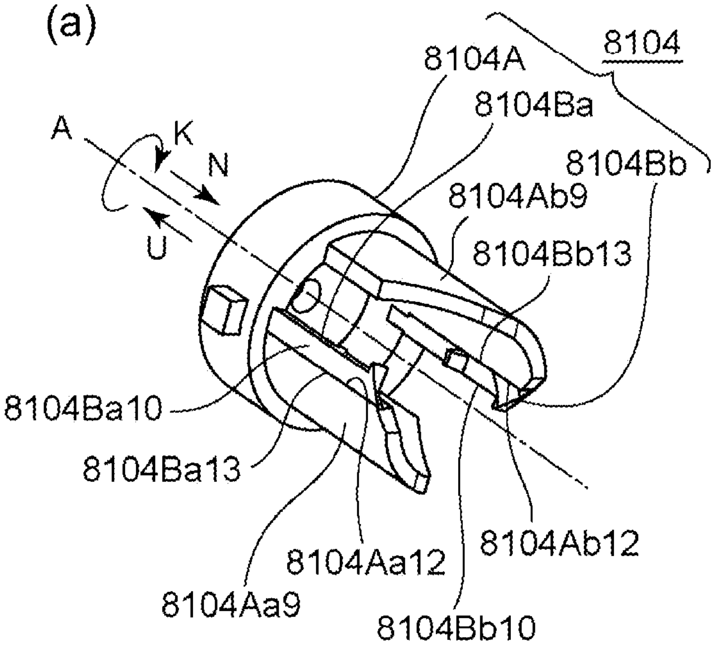
Figure 173:
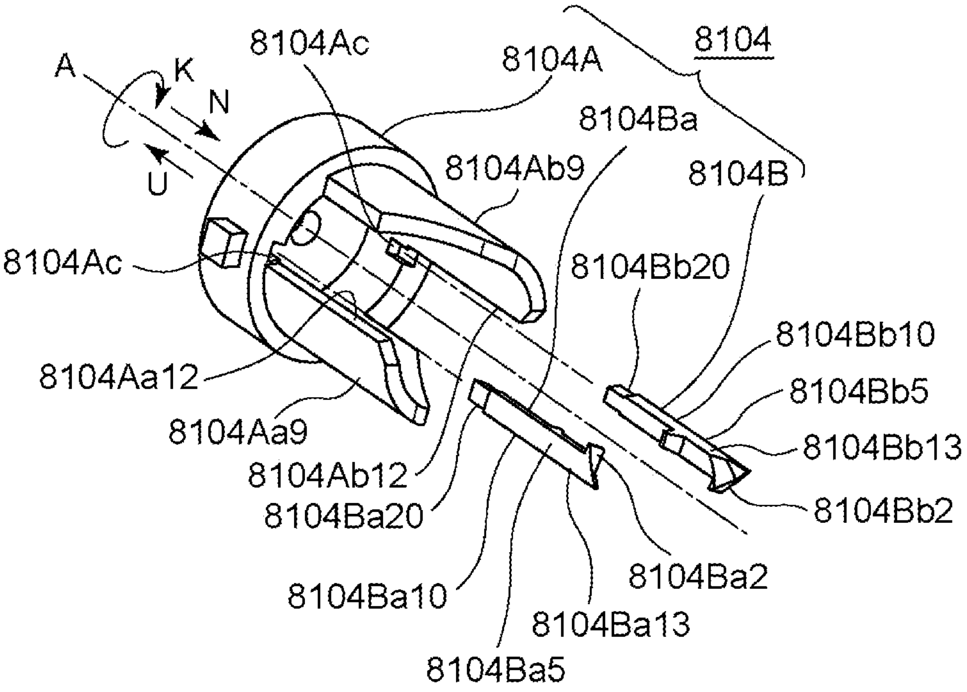

FIG. 173 is a perspective view of a restriction releasing member in Modified Example 1 of Embodiment 8.

Figure 174:
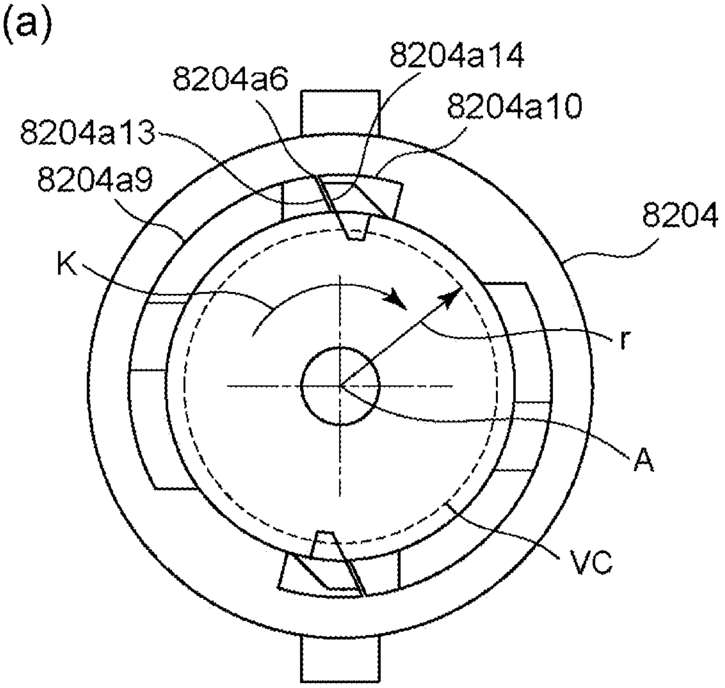
Figure 174:
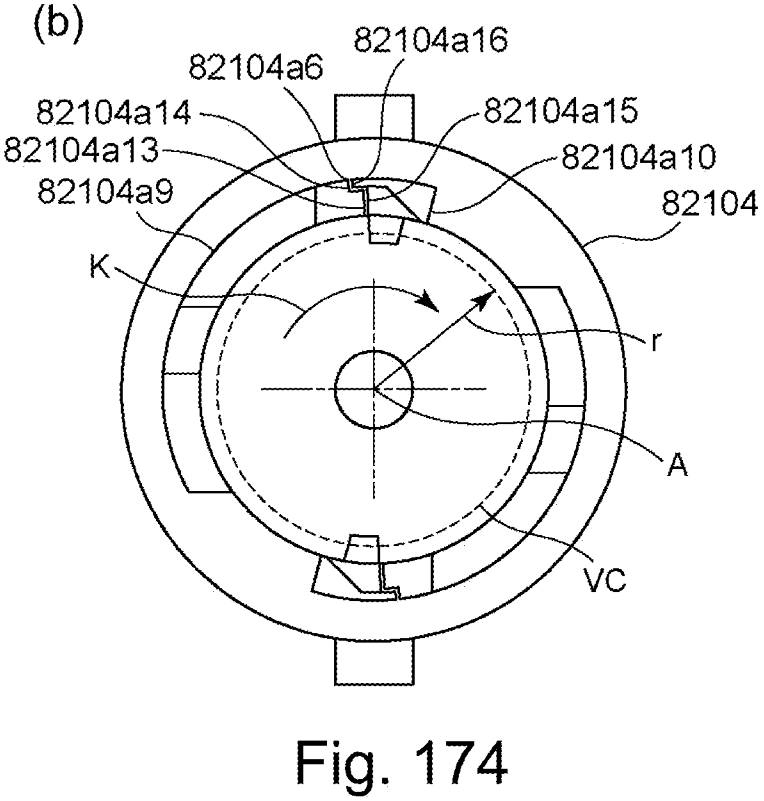

FIG. 174 is a detailed view of the restriction releasing member in Modified Example 2 of Embodiment 8.

Figure 175:
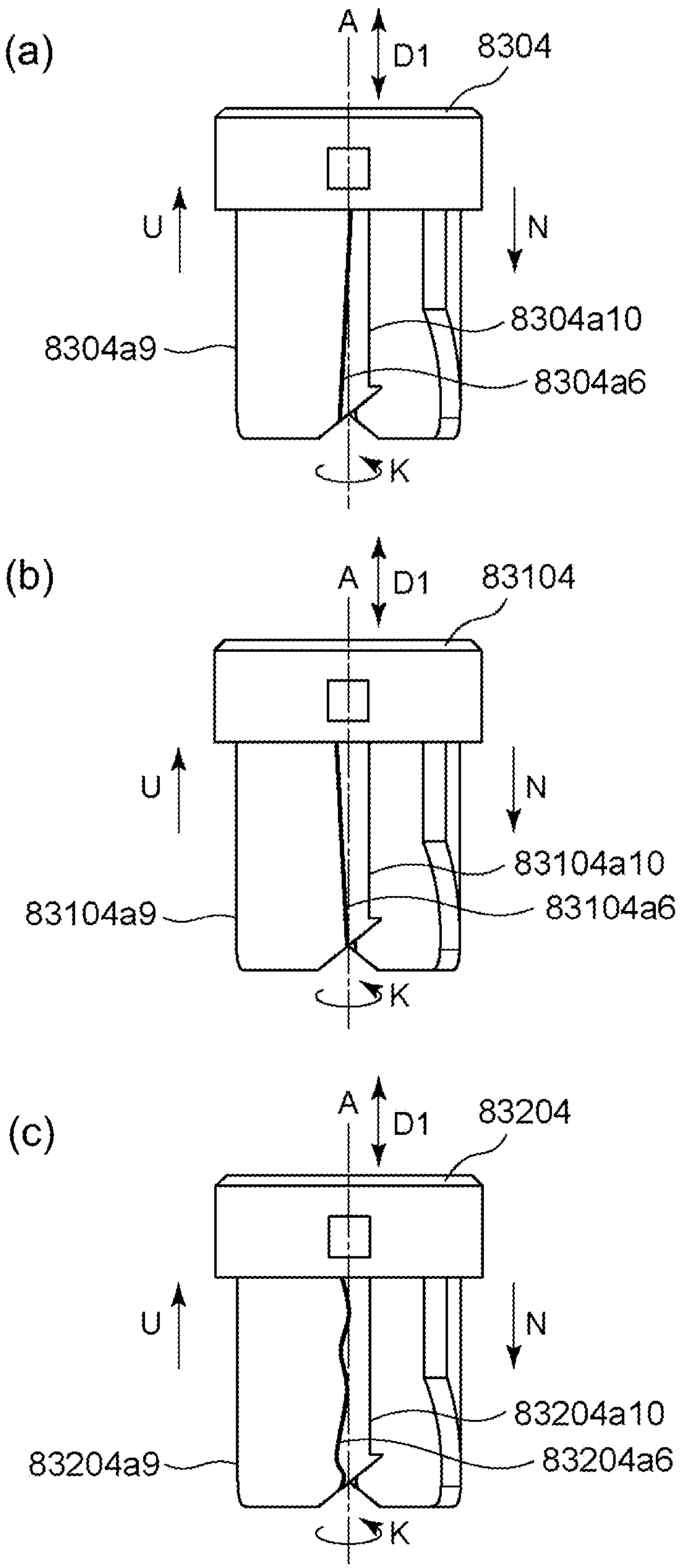

FIG. 175 is a detailed view of a restriction releasing member according to Modified Example 3 of Embodiment 8.

Figure 176:
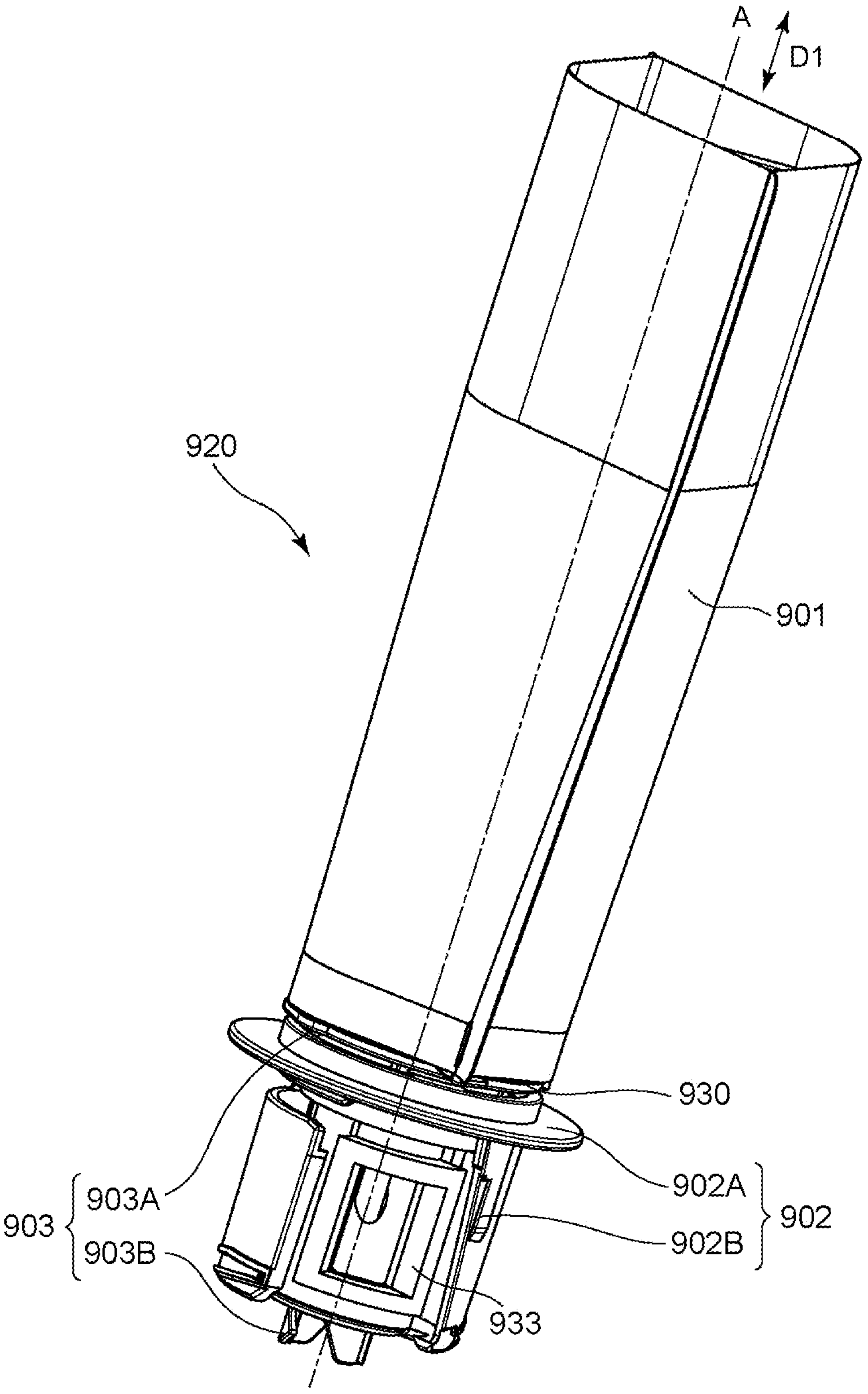

FIG. 176 is a perspective view of a toner pack according to Embodiment 9.

Figure 177:
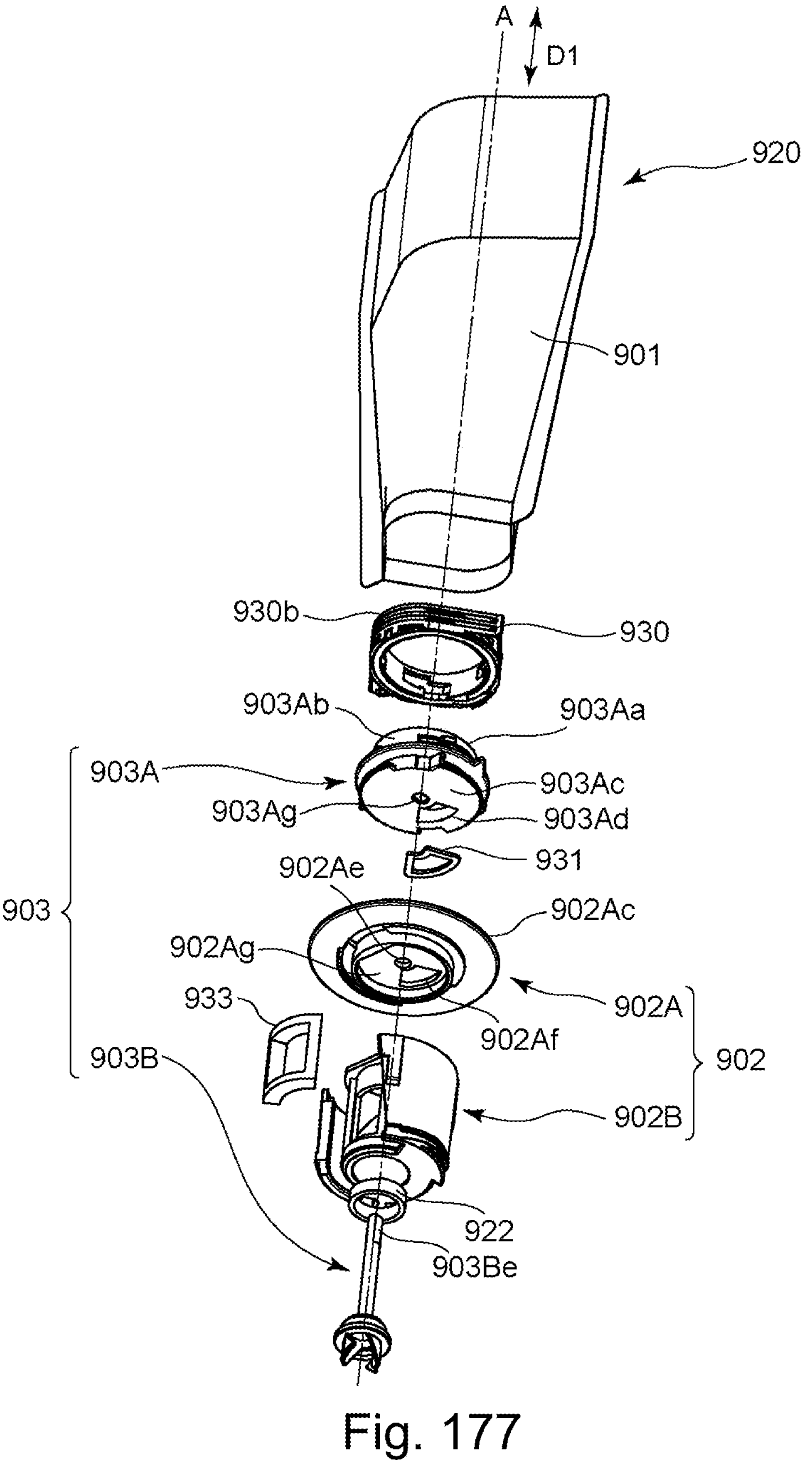

FIG. 177 is an exploded perspective view of the toner pack according to Embodiment 9.

Figure 178:
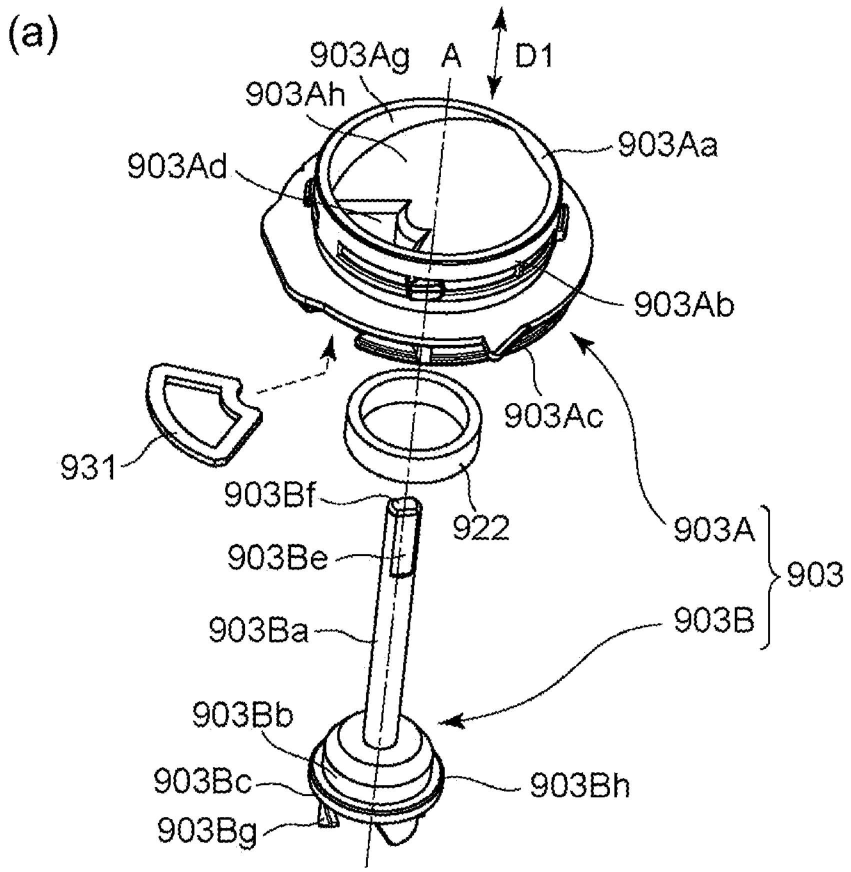
Figure 178:
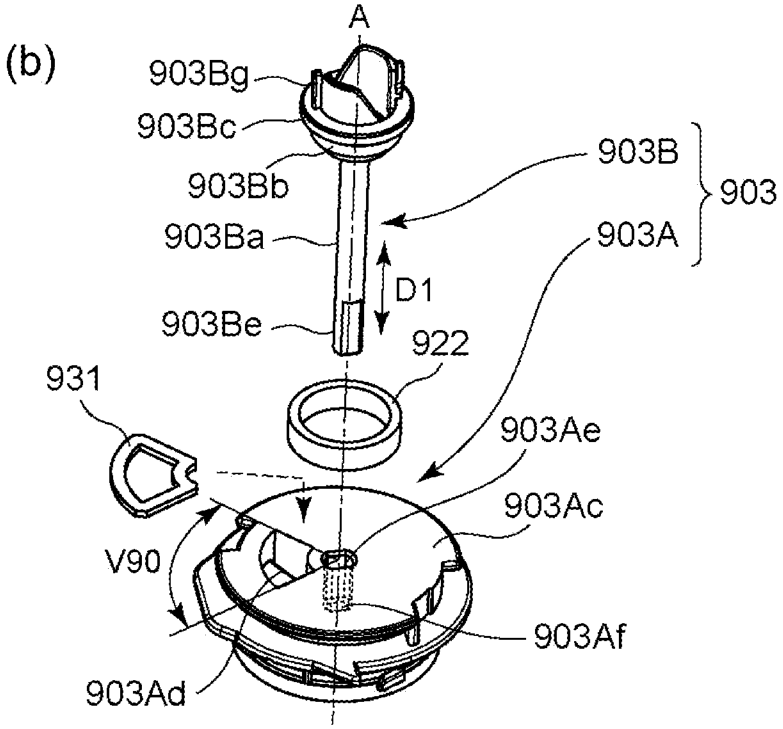

FIG. 178 is an exploded perspective view of a nozzle according to Embodiment 9.

Figure 179:
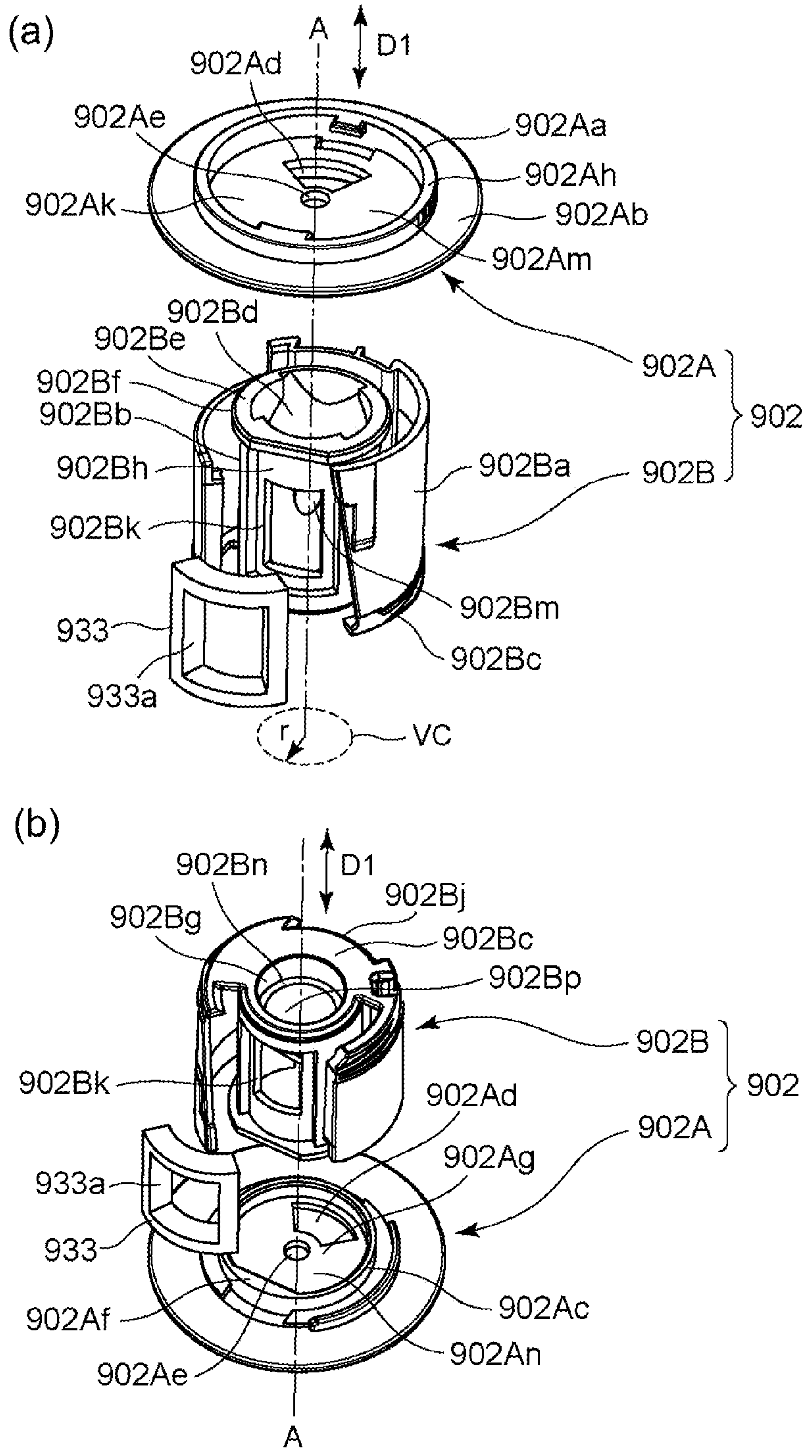

FIG. 179 is exploded perspective views of a pack-side shutter according to Embodiment 9.

Figure 180:
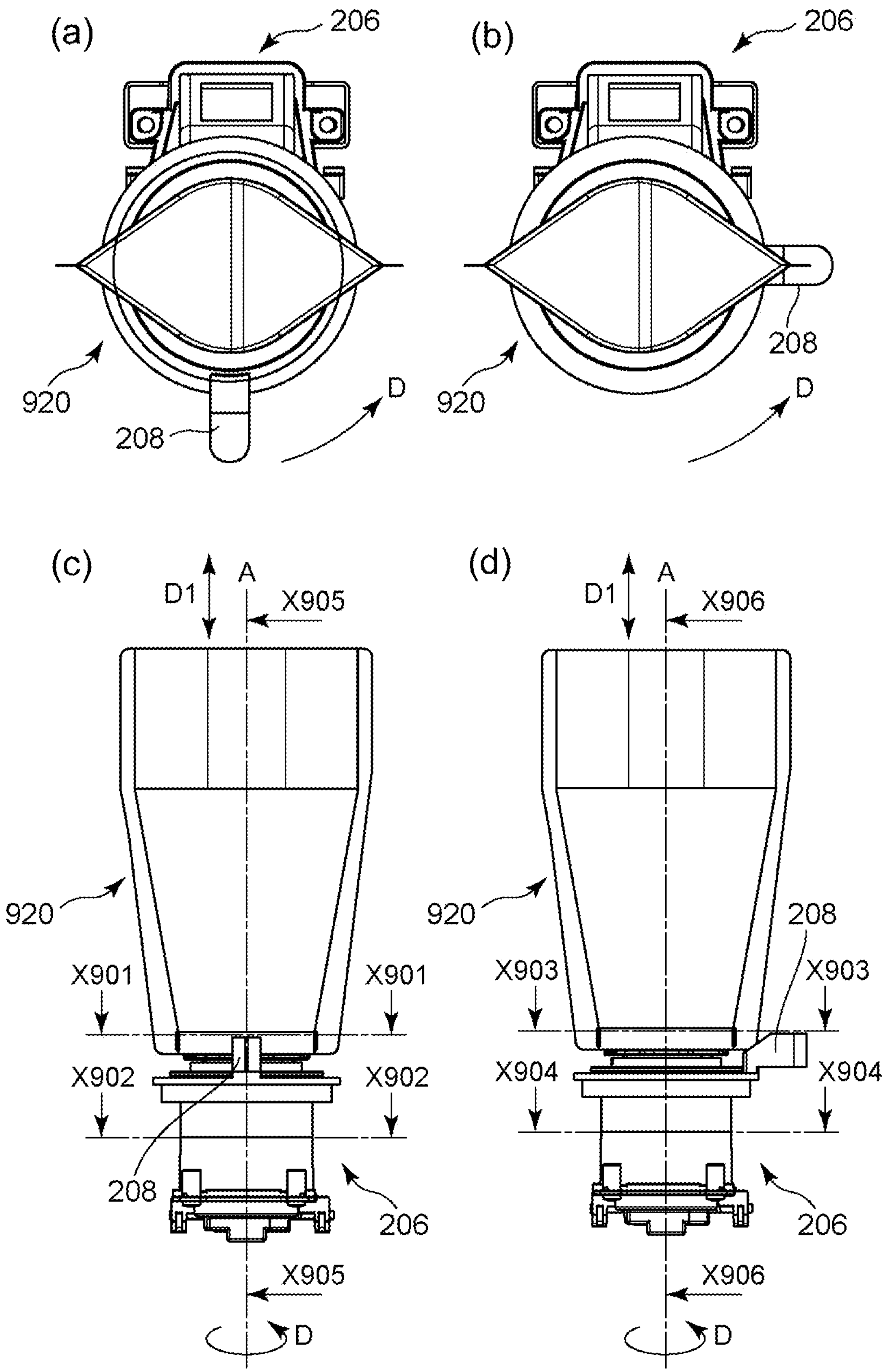

FIG. 180 is top views and side views illustrating a state in which the toner pack is mounted on the mounting portion in Embodiment 9.

Figure 181:
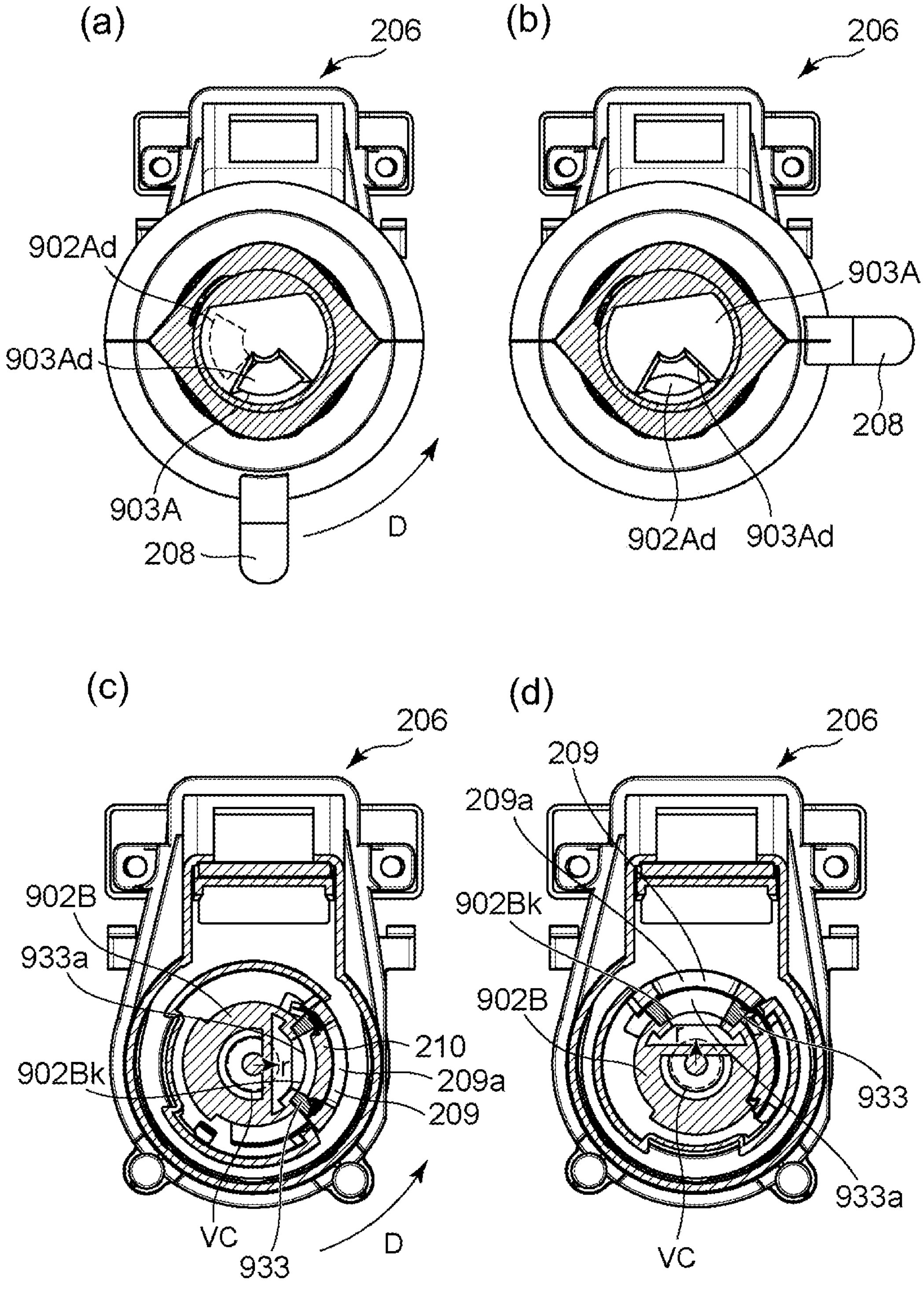

FIG. 181 is sectional views in a state in which the toner pack is mounted to the mounting portion in Embodiment 9.

Figure 182:
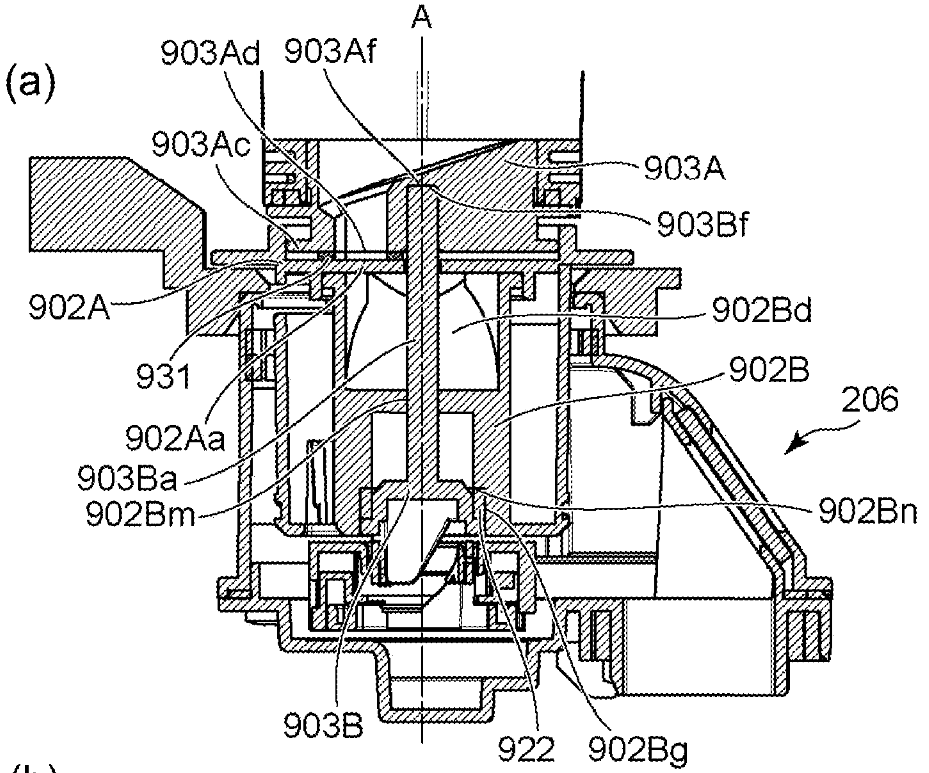
Figure 182:
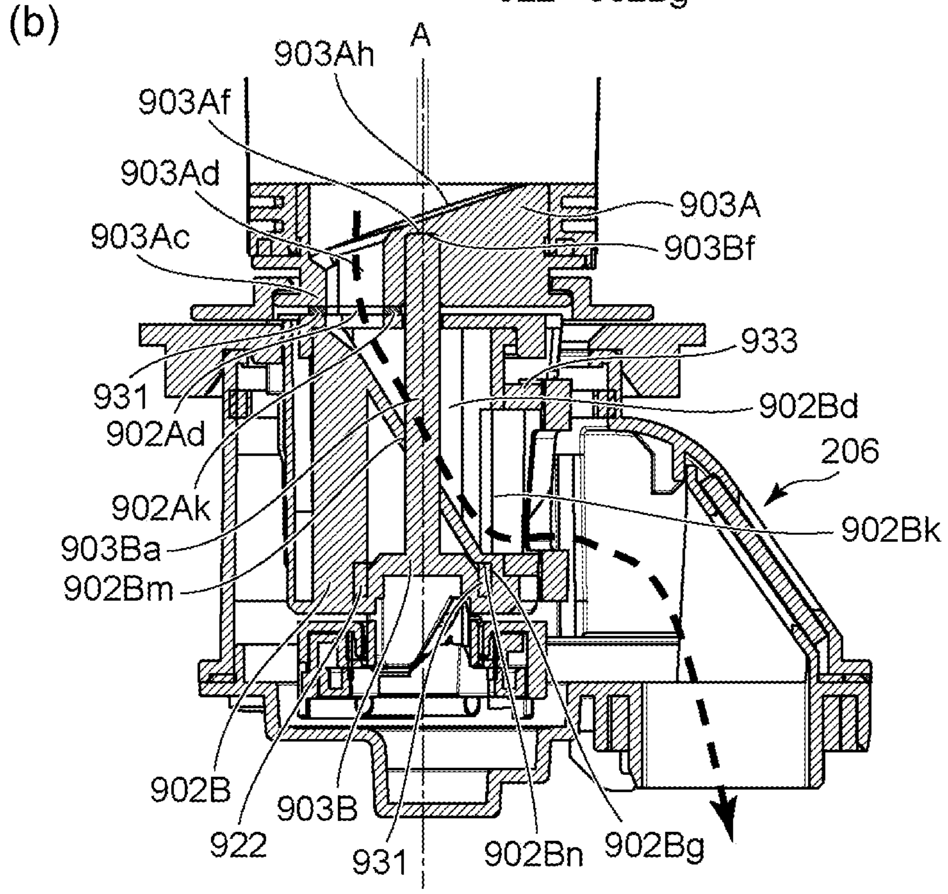

FIG. 182 is sectional views of the state in which the toner pack is mounted on the mounting portion according to Embodiment 9.

Figure 183:
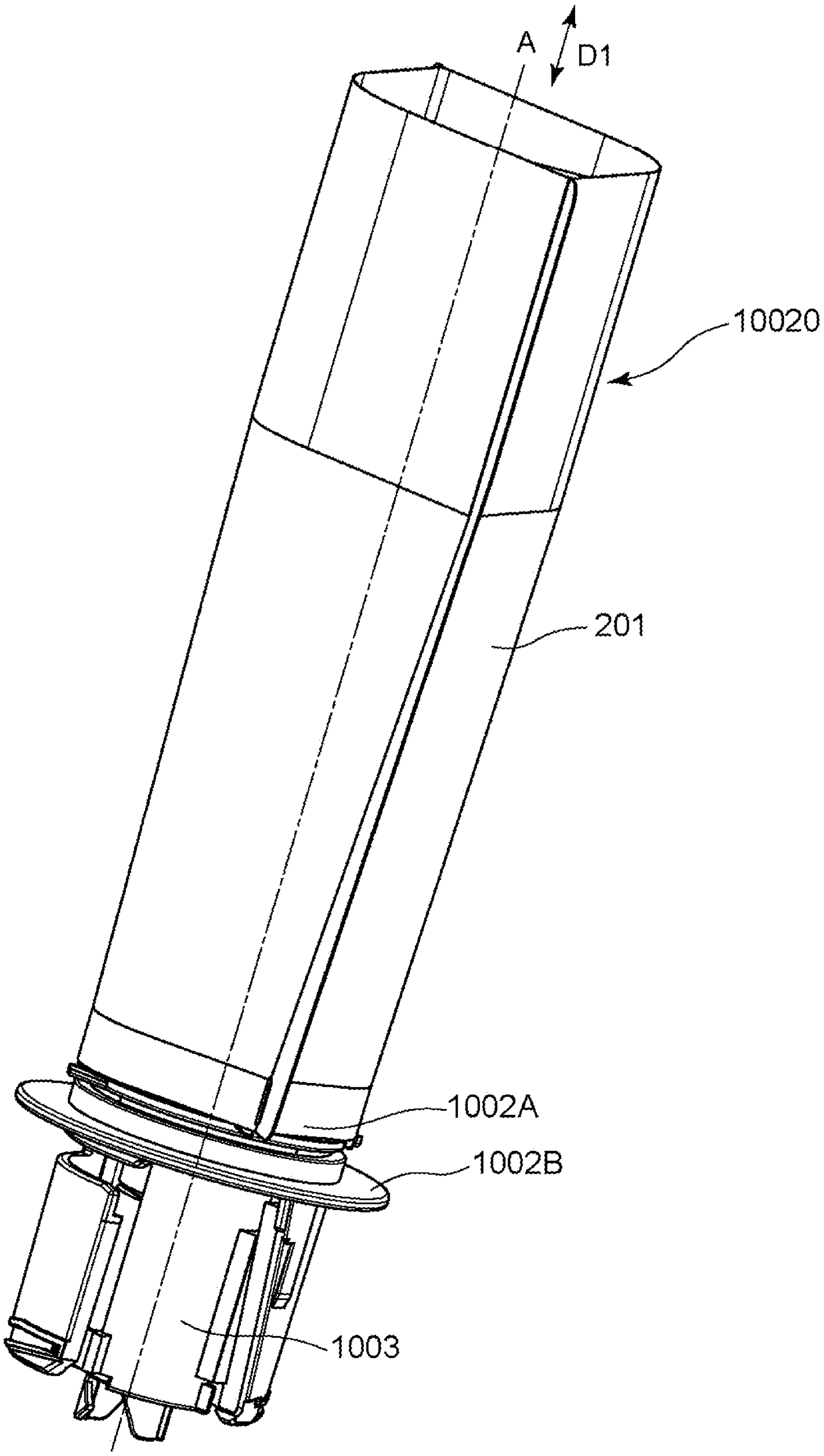

FIG. 183 is a perspective view of the toner pack according to Embodiment 10.

Figure 184:
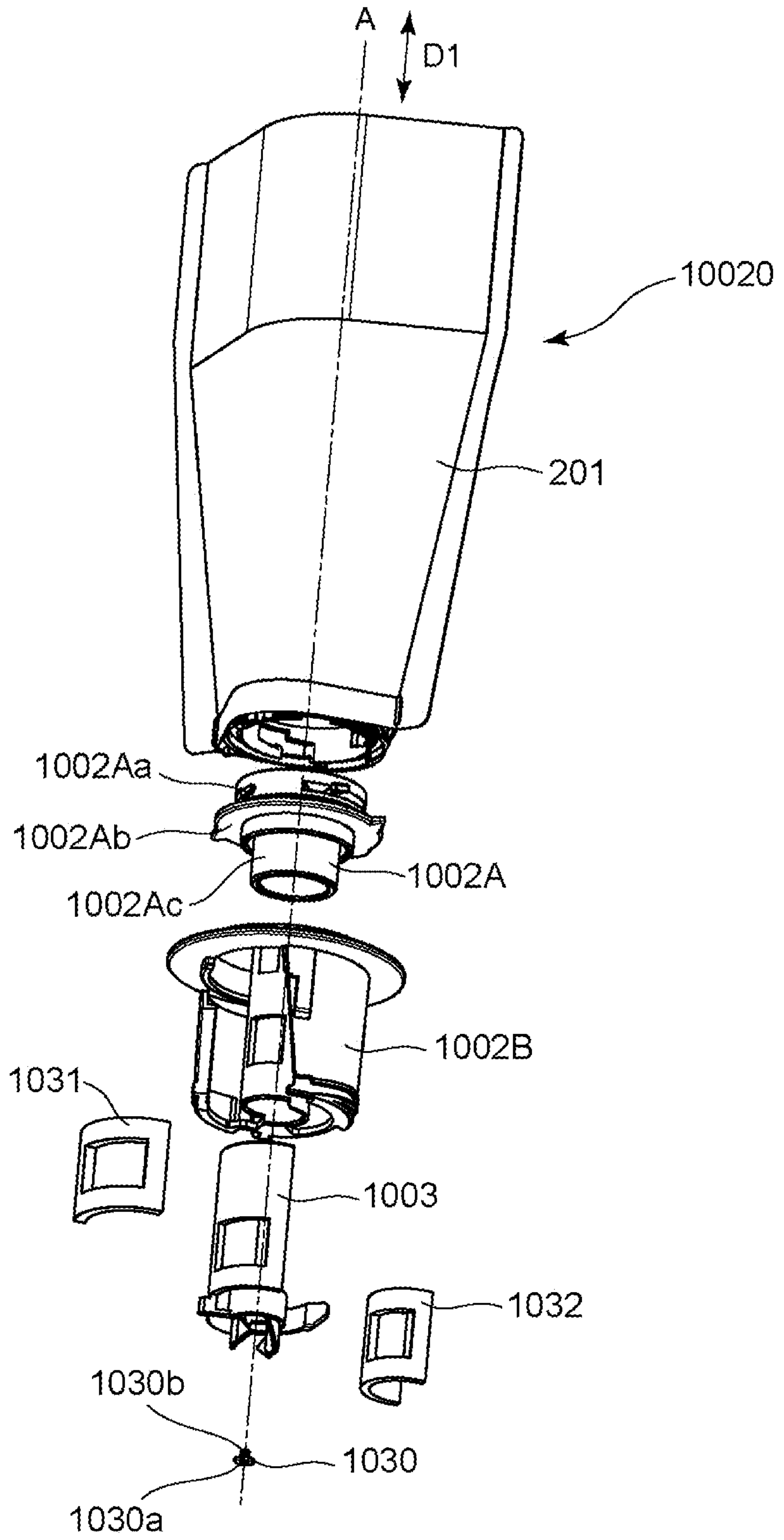

FIG. 184 is an exploded perspective view of the toner pack according to Embodiment 10.

Figure 185:
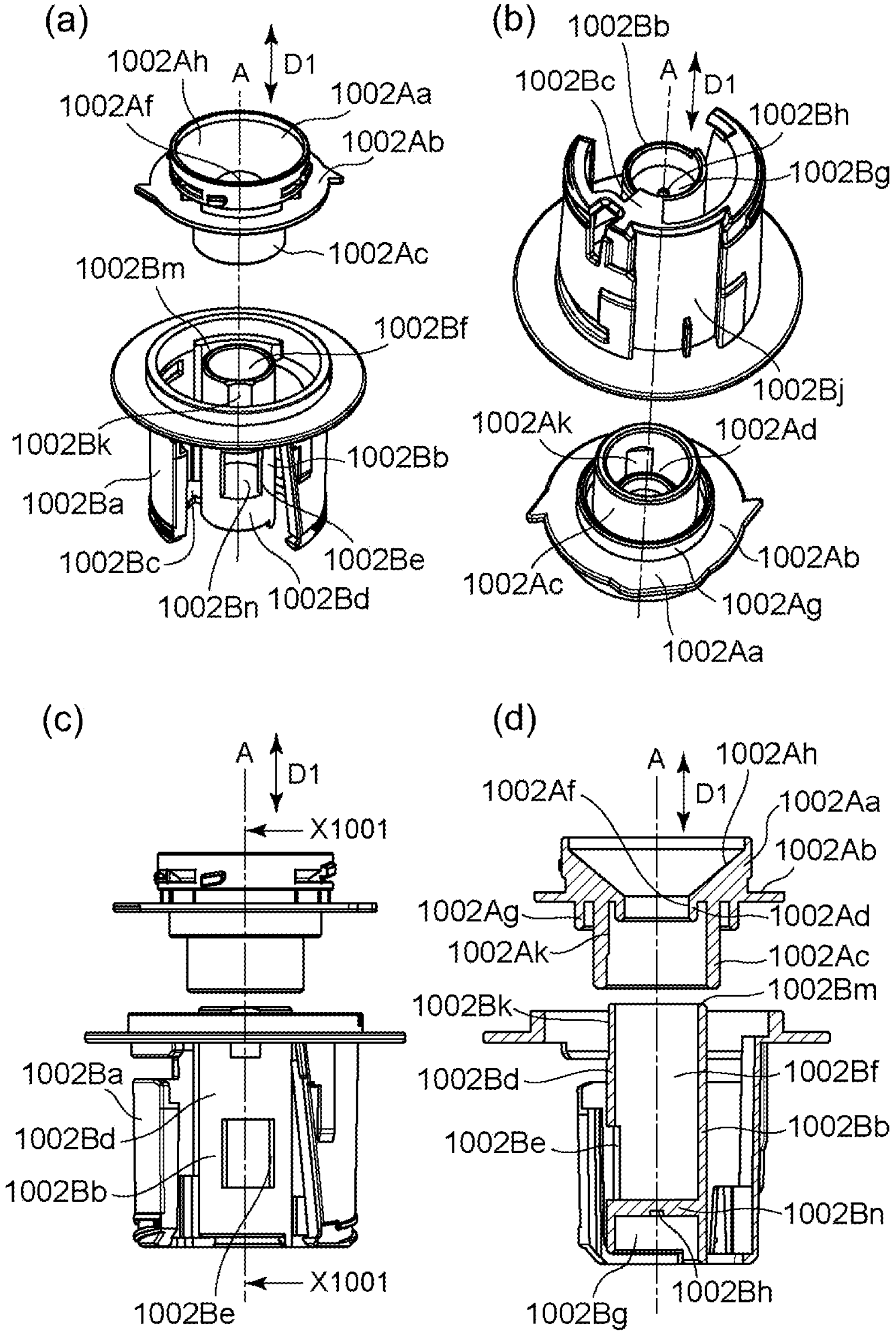

FIG. 185 is an exploded view of a nozzle in Embodiment 10.

Figure 186:
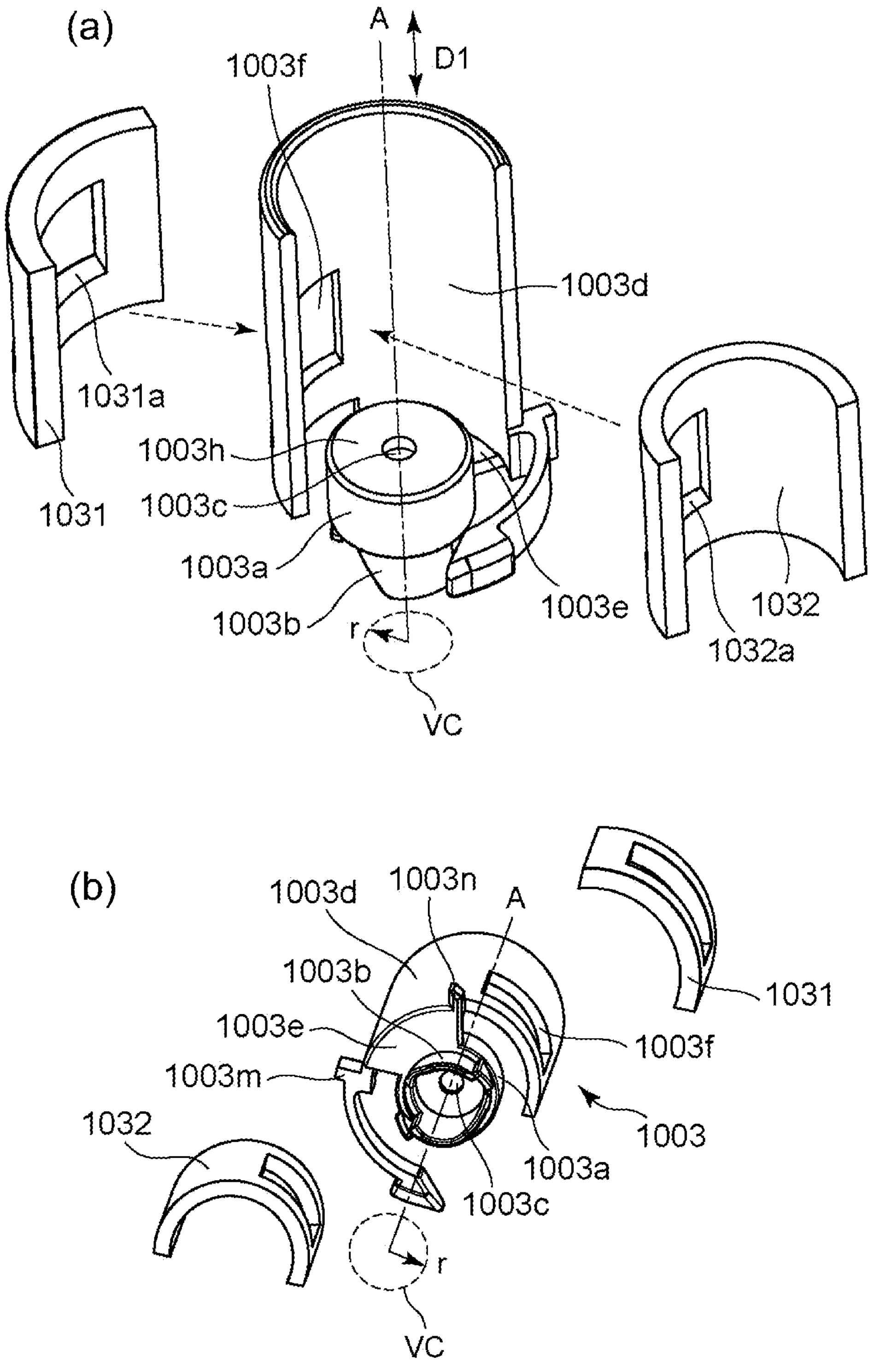

FIG. 186 is exploded perspective views of a pack-side shutter according to Embodiment 10.

Figure 187:
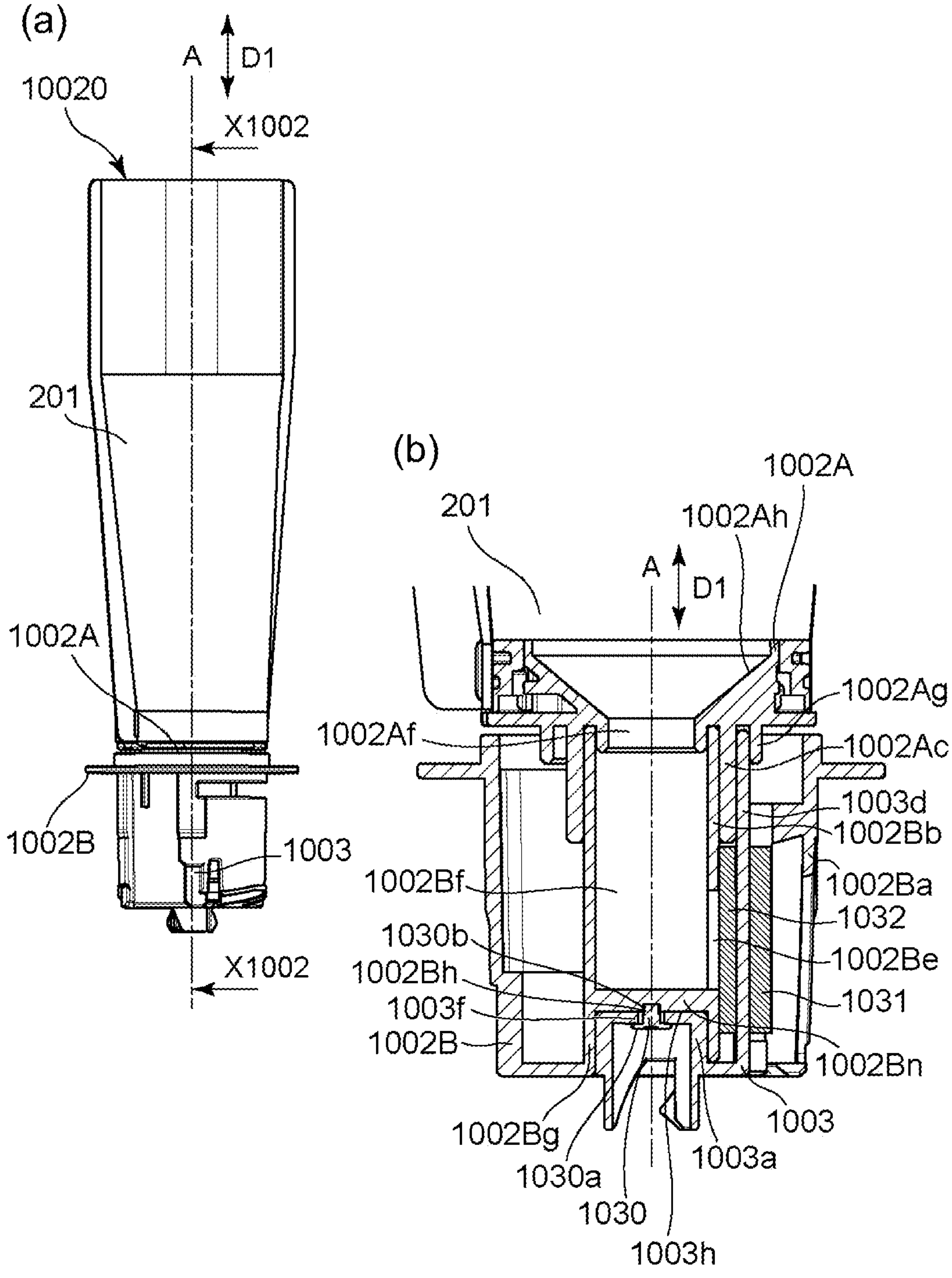

FIG. 187 is a side view and a sectional view of the toner pack according to Embodiment 10.

Figure 188:
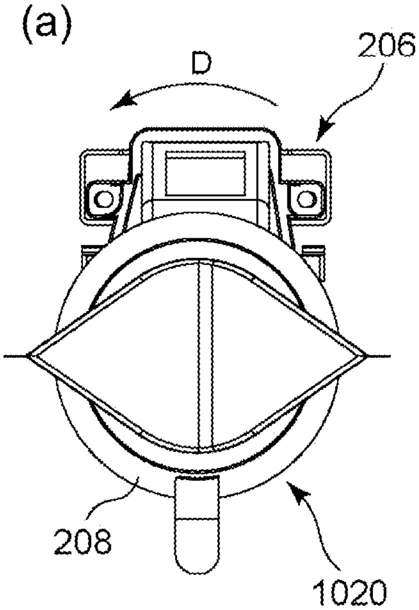
Figure 188:
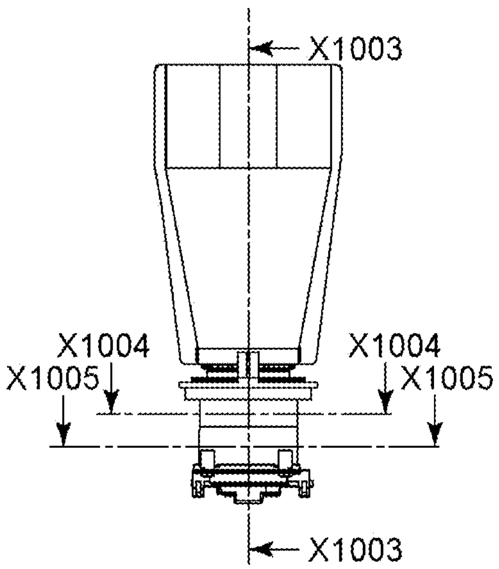
Figure 188:
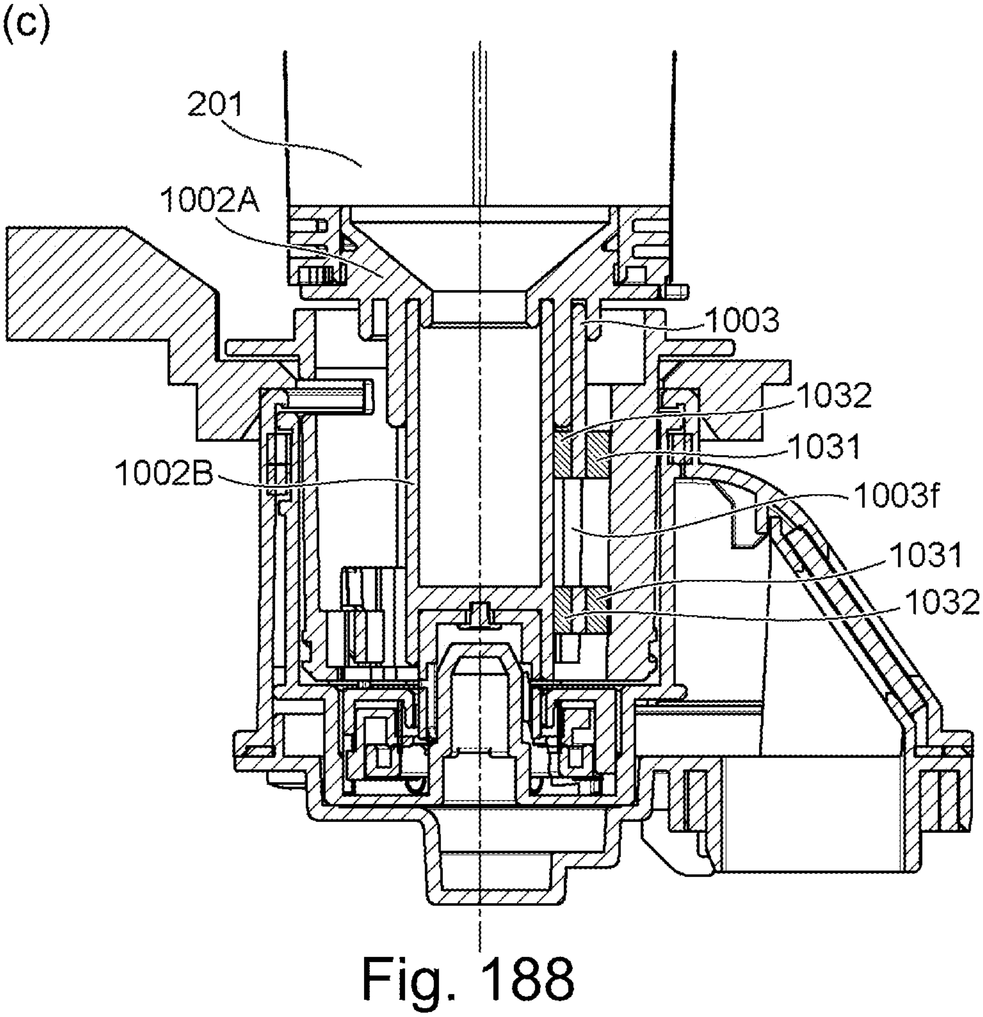

FIG. 188 is a top view, a side view, and a sectional view illustrating a state in which the toner pack is mounted to the mounting portion in Embodiment 10.

Figure 189:
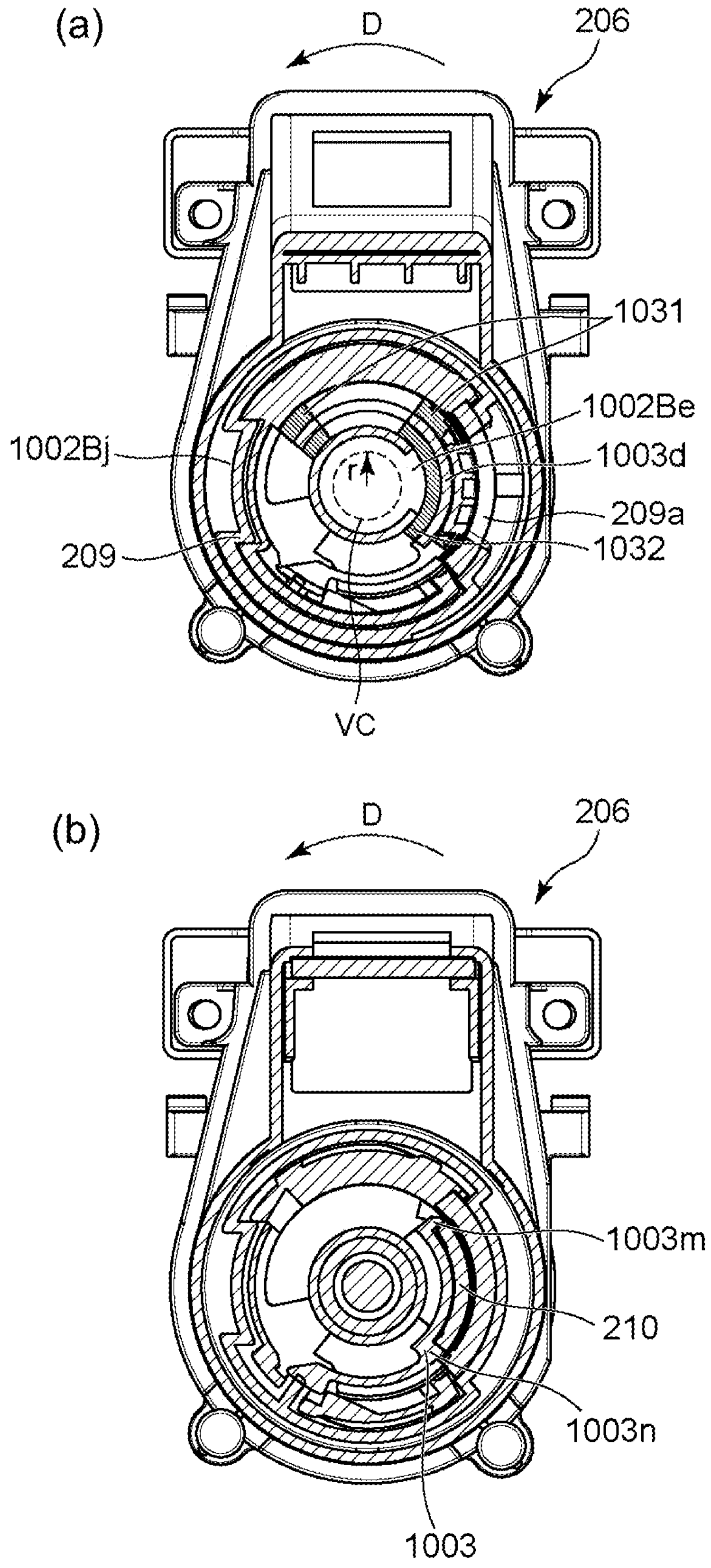

FIG. 189 is cross-sectional views illustrating a state in which the toner pack is mounted to the mounting portion in Embodiment 10.

Figure 190:
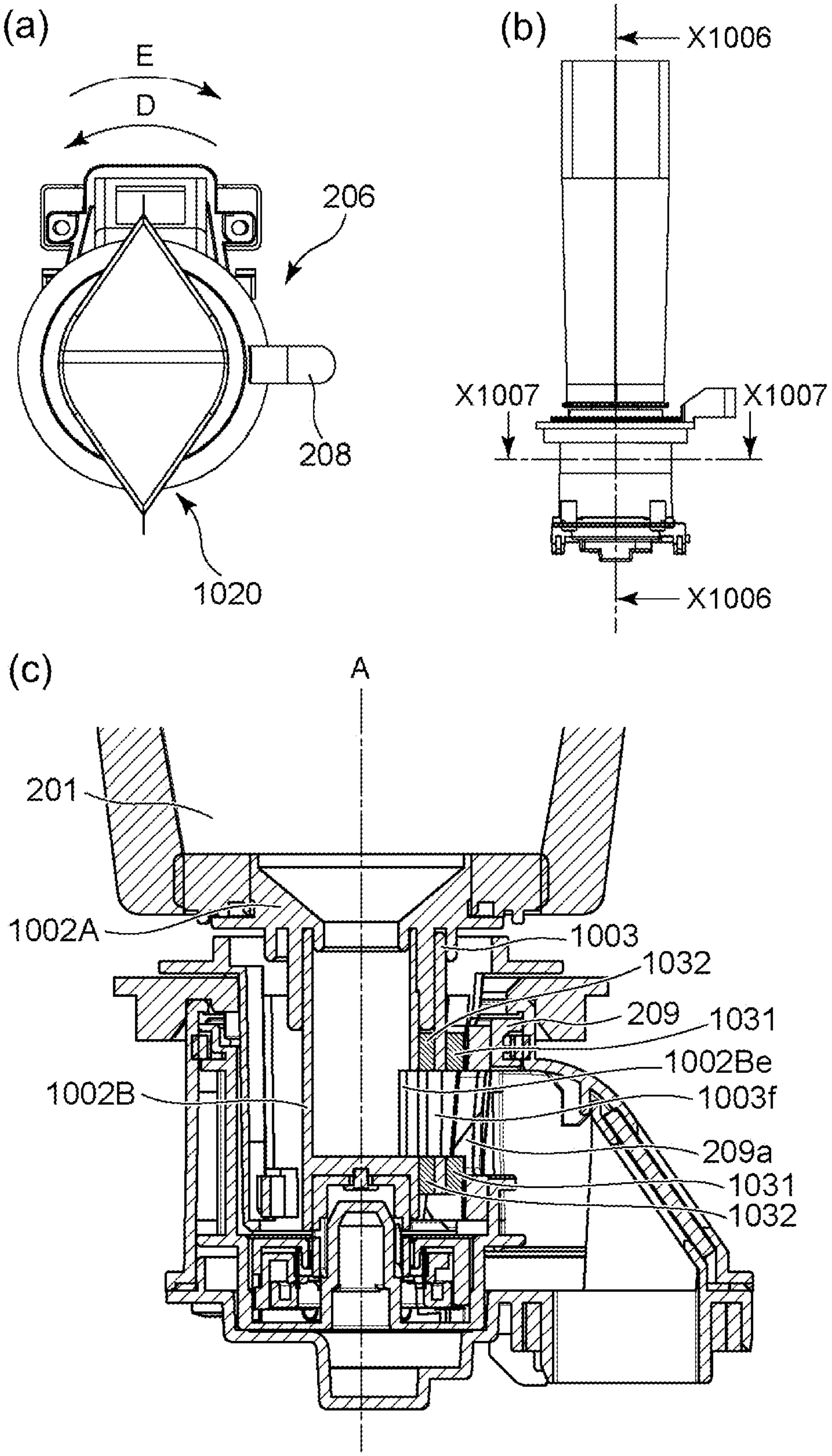

FIG. 190 is a top view, a side view, and a cross-sectional view illustrating a state in which toner in the toner pack is supplied into a toner accommodating chamber of a developer container in Embodiment 10.

Figure 191:
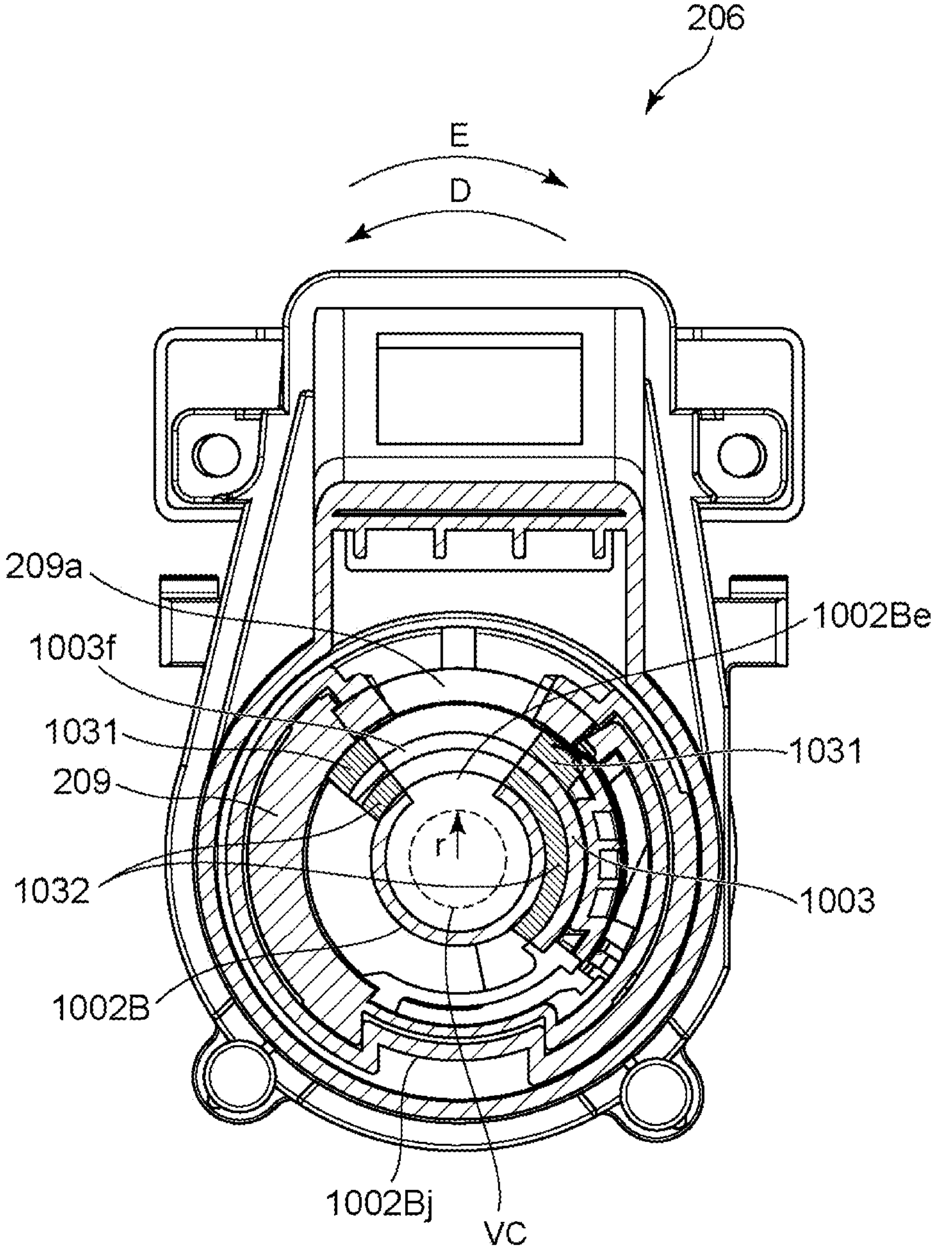

FIG. 191 is a cross-sectional view illustrating a state in which the toner of the toner pack is supplied into the toner accommodating chamber of the developer container in Embodiment 10.

Figure 192:
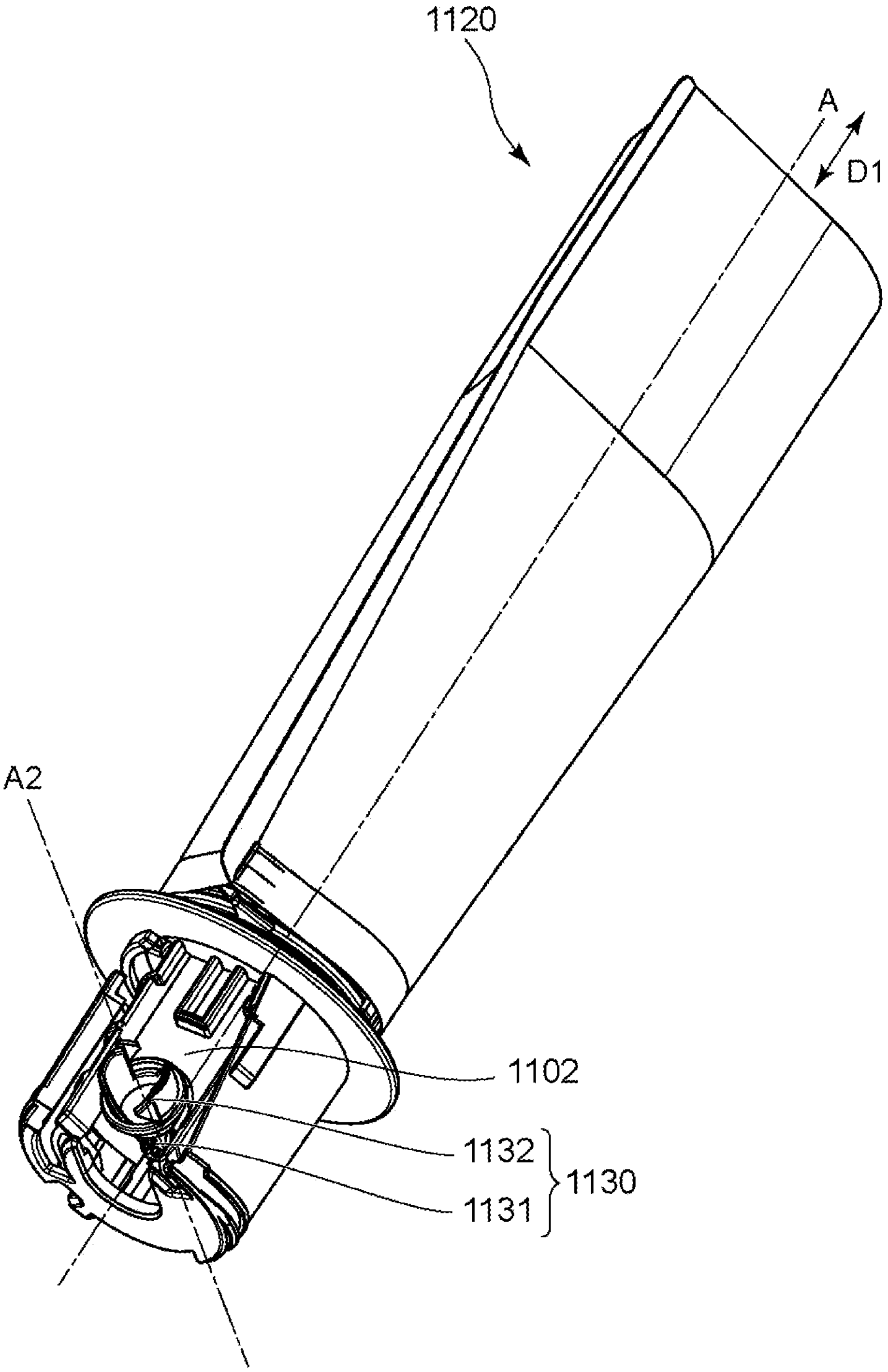

FIG. 192 is a perspective view of a state in which a free end member of the toner pack is in a first attitude in Embodiment 11.

Figure 193:
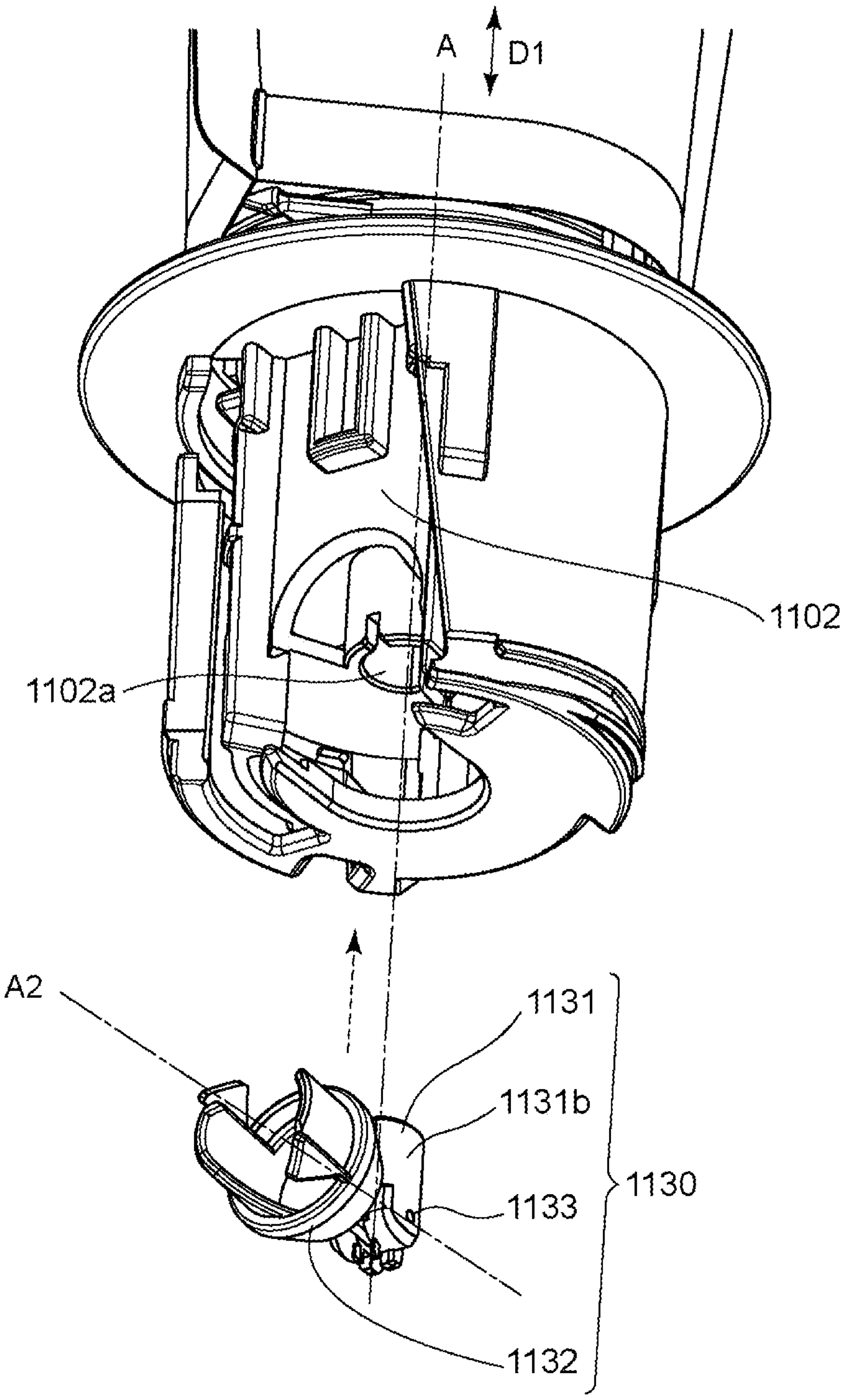

FIG. 193 is a partially exploded perspective view of a toner pack according to Embodiment 11.

Figure 194:
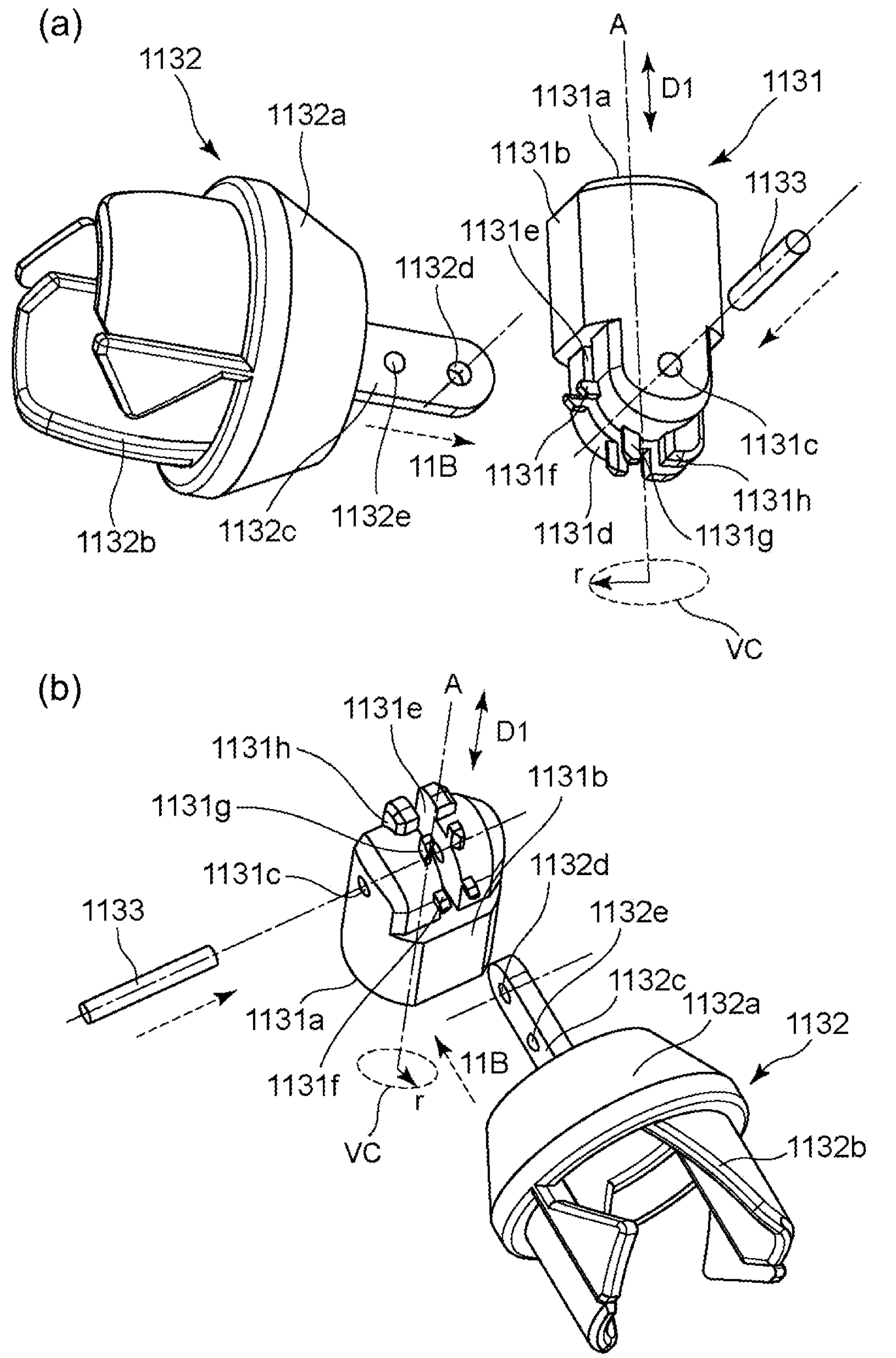

FIG. 194 is an exploded perspective view of a projecting member in Embodiment 11.

Figure 195:
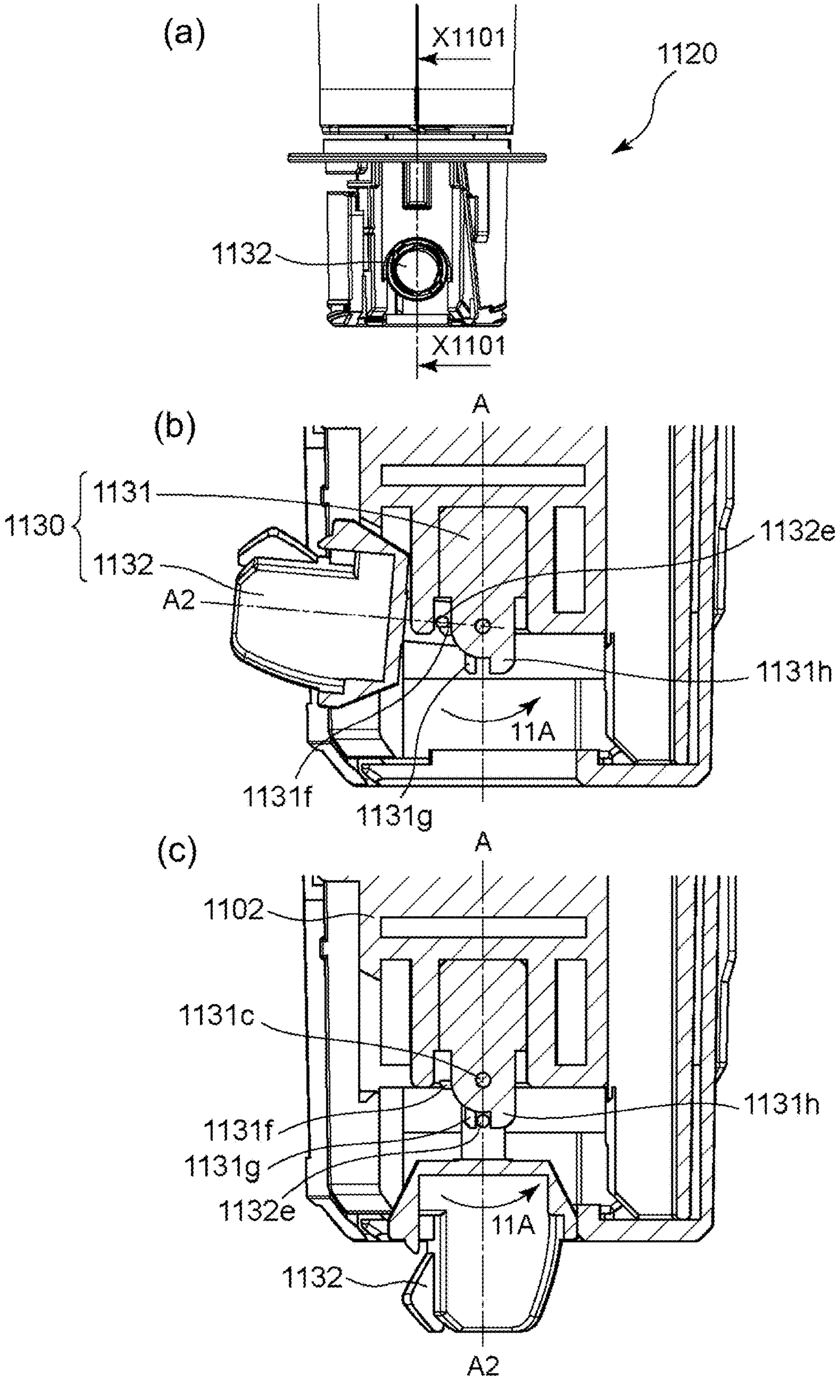

FIG. 195 is a side view and a sectional view illustrating a user operation of the projecting member in Embodiment 11.

Figure 196:
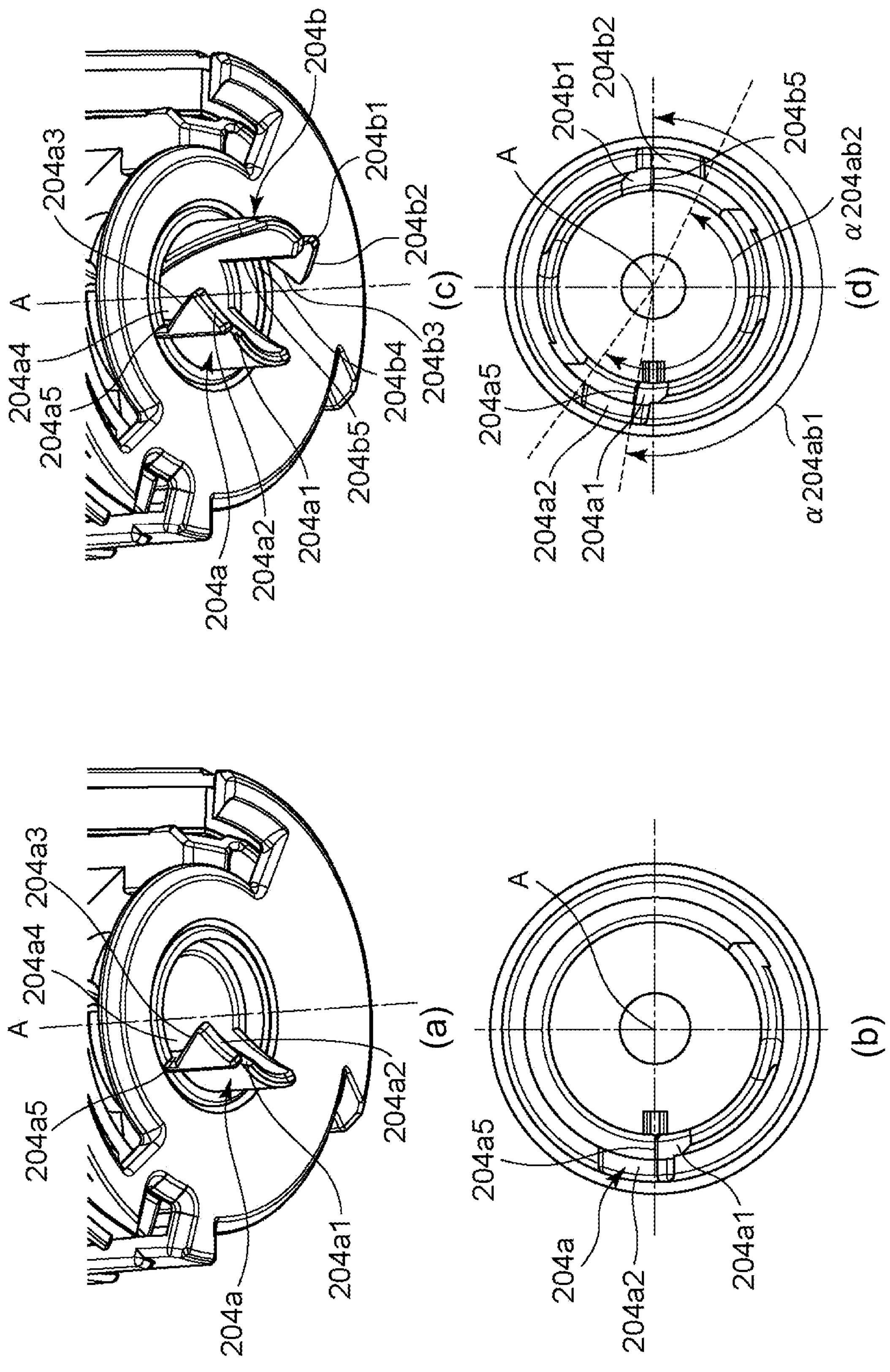

FIG. 196 is an illustration showing a structure in which only one restriction releasing portion of the projecting portion in Embodiment 2 and a structure in which the second restriction releasing portion has a shape of 190-degree rotational symmetry of the first restriction releasing portion.

EMBODIMENTS OF THE INVENTION

Hereinafter, exemplary embodiments for implementing the present invention will be described with reference to the accompanying drawings.

Embodiment 1

Hereinafter, embodiments of the present invention will be described in detail with reference to the drawings.

(Image Forming Apparatus System)

Figure 1:
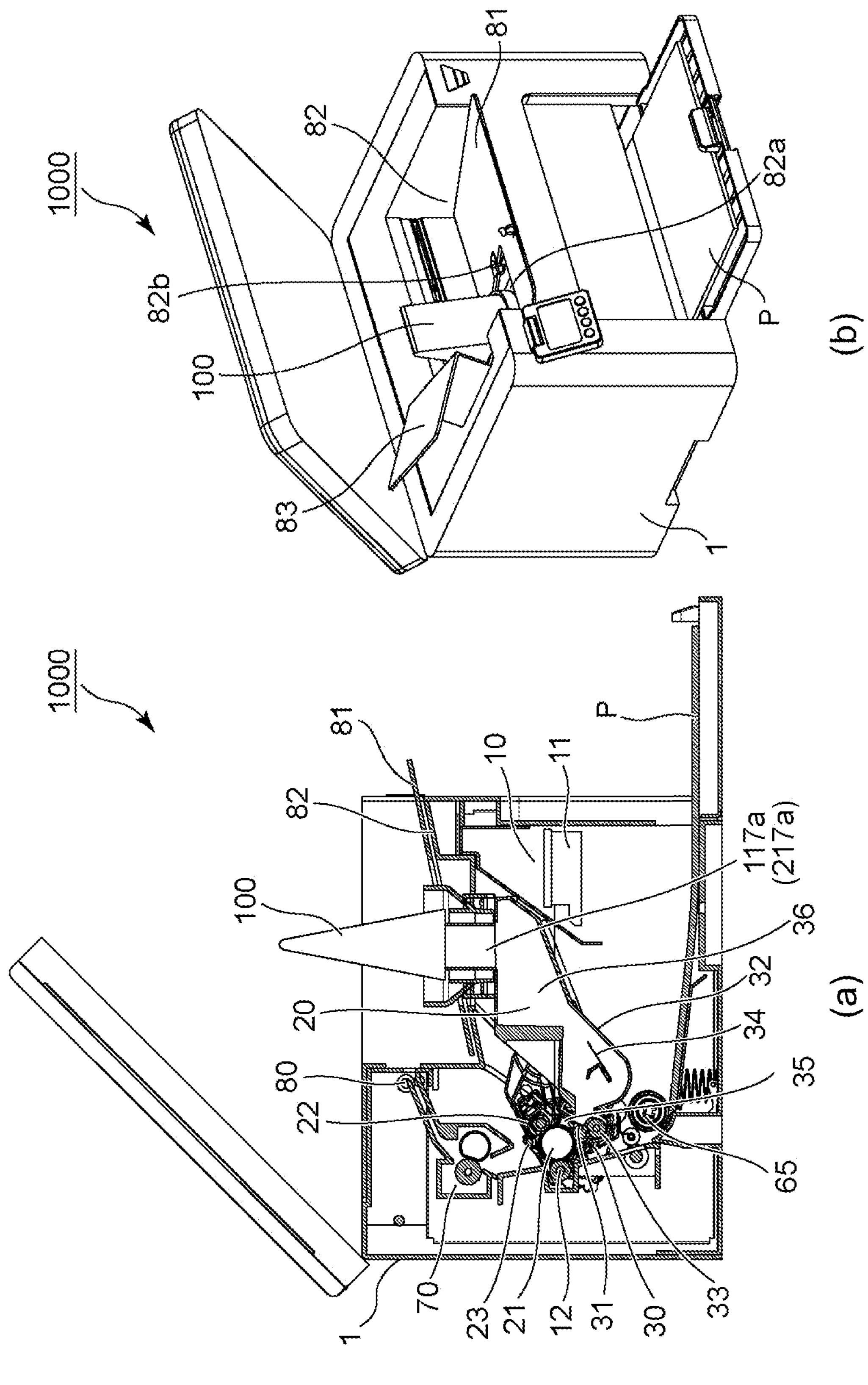
FIG. 1 is views of an image forming system according to Embodiment 1.

Part (a) of FIG. 1 is a schematic cross-sectional view illustrating a structure of an image forming system 1000 according to Embodiment 1. Part (b) of FIG. 1 is a perspective view of the image forming system 1000.

Figure 2:
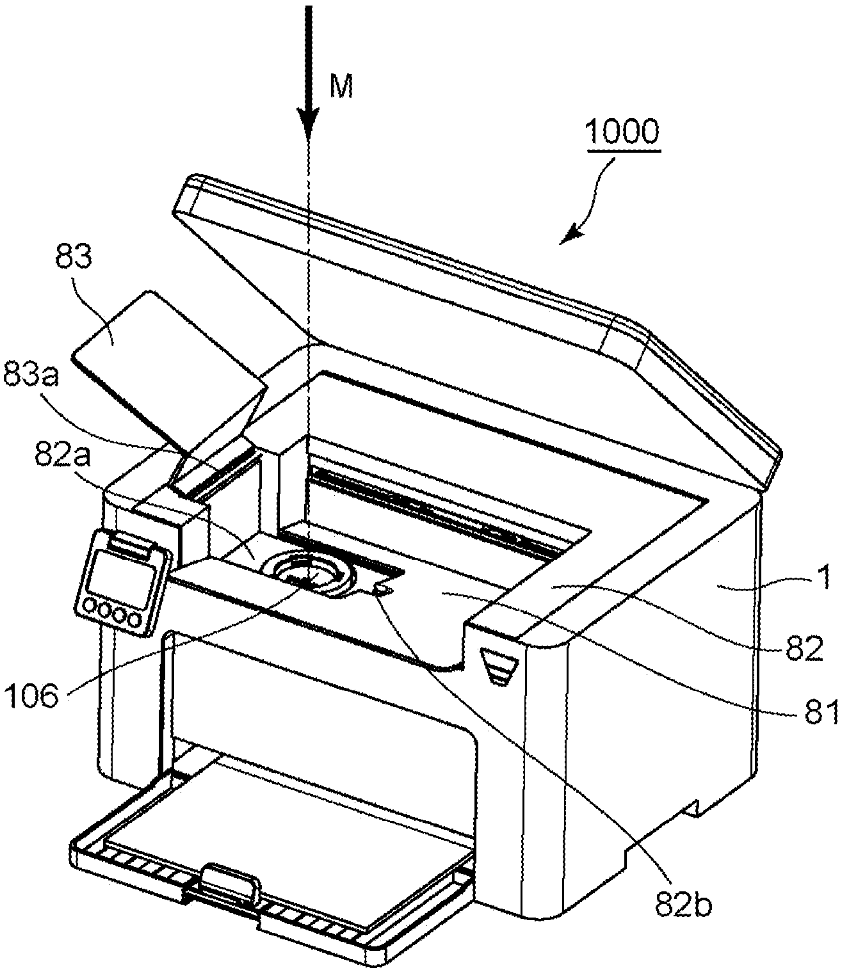
FIG. 2 is a perspective view of an image forming apparatus according to Embodiment 1.

The image forming system 1000 includes an image forming apparatus 1 and a toner pack 100 (toner container, toner cartridge) which can be mounted to the image forming apparatus 1. FIG. 2 is a perspective view of the image forming apparatus 1 to which the toner pack 100 is not mounted.

The toner pack 100 is mountable to the mounting portion 106 of the image forming apparatus 1 shown in FIG. 2 and contains toner to be supplied to the image forming apparatus 1. The detailed structure of the toner pack 100 will be described hereinafter. The toner pack 100 is mounted by moving it in the mounting direction M shown in FIG. 2. In this embodiment, the mounting direction M of the toner pack 100 is the direction of gravity, but the direction M may be inclined relative to the direction of gravity.

(Image Forming Apparatus)

The image forming apparatus 1 is a monochromatic printer which forms an image on the recording material P based on the image information inputted from an external device. The recording material P may be various sheet materials such as papers such as plain paper and thick paper, plastic films such as sheets for overhead projectors, sheets having a special shape such as envelopes and index papers, or various sheet materials made of different materials such as cloth.

As shown in part (a) of FIG. 1 and part (b) of FIG. 1, the image forming apparatus 1 has the following structure. It comprises an image forming portion 10 that forms a toner image on the recording material P, a pickup roller 65 that feeds the recording material P to the image forming portion 10, a fixing portion 70 that fixes the toner image formed by the image forming portion 10, on the recording material P, and the discharging roller pair 80.

The image forming portion 10 includes a scanner unit 11, an electrophotographic process unit 20*a* transfer roller 12 that transfers a toner image as a developer image formed on a photosensitive drum 21 of the process unit 20 to the recording material P. The process unit 20 includes a photosensitive drum 21, a charging roller 22, a pre-exposure portion 23, and a developing device 30 (developing unit, developing portion) including a developing roller 31.

The photosensitive drum 21 (image bearing member) is a photosensitive member molded into a cylindrical shape. The photosensitive drum 21 of this embodiment has a photosensitive layer formed of a negatively charged organic photosensitive member on a drum-shaped substrate made of aluminum. Further, the photosensitive drum 21 is rotationally driven by a motor in a predetermined rotational direction (clockwise direction in the Figure) at a predetermined process speed.

The charging roller 22 contacts the photosensitive drum 21 with a predetermined pressure contact force to form a charging portion. Further, by applying a desired charging voltage by a charging high voltage power source, the surface of the photosensitive drum 21 is uniformly charged to a predetermined potential. In this embodiment, the photosensitive drum 21 is charged by the charging roller 22 to the negative polarity. The pre-exposure portion 23 removes static electricity from the surface potential of the photosensitive drum 21 before reaching the charging portion in order to generate a stable discharge in the charging portion.

The scanner unit 11 as an exposure means scans and exposes a surface of the photosensitive drum 21 by irradiating the photosensitive drum 21 with a laser beam corresponding to image information inputted from an external device, using a polygonal mirror. By this exposure, an electrostatic latent image corresponding to the image information is formed on the surface of the photosensitive drum 21. The scanner unit 11 is not limited to the laser scanner device, and, for example, an LED exposure device including an LED array in which a plurality of LEDs are arranged along the longitudinal direction of the photosensitive drum 21 may be employed.

The developing device 30 includes a developing roller 31 for supplying the developer to the developing roller 31 as a developer carrying member for carrying the developer, a developer container 32 (developing frame) which is the frame of the developing device 30, and a supply roller 33 capable of supplying the developer to the developing roller 31. The developing roller 31 and the supply roller 33 are rotatably supported by the developer container 32. In addition, the developing roller 31 is arranged in the opening of the developer container 32 so as to face the photosensitive drum 21. The supply roller 33 is rotatably in contact with the developing roller 31, and the toner as a developer contained in the developer container 32 is supplied to the surface of the developing roller 31 by the supply roller 33. The supply roller 33 is not always required, if the toner can be sufficiently supplied to the developing roller 31.

The developing device 30 of this embodiment uses a contact developing method as a developing method. That is, a toner layer carried on the developing roller 31 is in contact with the photosensitive drum 21 in a developing portion (developing region) where the photosensitive drum 21 and the developing roller 31 face each other. A developing voltage is applied to the developing roller 31 by a developing high voltage power source. Under the developing voltage, the toner carried on the developing roller 31 is transferred from the developing roller 31 to the drum surface in accordance with the potential distribution on the surface of the photosensitive drum 21, so that the electrostatic latent image is developed into a toner image. In this embodiment, a reverse development method is employed. That is, the surface of the photosensitive drum is charged in the charging step and then a charge amount is attenuated by the exposure in the exposure step, and the toner adheres to the surface region of the photosensitive drum 21 having the attenuated charge amount, so that a toner image is formed.

Further, in this embodiment, a toner having a particle size of 6 μm and a negative regular charge polarity is used. As an example, the toner of this embodiment employs a polymerized toner produced by a polymerization method. In addition, the toner of this embodiment does not contain a magnetic component, and is a so-called non-magnetic one-component developer in which the toner is supported on the developing roller 31 mainly by an intermolecular force or an electrostatic force (mirror image force). However, a one-component developer containing a magnetic component may be used. In addition to the toner particles, the one-component developer may contain additives (for example, wax or silica fine particles) for adjusting the fluidity and charging performance of the toner. Furthermore, as the developer, a two-component developer comprising a non-magnetic toner and a magnetic carrier may be used. When a magnetic developer is used, for example, a cylindrical developing sleeve in which a magnet is arranged inside is used as the developer carrier.

The developer container 32 includes a toner accommodating chamber 36 (second accommodating portion, main assembly accommodating portion) for accommodating toner. A stirring member 34 (toner transporting member) is provided inside the toner accommodating chamber 36. The stirring member 34 is driven by a motor (not shown) to stir the toner in the developer container 32, and at the same time, feed the toner toward the developing roller 31 and the supply roller 33. In addition, the stirring member 34 functions to circulate the toner not used for development but stripped off the developing roller 31 in the developer container, thus making uniform the toner in the developer container. The stirring member 34 is not limited to the rotating type. For example, a stirring member including a swinging shape may be employed instead.

Further, a developing blade 35 that restricts the amount of toner carried on the developing roller 31 is arranged in the opening of the developer container 32 in which the developing roller 31 is arranged. The toner supplied to the surface of the developing roller 31 passes through the portion facing the developing blade 35 with the rotation of the developing roller 31, so that the toner is uniformly formed into a thin layer and is charged to the negative polarity by triboelectric charging.

Next, the image forming operation of the image forming apparatus 1 will be described. When a command for image formation is inputted to the image forming apparatus 1, the image forming process by the image forming portion 10 is started based on the image information inputted from an external computer connected to the image forming apparatus 1. The scanner unit 11 irradiates the photosensitive drum 21 with a laser beam based on the inputted image information. At this time, the photosensitive drum 21 is precharged by the charging roller 22, and the electrostatic latent image is formed on the photosensitive drum 21 by being irradiated with the laser beam. Thereafter, the electrostatic latent image is developed by the developing roller 31, and a toner image is formed on the photosensitive drum 21.

In parallel with the image forming process described above, the recording material P is fed out by the pickup roller 65 and is fed toward the transfer nip formed by the transfer roller 12 and the photosensitive drum 21.

The transfer roller 12 is supplied with a transfer voltage from a transfer high-voltage power source, so that the toner image carried on the photosensitive drum 21 is transferred onto the recording material P. When the recording material P now carrying the toner image passes through the fixing portion 70, the toner image is heated and pressed. By this, the toner particles are melted and then fixed, so that the toner image is fixed on the recording material P. The recording material P which has passed through the fixing portion 70 is discharged to the outside (outside the machine) of the image forming apparatus 1 by the discharging roller pair 80 as the discharging means, on the discharge tray 81 as a stacking portion provided at an upper portion of the image forming apparatus 1.

A top cover 82 as a stacking tray is provided at the upper portion of the image forming apparatus 1, and the discharge tray 81 as a stacking surface is formed at the upper surface of the top cover 82. As shown in part (b) of FIG. 1 and FIG. 2, the top cover 82 is provided with an opening/closing member 83 which is supported so as to be openable/closable around a rotation shaft 83*a* extending in the front-rear direction. The discharge tray 81 of the top cover 82 is provided with an opening 82*a* which opens upward. As shown in FIG. 2, the mounting portion 106 for mounting the toner pack 100 is exposed through the opening 82*a*.

The opening/closing member 83 is movable between a closed position for covering the mounting portion 106 in which the toner pack 100 cannot be mounted to the image forming apparatus 1, and an open position in which the mounting portion 106 is exposed so that the toner pack 100 can be mounted to the image forming apparatus 1. The opening/closing member 83 functions as a part of the discharge tray 81 in the closed position. The opening/closing member 83 and the opening 82*a* are formed on the left side of the discharge tray 81 as viewed from the front of the image forming apparatus 1. The front side of the image forming apparatus 1 described here is the upstream side of the image forming apparatus 1 in the direction in which the recording material P is fed out by the pickup roller 65. In addition, the opening/closing member 83 is opened to the left by hooking a finger in the groove portion 82*b* provided in the top cover 82.

The opening 82*a* of the discharge tray 81 is opened so that the mounting portion 106 formed on the upper portion of the image forming apparatus 1 is exposed, and by opening the opening/closing member 83, the user can access the mounting portion 106. In this embodiment, the direct supply method in which the user supplies the toner from the toner pack 100 mounted on the mounting portion 106 to the developing device 30 while the developing device 30 is mounted in the image forming apparatus 1 is employed. At least a part of the toner pack 100 is exposed to the outside of the image forming apparatus 1 in a state of being mounted to the mounting portion 106 of the image forming apparatus 1.

When the remaining amount of toner in the process unit 20 is low, it is not necessary to take out the process unit 20 from the image forming apparatus 1 and replace it with a new process unit, so that usability can be improved. Further, the toner can be replenished to the developer container 32 at a lower cost than replacing the entire process unit 20. In the direct supply method, it is not necessary to replace various rollers, gears, and so on, and therefore, the cost can be reduced, as compared with the case where only the developing device 30 of the process unit 20 is replaced, as well.

(Toner Pack Mounting Portion)

First, referring to FIGS. 3 to 8, the structure of the mounting portion 106 will be described. In this embodiment, the mounting portion 106 is a unit for mounting the toner pack 100.

Figure 3:
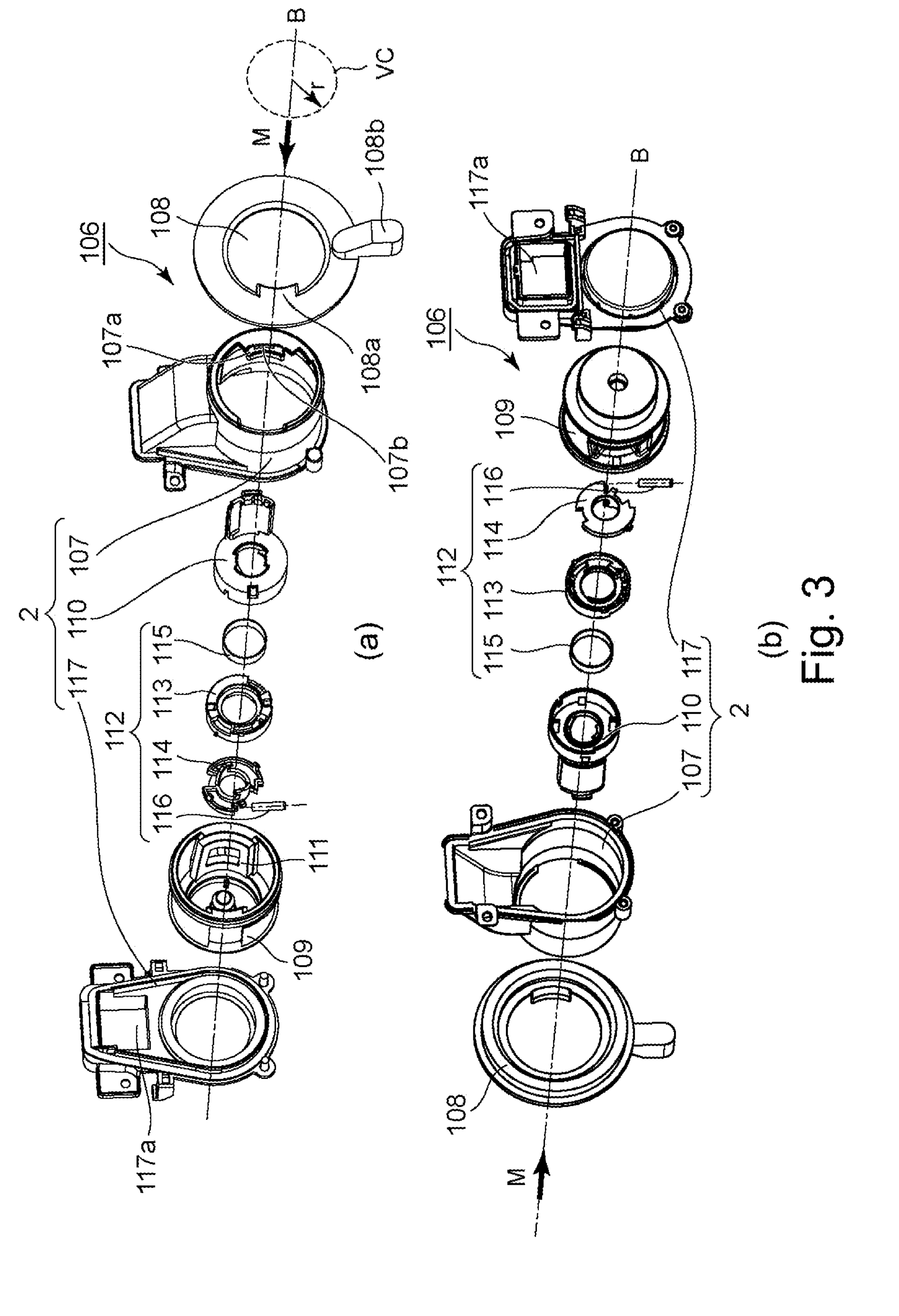
FIG. 3 is exploded perspective views of a mounting portion in Embodiment 1.
Figure 5:
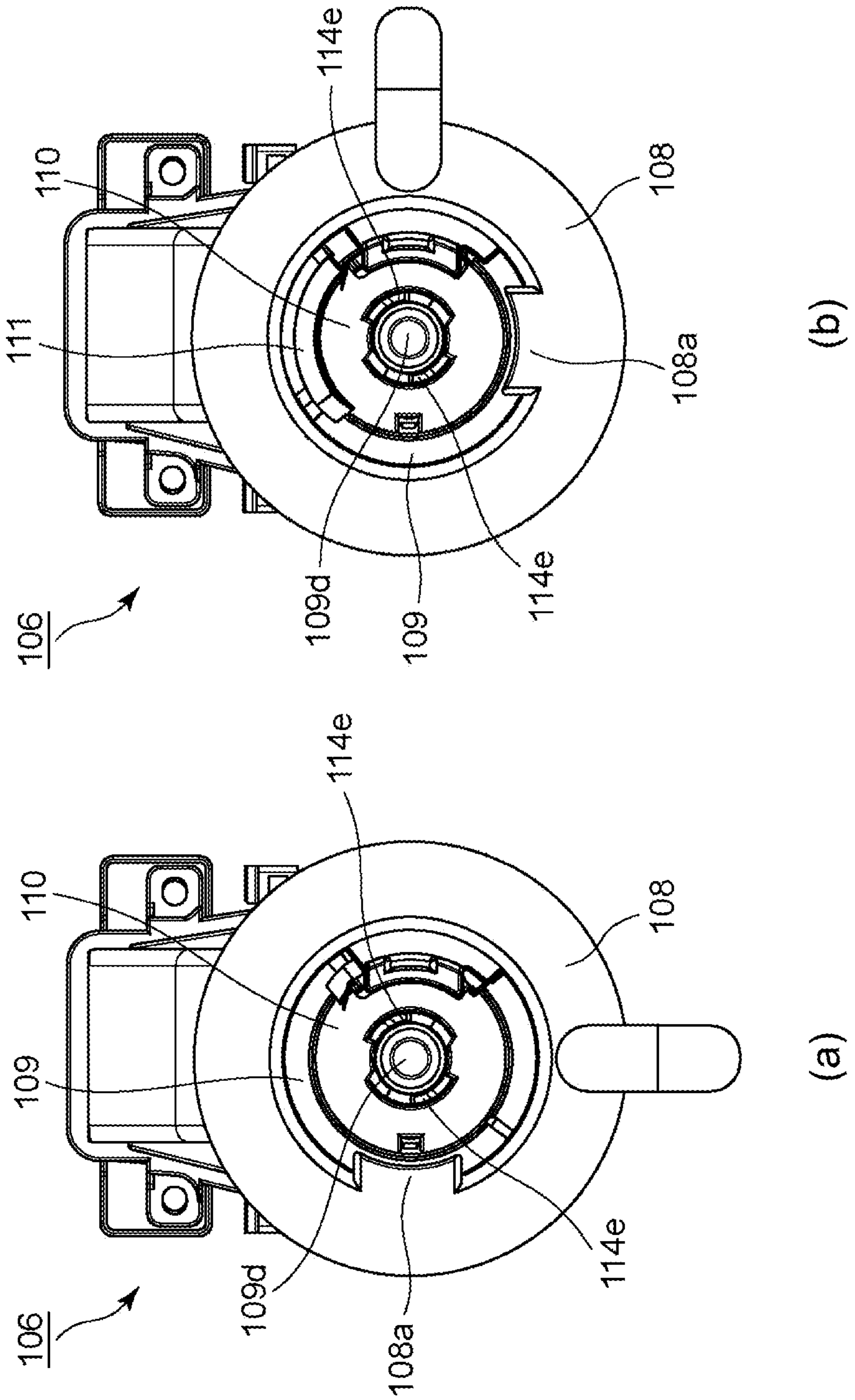
FIG. 5 is top views of the mounting portion in Embodiment 1 as viewed from above.
Figure 6:
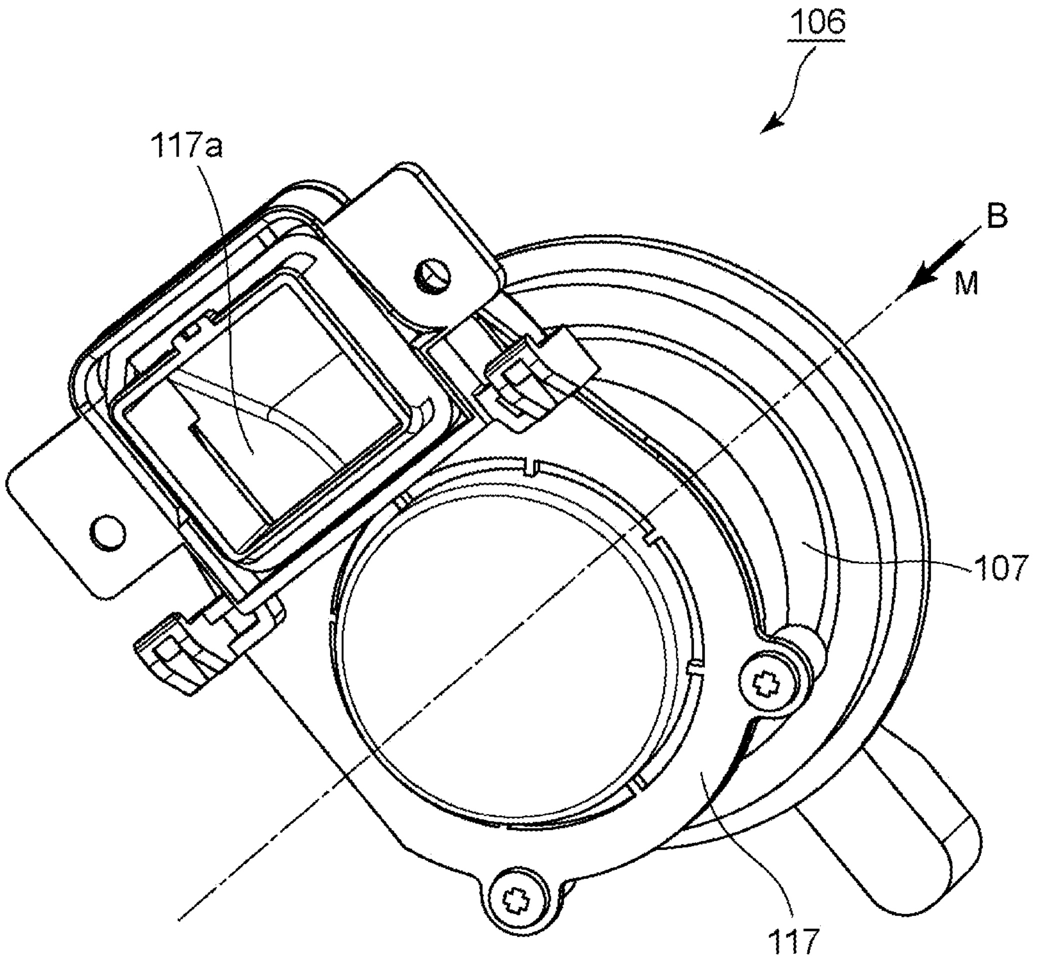
FIG. 6 is a view of the mounting portion in Embodiment 1 as viewed from below.

Part (a) of FIG. 3 is an exploded perspective view of the mounting portion 106. Part (b) of FIG. 3 is an exploded perspective view of the mounting portion 106 as viewed in a direction different from that of part (a) of FIG. 3. Part (a) of FIG. 4 and part (a) of FIG. 5 are a perspective view illustrating the appearance of the mounting portion 106 when the operating lever 108 is in the closed position, and a view of the mounting portion 106 as viewed in the mounting direction M, respectively. Part (b) of FIG. 4 and part (b) of FIG. 5 are a perspective view illustrating the appearance of the mounting portion 106 when the operating lever 108 is in an open position, and a view of the mounting portion 106 as viewed in the mounting direction M, respectively. FIG. 6 is a perspective view of the mounting portion 106 as viewed from the downstream side in the mounting direction M.

Figure 7:
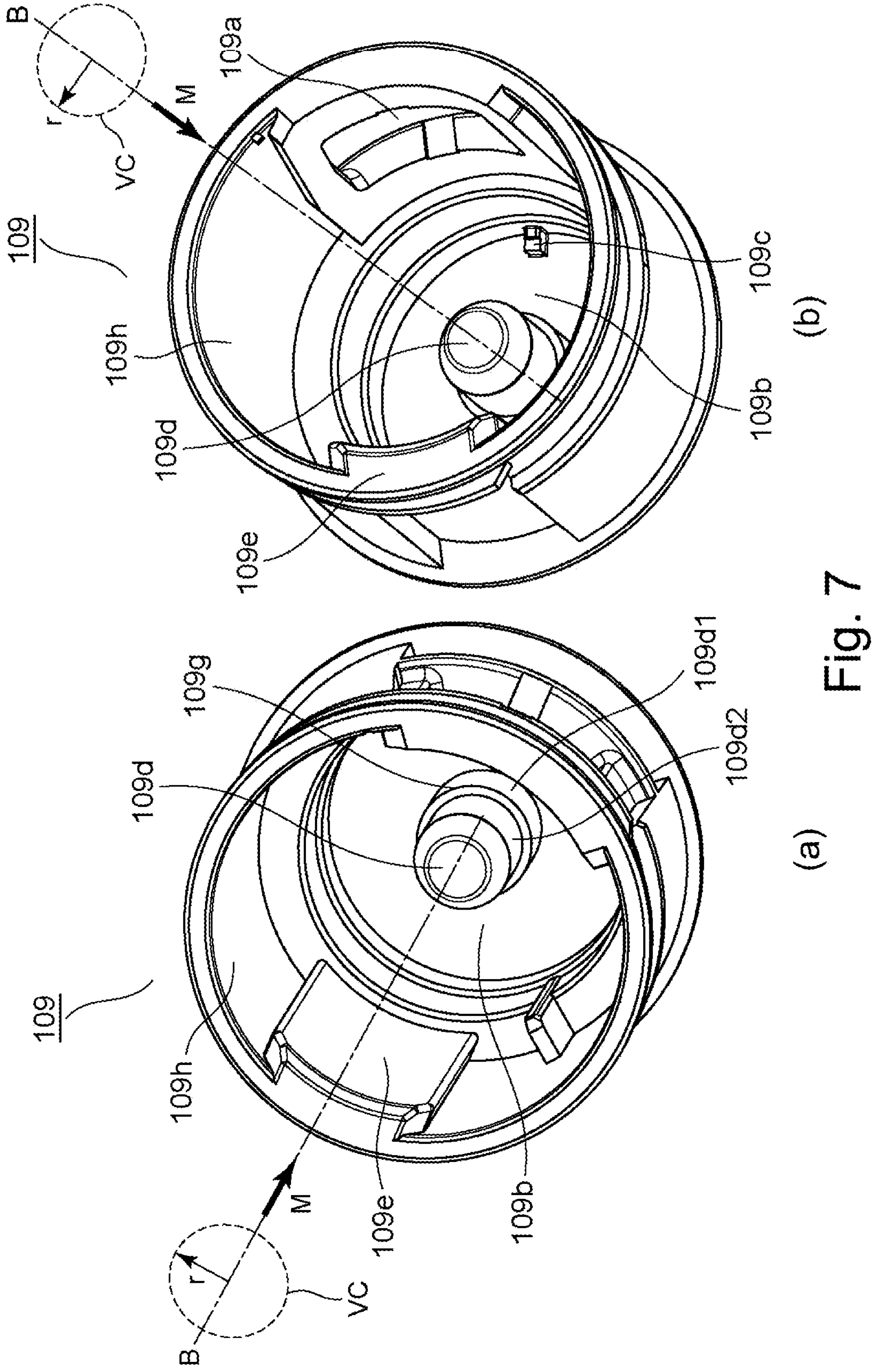
FIG. 7 is perspective views of an apparatus-side shutter in Embodiment 1.
Figure 8:
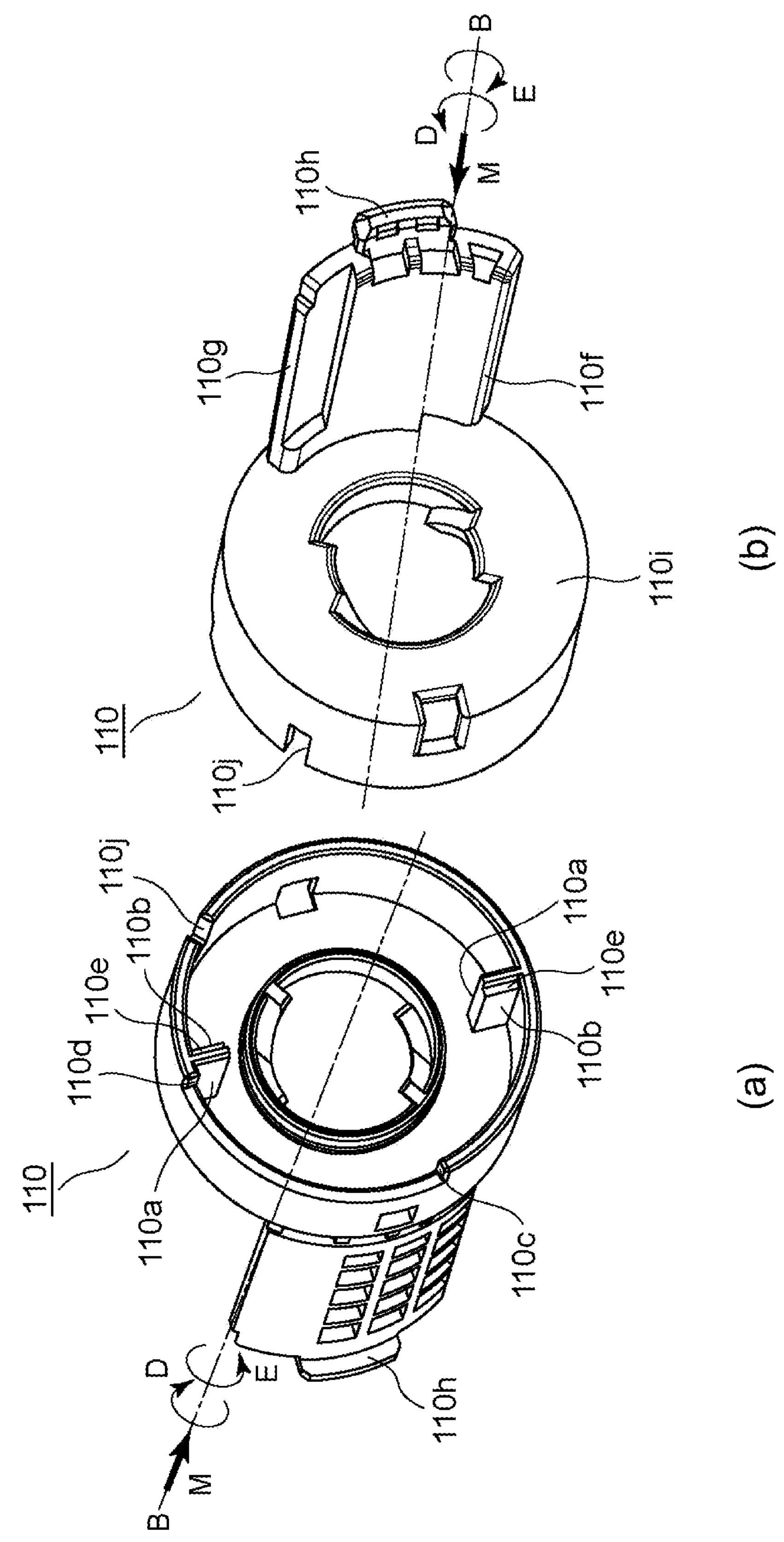
FIG. 8 is a perspective view of a cover in Embodiment 1.

Part (a) of FIG. 7 is a perspective view of the apparatus-side shutter 109 as viewed from the upstream side in the mounting direction M. Part (b) of FIG. 7 is a perspective view of the apparatus-side shutter 109 as viewed from a point different from that of part (a) of FIG. 7. Part (a) of FIG. 8 is a perspective view of a cover 110 as viewed from the downstream side of the cover 110 in the mounting direction M. Part (b) of FIG. 8 is a perspective view of the cover 110 as viewed from the upstream side in the mounting direction M.

Figure 4:
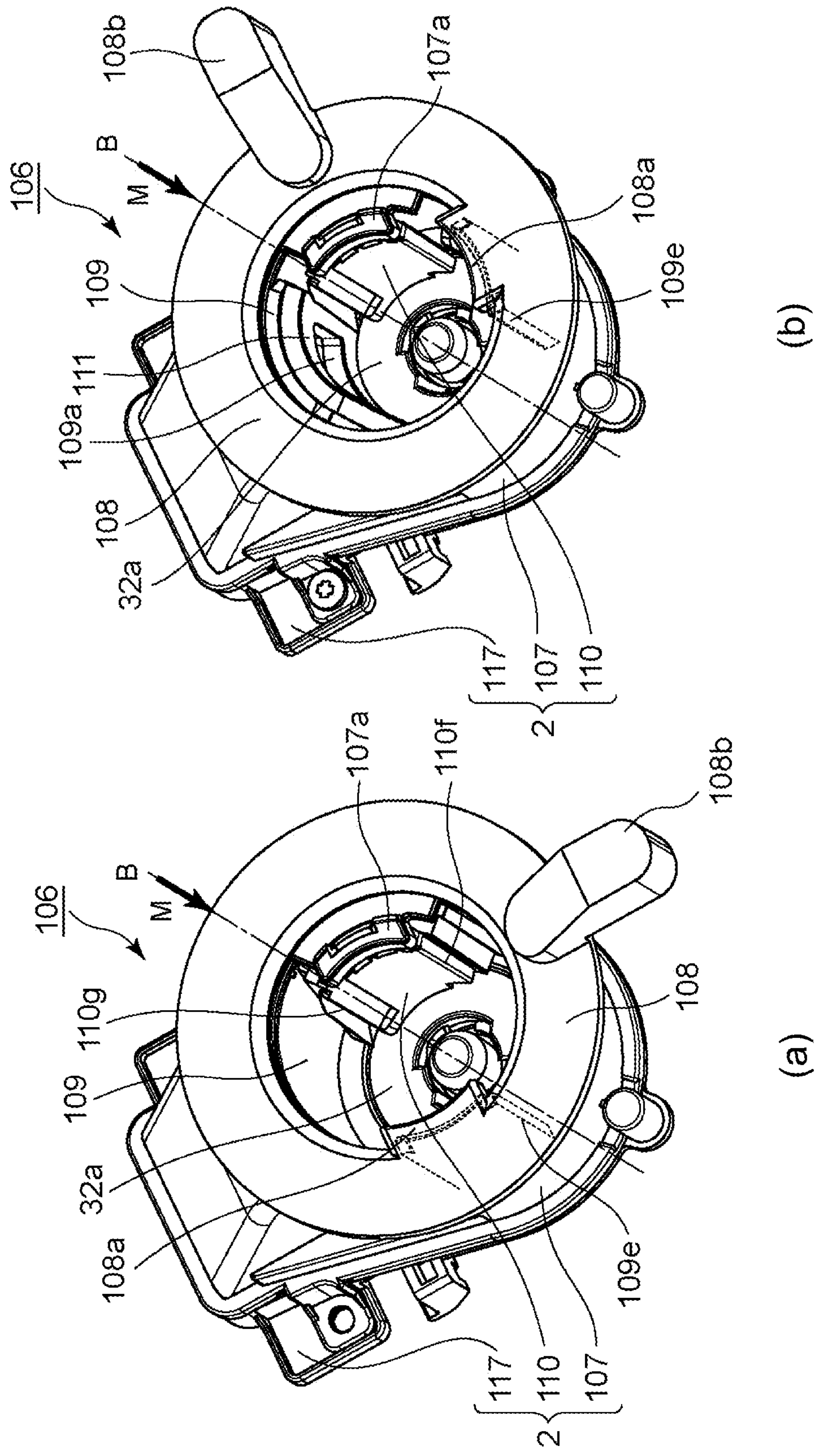
FIG. 4 is external perspective views of the mounting portion in Embodiment 1.

The mounting portion 106 shown in FIGS. 3 and 4 is provided with a base frame 2 including a first frame 107, a second frame 117, and the cover 110. The cover 110 and the second frame 117 are fixed to the first frame 107. As shown in FIG. 8, the cover 110 includes an engaged portion 110*h* which engages with the engaging portion 107*b* (part (a) of FIG. 3 of the first frame 107 so as not to rotate about the rotational axis B relative to the first frame 107. The first frame 107, the cover 110, and the second frame 117 may be integrally structured instead of being separate members. As shown in FIGS. 3 and 6, the second frame 117 is provided with an apparatus-side opening 117*a* (frame opening, receiving opening), and the apparatus-side opening 117*a* is in fluid communication with a toner accommodating chamber 36 of the developing device 30 (see part (a) of FIG. 1).

The operating lever 108 and the apparatus-side shutter 109 (second shutter) are mounted to the base frame 2 so as to be rotatable about the rotational axis B (central axis).

The first frame 107 is provided with a positioning portion 107*a*. The positioning portion 107*a* projects inward from the inner peripheral surface of the first frame 107 centered on the rotational axis B in the radial direction r of an imaginary circle VC centered on the rotational axis B. Further, the operating lever 108 is provided with a drive transmission portion 108*a* (lever projection) and an operating portion 108*b*. As shown in part (a) of FIG. 3, the drive transmission portion 108*a* of the operating lever 108 a projection portion which projects inward beyond an inner peripheral surface centered on the rotational axis B of the operating lever 108 in the radial direction r of the imaginary circle VC centered on the rotational axis B.

The apparatus-side shutter 109 is a cylindrical member having an open upper portion, and as shown in FIG. 7, it is provided with a receiving opening 109*a* (second shutter opening, apparatus-side shutter opening) in a lateral side surface, extending in the rotational axis B direction, of the apparatus side shutter, and it has a bottom surface 109*b* provided with a restricted rib 109*c* (rotation restricted portion). The apparatus-side shutter 109 further includes a center boss 109*d* (positioning shaft, shaft portion), a driven transmission portion 109*e* (pushed portion, apparatus-side shutter projection), a pack contact surface 109*g* (mounting direction positioning), and an inner peripheral surface 109*h* (positioning in the radial direction). The apparatus-side shutter 109 is structured to be rotatable about the rotational axis B relative to the base frame 2.

The restricted rib 109*c* projects upward from the bottom surface 109*b* in the direction of the rotational axis B. As shown in part (a) of FIG. 7, the driven transmission portion 109*e* is a projection projecting inward in the radial direction r of the imaginary circle VC centered on the rotational axis B. An apparatus-side seal 111 is mounted around the receiving opening 109*a* (see part (b) of FIG. 4.

Here, the apparatus-side shutter 109 is structured so as to be rotatable relative to the base frame 2 between a closed position in which the receiving opening 109*a* is covered by the apparatus-side seal 111 and the cover 110, and an open position in which it is open, not covered by the cover 110 and is opened. The closed position is the position shown in part (a) of FIG. 4 and part (a) of FIG. 5, and is a position (non-communication position) in which the receiving opening 109*a* of the apparatus-side shutter 109 is not in fluid communication with the apparatus-side opening 117*a* of the second frame 117. The open position is the position shown in part (b) of FIG. 4 and part (b) of FIG. 5, and is a position (communication position) in which the receiving opening 109*a* of the apparatus-side shutter 109 is in fluid communication with the apparatus-side opening 117*a* of the second frame 117. By moving the apparatus-side shutter 109 to the open position, the toner can be supplied (supplied) from the toner pack 100 into the toner accommodating chamber 36 of the developing device 30 through the receiving opening 109*a*.

The drive of the operating lever 108 and the apparatus-side shutter 109 is not connected for drive transmission, and therefore, the apparatus-side shutter 109 does not rotate even if the operating lever 108 is operated without the toner pack 100 mounted.

(Apparatus-Side Shutter Rotation Restriction Mechanism)

As shown in FIG. 3, the mounting portion 106 of the image forming apparatus 1 further comprises a rotation restricting mechanism 112 including a restricting member 113 (rotation restriction member), a releasing member 114, a restriction spring 115, and a release spring 116.

Figure 9:
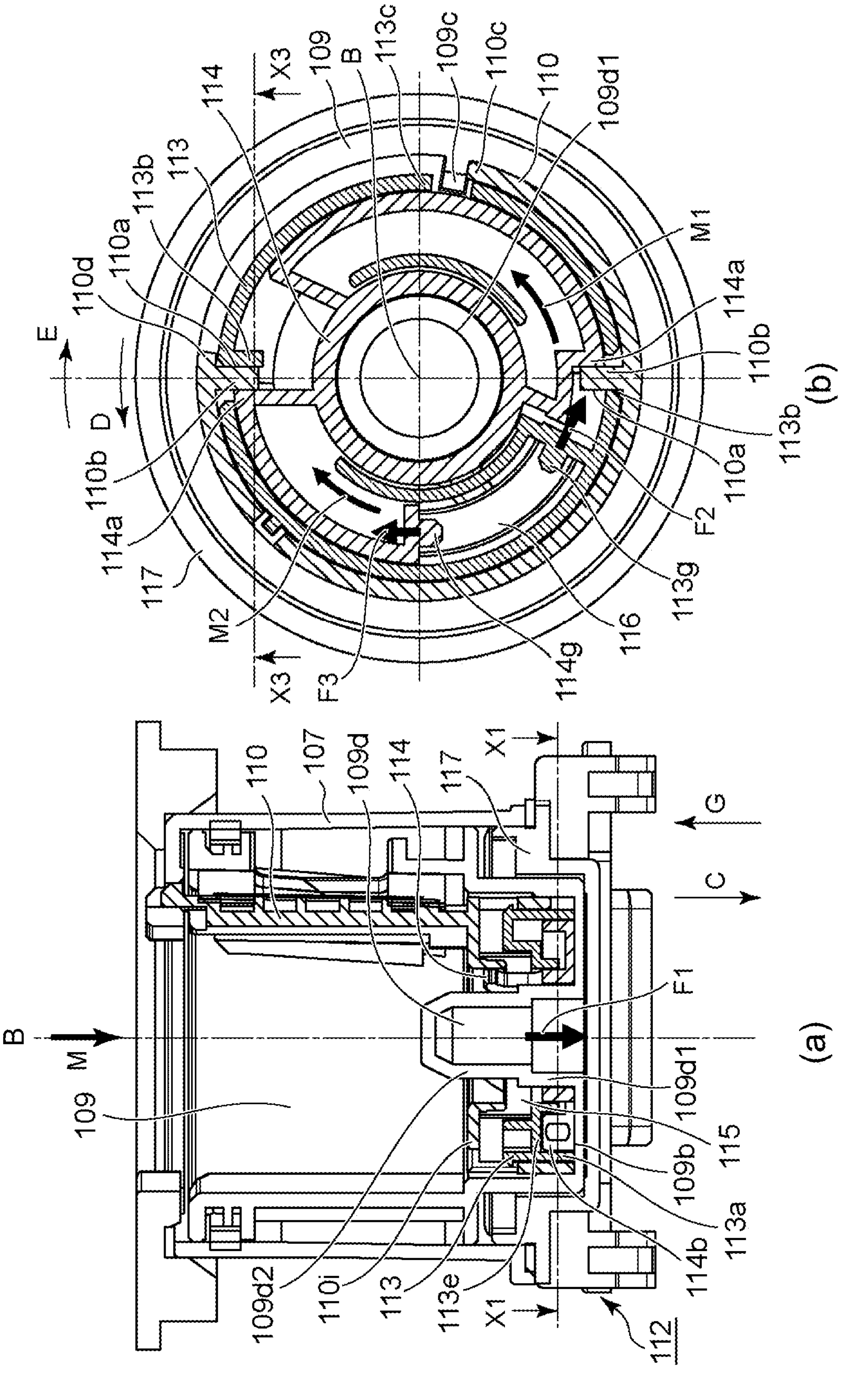
FIG. 9 is cross-sectional views of the mounting portion in Embodiment 1 (when the shutter rotation on the apparatus-side is restricted).
Figure 10:
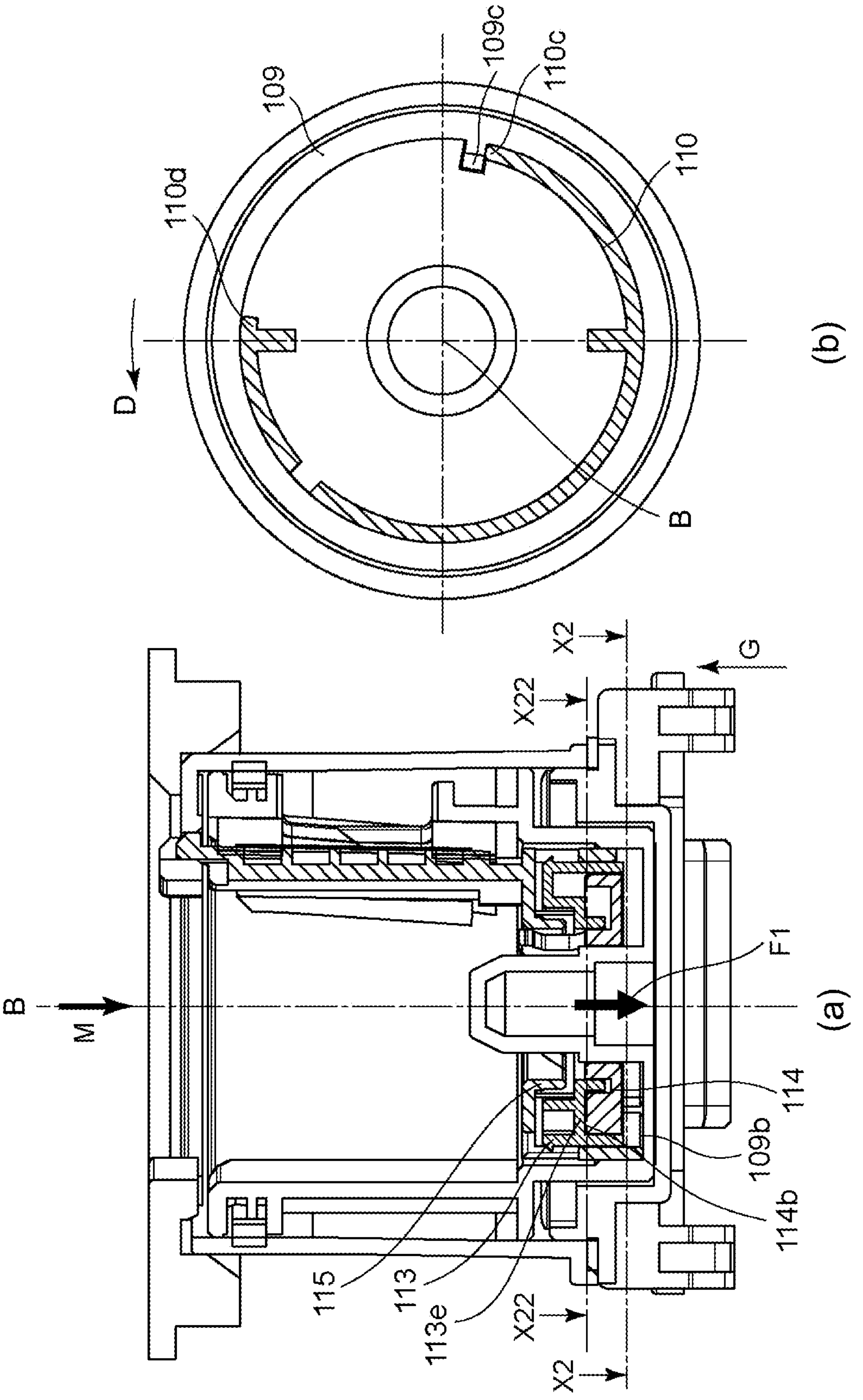
FIG. 10 is sectional views of the mounting portion in Embodiment 1 (when the restriction of the apparatus-side shutter rotation is released).
Figure 12:
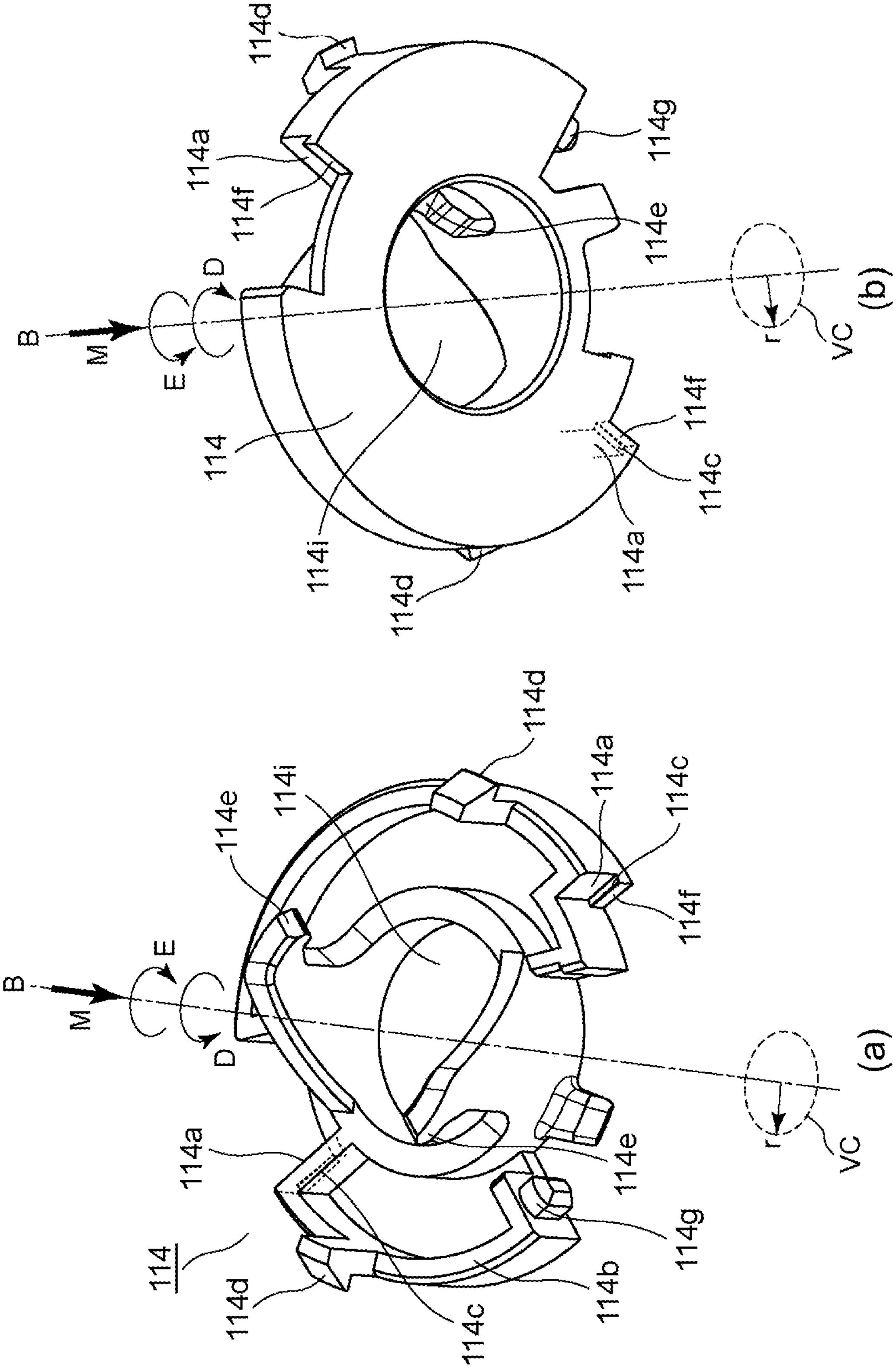
FIG. 12 is perspective views of the releasing member used in Embodiment 1.
Figure 13:
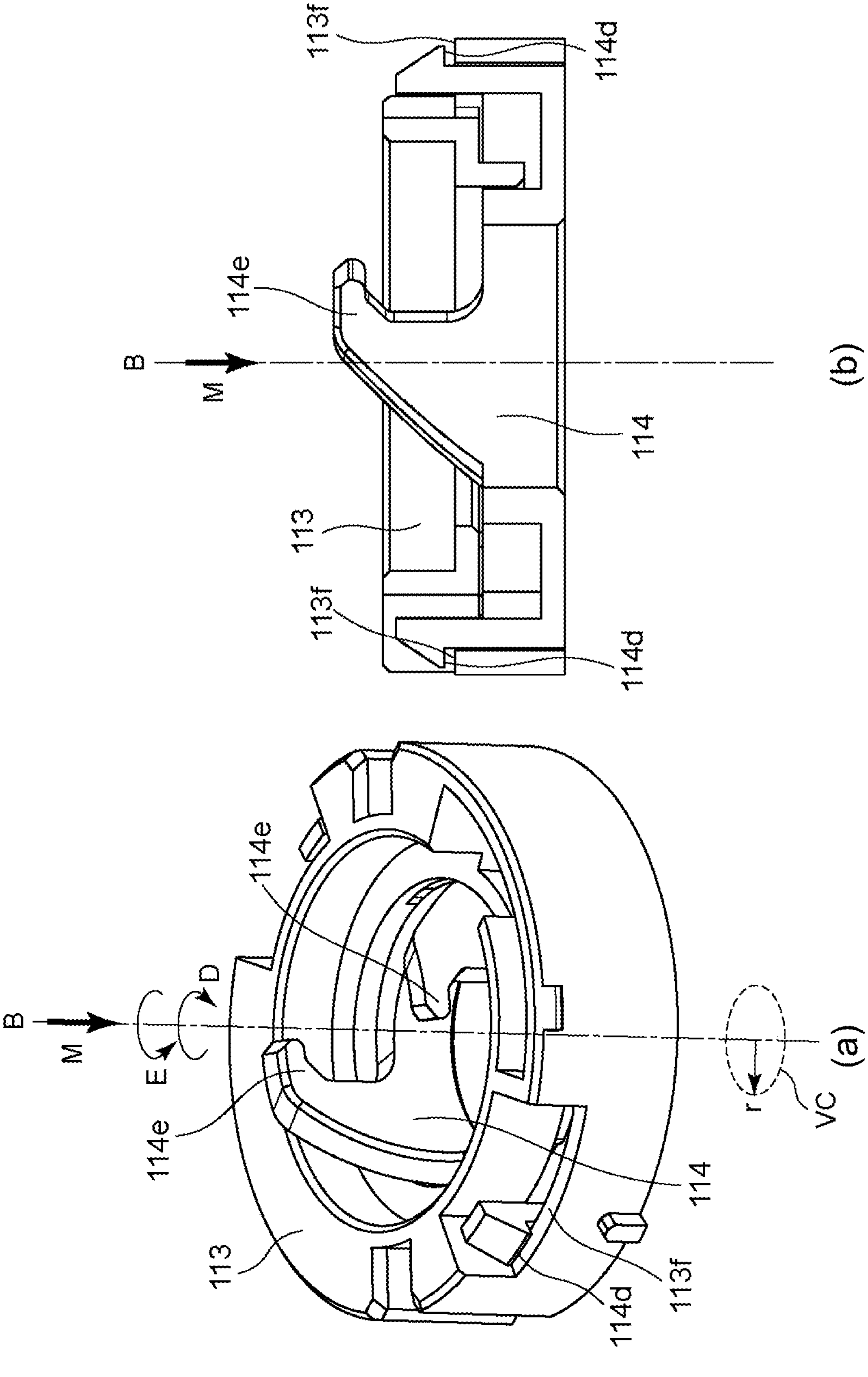
FIG. 13 is a perspective view and a front view of a unit in which the restriction member and the releasing member are assembled in Embodiment 1.
Figure 14:
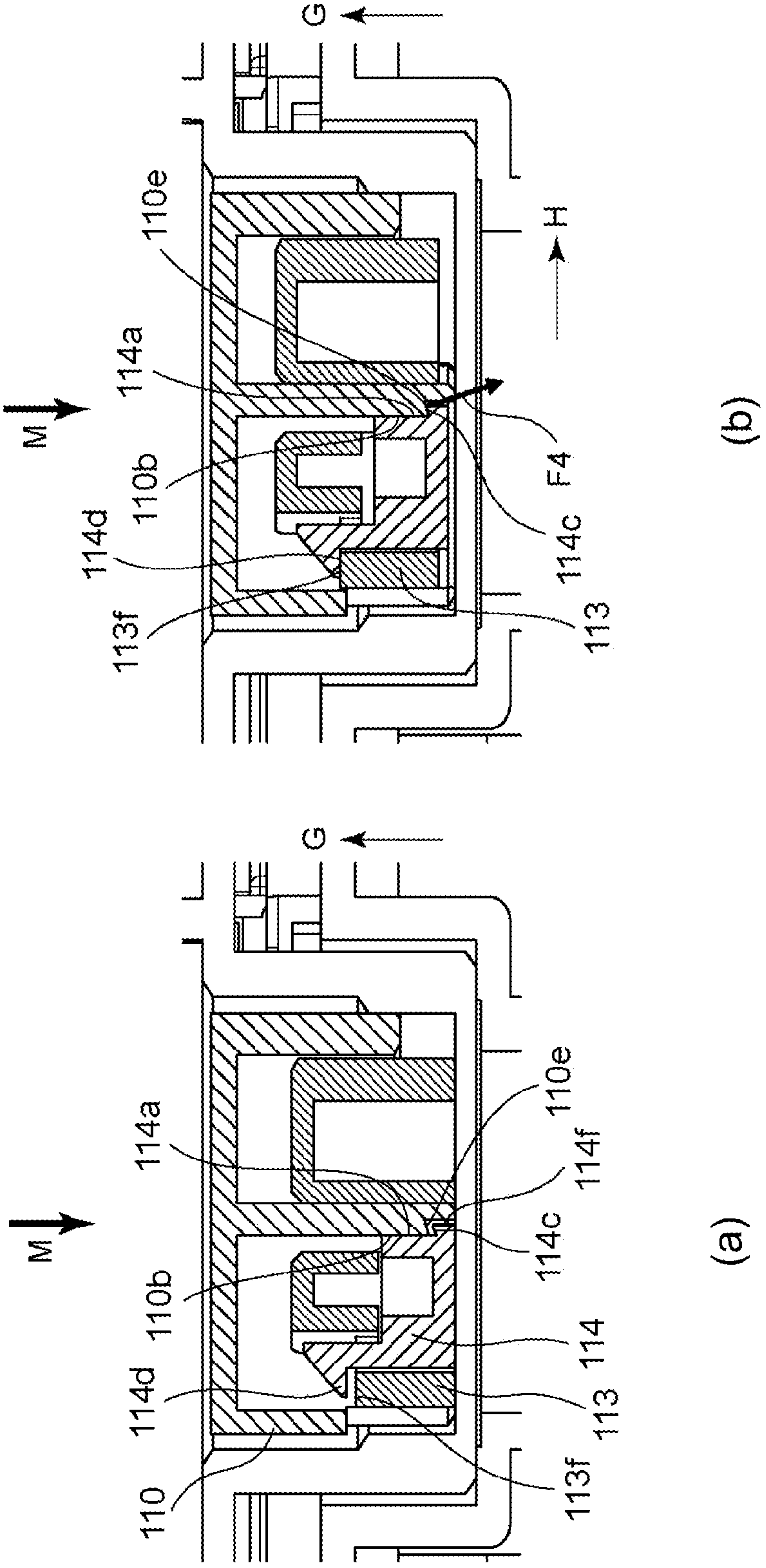
FIG. 14 is sectional views of the mounting portion in Embodiment 1.

Referring to FIGS. 9 to 15, the rotation restricting mechanism 112 will be described. In FIGS. 9, 10 and 14, the cut surfaces of the cover 110, the restricting member 113, and the releasing member 114 are shaded for better illustration.

It may happen that in a state where the toner pack 100 is not mounted on the mounting portion 106, the apparatus-side shutter 109 is unintentionally moved from the closed position to the open position due to an impact during transportation of the image forming apparatus 1 or due to an erroneous operation by the user with the consequence that it is rotated beyond a predetermined degree. In such a case, it may be difficult for the user to mount the toner pack 100 on the mounting portion 106 when using the image forming apparatus 1. Details on this point will be described hereinafter. Therefore, the image forming apparatus 1 of this embodiment is provided with a rotation restricting mechanism 112 in order to prevent the shutter 109 on the apparatus side from rotating from the closed position to the open position.

FIGS. 9 and 10 are sectional views of the mounting portion 106. Part (a) of FIG. 9 is a sectional view taken along a line parallel to the rotational axis B in a state in which the rotation of the apparatus-side shutter 109 from the closed position to the open position is restricted by the rotation restricting mechanism 112. Part (b) of FIG. 9 is a cross-sectional view taken along the line X1-X1 in part (a) of FIG. 9. Part (a) of FIG. 10 is a sectional view taken along a line parallel to the rotational axis B in a state in which the rotation restriction of the apparatus-side shutter 109 by the rotation restricting mechanism 112 is released. Part (b) of FIG. 10 is a cross-sectional view taken along the line X2-X2 of part (a) of FIG. 10. FIG. 10 shows, for convenience of the explanation, the state of the mounting portion 106 in which the rotation restriction of the apparatus-side shutter 109 is released in the state in the toner pack 100 is not mounted.

Figure 11:
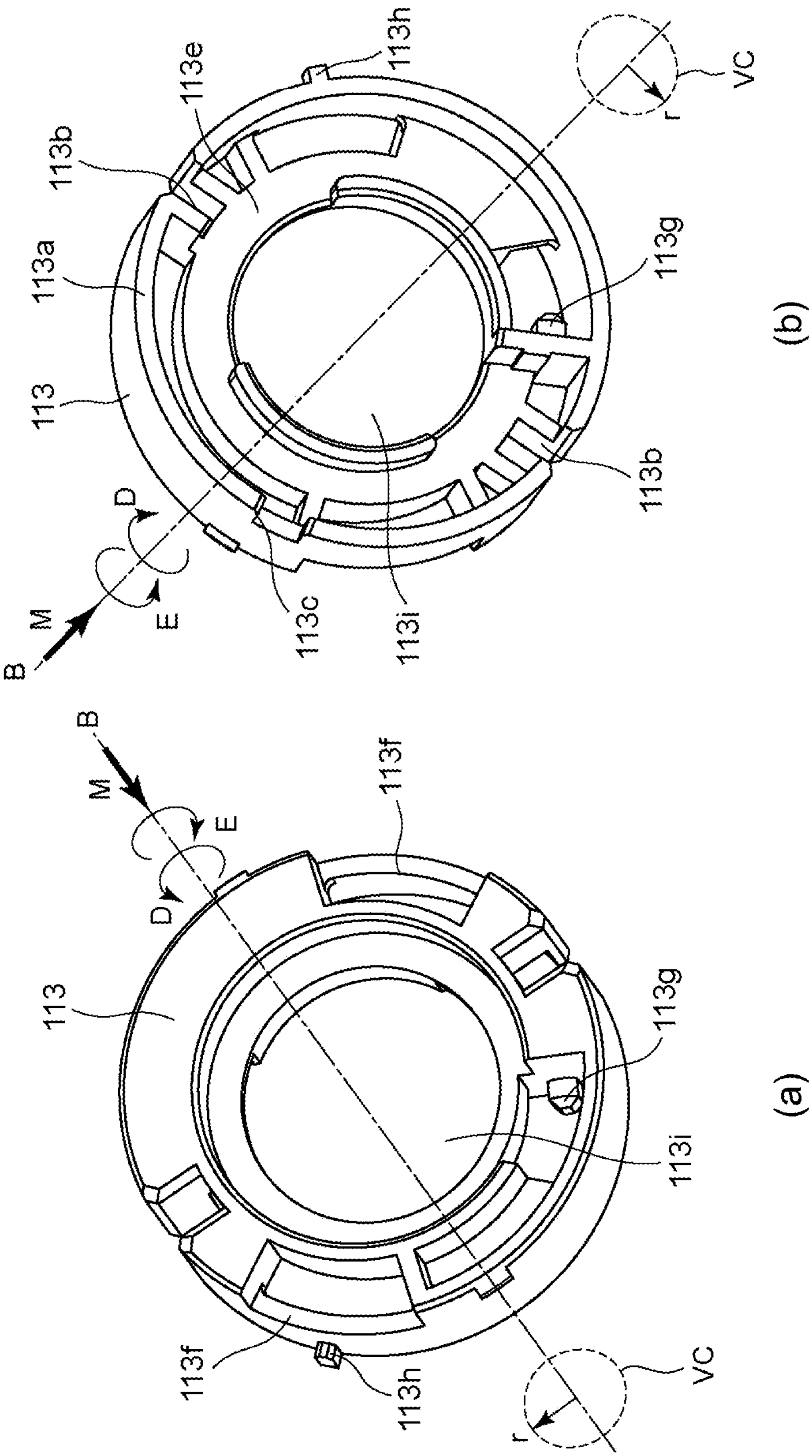
FIG. 11 is perspective views of a restriction member in Embodiment 1.

Further, part (a) of FIG. 11 is a perspective view of the restricting member 113 as viewed from the upstream side in the mounting direction M. Part (b) of FIG. 11 is a perspective view of the restricting member 113 as viewed from the downstream side in the mounting direction. Part (a) of FIG. 12 is a perspective view of the releasing member 114 as viewed from the upstream side in the mounting direction M. Part (b) of FIG. 12 is a perspective view of the releasing member 114 as viewed from the downstream side in the mounting direction M. Part (a) of FIG. 13 is a perspective view of a unit in which the restricting member 113 and the releasing member 114 are assembled. Part (b) of FIG. 13 is a sectional view, taken along a line parallel to the rotational axis B, of a unit in which the restricting member 113 and the releasing member 114 are assembled.

As shown in part (a) of FIG. 9, a restricting member 113, a releasing member 114, a restriction spring 115, and a release spring 116 are provided inside the apparatus-side shutter 109.

As shown in FIG. 11, the restricting member 113 is an annular member provided with a central hole 113*i* centered on the rotational axis B. The restricting member 113 includes a lower surface 113*a*, a pair of first contact surfaces 113*b*, a second contact surface 113*h*, a second restricting surface 113*c* (rotation restriction portion), contacted surfaces 113*e*, and a pair of locked surfaces 113*f*, and a spring engagement portion 113*g*. The first contact surface 113*b* and second contact surface 113*h* constituting a pair are downstream end surfaces in the rotational direction D of the apparatus-side shutter 109. The second restricting surface 113*c* is an end surface on the downstream side in the rotational direction E of the apparatus-side shutter 109. The locked surface 113*f* is an end surface (upper surface) on the upstream side in the mounting direction M. The lower surface 113*a* is an end surface on the downstream side in the mounting direction M. The spring engagement portion 113*g* is a projection projecting in the rotational direction E.

As shown in FIG. 12, the releasing member 114 (guided member) is provided with a pair of releasing claws 114*e* (engagement claws) extending upward, and is provided with a central hole 114*i* centered on the rotational axis B is provided. The releasing member 114 includes a pair of contact surfaces 114*a*, a contact surface 114*b*, a pair of rise restricted surfaces 114*c*, a pair of locking surfaces 114*d*, and a pair of releasing claws 114*e* (engaged portions), a pair of contact surfaces 114*f* and a spring engagement portion 114*g*. The pair of contact surfaces 114*a* are end surfaces on the downstream side in the rotational direction E of the apparatus-side shutter 109. The contact surface 114*b* is an end surface (upper surface) on the upstream side in the mounting direction M. The contact surface 114*f* is an end surface on the downstream side in the rotational direction E with respect to the contact surface 114*a*. The rise restricted surface 114*c* is a surface connecting the contact surface 114*a* and the contact surface 114*f*, and is an end (end surface facing upward) surface on the upstream side in the mounting direction M. The locking surface 114*d* is a surface (a surface facing downward) which projects from the outer peripheral surface of the releasing member 114 and faces in the mounting direction M.

As shown in FIG. 13, when the restricting member 113 and the releasing member 114 are assembled, the locked surface 113*f* of the restricting member 113 is directly below the locking surface 114*d* of the releasing member 114, and faces the locking surface 114*d*. In addition, the releasing claw 114*e* projects upward from the central hole centered on the rotational axis B of the restricting member 113 beyond the upper surface of the restricting member 113.

As shown in part (a) of FIG. 9 and part (b) of FIG. 9, the restricting member 113 and the releasing member 114 are rotatably supported by the large diameter portion **109*d*1 of the center boss 109*d* of the apparatus-side shutter 109. Further, the rotation restricting mechanism 112 is covered by the upper surface 110*i* of the cover 110. The center boss 109*d* is provided coaxially with the rotational axis B of the apparatus-side shutter 109. The restricting member 113 is urged in the direction of arrow C of the direction of the rotational axis B by the urging force F1 of the restricting spring 115 (second elastic member, second urging member), and the lower surface 113*a* thereof contacts the bottom surface 109*b* of the apparatus-side shutter 109. The position of the restriction member at this time is a restriction position. The arrow C direction is the mounting direction M of the toner pack 100. Further, as shown in part (b) of FIG. 9, a release spring 116 (first elastic member, first urging member) is provided between the restricting member 113 and the releasing member 114 in the rotational direction of the apparatus-side shutter 109. One end and the other end of the release spring 116 are engaged with the spring engagement portion 113*g* of the restricting member 113 and the spring engagement portion 114*g* of the releasing member 114, respectively. By the urging force F2 of the release spring 116, the restricting member 113 receives moment M1 in the rotational direction D, So that at least one of the pair of first contact surfaces 113*b* contacts the corresponding first contact surface 110*a* of the cover 110. The second contact surface 113*h* of the restricting member 113 contacts the contacted surface 110*j* (see FIG. 8) of the cover 110, so that the rotation in the rotational direction D is restricted. On the other hand, the releasing member 114 receives moment M2 in the rotational direction E by the urging force F3 of the release spring 116, so that at least one of the pair of contact surfaces 114*a* contacts the corresponding second contacted surface 110*b* of the cover 110**.

Here, the cover 110 is integrally fixed to the first frame 107. Therefore, as shown in part (b) of FIG. 9, the restricted rib **109*c* of the apparatus-side shutter 109 is between the first restriction surface 110*c* of the cover 110 and the second restricting surface 113*c* of the restricting member 113. Therefore, the rotation of the apparatus-side shutter 109 in the rotational direction D (direction from the closed position to the open position) is restricted by the second restricting surface 113*c* of the restricting member 113. The rotation of the apparatus-side shutter 109 in the rotational direction E (direction from the open position to the closed position) is restricted by the first restriction surface 110*c* of the cover 110**.

(Rotation Restriction Releasing Method)

A method of releasing the rotation restriction of the apparatus-side shutter 109 by the rotation restricting mechanism 112 will be described. The first step of rotating the releasing member 114 in the rotational direction D against the moment M2 by the release spring 116 from the state of part (b) of FIG. 9 is carried out, and then, the second step of moving the releasing member 114 is in an arrow G direction shown in part (a) of FIG. 9 is carried out. The first step and the second step are performed by mounting the toner pack 100 onto the mounting portion 106, which will be described after the structure of the toner pack 100 is described. Here, the description will be made using only the structure of the mounting portion 106.

In the second step, the contact surface **114*b* of the releasing member 114 is brought into abutment to the contacted surface 113*e* of the restricting member 113, and the releasing member 114 and the restricting member 113 are integrally moved in the direction of arrow G against the urging force F1 of the restriction spring 115. By executing the second step, the rotation restriction is released as shown in FIG. 10. The arrow G direction is the direction opposite to the mounting direction M of the toner pack 100**.

In the state where the rotation restriction is released, as shown in part (b) of FIG. 10, the second restricting surface **113*c* of the restricting member 113 retracts from the movement locus (rotation locus) of the restricted rib 109*c* of the apparatus-side shutter 109. The position of the restricting member 113 at this time is a restriction release position (release position). Then, the restricted rib 109*c* becomes movable between the first restriction surface 110*c* and the third restriction surface 110*d* of the cover 110. The distance between the first restriction surface 110*c* and the third restriction surface 110*d* is such that the apparatus-side shutter 109 can rotate and move between the closed position and the open position, and therefore, the rotation restriction of the apparatus-side shutter 109 is released. The apparatus-side shutter 109 becomes rotatable from the closed position to the open position in the rotational direction D about the rotational axis B. On the other hand, the rotation of the shutter 109 on the apparatus-side from the closed position in the direction opposite to the rotational direction D is restricted by the first restriction surface 110*c* of the cover 110. The amount of movement of the releasing member 114 in the arrow G direction (upward direction) suffices if it is not less than such an amount that the second restricting surface 113*c* of the restricting member 113 in during moving with the releasing member 114 does not overlap with the restricted rib 109*c* of the apparatus-side shutter 109**, in the direction of the rotational axis B.

Here, the description will be made as to the structure of the rotation restricting mechanism 112 by which the rotation restriction of the apparatus-side shutter 109 is not released when the rotation restricting mechanism 112 is carried out from the second step without carrying out the first step.

Part (a) of FIG. 14 is a sectional view taken along a line X3-X3 in part (b) of FIG. 9. Part (b) of FIG. 14 is a sectional view taken along the line X3-X3 when the restricting member 113 is moved in the direction of arrow G without rotating the releasing member 114 in the rotational direction D from the state of part (a) of FIG. 14.

As shown in part (a) of FIG. 14 and part (a) of FIG. 8, the cover 110 is provided with a rise restricting surface **110*e* (rising restricting section). As shown in part (a) of FIG. 14 and part (a) of FIG. 12, the releasing member 114 is provided with an rise restricted surface 114*c* (rising restricted portion). When the restricting member 113 moves in the direction of arrow G in a state in which the second contact surface 110*b* and the contact surface 114*a* are in contact with each other as shown in part (b) of FIG. 9, the locked surface 113*f* of the restricting member 113 is brought into abutment to the locking surface 114*d* of the releasing member 114. The same structure is provided on the opposite side with respect to the rotational axis B as the center, and therefore, the restricting member 113 and the releasing member 114 are integrally moved in the direction of arrow G (upward). As a result, as shown in part (b) of FIG. 14, the rise restricted surface 114*c* of the releasing member 114 abuts on the rise restricting surface 110*e* of the cover 110 so that the movement thereof in the G direction is restricted, by which the movement, in the arrow G direction, of the restricting member 113 integrally moving with the releasing member 114 is restricted. At this time, the restricted rib 109*c*** of the apparatus-side shutter 109 is maintained in a rotation restricted state by the first restriction surface 110*c* and the second restricting surface 113*c* as shown in part (b) of FIG. 9. The position (region), in the rotational direction about the rotational axis B, of the releasing member 114 at this time is the rise restriction position (rise restriction region). That is, the rise restricting position is the position (region) of the releasing member 114 at the time when the rise restricted surface 114*c* of the releasing member 114 overlaps with the rise restricting surface 110*e* of the cover 110 as viewed in the direction of the rotational axis B.

The first step is a step of rotating the releasing member 114 in the rotational direction D against the urging force of the release spring 116 to the rise restriction release position (rise restriction release region) in which the rise restricted surface 114*c* of the releasing member 114 does not abut to the rise restricting surface 110*e* of the cover 110.

Figure 15:
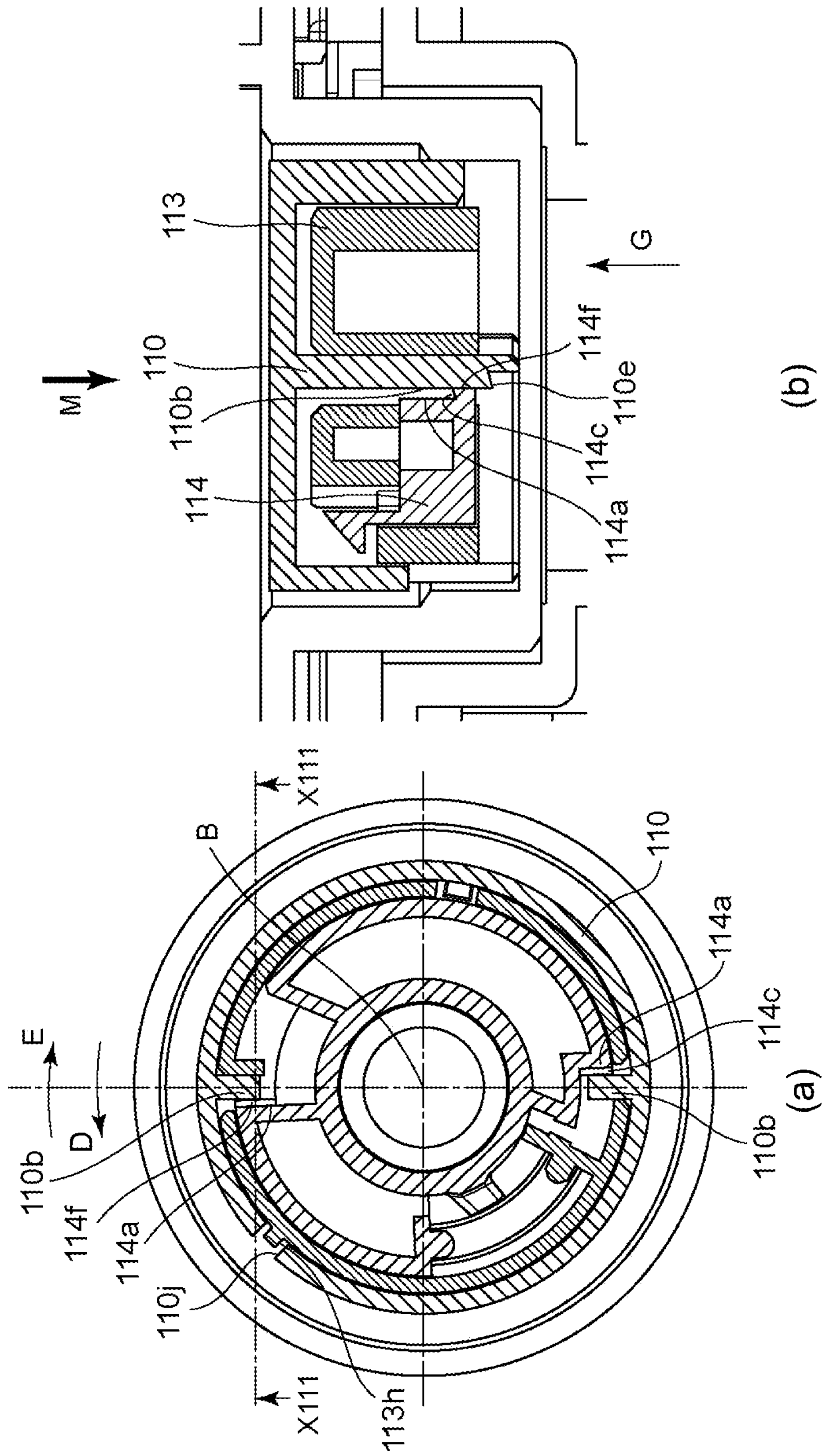
FIG. 15 is sectional views of the mounting portion in Embodiment 1.

Part (a) of FIG. 15 is a cross-section taken along a line X22-X22 of part (a) of FIG. 10. Part (a) of FIG. 15 is an illustration showing a state in which the second step is performed after the first step. The second step of this embodiment includes the operation in which the releasing member 114 is rotated in the rotational direction E until at least one of the pair of contact surfaces 114*f* of the releasing member 114 abuts to the corresponding one of the pair of second contacted surfaces 110*b* of the cover 110. Part (b) of FIG. 15 is a cross-section taken along a line X111-X111 of part (a) of FIG. 15.

As shown in part (a) of FIG. 15, as viewed in the direction of the rotational axis B, the rise restricted surface 114*c* of the releasing member 114 and the rise restricting surface 110*e* of the cover 110 do not overlap with each other. Therefore, as shown in part (b) of FIG. 15, the restricting member 113 can move integrally with the releasing member 114 in the direction of arrow G, the position of the releasing member 114 in the rotational direction about the rotational axis B is the rise restriction release position. That is, as viewed in the direction of the rotational axis B, the rise restriction release position is the position of the releasing member 114 when the rise restricted surface 114*c* of the releasing member 114 does not overlap with the rise restricting surface 110*e* of the cover 110. The amount of rotation of the releasing member 114 in the rotational direction D in the first step suffices if the rise restricted surface 114*c* of the releasing member 114 does not overlap with the rise restricting surface 110*e* of the cover 110 as viewed in the direction of the rotational axis B.

The method of releasing the rotation restriction of the shutter 109 on the apparatus-side is a first step and a second step after the first step. The first step is a step of rotating the releasing member 114 from the rise restriction position to the rise restriction release position in the rotational direction D. The second step is a step of moving the releasing member upward together with the restricting member 113 so that the restricting member 113 moves from the restriction position to the restriction release position while the releasing member 114 is in the rise restriction release position. The second step may or may not include an operation of rotating the releasing member 114 in the rotational direction E until the contact surface 114*f* of the releasing member 114 abuts to the second contacted surface 110*b* of the cover 110.

(Toner Pack)

Figure 16:
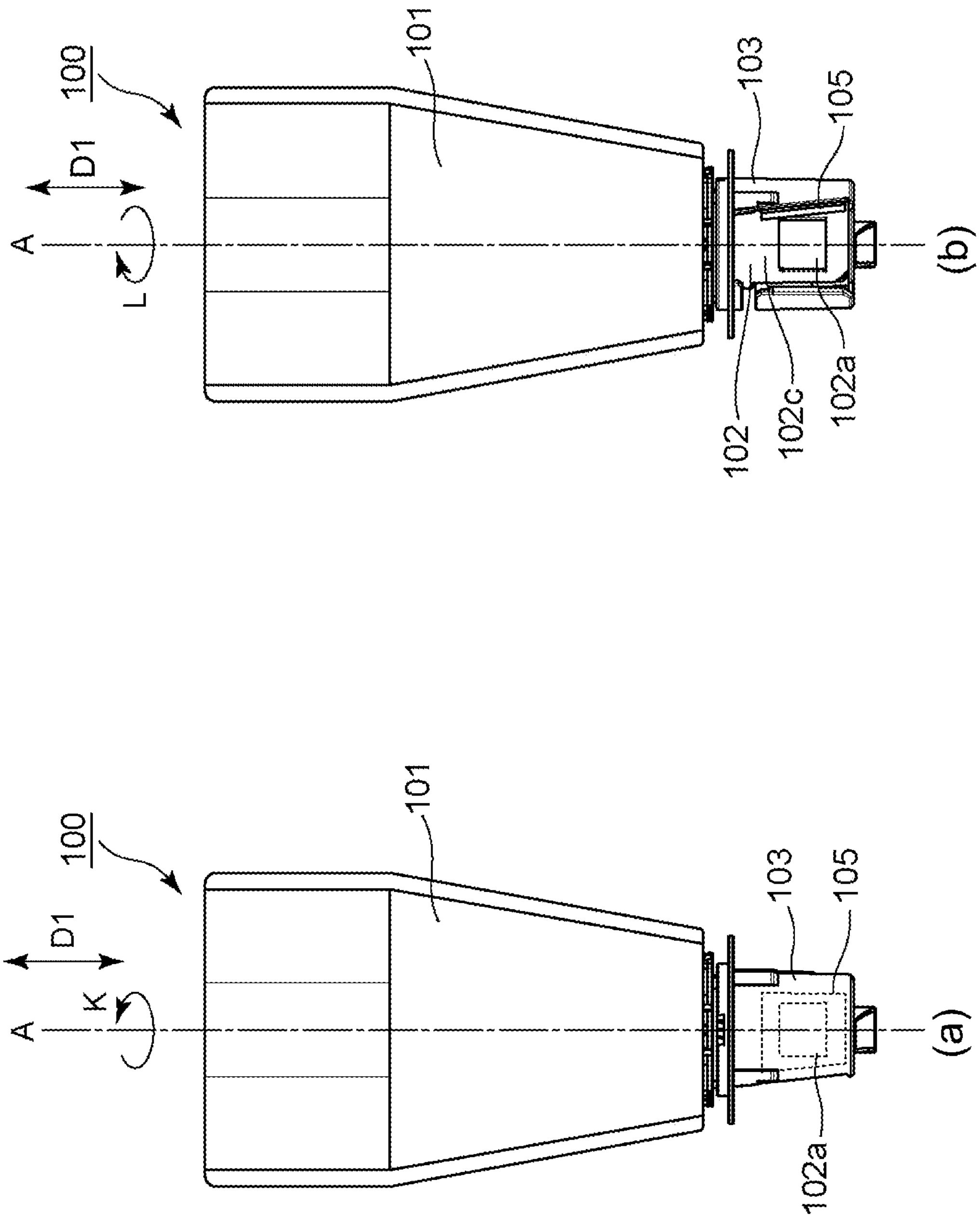
FIG. 16 is front views of a toner pack according to Embodiment 1.
Figure 17:
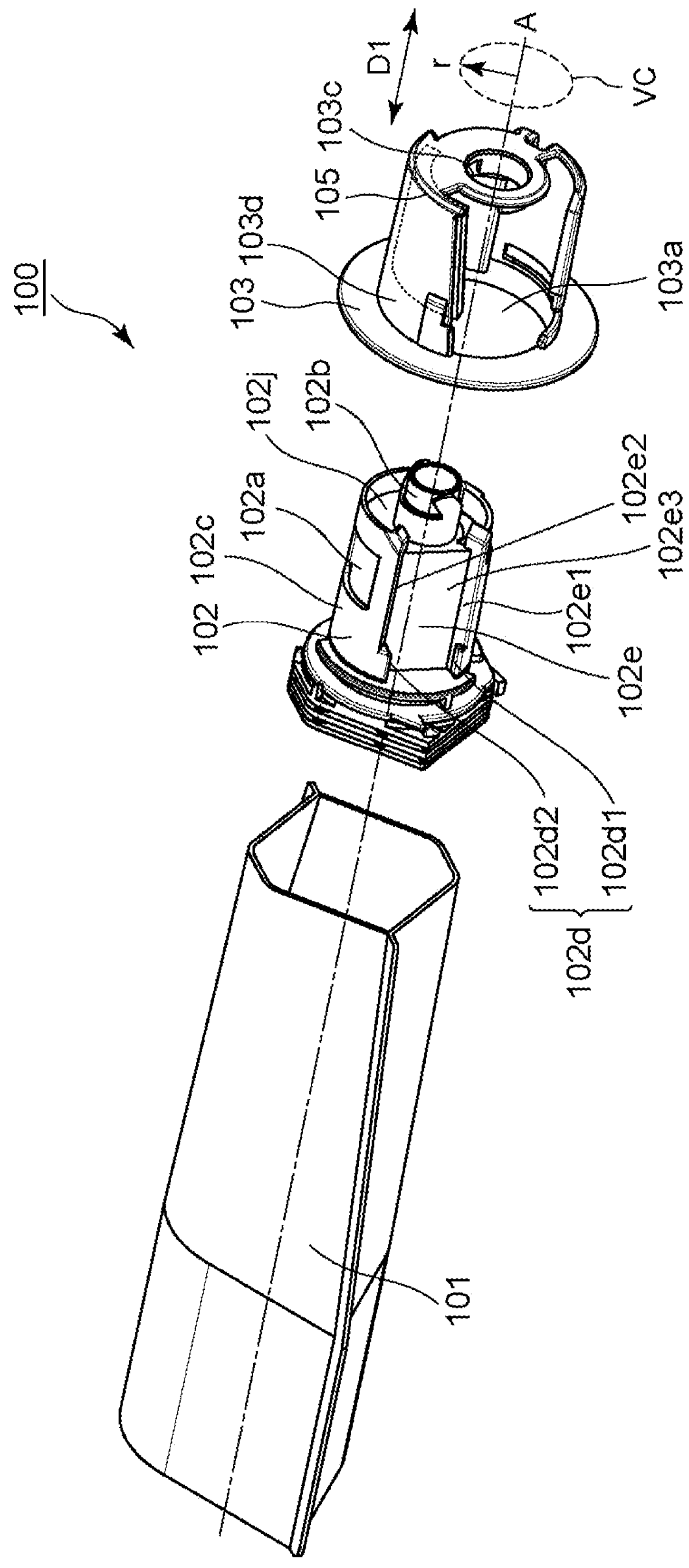
FIG. 17 is an exploded perspective view of the toner pack according to Embodiment 1.

Referring to FIGS. 16 and 17, the basic structure of the toner pack 100 will be described. Part (a) of FIG. 16 is a front view of the toner pack 100 when the pack side shutter 103 is in the closed position. Part (b) of FIG. 16 is a front view of the toner pack 100 when the pack side shutter 103 is in the open position. FIG. 17 is an exploded perspective view of the toner pack 100.

The toner pack 100 includes an accommodating portion 101 (first accommodating portion) for accommodating toner, a nozzle 102 (nozzle portion, pipe, tube, valve, discharging portion), and a pack-side shutter 103 (container shutter, rotatable member). As shown in FIG. 16, the accommodating portion 101 is provided on the side of the first end portion in the first direction D1, and the nozzle 102 and the pack side shutter 103 are provided on the side of the second end portion opposite from the first end portion in the first direction. The accommodating portion 101 is a pouch formed by pouch processing from a flexible polypropylene sheet. The accommodating portion 101 is not limited to the pouch, and may be a resin bottle or a container made of paper or vinyl resin material.

On the side surface 102*c* (first outer surface) of the nozzle 102 extending along the first direction D1, there is provided a discharge opening 102*a* (nozzle opening, first opening) structured to be in fluid communication with an inside of the accommodating portion 101. The toner stored in the accommodating portion 101 is discharged to the outside of the toner pack 100 through the discharge opening 102*a*. The nozzle 102 may be integrally structured with the accommodating portion 101. In addition, a seal may be provided between the accommodating portion 101 and the discharge opening 102*a* of the nozzle 102, so that the accommodating portion 101 and the discharge opening 102*a* may be brought into fluid communication with each other when the seal is removed.

A pack-side shutter 103 (rotatable member) is provided on the outside of the side surface 102*c* of the nozzle 102. The pack-side shutter 103 is mounted so as to be rotatable around a rotational axis A (first rotational axis) extending in a direction along the first direction D1, and as shown in FIG. 17, it is provided with an opening 103*a* (rotatable member opening, first shutter). The pack-side shutter 103 is provided outside the side surface 102*c* in the radial direction r of the imaginary circle VC centered on the rotational axis A. The side surface 102*c* of the nozzle 102 is a curved surface which is convex toward the outside in the radial direction r of the imaginary circle VC centered on the rotational axis A. The inner surface of the pack-side shutter 103 (the surface facing the side surface 102*c*) is a curved surface along the side surface 102*c* of the nozzle 102, and a substantially rectangular pack-side seal 105 is mounted thereto. The side surface 102*c* of the nozzle 102 is also a surface extending along the rotational axis A.

As shown in FIG. 16, the pack-side shutter 103 is structured to be rotatable around a rotational axis A between a closed position in which the pack-side seal 105 closes the discharge opening 102*a* of the nozzle 102 and an open position in which the discharge opening 102*a* is opened. When the pack-side shutter 103 is in the open position, the discharge opening 102*a* of the nozzle 102 is exposed through the opening 103*a*.

Part (a) of FIG. 16 and part (b) of FIG. 16 show a state in which the pack-side shutter 103 is in the closed position and the open position, respectively. As shown in part (a) of FIG. 16, when the pack-side shutter 103 in the closed position is rotated in an arrow K direction (first rotational direction) about the rotational axis A, the pack side shutter 103 becomes in the open position shown in part (b) of FIG. 16. Conversely, when the pack-side shutter 103 is rotated from the open position in an arrow L direction (second rotational direction), it becomes in the closed position. In the rotational operation of the pack-side shutter 103, the pack-side shutter 103 rubs against the side surface 102*c* of the nozzle 102 by way of the pack-side seal 105.

Referring to FIGS. 18 to 21, the detailed structure of the nozzle 102 and the pack-side shutter 103 will be described. An arrow N indicates the direction from the accommodating portion 101 toward the nozzle 102, and an arrow U direction is opposite thereto. The arrow N direction and the arrow U direction are parallel to the rotational axis A.

Figure 18:
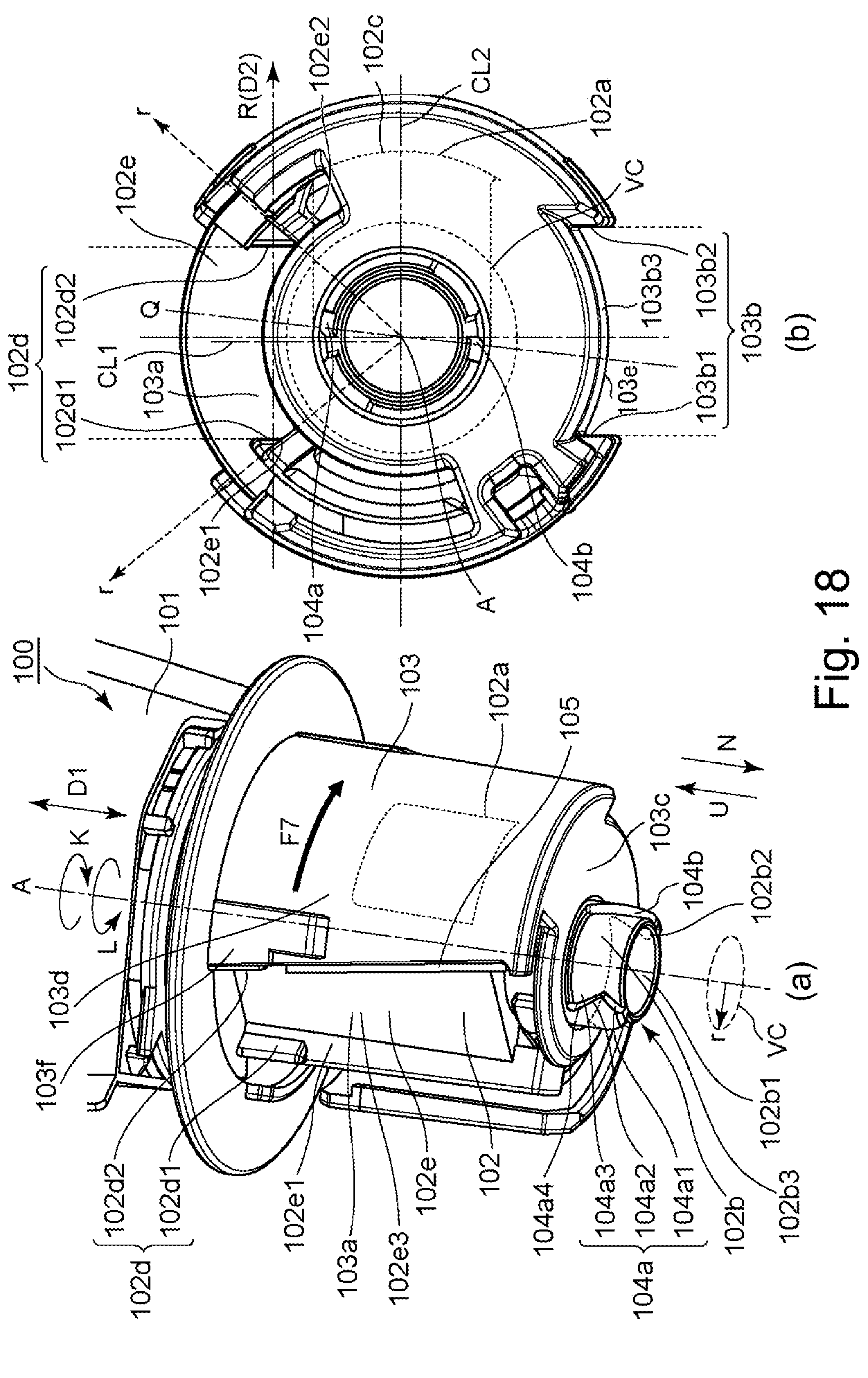
FIG. 18 is a perspective view and a bottom view of a neighborhood of a nozzle in Embodiment 1 (when the shutter on the pack side is closed).
Figure 19:
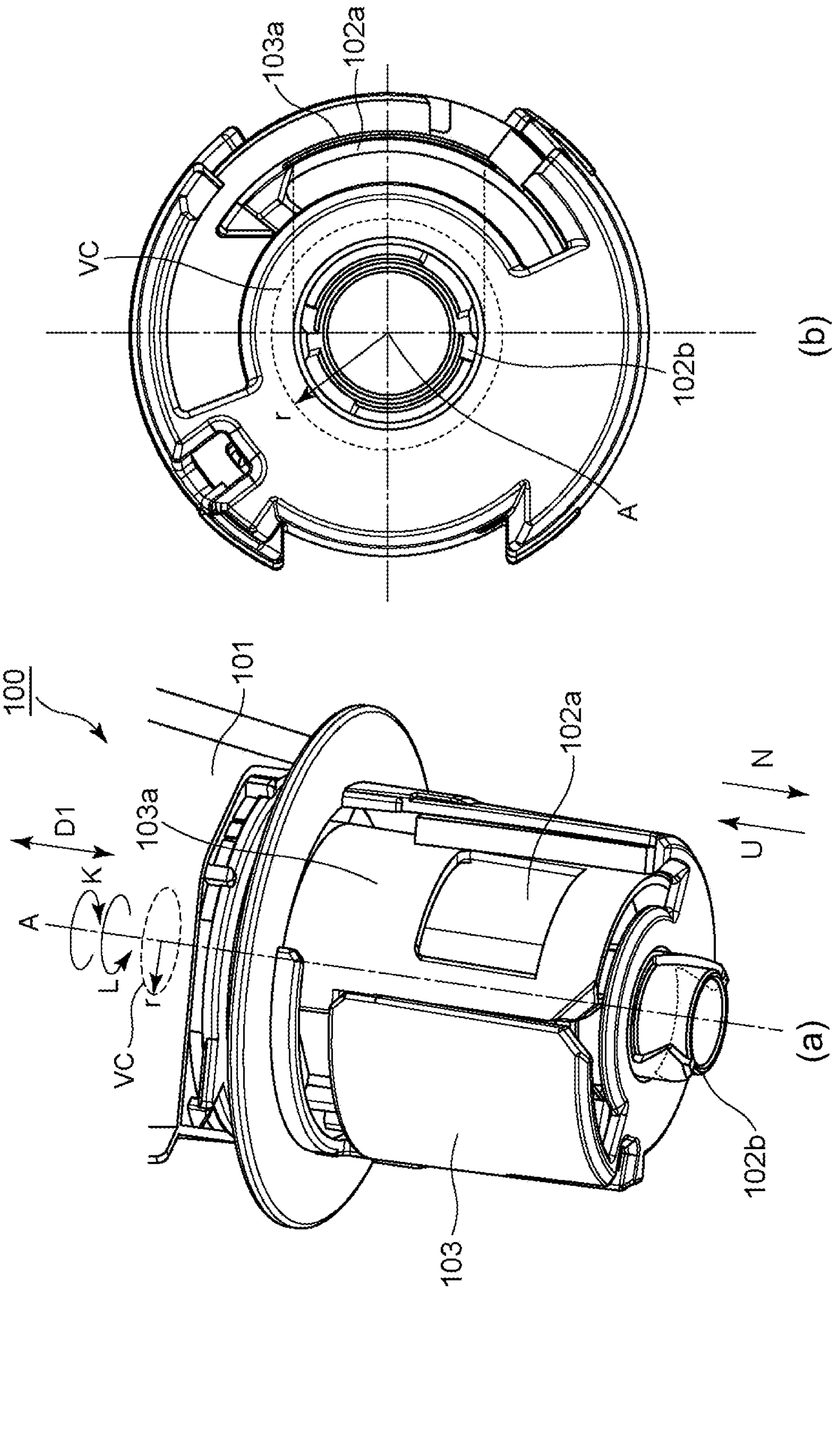
FIG. 19 is a perspective view and a bottom view of the neighborhood of the nozzle according to Embodiment 1 (when the shutter on the pack side is opened).
Figure 20:
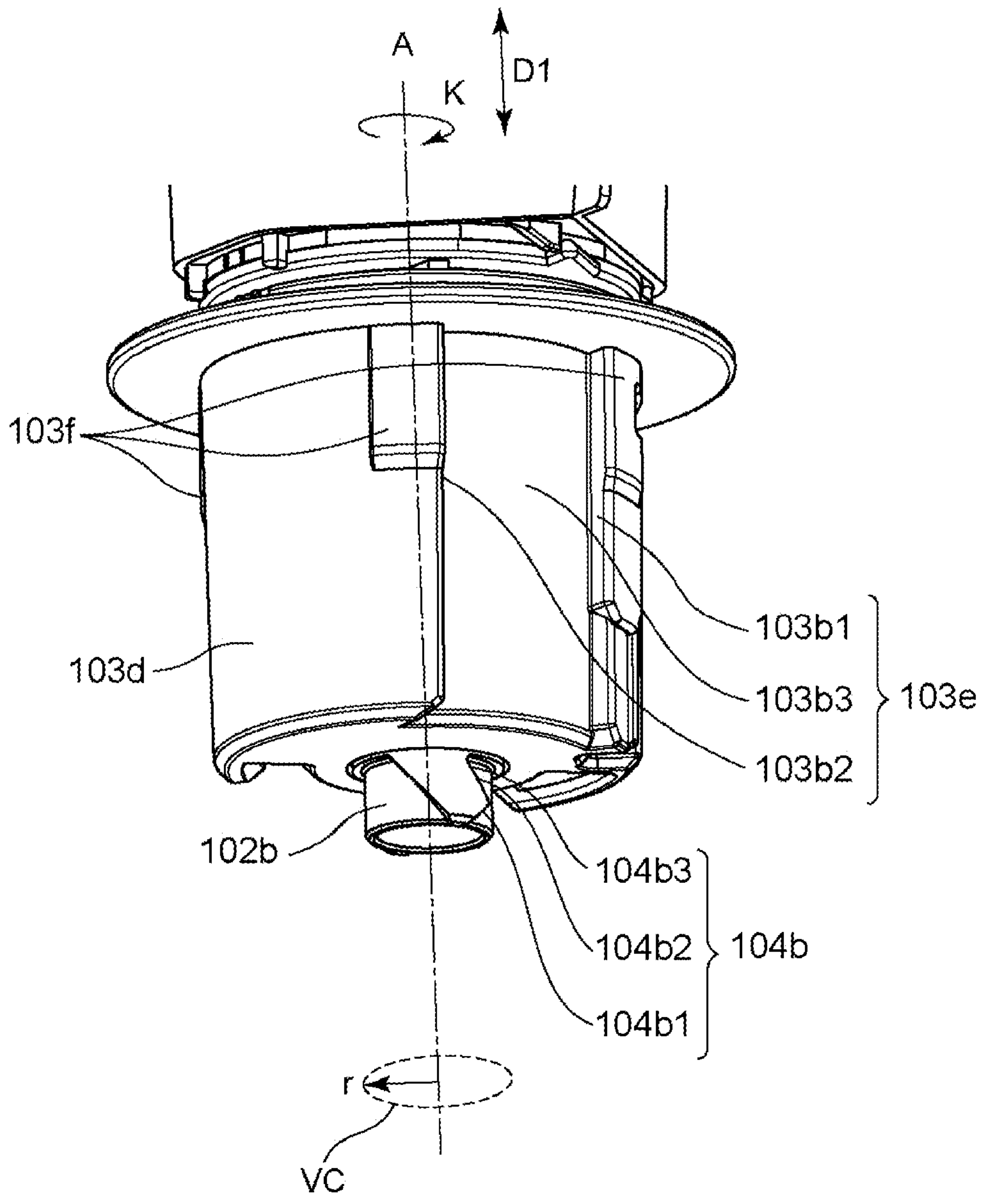
FIG. 20 is a rear perspective view of the neighborhood of the nozzle in Embodiment 1.
Figure 21:
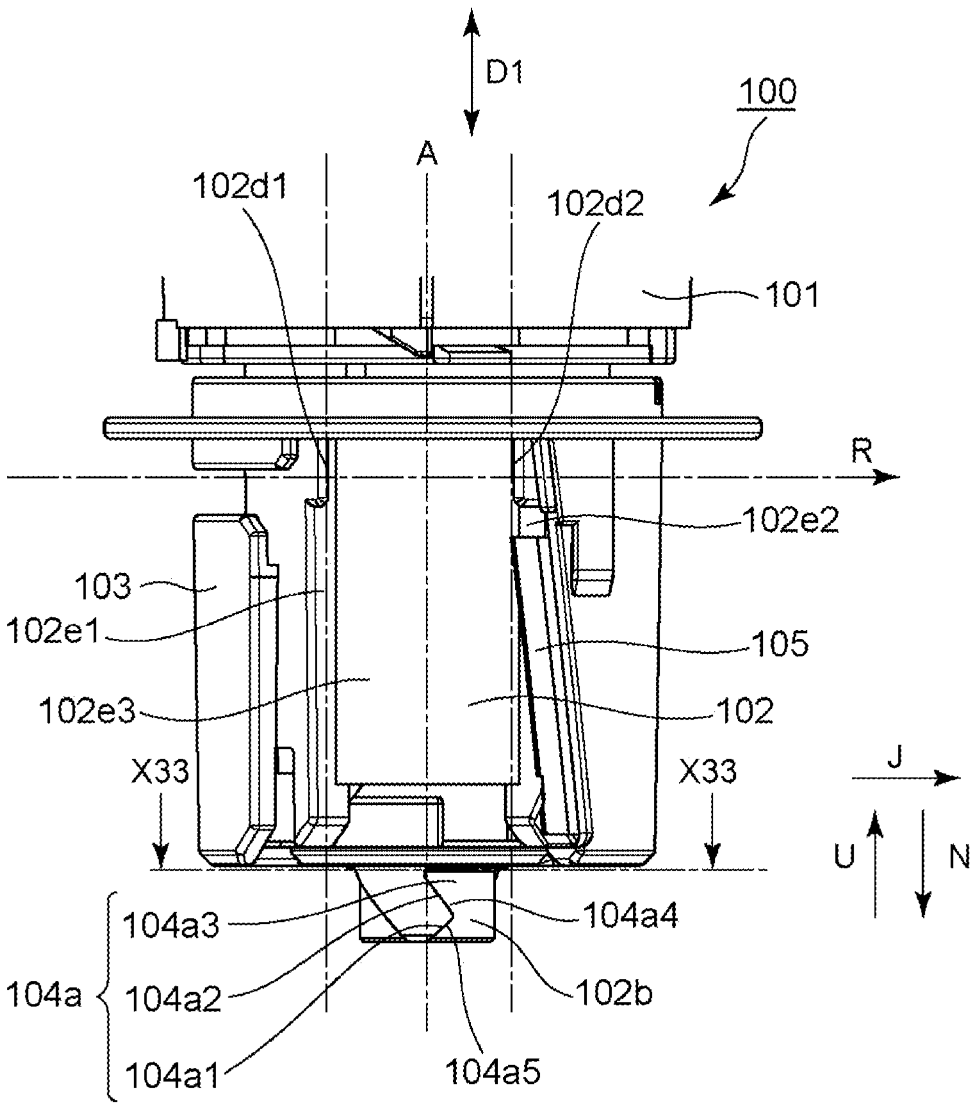
FIG. 21 is a front view of the neighborhood of the nozzle in Embodiment 1.

Part (a) of FIG. 18 is an enlarged view of the neighborhood of the nozzle 102 when the pack-side shutter 103 is in the closed position. Part (b) of FIG. 18 is a view of the toner pack 100 as viewed in the direction of arrow U in part (a) of FIG. 18. Part (a) of FIG. 19 is an enlarged view of the neighborhood of the nozzle 102 when the pack-side shutter 103 is in the open position. Part (b) of FIG. 19 is a side view of the toner pack 100 as viewed in the direction of arrow U in part (a) of FIG. 19. FIG. 20 is a view of the neighborhood of the nozzle 102 as viewed from the side opposite to the side from which FIG. 18 views. FIG. 21 is a view of the neighborhood of the nozzle 102 as viewed in a direction parallel to the surfaces 102*d*1 and 102*d*2 of the nozzle 102 (direction perpendicular to the rotational axis A).

As shown in part (a) of FIG. 18 and part (b) of FIG. 18, the nozzles 102 is provided with a positioned portion 102*d* having a surface 102*d*1 (first nozzle surface, first facing surface) and a surface 102*d*2 (second nozzle surface, second facing surface) which are arranged in an arrow R direction (second direction D2) so as to face each other with a space therebetween and which extend in a direction perpendicular to the R direction. As shown in part (b) of FIG. 18, the surfaces 102*d*1 and 102*d*2 in this embodiment extend in a direction perpendicular to the arrow R direction and are parallel to each other. That is, the arrow R direction is a normal direction to the surfaces 102*d*1 and 102*d*2. The positioned portion 102*d* engages with the positioning portion 107*a* (part (a) of FIG. 3 of the first frame 107 when the toner pack 100 is mounted on the mounting portion 106. By this, the position of the nozzle 102 in the direction of the arrow R relative to the first frame 107 (base frame 2) is determined. By this, the position of the nozzle 102 in the rotational direction about the rotational axis A relative to the first frame 107 is also determined. In part (b) of FIG. 18, a straight line CL1 (first imaginary straight line) which passes through the center of the surface 102*d*1 and the surface 102*d*2 in the R direction and which extends in the direction perpendicular to the arrow R direction is in a phase rotated by about 90° relative to CL2 (second imaginary straight line) which passes through the center of the rotational axis A and the discharge opening 102*a*. That is, the straight line CL1 and the straight line CL2 are perpendicular to each other.

Further, as shown in FIGS. 18 and 21, the direction of the rotational axis A, the surface 102*d*1 and the surface 102*d*2 are provided with surfaces 102*e*1 and 102*e*2 on downstream sides in a N direction, respectively. As shown in part (b) of FIG. 18, the surfaces 102*e*1 and 102*e*2 extend in the radial direction r of the imaginary circle VC centered on the rotational axis A.

In FIG. 21, a side surface 102*e*3 (second outer surface) is provided between the surfaces 102*d*1 and 102*d*2 and between the surfaces 102*e*1 and 102*e*2 in the direction of arrow R. The side surface 102*e*3 is recessed inward in the radial direction r with respect to the side surface 102*c*. The surface 102*d*1, the surface 102*d*2, the side surface 102*e*3, the surface 102*e*1, the surface 102*e*2 and the side surface 102*e*3 form a recess 102*e* (nozzle recess).

The surface 102*d*1 and the surface 102*d*2 do not necessarily have to be parallel as in this embodiment. The surface 102*d*1 and the surface 102*d*2 may extend in the radial direction r of the imaginary circle VC centered on the rotational axis A.

Further, as shown in FIG. 18, when viewed in a direction perpendicular to the direction of the rotational axis A (first direction D1), the side surface 103*d* (the outer surface of the first rotation member) of the pack side shutter 103 is provided with an opening 103*a* (rotatable member opening). In part (a) of FIG. 18, when the pack-side shutter 103 is in the closed position, at least a part of the recess 102*e* of the nozzle 102 is exposed through the opening 103*a*. By doing so, when the toner pack 100 is mounted on the mounting portion 106 with the pack-side shutter 103 closed, the recesses 102*e* (surfaces 102*d*1 and 102*d*2) are engaged with the positioning portion 107*a*.

Further, as shown in part (b) of FIG. 18, as viewed in the direction of the rotational axis A (first direction D), when the pack side shutter 103 is in the closed position a driven transmission portion 103*e* (rotatable member recess) is provided on the opposite side across the rotational axis A from the recess 102*e* of the nozzle 102 (opening 103*a* of the pack-side shutter 103). Both the surface 103*b*1 and the surface 103*b*2 of the driven transmission portion 103*e* extend in a direction perpendicular to the arrow R direction. FIG. 20 is an enlarged perspective view of the neighborhood of the pack-side shutter 103 as viewed from the side where the driven transmission portion 103*e* is provided. Between the surfaces 103*b*1 and 103*b*2, there is a side surface 103*b*3 (outer surface of the second rotatable member) recessed inward in the radial direction r beyond the side surface 103*d*. The driven transmission portion 103*e* comprises the surface 103*b*1, the surface 103*b*2, and the side surface 103*b*3.

When the pack-side shutter 103 is rotated in the arrow K direction from the closed position shown in FIG. 18, the pack-side shutter 103 takes an open position, and the discharge opening 102*a* of the nozzle 102 is exposed through the opening 103*a* of the pack-side shutter 103 as shown in FIG. 19.

Further, as shown in FIGS. 18 and 20, the pack-side shutter 103 is provided with a radial positioning portion 103*f* projecting outward in the radial direction r beyond the side surface 103*d*. The radial positioning portion 103*f* is provided on the upstream side of the pack side shutter 103 in the N direction of the direction of the rotational axis A. The radial positioning portion 103*f* is provided at each of three locations at intervals in the rotational direction of the pack-side shutter 103 (circumferential direction of the imaginary circle VC). The structure is such that when the toner pack 100 is mounted on the mounting portion 106, the radial positioning portion 103*f* of the pack-side shutter 10 abuts on the inner peripheral surface 109*h* of the apparatus-side shutter 109 so that the position of the toner pack 100 in the radial direction r is determined.

The nozzle 102 in this embodiment is a component provided with a passage through which the toner passes and a discharge opening 102*a* for discharging the toner through the nozzle 102. A cross-sectional area of the passage of the nozzle 102 through which the toner passes may be smaller, larger, or even as goes toward the discharge opening 102*a*. The cross-sectional area and length of the passage of the nozzle 102 may be appropriately changed depending on the toner discharging property and the like, and therefore, they are not limited. In addition, the discharge opening 102*a* of the nozzle 102 does not have to be the most downstream opening from which the toner is discharged from the toner pack 100. The toner discharged from the discharge opening 102*a* of the nozzle 102 may be discharged to the outside of the toner pack 100 after passing through a passage of a member different from the nozzle 102.

The pack-side shutter 103 may be a rotatable member including a driven transmission portion 103*e* and always opening the discharge opening 102*a* of the nozzle 102 regardless of the rotation position. In such a case, the structure may be such that the discharge opening 102*a* of the nozzle 102 is closed by a seal when the toner pack 100 is not mounted to the mounting portion 106, and the seal is removed by the mounting operation to the mounting portion 106 or after the mounting of the toner pack 100. Furthermore, the toner pack 100 may not be provided with a pack side shutter 103.

(Restriction Releasing Portion of Toner Pack)

Referring to FIGS. 16 to 21, the restriction releasing portion 104 will be described. As shown in FIG. 16, the toner pack 100 is oriented so that the side of the second end portion (the side of the nozzle 102) of the toner pack 100 is below the side of the first end portion (the side of the toner accommodating portion). Or, the toner pack 100 is oriented so that at least a part of the nozzle 102 is below the accommodating portion 101 and the rotational axis A is in the vertical direction. This attitude is an attitude for mounting on the mounting portion 106 of the image forming apparatus 1. At this time, in part (a) of FIG. 18 and part (a) of FIG. 19, the arrow N direction is downward and the arrow U direction is upward.

The nozzle 102 is provided with a projecting portion 102*b* (projecting portion, engaging portion) which projects (projects) in the arrow N direction (downward) beyond the end surface 103*c* of the pack side shutter 103 in the arrow N direction. As shown in part (a) of FIG. 18, the projecting portion 102*b* is a cylindrical portion (a portion including a cylindrical shape) centered on the rotational axis A. The projecting portion 102*b* has a projecting portion end surface 102*b*2 which is a lower end surface. The projecting portion end surface 102*b*2 is provided with a hole defined by an inner peripheral surface 102*b*1 (inner peripheral guide surface) centered on the rotational axis A. The projecting portion 102*b* projects downward beyond the end surface 103*c* of the pack-side shutter 103 provided below the discharge opening 102*a*. Further, as shown in FIG. 17, the projecting portion 102*b* projects downward beyond a lower end surface 102*j* of the nozzle 102. In this embodiment, the end surface 103*c* of the pack-side shutter 103 and the end surface 102*j* of the nozzle 102 are end surfaces perpendicular to the rotational axis A, but are not limited to such a structure. These surfaces may be any surface extending in a direction crossing the rotational axis A as viewed in a direction perpendicular to the rotational axis A.

The outer peripheral surface 102*b*3 of the projecting portion 102*b* is provided with a restriction releasing portion 104 including a first restriction releasing portion 104*a* (first projection) and a second restriction releasing portion 104*b* (second projection). The first restriction releasing portion 104*a* and the second restriction releasing portion 104*b* have a symmetric shape with respect to the rotational axis A. That is, as shown in FIG. 20, the second restriction releasing portion 104*b* is on the opposite side of the first restriction releasing portion 104*a* with respect to the rotational axis A in the direction perpendicular to the rotational axis A. In other words, the second restriction releasing portion 104*b* has a shape which is rotationally 180-degree symmetric with respect to the rotational axis A of the first restriction releasing portion 104*a*.

The first restriction releasing portion 104*a* includes a first slope 104*a*1 (first engaging surface, downward surface, downward guide surface, downward force applying surface, downward push surface) and a second slope 104*a*2 (second engaging surface upward surface, upward guide surface). The first slope 104*a*1 is below the second slope 104*a*2 and overlaps with the second slope 104*a*2 as viewed in the direction of the rotational axis A. As shown in part (a) of FIG. 18, the first slope 104*a*1 is a surface which extends so as to go in the arrow U direction (upward) as goes in the rotational direction K (predetermined rotational direction, first rotational direction, first circumferential direction of the imaginary circle VC) about the rotational axis A and which faces in the arrow N direction (downward).

On the other hand, the second slope 104*a*2 is a surface extending so as to go in the arrow N direction (downward) as goes in the rotational direction K about the rotational axis A, and is a surface facing the arrow U direction (upward). In other words, the second slope 104*a*2 is a surface extending so as to go in the arrow U direction as goes in the rotational direction L (second rotational direction, the second circumferential direction of the imaginary circle VC) about the rotational axis A and facing in the arrow U direction. A cavity 104*a*3 is provided above (directly above) the second slope 104*a*2.

The downstream end of the first slope 104*a*1 and the downstream end of the second slope 104*a*2 in the rotational direction K are continuous with each other. That is, the downstream end of the first slope 104*a*1 and the downstream end of the second slope 104*a*2 in the rotational direction K are at the same position in the rotational direction D. In other words, the downstream end of the first slope 104*a*1 and the downstream end of the second slope 104*a*2 are in overlapping positions as viewed in the direction of the rotational axis A.

In other words, there is a connecting portion which connects the downstream end of the first slope 104*a*1 in the rotational direction K and an upstream end of the second slope 104*a*2 in the rotational direction L.

As shown in FIG. 21, as viewed in a direction perpendicular to the rotational axis A (first direction D1), the first slope 104*a*1 extends so as to go up (arrow U direction) as goes in an arrow J direction (predetermined direction) perpendicular to the rotational axis A. The second slope 104*a*2 extends so as to go down (arrow N direction) as goes in the direction of arrow J (predetermined direction) perpendicular to the axis of rotation A.

The ridge line 104*a*5 of the first slope 104*a*1 also extends such that it goes in the direction of the arrow U as goes in the direction of the arrow J perpendicular to the rotational axis A. The ridge line 104*a*4 of the second slope 104*a*2 also extends such that it goes in the direction of the arrow N as goes in the direction of the arrow J perpendicular to the rotational axis A. The ridge line described here is a boundary line between surfaces. The ridge line 104*a*5 is a boundary line between the first slope 104*a*1 and the outer peripheral surface of the first restriction releasing portion 104*a*. The ridge line 104*a*4 is a boundary line between the second slope 104*a*2 and the outer peripheral surface of the first restriction releasing portion 104*a*.

As shown in FIG. 20, the second restriction releasing portion 104*b* has a first slope 104*b*1 (downward surface) and a second slope 104*b*2 (upward surface). A cavity 104*b*3 is provided above the second slope 104*b*2. The first slope 104*b*1, the second slope 104*b*2, and the cavity 104*b*3 have the same structures as the first slope 104*a*1, the second slope

104*a*2, and the cavity 104*a*3 of the first restriction releasing portion 104*a*, respectively, and therefore, the description thereof will be omitted.

Figure 22:
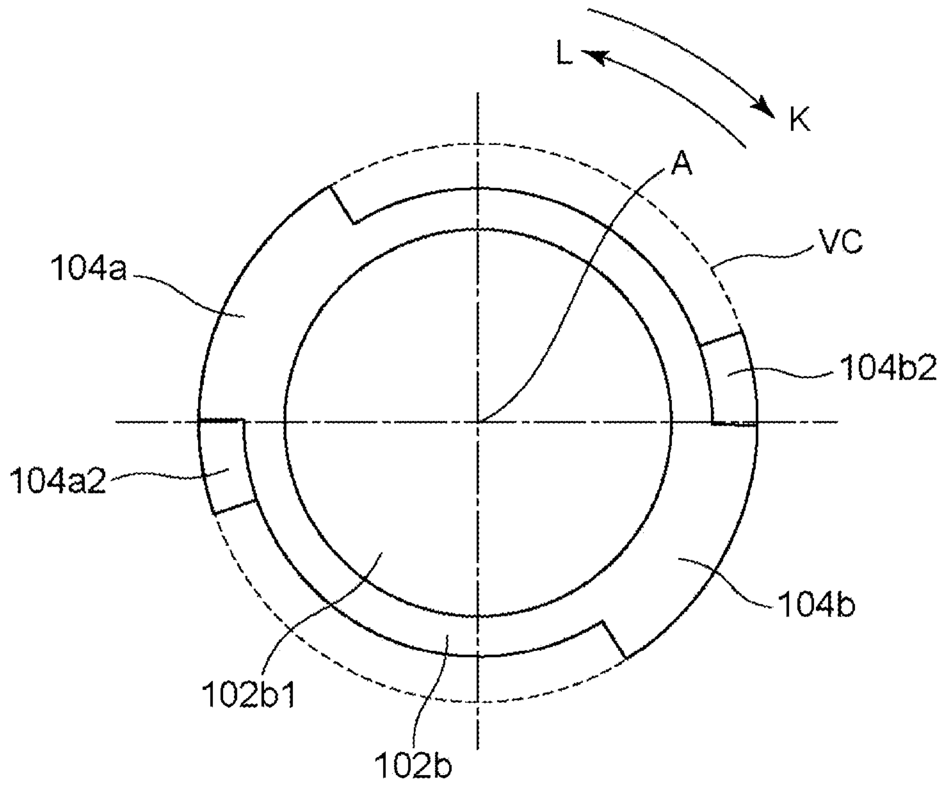
FIG. 22 is a cross-section of a projecting portion of the nozzle in Embodiment 1.

FIG. 22 is a cross-sectional view of the projecting portion 102*b* taken along a line X33-X33 in FIG. 21. FIG. 22 shows the second slope 104*a*2 of the first restriction releasing portion 104*a* and the second slope 104*b*2 of the second restriction releasing portion 104*b* as viewed from above. In FIG. 22, it is understood that both the second slope 104*a*2 and the second slope 104*b*2 extend along the rotational direction of the pack-side shutter 103 (the circumferential direction of the imaginary circle VC centered on the rotational axis A).

Further, as shown in FIG. 21, the arrow J direction is parallel to the arrow R direction (second direction) which is the normal direction of the surface 102*d*1 and the surface 102*d*2. And, in part (b) of FIG. 18, a straight line Q passing through the first restriction releasing portion 104*a* and the second restriction releasing portion 104*b* extends in the direction crossing the arrow R direction.

As shown in FIG. 21, in the direction of arrow R, the positions of the first restriction releasing portion 104*a* and the second restriction releasing portion 104*b* are between the position of the surface 102*d*1 and the position of the surface 102*d*2 of the positioned portion 102*d*. That is, as viewed in the direction perpendicular to the rotational axis A (arrow R direction), the positions of the first slope 104*a*1 and the second slope 104*a*2 are both between the position of the surface 102*d*1 and the position of the surface 102*d*2 in the direction of the arrow R. Viewed in the direction perpendicular to the rotational axis A (arrow R direction), the positions of the first restriction releasing portion 104*a* and the second restriction releasing portion 104*b* overlap with the positions of the recess 102*e* in the arrow R direction.

It is desirable that the inclination angles of the first slope 104*a*1 and the second slope 104*a*2 with respect to the rotational axis A are in the range of 45°±15°. In addition, in this embodiment, a length of the first slope 104*a*1 in the direction of the rotational axis A is about 2 mm, a length of the second slope 104*a*2 is about 3 mm, and a length of the second slope 104*a*2 is larger than that of the first slope 104*a*1.

The first slope 104*a*1, the second slope 104*a*2, and the cavity 104*a*3 are exposed to the outside of the toner pack 100 so that the rotation restricting mechanism 112 of the mounting portion 106 can be accessed. Further, the projecting portion 102*b* does not necessarily have to be provided on the nozzle 102.

(Mounting Toner Pack to Mounting Portion)

Referring to FIGS. 23 to 29, a mechanism for releasing the rotation restriction of the apparatus-side shutter 109 by the rotation restricting mechanism 112 described in the foregoing by mounting the toner pack 100 on the mounting portion 106 will be described.

Figure 23:
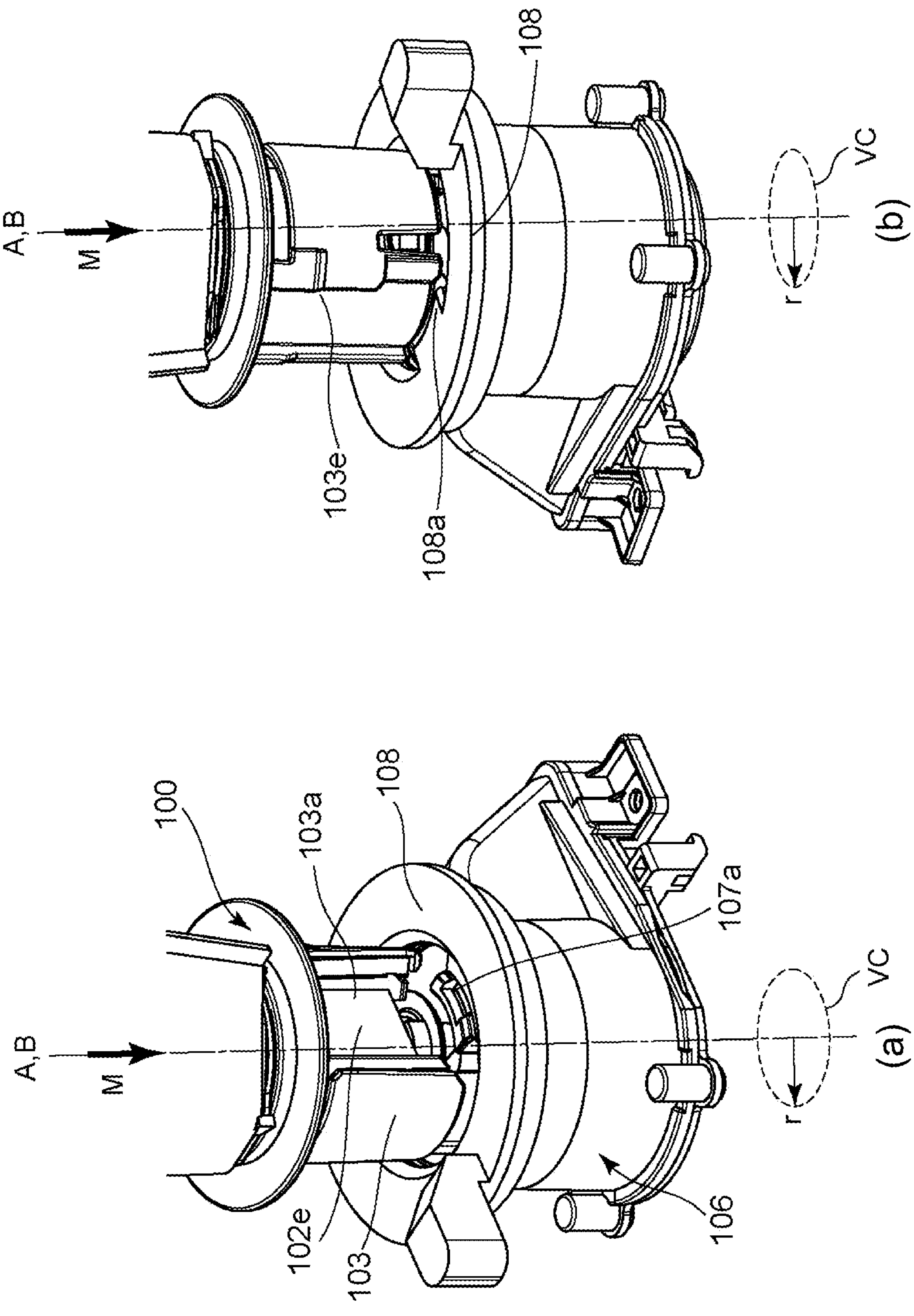
FIG. 23 is perspective views of the mounting portion and the toner pack in a state during mounting operation in Embodiment 1.
Figure 24:
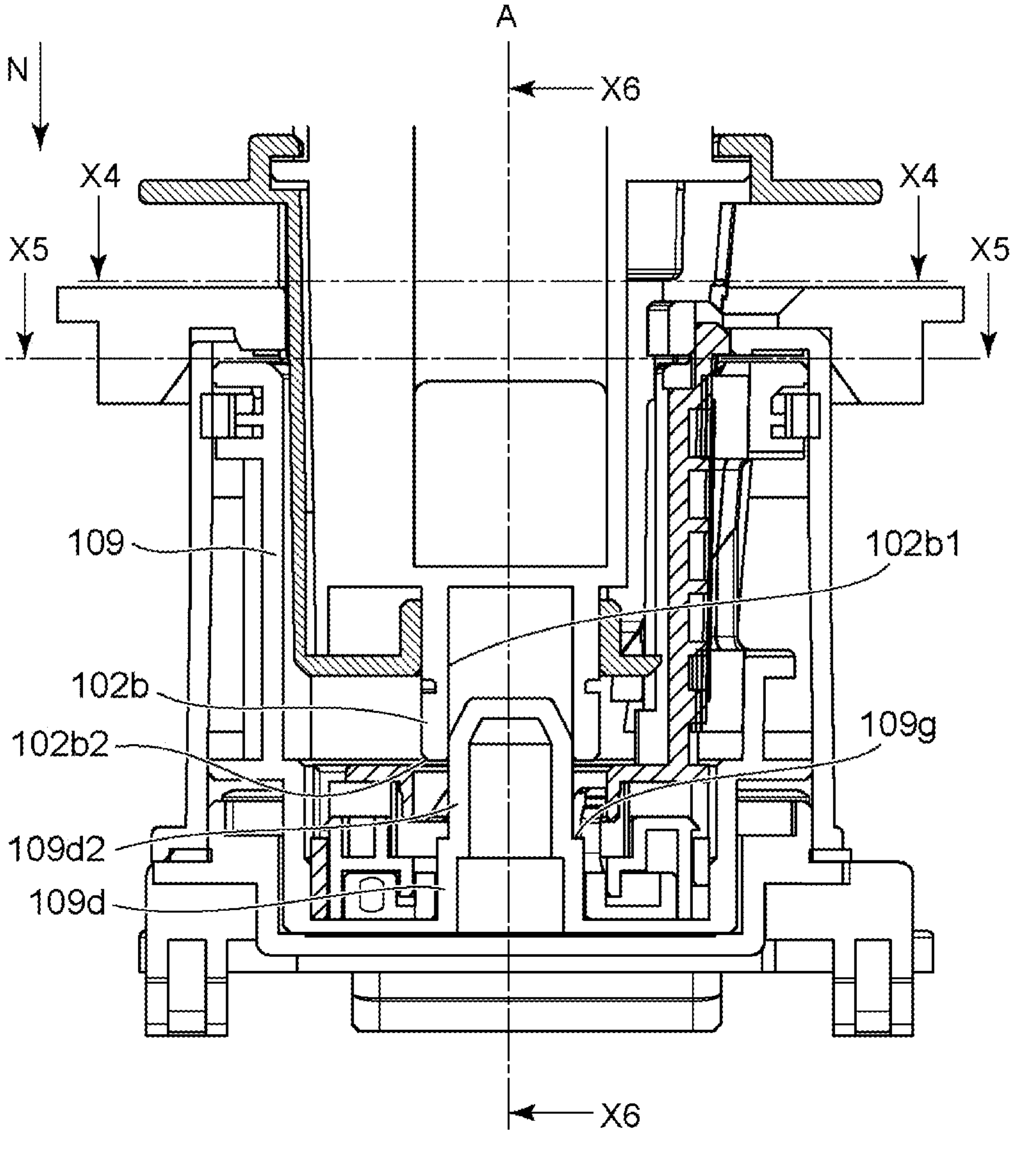
FIG. 24 is a sectional view of the mounting portion and the toner pack in a state during mounting in Embodiment 1.
Figure 25:
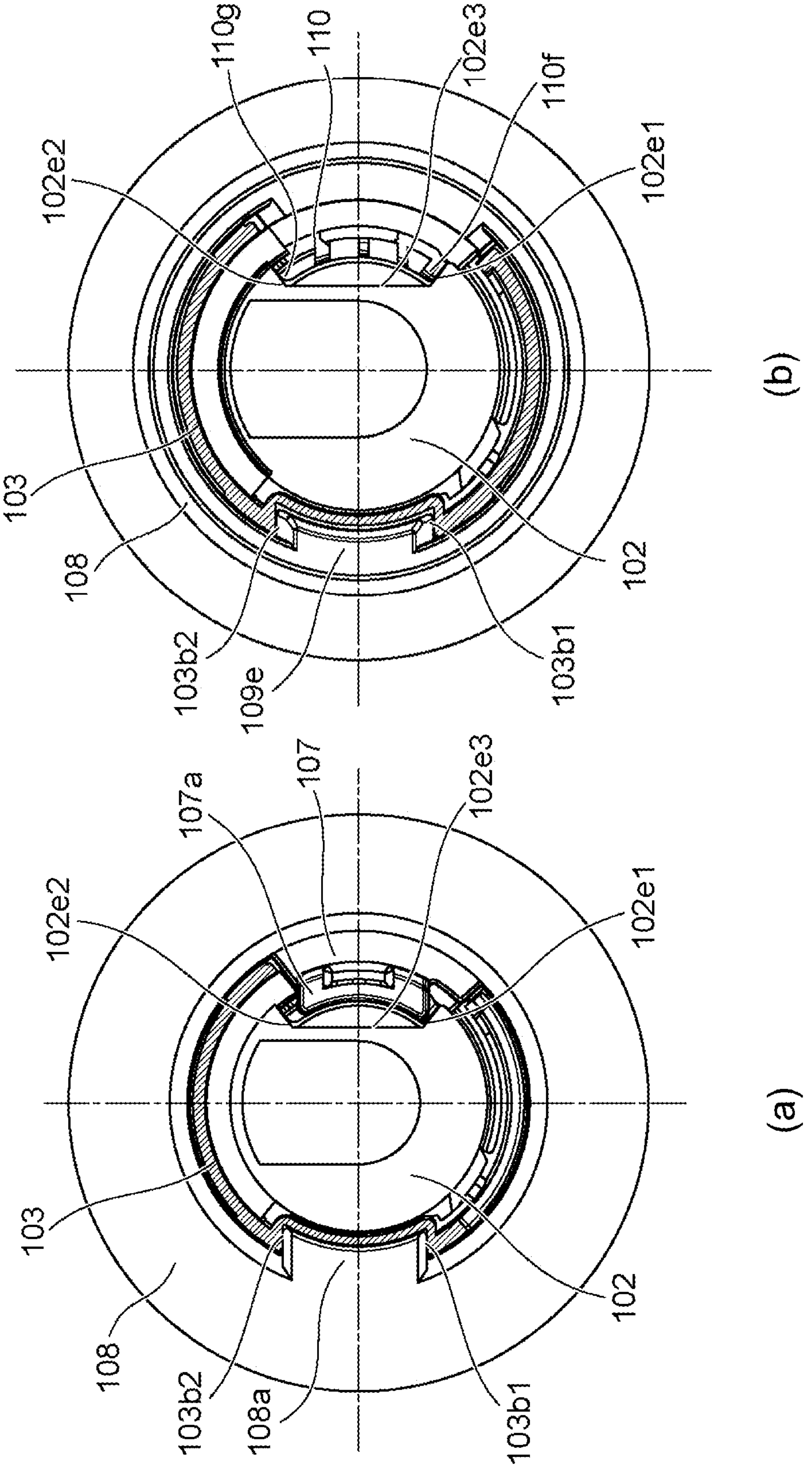
FIG. 25 is cross-sectional views of the mounting portion and the toner pack in a state during mounting in Embodiment 1.
Figure 26:
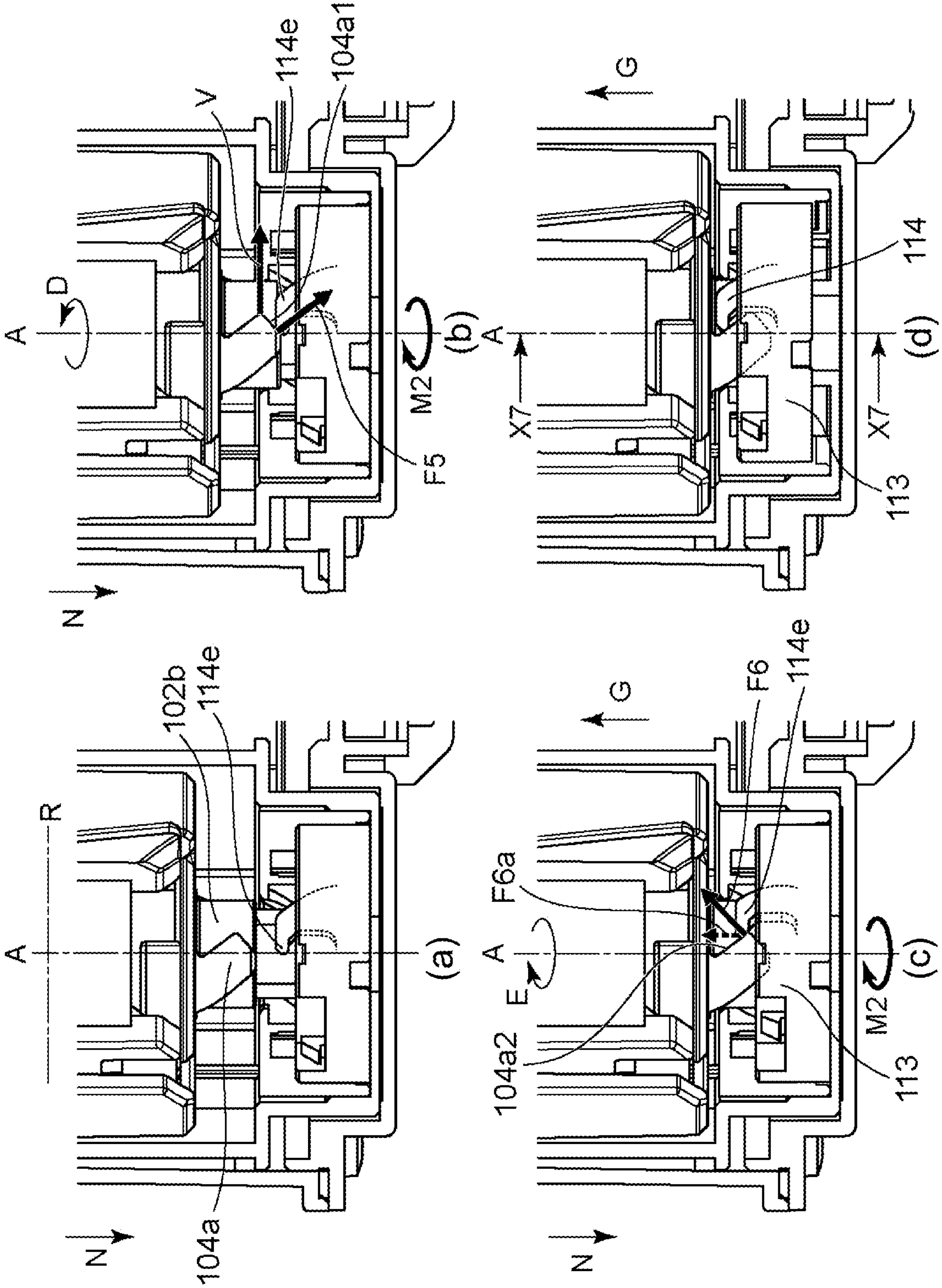
FIG. 26 is an illustration of a process in which the rotation restriction of the shutter on the apparatus-side by the rotation restriction mechanism of the mounting portion is released by mounting the toner pack in Embodiment 1.
Figure 27:
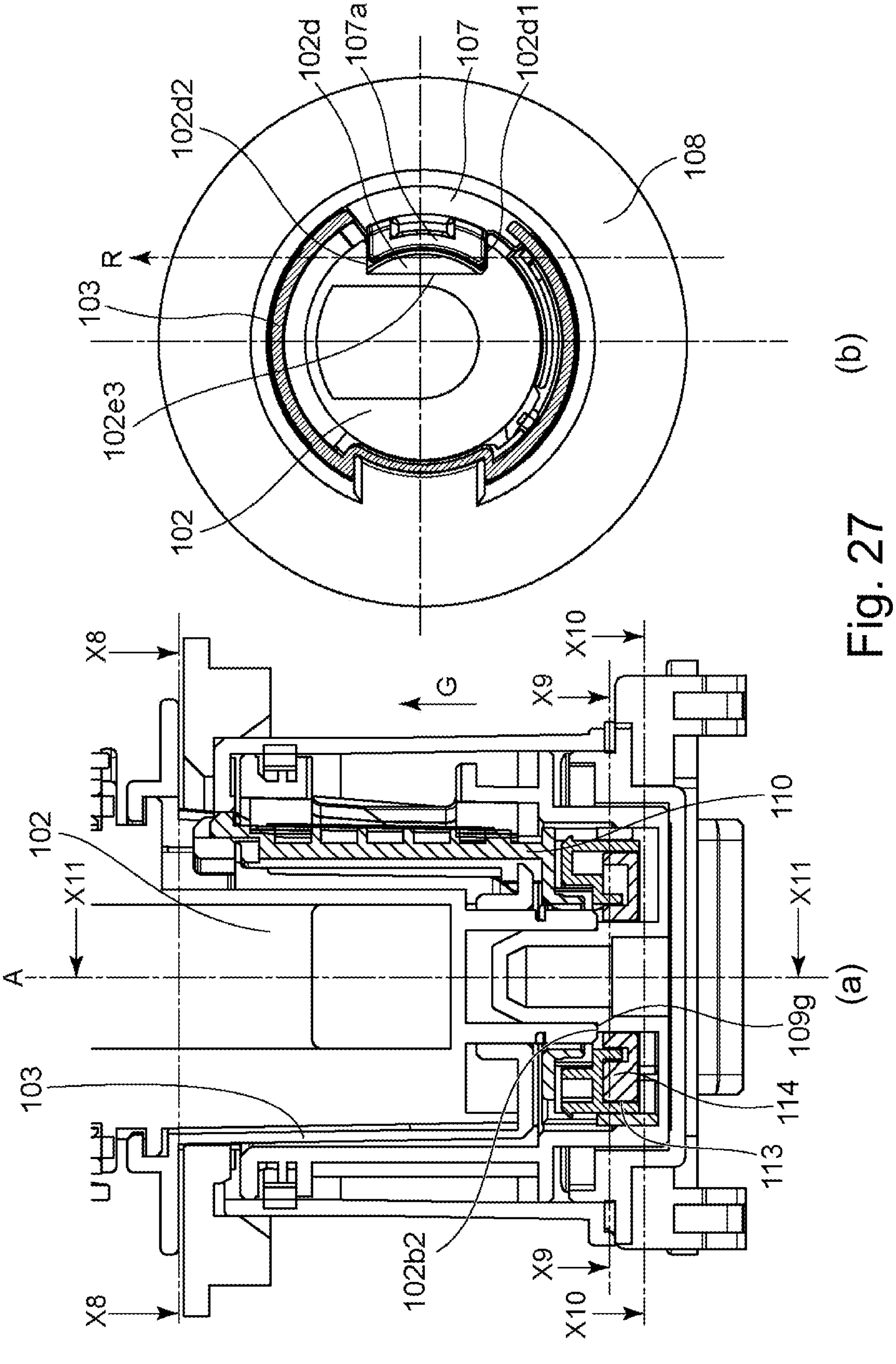
FIG. 27 is sectional views of the mounting portion and the toner pack at the time when the mounting portion of the toner pack according to Embodiment 1 is completed.

Part (a) of FIG. 23 is a perspective view of the toner pack 100 and the mounting portion 106 while the toner pack 100 is being mounted on the mounting portion 106. Part (b) of FIG. 23 is a perspective view of the toner pack 100 and the mounting portion 106 as viewed from a point different from that in part (a) of FIG. 23. FIG. 24 is a sectional view taken along a line parallel to the rotational axis A (rotational axis B) in a state in which the toner pack 100 is further moved from the state of FIG. 23 in the mounting direction. Part (a) of FIG. 25 is a cross-sectional view taken along a line X4-X4 in FIG. 24. Part (b) of FIG. 25 is a cross-sectional view taken along a line X5-X5 in FIG. 24. Part (a) of FIG. 26 is a sectional view taken along a line X6-X6 in FIG. 24. Part (a) of FIGS. 26 to 26 (*d*) are sectional views illustrating a process of mounting the toner pack 100 on the mounting portion 106. Part (a) of FIG. 27 is a sectional view taken along a line X7-X7 in part (d) of FIG. 26. Part (b) of FIG. 27 is a cross-sectional view taken along a line X8-X8 in part (a) of FIG. 27.

In FIG. 24, FIG. 25, and part (b) of FIG. 27, the cut surfaces of the pack-side shutter 103 and the cover 110 are shaded for better illustration. Further, in FIG. 26, the pack side shutter 103, the restricting member 113, and the releasing member 114 are shown in side views, and the members other than them are shown in sectional views. Further, in FIG. 27, the cut surfaces of the cover 110, the restricting member 113, and the releasing member 114 are shaded for better illustration.

As shown in FIG. 23, the toner pack 100 with the pack-side shutter 103 in the closed position is moved in the mounting direction M relative to the mounting portion 106 with the apparatus-side shutter 109 in the closed position. At this time, as viewed in the mounting direction M the pack-side shutter 103 is positioned in the rotational direction, to effect alignment between the positions of the recess 102*e* of the nozzle 102 (opening 103*a* of the pack-side shutter 103) and the positioning portion 107*a* of the first frame 107. At the same time, the pack-side shutter 103 is positioned in the rotational direction, to effect alignment between the positions of the driven transmission portion 103*e* of the pack-side shutter 103 and the drive transmission portion 108*a* of the operating lever 108 in the rotational direction of the pack-side shutter 103.

After the positioning described above, the toner pack 100 is moved in the mounting direction M and mounted on the mounting portion 106, then, as shown in FIG. 24, the inner peripheral surface 102*b*1 of the projecting portion 102*b* of the nozzle 102 is fitted (engaged) around a small diameter portion 109*d*2 of the center boss 109*d* of the apparatus-side shutter 109. By this, the position of the nozzle 102 in the radial direction relative to the apparatus-side shutter 109 below the nozzle 102 (downstream side in the mounting direction M) is determined. The inner peripheral surface 102*b*1 of the projecting portion 102*b* does not necessarily have to be structured to fit with the center boss 109*d*, and may be structured so as not to interfere with the center boss 109*d*. As shown in part (a) of FIG. 25, the drive transmission portion 108*a* (lever projection) of the operating lever 108 and the driven transmission portion 103*e* (rotatable member recess portion) of the pack side shutter 103 engage with each other. At the same time, as shown in part (b) of FIG. 25, the side surface 110*f* and the side surface 110*g* of the cover 110 become close to the surfaces 102*e*1 and 102*e*2 forming the recess 102*e* (nozzle recess) of the nozzle 102, respectively. Further, the driven transmission portion 103*e* (rotatable member recess portion) of the pack-side shutter 103 engages with the driven transmission portion 109*e* (shutter projection) of the apparatus-side shutter 109. By this, the rotational axis A of the pack-side shutter 103 and the rotational axis B of the apparatus-side shutter 109 become substantially coaxial. The operating lever 108, the pack-side shutter 103, and the apparatus-side shutter 109 are substantially integrally rotatable relative to the first frame 107 (base frame 2) and the nozzle 102 in the rotation about the rotational axis A (rotational axis B). Specifically, when the operating lever 108 is rotated, the drive transmission portion 108*a* of the operating lever 108 presses the surface 103*b*1 or 103*b*2 of the pack side shutter 103, so that the pack side shutter 103 is rotated. Thereafter, the surface 103*b*1 or the surface 103*b*2 of the pack-side shutter 103 presses the driven transmission portion 109*e* of the apparatus-side shutter 109 to rotate the apparatus-side shutter 109.

Here, if the apparatus-side shutter 109 rotates from the closed position to the open position due to vibration during transportation of the image forming apparatus 1, the position of the driven transmission portion 109*e* of the apparatus-side shutter 109 deviates in the rotational direction. Then, when the toner pack 100 is to be mounted on the mounting portion 106, what happens is as follows. When the driven transmission portion 103*e* of the pack-side shutter 103 engages with the drive transmission portion 108*a* of the operating lever 108, and thereafter the toner pack 100 is further moved in the mounting direction M, it cannot engage with the driven transmission portion 109*e* of the apparatus-side shutter 109. Therefore, the toner pack 100 cannot be moved to the mounting complete position relative to the mounting portion 106. In order to prevent such a situation from occurring, a rotation restricting mechanism 112 of the shutter 109 on the apparatus-side is provided.

Here, a mechanism will be described in which the rotation restricting mechanism 112 of the mounting portion 106 is released by mounting the toner pack 100 to the mounting portion 106. Hereinafter, the second restriction releasing portion 104*b* functions in the same manner as the first restriction releasing portion 104*a*, and therefore, the description thereof will be omitted.

At the time of the state of part (a) of FIG. 26, the first restriction releasing portion 104*a* of the nozzle 102 and the releasing claw 114*e* of the releasing member 114 are not yet in contact with each other. When the toner pack 100 is further moved in the arrow N direction (mounting direction M) from this position, as shown in part (b) of FIG. 26, the first slope 104*a*1 of the first restriction releasing portion 104*a* and the releasing claw 114*e* are brought into contact with each other. When the toner pack 100 is further moved in the direction of arrow N from this position, the releasing member 114 is rotated in the rotational direction D by a force F5 received by the releasing claw 114*e* from the first slope 104*a*1 against the moment M2 (urging force) applied by the release spring 116. At this time, the first slope 104*a*1 guides the releasing claw 114*e* so that the releasing member 114 is rotated in the rotational direction D. The releasing member 114 rotates in the rotational direction D until the releasing claw 114*e* passes the downstream end of the first slope 104*a*1 in the rotational direction D. The rotation of the releasing member 114 in the rotational direction D is the first step described above. That is, as shown in part (a) of FIG. 15, this is a step in which the rise restricted surface 114*c* of the restriction member lifted causes the releasing member 114 to rotate in the rotational direction D against the urging force of the release spring 116 until the it reaches a position where it does not contact the rise restricting surface 110*e* of the cover 110.

After the first step, the releasing claw 114*e* rides on the downstream end of the second slope 104*a*2 in the rotational direction D. In other words, after the first step, the releasing claw 114*e* rides on the upstream end of the second slope 104*a*2 in the rotational direction E. At this time, as shown in part (c) of FIG. 26, the releasing claw 114*e* is contacted by the second slope 104*a*2 of the nozzle 102 by the moment M2 (urging force) provided by the release spring 116 to receive a force F6. Then, by the arrow G direction component F6*a* of the force F6, the releasing member 114 is moved (guided) in the arrow G direction (upward) along the second slope 104*a*2 and at the same time rotates in the rotational direction E about the rotational axis A. That is, the rotational direction of the releasing member 114 changes from the rotational direction D to the direction E at the connecting portion where the downstream end of the first slope 104*a*1 in the rotational direction D and the upstream end of the second slope 104*a*2 in the rotational direction E are connected. In addition, the second slope 104*a*2 guides the releasing claw 114*e* so that the releasing member 114 is moved upward. The second slope 104*a*2 guides the releasing claw 114*e* so that the releasing member 114 is moved upward while being rotated in the rotational direction E.

The movement of the releasing member 114 in the arrow G direction (upward) and the rotation in the rotational direction E are the second steps described in the foregoing. Here, as described above, in the second step, the restricting member 113 moves in the arrow G direction together with the releasing member 114. As shown in part (a) of FIG. 15, at least one of the contact surfaces 114*f* (pair) of the releasing member 114 is rotationally moved until it comes into contact with one of the second contact surfaces 110*b* of the corresponding cover 110, thus reaching the mounting completion position shown in part (d) of FIG. 26 and FIG. 27. As shown in part (d) of FIG. 26, when the contact surface 114*f* of the releasing member abuts to the second contact surface 110*b* of the cover 110, a part of the releasing claw 114*e* enters the cavity 104*a*3 above (directly above) the second slope 104*a*2.

As described above, by mounting the toner pack 100 on the mounting portion 106, the rotation restriction by the rotation restricting mechanism 112 of the apparatus-side shutter 109 is released through the first step and the second step described above.

When the toner pack 100 is in the mounting complete position, as shown in FIG. 27, the projecting portion end surface 102*b*2 of the projecting portion 102*b* of the nozzle 102 is in contact with the pack contact surface 109*g* of the apparatus-side shutter 109. By this, the position of the nozzle 102 (toner pack 100) in the direction of the rotational axis A (mounting direction M) is determined with respect to the mounting portion 106. In addition, three points of the radial positioning portion 103*f* (FIGS. 18 and 20) of the pack side shutter 103 are in contact with the inner peripheral surface 109*h* (FIG. 7) of the apparatus-side shutter 109. By this, the positions of the nozzle 102 and the pack-side shutter 103 (toner pack 100) in the radial direction on the upstream side in the mounting direction M are determined.

The sectional view of X10-X10 in part (a) of FIG. 27 is the same as that in part (a) of FIG. 15, and therefore, the description thereof will be omitted. As shown in part (b) of FIG. 27, which is a cross-section of X8-X8 in part (a) of FIG. 27, the positioning portion 107*a* of the first frame 107 is engaged with the positioned portion 102*d* of the nozzle 102 having the surfaces 102*d*1 and 102*d*2. Therefore, the nozzle 102 is positioned relative to the first frame 107 (base frame 2) in the arrow R direction of the surfaces 102*d*1 and 102*d*2. As shown in FIG. 26, the arrow R direction is substantially parallel to the locus V in which the releasing claw 114*e* rotates in the rotational direction D when the first restriction releasing portion 104*a* and the releasing claw 114*e* come into contact with each other. By this, the position of the nozzle 102 is determined relative to the first frame 107 in the direction of the arrow R, And therefore, the operation of releasing the rotation restriction relative to the apparatus-side shutter 109 can be further stabilized.

By the mechanism described above, the rotation restriction by the rotation restricting mechanism 112 of the apparatus-side shutter 109 is released, and the apparatus-side shutter 109 is enabled to rotate from the closed position to the release position. When the pair of contact surfaces 114*f* abut on the pair of second contact surfaces 110*b*, the releasing member 114 is vigorously rotated by the moment M2, so that a light collision sound is produced and at the same time, the user's hand holding the toner pack 100 feels the reaction. That is, the user can recognize that the locking of the shutter 109 on the apparatus-side has been released by the collision sound and the reaction. When the toner pack 100 is dismounted from the mounting portion 106, the reverse process of FIG. 26 is carried out, and the apparatus-side shutter 109 is again restricted by the rotation restricting mechanism 112.

(Lever Operation)

As described above, In the state in the toner pack 100 is mounted on the mounting portion 106, the operating lever 108, the pack side shutter 103, and the apparatus-side shutter 109 rotate integrally about the rotational axis A (rotational axis B).

Figure 28:
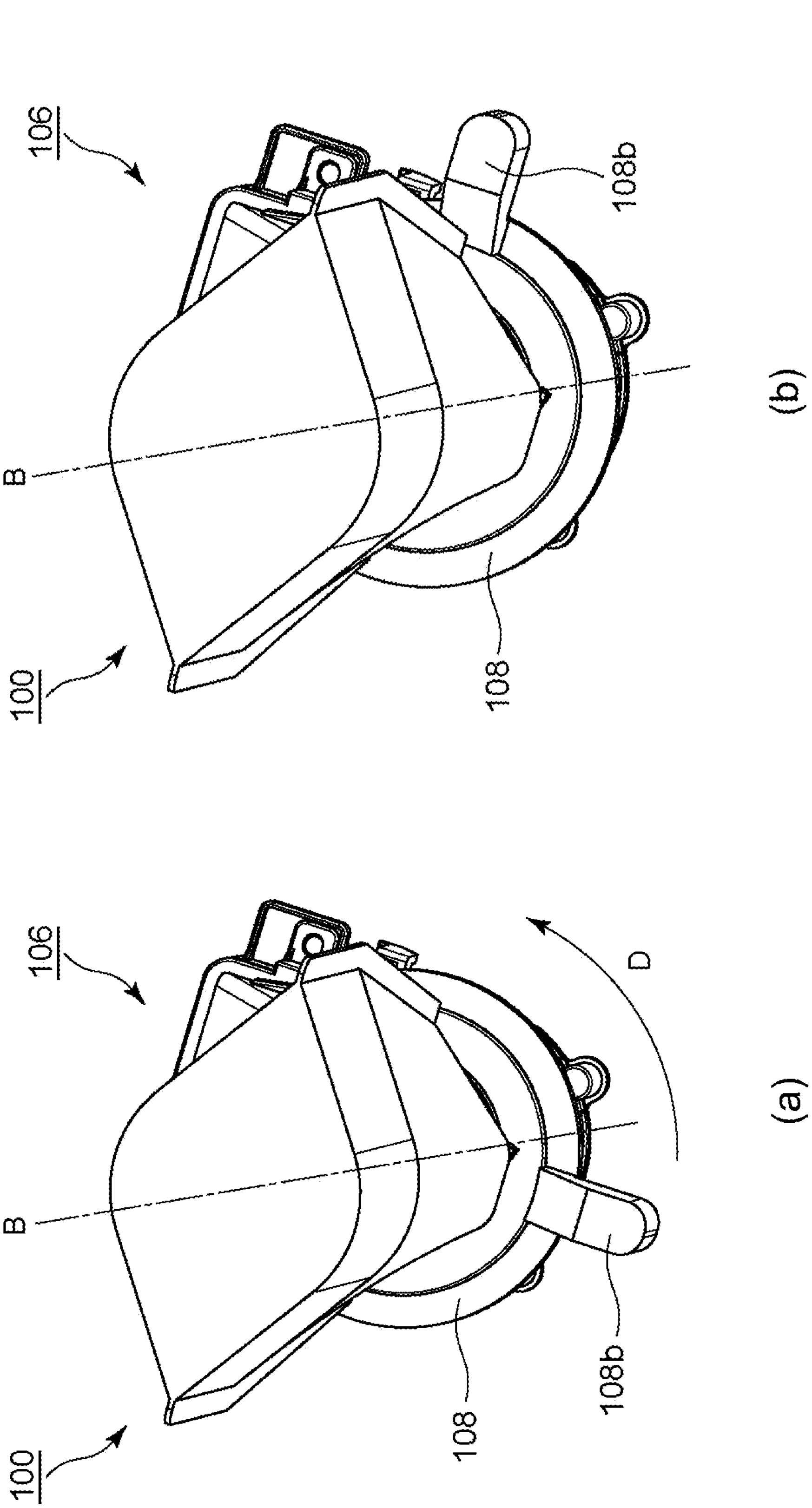
FIG. 28 is perspective views of the toner pack mounted on the mounting portion when an operating lever is in a closed position and an open position, as viewed from above.

Here, part (a) of FIG. 28 is a perspective view of the toner pack 100 at the time when the operating lever 108 is in the closed position, as viewed from above. Part (b) of FIG. 28 is a perspective view of the toner pack 100 at the time when the operating lever 108 is in the open position, as viewed from above.

As shown in FIG. 28, when the operating portion 108*b* of the operating lever 108 is rotated in the rotational direction D after the mounting of the toner pack 100 to the mounting portion 106 is completed, the shutter 109 on the apparatus-side is rotated from the closed position to the open position, and the pack side shutter 103 rotates from the closed position to the open position.

When the pack-side shutter 103 rotates from the closed position to the open position, the frictional force F7 received by the nozzle 102 from the pack-side shutter 103 by way of the pack-side seal 105 is directed in the arrow K direction as shown in part (a) of FIG. 18. This is the same direction as the rotational direction D of the operating lever 108 in FIG. 28. The nozzle 102 receives the frictional force F7 and rotates between the surfaces 102*d*1 and 102*d*2, and the positioning portion 107*a* of the first frame 107, by the amount of the engagement play (play) in the arrow K direction, the rotational direction of the nozzle 102 at this time is such that the second slope 104*a*2 of the first restriction releasing portion 104*a* approaches the releasing claw 114*e* of the releasing member 114, and such that the second slope 104*b*2 of the second restriction releasing portion 104*b* approaches the releasing member 114. That is, when the operating lever 108 is rotated to rotate the pack-side shutter 103 from the closed position to the open position, the restricting member 113 moves upward (in the direction opposite to the mounting direction M) together with the releasing member 114. Then, the second restricted surface 113*c* of the restricting member 113 is separated upward from the restricted rib 109*c* of the apparatus-side shutter 109, and the margin for releasing the rotation restriction is increased. Therefore, it is possible to more stably maintain the state in which the rotation restriction for the apparatus-side shutter 109 is released.

By the above-described operation, the toner pack 100 accommodating portion 101 and the toner accommodating chamber 36 are rotated in fluid communication with each other through the discharge opening 102*a*, the receiving opening 109*a*, and the apparatus-side opening 117*a*.

Figure 29:
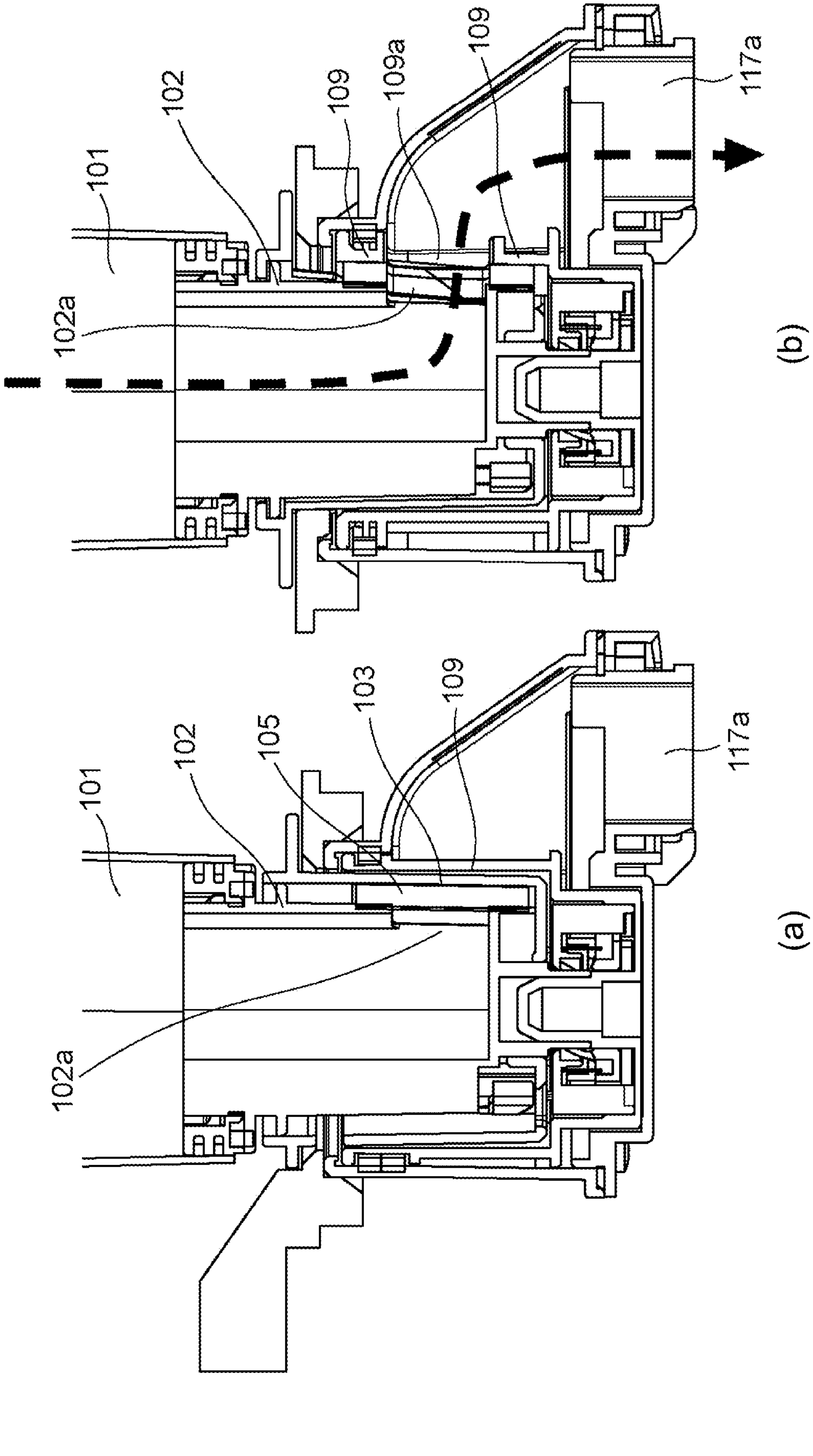
FIG. 29 is sectional views illustrating a toner movement path when the apparatus-side shutter and the pack-side shutter are closed and opened.

Here, part (a) of FIG. 29 is a sectional view of the toner pack 100 and the mounting portion 106 when both the apparatus-side shutter 109 and the pack-side shutter 103 are in the respective closed positions. Part (b) of FIG. 29 is a sectional view of the toner pack 100 and the mounting portion 106 when both the apparatus-side shutter 109 and the pack-side shutter 103 are in the respective open positions.

In part (a) of FIG. 29, the discharge opening 102*a* of the nozzle 102 is closed by the pack side shutter 103, the pack side seal 105, and by the apparatus-side shutter 109, and the toner in the accommodating portion 101 cannot reach the apparatus-side opening 117*a* of the second frame 117. On the other hand, in part (b) of FIG. 29, the discharge opening 102*a* of the nozzle 102 is opened by moving the pack-side shutter 103, the pack-side seal 105, and the apparatus-side shutter 109. Therefore, the toner in the accommodating portion 101 is compressed by the user compressing the accommodating portion 101, the toner in the accommodating portion 101 reaches the apparatus-side opening 117*a* of the second frame 117 together with the air through the discharge opening 102*a*, and the toner is supplied into the toner accommodating chamber 36 of the developer container 32 through the side opening 117*a*.

Modified Example 1

In this embodiment, the first restriction releasing portion 104*a* and the second restriction releasing portion 104*b* are provided on the outer peripheral surface 102*b*3 of the projecting portion 102*b* of the nozzle 102. However, the following structure may be employed instead.

Figure 30:
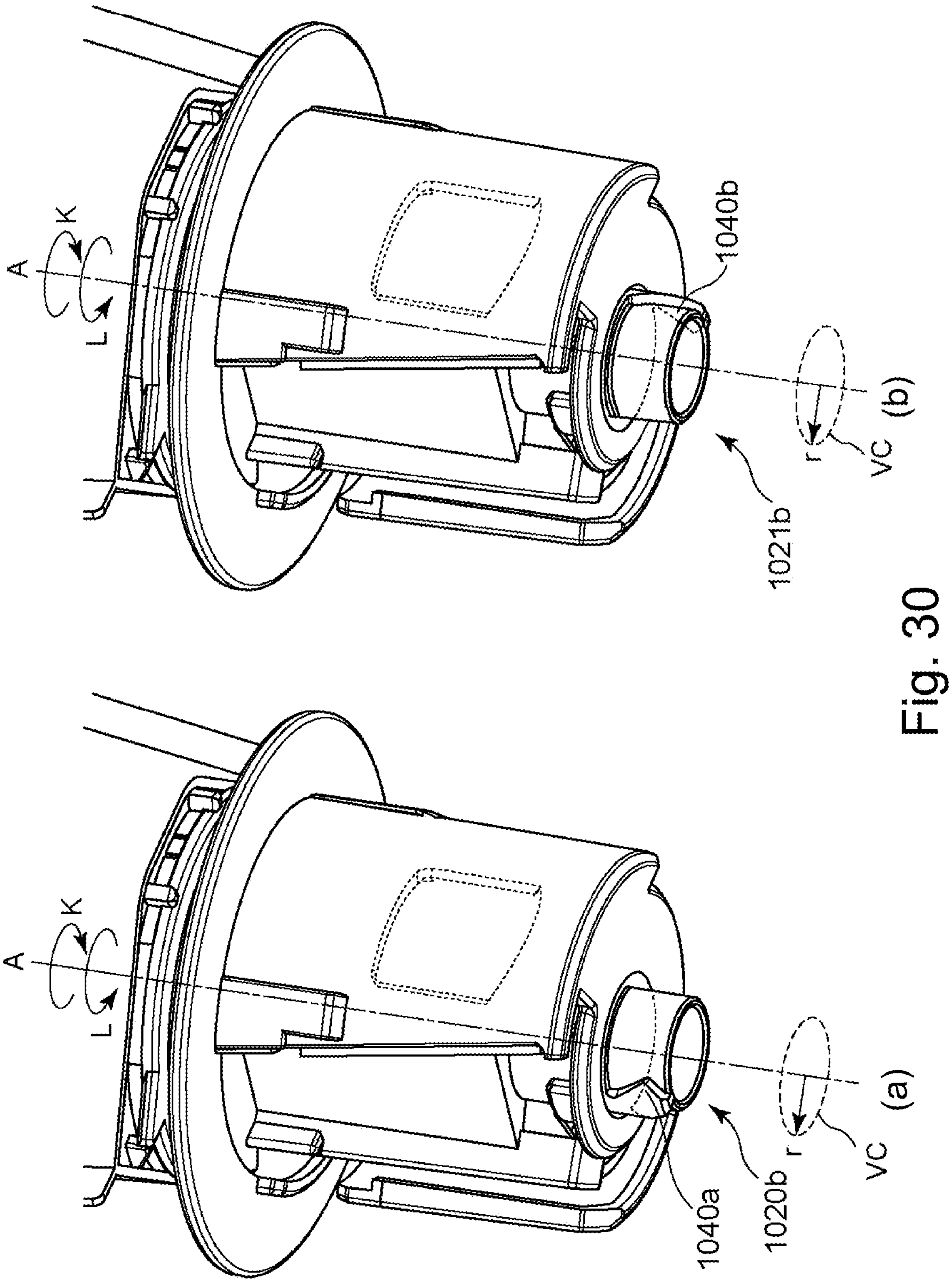
FIG. 30 is perspective views of a neighborhood of the nozzle in Modified Example 1 of Embodiment 1.

First, as shown in part (a) of FIG. 30, a projecting portion 1020*b* is provided with a restriction releasing portion 1040*a* corresponding to the first restriction releasing portion 104*a* of Embodiment 1. However, there is not provided a portion corresponding to the second restriction releasing portion 104*b*.

Second, as shown in part (b) of FIG. 30, the projecting portion 1021*b* is provided with a restriction releasing portion 1040*b* corresponding to the second restriction releasing portion 104*b* of Embodiment 1. However, there is not provided a portion corresponding to the first restriction releasing portion 104*a*.

Modified Example 2

In this embodiment, the first restriction releasing portion 104*a* is provided with the first slope 104*a*1 and the second slope 104*a*2, and the second restriction releasing portion 104*b* has a sheet which is rotationally symmetric with the first restriction releasing portion 104*a* about the rotational axis A. However, the following structure may be used instead.

Figure 31:
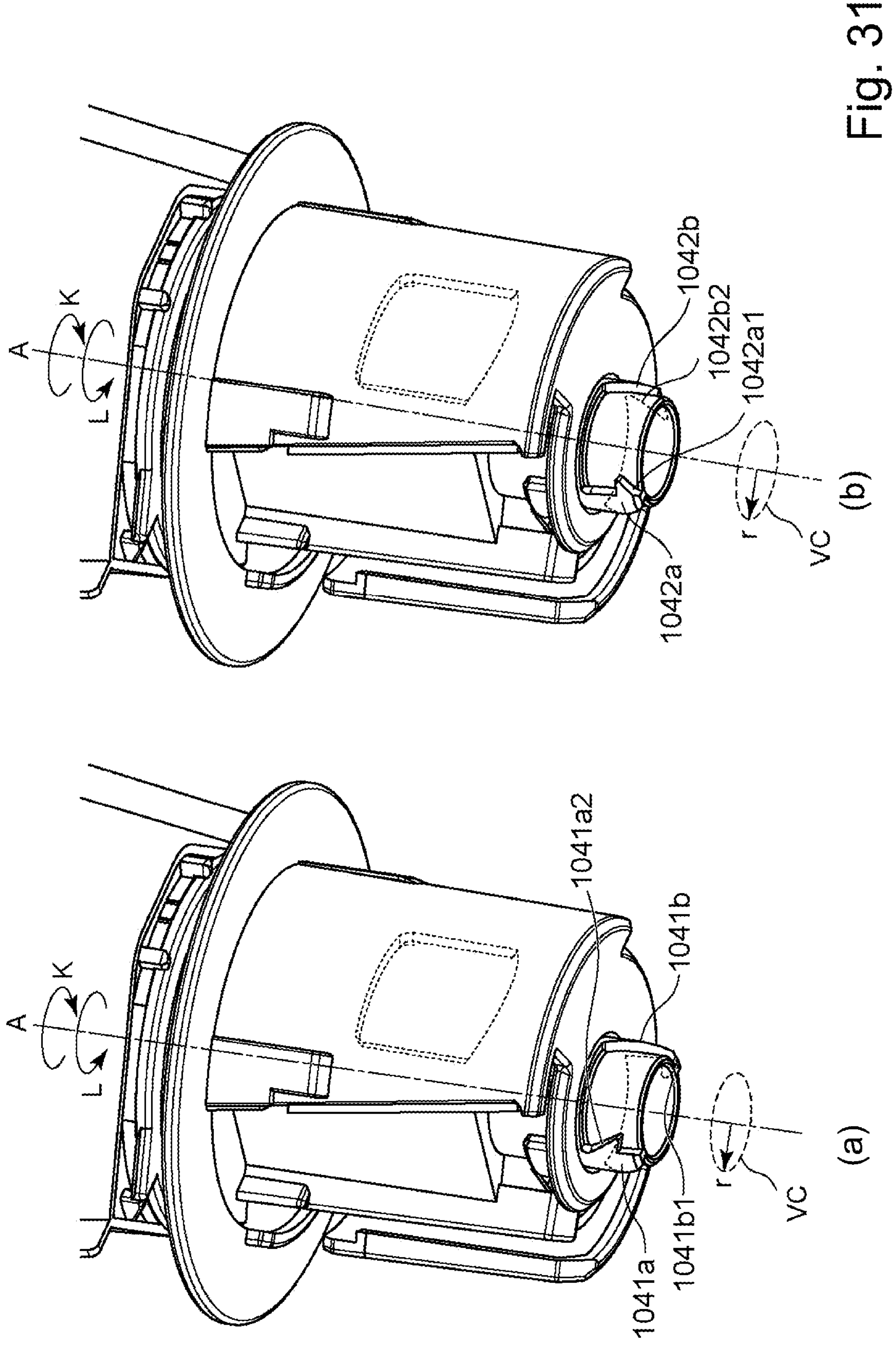
FIG. 31 is perspective views of a neighborhood of the nozzle depending on Modified Example 2 of Embodiment 1.

First, as shown in part (a) of FIG. 31, although the first restriction releasing portion 1041*a* is provided with a second slope 1014*a*2 corresponding to the second slope 104*a*2 of Embodiment 1, it does not have a slope corresponding to the first slope 104*a*1 of Embodiment 1. Further, although the second restriction releasing portion 1041*b* has a first slope 1041*b*1 corresponding to the first slope 104*a*1 of Embodiment 1, it does not have a slope corresponding to the second slope 104*a*2 of Embodiment 1.

Second, as shown in part (b) of FIG. 31, although the first restriction releasing portion 1042*a* has a first slope 1042*a*1 of Embodiment 1, It does not have a slope corresponding to the second slope 104*a*2 of Embodiment 1. Further, although the second restriction releasing portion 1042*b* has a second slope 1042*b*2 corresponding to the second slope 104*a*2 of Embodiment 1, it does not have a slope corresponding to the first slope 104*a*1 of Embodiment 1.

Modified Example 3

In this embodiment, the projecting portion 102*b* is provided with the first restriction releasing portion 104*a* and the second restriction releasing portion 104*b* on the outer peripheral surface 102*b*3 of the cylindrical portion having the hole with the inner peripheral surface 102*b*1 on the projecting portion end surface 102*b*2. However, the following structure may be employed instead.

Figure 32:
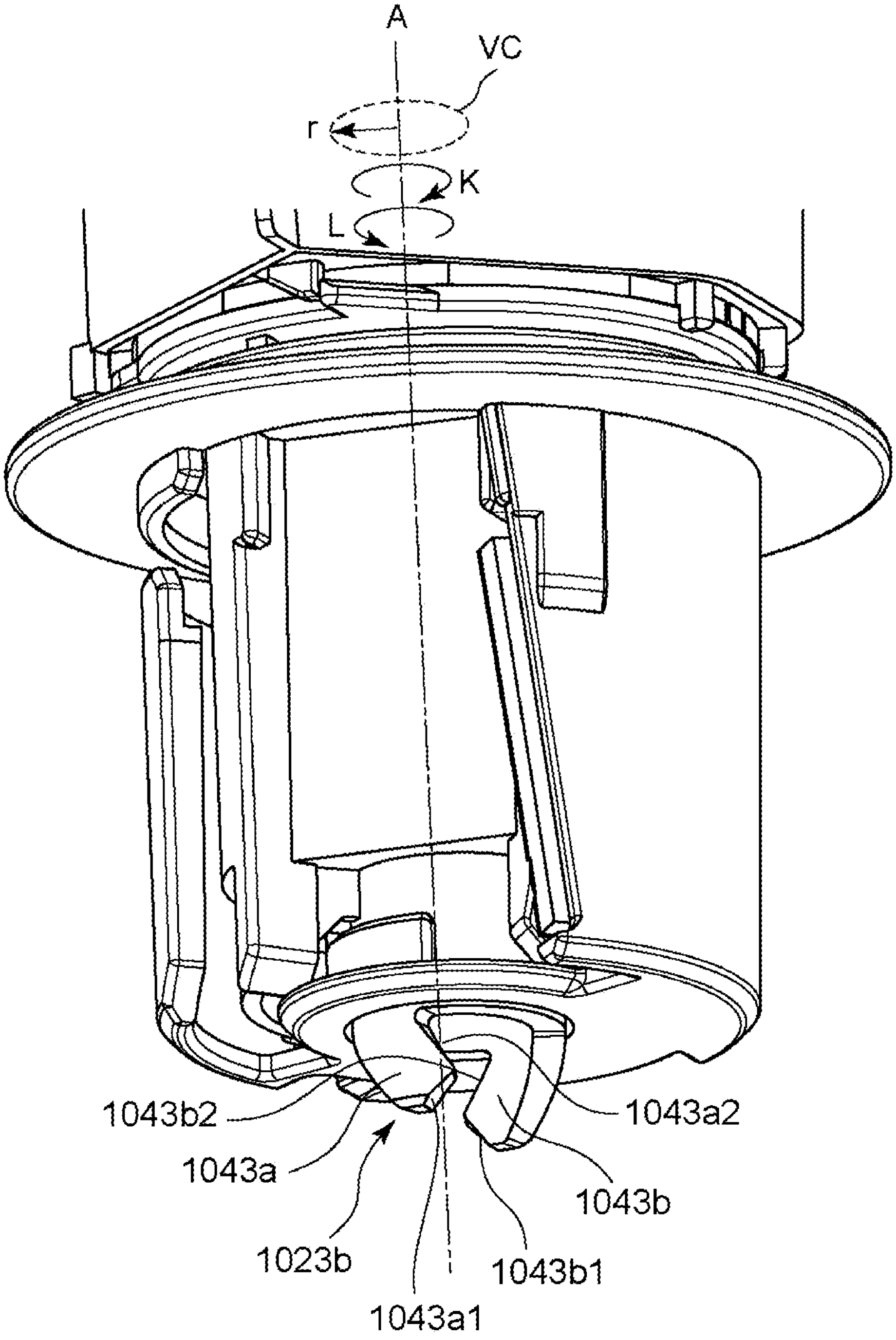
FIG. 32 is a perspective view of the neighborhood of the nozzle in Modified Example 3 of Embodiment 1.

As shown in FIG. 32, it has a projecting portion 1023*b* including no wall surface (wall surface corresponding to the outer peripheral surface 102*b*3) connecting between a first restriction releasing portion 1043*a* and a second restriction releasing portion 1043*b*. The first restriction releasing portion 1043*a* is a first projection including a first slope 1043*a*1 and a second slope 1043*a*2 corresponding to the first slope 104*a*1 and the second slope 104*a*2 of Embodiment 1, respectively, and is a first projection projecting downward. The second restriction releasing portion 1043*b* has a first slope 1043*b*1 and a second slope 1043*b*2 corresponding to the first slope 104*b*1 and the second slope 104*b*2 of Embodiment 1, respectively, and is a second projection projecting downward. There is provided a space between the first restriction releasing portion 1043*a* and the second restriction releasing portion 1043*b*.

Modified Example 4

Figure 33:
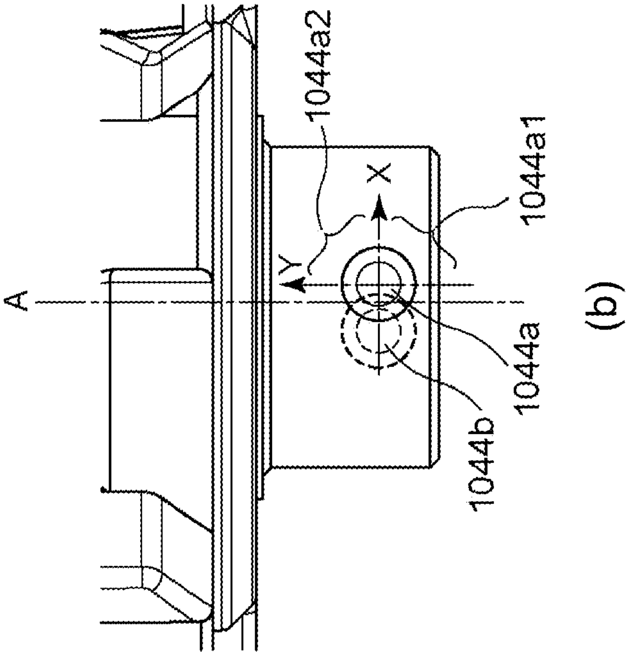
FIG. 33 is a perspective view and a front view of a neighborhood of the nozzle in Modified Example 4 of Embodiment 1.
Figure 33:
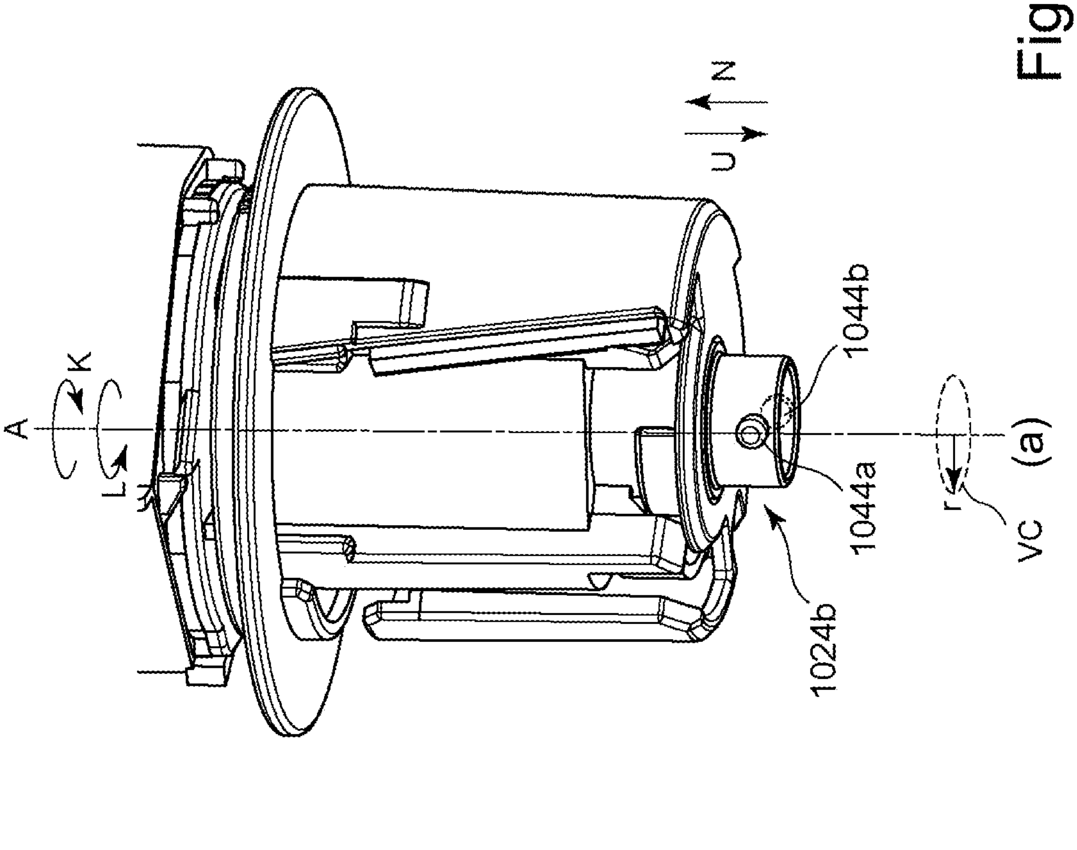

As shown in part (a) of FIG. 33, two round shaft-shaped bosses may be used as the first restriction releasing portion 1044*a* and the second restriction releasing portion 1044*b*, respectively. As viewed in the axial direction of the first restriction releasing portion 1044*a*, as shown in part (b) of FIG. 33, a Y axis extending in the direction of the rotational axis A (arrow U direction) and an X-axis extending in the direction perpendicular to the rotational axis A are defined with the axis of the first restriction releasing portion 1044*a* as an origin. Of the four quadrants separated by the X-axis and the Y-axis, the outer peripheral surface of the first restriction releasing portion 1044*a* in the fourth quadrant is the first slope 1044*a*1, and the outer peripheral surface of the first restriction releasing portion 1044*a* in the first quadrant is the second slope 1044*a*2. The same applies to the second restriction releasing portion 1044*b*. Therefore, the same effects as those of this embodiment can be provided.

Modified Example 5

Figure 34:
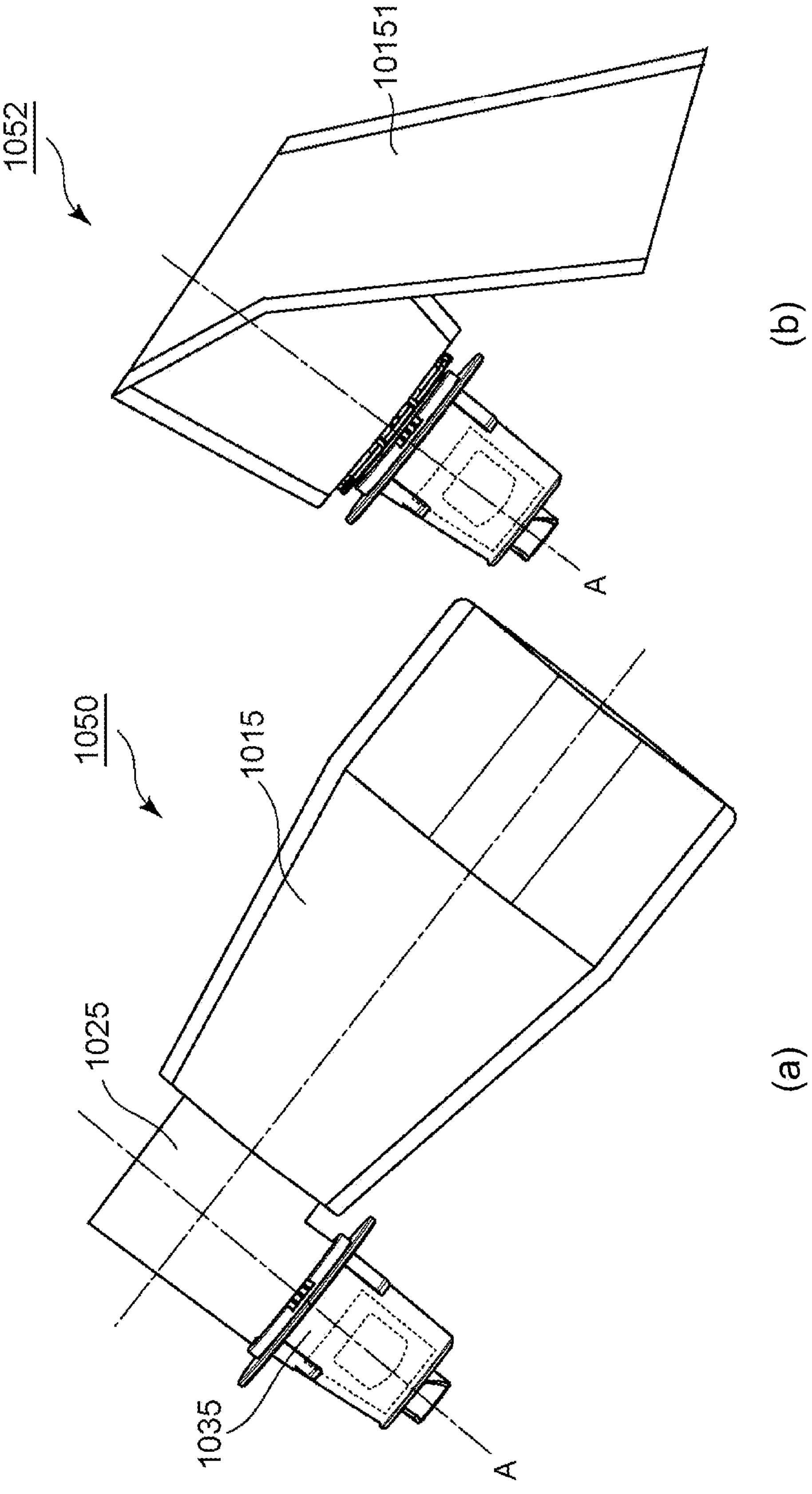
FIG. 34 is front views of the toner pack in Modified Example 5 of Embodiment 1.

As shown in part (a) of FIG. 34, the toner pack 1050 in which the nozzle 1025 is bent into an L shape may be used. The accommodating portion 1015 has a structure extending in a direction intersecting the rotational axis A of the pack-side shutter 1035.

Further, as shown in part (b) of FIG. 34, the toner pack 1052 in which the accommodating portion 10151 of the toner pack 1051 hangs down may be used.

Modified Example 6

Figure 35:
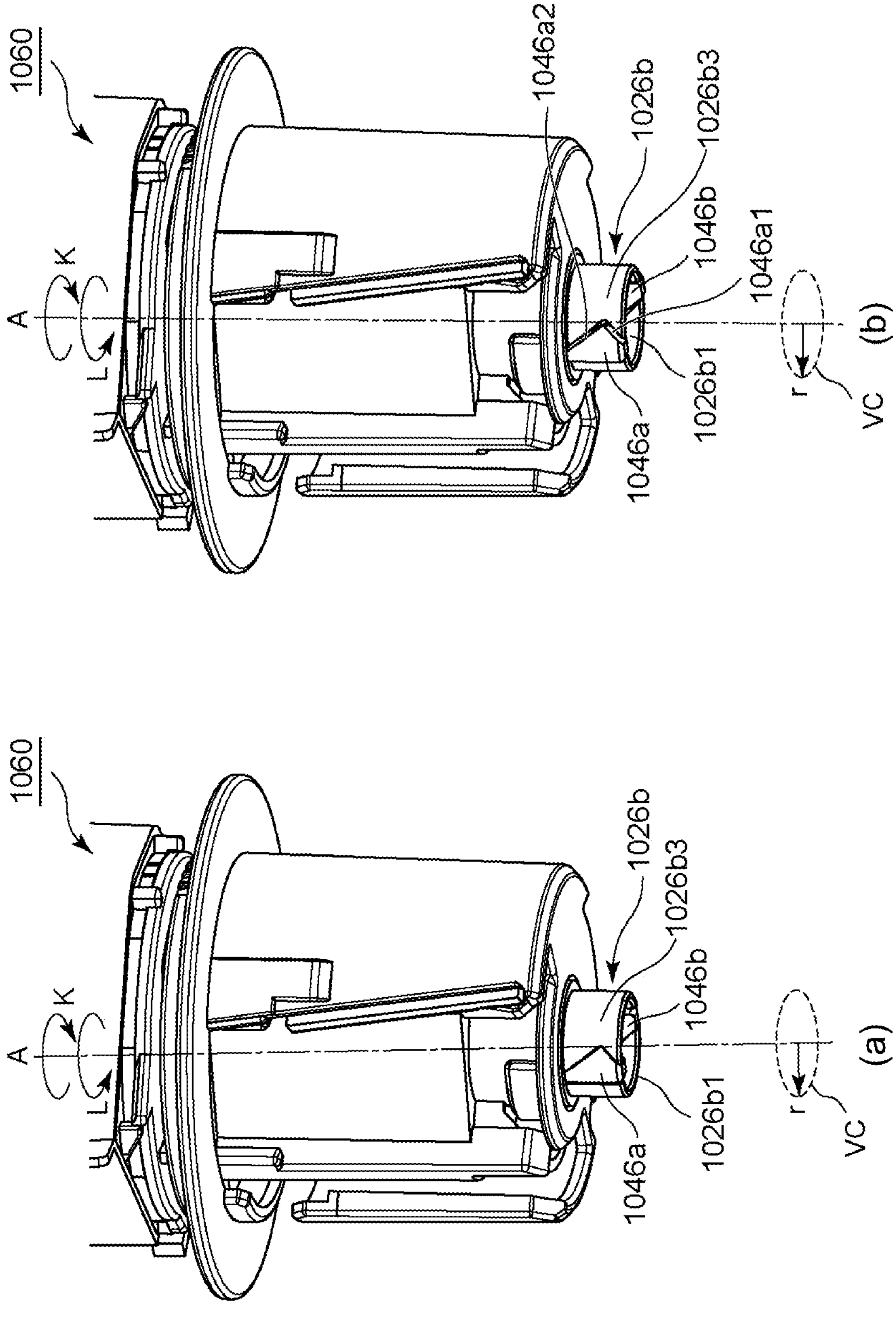
FIG. 35 is perspective views of a neighborhood of the nozzle in Modified Example 6 of Embodiment 1.

In this embodiment, the first restriction releasing portion 104*a* and the second restriction releasing portion 104*b* are fixed to the nozzle 102, but they may be movable. In this modified example, as shown in part (a) of FIG. 35, The structure is such that when the toner pack 1060 is not mounted on the mounting portion 106 of the image forming apparatus 1, the first restriction releasing portion 1046*a* is accommodated inside (inner peripheral surface 1026*b*1 side) the outer peripheral surface 1026*b*3 of the projecting portion 1026*b*. And, The structure is such that in the process of mounting the toner pack 1060 on the mounting portion 106 of the image forming apparatus 1 or by the user's operation, the first restriction releasing portion 1046*a* projects to the outside of the imaginary circle VC of the outer peripheral surface 1026*b*3 of the projecting portion 1026*b* in the radial direction r.

As an example of the structure in which the first restriction releasing portion 1046*a* projects outward in the radial direction r in the process of mounting the toner pack 1060 on the mounting portion 106 of the image forming apparatus 1, when the center boss 109*d* of the apparatus-side shutter 109 is inserted inside the inner peripheral surface 1026*b*1 of the projecting portion 1026*b*, the first restriction releasing portion 1046*a* is pushed by the center boss 109*d* to project outward beyond the outer peripheral surface 1026*b*3 in the radial direction. The same structure as that of the first restriction releasing portion 1046*a* can be applied to the second restriction releasing portion 1046*b*.

Modified Example 7

Figure 36:
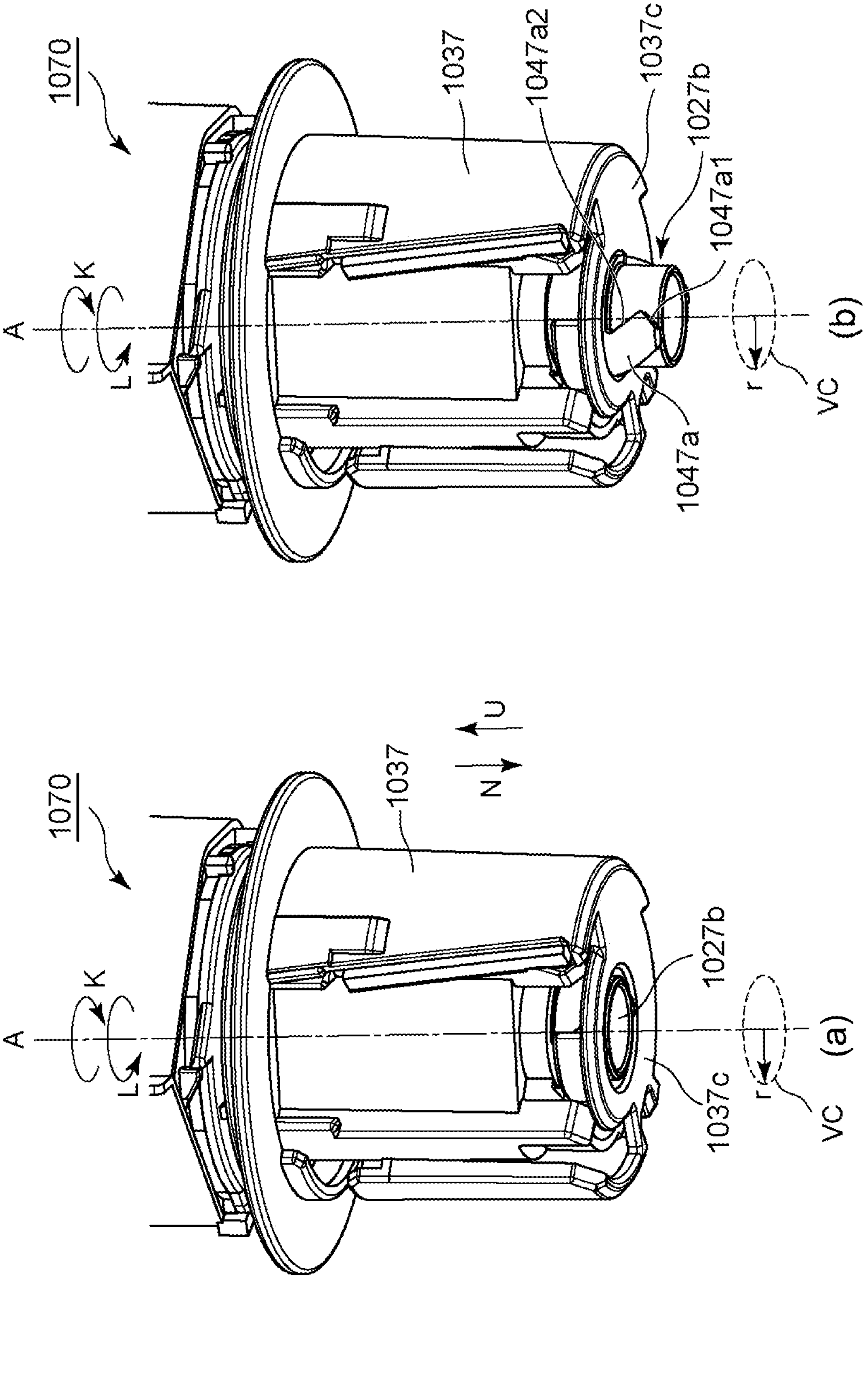
FIG. 36 is perspective views of a neighborhood of the nozzle in Modified Example 7 of Embodiment 1.

The structure may be such that when the toner pack 1070 is not mounted to the image forming apparatus 1, the projecting portion 1027*b* does not project from the end surface 1037*c* of the pack side shutter 1037, and the projecting portion 1027*b* project in the direction of the arrow N beyond the end surface 1037*c* in the process of mounting the toner pack to the image forming apparatus 1. That is, the projecting portion 1027*b* may be movable so as to take a projected position (projection position) as shown in part (b) of FIG. 36 in which it projects (projects) in the arrow N direction beyond the end surface 1037*c* and the retracted position as shown in part (a) of FIG. 36 in which it is retracted in the U direction from the projecting position (FIG. 36). The projecting portion 1027*b* may be structured not to project from the end surface 1037*c* in the retracted position. In such a case, user may manually move the projecting portion 1027*b* to the projection position and to the retracted position.

Modified Example 8

Figure 37:
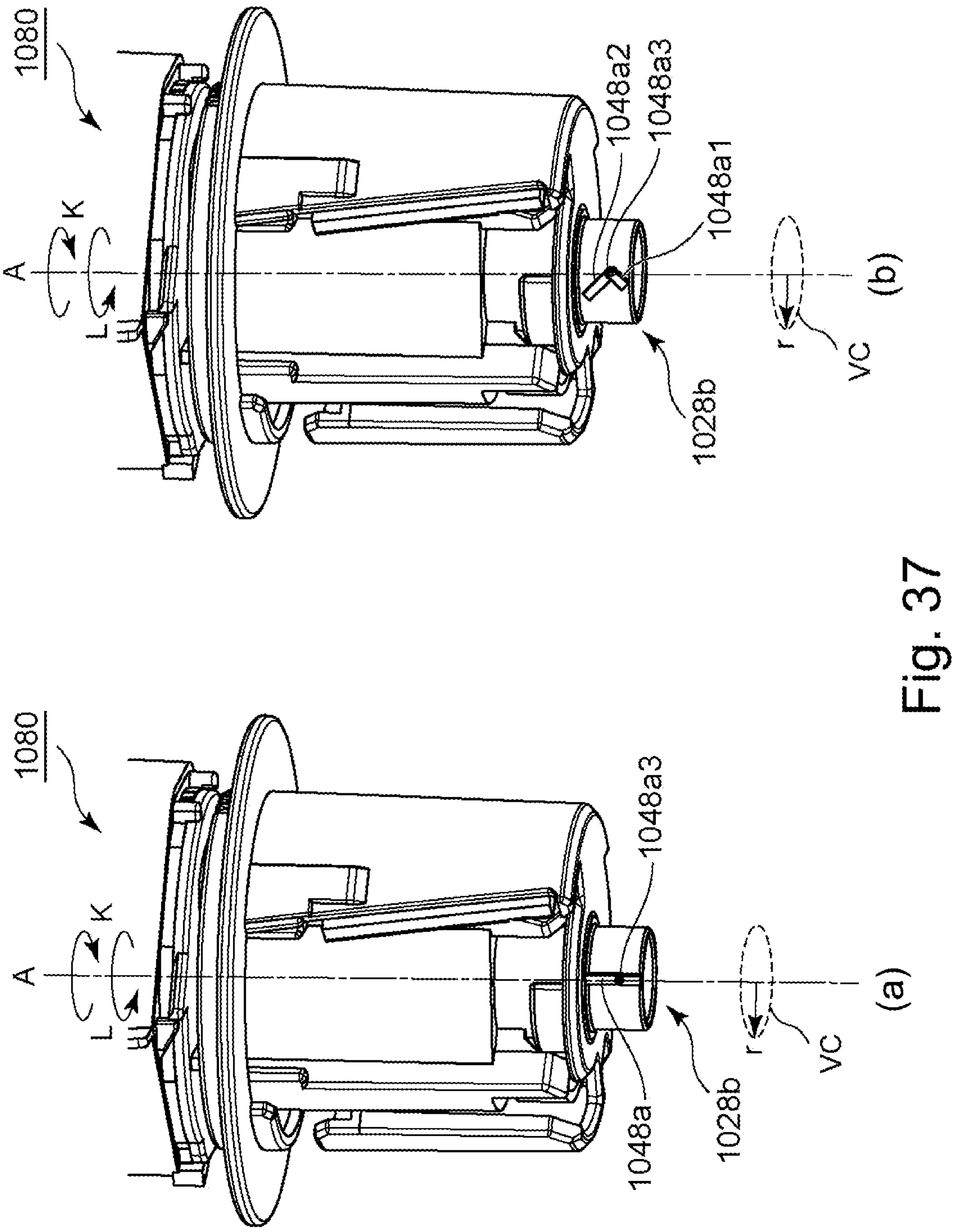
FIG. 37 is perspective views of a neighborhood of the nozzle in Modified Example 8 of Embodiment 1.

As shown in part (a) of FIG. 37, in a state in which the toner pack 1080 is not mounted to the image forming apparatus 1, the first restriction releasing portion 1048*a* is a linear rib extending in the direction of the rotational axis A and has only a surface extending in the direction of the axis A. The first restriction releasing portion 1048*a* has a rotation center 1048*a*3 at a position between one end and the other end in the direction of the rotational axis A. The structure may be such that during or before the process of mounting on the mounting portion 106 of the image forming apparatus 1, the rib is moved (rotated) by the user about the rotation center 1048*a*3 so as to provide a first slope 1048*a*1 corresponding to the first slope 104*a*1 of Embodiment 1 and a second slope 1048*a*2 corresponding to the second slope 104*a*2 of Embodiment 1, as shown in part (b) of FIG. 37.

Modified Example 9

Figure 38:
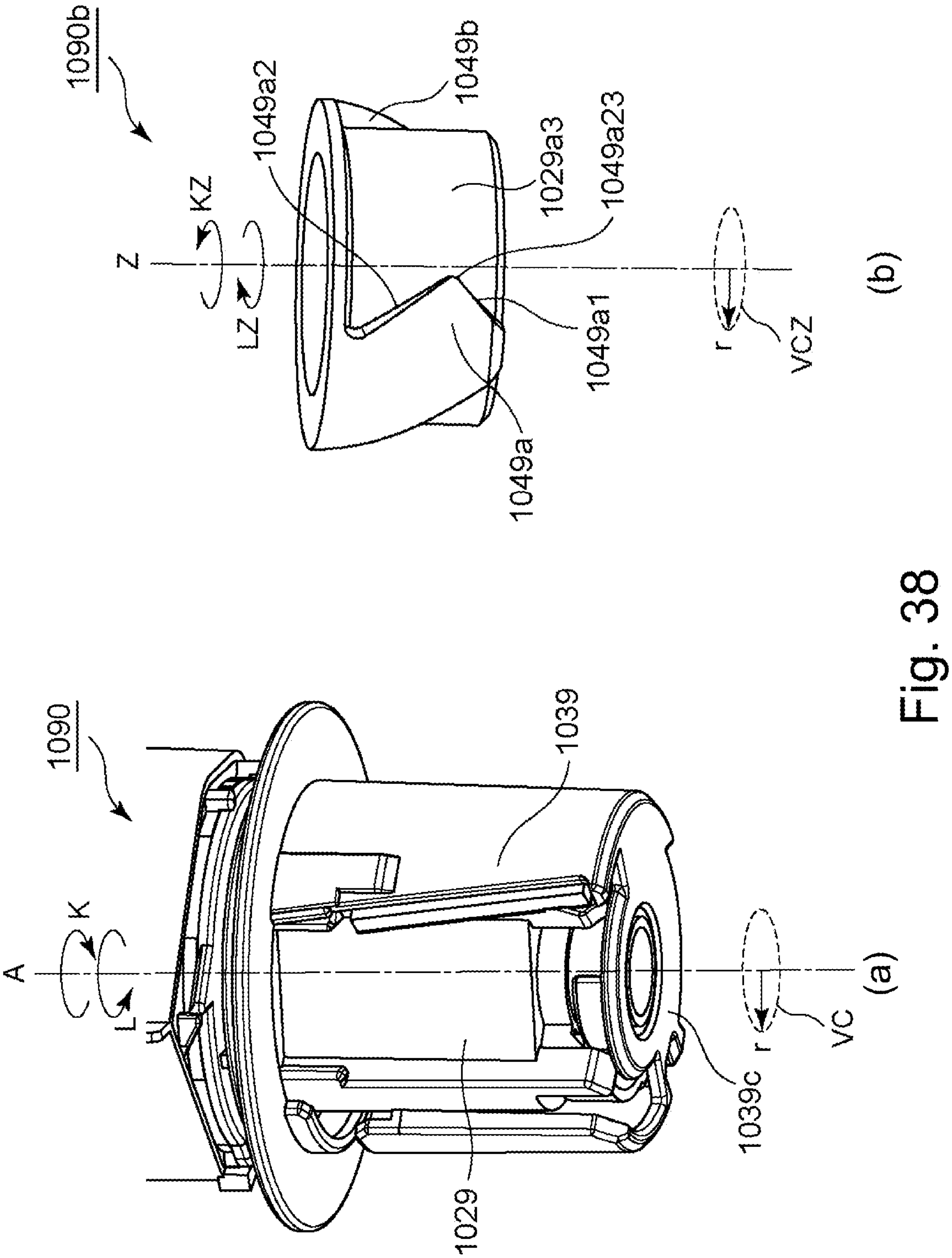
FIG. 38 is perspective views of the neighborhood of the nozzle and an attachment according to Modified Example 9 of Embodiment 1.

In this embodiment, the nozzle 102 and the projecting portion 102*b* are integral with each other, but these may be separate members. That is, as shown in FIG. 38, it may be a mounting kit including a toner pack 1090 accommodating the toner and an attachment 1090*b*, and may be a mounting kit for mounting to image forming mounting.

The toner pack 1090 has the same structure as that of Embodiment 1 except that the portion corresponding to the projecting portion 102*b* of Embodiment 1 is not provided, and therefore, the description thereof will be omitted.

The attachment 1090*b* has a cylindrical shape having an outer peripheral surface 1029*a*3 centered on the central axis Z. The attachment 1090*b* is provided with a first restriction releasing portion 1049*a* and a second restriction releasing portion 1049*b* on the outer peripheral surface 1029*a*3 when the central axis Z is oriented in the vertical direction (gravity direction). The first restriction releasing portion 1049*a* has an upward facing surface 1049*a*2 which faces upward and goes downward as goes in the circumferential direction of the outer peripheral surface 1029*a*3 (the first circumferential direction KZ of the imaginary circle VCZ centered on the central axis Z). In other words, the upward surface 1049*a*2 is configured to extend so as to go up as goes in the second circumferential direction LZ, which is the opposite direction of the first circumferential direction KZ of the imaginary circle VCZ and to face upward 61806180. The attachment 1090*b* also has a downward surface 1049*a*1 structured to face downward and to extend so as to go up as goes in the circumferential direction (first circumferential direction KZ) of the outer peripheral surface 1029*b*3. Further, it has a connecting portion 1049*a*23 which connects the upstream end of the upward surface 1049*a*2 in the second circumferential direction LZ and the downstream end of the downward surface 1049*a*1 in the first circumferential direction KZ.

The attachment 1090*b* may be structured to be mountable to the bottom surface of the nozzle 1029 of the toner pack 1090 (bottom surface of the toner pack 1090). Further, the attachment 1090*b* may be structured not to be mounted to the toner pack 1090. That is, the attachment 1090*b* is first mounted to the mounting portion 106 of the image forming apparatus 1, so that the rotation restriction of the shutter 109 on the apparatus side is released. Then, after mounting the attachment 1090*b*, the toner pack 1090 is mounted on the mounting portion 106. The mechanism by which the rotation restriction of the apparatus-side shutter 109 by the rotation restricting mechanism 112 is released by mounting the attachment 1090*b* to the mounting portion 106 is the same as the case in which the toner pack 100 is mounted on the mounting portion 106, and therefore, the explanation therefor is omitted.

Figure 39:
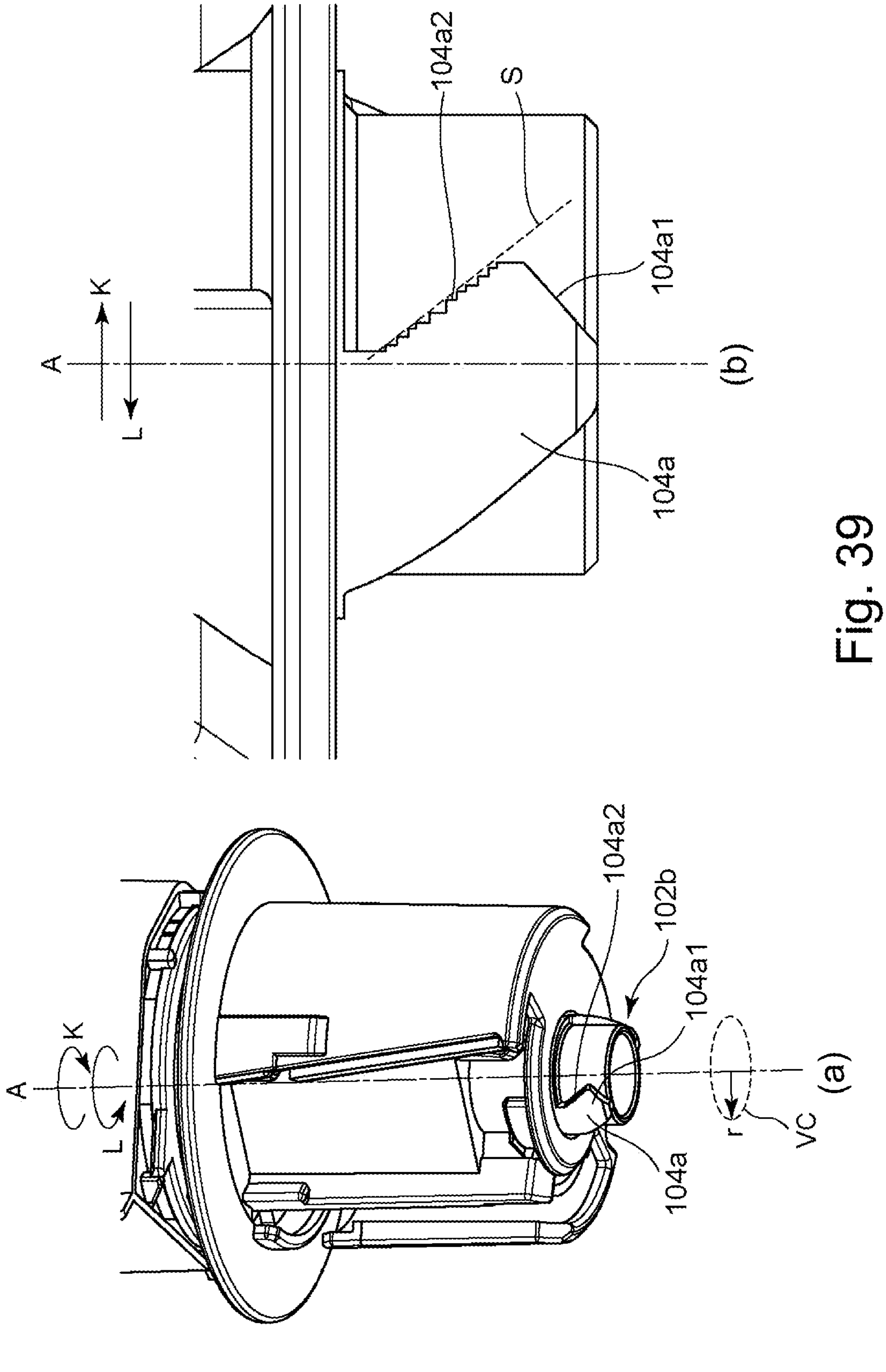
FIG. 39 is enlarged views of a second slope of the restriction releasing portion in Embodiment 1 and Modified Examples 1-9 of Embodiment 1.

Finally, a minute uneven surface formed by finely and alternately repeating a surface parallel to or perpendicular to the rotational axis A as shown in FIG. 39 will be described. In the case that an envelope S of the uneven surface extends in the same direction as the second slope 104*a*2 of the base embodiment or any of the modified examples, it can be regarded as the first slope 104*a*1 or the second slope 104*a*2 of Embodiment 1. The same applies to Embodiment 2 and the modified examples of Embodiment 2 described below.

Embodiment 2

Referring to FIGS. 40 to 71, the structure of Embodiment 2 will be described. The same points as in the above-described embodiment will be omitted. Of the elements disclosed in this embodiment, those corresponding to the members described in Embodiment 1 are assigned the same names as the members of Embodiment 1, and only the points different from those of Embodiment 1 will be described.

(Toner Pack Mounting Portion)

Referring to FIGS. 40 to 45, the structure of the mounting portion 206 will be described. In this embodiment, the mounting portion 206 is a unit for mounting the toner pack 220.

Figure 40:
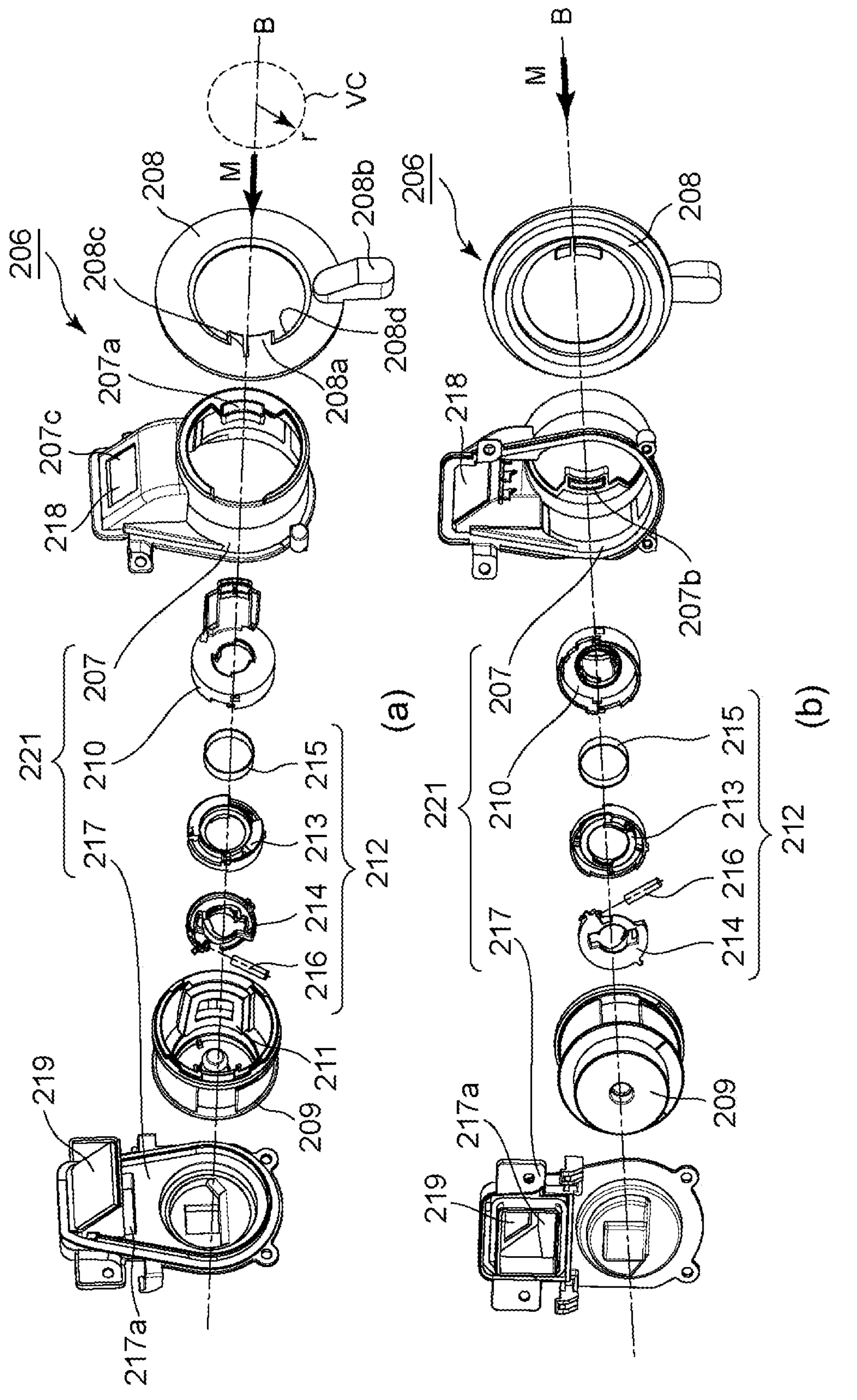
FIG. 40 is exploded perspective views of the mounting portion in Embodiment 2.
Figure 42:
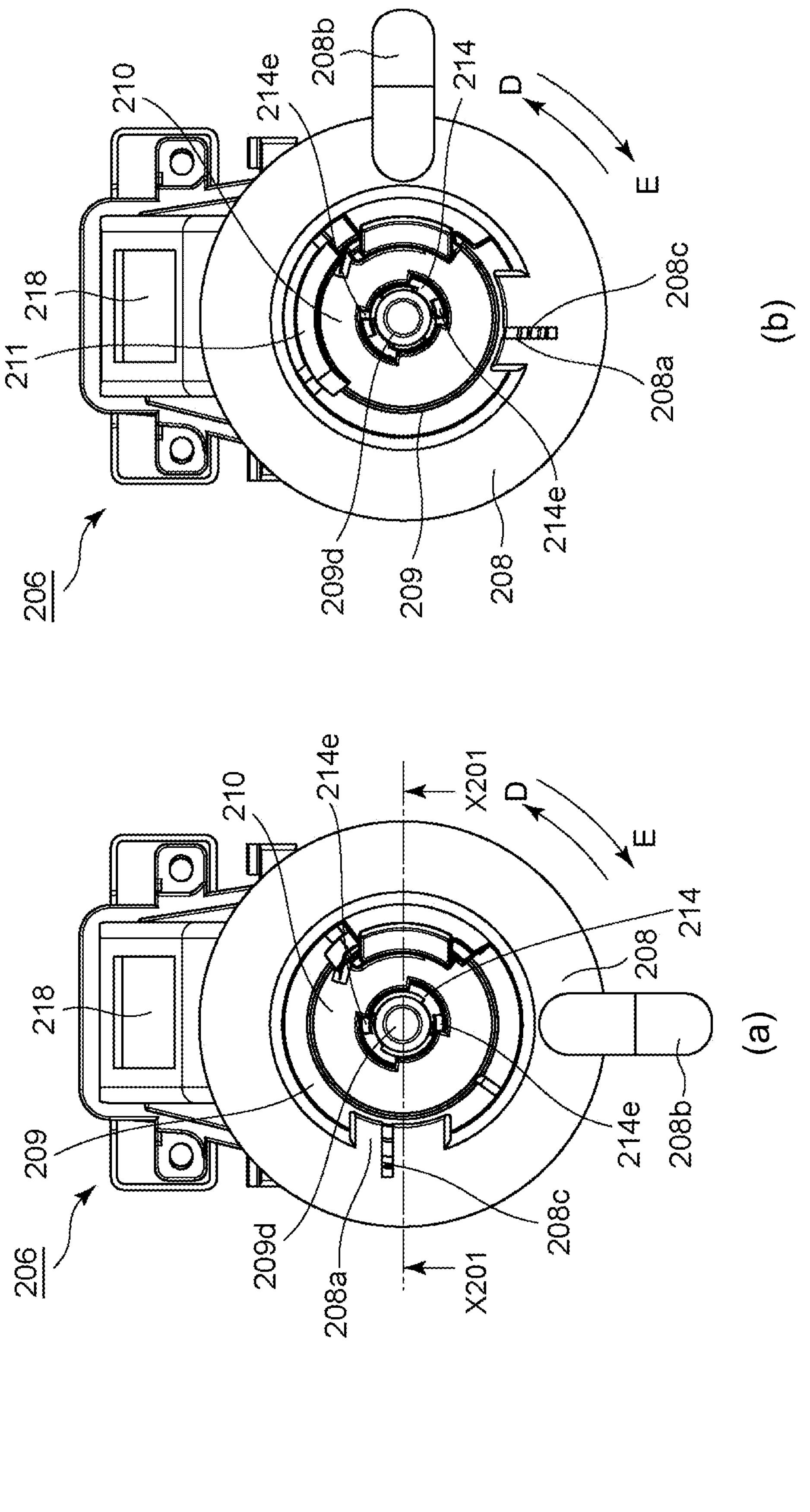
FIG. 42 is views of the mounting portion in Embodiment 2 as viewed from above.
Figure 43:
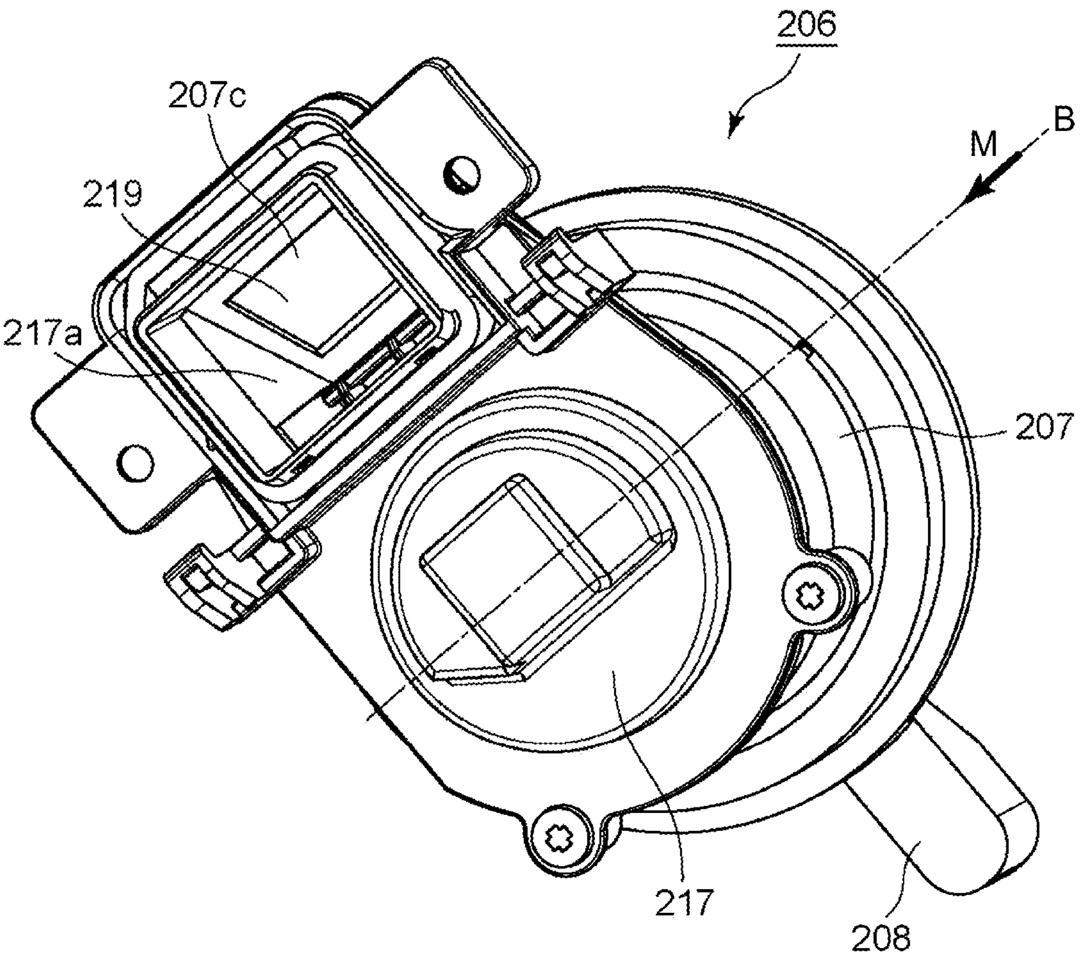
FIG. 43 is a view of the mounting portion in Embodiment 2 as viewed from below.
Figure 44:
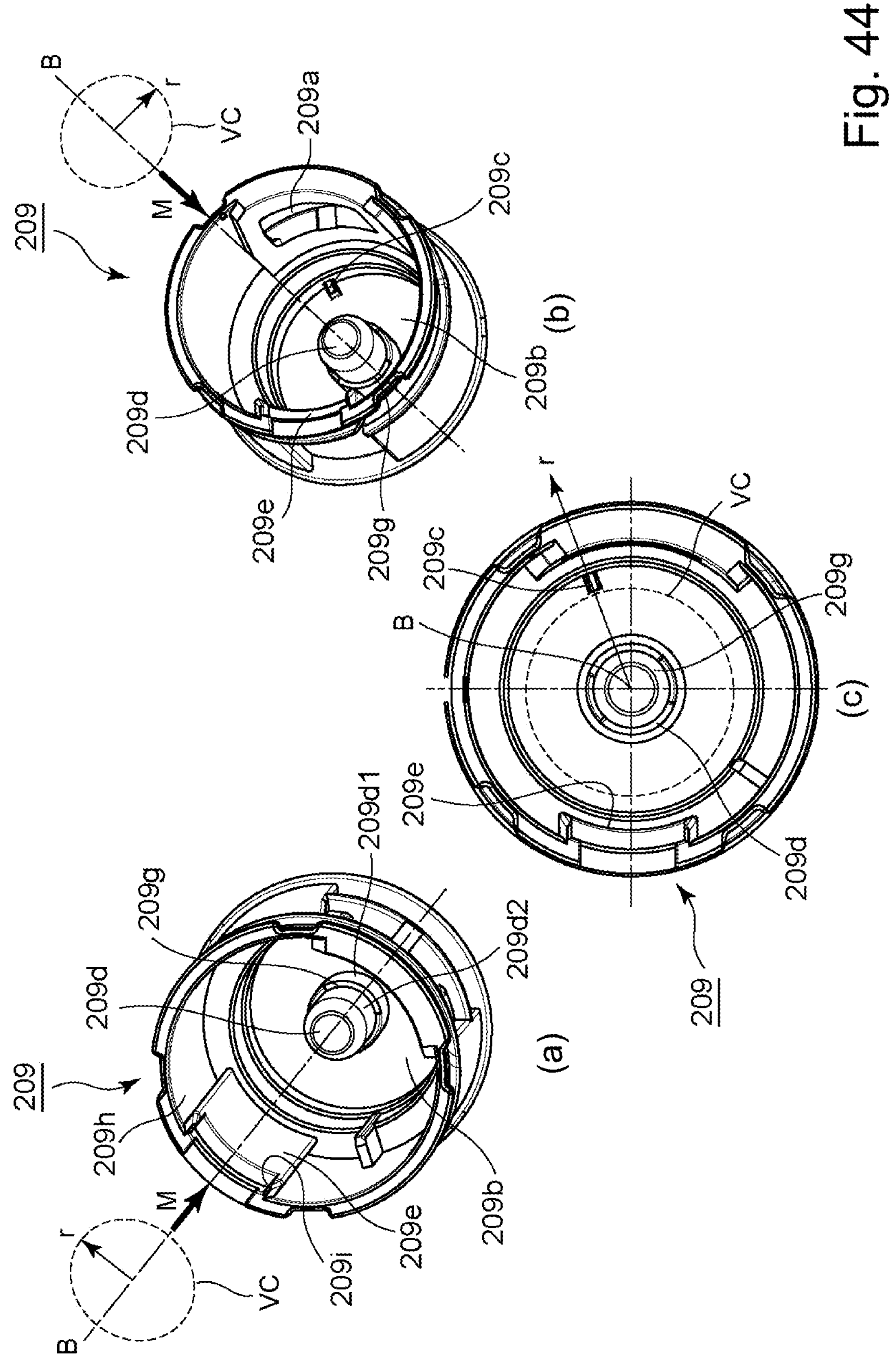
FIG. 44 is perspective views of an apparatus-side shutter in Embodiment 2.
Figure 45:
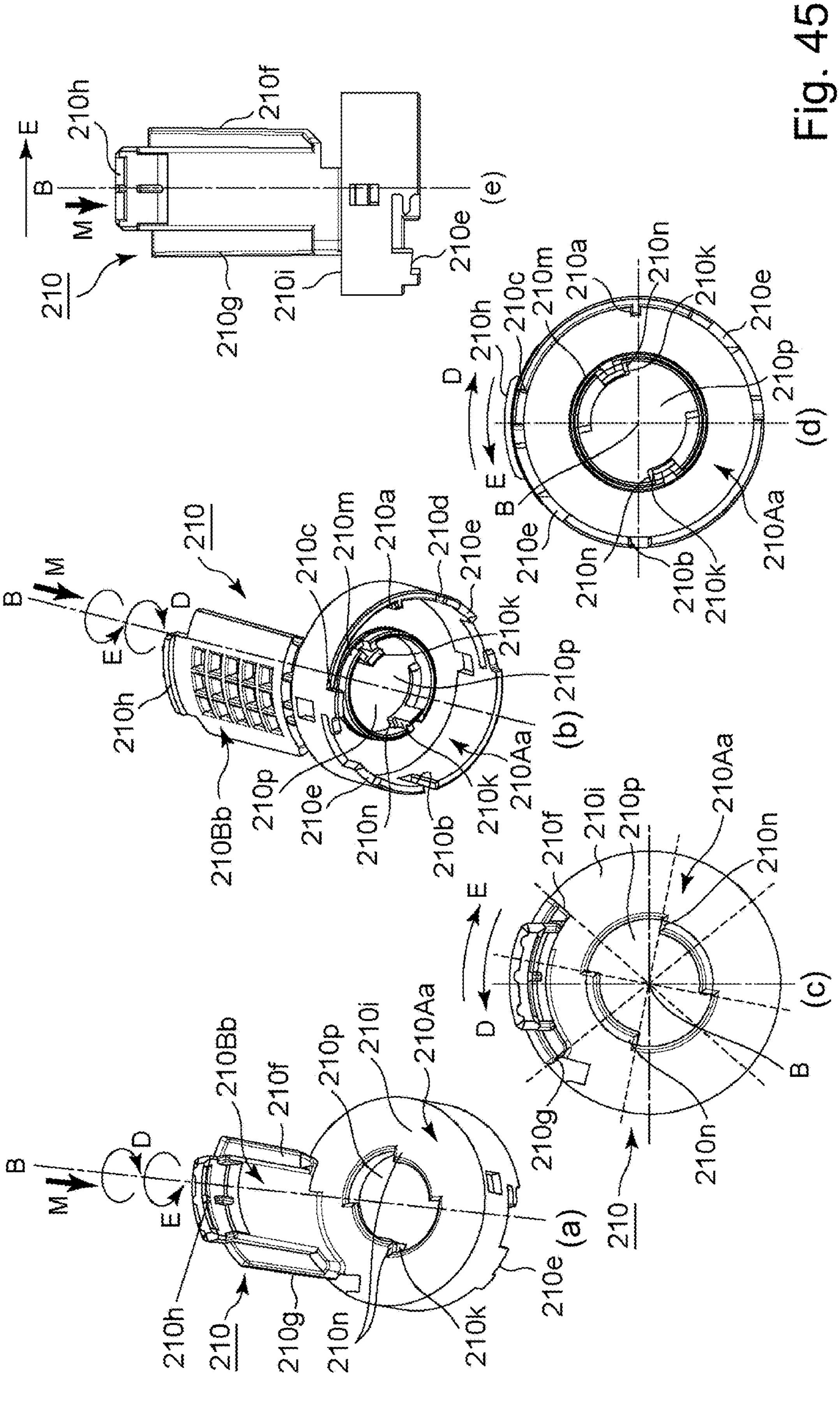
FIG. 45 is perspective views of a cover in Embodiment 2.

Part (a) of FIG. 40 is an exploded perspective view of a mounting portion 206. Part (b) of FIG. 40 is an exploded perspective view of the mounting portion 206 as viewed in a direction different from that of part (a) of FIG. 40. Part (a) of FIG. 41 and part (a) of FIG. 42 are a perspective view illustrating the appearance of the mounting portion 206, and a view as seen in the mounting direction M (direction of the rotational axis B), when the operating lever 208 is in the closed position, respectively. Part (b) of FIG. 41 and part (b) of FIG. 42 are a perspective view illustrating the appearance of the mounting portion 206, and a view as seen in the mounting direction M (the direction of the rotational axis B), when the operating lever 208 is in the open position, as viewed in the mounting direction M, respectively. FIG. 43 is a perspective view of the mounting portion 206 as viewed from the downstream side in the mounting direction M. Part (a) of FIG. 44 is a perspective view of the apparatus-side shutter 209 as viewed from the upstream side in the mounting direction M. Part (b) of FIG. 44 is a perspective view of the apparatus-side shutter 209 as viewed from a point different from that of part (a) of FIG. 44. Part (c) of FIG. 44 is a top view of an apparatus-side shutter 209 as viewed in the mounting direction M. Part (a) of FIG. 45 is a perspective view of a cover 210 as viewed from the upstream side in the mounting direction M. Part (b) of FIG. 45 is a perspective view of the cover 210 as viewed from the downstream side in the mounting direction M. Part (c) of FIG. 45 is a top view of the cover 210 as viewed in the mounting direction M. Part (d) of FIG. 45 is a bottom view of the cover 210 as viewed in the mounting direction M. Part (e) of FIG. 45 is a side view of the cover 210 as viewed in a direction perpendicular to the mounting direction M.

Figure 41:
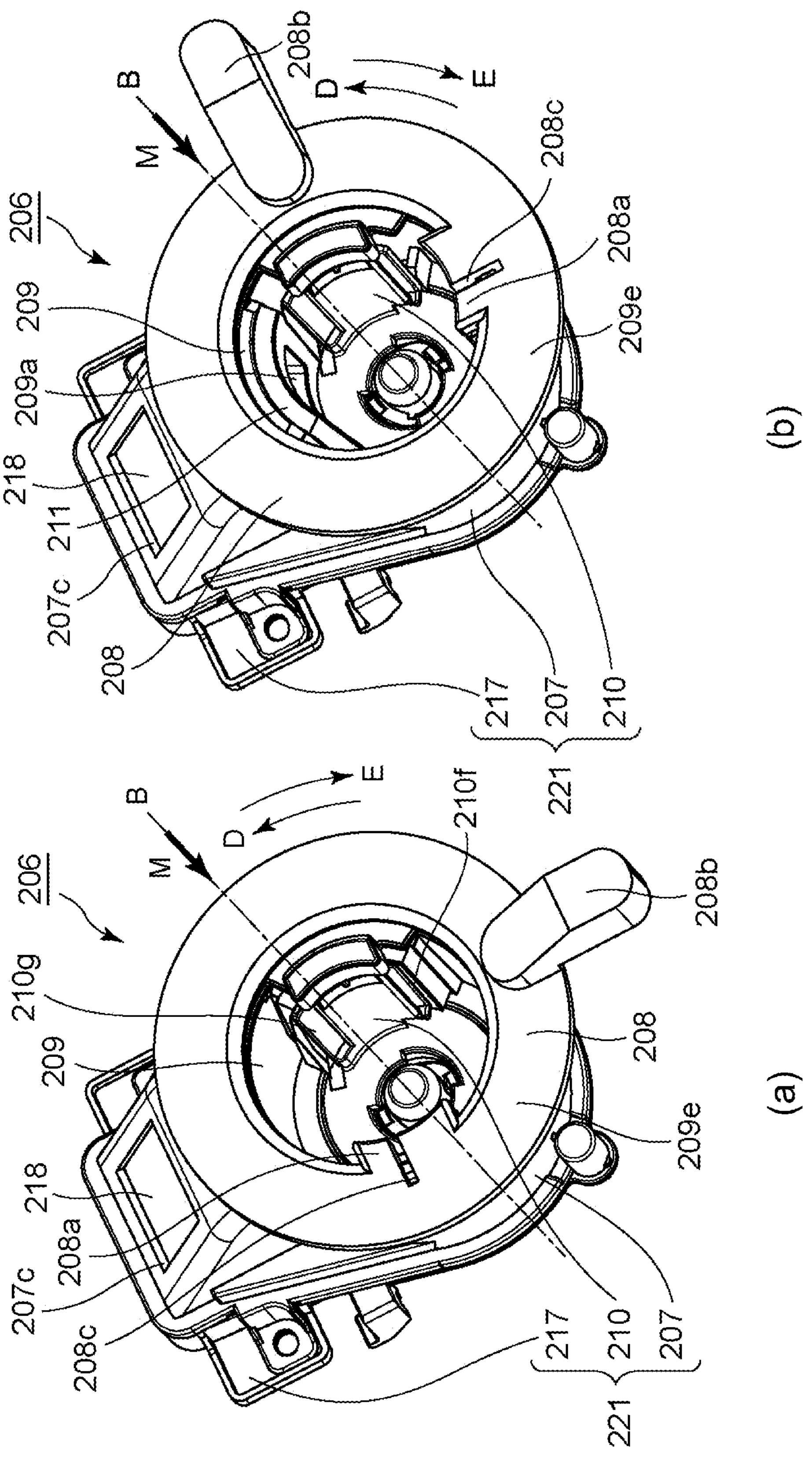
FIG. 41 is external perspective views of the mounting portion in Embodiment 2.

The mounting portion 206 shown in FIGS. 40 and 41 is provided with a base frame 221 including a first frame 207, a second frame 217, and a cover 210. The cover 210 and the second frame 217 are fixed to the first frame 207. A first filter 218 having a predetermined air flow rate is mounted to an air hole 207*c* of the first frame 207. Further, a second filter 219 having a predetermined air flow rate is also mounted to the second frame 217. As shown in FIG. 45, the cover 210 is provided with an engaged portion 210*h* which engages with an engaging portion 207*b* (see part (b) of FIG. 40 of the first frame 207 so that the cover 210 does not move relative to the first frame 207. The first frame 207, the cover 210, and the second frame 217 may be an integral member instead of separate members. As shown in FIGS. 40 and 43, the second frame 217 is provided with an apparatus-side opening 217*a* (frame opening, receiving opening), and the apparatus-side opening 217*a* is in fluid communication with a toner accommodating chamber 36 (second accommodating portion) of the developing device 30 (see part (a) of FIG. 1). The mounting portion 206 and the toner accommodating chamber 36 form a toner accommodating unit.

As shown in FIG. 41, the operating lever 208 and the apparatus-side shutter 209 (second shutter) are rotatable about the rotational axis B (central axis) relative to the base frame 221 in the rotational direction D (first rotation) and in the rotational direction E (second rotational direction). The rotational direction E is opposite to the direction of the rotational direction D.

As shown in part (a) of FIG. 40, the first frame 207 is provided with a positioning portion 207*a*. The positioning portion 207*a* projects inward from the inner peripheral surface of the first frame 207 centered on the rotational axis B in the radial direction r of the imaginary circle VC centered on the rotational axis B. In addition, the operating lever 208 is provided with a drive transmission portion 208*a* (lever projection) and an operating portion 208*b*. The drive transmission portion 208*a* is provided with a slit 208*c*. The drive transmission portion 208*a* of the operating lever 208 is a projection projecting inward from the inner peripheral surface 208*d* centering on the rotational axis B of the operating lever 208 in the radial direction r of the imaginary circle VC centered on the rotational axis B.

As shown in FIG. 44, the apparatus-side shutter 209 is a cylindrical member provided with an open top end, a bottom surface 209*b*, and on the apparatus-side lateral portion having an inner peripheral surface 209*h* (radial positioning) centered on the rotational axis B. The bottom surface 209*b* is provided with a center boss 209*d* (positioning shaft, shaft portion) and a restricted rib 209*c* (rotation restricted portion). A receiving opening 209*a* (second shutter opening, apparatus-side shutter opening) and a driven transmission portion 209*e* (pushed portion, shutter projection) are provided on the apparatus-side shutter lateral portion of the apparatus-side shutter 209. The center boss 209*d* has a pack contact surface 209*g* (positioning in the mounting direction) facing upward.

The center boss 209*d* is a shaft having a central axis of the rotational axis B, and projects above the bottom surface 209*b* (in the direction opposite to the mounting direction M). As shown in part (c) of FIG. 44, the restricted rib 209*c* is provided outside the center boss 209*d* in the radial direction r of the imaginary circle VC centered on the rotational axis B. As shown in part (a) of FIG. 44 and part (b) of FIG. 44, the restricted rib 209*c* projects upward from the bottom surface 209*b* in the direction of the rotational axis B. As shown in part (c) of FIG. 44, the driven transmission portion 209*e* is a projection which projects inward in the radial direction r of the imaginary circle VC. In addition, the driven transmission portion 209*e* is provided outside the restricted rib 209*c* in the radial direction r of the imaginary circle VC. As shown in part (b) of FIG. 41, an apparatus-side seal 211 is mounted around the receiving opening 209*a*.

Here, the apparatus-side shutter 209 is movable relative to the base frame 221 between a closed position in which the receiving opening 209*a* is closed by the apparatus-side seal 211 and the cover 210, and an open position in which said receiving opening is not closed by the cover 210 and is opened. As shown in part (a) of FIG. 41 and part (a) of FIG. 42, the closed position is such that the receiving opening 209*a* of the apparatus-side shutter 209 and the apparatus-side opening 217*a* of the second frame 217 shown in FIG. 43 are not in fluid communication with each other. As shown in part (b) of FIG. 41 and part (b) of FIG. 42, the open position is a fluid communication position in which the receiving opening 209*a* of the apparatus-side shutter 209 and the apparatus-side opening 217*a* of the second frame 217 are in fluid communication with each other. As the apparatus-side shutter 209 rotates in the rotational direction D from the closed position (non-communication position) to the open position (communication position), the toner of the developing device 30 is enabled to replenish (supply) the toner into the accommodating chamber 36 from the toner pack 220 by way of the receiving opening 209*a*. When the apparatus-side shutter 209 rotates in the rotational direction E from the open position to the closed position, it becomes impossible to supply toner from the toner pack 220 into the toner accommodating chamber 36 of the developing device 30 by way of the receiving opening 209*a*.

The operating lever 208 and the apparatus-side shutter 209 are not directly engaged with each other, and therefore, the apparatus-side shutter 209 does not rotate even if the operating lever 208 is operated without the toner pack 220 mounted.

(Device Side Shutter Rotation Restriction Mechanism)

As shown in FIG. 40, the mounting portion 206 of the image forming apparatus 1 includes a rotation restricting mechanism 212 having a restricting member 213, a releasing member 214, a restricting spring 215, and a releasing spring 216.

Figure 47:
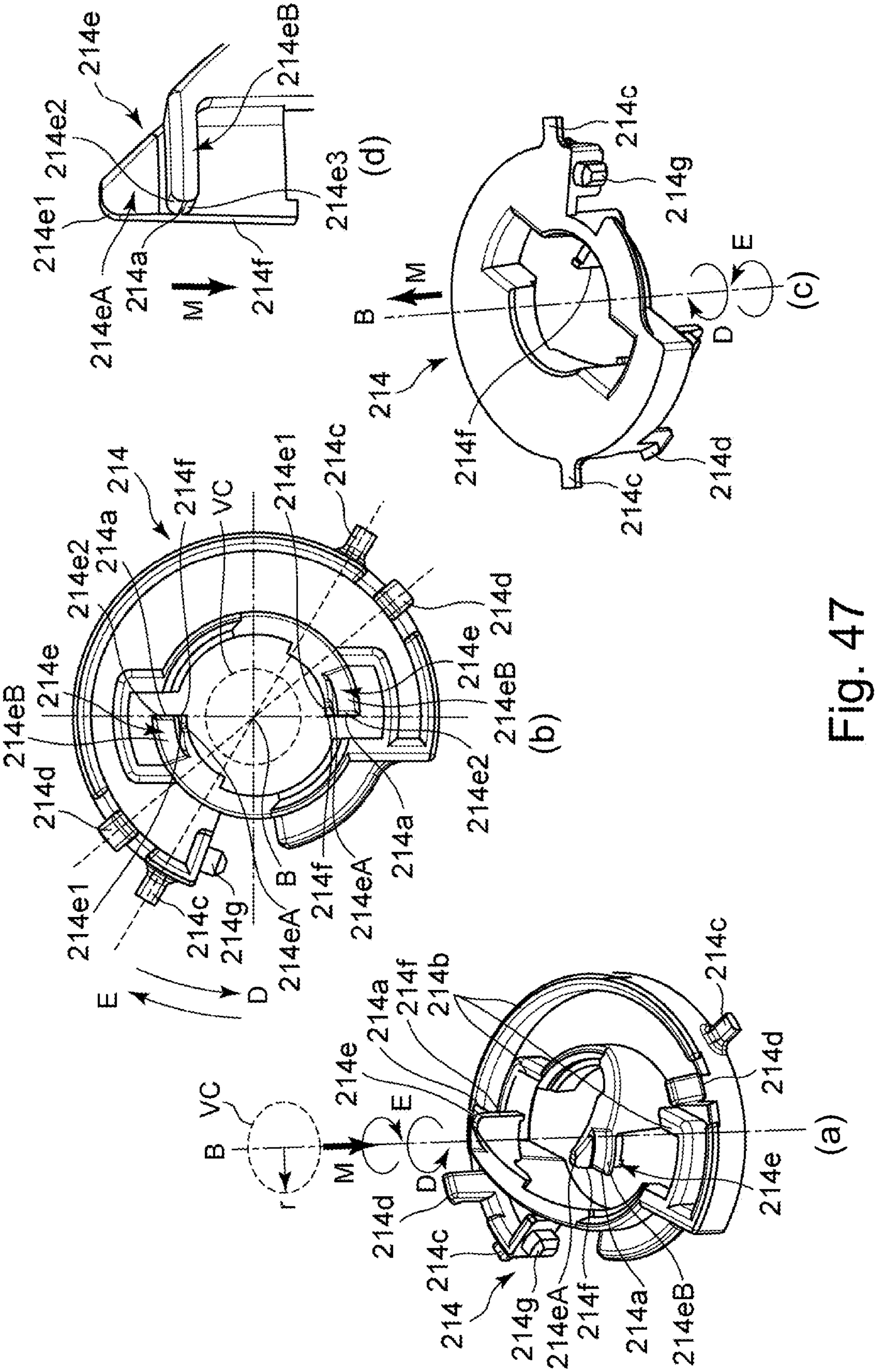
FIG. 47 is perspective views of a releasing member in Embodiment 2.
Figure 48:
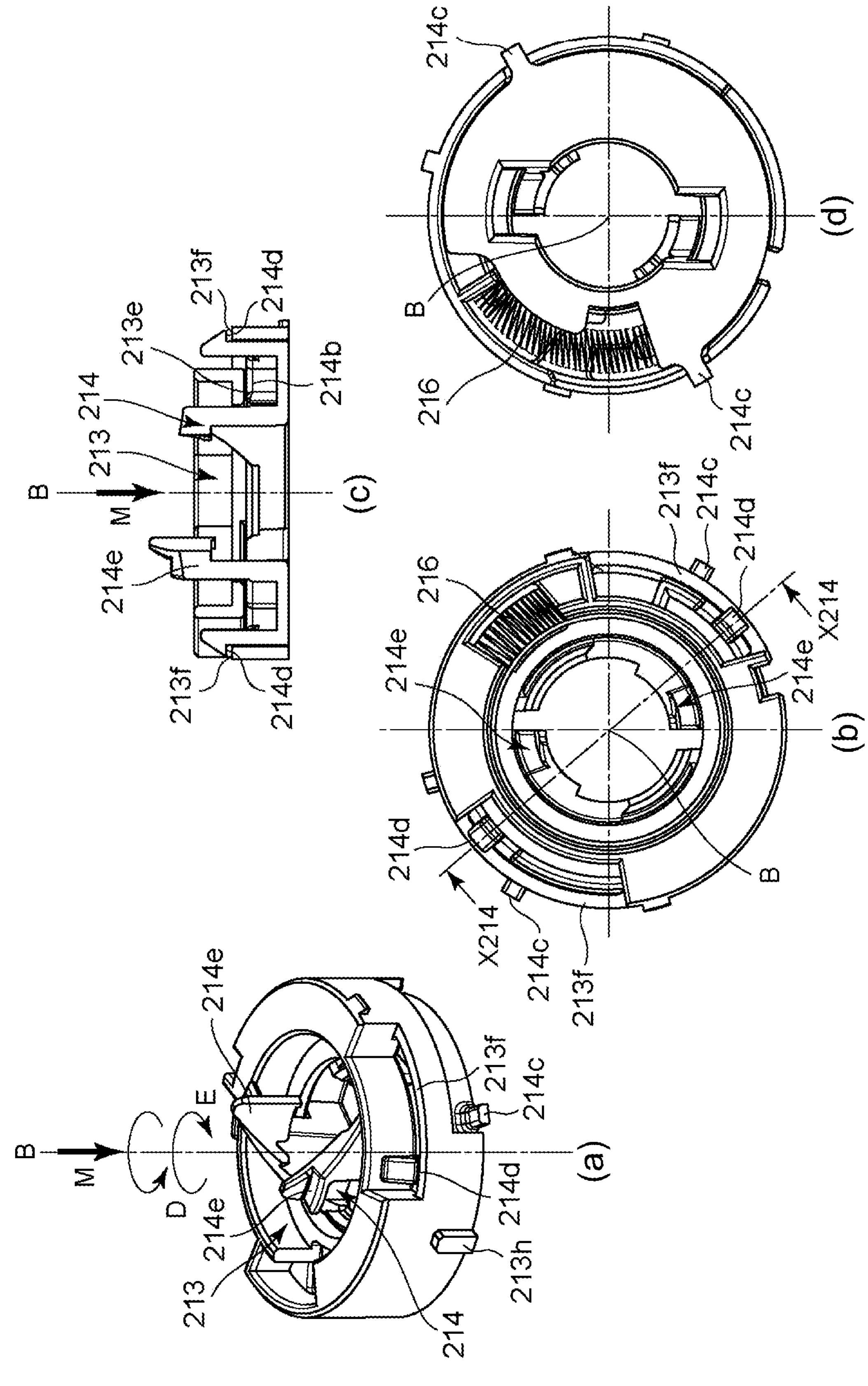
FIG. 48 is perspective views of a unit in which a restriction member and a releasing member are assembled in Embodiment 2.
Figure 49:
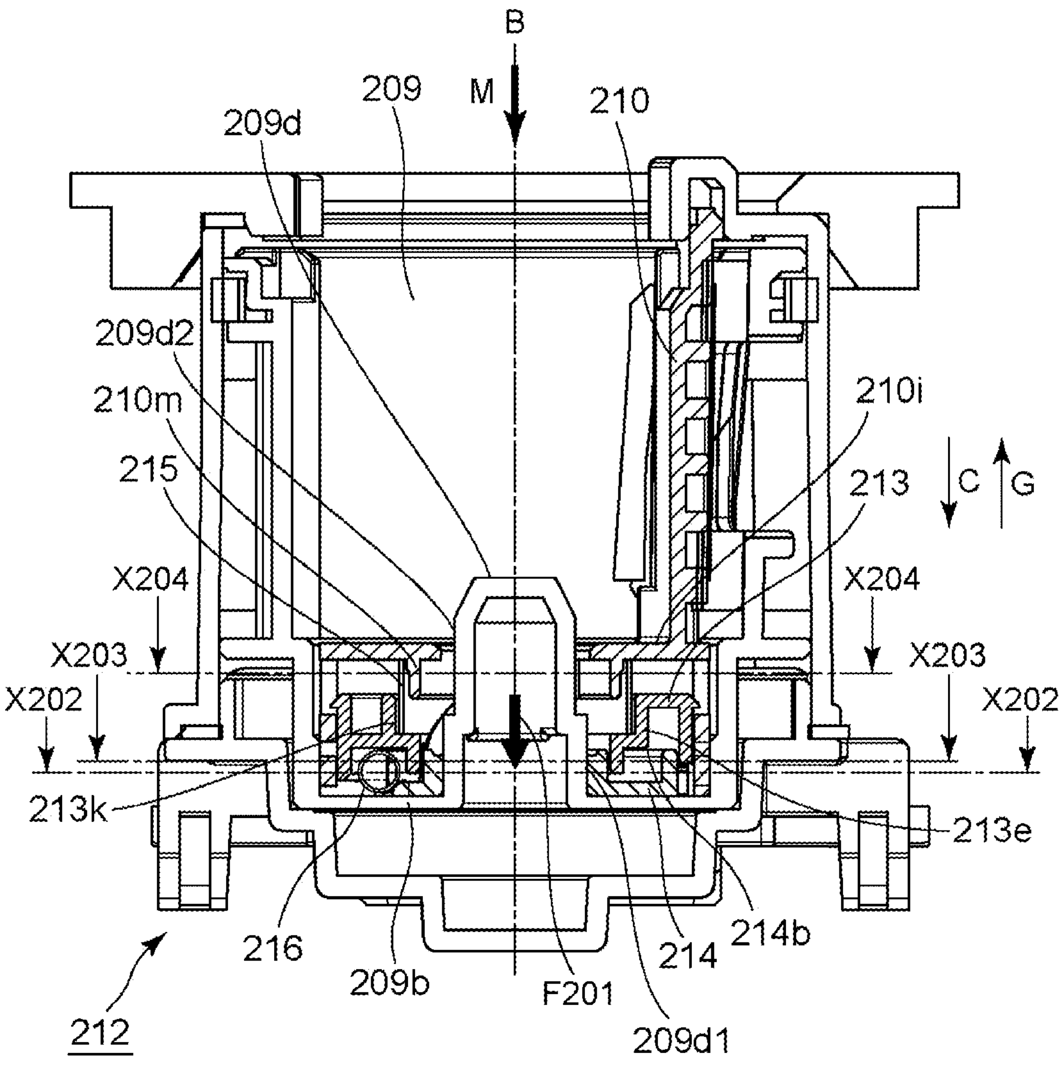
FIG. 49 is a sectional view of a mounting portion in Embodiment 2 (when the shutter rotation on the apparatus-side is restricted).
Figure 50:
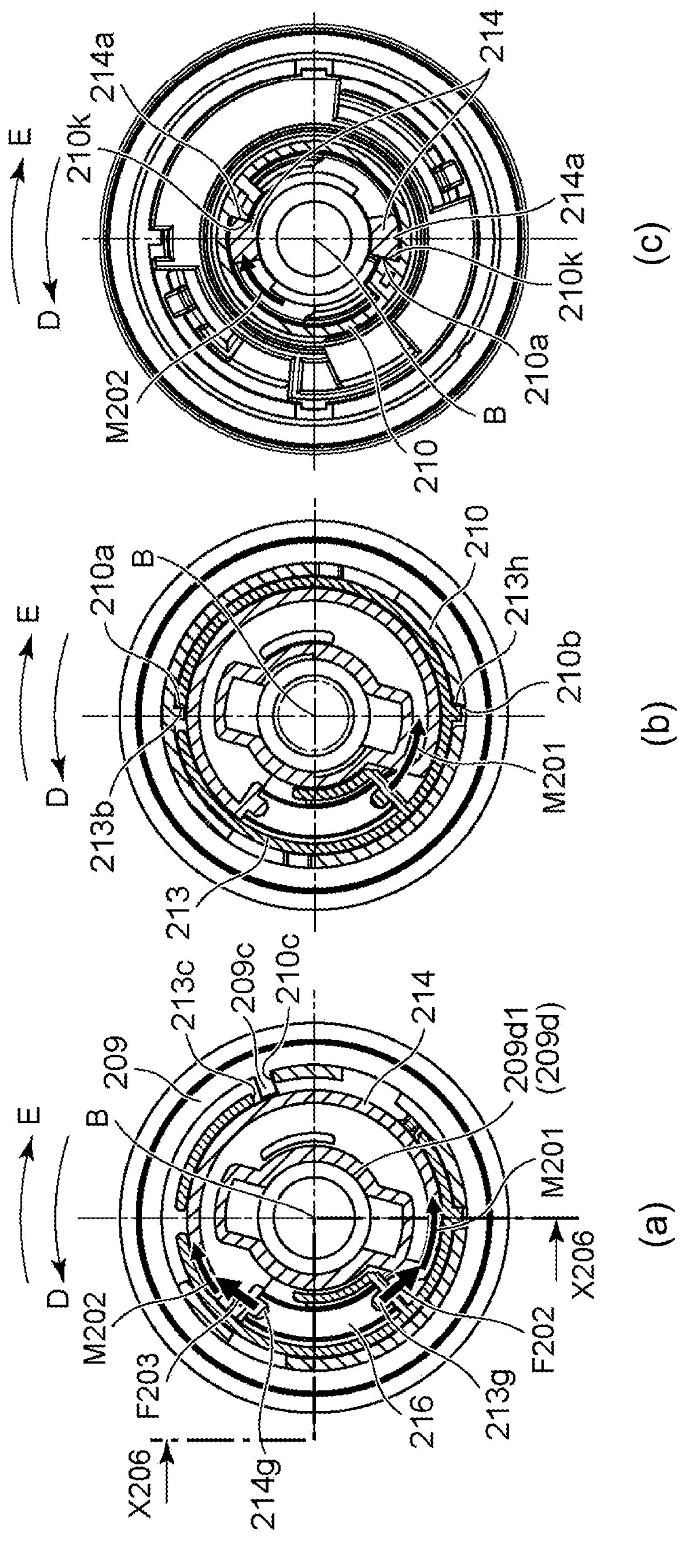
FIG. 50 is cross-sectional views illustrating a position of the releasing member relative to the restriction member in Embodiment 2.

Referring to FIGS. 46 to 50, The rotation restricting mechanism 212 will be described. In FIGS. 49 and 50, the cut surfaces of the cover 210, the restricting member 213, and the releasing member 214 are shaded for better illustration.

It may happen that when the toner pack 220 is not mounted on the mounting portion 206, the apparatus-side shutter 209 is rotated more than a predetermined amount from the closed position to the open position by an impact (vibration) during distribution of the image forming apparatus 1 or by an erroneous operation by the user. If it happened, it might be difficult for the user to mount the toner pack 220 on the mounting portion 206 when using the image forming apparatus 1. Details on this point will be described hereinafter. In view of this, the image forming apparatus 1 of this embodiment is provided with a rotation restricting mechanism 212 in order to restrict the rotation of the shutter 209 on the apparatus side from the closed position to the open position.

Figure 46:
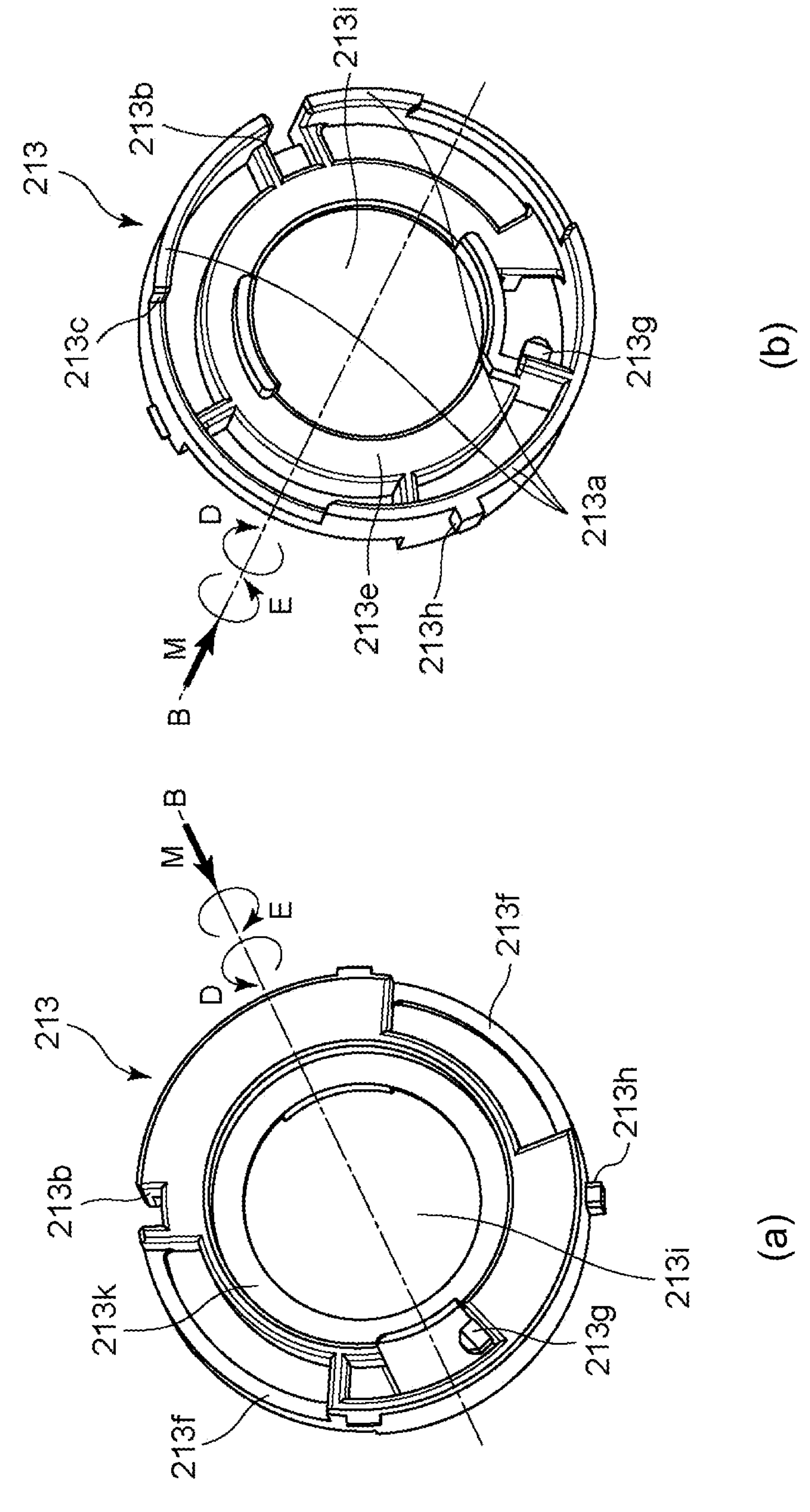
FIG. 46 is perspective views of the restriction member in Embodiment 2.

Part (a) of FIG. 46 is a perspective view of a restricting member 213 as viewed from the upstream side in the mounting direction M. Part (b) of FIG. 46 is a perspective view of the restricting member 213 as viewed from the downstream side in the mounting direction. Part (a) of FIG. 47 is a perspective view of a releasing member 214 as viewed from the upstream side in the mounting direction M. Part (b) of FIG. 47 is a top view of the releasing member 214 as viewed in the mounting direction M. Part (c) of FIG. 47 is a perspective view of the releasing member 214 as viewed from the downstream side in the mounting direction M. Part (d) of FIG. 47 is an enlarged view of a releasing claw 214*e* of the releasing member 214. Part (a) of FIG. 48 is a perspective view of a unit in which the restricting member 213 and the releasing member 214 are assembled. Part (b) of FIG. 48 is a top view of the unit in which the restricting member 213 and the releasing member 214 are assembled as viewed in the mounting direction M. Part (c) of FIG. 48 is a sectional view taken along a line X214-X214 in part (b) of FIG. 48. Part (d) of FIG. 48 is a bottom view of the unit in which the restricting member 213 and the releasing member 214 are assembled, as viewed in the mounting direction M. FIG. 49 is a sectional view taken along a X201-X201 in part (a) of FIG. 42, which is a sectional view taken along a line parallel to the rotational axis B in a state in which the rotation of the apparatus-side shutter 209 from the closed position to the open position is restricted by the rotation restricting mechanism 212. Part (a) of FIG. 50 is a cross-sectional view taken along a line X202-X202 in FIG. 49. Part (b) of FIG. 50 is a cross-sectional view taken along a line X203-X203 in FIG. 49. Part (c) of FIG. 50 is a cross-sectional view taken along a line X204-X204 in FIG. 49.

As shown in FIG. 49, a restricting member 213, a releasing member 214, a restricting spring 215, and a releasing spring 216 are provided inside the apparatus-side shutter 209.

As shown in part (a) of FIG. 46 and part (b) of FIG. 46, the restricting member 213 is an annular member provided with a central hole 213*i* centered on the rotational axis B. The restricting member 213 has a function of restricting the rotation of the apparatus-side shutter 209, which will be described hereinafter. The restricting member has a lower surface 213*a*, a first contact surface 213*b*, a second contact surface 213*h*, a second restricting surface 213*c* (rotation restriction portion), a contacted surface 213*e*, a pair of locked surfaces 213*f*, a release spring engaging portion 213*g* and a restriction spring engaging portion 213*k*. The first contact surface 213*b* and the second contact surface 213*h* are end surfaces on the downstream side in the rotational direction D of the apparatus-side shutter 209. The second restricting surface 213*c* is an end surface on the downstream side in the rotational direction E of the apparatus-side shutter 209.

The locked surface 213*f* is an end surface (upper surface) on the upstream side in the mounting direction M. The lower surface 213*a* is an end surface (bottom surface) on the downstream side in the mounting direction M. The release spring engaging portion 213*g* is a projection projecting in the rotational direction E. The restriction spring engaging portion 213*k* is a recess recessed in the mounting direction M.

As shown in part (a) of FIG. 47 and part (b) of FIG. 47, the releasing member 214 (guided member, engaged member) includes a pair of releasing claws 214*e* (first engaging claws and second engaging claws, a pair of engaged portions) having shapes of 180-degree rotationally symmetry centered on the rotational axis B. The releasing claw 214*e* extends in the direction opposite to the mounting direction M (upward).

As shown in part (d) of FIG. 47, the releasing claw 214*e* is provided with a first guided portion 214*e*A (first contacted portion, first engaged portion) and a second guided portion 214*e*B (second contacted portion, second engaged portion). As shown in part (a) of FIG. 47 and part (b) of FIG. 47, the second guided portion 214*e*B is placed at a position which is more remote from the rotational axis B than the first guided portion 214*e*A in the radial direction r of the imaginary circle VC downwardly in the direction of the axis of rotation B.

As shown in part (d) of FIG. 47, the first guided portion 214*e*A has a first guided surface 214*e*1 and a contact surface 214*f*. The second guided portion 214*e*B has a contact surface 214*a*, a second guided surface 214*e*2 (first engaged surface), and a third guided surface 214*e*3 (second engaged surface).

As shown in part (b) of FIG. 47, the contact surface 214*f* and the contact surface 214*a* are end surface s, on the downstream side in the rotational direction E about the rotational axis B, of the releasing claw 214*e*, and they are at the same positions in the circumferential direction of the imaginary circle VC. The contact surface 214*a* is placed outside the contact surface 214*f* in the radial direction r of the imaginary circle VC centered on the rotational axis B.

The first guided surface 214*e*1 is placed on the upstream side in the mounting direction M with respect to the contact surface 214*f*. In other words, the first guided surface 214*e*1 is placed above any of the contact surface 214*f*, the second guided surface 214*e*2, and the third guided surface 214*e*3. The second guided surface 214*e*2 is a surface facing upward. The second guided surface 214*e*2 is placed on the upstream side in the mounting direction M with respect to the contact surface 214*a*. In other words, the second guided surface 214*e*2 is placed above the contact surface 214*a*. The third guided surface 214*e*3 is a surface facing downward. The third guided surface 214*e*3 is placed on the downstream side in the mounting direction M with respect to the contact surface 214*a*. In other words, the third guided surface 214*e*3 is placed below the contact surface 214*a*. That is, the second guided surface 214*e*2 is above the third guided surface 214*e*3. The contact surface 214*a* is between the second guided surface 214*e*2 and the third guided surface 214*e*3 in the mounting direction (direction of rotational axis B, gravity direction).

The releasing member 214 further includes a pair of rise restricted surfaces 214*c* (rising restricted portions), a pair of locking surfaces 214*d*, a release spring engaging portion 214*g*, and a contact surface 214*b*.

The pair of rise restricted surfaces 214*c* and the pair of locking surfaces 214*d* are arranged so as to be 180 degrees symmetric with respect to the rotational axis B. As shown in part (a) of FIG. 47 to part (c) of FIG. 47, the rise restricted surface 214*c* projects outward in the radial direction r of the imaginary circle VC beyond the outer peripheral surface centered on the rotational axis B of the releasing member 214. The locking surface 214*d* is a surface (a surface facing downward) which projects from the outer peripheral surface of the releasing member 214 in the direction opposite to the mounting direction M and which faces the mounting direction M. The release spring engaging portion 214*g* is a projection projecting in the rotational direction D. The contact surface 214*b* is a surface facing upward.

In the state where the restricting member 213 and the releasing member 214 are assembled in, as shown in part (a) of FIG. 48 and part (c) of FIG. 48, the locked surface 213*f* of the restricting member 213 is directly below the locking surface 214*d* of the releasing member 214 and faces the locking surface 214*d*. Therefore, the structure is such that even if an attempt is made to move the restricting member 213 upward, it cannot be moved because the locked surface 213*f* of the restricting member 213 is locked to the locking surface 214*d* of the releasing member 214 unless the releasing member 214 is moved upward. As shown in part (c) of FIG. 48, the contact surface 214*b* of the releasing member 214 faces the contacted surface 213*e* of the restricting member 213. Therefore, when the releasing member 214 is moved upward, the contact surface 214*b* comes into contact with the contacted surface 213*e* of the restricting member 213, and the releasing member 214 and the restricting member 213 can integrally move upward. In addition, as shown in part (b) of FIG. 48 and part (d) of FIG. 48, between the release spring engaging portion 213*g* of the restricting member 213 and the release spring engaging portion 214*g* of the releasing member 214, there is provided a spring 216. Further, the pair of releasing claws 214*e* project upward through the central hole 213*i* centered on the rotational axis B of the restricting member 213 beyond the upper surface of the restricting member 213.

As shown in FIG. 45, the cover 210 includes a base cover portion 210Aa and a wall portion 210Bb extending upward from the base cover portion 210Aa.

The base cover portion 210Aa includes an upper surface 210*i* provided with a center hole 210*p* (cover opening) centered on the rotational axis B and a pair of eave portions 210*n*, a first contacted surface 210*a*, and a second contacted surface 210*b*, a pair of third contacted surfaces 210*k*, a first restricting surface 210*c*, a pair of rise restricting surfaces 210*e*, and a restriction spring engagement portion 210*m*. The wall portion 210Bb is provided with a side surface 210*f*, a side surface 210*g*, and the above-described engaged portion 210*h*.

As shown in part (b) of FIG. 45 and part (d) of FIG. 45, the first contacted surface 210*a* and the second contacted surface 210*b* are end surfaces on the downstream side in the rotational direction E. The third contacted surface 210*k* is an end surface on the downstream side in the rotational direction D. An eave portion 210*n* is provided on the upstream side of the third contacted surface 210*k* in the mounting direction M. As shown in part (c) of FIG. 45, the third contacted surface 210*k* is structured to be covered by the eave portion 210*n* as viewed from above in the direction of the rotational axis B so as not to be exposed. The pair of rise restricting surfaces 210*e* are surfaces facing the downstream side (downward) in the mounting direction M, and as shown in part (e) of FIG. 45, they include surfaces which extend so as to go in the mounting direction M (downward) as goes in the rotational direction D. The restriction spring engagement portion 210*m* is a cylindrical projection projecting in the mounting direction M.

Here, as shown in FIG. 49, the restricting member 213 and the releasing member 214 are rotatably supported by a large diameter portion 209*d*1 of the center boss 209*d* of the apparatus-side shutter 209. In addition, a part of the rotation restricting mechanism 212 is covered by the upper surface 210*i* of the cover 210. The center boss 209*d* is provided coaxially with the rotational axis B of the apparatus-side shutter 209. As shown in FIG. 49, a restricting spring 215 (second elastic member, second urging member) is mounted between the cover 210 and the restricting member 213. One end and the other end of the restricting spring 215 are engaged with the restriction spring engagement portion 210*m* of the cover 210 and the restriction spring engaging portion 213*k* of the restricting member 213, respectively. As shown in part (b) of FIG. 45 and part (d) of FIG. 43, the restricting spring engaging portion 210*m* is an annular rib centered on the rotational axis B, and is inserted into the inner diameter region of the restricting spring 215.

The restricting member 213 is urged in the direction of arrow C in parallel with the rotational axis B by the urging force F201 of the restricting spring 215, and the lower surface 213*a* (see part (b) of FIG. 46 contacts the bottom surface 209*b* of the apparatus-side shutter 209. The arrow C direction is the mounting direction M (gravity direction) of the toner pack 220. Further, as shown in FIG. 50, part (b) of FIG. 48 and part (d) of FIG. 48, in the rotational direction of the apparatus-side shutter 209, the releasing spring 216 (first elastic member, first urging member) is mounted between the restricting member 213 and the releasing member 214. One end and the other end of the releasing spring 216 are engaged with the release spring engaging portion 213*g* of the restricting member 213 and the release spring engaging portion 214*g* of the releasing member 214, respectively. As shown in part (b) of FIG. 50, the restricting member 213 receives a moment M201 in the rotational direction D by the urging force F202 of the releasing spring 216, and the first contact surface 213*b* of the restricting member 213 is brought into contact with the first contacted surface 210*a* of the cover 210, or the second contact surface 213*h* of the restricting member 213 is brought into contact with the second contacted surface 210*b* of the cover 210. By this, the restricting member 213 is restricted from rotating in the rotational direction D.

On the other hand, as shown in part (c) of FIG. 50, the releasing member 114 receives the moment M202 in the rotational direction E by the urging force F203 of the release spring 116, and at least one of the pair of contact surfaces 214*a* is brought into contact with the corresponding one of the third contacted surfaces 210*k* of the cover 210. By this, the rotation of the releasing member 114 in the rotational direction E is restricted, and the position thereof in the rotational direction E relative to the cover 210 is determined.

Here, the cover 210 is fixed to the first frame 207. Therefore, as shown in part (a) of FIG. 50, the restricted rib 209*c* of the apparatus-side shutter 209 is placed between the first restricting surface 210*c* of the cover 210 and the second restricting surface 213*c* of the restricting member 213. For this reason, the rotation of the apparatus-side shutter 209 in the rotational direction D (direction from the closed position to the open position) is restricted by the second restricting surface 213*c* of the restricting member 213. The rotation of the apparatus-side shutter 209 in the rotational direction E (direction from the open position to the closed position) is restricted by the first restricting surface 210*c* of the cover 210.

(Rotation Restriction Release Method)

Referring to FIGS. 51 to 54, a method of releasing the rotation restriction of the apparatus-side shutter 209 by the rotation restricting mechanism 212 will be described. For better illustration, the cut surfaces of the cover 210, the restricting member 213, and the releasing member 214 are shaded.

Figure 51:
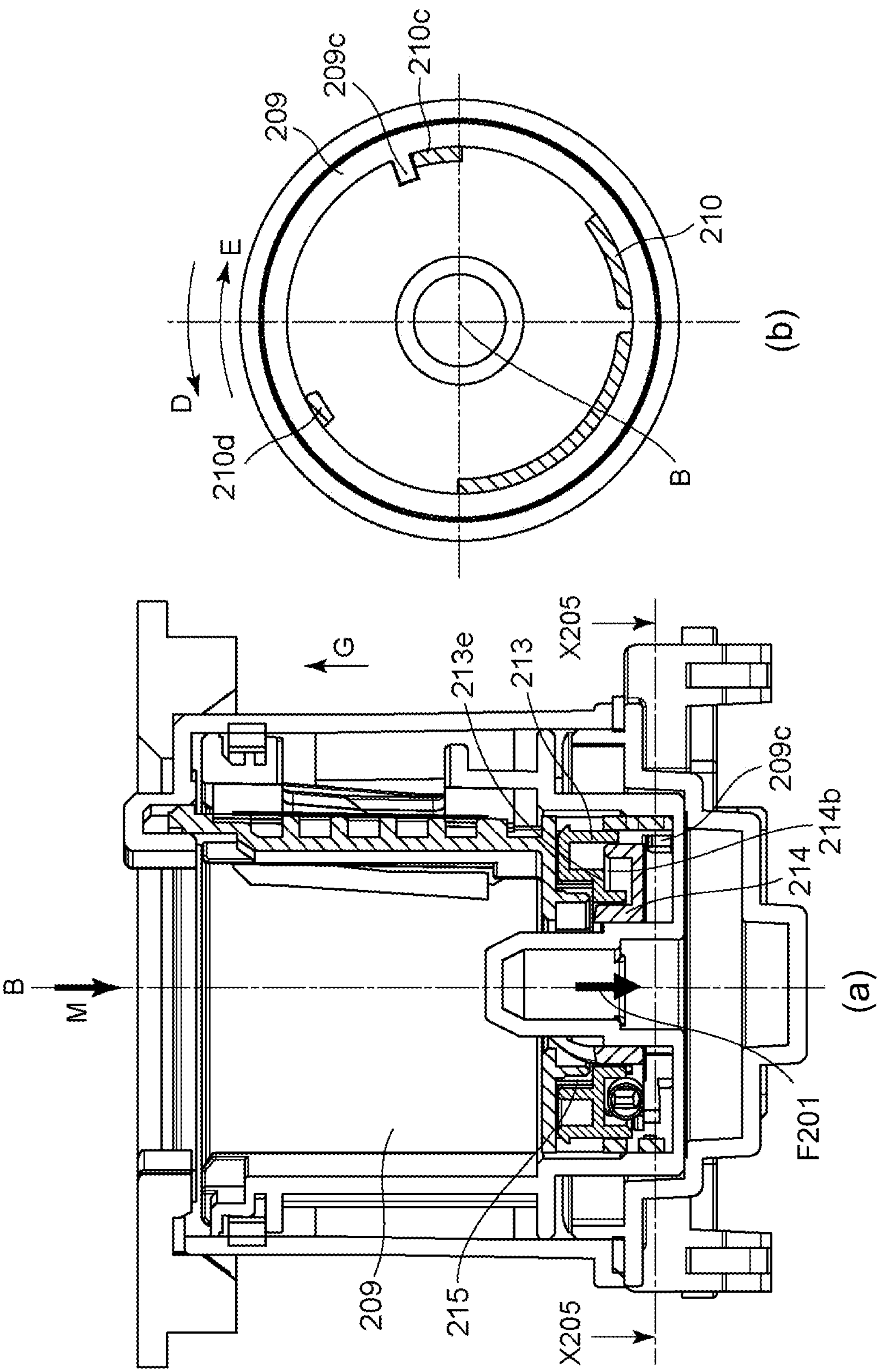
FIG. 51 is sectional views of the mounting portion in Embodiment 2 (when the apparatus-side shutter rotation restriction is released).

Part (a) of FIG. 51 is a sectional view, taken along a line (same as that in FIG. 49) parallel with the rotational axis B, of the mounting portion 206 in a state in which the rotation restriction of the apparatus-side shutter 209 by the rotation restricting mechanism 212 is released. Part (b) of FIG. 51 is a cross-sectional view taken along a line X205-X205 of part (a) of FIG. 51. FIG. 51 shows the state of the mounting portion 206 in which the rotation restriction of the apparatus-side shutter 209 is released when the toner pack 220 is not mounted, for convenience of explanation.

After the first step of rotating the releasing member 214 in the rotational direction D from the state of FIGS. 49 and 50, the second step of moving the releasing member 214 in the arrow G direction (upward) shown in FIG. 49 is carried out. In this embodiment, the first step and the second step are executed by the operation of mounting the toner pack 220 on the mounting portion 106. This will be described after explaining the structure of the toner pack 220. Here, only the structure of the mounting portion 206 will be described. In the second step, the contact surface 214*b* of the releasing member 214 contacts the contacted surface 213*e* of the restricting member 213, and the releasing member 214 and the restricting member 213 are integrally moved in the direction of arrow G against the urging force F201 of the restricting spring 215. Through this second step, the state of releasing the rotation restriction shown in FIG. 51 is reached. The arrow G direction is the direction opposite to the mounting direction M of the toner pack 220.

In the state that the rotation restriction is released, as shown in part (b) of FIG. 51, the second restricting surface 213*c* of the restricting member 213 is retracted upward, from the movement locus (rotation locus) of the restricted rib 209*c* between the closed position and the open position of the apparatus-side shutter 209. The position of the restricting member 213 is referred to as a restriction release position (release position). And, the restricted rib 209*c* (apparatus-side shutter 209) can move between the first restricting surface 210*c* and the third restriction surface 210*d* of the cover 210. The distance between the first restricting surface 210*c* and the third restriction surface 210*d* is such that the apparatus-side shutter 209 can rotate and move between the closed position and the open position. Therefore, the rotation restriction of the apparatus-side shutter 209 is released between the closed position and the open position. That is, the apparatus-side shutter 209 can rotate from the closed position to the open position in the rotational direction D about the rotational axis B. On the other hand, the rotation of the apparatus-side shutter 209 in the rotational direction E from the closed position is restricted by the first restricting surface 210*c* of the cover 210. The amount of movement of the releasing member 214 in the arrow G direction (upward direction) suffices if it is more than the amount necessary to the position in which the second restricting surface 213*c* of the restricting member 213 which moves integrally with the releasing member 214 does not overlap with the restricted rib 209*c* of the apparatus-side shutter 209 in the direction of the rotational axis B.

Here, the rotation restricting mechanism 212 is structured so that the rotation restriction of the apparatus-side shutter 209 is not released when the rotation restricting mechanism 212 is operated starting at the second step without executing the operation of the first step.

Figure 52:
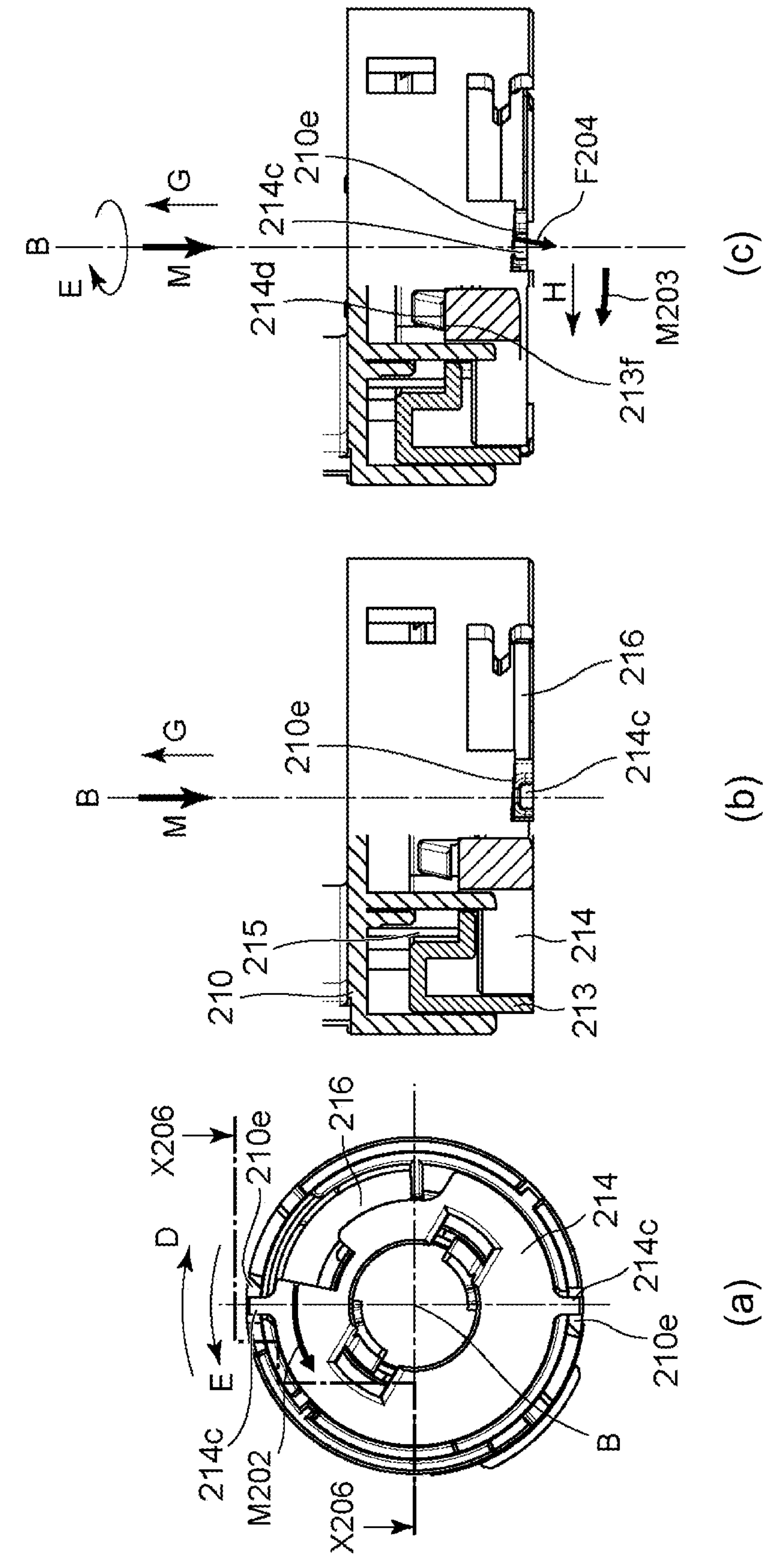
FIG. 52 is sectional views illustrating a position of the releasing member relative to the restriction member in Embodiment 2.

Part (a) of FIG. 52 is a side view of part (a) of FIG. 50 as viewed in the direction of arrow G. Part (b) of FIG. 52 is a sectional view taken along the line X206-X206 of part (a) of FIG. 52. Part (c) of FIG. 52 shows a state in which the restricting member is moved in the direction of arrow G from the state of part (a) of FIG. 52 and part (b) of FIG. 52. For better illustration, only the cover 210, the restricting member 213, the releasing member 214, the restricting spring 215, and the releasing spring 216 are shown, and the restricting member 213 is not shown in a cross-section.

As shown in part (a) of FIG. 52, part (b) of FIG. 52, part (b) of FIG. 45, and part (d) of FIG. 45, the cover 210 is provided with a rise restricting surface 210*e* (rise restricting portion), and the releasing member 214 is provided with an rise restricted surface 214*c* (rise restricted portion). When the restricting member 213 is moved in the arrow G direction without being rotated in the rotational direction D from this state, the locked surface 213*f* of the restricting member 213 comes into contact with the locking surface 214*d* of the releasing member 214. The same structure is provided on the opposite side with respect to the rotational axis B, the restricting member 213 and the releasing member 214 are integrally moved in the arrow G direction (upward). As a result, as shown in part (c) of FIG. 52, the rise restricted surface 214*c* of the releasing member 214 contacts the rise restricting surface 210*e* of the cover 210 to restrict the movement of the releasing member 214 in the arrow G direction, and therefore, the restricting member 213 which moves integrally with the releasing member 214 is also restricted in the movement in the direction of arrow G. Since the amount of movement of the restricting member 213 in the arrow G direction is insufficient, the restricted rib 209*c* of the apparatus-side shutter 209 is maintained in the rotation restricted state by the first restricting surface 210*c* and the second restricting surface 213*c* as shown in part (a) of FIG. 50. At this time, the position (region) in the rotational direction about the rotational axis B of the releasing member 214 at this time is a rise restricted position (rising restricting region). That is, the rise restriction position is the position of the releasing member 214 when the rise restricted surface 214*c* of the releasing member 214 overlaps with the rise restricting surface 210*e* of the cover 110 as viewed in the direction of the rotational axis B. Further, as shown in part (c) of FIG. 52, the rise restricting surface 210*e* and the rise restricted surface 214*c* are inclined so that a force F204 received by the rise restricted surface 214*c* from the rise restricting surface 210*e* has a component in a direction of an arrow H. The rise restricting surface 210*e* and the rise restricted surface 214*c* are inclined downward toward a downstream side in the rotational direction D. The arrow H direction component of the force F204 applies a moment M203 to the releasing member 214 in the rotational direction EBay this, even if the restricting member 213 tends to move in the arrow G direction (upward) due to the vertical vibration of the image forming apparatus 1 during transportation, the releasing member 214 is not easily rotate in the rotational direction D, and therefore, the restriction in the direction of arrow G by the cover 210 is not released.

Next, referring to FIGS. 52 and 53, a process of releasing the rotation restriction of the apparatus-side shutter 209 through the first step and the second step will be described. The first step is a step of rotating the releasing member 214 in the rotational direction D against the moment M202 by the releasing spring 216 until the rise restricted surface 214*c* of the releasing member 214 is out of contact with the rise restricting surface 210*e* of the cover 210.

Figure 53:
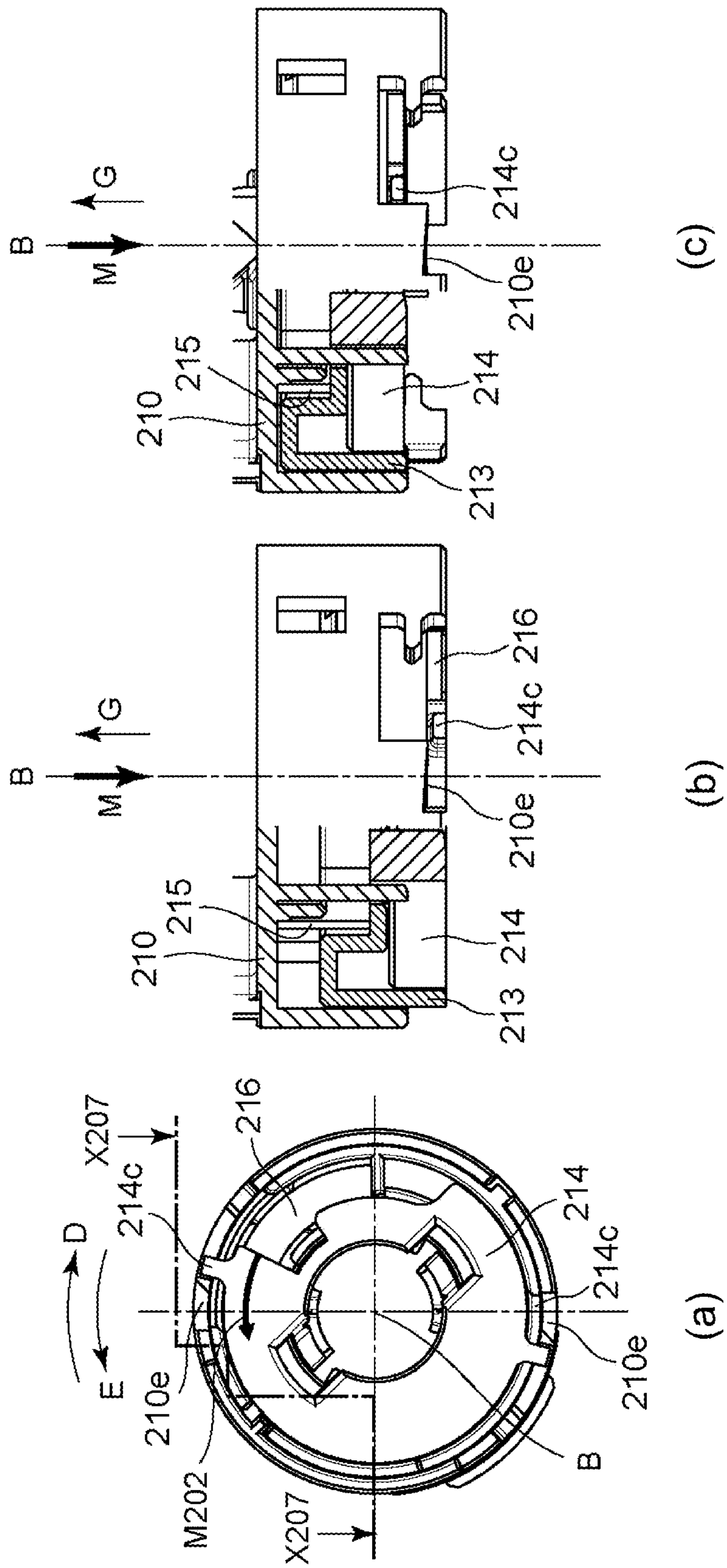
FIG. 53 is sectional views illustrating a position of the releasing member relative to the restriction member in Embodiment 2.
Figure 54:
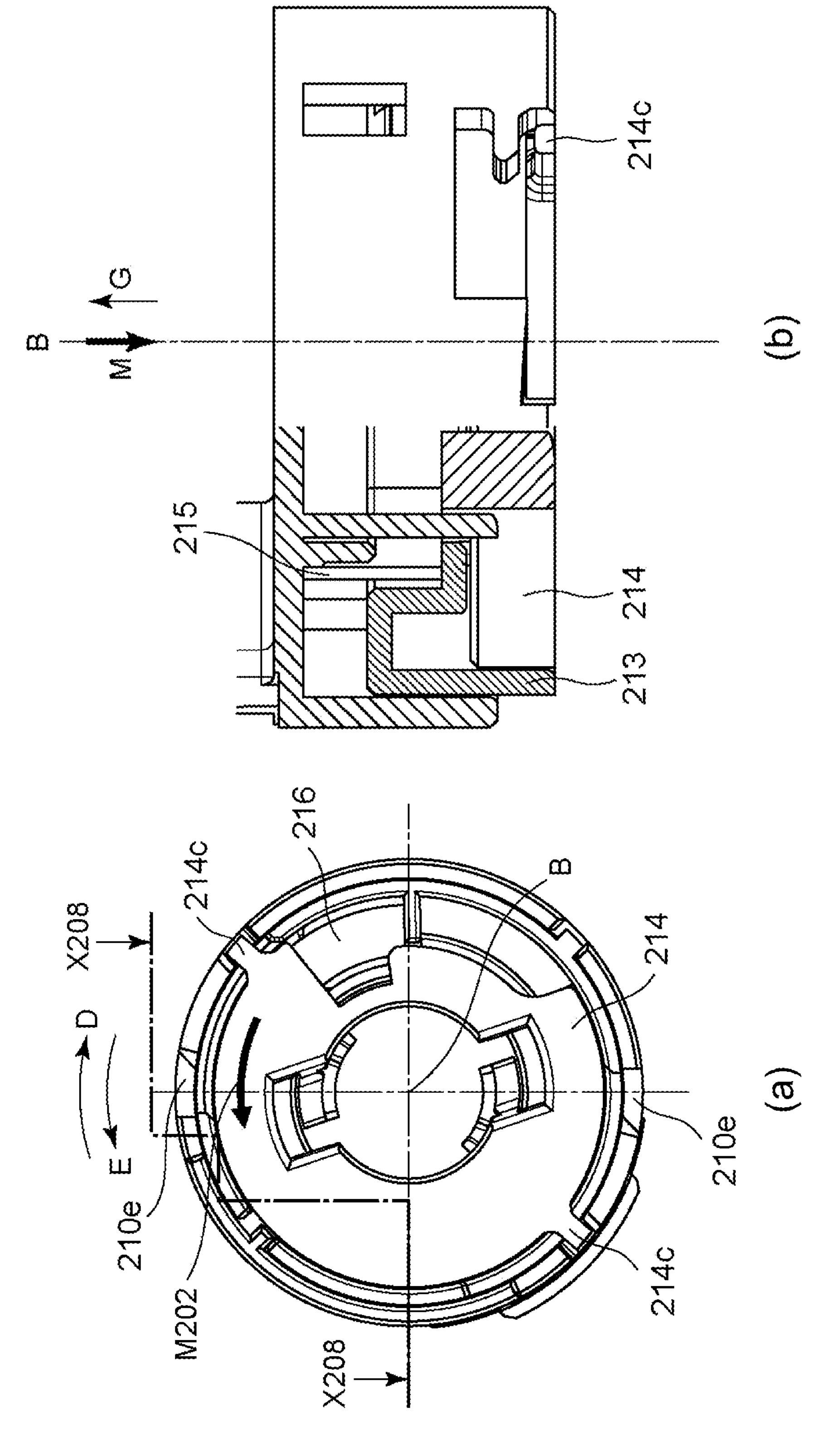
FIG. 54 is cross-sectional views illustrating a position of the releasing member relative to the restriction member in Embodiment 2.

Part (a) of FIG. 53 shows a state in which the first step has been passed from the state in part (a) of FIG. 52. Part (b) of FIG. 53 is a sectional view taken along the line X207-X207 in part (a) of FIG. 53. Part (c) of FIG. 53 shows a state in which the second step has been passed from the state in part (b) of FIG. 53. Part (a) of FIG. 54 shows a state in which the releasing member 214 is further rotated in the rotational direction D from part (a) of FIG. 53. Part (b) of FIG. 54 is a sectional view taken along the line X208-X208 of part (a) of FIG. 54. As in FIG. 52, FIGS. 53 and 54 show only the cover 210, the restricting member 213, the releasing member 214, the restricting spring 215, and the releasing spring 216 for better illustration, and the restricting member 213 is not in a cross-section.

As shown in part (a) of FIG. 53, as viewed in the direction of the rotational axis B, the rise restricted surface 214*c* of the releasing member 214 and the rise restricting surface 210*e* of the cover 210 do not overlap with each other. Therefore, as shown in part (b) of FIG. 53, the restricting member 213 can move integrally with the releasing member 214 in the direction of arrow G. At this time, the position (region) in the rotational direction about the rotational axis B of the releasing member 214 is a rise restriction release position (rise restriction release region). That is, the rise restriction release position is the position (region) of the releasing member 214 when the rise restricted surface 214*c* of the releasing member 214 does not overlap with the rise restricting surface 210*e* of the cover 210 as viewed in the direction of the rotational axis B. The amount of rotation of the releasing member 214 in the rotational direction D in the first step suffices if it is more than an amount by which, as viewed in the direction of the rotational axis B, the rise restricted surface 214*c* of the releasing member 214 does not overlap with the rise restricting surface 210*e* of the cover 210.

The method of releasing the rotation restriction of the apparatus-side shutter 209 includes a first step and a second step after the first step. The first step is a step of rotating the releasing member 214 from the rise restriction release position to the rise restriction release position in the rotational direction D. The second step is a step of moving the releasing member upward together with the restricting member 213 so that the restricting member 213 moves from the restriction position to the restriction release position while the releasing member 214 is in the rise restriction release position. The second step of this embodiment may include an operation of rotating the releasing member 214 in the rotational direction D or the rotational direction E. For example, it may be as shown in FIG. 54 that in the first step, the releasing member 214 is rotated more in the rotational direction D than in part (a) of FIG. 53, and in the second step, the releasing member 214 is moved in the arrow G direction and is rotated in the rotational direction E.

(Toner Pack)

Figure 55:
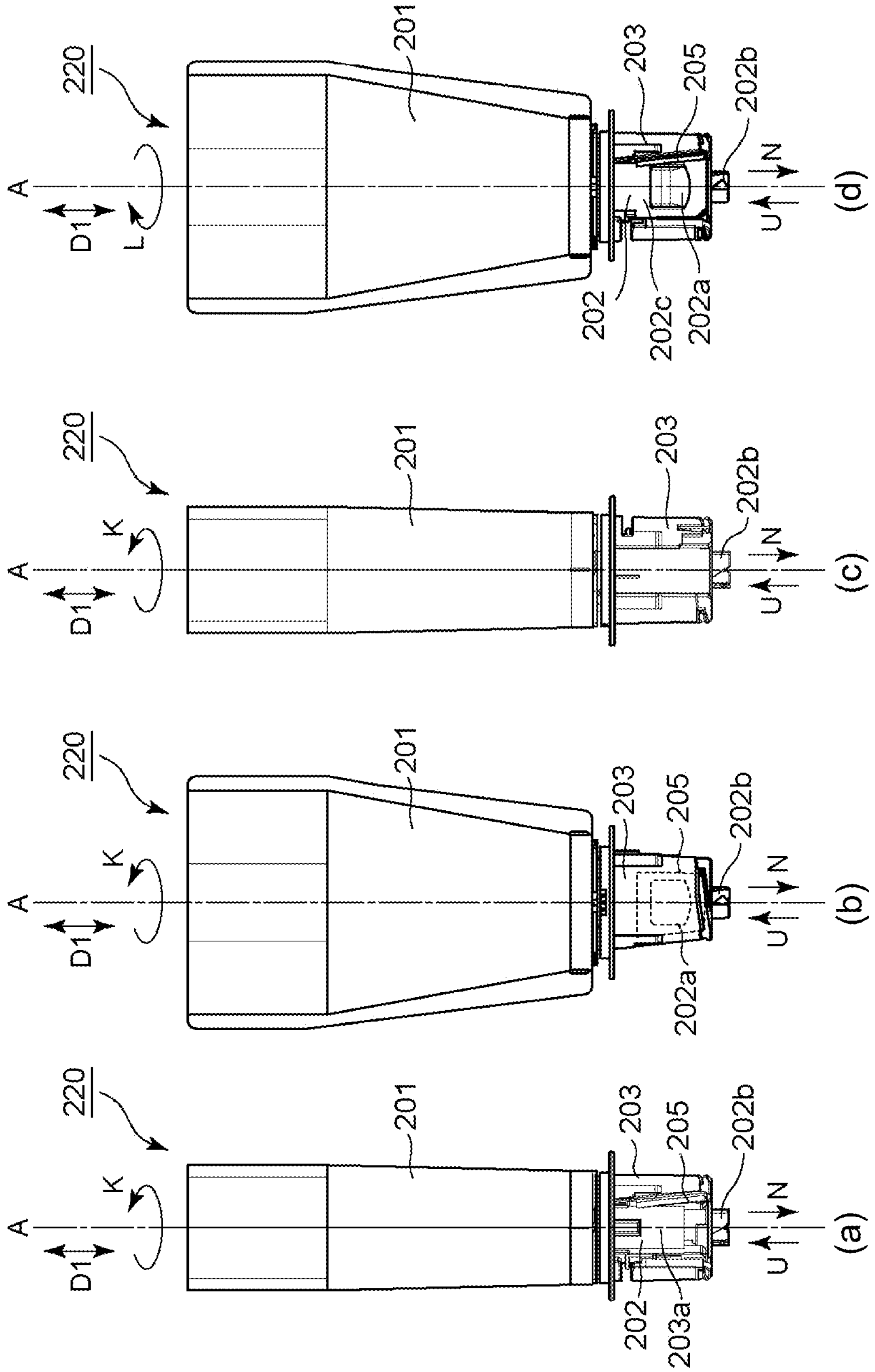
FIG. 55 is a front view, a rear view, and a side view of a toner pack according to Embodiment 2.
Figure 56:
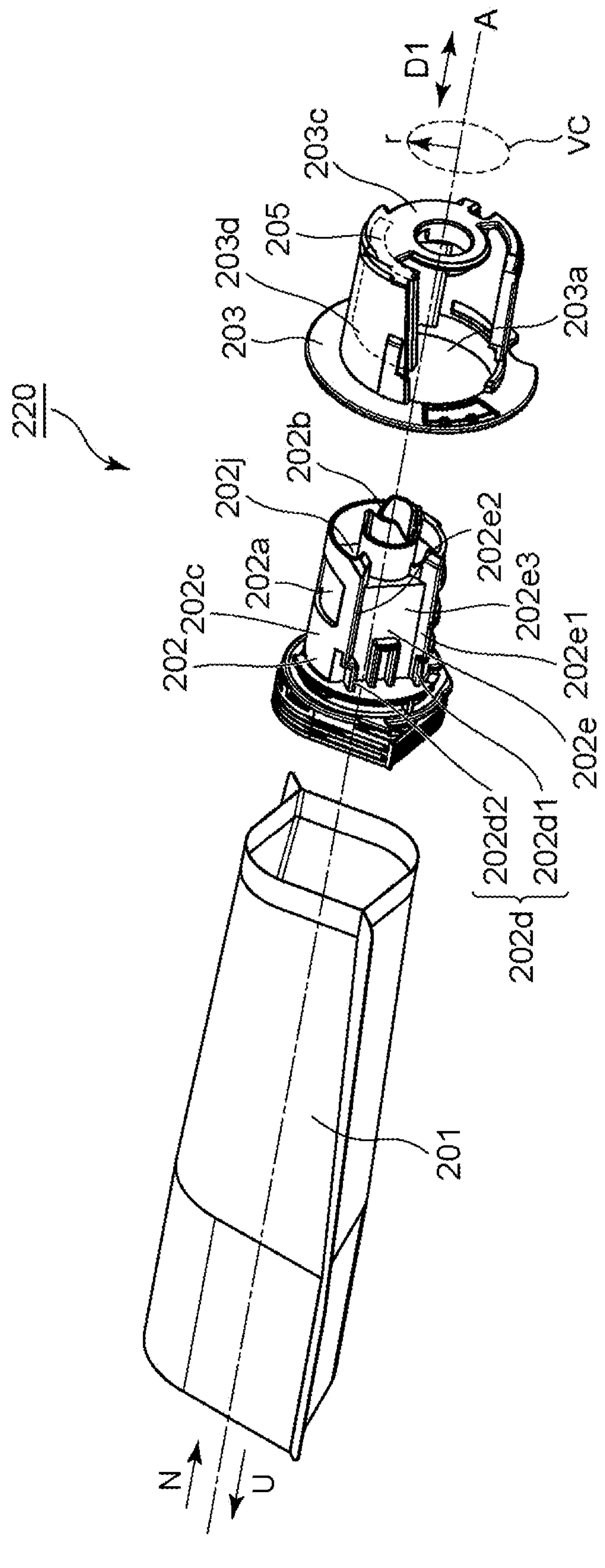
FIG. 56 is an exploded perspective view of the toner pack according to Embodiment 2.

Referring to FIGS. 55 and 56, an overall structure of the toner pack 220 will be described. Part (b) of FIG. 55 is a front view of the toner pack 220 when the pack side shutter 203 is in the closed position. Part (d) of FIG. 55 is a front view of the toner pack 220 when the pack side shutter 203 is in the open position. Part (a) of FIGS. 55 and 55 (*c*) are left side views and right side views of the toner pack 220 of part (b) of FIG. 55, respectively. FIG. 56 is an exploded perspective view of the toner pack 220. The arrow N direction and the arrow U direction are parallel to the rotational axis A. When the toner pack 220 is in the mounting attitude, the arrow N direction is the vertical downward direction (gravity direction), and the arrow U direction is the vertical upward direction.

The toner pack 220 includes an accommodating portion 201 (first accommodating portion) for accommodating toner, a nozzle 202 (discharging portion, nozzle portion, pipe, tube, valve), and a pack-side shutter 203 (container shutter, rotatable member). As shown in FIG. 55, the accommodating portion 201 is provided on the side of the first end portion in the first direction D1, and the nozzle 102 and the pack side shutter 203 are provided on the side of the second end portion opposite to the first end portion in the first direction D1. That is, the accommodating portion 201 and the nozzle 202 are structured to be arranged in the first direction D1. The accommodating portion 201 in this embodiment is a pouch formed by pouching a flexible polypropylene sheet. The accommodating portion 201 is not limited to the pouch, and may be a resin bottle or a container made of paper, vinyl or the like.

As shown in FIG. 56, on the side surface 202*c* (first outer surface) of the nozzle 202 extending in the first direction D1, a discharge opening 202*a* (opening, nozzle opening, a first opening) configured for fluid communication with the inside of the accommodating portion 201. The toner stored in the accommodating portion 201 is structured to be discharged to the outside of the toner pack 220 through the discharge opening 202*a* of the nozzle 202. The nozzle 202 may be integrally structured with the accommodating portion 201. Further, a seal (not shown) may be provided between the accommodating portion 201 and the discharge opening 202*a* of the nozzle 202, and the accommodating portion 201 and the discharge opening 202*a* may be brought into fluid communication with each other when the seal is removed. Further, the discharge opening 202*a* does not have to be the final discharge opening for discharging toner from the toner pack 220 to the outside of the toner pack 220.

A pack-side shutter 203 is provided on the outside of the side surface 202*c* of the nozzle 202. The pack-side shutter 203 is mounted rotatably around a rotational axis A (first rotational axis, central axis) extending in a direction along the first direction D1, and is provided with an opening 203*a* (rotatable member opening, first shutter opening) in the side surface 203*d* (first rotatable member outer surface, rotatable member side surface portion) extending in the direction of the rotational axis A as shown in FIG. 56. The pack-side shutter 203 is provided outside the side surface 202*c* of the nozzle 202 in the radial direction r of the imaginary circle VC centered on the rotational axis A. The side surface 202*c* of the nozzle 202 is a curved surface that is convex toward the outside in the radial direction r of the imaginary circle VC centered on the rotational axis A. That is, the discharge opening 202*a* faces the outside in the radial direction r (the direction perpendicular to the rotational axis A). Further, the inner surface of the pack-side shutter 203 (the surface facing the side surface 202*c*) is a curved surface along the side surface 202*c* of the nozzle 202, and a substantially rectangular pack-side seal 205 is mounted thereon.

As shown in part (b) of FIG. 55 and part (d) of FIG. 55, the pack-side shutter 203 is movable between a closing position in which the pack-side seal 205 closes the discharge opening 202*a* of the nozzle 202 and an opening position in which the discharge opening 202*a* is opened, in the rotational direction K (first rotational direction) and the rotational direction L (second rotational direction) opposite to the rotational direction K about the rotational axis A. When the pack-side shutter 203 is in the open position, the discharge opening 202*a* of the nozzle 202 is uncovered through the opening 203*a*.

When the pack-side shutter 203 in the closed position shown in part (b) of FIG. 55 is rotated in the direction of arrow K about the rotational axis A, the pack-side shutter 203 is moved to the open position shown in part (d) of FIG. 55. On the contrary, when the pack side shutter 203 is rotated from the open position in the direction of an arrow L, it is moved to the closed position. In the rotational operation of the pack-side shutter 203, the pack-side shutter 203 slides on the side surface 202*c* of the nozzle 202 by way of the pack-side seal 205.

Referring to FIGS. 57 to 61, the detailed structure of the nozzle 202 and the pack-side shutter 203 will be described. The arrow N direction is the direction from the accommodating portion 201 toward the nozzle 202, and the U direction is the opposite thereto. The arrow N direction and the arrow U direction are directions parallel to the rotational axis A. When the toner pack 220 is in the mounting attitude, the arrow N direction is the vertical downward direction (gravity direction), and the arrow U direction is the vertical upward direction.

Figure 57:
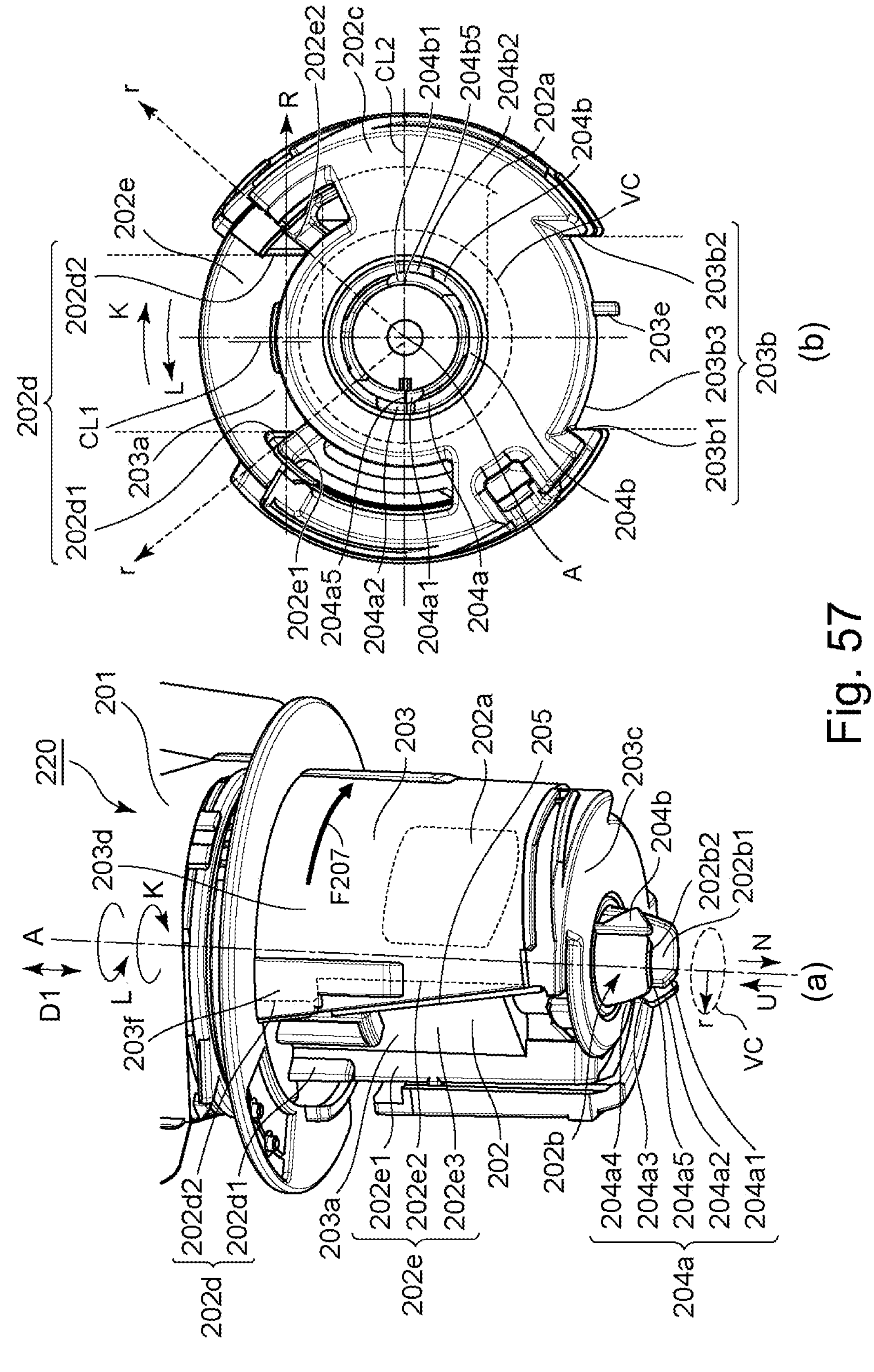
FIG. 57 is a perspective view and a bottom view of the neighborhood of a nozzle in Embodiment 2 (when the shutter on the pack side is closed).
Figure 58:
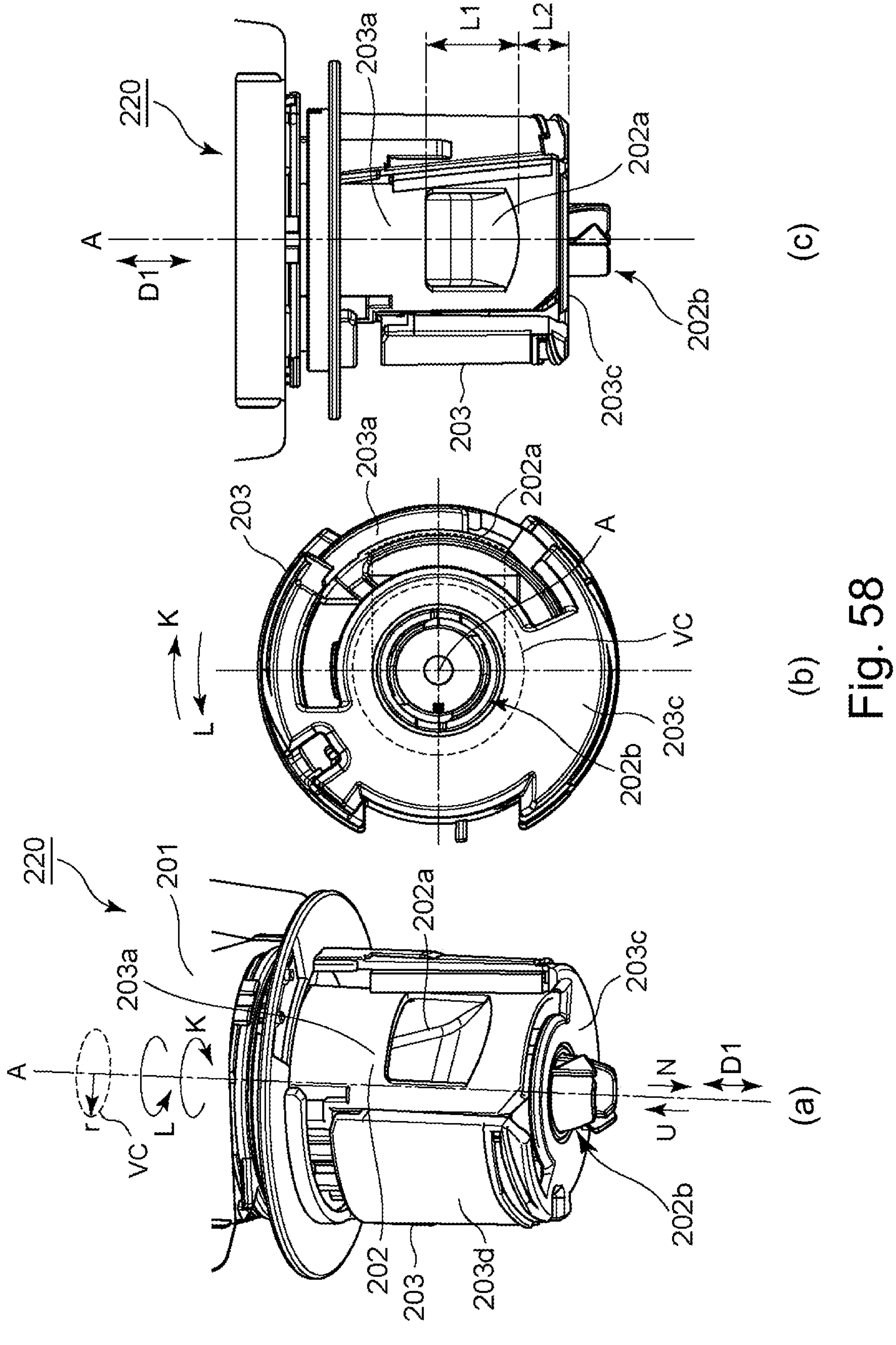
FIG. 58 is a perspective view, a bottom view, and a front view of the neighborhood of the nozzle in Embodiment 2 (when the shutter on the pack side is opened).
Figure 59:
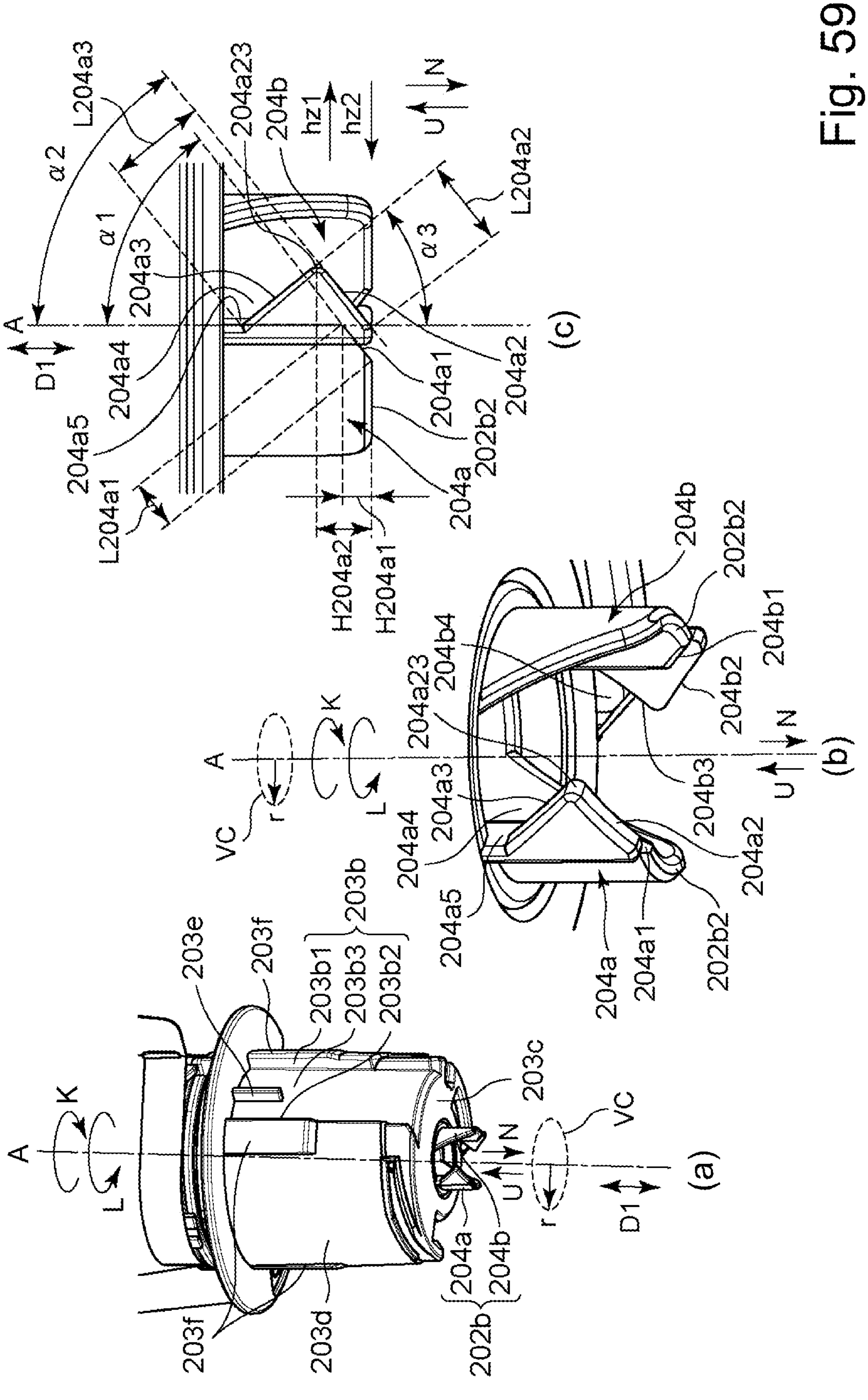
FIG. 59 is a rear perspective view of the neighborhood of the nozzle, an enlarged perspective view, and a front view of a projection in according to Embodiment 2.
Figure 60:
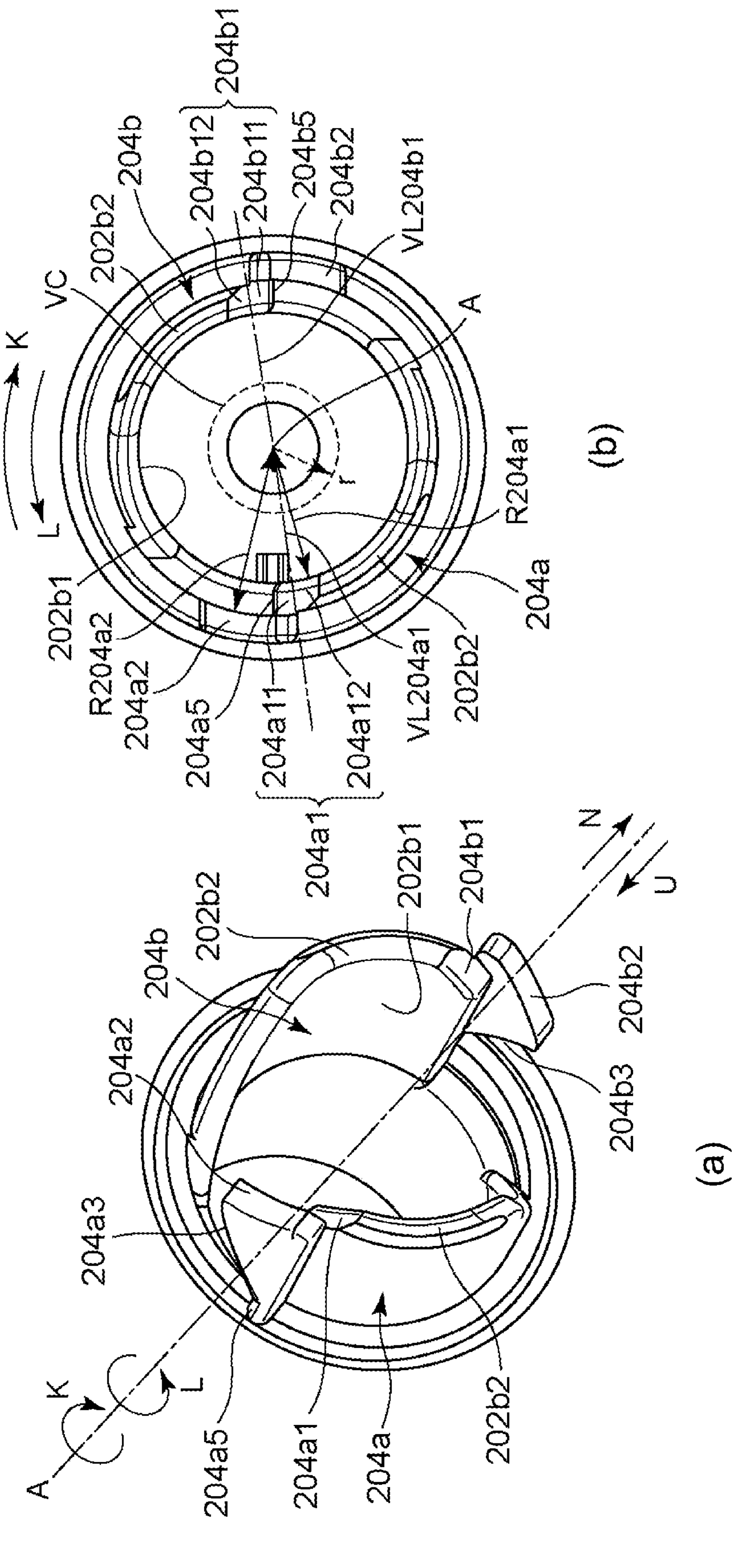
FIG. 60 is a perspective view and a bottom view of the projecting portion in Embodiment 2.
Figure 61:
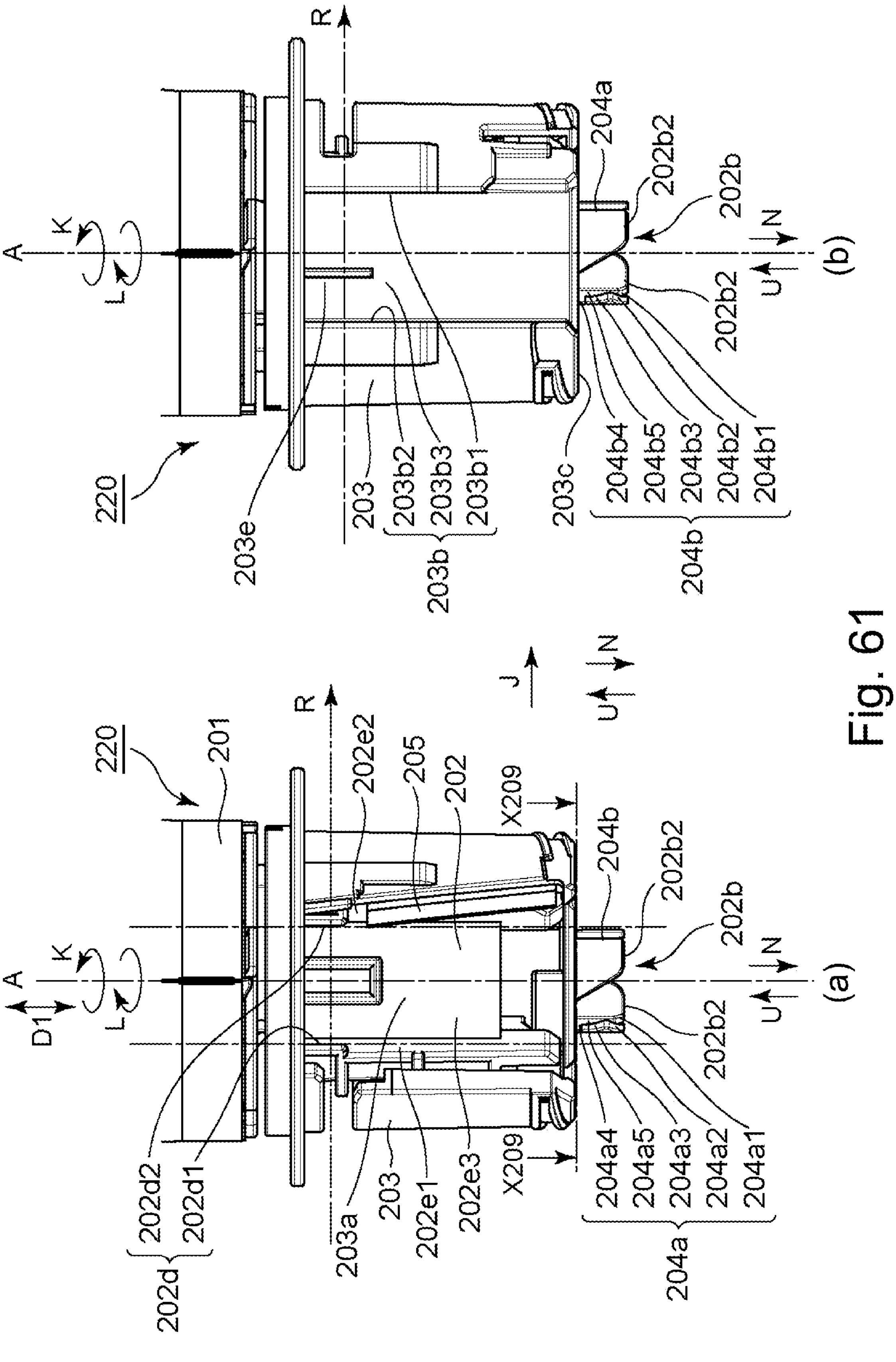
FIG. 61 is a front view and a rear view of a neighborhood of the nozzle in Embodiment 2.

Part (a) of FIG. 57 is an enlarged view of the neighborhood of the nozzle 202 when the pack-side shutter 203 is in the closed position. Part (b) of FIG. 57 is a view of the toner pack 220 as viewed in the direction of arrow U in part (a) of FIG. 57. Part (a) of FIG. 58 is an enlarged perspective view of the neighborhood of the nozzle 202 when the pack-side shutter 203 is in the open position. Part (b) of FIG. 58 is a side view of the toner pack 220 as viewed in the direction of arrow U in part (a) of FIG. 58. Part (c) of FIG. 58 is an enlarged view of the nozzle 202 in part (a) of FIG. 58, as viewed from the front side. Part (a) of FIG. 59 is a perspective view of the neighborhood of the nozzle 202 as viewed from the side opposite to that in part (a) of FIG. 57. Part (b) of FIG. 59 is an enlarged perspective view of the projecting portion 202*b* of part (a) of FIG. 59. Part (c) of FIG. 59 is an enlarged view of the projecting portion 202*b* as viewed in a direction perpendicular to the rotational axis A. Part (a) of FIG. 60 is an enlarged perspective view of the projecting portion 202*b*. Part (b) of FIG. 60 is a partial enlarged view of the projecting portion 202*b* of part (b) of FIG. 57. Part (a) of FIG. 61 and part (b) of FIG. 61 are a front view and a rear view of the nozzle 202, respectively. Part (a) of FIG. 61 and part (b) of FIG. 61 are illustrations of the neighborhood of the nozzle 202 as viewed in a direction parallel to the surface 202*d*1 and the surface 202*d*2 of the nozzle 202 (direction perpendicular to the rotational axis A).

As shown in part (a) of FIG. 61 and part (b) of FIG. 57, the nozzles 102 is provided with a positioned portion 202*d* having a surface 202*d*1 (first nozzle surface, first opposing surface) and surface 202*d*2 (second nozzle surface, second opposing surface) which are arranged in the arrow R direction (second direction D2) with a gap therebetween and which extend in a direction crossing with the arrow R direction. The arrow R direction is a direction perpendicular to the first direction D1. As shown in part (b) of FIG. 57, the surfaces 202*d*1 and 202*d*2 in this embodiment extend in a direction perpendicular to the arrow R direction and are parallel to each other. That is, the arrow R direction is the normal direction of the surface 202*d*1 and the surface 202*d*2. The positioned portion 202*d* engages with the positioning portion 207*a* (part (a) of FIG. 40) of the first frame 207 when the toner pack 220 is mounted on the mounting portion 206. By this, the position of the nozzle 202 in the arrow R direction (the position in the rotational direction about the rotational axis A) relative to the first frame 207 (base frame 221) is determined. In part (b) of FIG. 57, the straight line CL1 (first imaginary straight line) which passes through the center between the surface 202*d*1 and the surface 202*d*2 in the arrow R direction and which extends in the direction perpendicular to the arrow R direction is in a phase rotated by about 90° with respect to the straight line CL2 (second imaginary straight line) which passes at the center of the discharge opening 202*a* and the rotational axis A. That is, The straight line CL2 resulted by rotating the straight line CL1 by 90 degrees about the rotational axis A passes through the discharge opening 202*a* of the nozzle 202.

Further, as shown in FIGS. 57 and 61, a surface 202*e*1 and a surface 202*e*2 are provided on the downstream side of the surface 202*d*1 and the surface 202*d*2 in the N direction in the direction of the rotational axis A, respectively. As shown in part (b) of FIG. 57, the surfaces 202*e*1 and 202*e*2 extend in the radial direction r of the imaginary circle VC centered on the rotational axis A.

In FIG. 61, a side surface 202*e*3 (second outer surface) is provided between the surfaces 202*d*1 and 202*d*2 and between the surfaces 202*e*1 and 202*e*2 in the direction of arrow R. The side surface 202*e*3 is recessed inward in the radial direction r with respect to the side surface 202*c*. The surface 202*d*1, the surface 202*d*2, the side surface 202*e*3, the surface 202*e*1, the surface 202*e*2 and the side surface 202*e*3 form a recess 202*e* (nozzle recess).

The surface 202*d*1 and the surface 202*d*2 do not necessarily have to be parallel as in this embodiment. The surface 202*d*1 and the surface 202*d*2 may be surfaces extending in the radial direction r of the imaginary circle VC centered on the rotational axis A.

Further, part (a) of FIG. 61 is a view of the neighborhood of the nozzle of the toner pack 220 in which the pack side shutter 203 is in the closed position, as viewed in the direction perpendicular to the direction of the rotational axis A. As shown in part (a) of FIG. 61, the opening 203*a* is provided in the side surface 203*d* of the pack-side shutter 203, and at least a part of the recess 202*e* (surface 202*e*1, surface 202*e*2, side surface 202*e*3) of the nozzle 202 is exposed to the outside through the opening 203*a*. At least the surfaces 202*d*1 and 202*d*2 are structured to be exposed through the opening 203*a* of the pack-side shutter 203 taking the closed position. This is because, the surfaces 202*d*1 and the surfaces 202*d*2 are to be engaged with the positioning portion 207*a* of the first frame 207 when the toner pack 220 is mounted on the mounting portion 206 with the pack side shutter 203 closed.

Further, as shown in part (b) of FIG. 57 a driven transmission portion 203*b* (rotatable member recess) is provided on the outer surface of the pack-side shutter 203 on the opposite side of the rotational axis A of the recess 202*e* (opening 203*a* of the pack-side shutter 203) of the nozzle 202, as the neighborhood of the nozzle 202 is viewed in the direction of the rotational axis A (first direction D) when the pack side shutter 203 is in the closed position. As shown in part (b) of FIG. 61, both the surface 203*b*1 and the surface 203*b*2 of the driven transmission portion 203*b* extend in a direction perpendicular to the arrow R direction (direction of the rotational axis A). Part (a) of FIG. 59 is an enlarged perspective view of the neighborhood of the pack-side shutter 203 as viewed from the side where the driven transmission portion 203*b* is disposed. Between the surfaces 203*b*1 and 203*b*2, there is provided a side surface 203*b*3 (second rotatable member outer surface, rotatable member side surface portion) recessed inward in the radial direction from the side surface 203*d*. The driven transmission portion 203*b* comprises the surface 203*b*1, the surface 203*b*2, and the side surface 203*b*3. Further, the rib 203*e* is provided on the side surface 203*b*3.

When the pack-side shutter 203 is rotated in the rotational direction K from the closed position shown in FIG. 57, the pack-side shutter 203 takes an open position, and the outlet 202*a* of the nozzle 202 is exposed through the opening 203*a* of the pack-side shutter 203, as shown in FIG. 58.

Further, as shown in part (a) of FIG. 57 and part (a) of FIG. 59, the pack-side shutter 203 is provided with a radial positioning portion 203*f* projecting outward in the radial direction beyond the side surface 203*d*. The radial positioning portion 203*f* is provided on the upstream side of the pack side shutter 203 in the N direction in the direction of the rotational axis A. The radial positioning portions 203*f* are provided at each of the three positions at intervals in the rotational direction of the pack-side shutter 203.

The nozzle 202 in this embodiment is includes a passage through which the toner passes and the discharge opening 202*a* for discharging the toner from the nozzle 202. The cross-sectional area of the passage through which the toner of the nozzle 202 passes may be made smaller, larger, or even toward the discharge opening 202*a*. The cross-sectional area and length of the passage of the nozzle 202 may be appropriately changed depending on the required toner discharge, and are not restrictive. Further, the discharge opening 202*a* of the nozzle 202 does not have to be the most downstream opening from which the toner is discharged from the toner pack 220. The toner discharged from the discharge opening 202*a* of the nozzle 202 may be discharged to the outside of the toner pack 220 after passing through a passage of a member different from the nozzle 202.

The pack-side shutter 203 may be a rotatable member which is provided with a driven transmission portion 203*b* but does not have a shutter function and therefore the discharge opening 202*a* of the nozzle 202 is open regardless of the rotational position. In such a case, it may be that the discharge opening 202*a* of the nozzle 202 is closed by a seal (not shown) when the toner pack 220 is not mounted to the mounting portion 206, and is by sealed by the mounting operation to the mounting portion 206 or after the mounting operation. Further, the toner pack 220 which is not provided with the pack side shutter 203 may be used.

(Restriction Releasing Portion of Toner Pack)

Referring to FIGS. 55 to 61, the restriction releasing portion 204 will be described. Here, as shown in FIG. 55, the toner pack 220 is oriented in a predetermined direction in which the side of the second end portion (the nozzle 202 side) of the toner pack 220 is below the side of the first end portion (the toner accommodating portion side). In other words, the toner pack 220 is oriented in an attitude (predetermined orientation) in which the rotational axis A is in the vertical direction (gravity direction) and in which, at least a part of the nozzle 202 is below the accommodating portion 201. The attitude of the toner pack 220 at this time is a mounting attitude to the mounting portion 206 of the image forming apparatus 1. At this time, in FIGS. 55 to 61, the N direction is the vertical downward direction (gravity direction), and the U direction is the vertical upward direction.

The nozzle 202 is provided with a projecting portion 202*b* (projecting portion, engaging portion) which projects (protrudes) in the arrow N direction (downward) beyond the end surface 203*c* of the pack side shutter 203 in the arrow N direction. As shown in part (a) of FIG. 57 and part (b) of FIG. 57, the projecting portion 202*b* is a cylindrical portion centered on the rotational axis A. Further, as shown in FIG. 55, the accommodating portion 201, the nozzle 202 (pack side shutter 203), and the projecting portion 202*b* are arranged in the order named in the N direction, which is the mounting direction of the toner pack 220 to the mounting portion 206.

As the projecting portion 202*b* is viewed in the direction of the rotational axis A, as shown in part (b) of FIG. 57, the projecting portion 202*b* is on the side closer to the rotational axis A than the driven transmission portion 203*b* of the pack-side shutter 203, in the radial direction r of the imaginary circle VC.

The projecting portion 202*b* has a projecting portion end surface 202*b*2 (positioning surface in the mounting direction) which is an end surface in the N direction. The projecting portion 202*b* is provided with a hole having an inner peripheral surface 202*b*1 (guide inner peripheral surface, positioning inner peripheral surface) facing inward in the radial direction r with the rotational axis A as the central axis.

Figure 71:
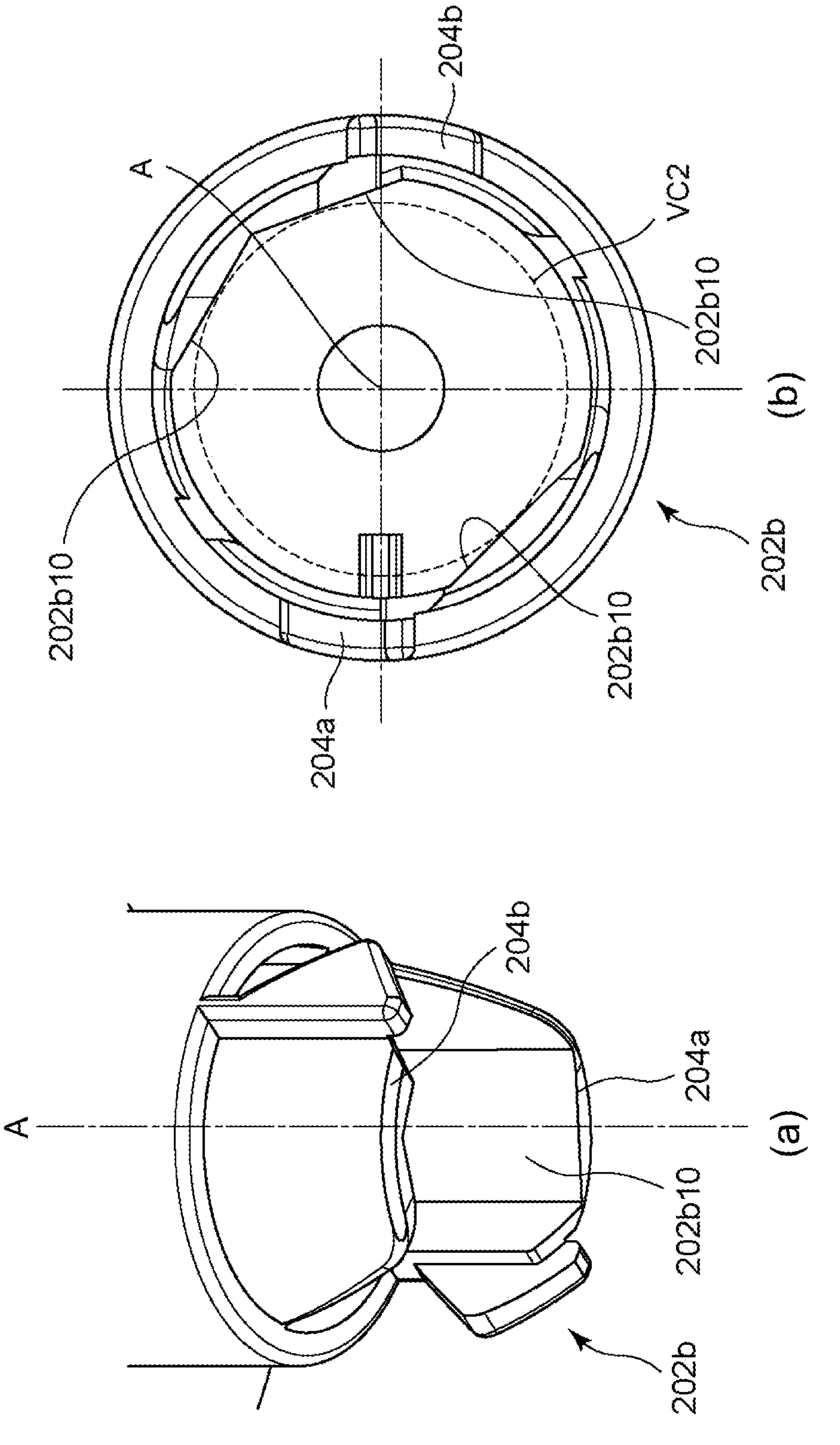
FIG. 71 is a perspective view and a bottom view illustrating a structure of a modified example of the inner peripheral surface of the projecting portion of the nozzle.

The inner peripheral surface 202*b*1 of this embodiment is a cylindrical surface centered on the rotational axis A as shown in part (b) of FIG. 60. However, the present invention is not limited to such an example. Part (a) of FIG. 71 is an enlarged perspective view of a projecting portion 202*b* having an inner peripheral surface structure different from that of this embodiment, and part (b) of FIG. 71 shows the projecting portion 202*b* of part (a) of FIG. 71 as viewed in the direction of the rotational axis A. The inner peripheral surface 202*b*10 comprises a plurality of flat surfaces which inscribes the imaginary circle so that the position of the center (central axis) of an imaginary circle VC2 is determined with respect to the projecting portion 202*b*. The central axis of the imaginary circle VC2 is coincident with the rotational axis A. The inner peripheral surface of the projecting portion 202*b* does not necessarily have to be a surface in which a central axis can be defined. Any inner peripheral surface may be used as long as the toner pack 220 can be mounted to the mounting portion 206 while dodging the center boss 209*d*.

As shown in part (a) of FIG. 57, part (a) of FIG. 58, and part (c) of FIG. 58, the projecting portion 202*b* projects downward from the end surface 203*c* of the pack-side shutter 203 beyond the discharge opening 202*a*. In this embodiment, the projecting portion 202*b* is provided on the nozzle 202 so as to project from the end surface 202*j* (bottom surface) in the direction of the rotational axis A of the nozzle 202 as shown in part (b) of FIG. 62. In addition, as shown in FIG. 56, the projecting portion 202*b* projects downward beyond the lower end surface 202*j* of the nozzle 202. In this embodiment, the end surface 203*c* of the pack-side shutter 203 and the end surface 202*j* of the nozzle 202 are end surfaces perpendicular to the rotational axis A, but the present invention is not limited thereto. These surfaces may be any surface if it extends in a direction crossing the rotational axis A as viewed in a direction perpendicular to the rotational axis A.

As shown in part (c) of FIG. 58, an opening width L1 of the nozzle 202 in the direction of the rotational axis A of the discharge opening 202*a*, and a width L2 measured from the lower end of the discharge opening 202*a* to the end surface 203*c* of the pack-side shutter 203 preferably satisfy 0.09<L2/L1<2.2.

Further, as shown in FIG. 56, the projecting portion 202*b* projects beyond the end surface 202*j* of the nozzle 202. In this embodiment, the end surface 203*c* of the pack-side shutter 203 and the end surface 202*j* of the nozzle 202 are end surfaces perpendicular to the rotational axis A, but the present invention is not limited to this example. These surfaces may be any surface which extends in a direction crossing the rotational axis A as viewed in a direction perpendicular to the rotational axis A.

Further, as shown in part (b) of FIG. 58, It is understood that as viewed in the direction of the rotational axis A, when the pack side shutter 203 is in the open position, the opening 203*a* of the pack side shutter 203 overlaps the discharge opening 202*a* in the circumferential direction of the imaginary circle VC.

The projecting portion 202*b* is provided with a restriction releasing portion 204 including a first restriction releasing portion 204*a* (first projection) and a second restriction releasing portion 204*b* (second projection). Detailed structures of the restriction releasing portion 204 will be described, referring to part (b) of FIG. 59, part (c) of FIG. 59, part (a) of FIG. 60, part (b) of FIG. 60, part (a) of FIG. 62, and part (b) of FIG. 62.

The first restriction releasing portion 204*a* includes a first slope 204*a*1 (first inner engaging surface, first downward surface, first downward guide surface, first force applying surface, first push surface), a second slope 204*a*2 (first outer engaging surface, second downward surface, second downward guide surface, second force applying surface, second push surface) and a third slope 204*a*3 (second engaging surface, first upward surface, upward guide surface)).

When the toner pack 220 is oriented in the predetermined direction (FIG. 50) described above, the first slope 204*a*1 and the second slope 204*a*2 have surfaces which face in the arrow N direction (downward) and which extend such that they go in the direction of the arrow U (upward) as go in the rotational direction K (first rotational direction) about the rotational axis A. In addition, as shown in part (c) of FIG. 59, as viewed in the direction perpendicular to the rotational axis A, the first slope 204*a*1 and the second slope 204*a*2 extend such that they go in the U direction (upward) as go in the first horizontal direction hz1 of the horizontal direction. Further, when the rotational direction K is the first circumferential direction of the circumferential direction of the imaginary circle VC, the first slope 204*a*1 and the second slope 204*a*2 face in the arrow N direction (downward) and extend such that they go in the arrow U direction as go in the first circumferential direction.

The third slope 204*a*3 is a surface which faces the arrow U direction (upward) and which extends such that it goes in the arrow U direction (upward) as goes in the rotational direction L (second rotational direction) about the rotational axis A. In addition, as shown in part (c) of FIG. 59, the third slope 204*a*3 has the surface which extends such that it goes in the arrow U direction (upward) as goes in the second horizontal direction hz2 which is opposite to the first horizontal direction hz1 of the horizontal direction, as viewed in the direction perpendicular to the rotational axis A. Further, when the rotational direction L is a second circumferential direction which is opposite to the first circumferential direction in the circumferential direction of the imaginary circle VC, the third slope **204*a*3** faces in the arrow U direction (upward direction) and extend such that it goes in the arrow U direction (upward) as goes in the second circumferential direction.

The downstream end of the second slope **204*a*2 in the rotational direction K and the downstream end of the third slope 204*a*3 in the rotational direction L are connected with each other by a connecting portion 204*a*23. Further, as shown in part (c) of FIG. 59, as viewed in the direction perpendicular to the rotational axis A, the downstream end of the second slope 204*a*2 in the first horizontal direction hz1 and the downstream end of the third slope 204*a*3 in the second horizontal direction hz2 are connected with each other by the connecting portion 204*a*23**.

The third slope **204*a*3 is above the second slope 204*a*2. Viewed in the direction of the rotational axis A, the third slope 204*a*3 overlaps with the second slope 204*a*2. In this embodiment, although the entire third slope 204*a*3 is above the second slope 204*a*2, It will suffice if at least a part of the third slope 204*a*3 is above the second slope 204*a*2**.

As shown in part (b) of FIG. 60, at least a part of the first slope **204*a*1 is placed at a position which is closer to the rotational axis A than the second slope 204*a*2 in the radial direction r in the circumferential direction of the imaginary circle VC and which is different from that of the second slope 204*a*2**.

In part (b) of FIG. 60, a radius R**204*a*1 measured from the rotational axis A to an inner end (edge line) of the first slope 204*a*1 is shorter than the radius R204*a*2 measured from the rotational axis A to the inner end (edge line) of the second slope 204*a*2. That is, at least a part of the first slope 204*a*1 is placed closer to the rotational axis A than the second slope 204*a*2** in the radial direction r.

Further, in part (b) of FIG. 60, two regions of the first slope **204*a*1 separated by an imaginary straight line VL204*a*1 passing through the rotational axis A and the most downstream end, in the rotational direction L, of the second slope 204*a*2 are an upstream side region 204*a*12 and a downstream side region 204*a*11 in the rotational direction K. In this case, the second slope 204*a*2 is not provided on the outside of the upstream region 204*a*12 in the radial direction r. That is, at least a part of the first slope 204*a*1 (upstream side region 204*a*12) is provided at a position different from that of the second slope 204*a*2 in the circumferential direction of the imaginary circle VC. Similarly, the two regions of the first slope 204*b*1 separated by an imaginary straight line VL204*b*1 passing through the rotational axis A and the most upstream end, in the rotational direction K, of the second slope 204*b*2 are an upstream side region 204*b*12 and a downstream side region 204*b*11 in the rotational direction L. In this case, outside the upstream region 204*b*12 in the radial direction r, the second slope 204*b*2 is not provided. That is, at least a part of the first slope 204*b*1 (upstream side region 204*b*12) is provided at a position different from that of the second slope 204*b*2 in the circumferential direction of the imaginary circle VC. That is, in the first restriction releasing portion 204*a*, the upstream region 204*a*12 of the first slope 204*a*1 is on the upstream side of the second slope 204*a*2 in the rotational direction K. Further, in the second restriction releasing portion 204*b*, the upstream side region 204*b*12 of the first slope 204*b*1 is on the upstream side of the second slope 204*b*2** in the rotational direction K.

Further, as shown in part (c) of FIG. 59, as viewed in the direction perpendicular to the rotational axis A, at least a part of the first slope **204*a*1 is at a position different from that of the second slope 204*a*2 in the horizontal direction (first horizontal direction hz1 or second horizontal direction hz2). On the other hand, at least a part of the third slope 204*a*3 is provided on the downstream side (upper side) of at least a part of the second slope 204*a*2 in the arrow U direction. That is, at least a part of the third slope 204*a*3 overlaps with the second slope 204*a*2 when viewed in the direction of the rotational axis A. In addition, above (directly above) the third slope 204*a*3, a cavity 204*a*4 and an abutment surface 204*a*5 (downstream end surface, contacted surface) are provided. The abutment surface 204*a*5 is an end surface on the downstream side in the rotational direction K, the end surface extending from the downstream end of the third slope 204*a*3 in the rotational direction L along the direction of the rotational axis A. The abutment surface 204*a*5 faces the downstream side in the rotational direction K. In part (c) of FIG. 59, the abutment surface 204*a*5 extends upward from the downstream end of the third slope 204*a*3 in the second horizontal direction hz2, and is an end surface on the downstream side in the first horizontal direction hz1**.

Next, referring to part (c) of FIG. 59, the description will be made as to inclination angles of the first slope **204*a*1, the second slope 204*a*2, and the third slope 204*a*3 with respect to the rotational axis A. As shown in part (c) of FIG. 59, as the projecting portion 202*b* is viewed in the direction perpendicular to the rotational axis A (gravity direction), the inclination angles, with respect to the direction of the rotational axis A, of the first slope 204*a*1, the second slope 204*a*2, and the third slope 204*a*3 are α1, α2, and α3, respectively. In this embodiment, α1, α2, and α3 are about 50 degrees, about 50 degrees, and about 40 degrees, respectively. It is preferable that α1, α2, and α3** are all 30 degrees or more and 60 degrees or less.

In addition, in this embodiment, as the projecting portion **202*b* is viewed in the direction perpendicular to the rotational axis A, a length L204*a*1 of the first slope 204*a*1 is about 2 mm, a length of the second slope 204*a*2 is about 3 mm, and a length L204*a*3 of the third slope 204*a*3 is about 3.5 mm. It is preferable that the length L204*a*2 is larger than the length L204*a*1, and the length L204*a*3 is larger than the length L204*a*2. Further, a length H204*a*1 from the projecting portion end surface 202*b*2 which is the lower end of the projecting portion 202*b* to the upper end of the first slope 204*a*1 is smaller than a length H204*a*2 from the projecting portion end surface 202*b*2 to the upper end of the second slope 204*a*2**.

The first slope **204*a*1, the second slope 204*a*2, the third slope 204*a*3, the cavity 204*a*4, and the abutment surface 204*a*5 are exposed to the outside of the toner pack 220 so that they can be accessed by the rotation restricting mechanism 212 of the mounting portion 206. They are structured so as to be exposed to the outside of the toner pack 220 in a state in which the toner pack 220 is in condition for being mounted to the mounting portion 206. That is, in the case that a cap or a cover is provided to protect the nozzle 202 of the toner pack 220 and the shutter 203** on the pack side at the time of transportation, they are exposed when the cap or cover is removed.

Figure 62:
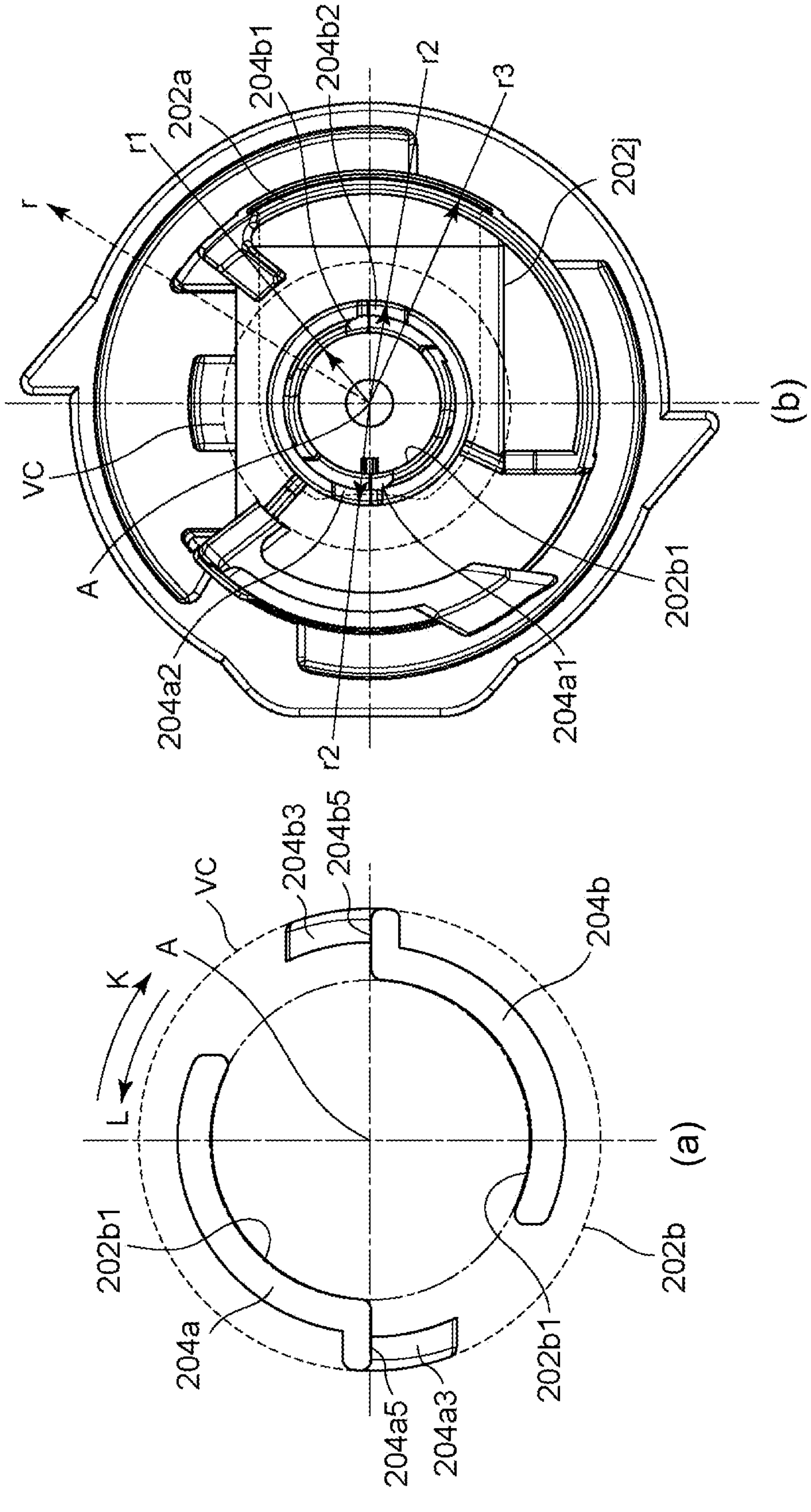
FIG. 62 is a cross-sectional view of a projecting portion of the nozzle and a bottom view of the nozzle in Embodiment 2.

Part (a) of FIG. 62 is a cross-sectional view taken along a line X209-X209 of the projecting portion **202*b* of part (a) of FIG. 61, and there are shown the third slope 204*a*3 of the first restriction releasing portion 204*a* and the third slope 204*b*3 of the second restriction releasing portion 204*b*. It is understood that both the third slope 204*a*3 and the third slope 204*b*3 extend along the rotational direction of the pack-side shutter 203** (the circumferential direction of the imaginary circle VC centered on the rotational axis A).

Part (b) of FIG. 62 is a view of the nozzle 202 viewed from the side where the projecting portion 202*b* can be seen in the direction of the rotational axis A. As shown in part (b) of FIG. 62, the restriction releasing portion 204 is placed outside the inner peripheral surface 202*b*1 and inside the discharge opening 202*a* in the radial direction r. The nozzle 202 is viewed in the direction of the rotational axis A, the first slope 204*a*1, the second slope 204*a*2, and the third slope 204*a*3 are preferably placed closer to the inner peripheral surface 202*b*1 than the discharge opening 202*a*. Here, a distance from the rotational axis A to the inner peripheral surface 202*b*1 is r1, a distance from the rotational axis A to the outer end of the second slope 204*a*2 (second slope 204*b*2) is r2, and a distance from the rotational axis A to the discharge opening 202*a* r3 preferably satisfy, $$(r2-r1)/(r3-r1)<0.3.$$

That is, as the nozzle 202 is viewed in the direction of the rotational axis A, a distance from the inner peripheral surface 202*b*1 to the first slope 204*a*1, a distance from the inner peripheral surface 202*b*1 to the second slope 204*a*2, and a distance from the inner peripheral surface 202*b*1 to the third slope 204*a*3 is preferably 30% or less of the distance from the inner peripheral surface 202*b*1 to the discharge opening 202*a*.

As shown in FIGS. 57 to 61, the second restriction releasing portion 204*b* is provided with a first slope 204*b*1 (third downward surface), a second slope 204*b*2 (fourth downward surface), a third slope 204*b*3 (second upward surface), a cavity 204*b*4 (second cavity), and abutment surface 204*b*5 (second abutment surface, second downstream end surface, second contacted surface). Here, the second restriction releasing portion 204*b* has a 180-degree rotationally symmetric shape of the first restriction releasing portion 204*a* with respect to the rotational axis A, and it is provided on the opposite side of the restriction releasing portion 204*a* with respect to the rotational axis A in the radial direction r of the imaginary circle VC. In other words, the first slope 204*b*1, the second slope 204*b*2, the third slope 204*b*3, the cavity 204*b*4, and the abutment surface 204*b*5 have 180-degree rotational symmetry shapes, with respect to the rotational axis A, of, the first slope 204*a*1, the second slope 204*a*2 third slope 204*a*3, the cavity 204*a*4, and the abutment surface 204*a*5, respectively. That is, if the first slope 204*a*1, the second slope 204*a*2, the third slope 204*a*3, the cavity 204*a*4, and the abutment surface 204*a*5 are rotated 180 degrees around the rotational axis A, they become the first slope 204*b*1, the second slope 204*b*2, the third slope 204*b*3, the cavity 204*b*4, and the abutment surface 204*b*5. Therefore, the detailed description of the second restriction releasing portion 204*b* will be omitted.

Here, the second slope 204*a*2 of the first restriction releasing portion 204*a* is not provided outside, in the radial direction r, of any region of the first slope 204*b*1 of the second restriction releasing portion 204*b*. That is, the first slope 204*a*1 is provided at a position different from that of the second slope 204*b*2 in the circumferential direction of the imaginary circle VC.

As shown in part (a) of FIG. 61 as viewed in a direction perpendicular to the rotational axis A (direction perpendicular to the arrow R direction), the projecting portion 202*b* is at a position between the surface 202*d*1 of the positioned portion 202*d* and the surface 202*d*2 in the arrow R direction. Therefore, in the direction of the arrow R, the positions of the first restriction releasing portion 204*a* and the second restriction releasing portion 204*b* are between the position of the surface 202*d*1 and the position of the surface 202*d*2 of the positioned portion 202*d*. That is, in the direction of arrow R, the positions of the first slope 204*a*1, the second slope 204*a*2, and the third slope 204*a*3 are all between the position of the surface 202*d*1 and the position of the surface 202*d*2. Viewed in the direction perpendicular to the rotational axis A, the positions of the first restriction releasing portion 204*a* and the second restriction releasing portion 204*b* overlap with the positions of the recess 202*e* in the arrow R direction.

In addition, as shown in part (a) of FIG. 61, the projecting portion 202*b* is inside the range of the width of the opening 203*a* of the pack-side shutter 203 in the arrow R direction as viewed in the direction perpendicular to the rotational axis A (radial direction r).

Further, in this embodiment, the projecting portion 202*b* is provided on the nozzle 202, but it is not necessarily provided on the nozzle 202.

Here, the projecting portion 202*b* of this embodiment is provided with two portions, namely a first restriction releasing portion 204*a* and a second restriction releasing portion 204*b*, which are 180-degree rotationally symmetric with respect to the rotational axis A. However, the present invention is not limited to such an example.

Part (a) of FIG. 196 and part (b) of FIG. 196 are perspective views and bottom views of the neighborhood of the projecting portion 202*b* in which the first restriction releasing portion 204*a* is provided and the second restriction releasing portion 204*b* is not provided.

In part (c) of FIG. 196 and part (d) of FIG. 196 area perspective view and a bottom view of the neighborhood of the projecting portion 202*b* in which the second restriction releasing portion 204*b* has a shape of 190-degree rotational symmetry, with respect to the rotational axis A, of the first restriction releasing portion 204*a*.

The structure may be such that only the first restriction releasing portion 204*a* including the first slope 204*a*1, the second slope 204*a*2, the third slope 204*a*3, the cavity 204*a*4, and the abutment surface 204*a*5 are provided, as shown in part (a) of FIG. 196 and part (b) of FIG. 196. In addition, as shown in part (c) of FIG. 196 and part (d) of FIG. 196, the second restriction releasing portion 204*b* may have a shape which is 190-degree rotationally symmetric with respect to the rotational axis A of the first restriction releasing portion 204*a*. That is, the first slope 204*b*1, the second slope 204*b*2, the third slope 204*b*3, the cavity 204*b*4, and the abutment surface 204*b*5 may have shapes which are 190-degree rotationally symmetric of, the first slope 204*a*1, the second slope 204*a*2, the third slope 204*a*3, the cavity 204*a*4, and the abutment surface 204*a*5 with respect to the rotational axis A, respectively. With this structure, the angle α204*ab*1 between the first slope 204*a*1 and the first slope 204*b*1 about the rotational axis is 190 degrees. The angle α204*ab*2 between the second slope 204*a*2 and the second slope 204*b*2 about the rotational axis A is also 190 degrees. The second restriction releasing portion 204*b* preferably has a shape of 150 degrees or more and 210 degrees or less rotationally symmetric of the first restriction releasing portion 204*a* with respect to the rotational axis A. That is, the first slope 204*b*1, the second slope 204*b*2, the third slope 204*b*3, the cavity 204*b*4, and the abutment surface 204*b*5 preferably have shapes of 150 degrees or more and 210 degrees or less rotationally symmetric of the first slope 204*a*1, the second slope 204*a*2, the third slope 204*a*3, the cavity 204*a*4 and the abutment surface 204*a*5 with respect to the rotational axis A, respectively.

(Mounting of Toner Pack to Mounting Portion)

Referring to FIGS. 63 to 69, the description will be made as to a mechanism for releasing the rotation restriction of the apparatus-side shutter 209 with the rotation restricting mechanism 212 described above by mounting the toner pack 220 on the mounting portion 206.

Figure 63:
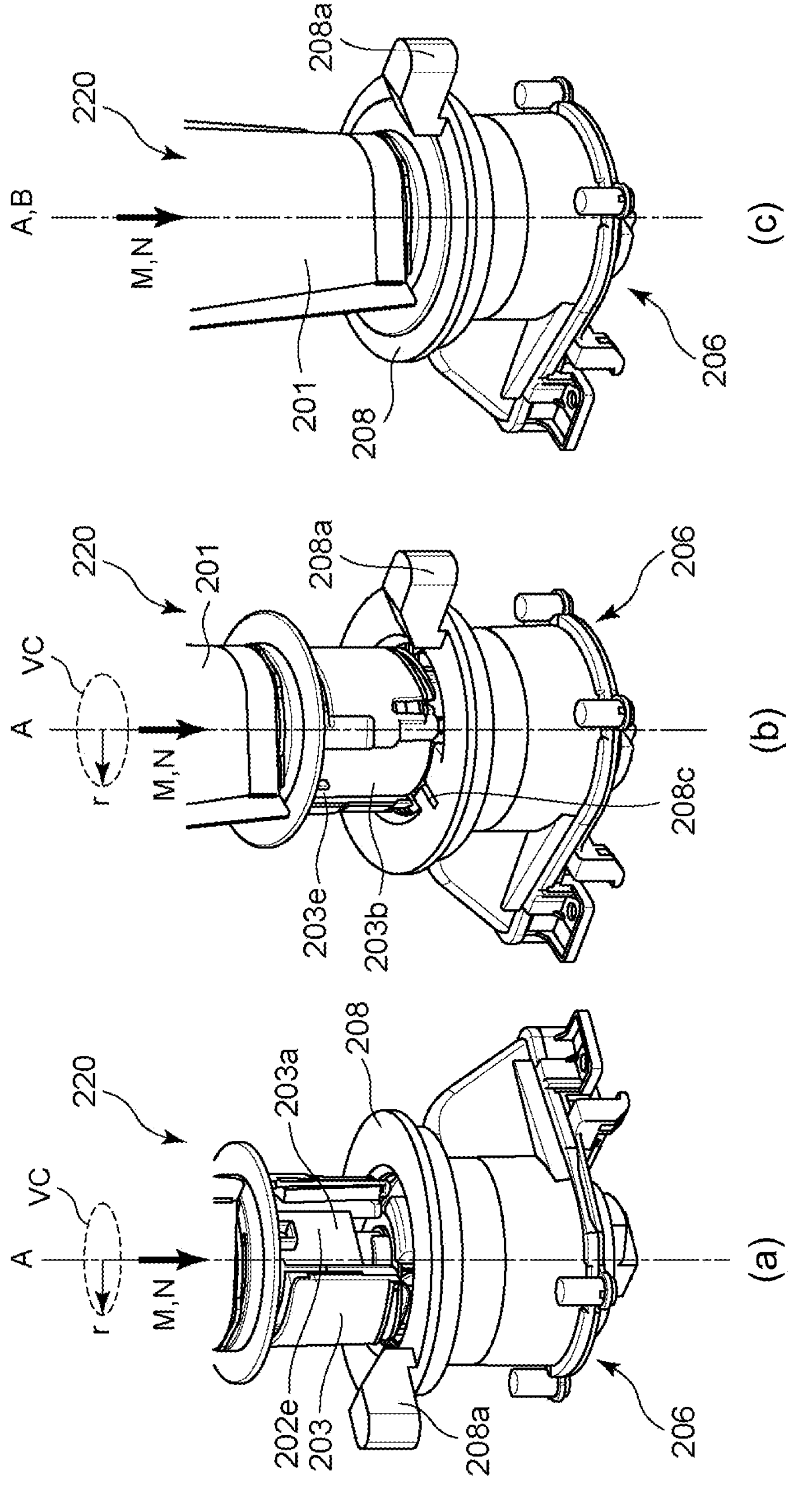
FIG. 63 is perspective views of the toner pack and the mounting portion immediately before and at the time of completion of mounting of the toner pack according to Embodiment 2.
Figure 64:
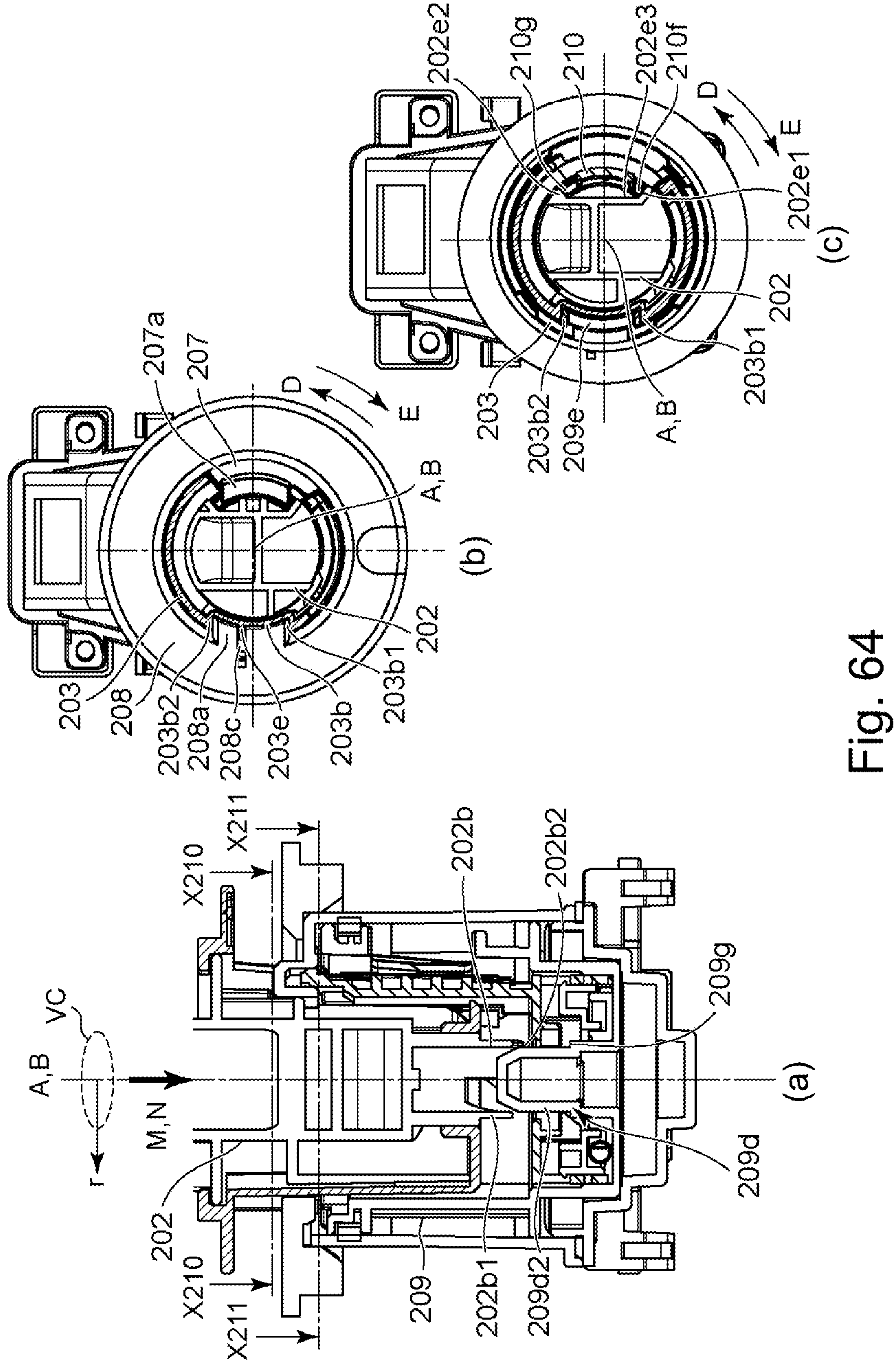
FIG. 64 is cross-sectional views of the mounting portion and the toner pack during mounting of the toner pack according to Embodiment 2.
Figure 65:
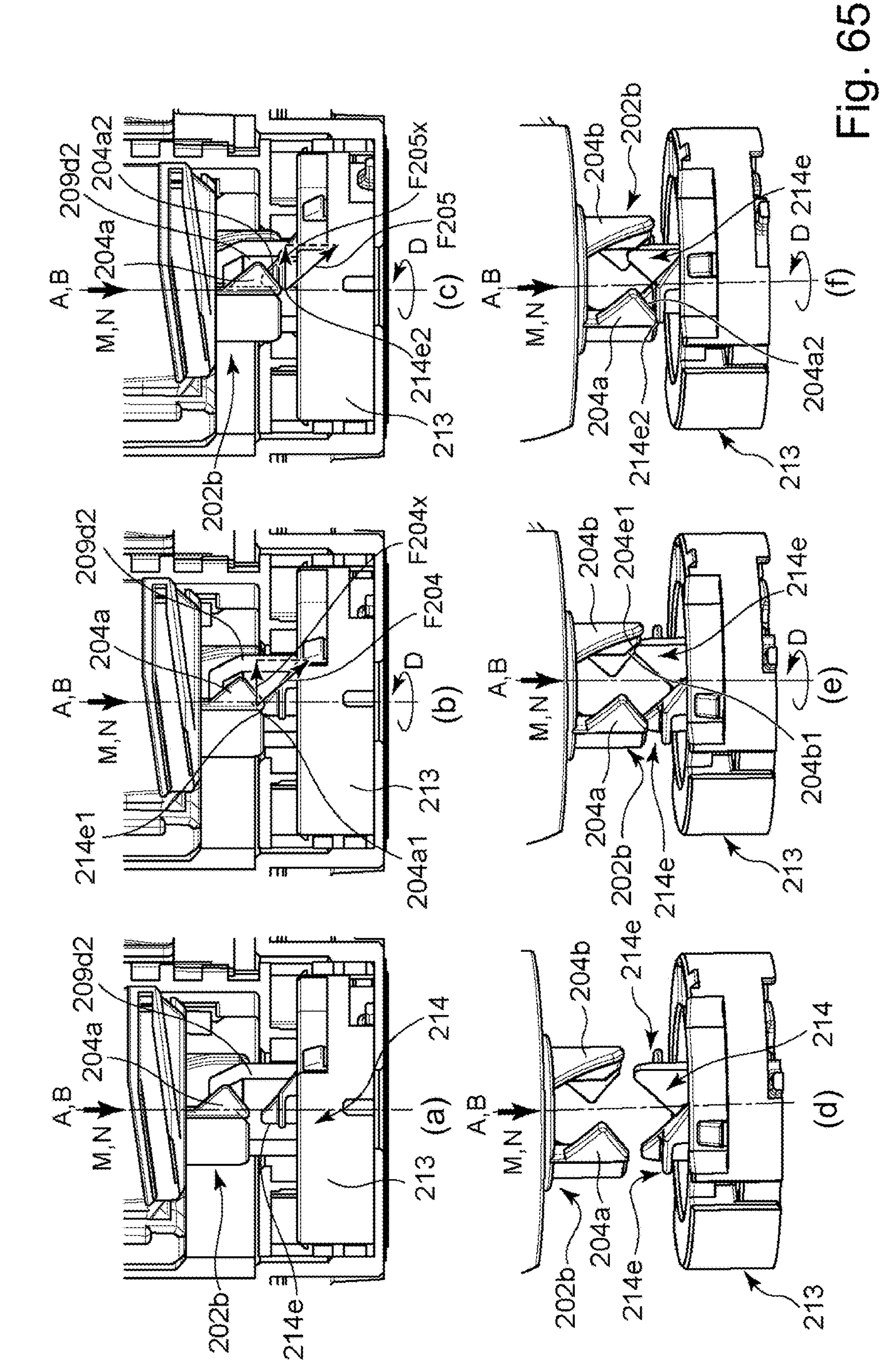
FIG. 65 is an illustration showing a process in which the rotation restriction of the shutter on the apparatus-side by the rotation restriction mechanism of the mounting portion is released by mounting the toner pack in Embodiment 2.
Figure 66:
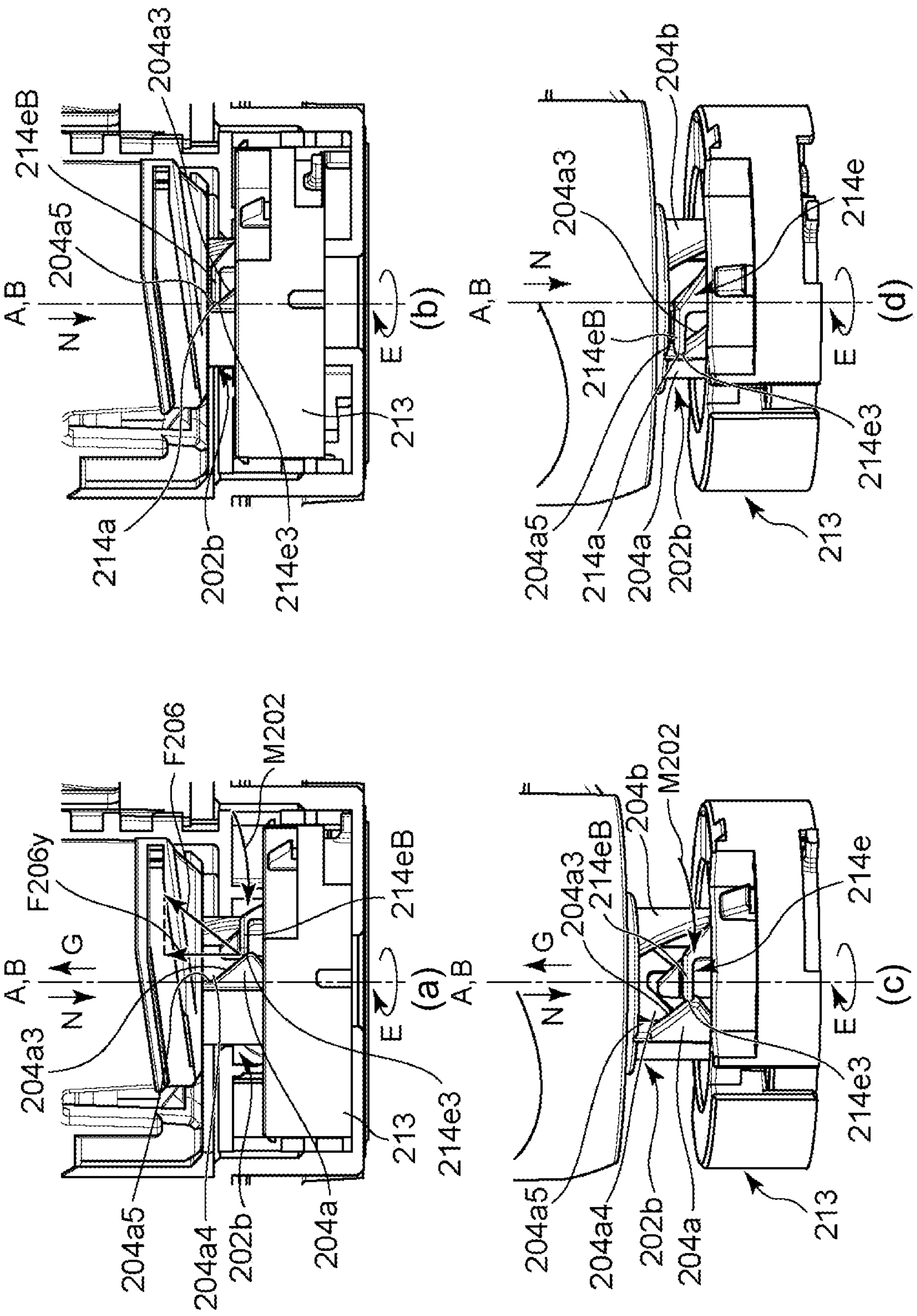
FIG. 66 is an illustration showing a process of releasing the rotation restriction of the shutter on the apparatus-side by the rotation restriction mechanism of the mounting portion, by mounting the toner pack, in Embodiment 2.
Figure 67:
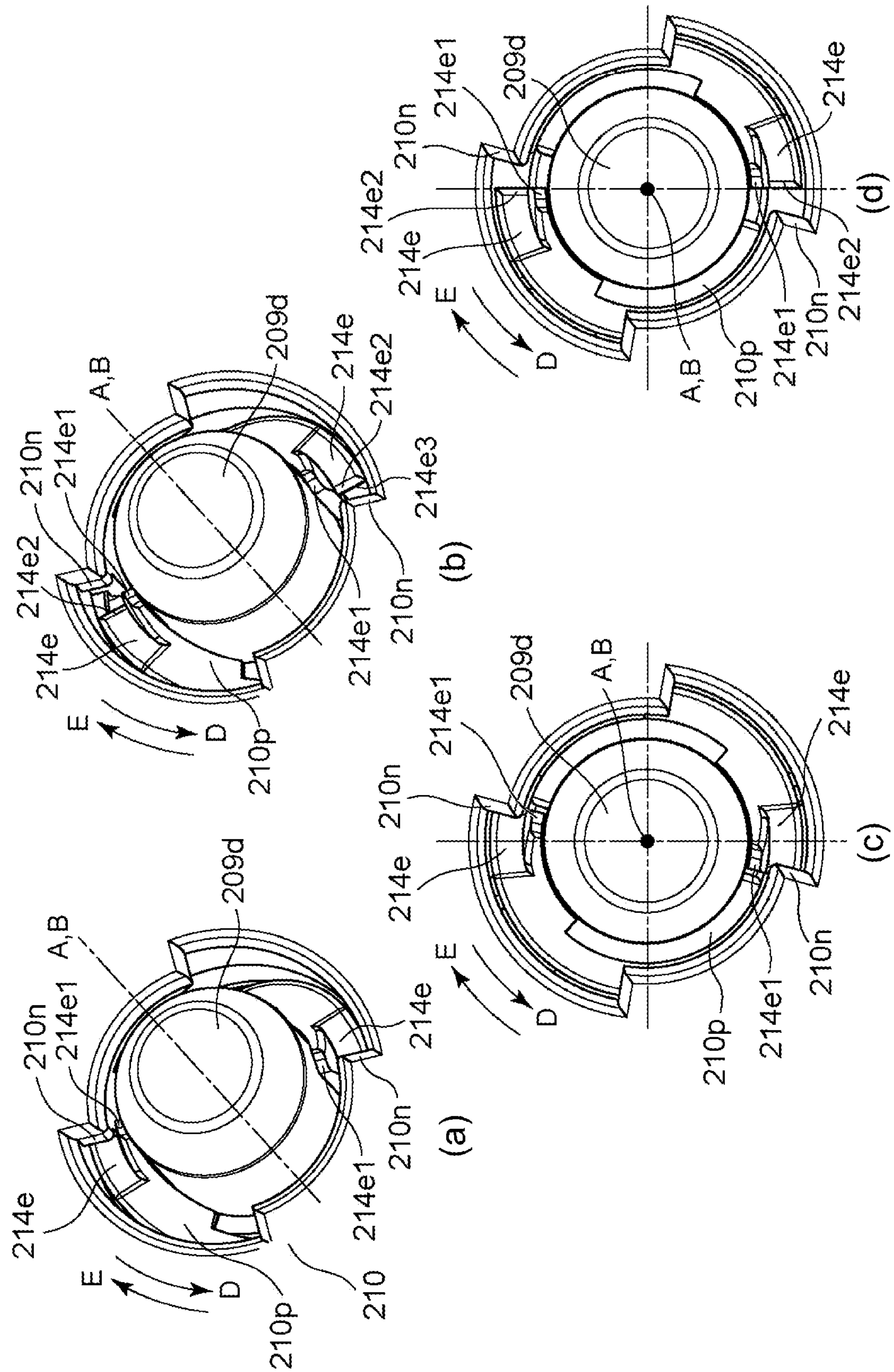
FIG. 67 is enlarged perspective views of the mounting portion showing how a releasing claw of the releasing member is exposed through the central hole of the cover of the mounting portion in Embodiment 2.
Figure 68:
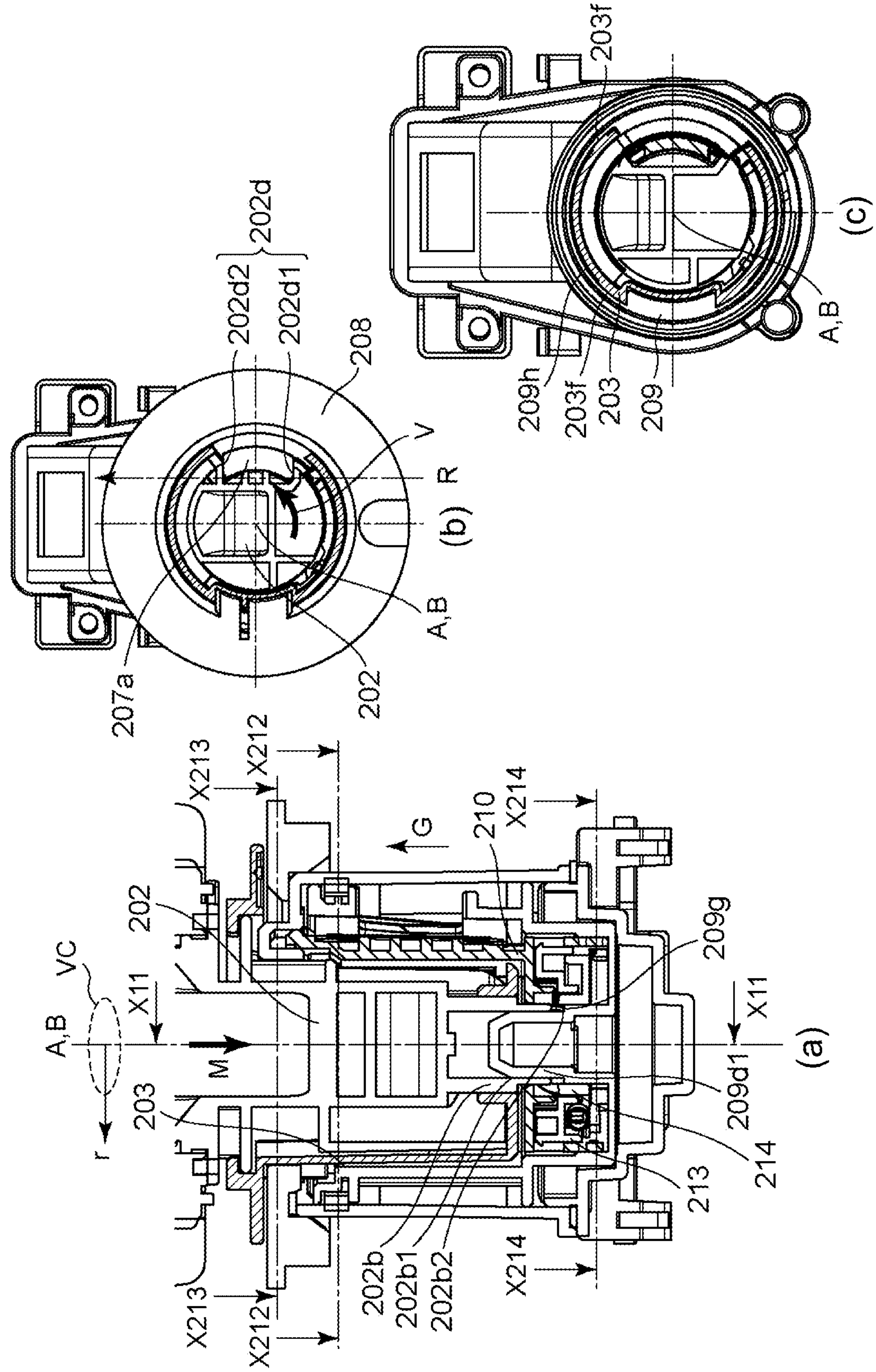
FIG. 68 is sectional views of the mounting portion and the toner pack at the time of completing the mounting of the toner pack in Embodiment 2.

Part (a) of FIG. 63 and part (c) of FIG. 63 are perspective views of the toner pack 220 and the mounting portion 206 while the toner pack 220 is being mounted on the mounting portion 206 and when the mounting is completed, respectively. Part (b) of FIG. 63 is a perspective view of the toner pack 220 and the mounting portion 206 as viewed from a side different from that of part (a) of FIG. 63. Part (a) of FIG. 64 a sectional view of the toner pack 220 and the mounting portion 206 taken along a line parallel to the rotational axis A (rotational axis B) in the state in which the toner pack 220 is further moved in the mounting direction from the state shown in part (a) of FIG. 63. Part (b) of FIG. 64 is a cross-sectional view taken along a line X210-X210 in part (a) of FIG. 64. Part (c) of FIG. 64 is a cross-sectional view taken along a line X211-X211 in part (a) of FIG. 64. Part (a) of FIG. 65 to part (c) of FIG. 65 are sectional views showing a process of mounting the toner pack 220 to the mounting portion 206. Part (d) of FIG. 65 to part (f) of FIG. 65 are perspective views, which correspond to part (a) of FIG. 65 to part (c) of FIG. 65, respectively but shows only the projecting portion 202*b*, the releasing member 214, and the restricting member 213. Part (a) of FIG. 66 and part (b) of FIG. 66 are cross-sectional views showing a process of mounting the toner pack 220 to the mounting portion 206, following the state shown in part (c) of FIG. 65. Part (c) of FIG. 66 and part (d) of FIG. 66 are perspective views which correspond to part (a) of FIG. 66 and part (b) of FIG. 66, respectively, but shows only the projecting portion 202*b*, the releasing member 214, and the restricting member 213. Part (a) of FIG. 67 and part (b) of FIG. 67 are perspective views illustrating a positional relationship between the releasing member 214 and the cover 210. Part (c) of FIG. 67 and part (d) of FIG. 67 are illustrations of the releasing member 214 and the cover 210 in the states of part (a) of FIG. 67 and part (b) of FIG. 67, as viewed in the direction (upper side) of the rotational axis A, respectively. Part (a) of FIG. 68 is a cross-sectional view taken along the rotational axis A (rotational axis B) of the toner pack 220 and the mounting portion 206 in a state in which the mounting of the toner pack 220 has been completed on the mounting portion 206. Part (b) of FIG. 68 and part (c) of FIG. 68 are a sectional view taken along a line X213-X213 and a sectional view taken along a line X212-X212 in part (a) of FIG. 68, respectively.

In FIG. 64, the cut surfaces of the shutter 203 on the pack side and the cover 210 is shaded for better illustration. In addition, in part (a) of FIG. 65 to part (c) of FIG. 65 and part (a) of FIG. 66 and part (b) of FIG. 66, the pack side shutter 203, the restricting member 213, and the releasing member 214 are side views, and other members is shown in sectional view. Further, in FIG. 68, the cut surfaces of the cover 210, the restricting member 213, and the releasing member 214 are shaded for better illustration.

As shown in part (a) of FIG. 63 and part (b) of FIG. 63, the toner pack 220 in which the pack-side shutter 203 is in the closed position is moved in the mounting direction M to the mounting portion 206 in which the apparatus-side shutter 209 is in the closed position. The user mounts the toner pack 220 on the mounting portion 206 by moving the toner pack 220 in the mounting direction M in a state of being oriented in the predetermined direction described above. The mounting direction M is the arrow N direction, that is, the vertical downward direction (gravity direction). Further, the mounting direction M is the direction of the rotational axis A (rotational axis B).

At this time, the toner pack 220 is mounted to the mounting portion 206 so that two positions are aligned in the rotational direction of the pack side shutter 203 (circumferential direction of the imaginary circle VC). The first is for the alignment between, as shown in part (a) of FIG. 63 as viewed in the mounting direction M, the recess 202*e* of the nozzle 202 (opening 203*a* of the shutter 203 on the pack side) and the positioning portion 207*a* of the first frame 207. The second is for the alignment between, as shown in part (b) of FIG. 63, the positions of the driven transmission portion 203*b* of the pack-side shutter 203 and the drive transmission portion 208*a* of the operating lever 208. The structure is such that by aligning one of them, the other is aligned.

After aligning these positions, the toner pack 220 is moved in the mounting direction M and mounted to the mounting portion 206, by which as shown in part (a) of FIG. 64, the small diameter portion 209*d*2 of the center boss 209*d* of the apparatus-side shutter 209 is inserted along the peripheral surface 202*b*1 inside the projecting portion 202*b* of the nozzle 202. The inner peripheral surface 202*b*1 of the projecting portion 202*b* and the small diameter portion 209*d*2 of the center boss 209*d* are fitted (engaged). By this fitting, the position of the nozzle 202 in the radial direction r of the imaginary circle VC with respect to the apparatus-side shutter 209 below the nozzle 202 (downstream side in the mounting direction M) is determined. At this time, as shown in part (b) of FIG. 64, the drive transmission portion 208*a* (lever projection) of the operating lever 208 and the driven transmission portion 203*b* (rotary body recess portion) of the pack side shutter 203 are engaged with each other. In addition, the rib 203*e* is inserted into the slit 208*c* provided in the drive transmission portion 208*a*. At the same time, as shown in part (c) of FIG. 64, the side surface 210*f* and the side surface 210*g* of the cover 210 guide the surface 202*e*1 and the surface 202*e*2 forming the recess 202*e* (nozzle recess) of the nozzle 202. In addition, the driven transmission portion 203*b* (rotatable member recess portion) of the pack-side shutter 203 engages with the driven transmission portion 209*e* (shutter projection) of the apparatus-side shutter 209. By this, the rotational axis A of the pack-side shutter 203 and the rotational axis B of the apparatus-side shutter 209 are made substantially coaxial.

The operating lever 208, the pack side shutter 203, and the apparatus-side shutter 209 are integrally rotatable about the rotational axis A (rotational axis B) relative to the first frame 207 (base frame 221) and the nozzle 202. Specifically, when the operating lever 208 is rotated in the rotational direction D, the drive transmission portion 208*a* of the operating lever 208 pushes the surface 203*b*1 of the pack side shutter 203 to rotate the pack side shutter 203 in the rotational direction D. Thereafter, the surface 203*b*2 of the pack-side shutter 203 pushes the driven transmission portion 209*e* of the apparatus-side shutter 209, and the apparatus-side shutter 209 is rotated in the rotational direction D. When the operating lever 208 is rotated in the rotational direction E, the drive transmission portion 208*a* of the operating lever 208 pushes the surface 203*b*2 of the pack-side shutter 203, and the pack-side shutter 203 is rotated in the rotational direction E. Thereafter, the surface 203*b*1 of the pack-side shutter 203 pushes the driven transmission portion 209*e* of the apparatus-side shutter 209 to rotate the apparatus-side shutter 209 in the rotational direction E. Thus, the structure is such that in the case that the rotation restricting mechanism 212 described above is not provided, the apparatus-side shutter 209 is structured to be rotated by the operating lever 208 by way of the pack-side shutter 203, and therefore, the apparatus-side shutter 209 can be rotated, regardless of the position of the operation lever.

Here, if the apparatus-side shutter 209 rotates in the rotational direction D from the closed position to the open position due to an erroneous operation by the user or vibration during transportation of the image forming apparatus 1, the position of the driven transmission portion 209*e* of the apparatus-side shutter 209 in the rotational direction also shifts. Then, when the toner pack 220 is to be mounted on the mounting portion 206, the result is as follows. When the toner pack 220 is further moved in the mounting direction M after the driven transmission portion 203*b* of the pack-side shutter 203 engages with the drive transmission portion 208*a* of the operating lever 208, it is unable to engage with the driven transmission portion 209*e* of the apparatus-side shutter 209. Therefore, the toner pack 220 cannot be moved to the mounting complete position relative to the mounting portion 206. In order to prevent such a situation from occurring, the rotation restricting mechanism 212 restricts the rotation of the apparatus-side shutter 209.

Next, referring to FIGS. 65 to 67, the details of the mechanism by which the rotation restricting mechanism 212 of the mounting portion 206 is released by mounting the toner pack 220 to the mounting portion 206 will be described. FIGS. 65 and 66 are illustrations showing the process of mounting the toner pack 220 on the mounting portion 206 in chronological order. The second restriction releasing portion 204*b* functions in the same manner as the first restriction releasing portion 204*a*, and therefore, the description thereof will be omitted.

At the time shown in part (a) of FIG. 65 (part (d) of FIG. 65), the first restriction releasing portion 204*a* of the nozzle 202 and the releasing claw 214*e* of the releasing member 214 are separated from each other. At this timing, as shown in part (a) of FIG. 67 and part (c) of FIG. 67, the second guided surface 214*e*2 of the releasing claw 214*e* shown in FIG. 47 is covered by the eave portion 210*n* of the cover 210 so as not to be exposed through the center hole 210*p* of the cover 210 as viewed in the direction of the rotational axis A. When the toner pack 220 is further moved in the direction of the arrow N (mounting direction M) from this position, the first slope 204*a*1 of the first restriction releasing portion 204*a* and the first guided surface 214*e*1 of the releasing claw 214*e* are brought into contact with each other, and a state shown in part (b) of FIG. 65 (part (e) of FIG. 65) results. When the toner pack 220 is further moved in the direction of the arrow N from this position, the releasing member 214 is rotated in the rotational direction D by the force F204 received by the first guided surface 214*e*1 from the first slope 204*a*1, against the urging force F203 of the releasing spring 216 shown in FIG. 50. At this time, the first slope 204*a*1 of the first restriction releasing portion 204*a* functions as a guide surface which guides the first guided surface 214*e*1 of the releasing member 214 so that the first guided surface 214*e*1 moves along the first slope 204*a*1. In other words, the first slope 204*a*1 guides the first guided surface 214*e*1 so that the releasing member 214 is rotated in the rotational direction D about the rotational axis A. Further, the first slope 204*a*1 of the first restriction releasing portion 204*a* also functions as a first force applying surface (first push surface) for applying (pushing) a force to the first guided surface 214*e*1. The force F204 includes a force component F204*x* which rotates the releasing member 214 in the rotational direction D around the rotational axis B against the urging force of the releasing spring 216. The releasing member 214 is rotated in the rotational direction D until the first guided surface 214*e*1 passes the downstream end, in the rotational direction D, of the first slope 204*a*1 in the rotational direction D. By the rotation of the releasing member 214 in the rotational direction D, the second guided surface 214*e*2 of the releasing claw 214*e* is exposed through the center hole 210*p* of the cover 210 as viewed in the direction of the rotational axis A, as shown in part (b) of FIG. 67 (part (d) of FIG. 67). That is, the first slope 204*a*1 has a function (preceding rotation function) of rotating the releasing member 214 to a position where at least the second guided surface 214*e*2 is exposed through the center hole 210*p* of the cover 210 as viewed in the direction of the rotational axis A. Although the first slope 204*a*1 of this embodiment is a slope, the present invention is not limited to such an example. It will suffice if it is a surface engageable with the first guided surface 214*e*1 to rotate the releasing member to 14 in the rotational direction D when the toner pack 220 is mounted on the mounting portion 206.

When the toner pack 220 is further moved in the direction of arrow N from the positioned shown in part (b) of FIG. 67 (part (d) of FIG. 67), the second slope 204*a*2 of the first restriction releasing portion 204*a* is brought into contact with the second guided surface 214*e*2 of the releasing claw 214*e*, with the result in the state shown in part (c) of FIG. 65 (part (f) of FIG. 65). In this state, when the toner pack 220 is moved in the direction of the arrow N, the releasing member 214 is rotated in the rotational direction D by a force F205 received by the second guided surface 214*e*2 from the second slope 204*a*2, against the force F203 received from the releasing spring 216 shown in FIG. 50. At this time, the second slope 204*a*2 of the first restriction releasing portion 204*a* functions as a guide surface for guiding the second guided surface 214*e*2 so that the second guided surface 214*e*2 moves along the second slope 204*a*2. In other words, the second slope 204*a*2 guides the second guided surface 214*e*2 of the releasing member 214 so that the releasing member 114 is rotated in the rotational direction D around the rotational axis A. Further, the second slope 204*a*2 of the first restriction releasing portion 204*a* also functions as a second force applying surface (second push surface) for applying (pushing) a force to the second guided surface 214*e*2. The force F205 includes a force component F205*x* which rotates the releasing member 214 in the rotational direction D around the rotational axis B against the urging force of the releasing spring 216.

The releasing member 214 is rotated in the rotational direction D until the second guided surface 214*e*2 passes the downstream end, in the rotational direction D, of the second slope 204*a*2 in the rotational direction D. The rotation of the releasing member 214 in the rotational direction D up to this point is the first step for releasing the rotation restriction described above. That is, this is a step of rotating the releasing member 214 in the rotational direction D against the urging force of the releasing spring 216 to the rise restriction release position (rise restriction release region) where the rise restricted surface 214*c* does not contact the rise restricting surface 210*e* of the cover 210 when the releasing member 214 is raised, as shown in part (b) of FIG. 53. In other words, It is a step of rotating the releasing member 214 against the urging force of the releasing spring 215 in the rotational direction D to the rise restriction release position where the rise restricted surface 214*c* does not overlap with the rise restricting surface 210*e* of the cover 210 as viewed in the direction of the rotational axis B. Although the second slope 204*a*2 of this embodiment is a slope, the present invention is not limited to such an example. It will suffice if it is engageable with the second guided surface **214*e*2 to rotate the releasing member 214 in the rotational direction D when the toner pack 220 is mounted to the mounting portion 206**.

After the first step, the third guided surface **214*e*3 of the releasing claw 214*e* rides up to the upstream end of the third slope 204*a*3 in the rotational direction E by way of the connecting portion 204*a*23 of the first restriction releasing portion 204*a*. That is, the rotational direction of the releasing member 214 is switched from the rotational direction D to the rotational direction E at the connecting portion 204*a*23 of the first restriction releasing portion 204*a***.

At this time, as shown in part (a) of FIG. 66 (part (c) of FIG. 66), the third guided surface **214*e*3 of the releasing claw 214*e* contacts the third slope 204*a*3 of the nozzle 202 and receives a force F206 therefrom by the moment M202 (urging force) of the releasing spring 216. Then, by the force component F206*y* in the direction of the arrow G of the force F206, the third guided surface 214*e*3 of the releasing member 214 moves in the direction in which the third slope 204*a*3 extends, while being guided by the third slope 204*a*3. The third slope 204*a*3 guides, after the releasing member 214 is rotated in the rotational direction D by the first slope 204*a*1 and the second slope 204*a*2, the third guided surface 214*e*3 so that the releasing member 214** is moved in the arrow G direction (upward) while being rotated in the rotational direction E.

The movement of the releasing member 214 in the arrow G direction is the second step for releasing the rotation restriction described above. In the second step, the restricting member 213 is moved in the arrow G direction by the releasing member 214. In addition, the releasing member 214 is rotated in the rotational direction E until the contact surface **214*a* and the contact surface 214*f* of the releasing member 214 shown in part (d) of FIG. 47 abut against the abutment surface 204*a*5 of the projecting portion 202*b*. That is, in the releasing member 214, the rotation in the rotational direction E is stopped by the contact surface 214*f* and the contact surface 214*f* abutting (contacting) the abutment surface 204*a*5 of the projecting portion 202*b*. In this manner, the rotation restriction release operation of the rotation restricting mechanism 212 is completed in the state where the toner pack 220 is in the mounting complete position shown in part (b) of FIG. 66 (part (d) of FIG. 66) and FIG. 68. The cross-section taken along a line X214-X214 in part (a) of FIG. 68 is the same as that in part (b) of FIG. 51, and the rotation restriction of the apparatus-side shutter 209** is released.

As described above, by mounting the toner pack 220 on the mounting portion 206, the rotation restriction of the apparatus-side shutter 209 by the rotation restricting mechanism 212 is released through the first step and the second step described above. Although the third slope **204*a*3 of this embodiment is a slope, the present invention is not limited to such an example. It will suffice if the surface it is a surface that engageable with the third guided surface 214*e*3 so that the releasing member 214 to move the releasing member 414 in the direction of arrow G (upward) when the toner pack 220 is mounted to the mounting portion 206. In addition, in this embodiment, in the second step, the releasing member 214 is rotated in the rotational direction E, but the structure may be such that the releasing member 214** is not rotated in the rotational direction E.

As shown in part (a) of FIG. 68, the mounting completion position of the toner pack 220 is the position where the projecting portion end surface **202*b*2 of the projecting portion 202*b* of the nozzle 202 is in contact with the pack contact surface 209*g* of the apparatus-side shutter 209. At this mounting complete position, the position of the toner pack 220 in the direction of the rotational axis A is determined with respect to the mounting portion 206. In addition, the inner peripheral surface 202*b*1 of the projecting portion 202*b* of the nozzle 202 is fitted (engaged) with the small diameter portion 209*d*2 of the center boss 209*d* of the apparatus-side shutter 209, By which the position thereof in the radial direction r of the imaginary circle VC on the downstream side of the mounting direction M. Further, as shown in part (c) of FIG. 68 which is a cross-section taken along line X212-X212 of part (a) of FIG. 68, three positions of the radial positioning portion 203*f* (FIG. 57, FIG. 59) of the pack side shutter 203 are in contact with the inner peripheral surface 209*h* (FIG. 44) of the apparatus-side shutter 209. By this, the positions of the nozzle 202 and the pack side shutter 203 (toner pack 220**) in the radial direction r of the imaginary circle VC on the upstream side of the mounting direction M is determined.

On the other hand, as shown in part (b) of FIG. 68 which is a cross-section taken along a line X213-X213 of part (a) of FIG. 68, the positioning portion **207*a* of the first frame 207 is engaged with the positioned portion of the nozzle 202 having the surface 202*d*1 and the surface 202*d*2. Therefore, the nozzle 202 is positioned with respect to the first frame 207 (base frame 221) in the arrow R direction of the surface 202*d*1 and the surface 202*d*2. By this, the position of the nozzle 202 is determined with respect to the first frame 207 in the direction of the arrow R, and therefore, the operation of releasing the rotation restriction relative to the apparatus-side shutter 209 can be further stabilized. In this description, the magnitudes of the force F204, the force F205, and the force F206 for operating the releasing member 214** are selected to be so large that the influences of gravity and frictional force can be ignored, and therefore, the description relating to the gravity and the frictional force are omitted.

By the mechanism described above, the rotation restriction of the apparatus-side shutter 209 by the rotation restricting mechanism 212 is released, and the apparatus-side shutter 209 becomes rotatable from the closed position to the release position.

Further, It is possible that when the contact surface **214*a* and the contact surface 214*f* of the releasing member 214 come into contact with the abutment surface 204*a*5, the releasing member 214 is vigorously rotated by the moment M202 to generate a light collision sound. In addition, the hand of the user holding the toner pack 220 can be made to feel the reaction. That is, the user can also recognize that the rotation restriction of the apparatus-side shutter 209 is released (mounting is completed) by the collision sound or the reaction. When the toner pack 220 is dismounted from the mounting portion 206, the reverse process of FIG. 65 is carried out, and the rotation of the apparatus-side shutter 209 is restricted by the rotation restricting mechanism 212** again.

(Operation of Operation Lever)

When the toner pack 220 is in the mounting complete position, as shown in part (b) of FIG. 68, the drive transmission portion **208*a* (lever projection) of the operating lever 208 and the driven transmission portion 203*b* (rotatable member recess) of the pack side shutter 203 are engaged with each other. In addition, as shown in part (c) of FIG. 68, the driven transmission portion 203*b* (rotatable member recess portion) of the pack-side shutter 203 is engaged with the driven transmission portion 209*e* (shutter projection) of the apparatus-side shutter 209. That is, as described above, the structure is such that in the state where the toner pack 220 is mounted on the mounting portion 206, the operating lever 208, the pack-side shutter 203, and the apparatus-side shutter 209** rotate integrally around the rotational axis A (rotational axis B).

Figure 69:
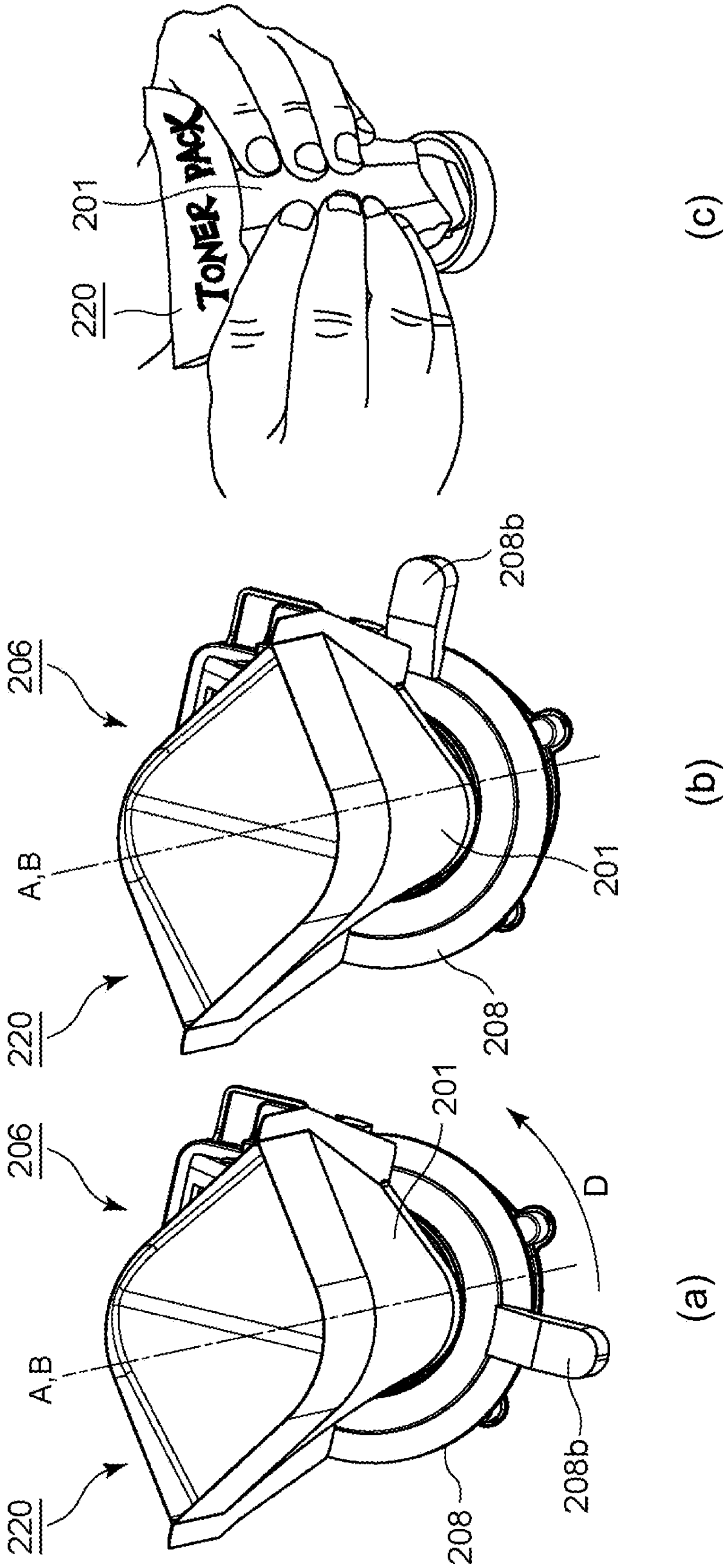
FIG. 69 the perspective views of the toner pack mounted to the mounting portion when the operating lever is in the closed position and the open position, as viewed from above.

Here, part (a) of FIG. 69 is a perspective view of the toner pack 220 when the operating lever 208 is in the closed position, as viewed from above. Part (b) of FIG. 69 is a perspective view of the toner pack 220 when the operating lever 208 is in the open position, as viewed from above. Part (c) of FIG. 69 is an illustration showing a state in which the user loosens the accommodating portion 201 and replenishes the toner in the state of part (b) of FIG. 69.

As shown in part (a) of FIG. 69 and part (b) of FIG. 69 it is understood that when the operating portion 208*b* of the operating lever 208 is rotated in the rotational direction D after the mounting of the toner pack 220 on the mounting portion 206 is completed, the apparatus-side shutter 209 rotates from the closed position to the open position, and the accommodating portion 101 does not rotate even when the operating lever 208 for rotating the pack-side shutter 203 from the closed position to the open position is rotated. It is the pack side shutter 203 and the apparatus-side shutter 209 that rotate together with the operating lever 208.

When the pack-side shutter 203 rotates from the closed position to the open position, a frictional force F207 received by the nozzle 102 from the pack-side shutter 103 by way of the pack-side seal 105 is directed in the rotational direction K as shown in part (a) of FIG. 57. This is the same direction as the rotational direction D of the operating lever 108 in FIG. 69. The nozzle 202 receives the frictional force F207 and may rotate in the rotational direction K by the amount of the play between the surfaces 202*d*1 and the surfaces 202*d*2 and the positioning portion 207*a* of the first frame 207. The rotational direction of the nozzle 202 at this time is such that the third slope 204*a*3 of the first restriction releasing portion 204*a* approaches the releasing claw 214*e* of the releasing member 214, and such that the third slope 204*b*3 of the second restriction releasing portion 204*b* approaches the releasing claw 214*e* of the releasing member 214. That is, when the operating lever 208 is rotated to rotate the pack-side shutter 203 from the closed position to the open position, the restricting member 213 moves upward (in the U direction) together with the releasing member 214. Then, the second restricting surface 213*c* of the restricting member 213 is separated upward from the restricted rib 209*c* of the apparatus-side shutter 209, with the result that the margin for releasing the rotation restriction is increased. Therefore, it is possible to more stably maintain the state in which the rotation restriction is released with respect to the apparatus-side shutter 109.

By the above operation, the toner pack 220 accommodating portion 201 and the toner accommodating chamber 36 are brought into contact with each other by way of the discharge opening 202*a*, the receiving opening 209*a*, and the apparatus-side opening 217*a*.

Figure 70:
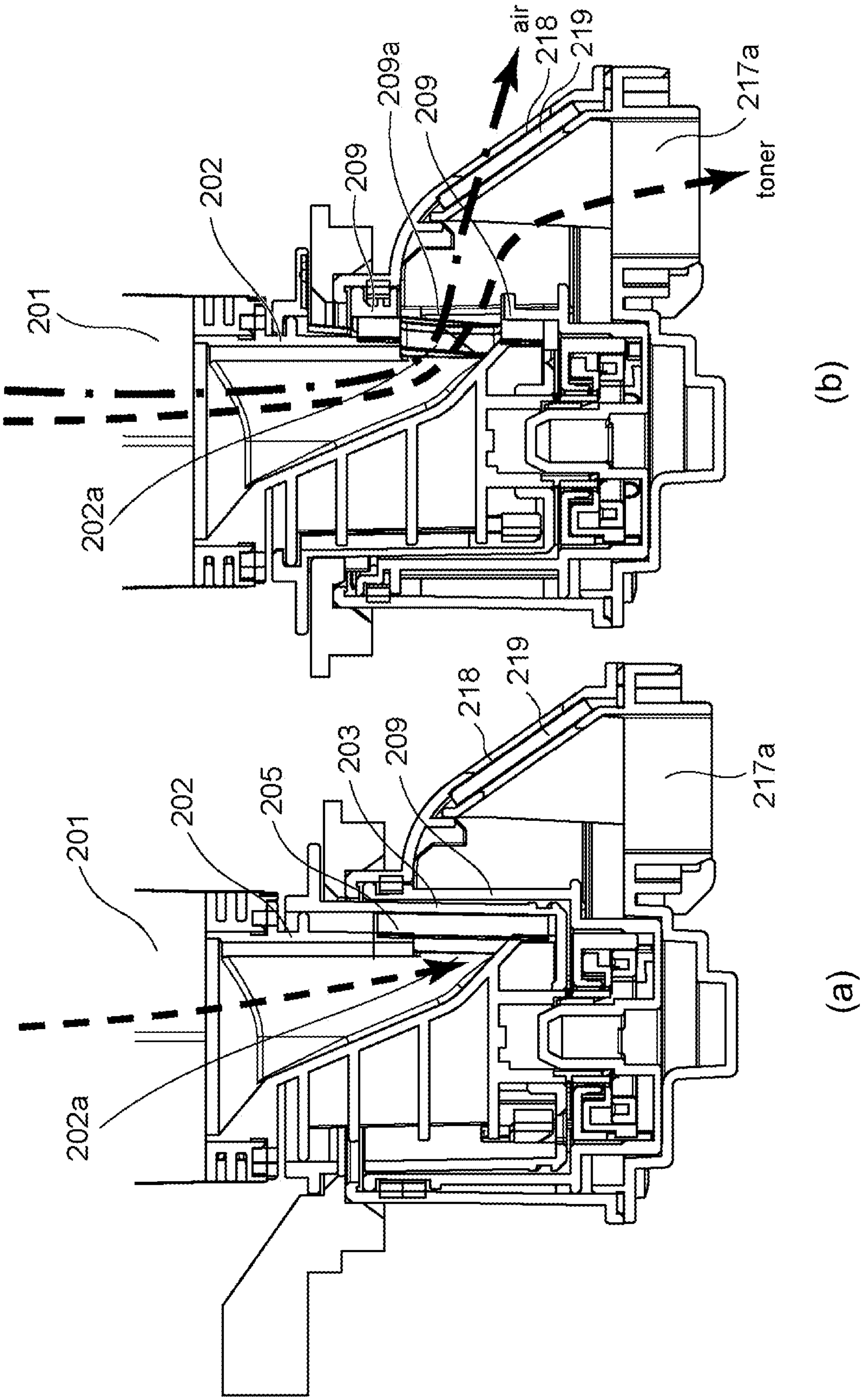
FIG. 70 is sectional views illustrating a toner movement path when the apparatus-side shutter and the pack-side shutter are closed and opened.

Here, part (a) of FIG. 70 is a sectional view of the toner pack 220 and the mounting portion 206 when both the apparatus-side shutter 209 and the pack-side shutter 203 are in the closed positions. Part (b) of FIG. 70 is a cross-sectional view of the toner pack 220 and the mounting portion 206 when both the apparatus-side shutter 209 and the pack-side shutter 203 are in the open positions.

In part (a) of FIG. 70, the discharge opening 202*a* of the nozzle 202 is closed by the pack side shutter 203, the pack side seal 205, and the apparatus-side shutter 209, so that the toner in the accommodating portion 201 cannot reach the apparatus-side opening 217*a* of the second frame 217. On the other hand, in part (b) of FIG. 70, the discharge opening 202*a* of the nozzle 202 is opened by the movement of the pack-side shutter 203, the pack-side seal 205, and the apparatus-side shutter 209. As shown in part (c) of FIG. 69, as the accommodating portion 201 is compressed by the user, the toner in the accommodating portion 201 is discharged to the outside of the toner pack 220 together with the air from the discharge opening 202*a*. A part of the air discharged from the discharge opening 202*a* passes through the first filter 218 and the second filter to be discharged to the outside of the mounting portion 206. The toner is replenished into the toner accommodating chamber 36 of the developer container 32 through the apparatus-side opening 217*a* of the second frame 217.

Modified Example 1

Next, referring to FIGS. 72 to 78, another structure will be described. The same points as those of the above-described examples will be omitted. In particular, of the elements disclosed in this modified example, those corresponding to the members described in Embodiment 2 are assigned the like names as the members of Embodiment 2, and the points different from those of Embodiment 2 will be described.

In this embodiment, the projecting portion 202*b* of the nozzle 202 is integrally formed with the nozzle 202. In this modified example, the projecting portion of Embodiment 2 is an attachment which is a component different from the nozzle. The attachment is an attachment to be mounted to the image forming apparatus 1. And, a mounting kit includes the attachment and a toner pack having no projection. The structure of the attachment will be described below.

Figure 72:
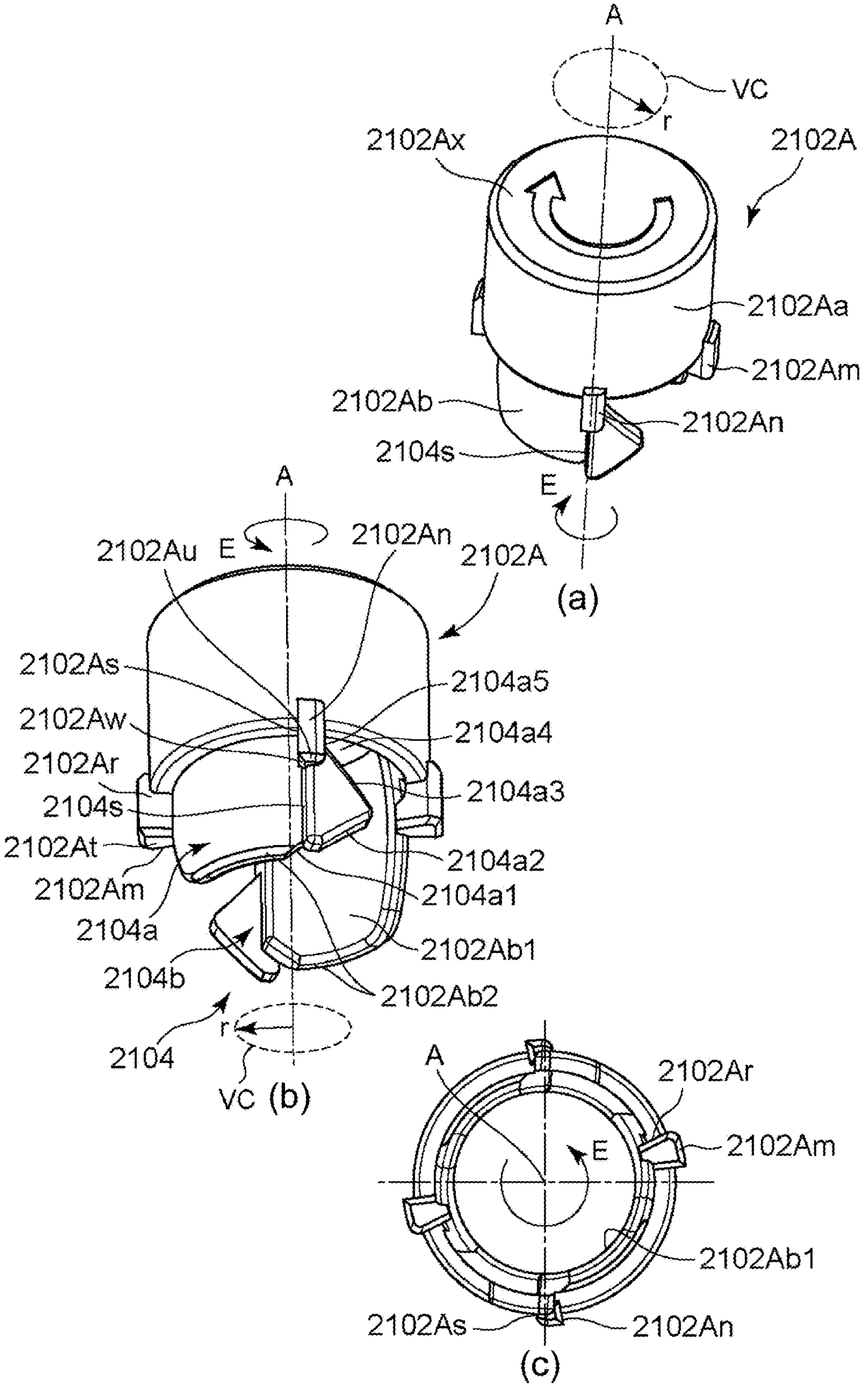
FIG. 72 is a perspective view and a side view of an attachment according to the Modified Example 1 of Embodiment 2.
Figure 76:
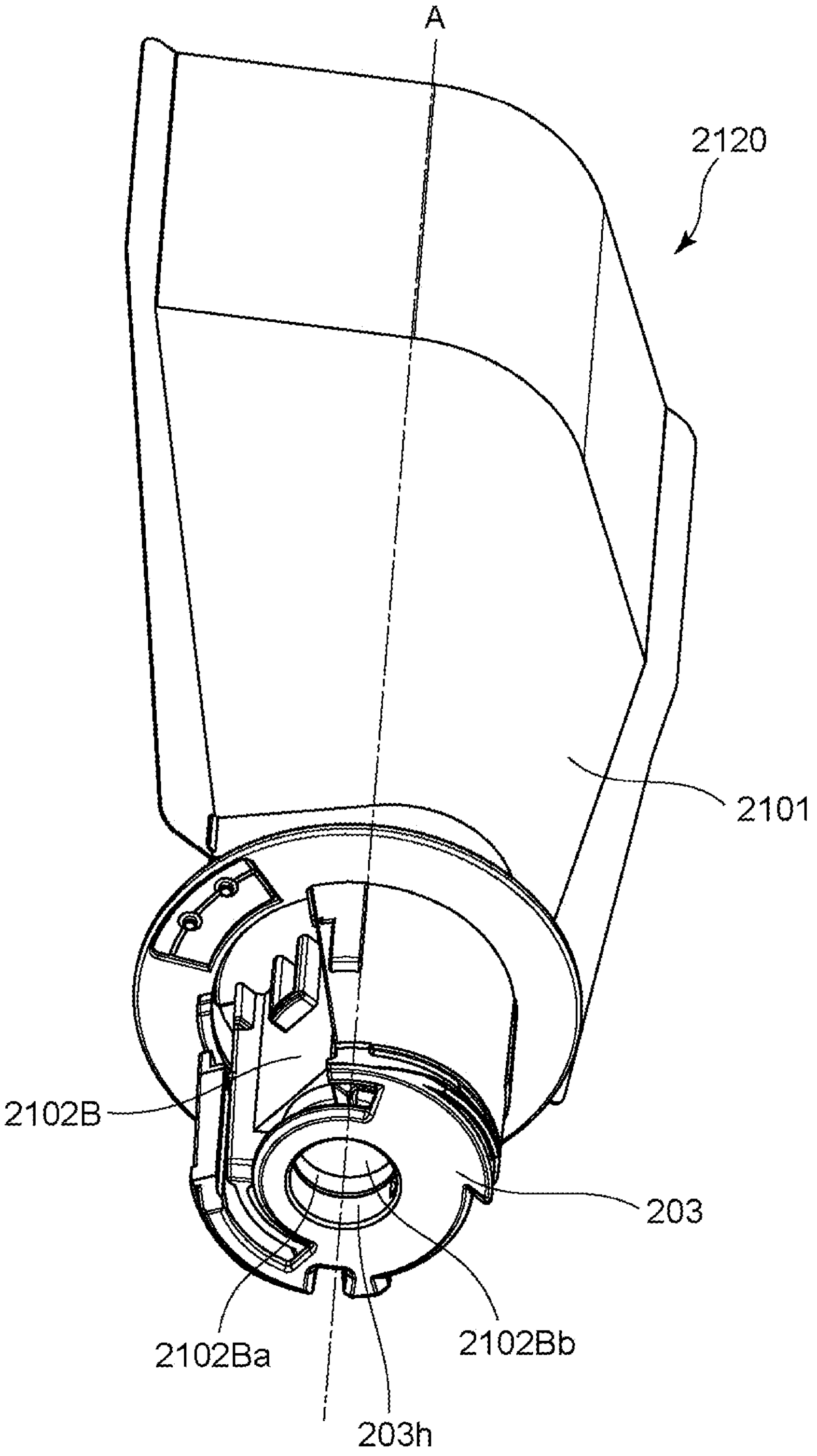
FIG. 76 is a perspective view of the toner pack according to Modified Example 1 of Embodiment 2.
Figure 77:
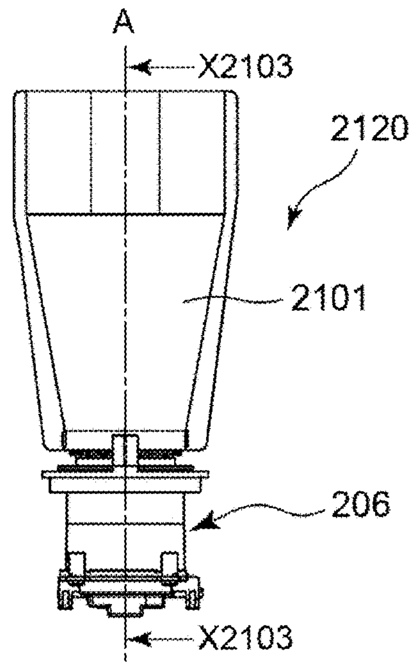
FIG. 77 is a side view and a sectional view of the toner pack mounted to the main assembly of the apparatus in Modified Example 1 of Embodiment 2.
Figure 77:
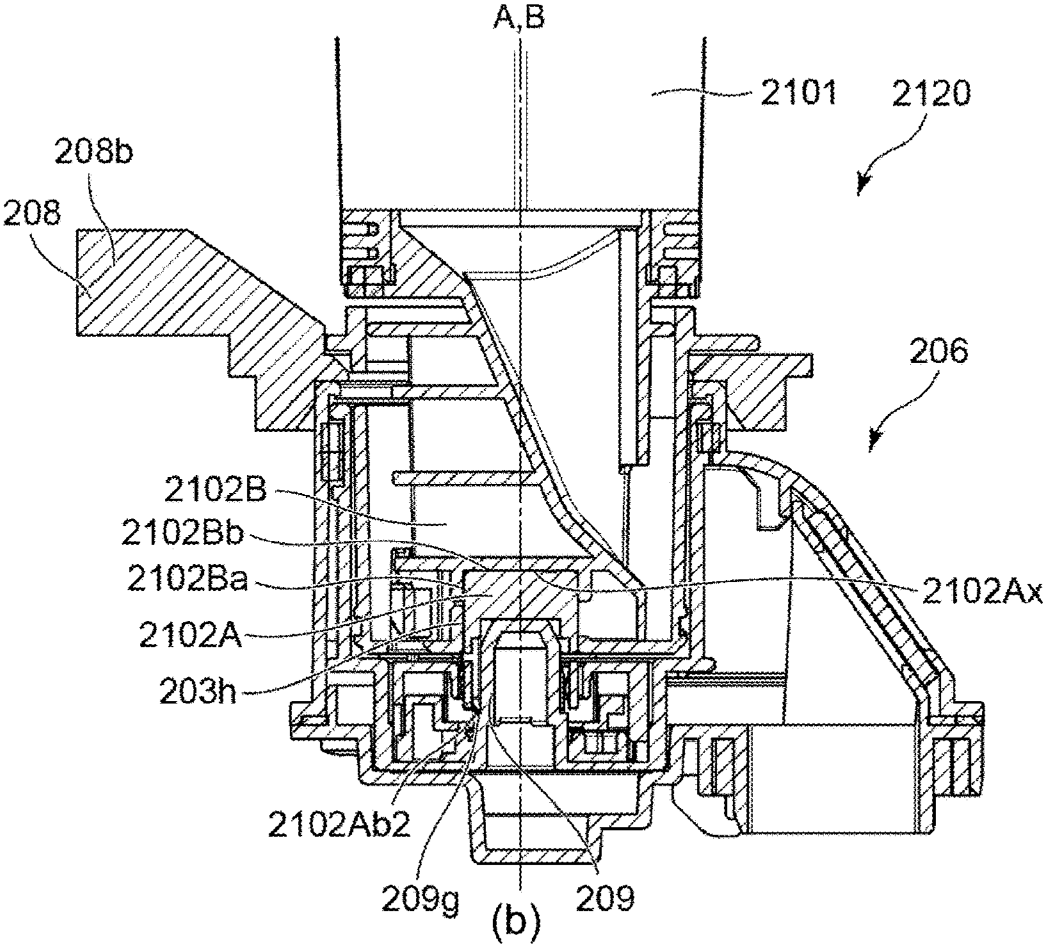
Figure 78:
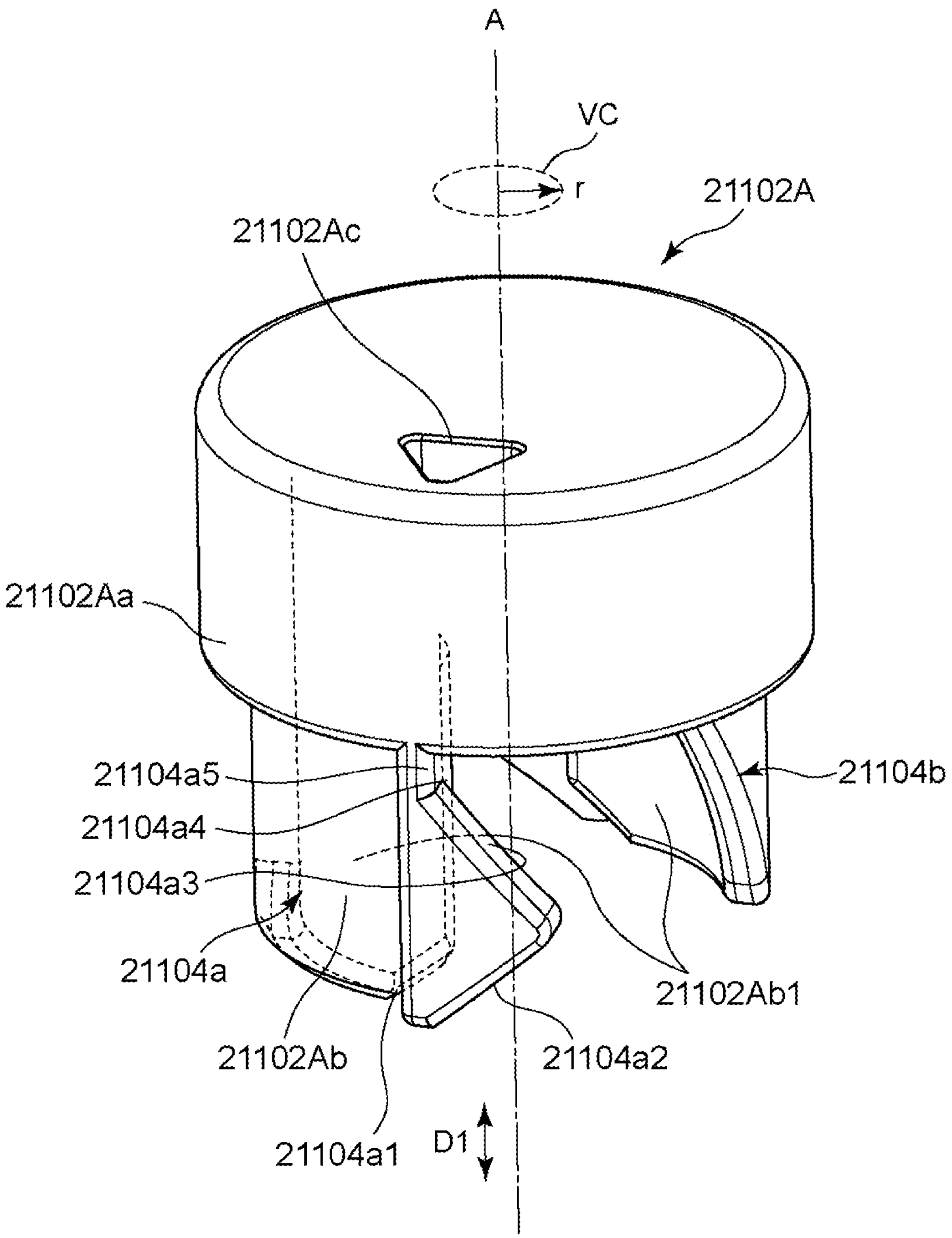
FIG. 78 is a perspective view of an attachment including different shapes according to Modified Example 1 of Embodiment 2.

FIG. 72 is a perspective view of the attachment 2102A of this modified example. Part (a) of FIG. 72 and part (b) of FIG. 72 are perspective views of the attachment 2102A as viewed from points different from each other, and part (c) of FIG. 72 is a perspective view of the attachment as viewed from a point different that of part (b) of FIG. 72. FIG. 76 is a perspective view of the toner pack 2120 having no projection. Part (a) of FIG. 77 is a side view of a state in which the toner pack 2120 is mounted on the image forming apparatus 1, and part (b) of FIG. 77 is a sectional view taken along a line X2103-X2103 in part (a) of FIG. 77. FIG. 78 is a perspective view of the attachment 21102A having a shape different from that of the attachment 2102A of this modified example.

When the attachment 2102A is mounted to the mounting portion 206, the rotation restriction by the rotation restricting mechanism 212 can be released even if the mounting is started from any phase in the circumferential direction of the imaginary circle VC to the mounting portion 206. The structure of this modified example will be described below.

As shown in part (a) of FIG. 72, the attachment 2102A has a generally cylindrical shape, and includes a cylindrical portion 2102Aa and a projecting portion 2102Ab provided in the order named from the first end side of the first direction D1. The cylindrical portion 2102Aa and the projecting portion 2102Ab have inner peripheral surfaces 2102Ab1. The inner peripheral surface 2102Ab1 of this modified example is a cylindrical surface having a central axis A. The inner peripheral surface 2102Ab1 does not necessarily have to be a cylindrical surface as in Embodiment 2. The projecting portion 2102Ab has the same structure as the projecting portion 202*b* of the nozzle 202 of Embodiment 2 shown in part (b) of FIG. 59 and part (c) of FIG. 59 and FIG. 60. The first restriction releasing portion 2104*a* (first projection) and the second restriction releasing portion 2104*b* (second projection) of the projecting portion 2102Ab in the present modified example have the same structure as the first restriction releasing portion 204*a* and the second restriction releasing portion 204*b* of Embodiment 2, respectively, and they are structured with the central axis A of the inner peripheral surface 2102Ab1 as the reference. That is, the first slope 2104*a*1, the second slope 2104*a*2, the third slope 2104*a*3, the cavity 2104*a*4, and the abutment surface 2104*a*5 of the projecting portion 2102Ab have the same structures as the first slope 204*a*1, the second slope 204*a*2, and the third slope 204*a*3, the cavity 204*a*4, and the abutment surface 204*a*5, respectively, and are structured with the central axis A of the inner peripheral surface 2102Ab1 as the reference. The second restriction releasing portion 2104*b* has a shape that is 180 degrees rotationally symmetric with respect to the rotational axis A of the first restriction releasing portion 2104*a*, and therefore, the description thereof will be omitted.

The cylindrical portion 2102Aa and the projecting portion 2102Ab are coaxially with the central axis A. The cylindrical portion 2102Aa is provided with an end surface 2102Ax perpendicular to the central axis A on the first end side in the first direction D1. Here, the attachment 2102A has a shape that is 180-degree rotationally symmetric with respect to the central axis A, and therefore, only one side will be described. The cylindrical portion 2102Aa is provided with projections 2102Am and 2102An which are on the second end side in the first direction D1 and which project in the radial direction r of the imaginary circle VC centered on the central axis A. The projections 2102Am and 2102An are placed in the projecting portion 2102Ab in the rotational direction about the central axis A, and a projection 2102An is provided on the downstream side in the rotational direction E of the projection 2102Am. In addition, on the upstream side of the projection 2102Am in the rotational direction E, an end surface 2102Ar parallel to the central axis A and crossing the rotational direction E is provided. Further, on the downstream side of the projection 2102An in the rotational direction E, an end surface 2102As parallel to the central axis A and crossing the rotational direction E is provided. The end surface 2102As is provided adjacent to the restriction releasing portion 2104*b* of the projecting portion 2102Ab, and the end surface 2102As is on the downstream side, in the rotational direction E, of the surface 2104*s* which is a surface of the restriction releasing portion 2104*b* facing the downstream side in the rotational direction E. Here, the surface 2104*s* is a flat surface which is parallel to the central axis A and crossing the rotational direction about the central axis A. The end surface 2102As and the surface 2104*s* are smoothly connected in the first direction D1 by a slope 2102Aw.

End surfaces 2102At and 2102Au on the second end side, in the first direction D1, of the projections 2102Am and 2102An are flat surfaces perpendicular to the central axis A, are placed at the same position in the first direction D1 and are located on the first end side in the first direction D1 from the projection end surface 2102Ab2 of the projecting portion 2102Ab.

(Mounting of Attachment)

Figure 73:
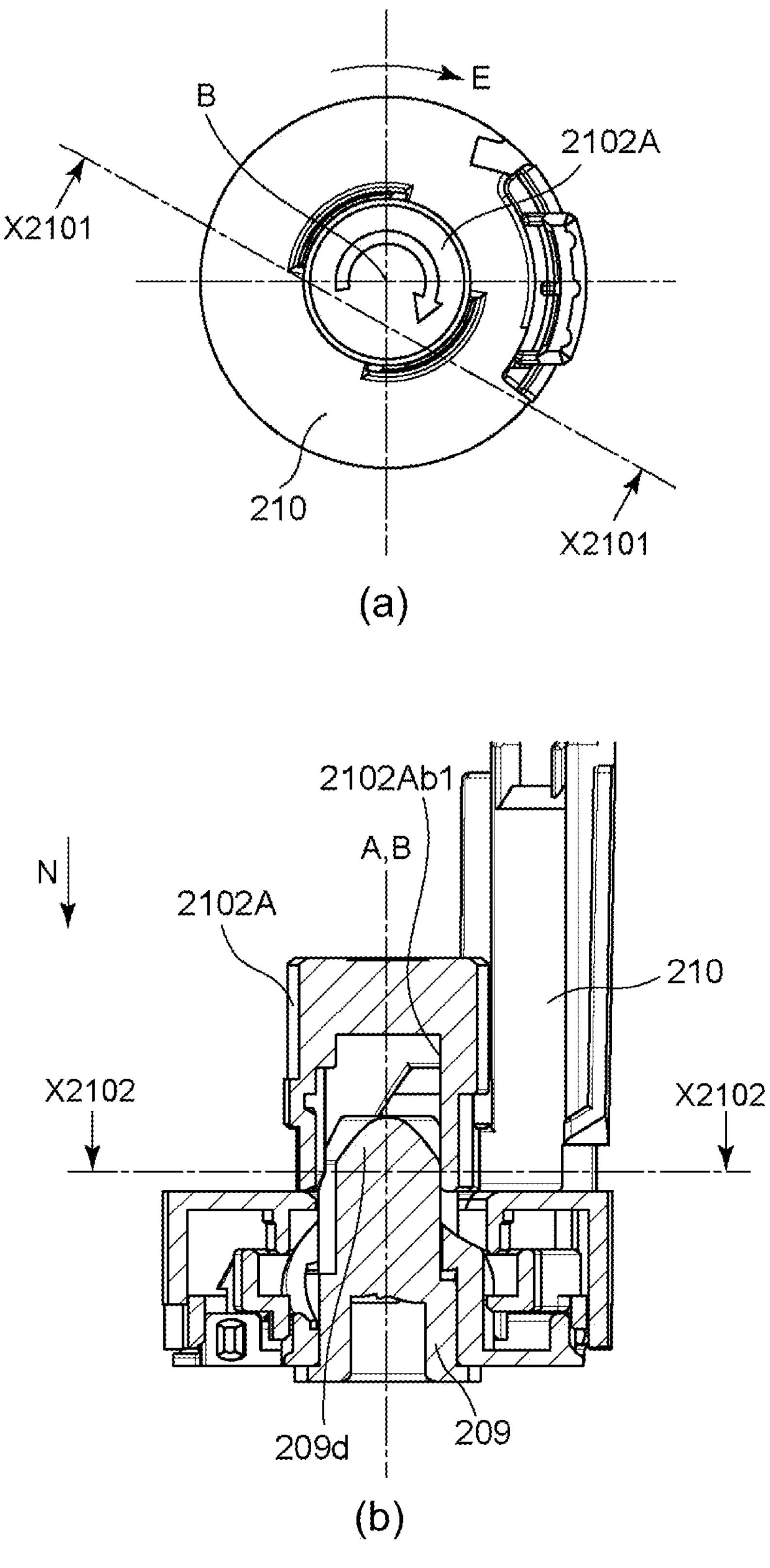
FIG. 73 is a top view and a cross-sectional view illustrating only the portions related with mounting of the attachment to the main assembly of the apparatus in Modified Example 1 of Embodiment 2.
Figure 74:
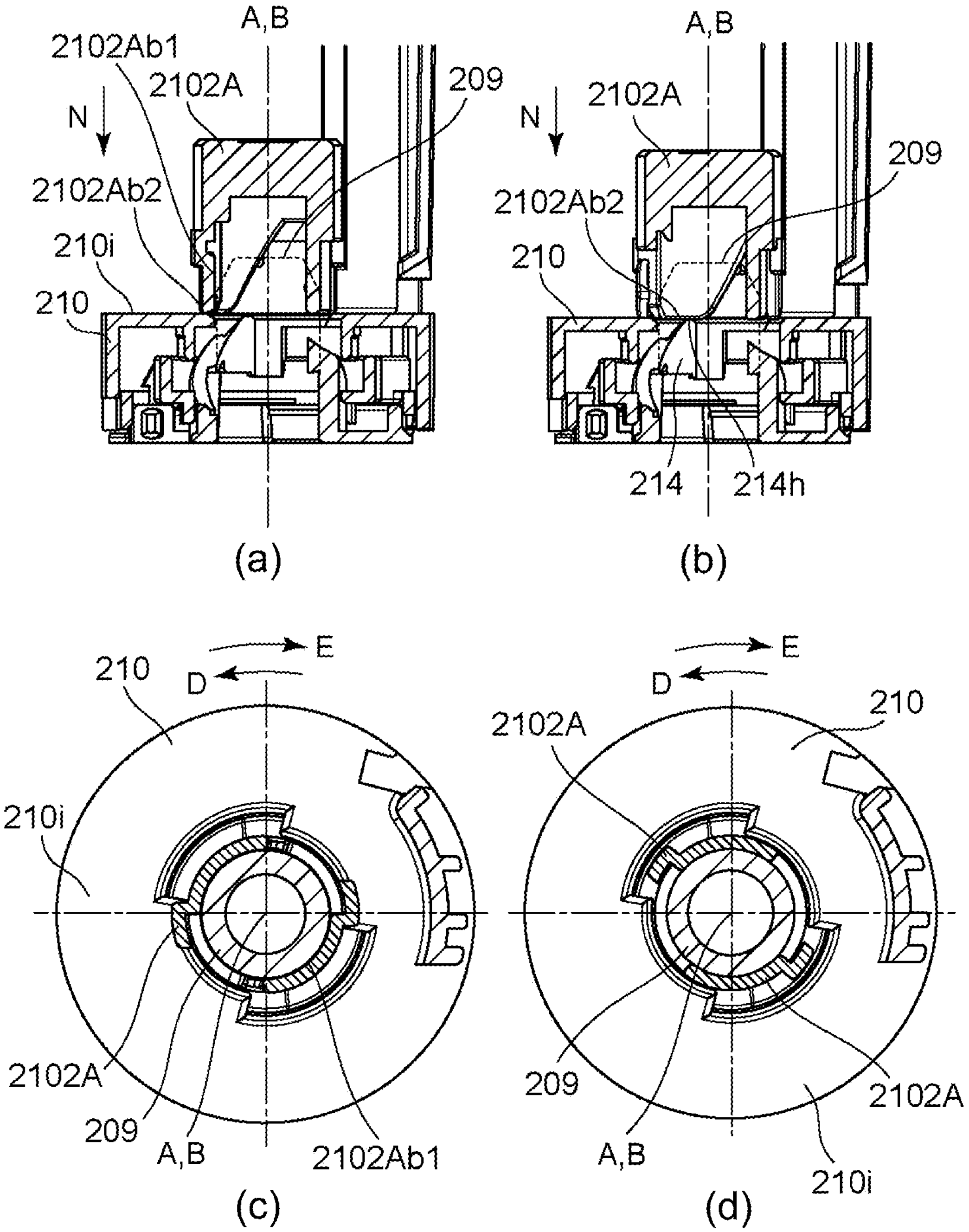
FIG. 74 is sectional views illustrating a process of mounting the attachment to the apparatus main assembly according to Modified Example 1 of Embodiment 2.
Figure 75:
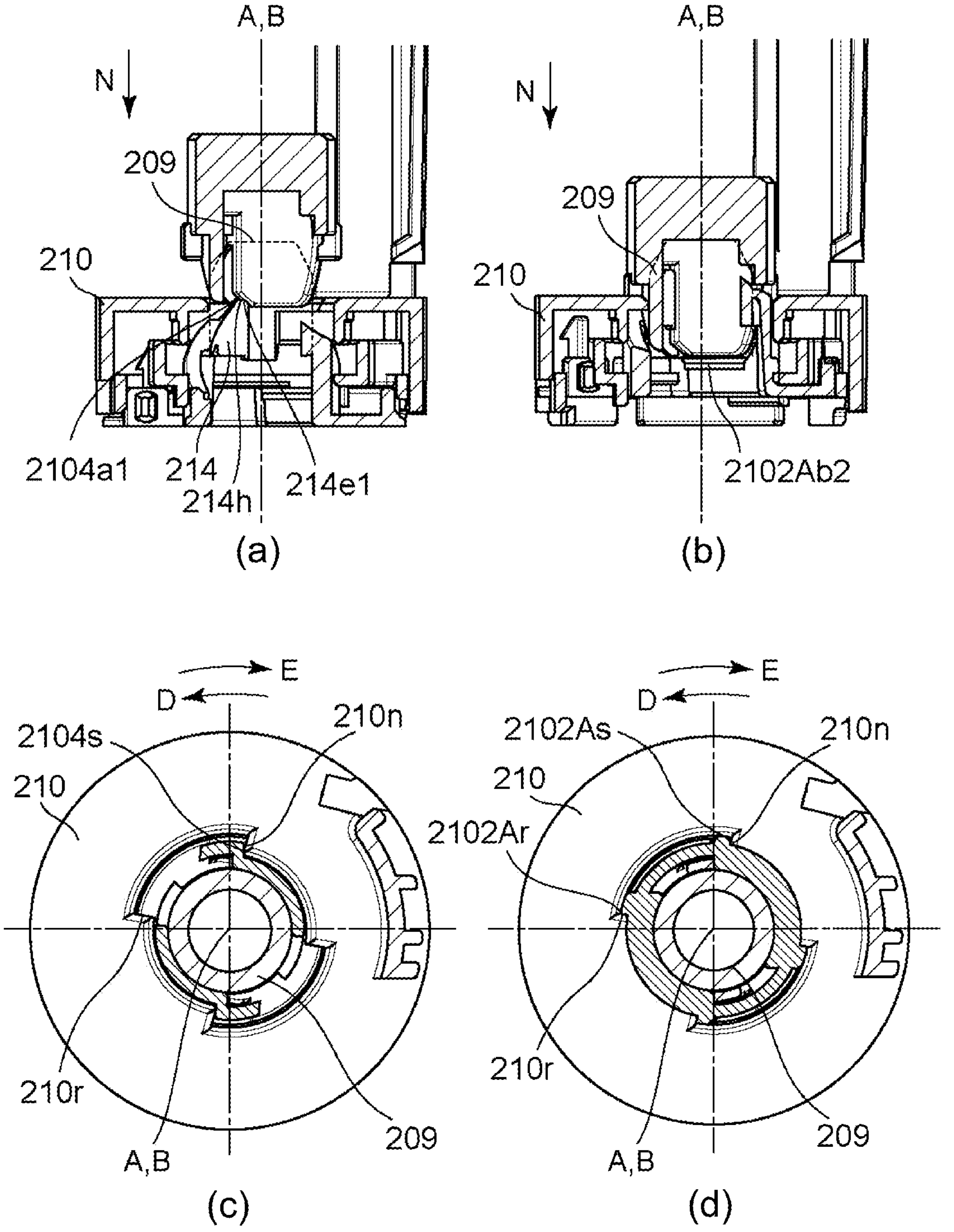
FIG. 75 is sectional views illustrating a process of mounting the attachment to the apparatus main assembly according to Modified Example 1 of Embodiment 2.

The attachment 2102A is mounted to the mounting portion 206 of the image forming apparatus 1. The details will be described below. Referring to FIGS. 73, 74 and 75, a method (usage method) of mounting the attachment 2102A to the image forming apparatus 1 will be described.

FIG. 73 is a schematic view illustrating parts of the cover 210, the restricting member 213, the releasing member 214, and the apparatus-side shutter 209 relating to a mounting operation of the attachment 2102A to the mounting portion 206, with the other portions omitted. Part (a) of FIG. 73 is a top view, and part (b) of FIG. 73 is a sectional view taken along the line X2101-X2101 in part (a) of FIG. 73. FIGS. 74 and 75 are sectional views illustrating a mounting process. In addition, it is a Figure illustrating the cover 210, the restricting member 213, and the releasing member 214, which are relating to mounting of the attachment 2102A to the image forming apparatus 1, With the other portions omitted. That is, FIGS. 74 and 75 are illustrations in which the apparatus-side shutter 209 is omitted from FIG. 73. Part (a) of FIG. 74, part (b) of FIG. 74, part (a) of FIG. 75 and part (b) of FIG. 75 are sectional views, taken along a line X2101-X2101 in part (a) of FIG. 73, illustrating the process of mounting the attachment 2102A to the image forming apparatus 1. In addition, part (c) of FIG. 74, part (d) of FIG. 74, part (c) of FIG. 75, and part (d) of FIG. 75 are cross-sectional views taken along a line X2102-X2102 in part (b) of FIG. 73, corresponding to the states shown in part (a) of FIG. 74, part (b) of FIG. 74, part (a) of FIG. 75, and part (b) of FIG. 75, respectively.

As shown in part (b) of FIG. 73, the user mounts the attachment 2102A to the mounting portion 206 by moving it downward (arrow N) with the projecting portion 2102Ab facing downward (gravity direction) and with the central axis A directed approximately in a predetermined direction facing the gravity direction. At this time, the mounting movement is effected so that the inner peripheral surface 2102Ab1 (recess) of the attachment 2102A is engaged (fitted) with the center boss 209*d* (positioning shaft, shaft portion) of the apparatus-side shutter 209. By engaging (fitting) the inner peripheral surface 2102Ab1 of the attachment 2102A with the center boss 209*d*, the attachment 2102A is positioned in the radial direction about the rotational axis B with respect to the apparatus-side shutter 209, and the central axis A of the attachment 2102A becomes coaxial with the rotational axis B of the mounting portion 206. Further, the user pushes the attachment 2102A in the direction of arrow N while rotating it in the rotational direction E.

As shown in part (a) of FIG. 74 and part (c) of FIG. 74, when the attachment 2102A is mounted in the direction of the arrow N, the inner peripheral surface 2102Ab1 of the attachment 2102A engages with the center boss 209*d* of the apparatus-side shutter 209, and then the projecting portion end surface 2102Ab2 of the attachment 2102A abuts to the upper surface 210*i* of the cover 210. Further, as shown in part (b) of FIG. 74 and part (d) of FIG. 74, the user pushes the attachment 2102A in the direction of the arrow N while rotating the attachment 2102A in the rotational direction E, and the projection end surface 2102Ab2 of the attachment 2102A abuts to the end surface 214*h* of the releasing member 214 placed on the second end side in the first direction D1. As shown in part (a) of FIG. 75 and part (c) of FIG. 75, when the user further rotates the attachment 2102A in the rotational direction E, the first slope 2104*a*1 of the attachment 2102A comes into contact with the guided surface 214*e*1 of the releasing member 214. In this manner, the releasing member 214 is rotated in the rotational direction D while being guided by the first slope 2104*a*1 by application of a force from the first slope 214*a*1 as in Embodiment 2. Further, By the user rotating the attachment 2102A in the rotational direction E, as shown in part (c) of FIG. 75, the surface 2104*s* abuts to the eave portion 210*n* of the cover 210 in the rotational direction E, and the rotation of the attachment 2102A is stopped thereby.

When the user further pushes the attachment 2102A in the direction of the arrow N from the state shown in part (a) of FIG. 75 and part (c) of FIG. 75, the slope 2102Aw (see part (b) of FIG. 72) abuts to the eave portion 210*n* of the cover 210, by which an attachment 2102A slightly rotates in the rotational direction D along the slope 2102Aw relative to the cover 210. Further, as shown in part (b) of FIG. 75 and part (d) of FIG. 75, when the user pushes the attachment 2102A in the direction of the arrow N, the end surface 2102As and the end surface 2102Ar are sandwiched in the rotational direction centered on the central axis A, between the eave portion 210*n* and the surface 210*r* facing the eave portion 210*n* in the rotational direction centered on the central axis A, and it is tightly fitted. Here, the surface 210*r* is parallel to the central axis A and process with the rotational direction E about the central axis A. Further, when the attachment 2102A is pushed in the arrow N direction by the user, the projecting portion end surface 2102Ab2 abuts to the pack contact surface 209*g*, and the movement of the attachment 2102A in the arrow N direction is stopped (see part (b) of FIG. 77)

The operation of the releasing member 214 accompanying the attachment of the above attachment 2102A to the mounting portion 206 will be described.

First, as shown in part (a) of FIG. 75, the releasing member 214 is rotated in the rotational direction D while being guided by the first slope 2104*a*1.

Further, the attachment 2102A moves in the direction of the arrow N, and the releasing member 214 rotated in the rotational direction D by the force F204 (see FIG. 65) which the first guided surface 214*e*1 receives from the first slope 2104*a*1, against the urging force F203 of the spring 216 shown in FIG. 50.

The releasing member 214 is rotated in the rotational direction D until the first guided surface 214*e*1 passes the downstream end, in the rotational direction D, of the first slope 2104*a*1 in the rotational direction D.

The attachment 2102A is further moved in the direction of the arrow N, the second slope 2104*a*2 of the first restriction releasing portion 2104*a* abuts to the second guided surface 214*e*2 of the releasing claw 214*e*, with the results of the state shown in part (c) of FIG. 65 (part (f) of FIG. 65) is reached. In this state, when the attachment 2102A is moved in the direction of the arrow N, the releasing member 214 is rotated in the rotational direction D by the force F205 received by the second guided surface 214*e*2 from the second slope 2104*a*2, against the urging force F203 applied by the releasing spring 216 of the releasing spring 216.

The releasing member 214 is rotated in the rotational direction D until the second guided surface 214*e*2 passes the downstream end, in the rotational direction D, of the second slope 2104*a*2 in the rotational direction D. The rotation of the releasing member 214 in the rotational direction D up to this point is the first step for releasing the rotation restriction.

The subsequent operations of the releasing member 214 are the same as those in Embodiment 2, and therefore, the description thereof will be omitted.

As in Embodiment 2, the rotation restriction by the rotation restricting mechanism 212 of the image forming apparatus 1 is released, and the apparatus-side shutter 209 becomes in a rotatable state. Here, the attachment 2102A is started to be mounted to the mounting portion 206 at any phase in the rotational direction about the central axis A. The release operation is started from which state described above depends on the phase at which the mounting is started, but the rotation restriction by the rotation restricting mechanism 212 can be released regardless of the state at which the release operation is started.

After the attachment 2102A is mounted to the mounting portion 206, the toner pack 2120 having no projection as shown in FIG. 76 is mounted to the mounting portion 206 of the image forming apparatus 1 as shown in FIG. 77. As shown in FIG. 76, since the toner pack 2120 of this modified example has the same shape as that of Embodiment 2 except for the nozzle 202 shown in Embodiment 2, the description other than the nozzle 2102B will be omitted.

In the nozzle 2102B of this modified example, a cylindrical recess portion 2102Ba is provided coaxially with the central axis A on the first end side in the first direction D1. A surface 2102Bb perpendicular to the central axis A is provided on the second end side of the recess 2102Ba in the first direction D1. As shown in part (b) of FIG. 77, the toner pack 2120 is mounted to the mounting portion 206 in the same manner as in Embodiment 2, and the through hole 203*h* which is on first end side of the pack side shutter 203 in the first direction D1 and which is coaxial with the central axis A the attachment 2102A engages with the cylindrical portion 2102Aa. It will suffice if the through hole 203*h* is larger than the cylindrical portion 2102Aa. Thereafter, similarly, the recess 2102Ba of the nozzle 2102B engages (fits) with the cylindrical portion 2102Aa of the attachment 2102A and the position of the nozzle 2102B in the radial direction relative to the attachment 2102A is determined. Further, the surface 2102Bb of the nozzle 2102B abuts to the end surface 2102Ax of the attachment 2102A, so that the mounting in the arrow N direction is completed. Thereafter, the toner in the accommodating portion 2101 is replenished into the toner accommodating chamber 36 of the developer container 32 in the same manner as in Embodiment 2. After use, the toner pack 2120 is removed in the same manner as in Embodiment 2, and then the attachment 2102A is removed against the tightening fitting force of the cover 210.

A mounting kit may include the attachment 2102A and the toner pack 2120 having no projection are set.

The method of using the mounting kit has two steps. The first step is a step of moving the attachment 2102A downward along the central axis in a state of being oriented in the predetermined direction described above to mount the attachment 2102A to the mounting portion. The second step is a step after the first step, and is a step of mounting the toner pack 2120 on the mounting portion. By the first step, the rotation restriction by the rotation restricting mechanism 212 of the apparatus-side shutter 209 is released. By the second step, the toner pack 2120 is mounted to the mounting portion 206 to which the attachment 2102A is mounted.

By transporting the toner pack in the form of the mounting kit, the packaging size of the toner pack 2120 in the central axis A direction can be reduced as compared with the structure of Embodiment 2. When the toner pack 2120 is used, the rotation restriction by the rotation restricting mechanism 212 of the apparatus-side shutter 209 can be released as in the other embodiments, by the user mounting the attachment 2102A to the image forming apparatus 1 in advance. When the toner pack 2120 is used, the rotation restriction by the rotation restricting mechanism 212 of the apparatus-side shutter 209 can be released as in the other embodiments, by the use of mounting the attachment 2102A to the toner pack 2120 in advance.

Next, the attachment 21102A having a structure simpler than that of the attachment 2102A will be described.

The attachment 2102A has been described as having the structure with which the rotation restriction by the rotation restricting mechanism 212 can be released regardless of the beginning phase, in the circumferential direction of the imaginary circle VC, of the mounting of the attachment 2102A to the mounting portion 206. However, it is also possible to employ a simpler structure such as the attachment 21102A, with which the user aligns and mounts the mounting portion 206 so as to match the phase of the mounting portion 206 around the central axis A.

As shown in FIG. 78, the attachment 21102A has a generically cylindrical shape, and a cylindrical portion 21102Aa and a projecting portion 21102Ab (projecting portion) are provided in the order named in the first direction D1. In the following, in the first direction D1, the cylindrical portion 21102 side of the attachment 21102A is referred to as the first end portion and the projecting portion side is referred to as the second end portion.

The cylindrical portion 21102Aa has an inner peripheral surface 21102Ab1. The inner peripheral surface 21102Ab1 of this modified example is a cylindrical surface having a central axis A. As shown in FIG. 71 of Embodiment 2, the inner peripheral surface 21102Ab1 does not have to be a cylindrical surface as long as the central axis A can be defined. The projecting portion 21102Ab has the same structure as the projecting portion 202*b* of the nozzle 202 of Embodiment 2 shown in part (b) of FIG. 59 and part (c) of FIGS. 59 and 60. The first restriction releasing portion 21104*a* (first projection) and the second restriction releasing portion 21104*b* (second projection) of the projecting portion 21102Ab have the same structures as the first restriction releasing portion 204*a* and the second restriction releasing portion 204*b* of Embodiment 2, respectively, and it is structured with respect to the central axis A of the inner peripheral surface 21102Ab1. That is, the first slope 21104*a*1, the second slope 21104*a*2, the third slope 21104*a*3, the cavity 21104*a*4, and the abutment surface 21104*a*5 of the projecting portion 21102Ab are the first slope 204*a*1 have the same structures as the first slope 204*a*1, the second slope 204*a*2, the third slope 204*a*3, the cavity 204*a*4, and the abutment surface 204*a*5, respectively, and they are structured with reference to the central axis A of the inner peripheral surface 2102Ab1. The second restriction releasing portion 21104*b* has a shape which is 180 degrees rotationally symmetric with respect to the rotational axis A of the first restriction releasing portion 21104*a*, and therefore, the description thereof will be omitted.

On the first end side of the cylindrical portion 21102Aa in the first direction D1, a triangular marking portion 21102Ac recessed toward the second end side in the first direction D1 is provided at a position away from the central axis A. Further, as shown in FIG. 76, In the toner pack 2120 of this modified example, the nozzle 2102B is provided with a cylindrical recess portion 2102Ba in order to avoid interference with the attachment 21102A already mounted on the mounting portion 206, when the toner pack 2120 is mounted on the mounting portion 206. Other structures will be described hereinafter.

As shown in FIG. 77, the user mounts the attachment 21102A to the mounting portion 206 so that the marking portion 21102Ac faces the operating portion 208*b* of the operation lever 208 shown in FIG. 67 in the circumferential direction of the imaginary circle VC centered on the central axis A. This is because when the attachment 21102A is mounted on the mounting portion 206, it is necessary to align the phase around the central axis A between the projecting portion 21102Ab and the mounting portion 206. The operation for releasing the rotation restriction of the mounting portion 206 is the same as the above-described structure, and therefore, the description thereof will be omitted.

Thereafter, the user mounts the toner pack 2120 on the mounting portion 206. Then, as in Embodiment 2, the rotation restriction by the rotation restricting mechanism 212 of the apparatus-side shutter 209 is released, and the toner can be replenished from the toner pack 2120 into the toner accommodating chamber 36 of the developer container 32.

Or, the structure may be such that when using the toner pack 2120, the attachment 21102A is mounted to the toner pack 2120 in advance. By doing so, similarly to embodiment 2, the rotation restriction by the rotation restricting mechanism 212 of the apparatus-side shutter 209 can be released by the attachment operation of the toner pack 2120 to the mounting portion 206. In this case, the attachment 21102A is mounted to the lower, when the toner pack 2120 is oriented in a predetermined direction, end of the nozzle 2102B in a predetermined rotation phase. By doing so, the phase adjustment at the time of mounting on the mounting portion 206 is unnecessary.

The structure of the projecting portion 2102Ab in this modified example can be used not only for the projecting portion 202*b* of embodiment 2 but also for modified examples of Embodiment 2.

Modified Example 2

Next, referring to FIGS. 79 to 87, another structure will be described. The same points as those of the above-described embodiments and modified examples will be omitted. In particular, of the elements disclosed in this modified example, those corresponding to the members described in Embodiment 2 and Modified Example 1 of Embodiment 2 are assigned the like names as the members of Embodiment 2 and Modified Example 1 of Embodiment 2, and only the points different from those of Embodiment 2 and Modified Example 1 of Embodiment 2 will be described.

In Modified Example 1 of Embodiment 2, the mounting kit comprising the attachment 2102 including the projecting portion 2102Ab, and a toner pack 2120 including the pack side shutter 203 and the accommodating portion 2101 has been described. In the now describing modified example, a structure in which the attachment has a shutter (rotatable member) will be described. That is, this modified example relates to a mounting kit comprising an attachment including a shutter and a projecting member having a projecting portion, and a toner pack. Although with such a mounting kit, it is possible to release the rotation restriction by the rotation restricting mechanism 212 of the apparatus-side shutter 209 and replenish the toner from the toner pack into the toner accommodating chamber 36 of the developer container 32, as in Embodiment 2.

Figure 79:
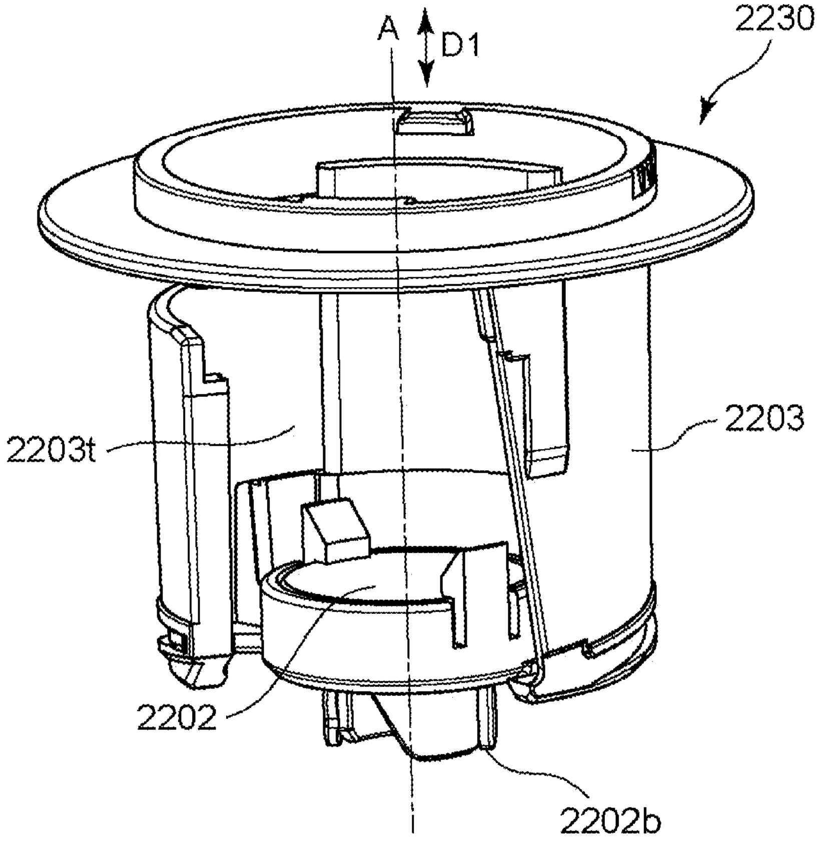
FIG. 79 is a perspective view and a side view of the attachment unit according to Modified Example 2 of Embodiment 2.
Figure 79:
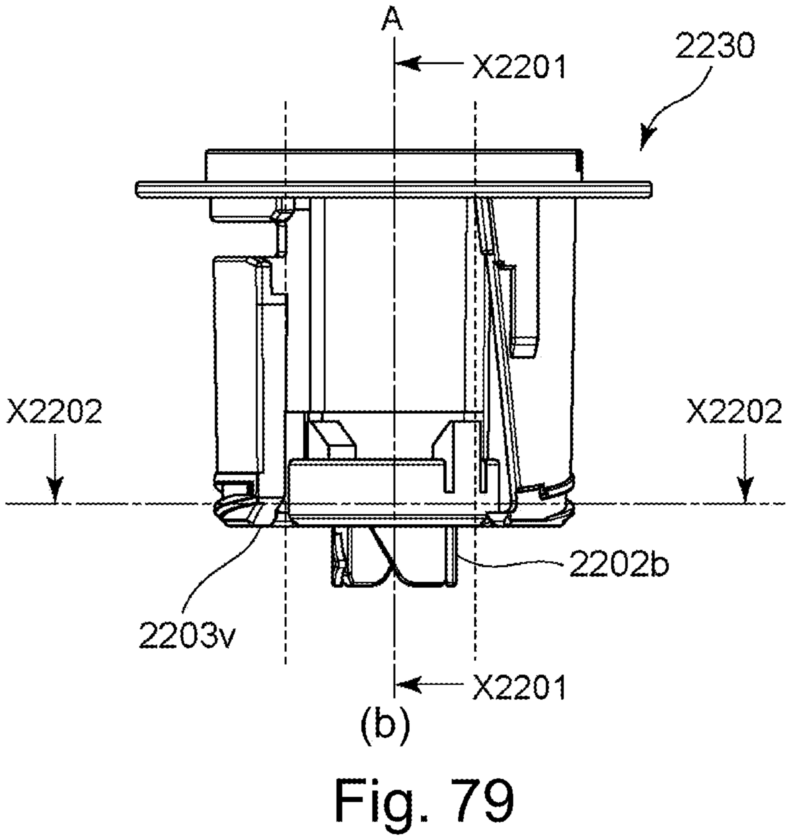
Figure 80:
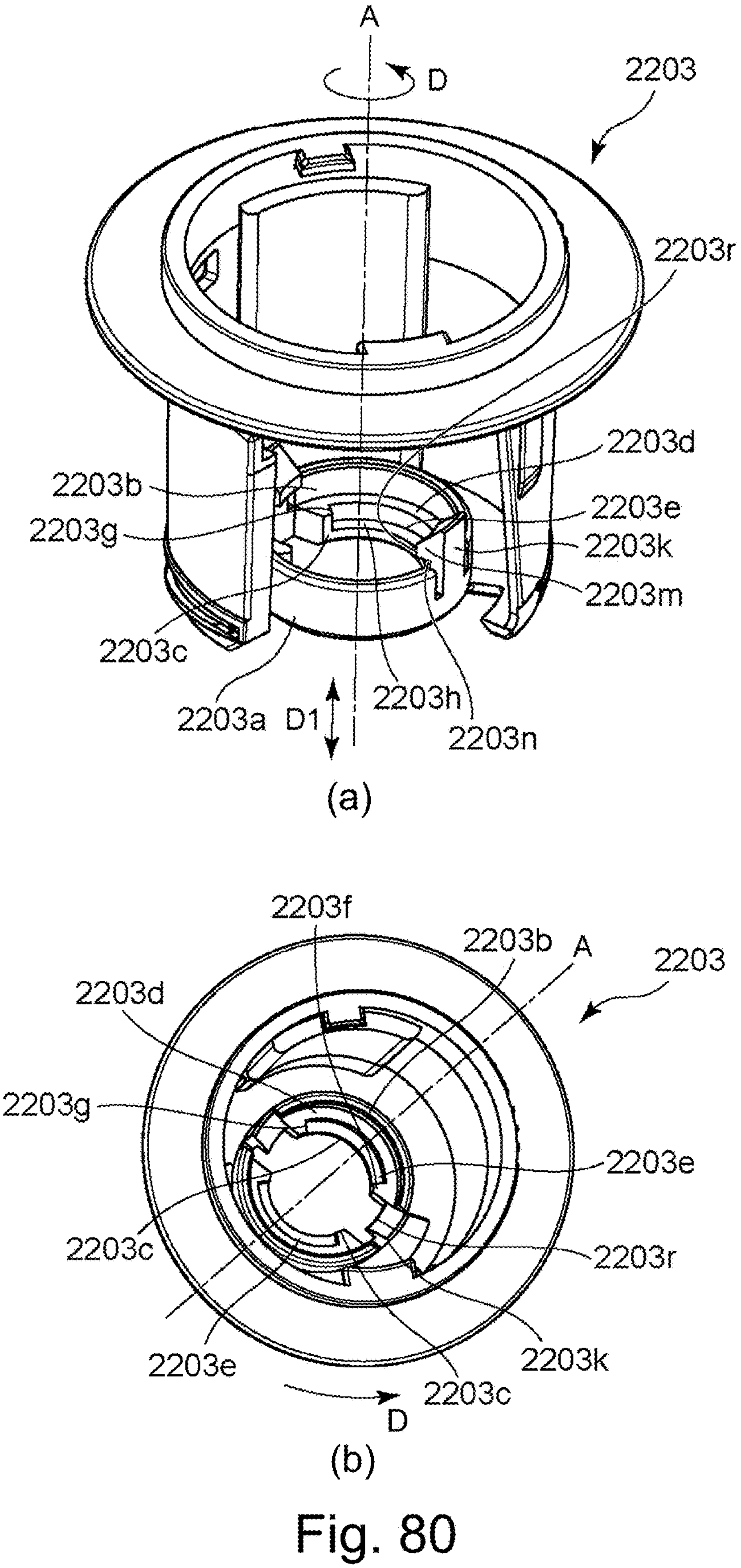
FIG. 80 is a perspective view of a shutter in Modified Example 2 of Embodiment 2.
Figure 81:
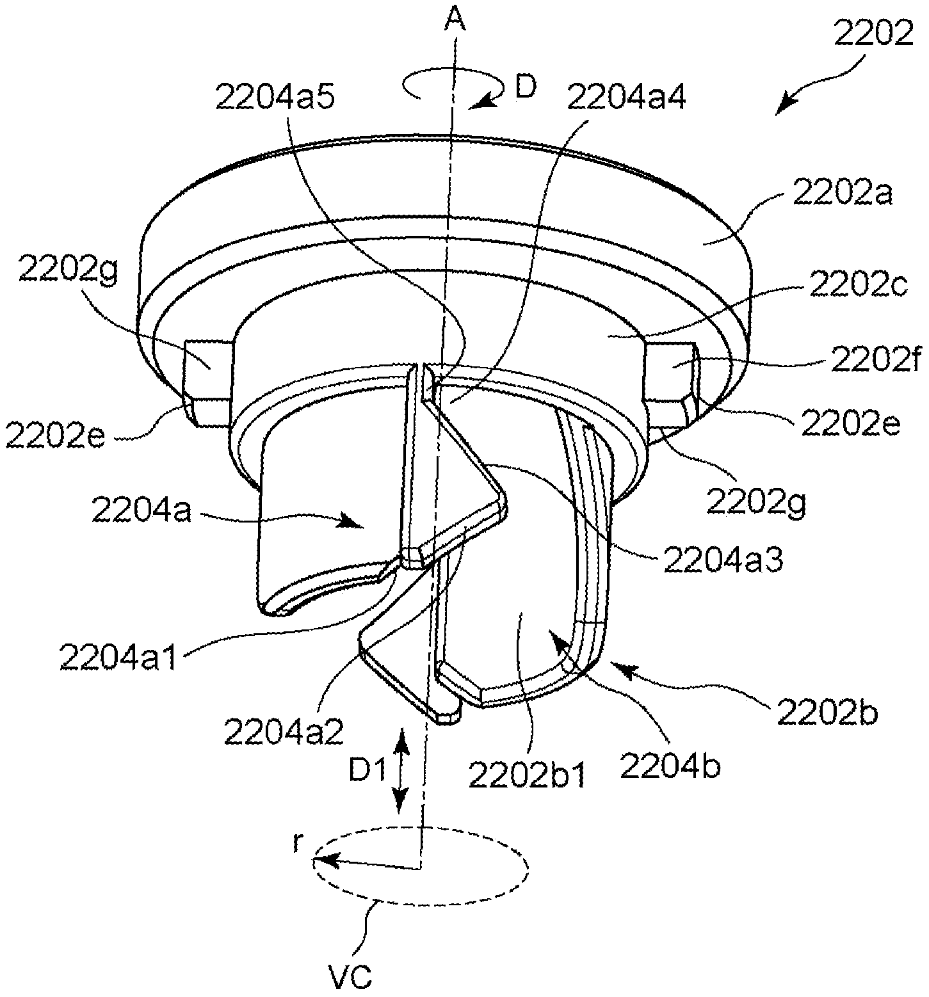
FIG. 81 is a perspective view of a projecting member in Modified Example 2 of Embodiment 2.

In this modified example, referring to FIGS. 79, 80, 81 and 82, the attachment 2230 including the projecting member 2202 and the shutter 2203 will be described. Part (a) of FIG. 79 and part (b) of FIG. 79 are a perspective view and a side view of the attachment 2230 of this modified example, respectively. Parts (a) and (b) of FIG. 80 are perspective views of the shutter 2203 as viewed in different directions, respectively. FIG. 81 is a perspective view of the projecting member 2202.

As shown in part (a) of FIG. 79, the attachment 2230 of this modified example has a shutter (rotatable member) 2203 and a projecting member 2202 (projecting member). The shutter 2203 and the projecting member 2202 are arranged in the first direction D1.

Referring to FIGS. 80 and 81, the structure of each component will be described in detail. Here, the shutter 2203 of this modified example has the same shape as the pack-side shutter 203 of Embodiment 2 except for the portion to which the projecting member 2202 is mounted, and therefore, only the mounting portion of the projecting member 2202 will be described. The shutter 2203 is mounted to the projecting member 2202 rotatably about the central axis A as the rotational axis. Further, in the following, in the first direction D1, the shutter 2203 side is referred to as the first end portion and the projecting member 2202 side is referred to as the second end portion.

As shown in part (a) of FIG. 80, the shutter 2203 has a substantially cylindrical shape centered on the central axis A, and has a hollow cylindrical portion 2203*a* substantially coaxial with the central axis A on the second end side in the first direction D1. For the shutter 2203, in the inside of hollow cylindrical portion 2203*a* centered on the central axis A, there are provided a cylindrical surface 2203*b* and a through hole 2203*c* having a diameter smaller than that of the cylindrical surface 2203*b*, substantially coaxially with the axis A, in this order from the first end side in the first direction D1. The hollow cylindrical portion 2203*a* is provided with two snap-fit portions 2203*k* at the positions 180-degree rotational symmetry about the central axis A. The snap-fit portion 2203*k* is provided so as to project from the hollow cylindrical portion 2203*a* toward the first end portion in the first direction D1, and is provided with a claw portion 2203*m* projecting toward the central axis A side. The claw portion 2203*m* faces the second end portion side in the first direction D1 and has a support surface 2203*n* substantially perpendicular to the central axis A. In addition, the surface 2203*r* is on the central axis A side of the claw portion 2203*m*. The surface 2203*r* is arranged inside the cylindrical surface 2203*b* with respect to the central axis A. The cylindrical surface 2203*b* and the through hole 2203*c* are connected by a surface 2203*d* substantially perpendicular to the central axis A. As shown in part (b) of FIG. 80, the surface 2203*d* is provided with two recesses 2203*e* recessed toward the second end side in the first direction D1 at the position 180 degrees symmetric positions about the central axis A. The recess portion 2203*e* has a sector recess shape centered on the central axis A, the side thereof close to the central axis A is in fluid communication with the through hole 2203*c*, and the side thereof far from the central axis A has a smaller radius than the cylindrical surface 2203*b*. Further, the angle of the sector shape about the central axis A is about 90 degrees. The recess portion 2203*e* is provided with a surface 2203*f* which crosses the rotational direction D on the upstream side in the rotational direction D and a surface 2203*g* which substantially crosses the rotational direction D on the downstream side in the rotational direction D. A surface 2203*h* substantially perpendicular to the central axis A is provided on the second end, in the first direction D1, side (bottom surface of the recess) of the recess portion 2203*e*. As shown in part (b) of FIG. 83, the shutter 2203 further is provided with a driven transmission portion 2203*u* (rotatable member recess) recessed inward in the radial direction r on a side peripheral portion centered on the central axis A. In addition, as viewed in the direction of the central axis A, a shutter opening 2203*t* (rotatable member opening) is provided on the side opposite from the side provided with the driven transmission portion 2203*s* with respect to the central axis A. The driven transmission portion 2203*u* has the same structure and function as the driven transmission portion 203*b* shown in part (b) of FIG. 57 and part (a) of FIG. 59 of Embodiment 2. The shutter opening 2203*t* has the same structure as the opening 203*a* shown in part (a) of FIG. 57 and part (a) of FIG. 61 of Embodiment 2.

As shown in FIG. 81, the projecting member 2202 has a substantially cylindrical shape centered on the central axis A, and is provided with a first cylindrical portion 2202*a*, a second cylindrical portion 2202*c* having a diameter smaller than that of the cylindrical portion 2202*a* and a substantially cylindrical projecting portion 2202*b* (projecting portion) in this order from the first end portion side in the first direction D1. Central axes of the first cylindrical portion 2202*a* and the second cylindrical portion 2202*c* of the projecting member 2202 are coincident with the central axis A. In addition, the projecting member 2202 has an inner peripheral surface 2202*b*1 (guide inner peripheral surface, positioning inner peripheral surface) centered on the central axis A. The inner peripheral surface 2202*b*1 of this modified example is a cylindrical surface having the central axis A. The inner peripheral surface 2202*b*1 is preferably a cylindrical surface or a surface for which a central axis A can be defined as shown in FIG. 71 of Embodiment 2.

The projecting portion 2202*b* has the same shape as the projecting portion 202*b* of Embodiment 2 shown in part (b) of FIG. 59, part (c) of FIG. 59 and FIG. 60. The first restriction releasing portion 2204*a* (first projection) and the second restriction releasing portion 2204*b* (second projection) of the projecting member 2202Ab of this modified example have the same structures as the first restriction releasing portion 204*a* and the second restriction releasing portion 204*b* of Embodiment 2, respectively, and is structured with reference to the central axis A as the rotational axis of the shutter 2203. That is, the first slope 2204*a*1, the second slope 2204*a*2, the third slope 2204*a*3, the cavity 2204*a*4, and the abutment surface 2204*a*5 of the projecting member 2202Ab have the same structures as the first slope 204*a*1, the second slope 204*a*2, the third slope 204*a*3, the cavity 204*a*4 and the abutment surface 204*a*5 of Embodiment 2, respectively, and they are structured with reference to the central axis A of the inner peripheral surface 2102Ab1. The second restriction releasing portion 2204*b* has a shape which is 180 degrees rotationally symmetric with respect to the rotational axis A of the first restriction releasing portion 2204*a*, and therefore, the description thereof will be omitted.

Two projections 2202*e* projecting from the first cylindrical portion 2202*a* toward the second end portion in the first direction D1 are provided at two positions 180-degree rotational symmetry about the central axis A. The projecting member 2202*e* is provided inside an outer shape of the first cylindrical portion 2202*a* in the radial direction r of the imaginary circle VC centered on the central axis A, and the central axis A side thereof is connected to the second cylindrical portion 2202*c*. The projections 2202*e* are each provided with an end surface 2202*f* which crosses the rotational direction D on the upstream side in the rotational direction D and an end surface 2202*g* which crosses the rotational direction D on the downstream side in the rotational direction D.

Further, as shown in part (b) of FIG. 79, the projecting member 2202*b* is inside the width of the shutter opening 2203*t* in a direction perpendicular to the rotational axis A, as viewed in a direction perpendicular to the rotational axis A so that the shutter opening 2203*t* of the shutter 2203 faces the front.

(Assembling)

Figure 82:
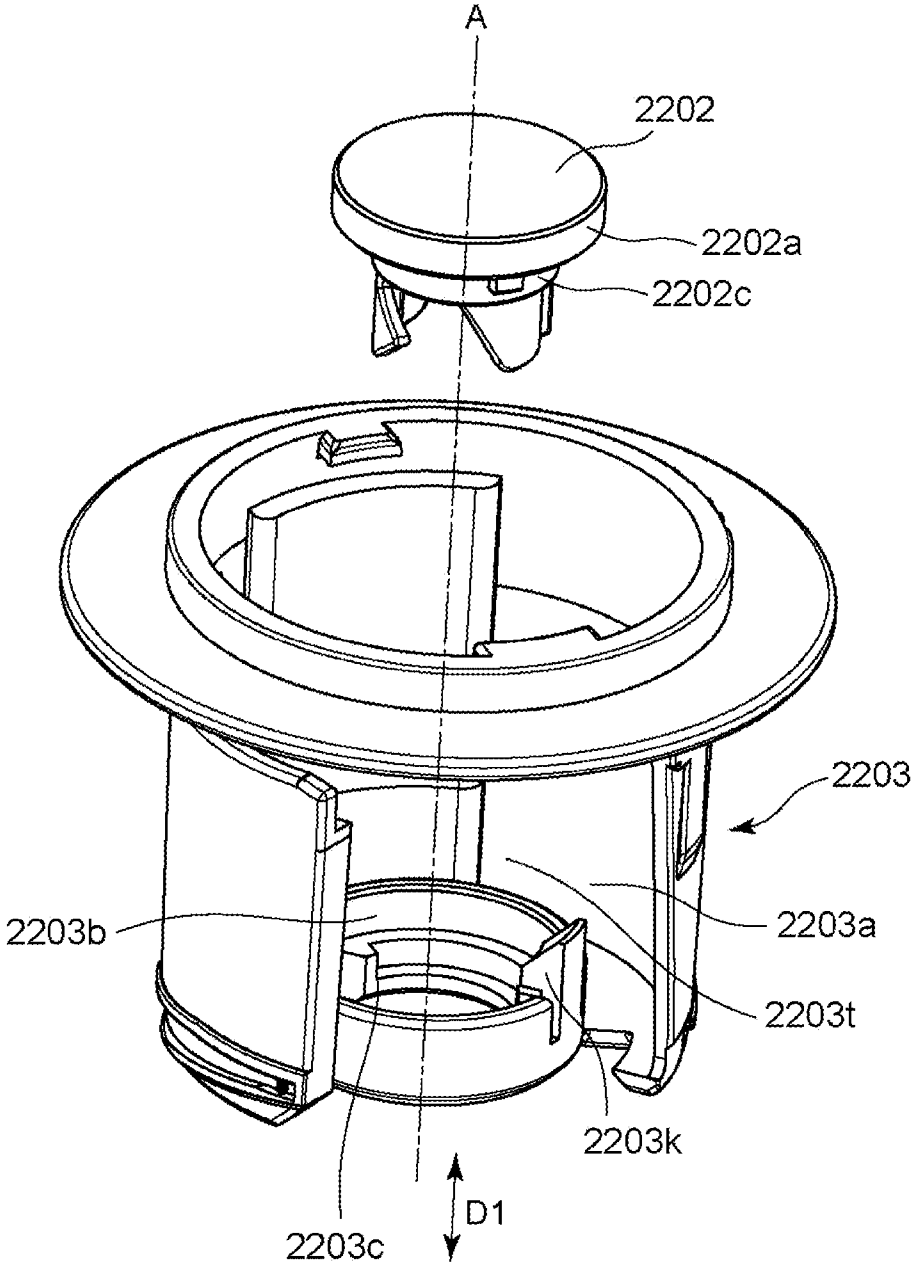
FIG. 82 is an exploded perspective view of the attachment unit according to Modified Example 2 of Embodiment 2.

Next, referring to FIGS. 82 and 83, the assembly of the shutter 2203 and the projecting member 2202 will be described. FIG. 82 is an exploded perspective view of the attachment 2230 of this modified example. Part (a) of FIG. 83 and part (b) of FIG. 83 are sectional views taken along lines X2201-X2201 and X2202-X2202, respectively in FIG. 79 at the time when the projecting member 2202 is placed at the first position relative to the shutter 2203.

As shown in FIG. 82, the projecting member 2202 is provided substantially coaxially with the central axis A from the first end side toward the shutter 2203 in the first direction D1. The projecting member 2202 is mounted to the shutter 2203 while pushing the two snap-fit portions 2203*k* of the shutter 2203 in directions away from each other. Thereafter, the projecting member 2202 is supported by the shutter 2203 so that the second cylindrical portion 2202*c* is fitted in the through hole 2203*c* of the shutter 2203. Further, the outer circumference of the first cylindrical portion 2202*a* of the projecting member 2202 is fitted to the cylindrical surface 2203*b* of the shutter 2203 with slight tightness.

Figure 83:
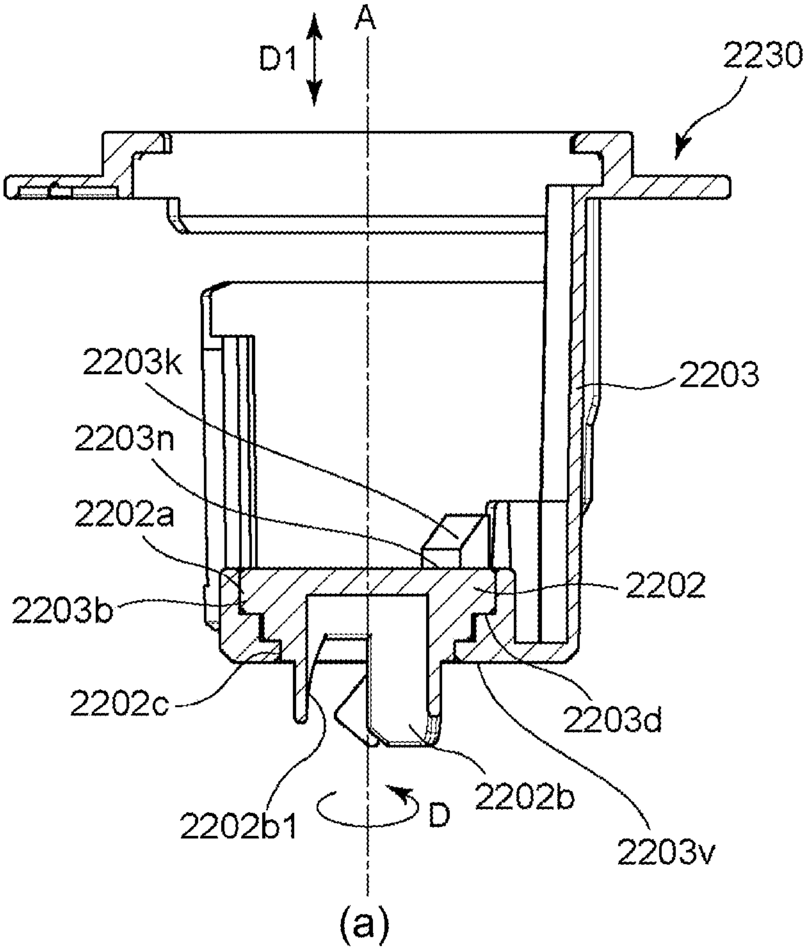
FIG. 83 is a cross-sectional view of a projecting member and a shutter when they are located at the first positions in Modified Example 2 of Embodiment 2.
Figure 83:
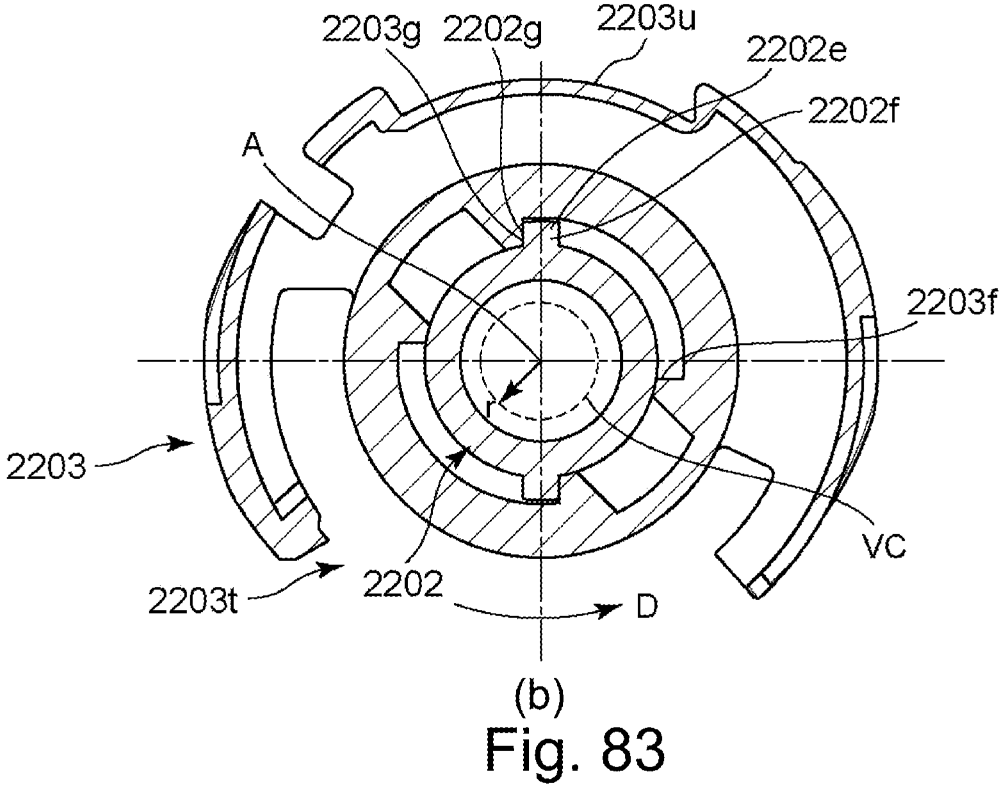

As shown in part (a) of FIG. 83, the first cylindrical portion 2202*a* of the projecting member 2202 abuts on the surface 2203*d* of the shutter 2203, and positioning thereof is effected in the first direction D1. Further, the projecting member 2202 abuts on the support surface 2203*n* of the snap-fit portion 2203*k* of the shutter 2203 on the first end side of the first direction D1, and the hollow cylindrical portion 2203*a* is sandwiched between the surface 2203*d* and the support surface 2203*n*. By this, the projecting member 2202 is restricted so as not to disengage off through the shutter 2203 in the first direction D1.

On the other hand, as shown in part (b) of FIG. 83, in the rotational direction about the central axis A, the end surface 2202*g* of the projecting member 2202*e* of the projecting member 2202 abuts the surface 2203*g* of the shutter 2203. This position is referred to as a first position.

Here, the projecting member 2202 is supported so as to be rotatable relative to the shutter 2203 in a certain range in the rotational direction centered on the central axis A, and in other words, the projecting member 2202 is supported so as to be movable relative to the shutter 2203 between the first position and the second position in the rotational direction centered on the rotational axis A. The projecting member 2202 is supported by the shutter 2203 so that the projecting portion 2202*b* projects beyond the lower surface of the shutter 2203 as shown in FIG. 83, when the projecting member 2202*b* is oriented in the predetermined direction such that it projects downward (gravity direction) and the central axis A is in the gravity direction. Further, as shown in part (a) of FIG. 83 and part (b) of FIG. 79, when the projecting member 2202*b* projects downward and the central axis A is oriented in a predetermined direction facing the direction of gravity, as shown in part (a) of FIG. 83 and part (b) of FIG. 79, and the projecting member 2202 is supported by the shutter 2203 so as to project (project) downward beyond the lower surface 2203*v* of the shutter 2203. Further, as shown in part (b) of FIG. 83, the projecting member 2202 (projecting portion 2202*b*) is placed at the position closer to the central axis A in the radial direction r than the driven transmission portion 2203*u* of the shutter 2203 as viewed in the direction of the central axis A.

(Mounting of Attachment)

That is, the attachment 2230 is moved downward (in the direction of arrow N) toward the mounting portion 206 in a state of being oriented in the predetermined direction described above, and is mounted to the mounting portion 206.

At this time, the driven transmission portion 2203*u* of the shutter 2203 shown in part (b) of FIG. 83 is engaged with the driven transmission portion 209*e* (shutter projection, see FIG. 44) of the apparatus-side shutter 209. By doing so, the shutter opening 2203*t* of the shutter 2203 and the receiving opening 209*a* of the apparatus-side shutter 209 are brought into fluid communication with each other. In addition, the inner peripheral surface 2202*b*1 of the projecting portion 2202*b* of the projecting member 2202 is fitted (engaged) with the small diameter portion 209*d*2 of the center boss 209*d* of the mounting portion 206.

Similarly to Embodiment 2, when the restriction releasing portion of the projecting member 2202*b* of the attachment 2230 (same as the projecting portion 202*b* of Embodiment 2) acts on the releasing member 214 of the mounting portion 206, the rotation restriction for the shutter 209 by the apparatus-side the rotation restricting mechanism 212 is released. Thereafter, with the rotation of the operating lever 208 shown in part (a) of FIG. 41 and part (b) of FIG. 41, the shutter 2203 is rotated in the direction of an arrow D together with the apparatus-side shutter 209.

Figure 84:
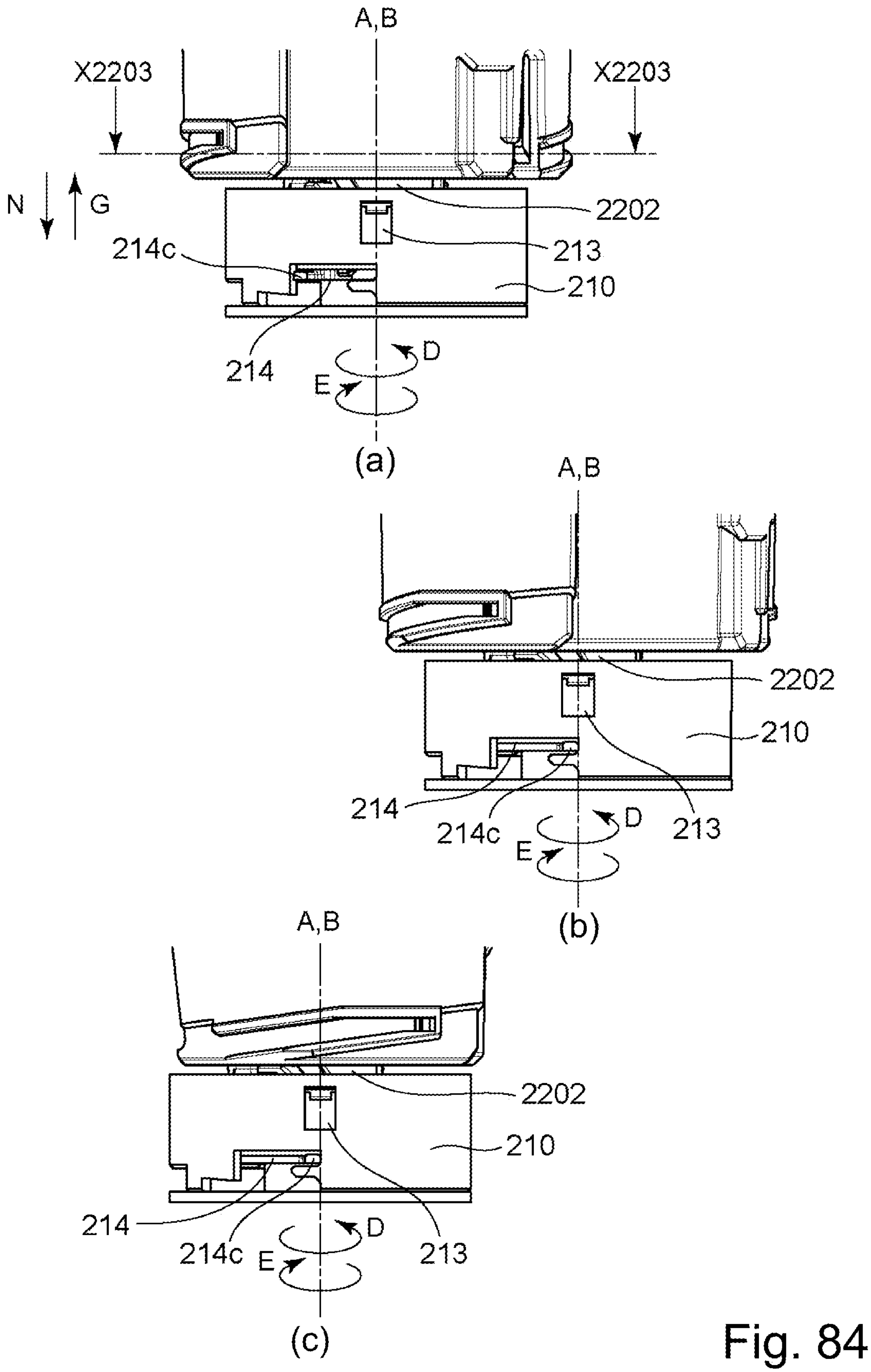
FIG. 84 is a side view of the neighborhood of the projecting member in the state in which the operating lever is between the closed position and the open position in Modified Example 2 of Embodiment 2.
Figure 85:
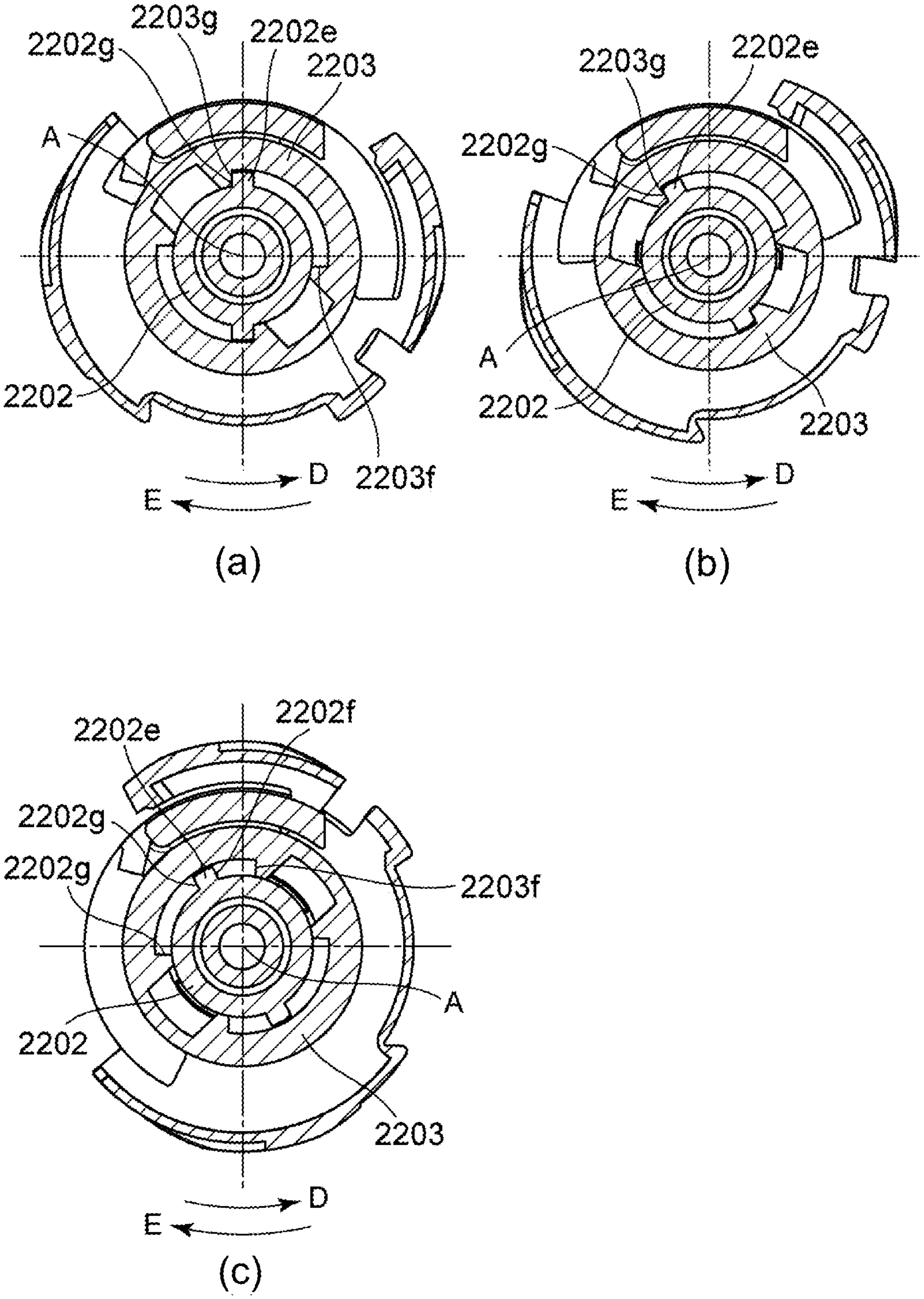
FIG. 85 is a cross-sectional view of the neighborhood of the projecting member in the state in which the operating lever is between the closed position and the open position in Modified Example 2 of Embodiment 2.

Referring to FIGS. 84 and 85, the operation of the attachment 2230 in association with the rotation of the operating lever 208 from the closed position to the open position will be described in detail. Part (a) of FIG. 84, (b) and (c) are enlarged side views of a part of the mounting portion 206 (cover 210, restricting member 213, releasing member 214) and a connecting portion of the attachment 2230, illustrating the operation of the attachment 2230. Part (a) of FIG. 84 is a side view when the operating lever 208 (not shown) is in the closed position, and part (b) of FIG. 84 is a side view of when the operating lever 208 between the closed position and the open position, and part (c) of FIG. 84 is a side view when the operating lever 208 is in the open position. Part (a) of FIG. 85, Figure (b) and Figure (c) are cross-sectional views taken along a line X2203-X2203 in part (a) of FIG. 84 corresponding to part (a) of FIG. 84, part (b) of FIG. 84 and part (c) of FIG. 84, respectively.

Part (a) of FIG. 84 and part (a) of FIG. 85 show a state in which the attachment 2230 is mounted on the mounting portion 206 and the operating lever 208 is in the closed position. At this time, similarly to Embodiment 2, as the attachment 2230 is being mounted to the mounting portion 206, the restriction releasing portion of the projecting member 2202*b* (same as the projecting portion 202*b* of Embodiment 2) acts on the releasing member 214 to release the rotation restriction effected by the rotation restricting mechanism 212 of the apparatus side shutter 209.

Next, when the operating lever 208 is rotated, the shutter 2203 also rotates in the direction of arrow D, and the state shown in part (b) of FIG. 84 and part (b) of FIG. 85 is reached. At this time, with the rotation of the shutter 2203, the projecting member 2202 fitted to the shutter 2203 with slight tightness also receives the frictional force from the shutter 2203 and rotates in the direction of the arrow D.

Here, since the projecting member 2202*b* is engaged with the releasing member 214, the releasing member 214 also rotates in the direction of arrow D together with the projecting member 2202. The attachment 2230 rotated in the direction of arrow D has stopped moving in the rotational direction by the abutment between the rise restricted surface 214*c* and the restricting member 213. At this time, as shown in part (b) of FIG. 85, in the rotational direction centered on the central axis A, the projecting member 2202 maintains the first position where the end surface 2202*g* of the projecting member 2202*e* abuts against the surface 2203*g* of the shutter 2203.

Next, when the operating lever 208 is further rotated in the direction of arrow D against the friction with the projecting member 2202, the operating lever 208 is in the open position as shown in part (c) of FIG. 84 and part (c) of FIG. 85. At this time, in the rotational direction about the central axis A, the end surface 2202*g* of the projecting member 2202 is not in contact with the surface 2203*g* of the shutter 2203. The position of the projecting member 2202 at this time when the operating lever 208 is placed in the open position is the second position.

Figure 86:
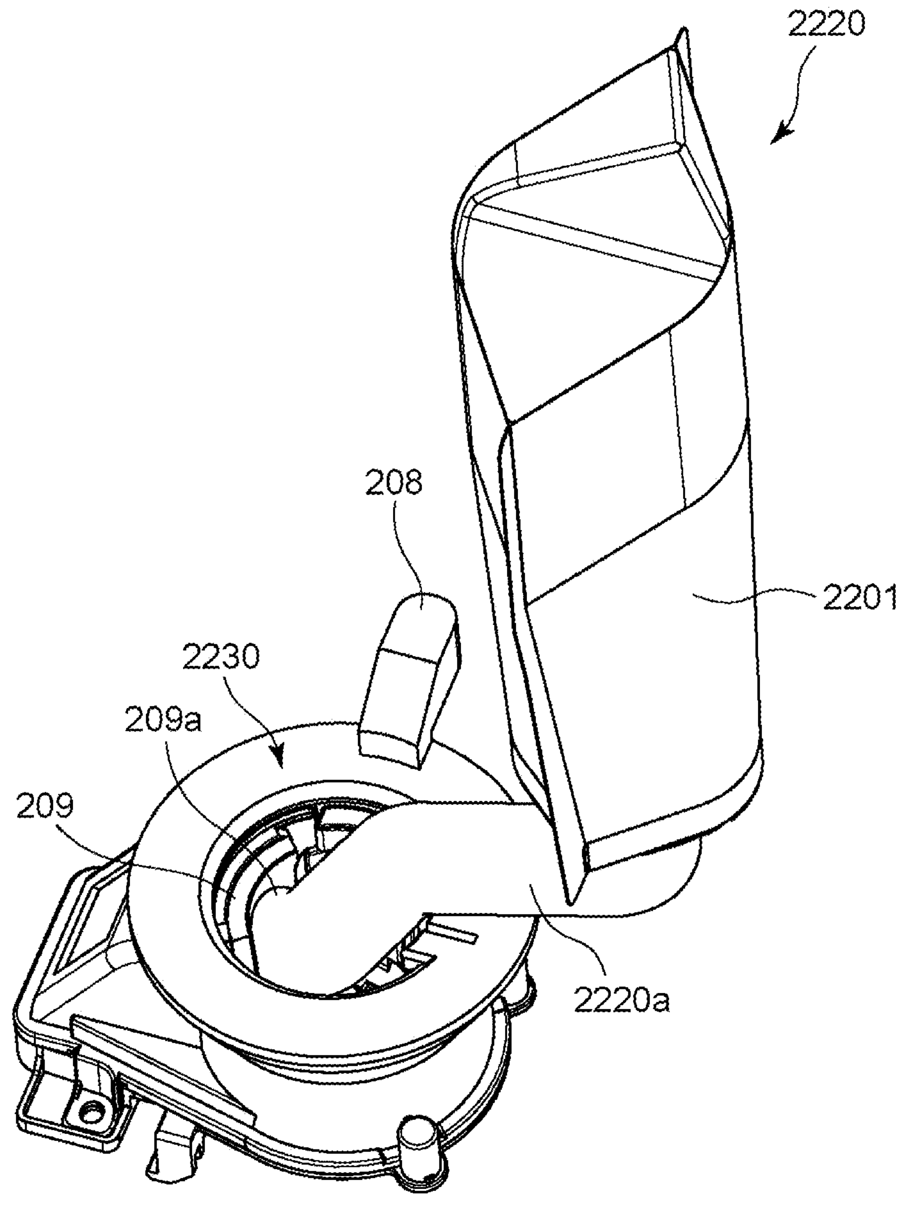
FIG. 86 is a perspective view of the toner pack mounted to the main assembly of the apparatus, according to Modified Example 2 of embodiment 2.

In the state shown in part (c) of FIG. 84 and part (c) of FIG. 85, the receiving opening 209*a* of the apparatus-side shutter 209 is exposed. Thereafter, as shown in FIG. 86, the user mounts, a toner pack 2220 provided with a straw-shaped discharge member 2220*a*, for example to the receiving opening 209*a*, and can supply the toner in the accommodating portion 2201 to the toner accommodating chamber 36 of the developer container 32.

Figure 87:
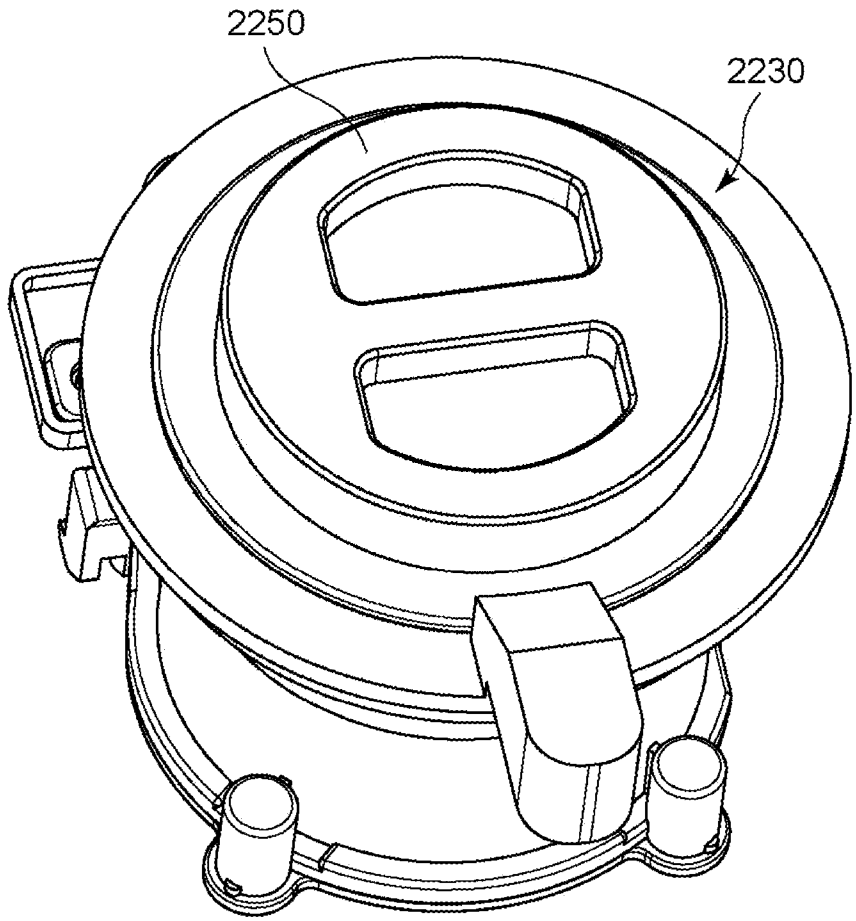
FIG. 87 is a perspective view of the attachment unit with the lid member mounted according to Modified Example 2 of Embodiment 2.

For example, as shown in FIG. 87, a lid member 2250 may be structured to be mounted to the attachment 2230 while the attachment 2230 is still mounted to the mounting portion 206.

When removing the attachment 2230, the operating lever 208 is rotated from the open position to the closed position in the direction of arrow E. Then, the operating lever 208, the shutter 2203, the projecting member 2202, and the releasing member 214 are interlocked to rotate in an arrow E direction in the reverse order of the operation associated with the rotation from the closed position to the open position described above. At this time, the operating lever moves from the open position to the closed position, and the projecting member 2202 moves from the second position to the first position.

Thereafter, by pulling out the attachment 2230 in the direction of arrow G (see FIG. 67) in the same manner as in Embodiment 2, the attachment 2230 is taken out from the mounting portion 206.

As described above, also in the mounting kit comprising the attachment 2230 including the projecting member 2202 and the shutter 2203, and the toner pack 2220 including the accommodating portion, it is possible to release the rotation restriction for the shutter 209 by the apparatus-side rotation restricting mechanism 212 and to replenish the toner from the toner pack 2220 to the toner accommodating chamber 36 of the developer container 32, similarly to Embodiment 2.

Further, in this modified example, the projecting member 2202 is structured to be movable within a predetermined range in the rotational direction about the central axis A relative to the mounting portion 206, but the same effect can be provided even when a positioning portion for positioning in the rotational direction about the central axis A with respect to the cover 210 as in Modified Example 1 without movement.

Further, as for the structure of the projecting member 2202*b* in this modified example, the structure of this modified example can be applied to the modified examples of embodiment 2 as well as to the projecting portion 202*b* of Embodiment 2.

Modified Example 3

Figure 88:
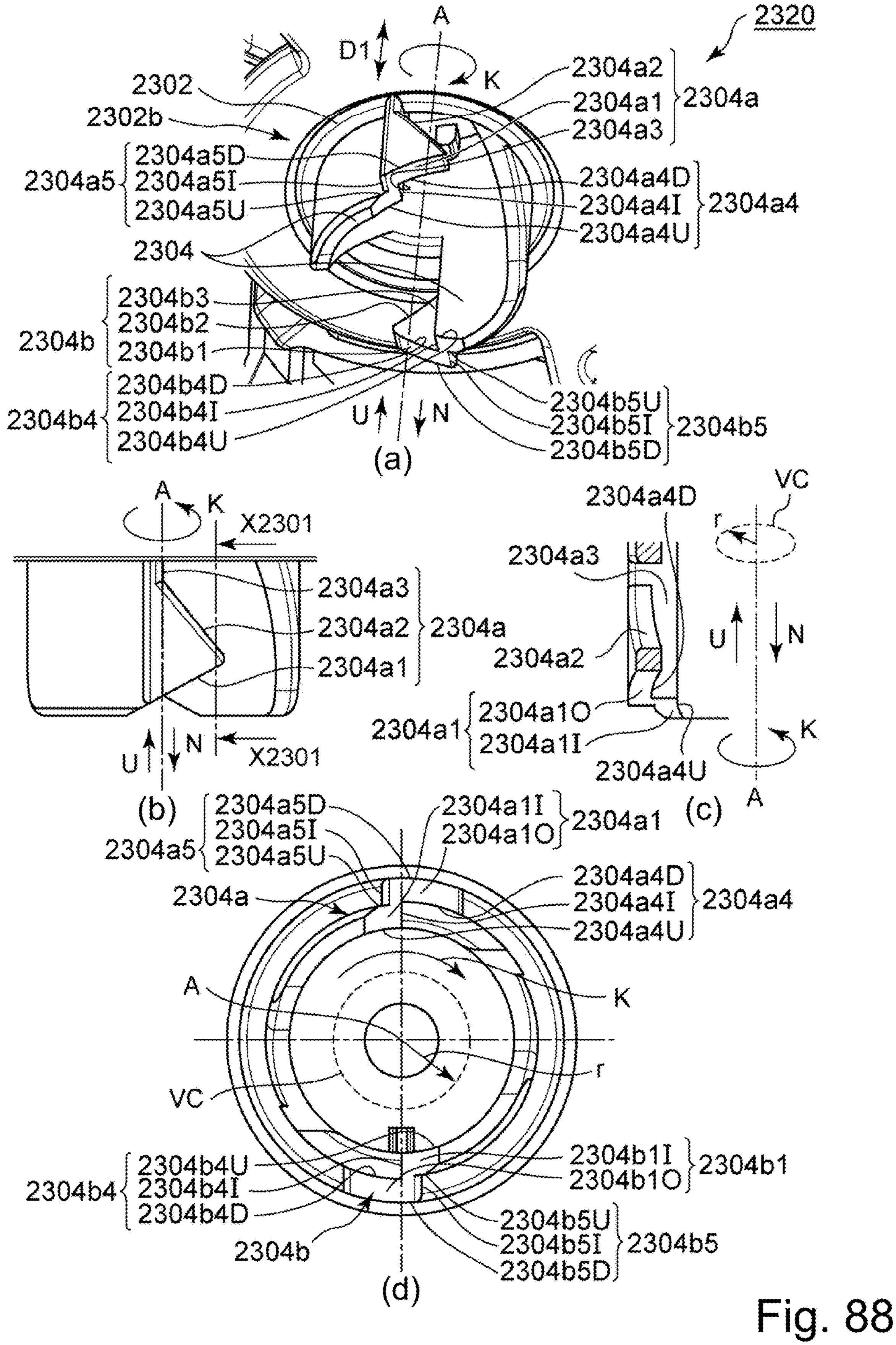
FIG. 88 is an illustration showing the detailed shapes of a first restriction releasing portion and the second restriction releasing portion in Modified Example 3 of Embodiment 2.

In this embodiment (Embodiment 2), the first slope 204*a*1 and the second slope 204*a*2 of the first restriction releasing portion 204*a* are different slopes, and the second restriction releasing portion 204*b* has the same structure. However, as shown in FIG. 88, the two slopes may have a smoothly continuous surface. Referring to FIGS. 88 to 91, the structure in this case will be described as an example of this modified example. In this modified example, the first slope 204*a*1 and the second slope 204*a*2 of the first restriction releasing portion 204*a* and the first slope 204*a*1 and the second slope 204*a*2 of the second restriction releasing portion 204*b* of this embodiment are changed to have a smoothly continuous surface. The structure is the same as that of this embodiment except for this changed portion, and therefore, the description thereof will be omitted.

FIG. 88 is an illustration of detailed shapes of a first restriction releasing portion 2304*a* (first projection) and a second restriction releasing portion 2304*b* (second projection) of this modified example. Part (a) of FIG. 88 is a perspective view of the first restriction releasing portion 2304*a* and the second restriction releasing portion 2304*b* as viewed from the side (nozzle side) of the second end portion in the first direction D1. Part (b) of FIG. 88 is a view of the first restriction releasing portion 2304*a* as viewed in a direction perpendicular to the rotational axis A. Part (c) of FIG. 88 is a sectional view taken along a line X2301-X2301 in part (b) of FIG. 88. Part (d) of FIG. 88 is a view of the first restriction releasing portion 2304*a* viewed in the direction of arrow U (upward).

As shown in part (a) of FIG. 88, the projecting portion 2302*b* of the nozzle 2302 is provided with a restriction releasing portion 2304 including the first restriction releasing portion 2304*a* and the second restriction releasing portion 2304*b*. The first restriction releasing portion 2304*a* includes a first slope 2304*a*1 (downward surface, downward guide surface, downward force applying surface, downward push surface), a second slope 2304*a*2 (upward surface, upward guide surface), abutment surface 2304*a*3 (downstream side end surface, abutted surface)).

As shown in part (b) of FIG. 88, the first slope 2304*a*1 faces the arrow N direction (downward), and it goes up in the arrow U direction (upward) as goes in the rotational direction K (first rotational direction) about the rotational axis A.

Here, as shown in part (a) of FIG. 88 and part (d) of FIG. 88, an end of the first slope 2304*a*1 on the side closer to the rotational axis A in the radial direction r of the imaginary circle VC centered on the rotational axis A is referred to as an inner end 2304*a*4 (inner edge line, inner ridge line). In addition, the inner end 2304*a*4 includes an inner upstream end 2304*a*4U (inner upstream edge line, inner upstream ridge line) on the upstream side in the rotational direction K and, an inner downstream end 2304*a*4D (inner downstream edge line, inner downstream ridge line) on the downstream side, and an inner intermediate end 2304*a*4I (inner intermediate edge line, inner intermediate ridge line) connecting them. The inner downstream end 2304*a*4D is more remote from the rotational axis A in the radial direction r of the imaginary circle VC centered on the rotational axis A than the inner upstream end 2304*a*4U. In this embodiment, as shown in part (d) of FIG. 88, the inner upstream end 2304*a*4U and the inner downstream end 2304*a*4D, have a first arc and a second arc centered on the rotational axis A, the second arc having a radius larger than that of the first arc as viewed in the direction of the rotational axis A. The inner intermediate end 2304*a*4I extends in the radial direction r so as to connect the first arc and the second arc.

In addition, as shown in part (a) of FIG. 88 and part (d) of FIG. 88, an end of the first slope 2304*a*1 on the side remote from the rotational axis A in the radial direction r of the imaginary circle VC centered on the rotational axis A is referred to as an outer end 2304*a*5 (outer edge line, outer ridge line). Further, the outer end 2304*a*5 includes an outer upstream end 2304*a*5U (outer upstream edge line, outer upstream ridge line) on the upstream side in the rotational direction K, an outer downstream end 2304*a*5D (outer downstream edge line, outer downstream ridge line) on the downstream side an outer intermediate end **2304*a*5I (outer intermediate edge line, outer intermediate ridge line) connecting them. The outer downstream end 2304*a*5D is at a position more remote from the rotational axis A in the radial direction r of the imaginary circle VC centered on the rotational axis A than the outer upstream end 2304*a*5U. In this embodiment, as shown in part (d) of FIG. 88, the outer upstream end 2304*a*5U and the outer downstream end 2304*a*5D have a third arc and a fourth arc centered on the rotational axis A, as viewed in the direction of the rotational axis A, the fourth arc having a radius larger than that of the third arc. The outer intermediate end 2304*a*5**I extends in the radial direction r so as to connect the third arc and the fourth arc.

As shown in part (b) of FIG. 88, at least a part of the second slope **2304*a*2 is provided on the arrow U direction (upward) side of at least a part of the first slope 2304*a*1**.

As shown in part (c) of FIG. 88, the first slope **2304*a*1 at this time has a first slope inside portion 2304*a*1I inside the second slope 2304*a*2 in the radial direction r of the imaginary circle VC centered on the rotational axis A. In addition, the first slope 2304*a*1 has a first slope outside portion 2304*a*1O at substantially the same position, in the radial direction r of the imaginary circle VC centered on the rotational axis A, as the position of the second slope 2304*a*2. At this time, at least a part of the inner side 2304*a*1I of the first slope and at least a part of the outer side 2304*a*1O of the first slope overlap in the rotational direction K (see also part (d) of FIG. 88**).

The abutment surface **2304*a*3 is provided on the arrow U direction side of (above) from the downstream side end, in the rotational direction K, of the first slope inner side 2304*a*1I. At least a part of the inner side 2304*a*1I of the first slope and at least a part of the outer side 2304*a*1O of the first slope overlap with each other in the rotational direction K, and therefore, the abutment surface 2304*a*3 overlaps with the outer side 2304*a*1**O of the first slope in the rotational direction K.

As shown in part (a) of FIG. 88, the second restriction releasing portion **2304*b* has a first slope 2304*b*1 (downward surface, downward guide surface, downward force applying surface) and a second slope 2304*b*2 (upward surface, upward guide surface, abutment surface 2304*b*3. Here, the first restriction releasing portion 2304*a* and the second restriction releasing portion 2304*b* have a shape which is 180-degree rotationally symmetric with respect to the rotational axis A. Therefore, the detailed description of the second restriction releasing portion 2304*b*** will be omitted.

Figure 89:
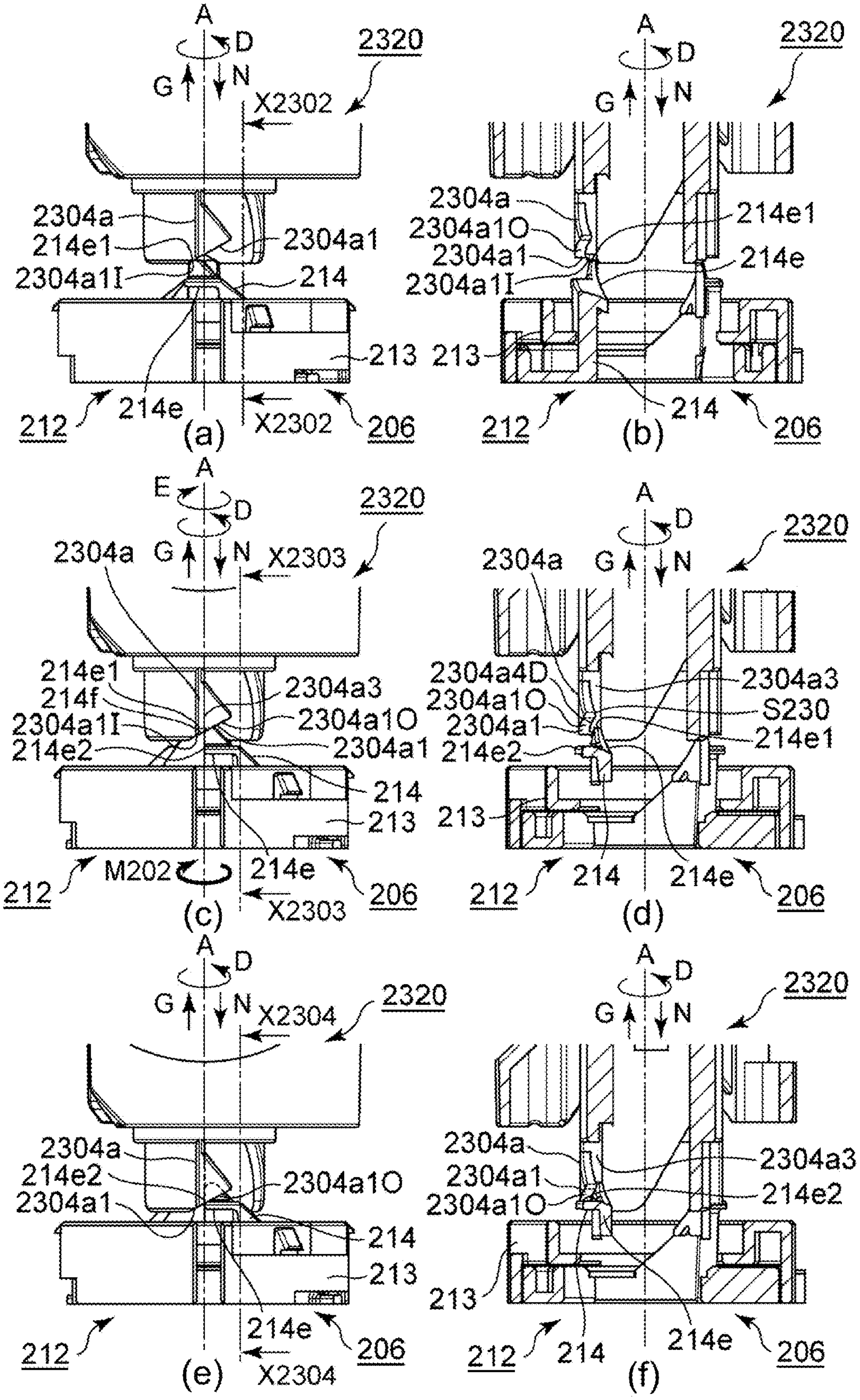
FIG. 89 is an illustration showing a process in which the releasing member is rotated by the first slope of the first restriction releasing portion in Modified Example 3 of Embodiment 2.
Figure 90:
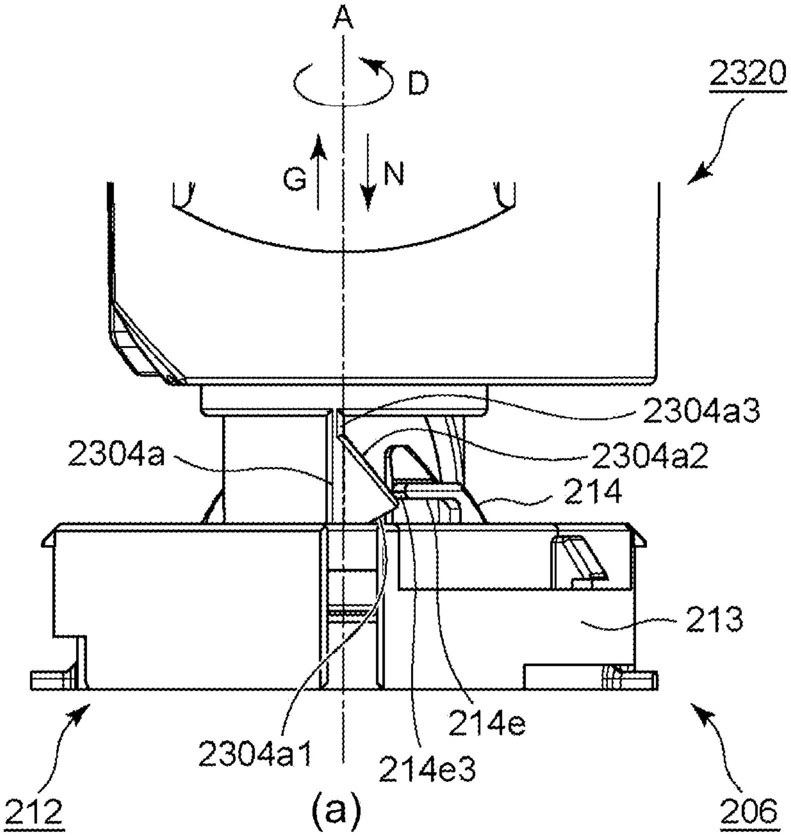
FIG. 90 is an illustration showing a process in which the releasing member is rotated by a second slope of a first restriction releasing portion in Modified Example 3 of Embodiment 2.
Figure 90:
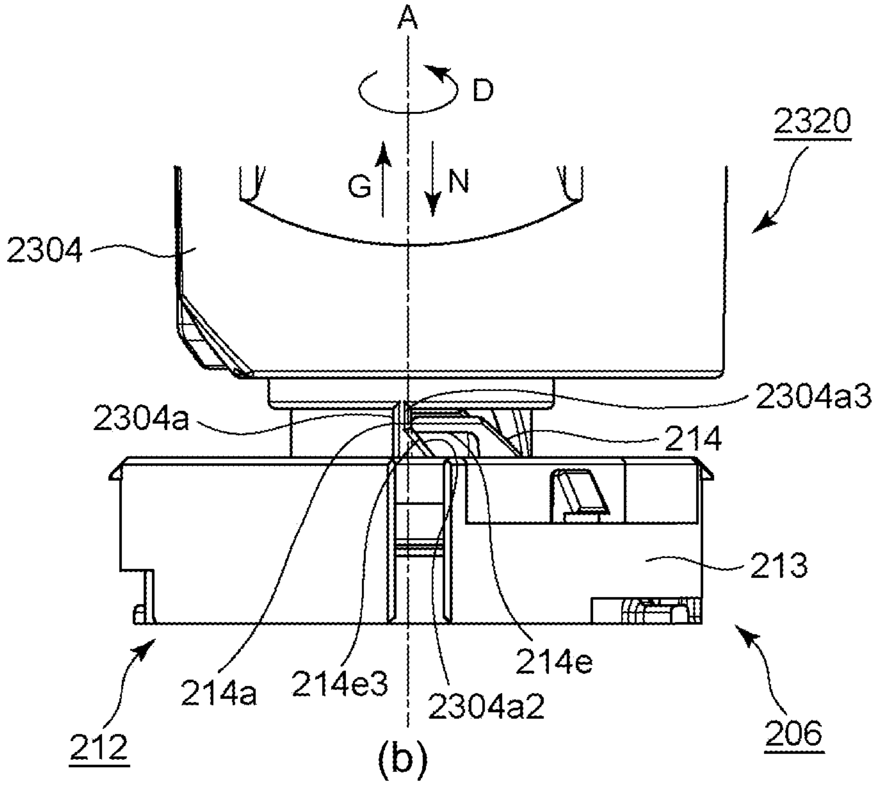

Next, referring to FIGS. 89 and 90, a mechanism for releasing the rotation restriction of the apparatus-side shutter 209 effected by the rotation restricting mechanism 212, by mounting the toner pack 2320 of this modified example to the mounting portion 206 will be described. FIG. 89 illustrates the operation of rotating the releasing claw **214*e* by the first slope 2304*a*1 of the first restriction releasing portion 2304*a*, and part (a), part (c), and part (e) of FIG. 89 show the process. Further, in FIG. 89, part (b) thereof is a sectional view taken along a line X2302-X2302 in the state shown in part (a) of FIG. 89, part (d) thereof is a sectional view taken along a line X2303-X2303 in the state of part (c) of FIG. 89, and part (f) thereof is a sectional view taken along a line X2304-X2304—in the state shown in part (e) of FIG. 89. FIG. 90 shows an operation in which the releasing claw 214*e* is moved by the second slope 2304*a*2 of the first restriction releasing portion 2304*a*. For the sake of better illustration, only the nozzle 2302 (restriction releasing portion 2304), the restricting member 213, and the releasing member 214 are shown in each part of this Figure. Further, in part (c) of FIG. 89, the hidden part of the abutment surface 214*a*3** which overlaps with the rotational axis A is clearly shown by a thin line only in this part of the Figure.

By mounting the toner pack 2320, as shown in part (a) of FIG. 89, the first slope **2304*a*1 of the first restriction releasing portion 2304*a* is brought into contact with the first guided surface 214*e*1 of the releasing claw 214*e*. At this time, as shown in part (b) of FIG. 89, the first guided surface 214*e*1 of the releasing claw 214*e* contacts the inner side 2304*a*1I of the first slope of the first restriction releasing portion 2304*a***.

When the toner pack 2320 is further moved in the arrow N direction (downward) from this position, the releasing member 214 rotates in the rotational direction D shown in part (a) of FIG. 89 by the same operation as in this embodiment. That is, the releasing member 214 is rotated in the rotational direction D by receiving a force while the first guided surface **214*e*1 is guided by the inner side 2304*a*1I of the first slope. Then, as shown in part (c) of FIG. 89, the releasing member 214 is in a state of being rotated in the rotational direction D until the first guided surface 214*e*1 passes the downstream end of the first slope inner side 2304*a*1I in the rotational direction D. At this time, the contact between the first guided surface 214*e*1 of the releasing claw 214*e* and the first slope 2304*a*1 of the first restriction releasing portion 2304*a* is released, and the rotation of the releasing claw 214*e* in the rotational direction D is stopped. In addition, as described above, the inner downstream end 2304*a*4D of the first restriction releasing portion 2304*a* is placed at a position more remote from the rotational axis A in the radial direction r of the imaginary circle VC centered on the rotational axis A than the inner upstream end 2304*a*4U (part (d) of FIG. 88). Therefore, as shown in part (d) of FIG. 89, there is a space S230 on the arrow G direction side (upper side) of the releasing claw 214*e***.

When the toner pack 2320 is further moved in the arrow N direction (downward) from this position, the releasing claw **214*e* enters the space S230 in the arrow G direction (upward). At this time, by the moment M202 (urging force) provided by the releasing spring 216 (see FIG. 50) shown in part (c) of FIG. 89, the contact surface 214*f* of the releasing claw 214*e* is brought into contact with the abutment surface 2304*a*3 of the first restriction releasing portion 2304*a*. By this, the releasing claw 214*e* is in a state in which rotation in the rotational direction E is restricted. At this time, since the abutment surface 2304*a*3 of the first restriction releasing portion 2304*a* overlaps the first slope outer side 2304*a*1O in the rotational direction K, the first slope outer side 2304*a*1O overlaps with the second guided surface 214*e*2 of the releasing claw 214*e* in the direction D. Then, as shown in part (e) of FIG. 89, the first slope 214*a*1 of the first restriction releasing portion 2304*a* contacts the second guided surface 214*e*2 of the releasing claw 214*e*. At this time, as shown in part (f) of FIG. 89, the second guided surface 214*e*2 of the releasing claw 214*e* contacts the outer side 2304*a*1O of the first slope of the first restriction releasing portion 2304*a***.

When the toner pack 2320 is further moved in the arrow N direction (downward) from this position, the releasing member 214 rotates in the rotational direction D shown in part (e) of FIG. 89 by the same operation as in this embodiment. That is, the releasing member 214 is rotated in the rotational direction D by receiving a force while the second guided surface 214*e*2 is guided by the outer side 2304*a*1O of the first slope.

Then, the releasing member 214 rotates in the rotational direction D until the second guided surface 214*e*2 passes the downstream end of the first slope outer side 2304*a*1O of the first restriction releasing portion 2304*a* in the rotational direction D. The operation up to this point is the first step in this modified example.

After the first step, as shown in part (a) of FIG. 90, the third guided surface 214*e*3 of the releasing claw 214*e* rides on the downstream end of the second slope 2304*a*2 of the first restriction releasing portion 2304*a* in the rotational direction D. Hereinafter, by the same operation as in this embodiment, as shown in part (b) of FIG. 90, the contact surface 214*a* and the contact surface 214*f* of the releasing member 214 abut against the abutment surface 2304*a*3 of the first restriction releasing portion 2304*a*. Then, the rotation restriction of the apparatus-side shutter (see FIG. 40) by the rotation restricting mechanism 212 is released.

As described above, in this modified example, the first slope 204*a*1 and the second slope 204*a*2 of the first restriction releasing portion 2304*a* in the embodiment which this modified example is based on have a smoothly continuous surface, and the first slope 204*b*1 and the second of the second restriction releasing portion 204*b* of the base embodiment are made continuous with each other. By this, it is sufficient to process one surface to provide the two surfaces, and therefore, the effect of reducing the processing man-hours can be expected.

In this modified example, the first slope 2304*a*1 of the first restriction releasing portion 2304*a* has an inner intermediate end 2304*a*4I between the inner upstream end 2304*a*4U and the inner downstream end 2304*a*4D of the inner end 2304*a*4. This is because there is an abutment surface 2304*a*3. The same applies to the second restriction releasing portion 2304*b*.

Figure 91:
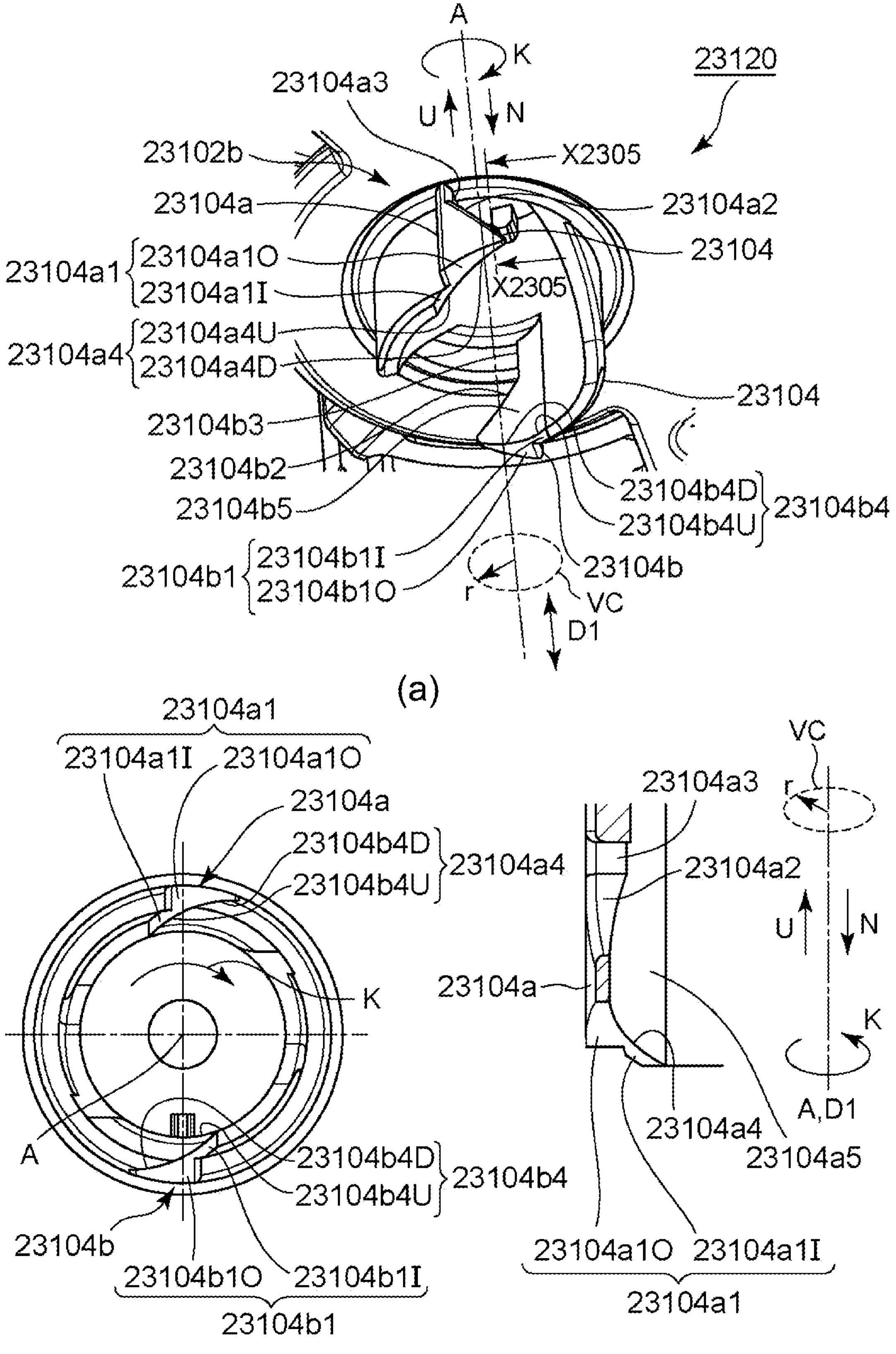
FIG. 91 is illustrations showing the detailed shapes of the first restriction releasing portion and the second restriction releasing portion in another form in Modified Example 3 of Embodiment 2.

Next, another structure will be described. As shown in FIG. 91, the projection 23102*b* of the nozzle 23102 is provided with a restriction releasing portion 23104 including a first restriction releasing portion 23104*a* (first projection) and a second restriction releasing portion 23104*b* (second projection). The inner end 23104*a*4 (inner edge line, inner ridge line) of the first slope 23104*a*1 of the first restriction releasing portion 23104*a* and the inner end 23104*b*4 (inner edge line, inner ridge line) of the first slope 23104*a*1 of the second restriction releasing portion 23104*b* are smoothly continuous from the upstream side to the downstream side in the rotational direction K. Hereinafter, the first restriction releasing portion 23104*a* and the second restriction releasing portion 23104*b* have a shape symmetric with 180 rotations about the rotational axis A, and therefore, only the first restriction releasing portion 23104*a* will be described. FIG. 91 shows the shape of the first restriction releasing portion 23104*a*, and part (a) thereof is a perspective view as seen from the side (nozzle side) of the second end portion in the first direction D1, part (b) is a view as seen from the side (nozzle side) of the second end portion in the first direction D1, and part (c) is a sectional view taken along a line X23104-X23104 in part (a) of FIG. 91.

As shown in part (a) of FIG. 91, the inner end 23104*a*4 is smoothly continuous toward the outside of the radial direction r of the imaginary circle VC centered on the rotational axis A, as goes toward the downstream side in the rotational direction K. Here, the inner end 23104*a*4 includes an inner upstream end 23104*a*4U (inner upstream edge line, inner upstream ridge) on the upstream side in the rotational direction K, and an inner downstream end 23104*a*4D (inner downstream edge line, inner downstream ridge). The inner upstream end 23104*a*4U and the inner downstream end 23104*a*4D are ends which extend smoothly continuous. Similarly, the inner end 23104*b*4 includes an inner upstream end 23104*b*4U (inner upstream edge line, inner upstream ridge) on the upstream side in the rotational direction K and an inner downstream end 23104*b*4D (inner downstream edge line, inner downstream ridge). The inner upstream end 23104*b*4U and the inner downstream end 23104*b*4D are ends which extend smoothly continuous.

Further, as shown in part (c) of FIG. 91, the first restriction releasing portion 23104*a* includes a first abutment surface 23104*a*5 on the arrow U direction side of (above) the inner end 23104*a*4 and a second abutment surface 23104*a*3 on the arrow U direction side of (above) the second slope 23104*a*2. Similarly, as shown in part (c) of FIG. 91, the second restriction releasing portion 23104*b* includes a first abutment surface 23104*b*5 on the arrow U direction side of (above) the inner end 23104*b*4 and a second abutment surface 23104*b*3 on the arrow U direction side of (above) the second slope 23104*b*2.

Figure 92:
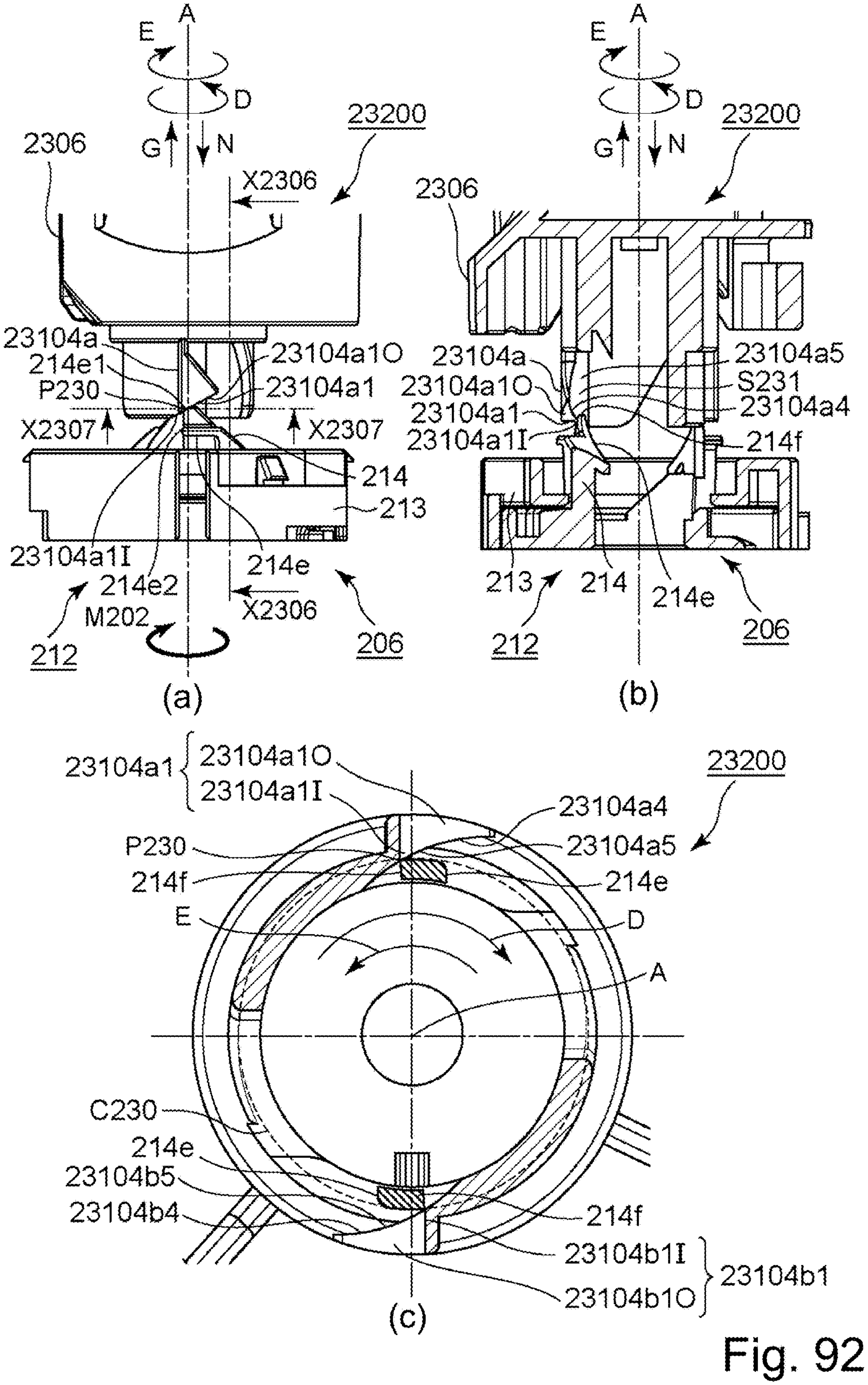
FIG. 92 is illustrations showing a process in which the releasing member is rotated by the first restriction releasing portion and the second restriction releasing portion of another form of Modified Example 3 of Embodiment 2.

Next, Referring to FIG. 92, the description will be made as to a mechanism in which the rotation restriction of the apparatus-side shutter 209 by the rotation restricting mechanism 212 is released by mounting the toner pack 23120 using the restriction releasing portion 23104 having another shape of this modified example. However, the description will be made only as to the points different from those of the modified examples, that is, only the operation after the releasing claw 214*e* is rotated in the rotational direction D by the first slope inner side 23104*a*1I of the first restriction releasing portion 23104*a* to release the contact with the first slope inner side 23104*a*1I. FIG. 92 shows a state in which the releasing claw 214*e* has released the contact of the first restriction releasing portion 23104*a* with the inner side 23104*a*1I of the first slope, and part (a) of FIG. 92 is a view as seen in a direction perpendicular to the rotational axis A, and part (b) of FIG. 92 is a sectional view taken along a line X2306-X2306 in part (a) of FIG. 92, and part (c) of FIG. 92 is a cross-sectional view taken along a line X2307-X2307 in part (a) of FIG. 92. For the sake of better illustration, only the nozzle 2302 (restriction releasing portion 23104), the restricting member 213, and the releasing member 214 are shown in each Figure. Further, in part (c) of FIG. 92, the cut surfaces of the nozzle 2302 (restriction releasing portion 23104) and the releasing claw 214*e* (releasing member 214) are shaded.

In the state shown in part (a) of FIG. 92, In the releasing claw 214*e*, the contact between the first guided surface 214*e*1 and the inner side 23104*a*1I of the first slope of the first restriction releasing portion 23104*a* is released, and, and the rotation in the rotational direction D is stopped. Further, as described above, the inner end 23104*a*4 of the first restriction releasing portion 23104*a* has such a shape that it goes outward in the radial direction r of the imaginary circle VC centered on the rotational axis A, as goes in the rotational direction D (part (a) of FIG. 91). Therefore, as shown in part (b) of FIG. 92, there is a space S231 on the arrow G direction side (upper side) of the releasing claw 214*e*.

When the releasing claw 214*e* enters the space S231 in the arrow G direction (upward), the releasing claw 214*e* tends to be rotated in the rotational direction E by the moment M202 (urging force) by the releasing spring 216 (see FIG. 50) shown in part (a) of FIG. 92. Then, as shown in part (b) of FIG. 92 and part (c) of FIG. 92, in the releasing claw 214*e*, the contact surface 214*f* is brought into contact with the first abutment surface 23104*a*5 of the first restriction releasing portion 23104*a* in the rotational direction E, by the moment M202. By this, the releasing claw 214*e* becomes in a state in which rotation in the rotational direction E is restricted.

Here, on the cross-section of part (c) of FIG. 92, an intersection between the circumscribed circle C230 centered on the rotational axis A of the contact surface 214*f* of the releasing claw 214*e* and the first abutment surface 23104*a*5 of the first restriction releasing portion 23104*a* is an intersection P230. In, the intersection P230 is set so as to overlap the first slope outer side 2304*a*1O of the first restriction releasing portion 23104*a* with respect to the rotational direction K. Further, since the contact portion between the first abutment surface 23104*a*5 of the first restriction releasing portion 23104*a* and the contact surface 214*f* of the releasing claw 214*e* is the intersection P230, as shown in part (a) of FIG. 92, the second guided surface 214*e*2 of the releasing claw 214*e* overlaps the outer side 23104*a*1O of the first slope of the first restriction releasing portion 23104*a* with respect to the rotational direction D.

When the toner pack 23120 is further moved in the direction of the arrow N (downward) from the state shown in FIG. 92, the outer side 2304*a*1O of the first slope of the first restriction releasing portion 23104*a* and the second guided surface 214*e*2 of the releasing claw 214*e* are brought into contact with each other. Thereafter, the rotation restriction of the apparatus-side shutter 209 by the rotation restricting mechanism 212 is released by the same operation as the present modified example.

As described in the foregoing, in the restriction releasing portion 23104 having above-described another shape of the present modified example, the inner upstream end 23104*a*4U and the inner downstream end 23104*a*4D of the first restriction releasing portion 2304*a* in the present modified example constitute the one smoothly continuous inner end. In addition, the inner upstream end 23104*b*4U and the inner downstream end 23104*b*4D of the second restriction releasing portion 23104*b* constitute one smoothly continuous end (edge line, ridge line). By this, the two ridge lines (faces) may be processed as one ridge line (face), and the effect of reducing the processing man-hours can be expected.

Modified Example 4

Next, referring to FIGS. 93 to 95, another structure will be described. The description of the same points as those of the above-described embodiments and modified example will be omitted. In particular, of the elements disclosed in this modified example, those corresponding to the members described in Embodiment 2 are assigned the same names as those of the members of Embodiment 2, and only the points different from those of Embodiment 2 will be described.

In Embodiment 2, the projecting portion 202*b* (projection) is integrally provided on the nozzle 202, but by providing the projection in another component, it is possible to facilitate reuse the projection having in the complicated shape, thus improving recyclability.

The structure in which the projecting portion 202*b* is provided on another component other than the nozzle will be described below.

Figure 93:
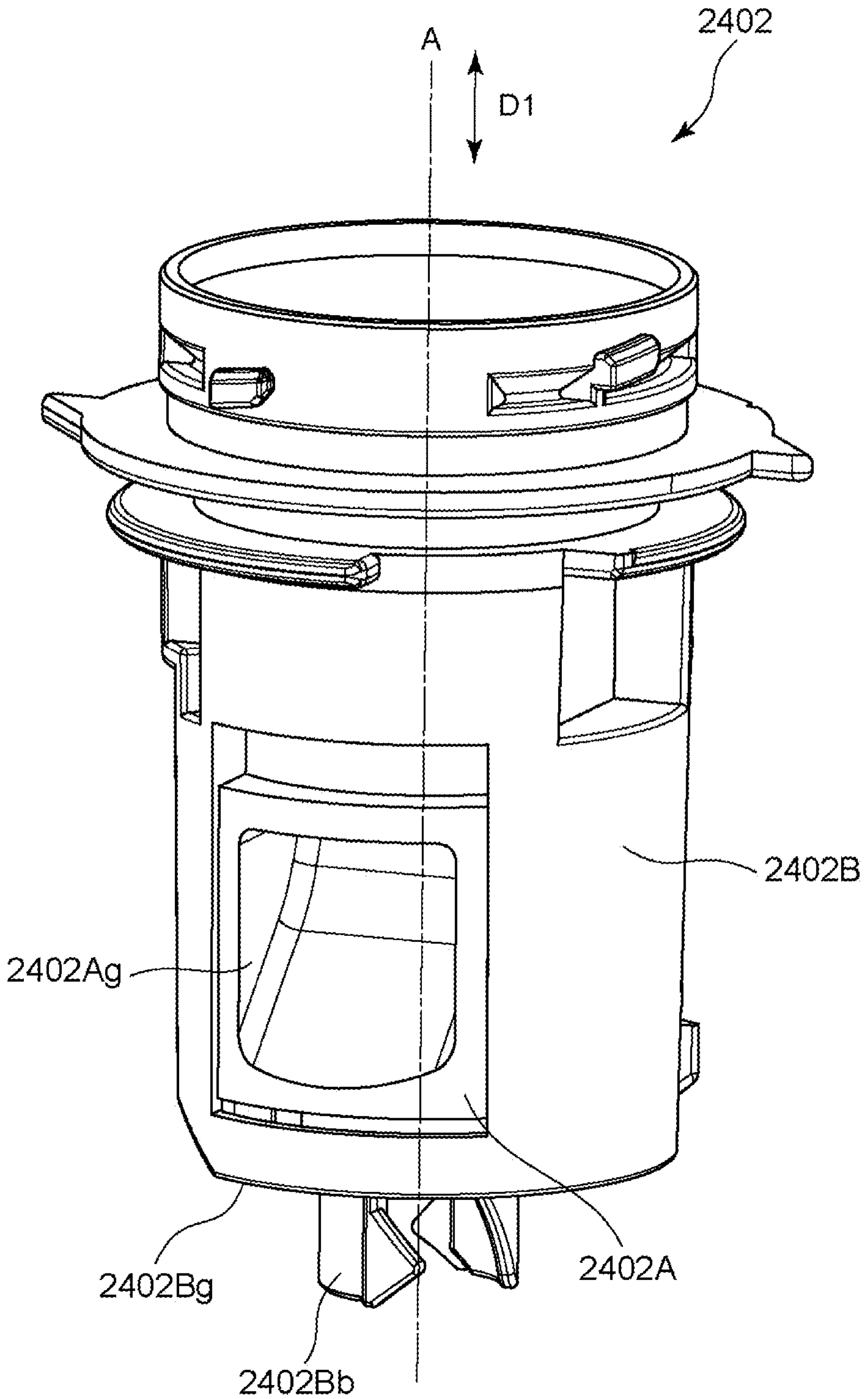
FIG. 93 is an external perspective view of a discharge unit according to Modified Example 4 of Embodiment 2.

FIG. 93 is an external perspective view of the discharge unit 2402 of this modified example. FIG. 94 is an exploded perspective view of the discharge unit 2402 of this modified example. FIG. 95 is a perspective view of the toner pack 2420 to which the discharge unit 2402 of this modified example is mounted.

As shown in FIG. 93, the discharge unit 2402 of this modified example has a cylindrical shape, and a nozzle 2402A (discharge portion) and a support member 2402B are arranged substantially coaxially with the rotational axis A.

Figure 94:
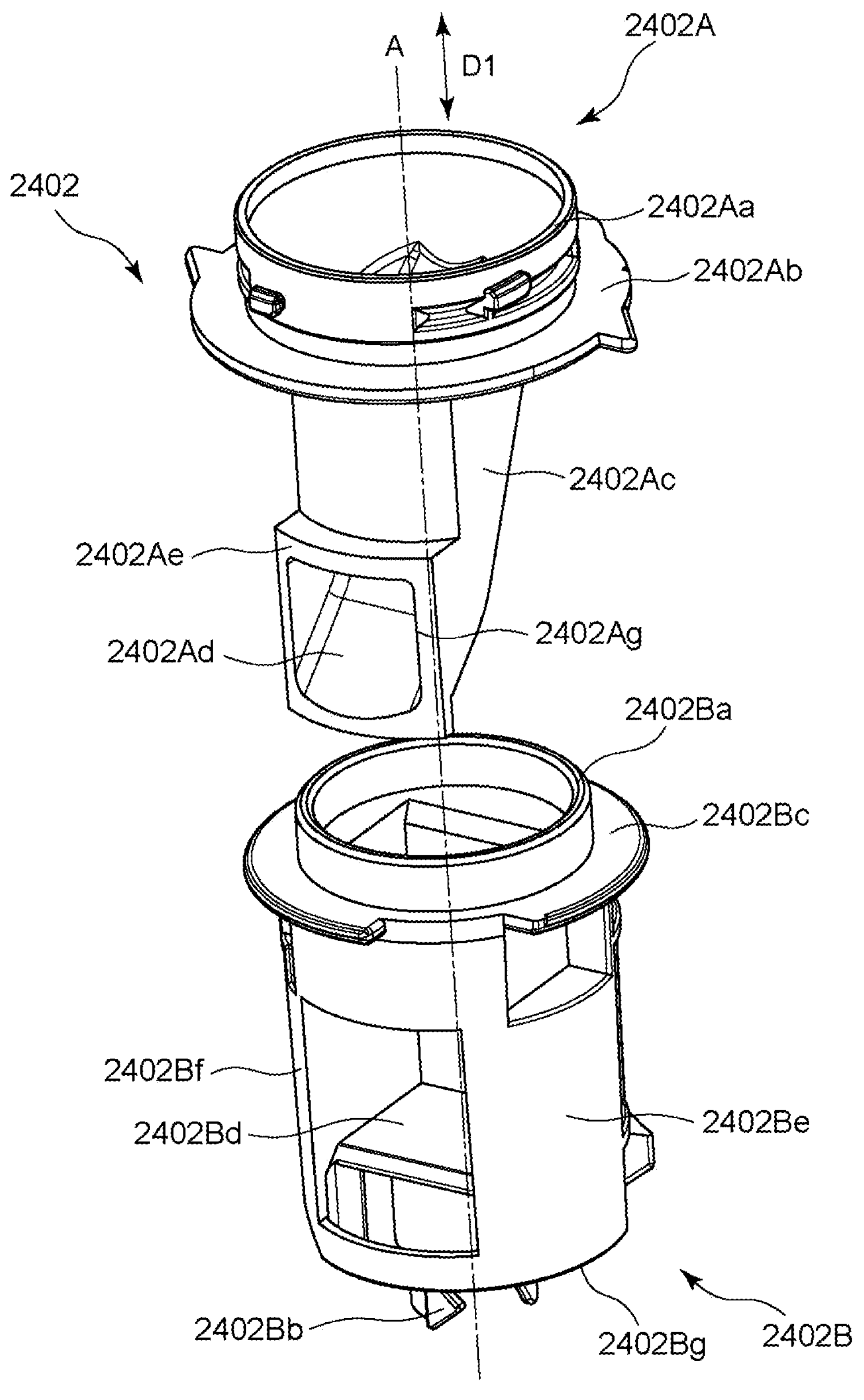
FIG. 94 is an exploded perspective view of the discharge unit according to Modified Example 4 of Embodiment 2.

As shown in FIG. 94, in the nozzle 2402A, a cylindrical portion 2402Aa and a disk portion 2402Ab having a diameter larger than that of the cylindrical portion 2402Aa are arranged substantially coaxially with the rotational axis A, in the order named from the first end side in the first direction D1. From the disk portion 2402Ab, a toner feed portion 2402Ac projecting toward the second end portion in the first direction D1 is extended. The toner feed portion 2402Ac is provided with a discharge surface 2402Ae, which is a surface extending in the rotational axis A direction, on the second end side in the first direction D1.

A through hole 2402Ad is provided in the nozzle 2402A, penetrates the cylindrical portion 2402Aa, the disk portion 2402Ab, and the toner feed portion 2402Ac from the first end side in the first direction D1, and it is in fluid communication with the discharge surface 2402Ae in a direction substantially perpendicular to the rotational axis A. The portion where the through hole 2402Ad penetrates the discharge surface 2402Ae is referred to as a discharge opening 2402Ag (opening).

The support member 2402B has a genuinely cylindrical shape, and includes a first cylindrical portion 2402Ba, a disk portion 2402Bc having a diameter larger than that of the first cylindrical portion 2402Ba and a second cylindrical portion 2402Be substantially coaxially with the rotational axis A, in this order from the first end portion side in the first direction D1. The projecting portion 2402Bb projects in the direction of the rotational axis A from an end surface 2402Bg of the second cylindrical portion 2402Be in the direction of the rotational axis A.

The projecting portion 2402Bb has the same shape as the projecting portion 202*b* of the nozzle 202 of Embodiment 2, And therefore, the description thereof will be omitted.

Further, a through hole 2402Bd is provided in the support member 2402B, and penetrates the first cylindrical portion 2402Ba, the disk portion 2402Bc, and the second cylindrical portion 2402Be from the first end side of the first direction D1, and it is extended to the side hole 2402Bf (side opening) of the second cylindrical portion 2402Be.

(Assembling of Discharge Unit)

Figure 95:
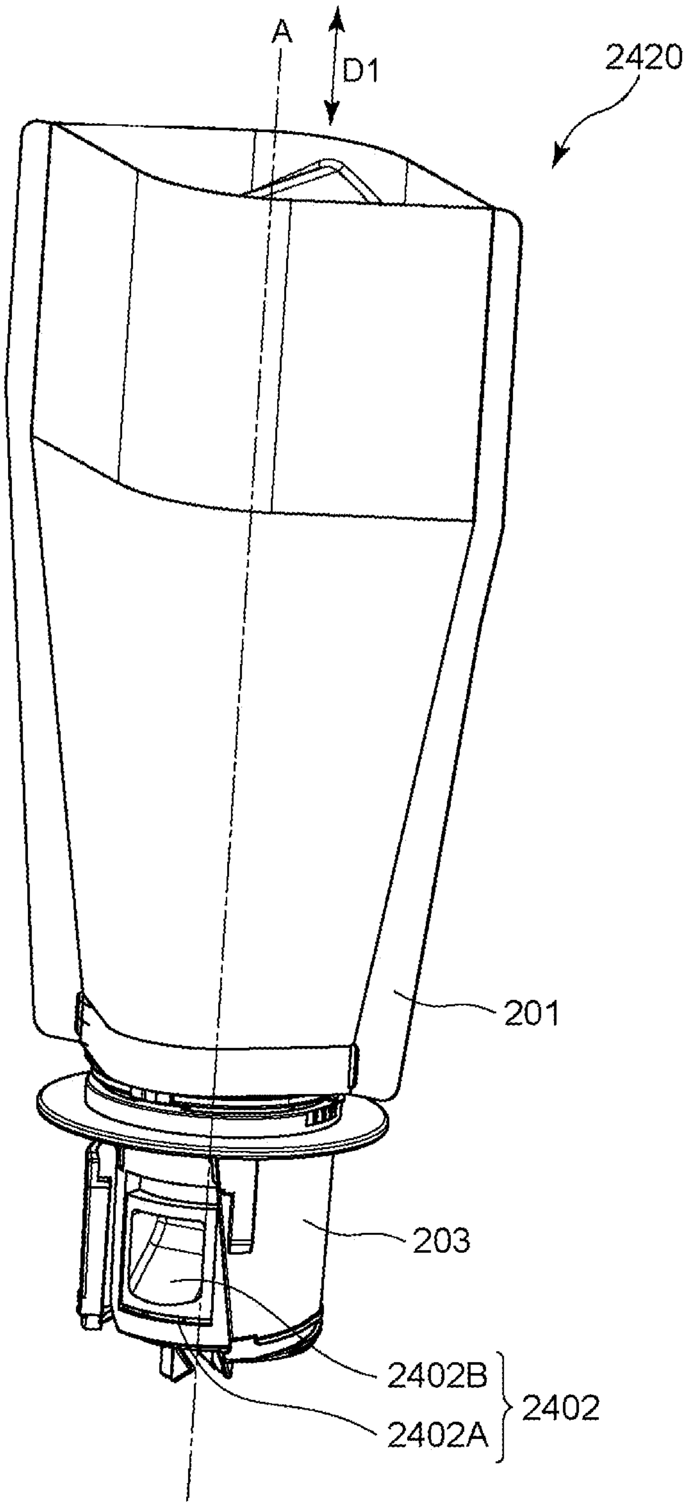
FIG. 95 is a perspective view of the toner pack equipped with the discharge unit according to Modified Example 4 of Embodiment 2.

On the first end side of the nozzle 2402A in the first direction D1, an accommodating portion 2401 is mounted to the cylindrical portion 2402Aa without a gap by adhesion or the like (See FIG. 95)

As shown in FIG. 94, the nozzle 2402A is provided with a support member 2402B extending from the second end side in the first direction D1 substantially coaxially with the rotational axis A. In the support member 2402B, the first cylindrical portion 2402Ba is tightly fitted into a recess (not shown) provided in the disk portion 2402Ab of the nozzle 2402A. In this manner, the support member 2402B is coupled with the nozzle 2402A.

In the discharge unit 2402 in which the nozzle 2402A and the support member 2402B are coupled, the discharge opening 2402Ag is disposed at substantially the same position as the position of the discharge opening 202*a* of the nozzle 202 of Embodiment 2.

As shown in FIG. 95, an orientation (direction in the mounting attitude) of the toner pack 2420 in which at least a part of the discharge unit 2402 is below the accommodating portion 201 and the rotational axis A extends in the gravity direction is as a predetermined direction. When the toner pack 2420 is oriented in a predetermined direction, the projecting portion 2402Bb projects downward from the end surface 2402Bg (lower surface) of the support member 2402B. Further, the projecting portion 2402Bb is below the discharge opening 2402Ag.

Further, as shown in FIG. 95, the pack side shutter 203 is mounted to the discharge unit 2402 by the same method as in Embodiment 2.

The method of mounting/dismounting to/from the mounting portion 206 is the same as that of Embodiment 2, and therefore, the description thereof will be omitted.

As described in the foregoing, the projecting portion 202*b* can be provided on the support member 2402B, which is a component different from the nozzle 2402A. The nozzle 2402A and the support member 2402B are fixed by press-fitting, and can be relatively easily removed from each other. Therefore, only the support member 2402B including the projecting portion 2402Bb having a complicated shape can be easily removed from the toner pack 2420. Therefore, it is possible to facilitate the reuse of the support member 2402B including the projecting portion 2402Bb, thus improving the recyclability.

Modified Example 5

Next, referring to FIGS. 96 to 98, another structure will be described. The same points as those of the above-described embodiments and modified examples will be omitted. In particular, of the elements disclosed in this modified example, those corresponding to the members described in Embodiment 2 are assigned the same names as those of the members of Embodiment 2, and only the points different from those of Embodiment 2 will be explained.

Figure 96:
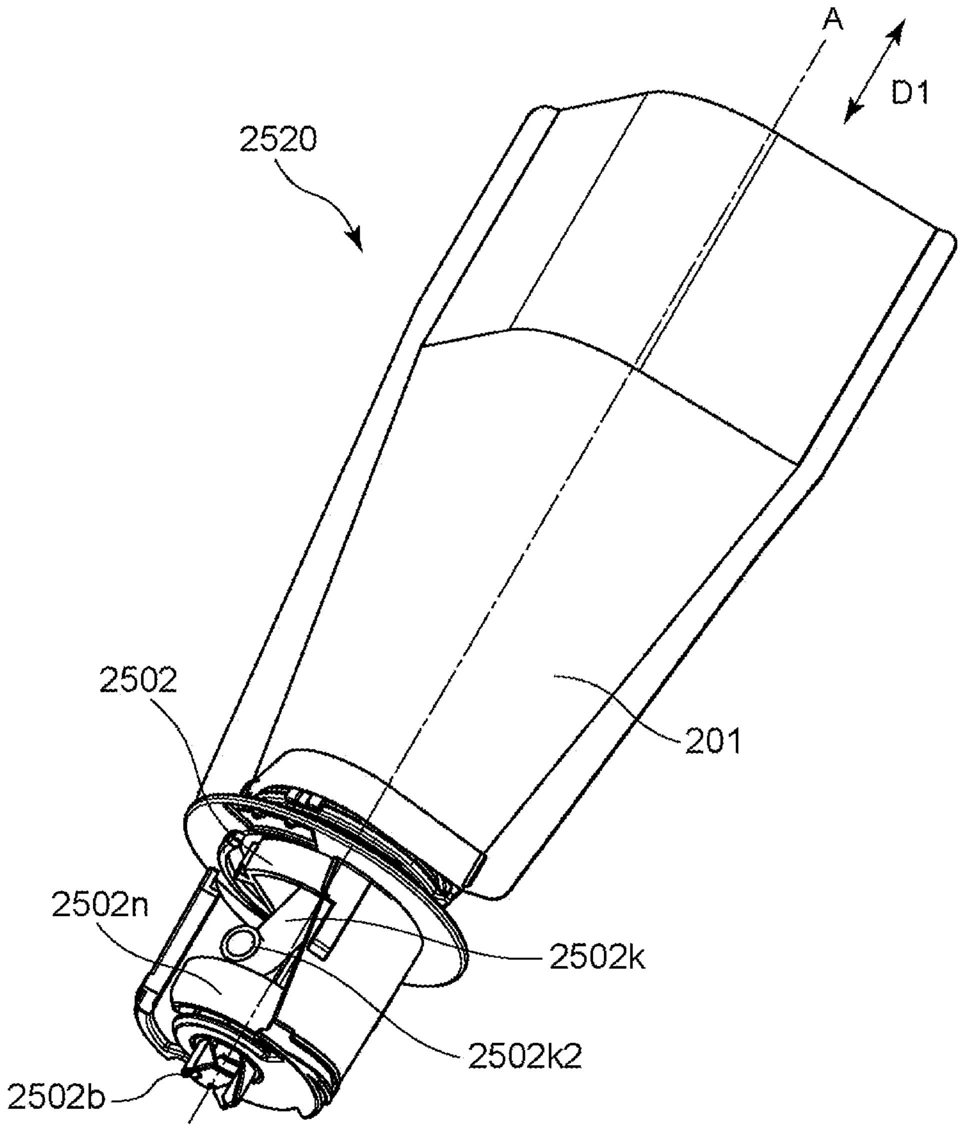
FIG. 96 is a perspective view of the toner pack according to Modified Example 5 of Embodiment 2.

FIG. 96 is a perspective view of the toner pack 2520 of this modified example. Part (a) of FIG. 97 is a perspective view of the nozzle 2502 of this modified example. Part (b) of FIG. 97 is a sectional view of the nozzle 2502 of this modified example.

In Embodiment 2, the nozzle 202 has a side surface 202*c* extending in the direction of the rotational axis A (central axis), and the discharge opening 202*a* is provided on the side surface 202*c*. On the other hand, in this modified example, the discharge opening 2502*k*2 is provided in an end surface of the cylindrical portion 2502*k*.

The nozzle 2502 of this modified example will be described.

Figure 97:
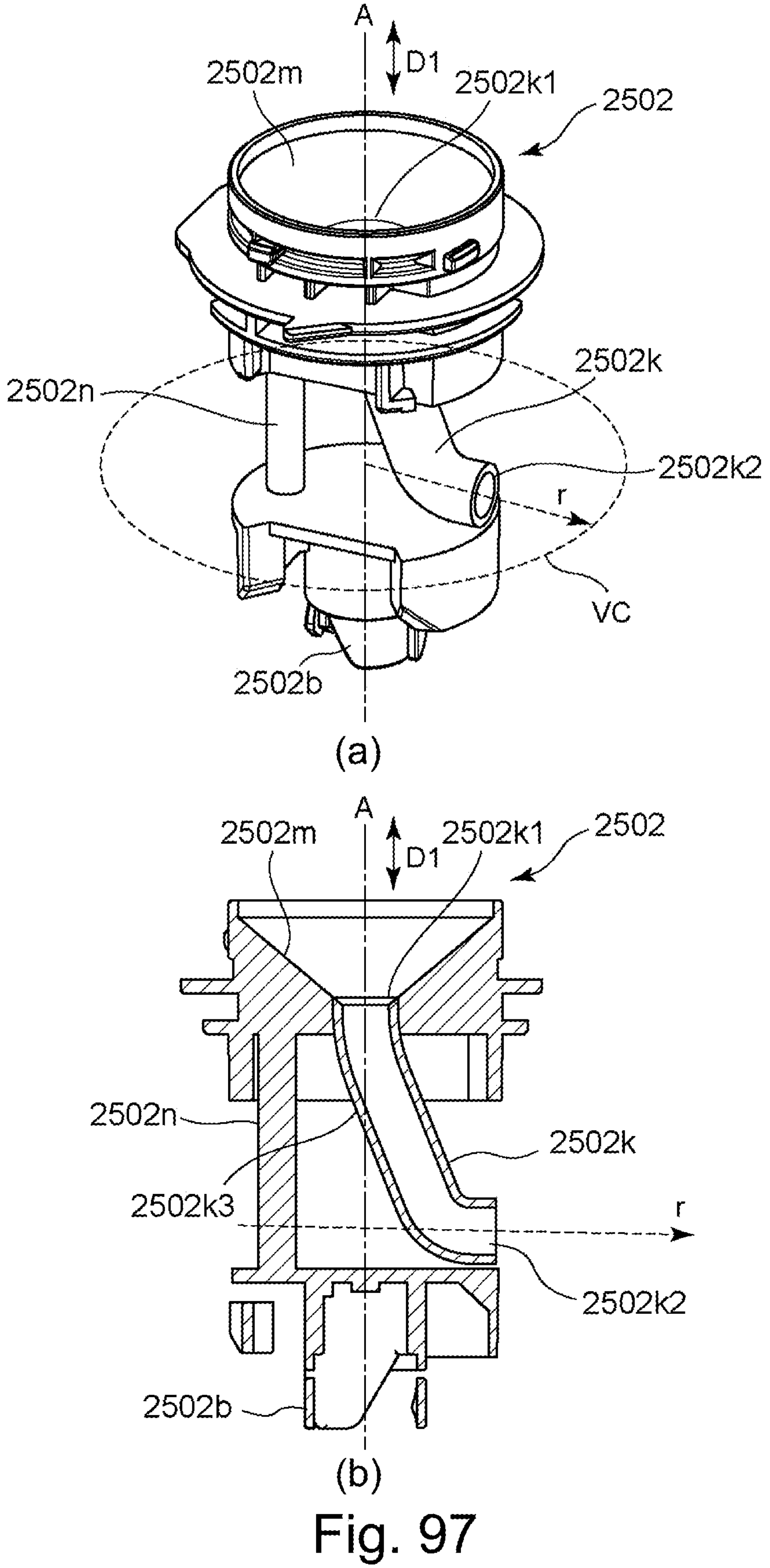
FIG. 97 is a perspective view and a sectional view of the nozzle in Modified Example 5 of Embodiment 2.

As shown in part (a) of FIG. 97 and part (b) of FIG. 97, the nozzle 2502 of this modified example includes a cylindrical portion 2502*k* (pipe) and a main assembly portion 2502*n* (pipe support member) which supports the cylindrical portion 2502*k*. The cylindrical portion 2502*k* has a cylindrical shape, and a substantially circular opening 2502*k*1 (reception port) is arranged substantially coaxially with the rotational axis A on the first end side in the first direction D1. In addition, a substantially circular discharge opening 2502*k*2 (exit) is provided at the end of the cylindrical portion 2502*k* opposite to the opening 2502*k*1. As shown in part (b) of FIG. 97, the discharge opening 2502*k*2 faces in a direction perpendicular to the rotational axis A. In other words, as shown in part (a) of FIG. 97, the discharge opening 2502*k*2 faces the outside in the radial direction r of the imaginary circle VC centered on the rotational axis A. The opening 2502*k*1 and the discharge opening 2502*k*2 are in fluid communication with each other by a communication passage 2502*k*3. The communication passage 2502*k*3 is a portion having a cylindrical shape bent into a curved shape. That is, in the cylindrical portion 2502*k*, the opening 2502*k*1 faces upward and the communication passage 2502*k*3 faces outward in the radial direction r, as goes downward, when the toner pack 2520 is oriented in the predetermined direction (direction of the mounting attitude) in Embodiment 2.

Further, the main assembly portion 2502*n* of the nozzle 2502 is provided with a slope portion 2502*m* on the first end side in the first direction D1 from the opening 2502*k*1. The slope portion 2502*m* is in the form of a conical slope substantially coaxial with the rotational axis A, and is a slope which inclines toward the second end side in the first direction D1 as goes to the rotational axis A.

The toner in the accommodating portion 201 of the toner pack 2520 passes through the cylindrical portion 2502*k* from the slope portion 2502*m*, is discharged through the discharge opening 2502*k*2, and is replenished into the toner accommodating chamber 36 of the developer container 32.

Further, a projecting portion 2502*b* projects downward from the lower end surface (bottom surface) of the main assembly portion 2502*n* when the toner pack 2520 is oriented in a predetermined direction. The projecting portion 2502*b* has exactly the same shape as the projecting portion 202*b* of Embodiment 2, and therefore, the description thereof will be omitted.

In this modified example, the nozzle 202 of Embodiment 2 has the same structure as that of Embodiment 2 except that the nozzle 202 is replaced with the nozzle 2502, and therefore, the other description thereof will be omitted.

In this modified example, the nozzle 2502 is described as a structure in which the main assembly portion 2502*n* and the cylindrical portion 2502*k* are combined, but the cylindrical portion and the main assembly portion may be integrally formed. Further, the cylindrical portion 2502*k* may be a hard member which does not deform, or may be formed of a member which has elasticity and deforms.

Further, in this modified example, although the discharge opening 2502*k*2 of the cylindrical portion 2502*k* is fixed so as to face the outside in the radial direction r, the present invention is not limited to such an example.

Figure 98:
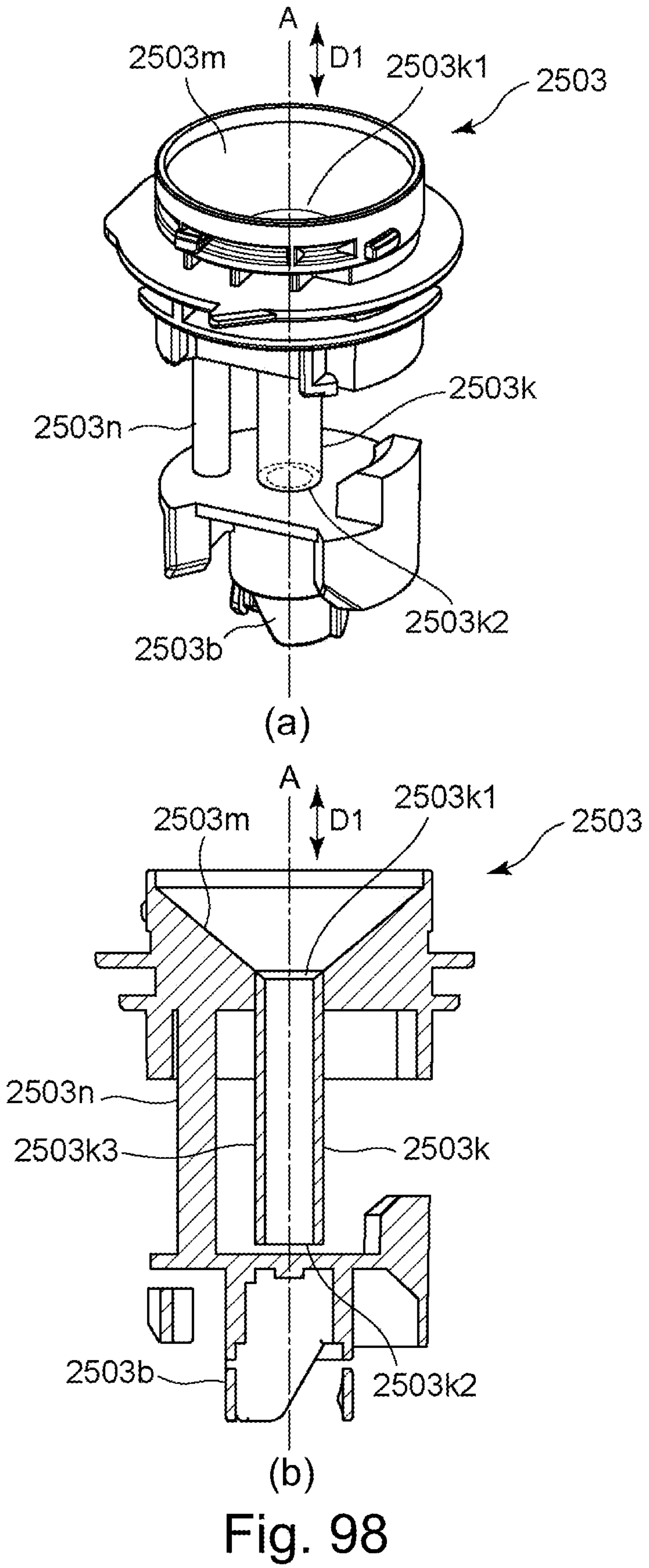
FIG. 98 is a perspective view and a cross-sectional view of the nozzle in Modified Example 5 of Embodiment 2 in a state in which the discharge opening faces downward.
Figure 99:
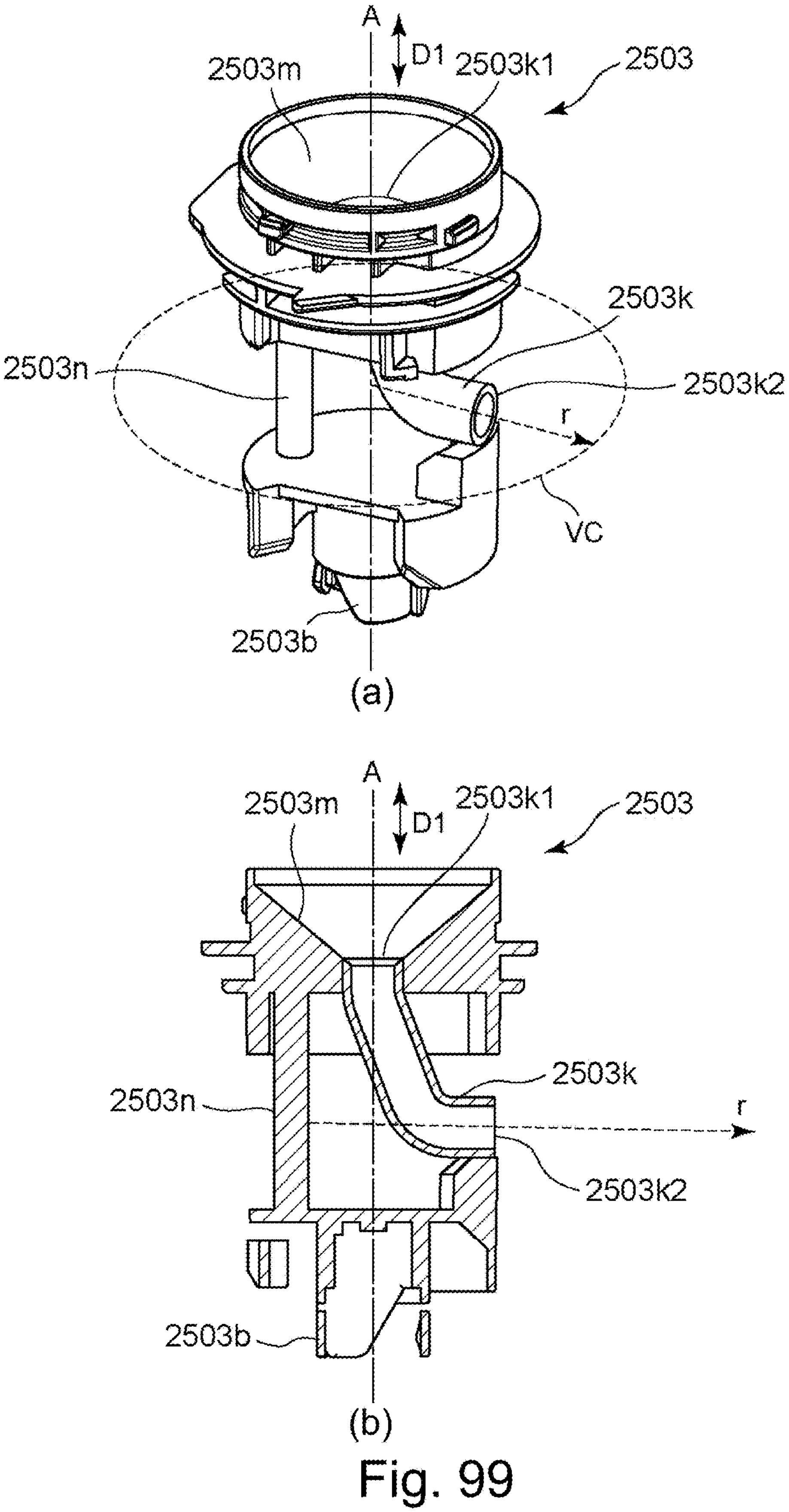
FIG. 99 is a perspective view and a sectional view of the nozzle in Modified Example 5 of Embodiment 2 in a state in which the discharge opening faces a radially outer side.

Referring to FIGS. 98 and 99, a toner pack 2530 including a nozzle 2503 in which the direction of the discharge opening of the cylindrical portion is variable will be described.

With this structure, the projecting portion 2503*b* and the slope portion 2503*m* of the nozzle 2503 have the same shape as the above-mentioned projecting portion 2502*b* and the slope portion 2502*m*, respectively, and therefore, the description thereof will be omitted.

Part (a) of FIG. 98 and part (b) of FIG. 98 are a perspective view and a sectional view of a nozzle 2503 in a state, the discharge opening 2503*k*2 of the cylindrical portion 2503*k* faces downward (direction of the rotational axis A), when the toner pack 2530 is oriented in a predetermined direction. Part (a) of FIG. 99 and part (b) of FIG. 99 are a perspective views and a cross-sectional view of the nozzle 2503 in a state in which the discharge opening 2503*k*2 of the cylindrical portion 2503*k* faces the outside in the radial direction r.

The cylindrical portion 2503*k* is flexible, and the discharge opening 2503*k*2 faces downward as shown in part (a) of FIG. 98 and part (b) of FIG. 98 in an unused fresh state. The receiving opening 2503*k*1 for receiving the toner from the accommodating portion 201 faces upward. When the toner pack 2530 is mounted on the mounting portion 206, the user can change the direction of the cylindrical portion 2503*k* so that it faces the outside in the radial direction r. The discharge opening **2503*k*2 of the cylindrical portion 2503*k* may be structured to face upward or inward in the radial direction r in the unused fresh state. That is, it will suffice if the discharge opening 2503*k*2 is structured to face the outside in the radial direction r when the toner pack 2530 is mounted on the mounting portion 206**.

Modified Example 6

In the present embodiment, the first restriction releasing portion **204*a* includes the first slope 204*a*1, the second slope 204*a*2, the third slope 204*a*3, and the abutment surface 204*a*5, and the second restriction releasing portion 204*b* has the structure of 180-degree rotationally symmetric with respect to the rotational axis A (central axis) of the first restriction releasing portion 204*a***. However, the present invention is not limited to such a structure. In this modified example, a structure in which the functions of the first restriction releasing portion and the second restriction releasing portion are separated will be described.

Figure 100:
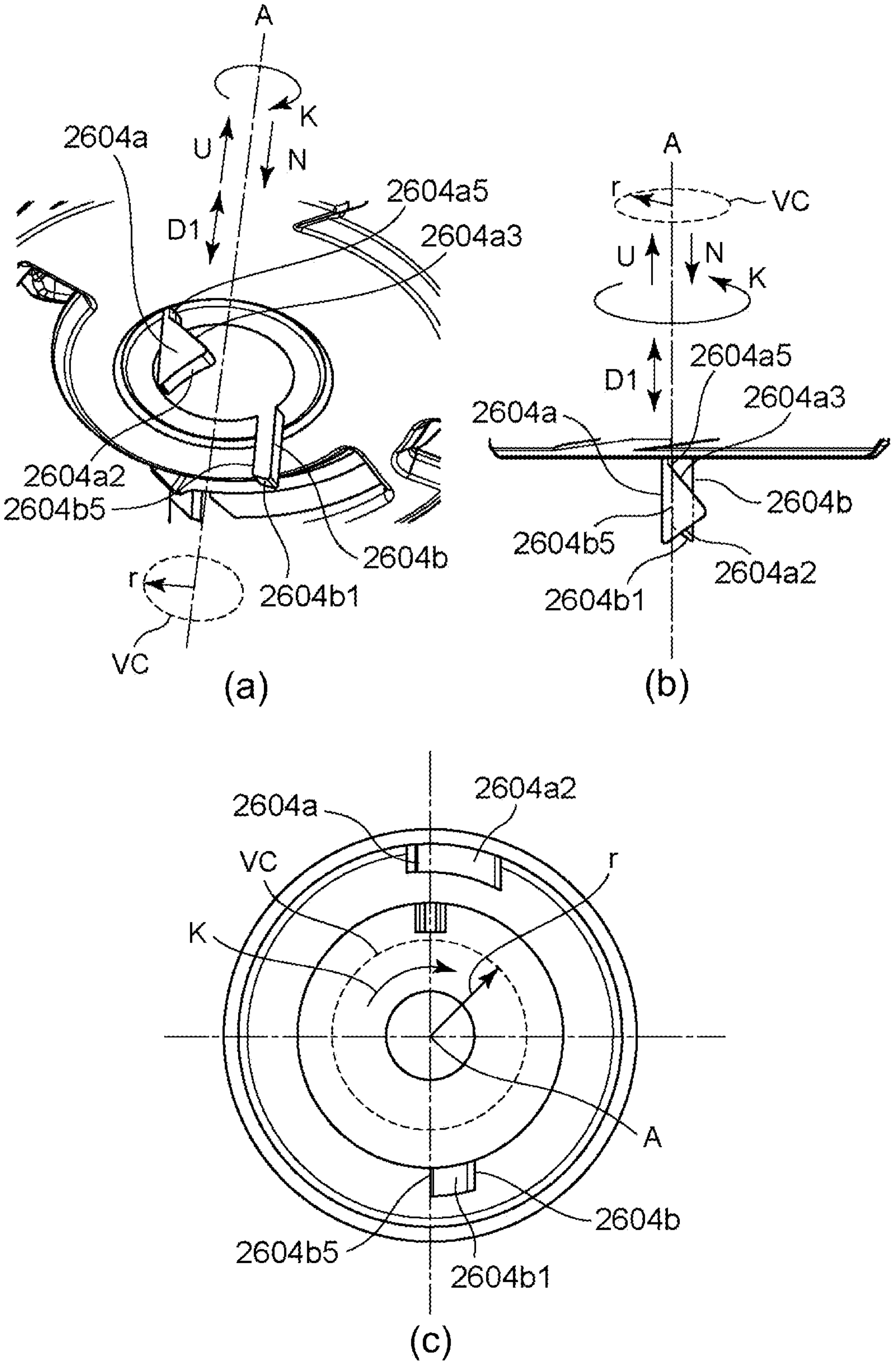
FIG. 100 is illustrations showing a detailed shape of the first restriction releasing portion and the second restriction releasing portion according to Modified Example 6 of Embodiment 2.

The second restriction releasing portion **2604*b* (second projection) of this modified example is provided on the opposite side of the rotational axis A from the first restriction releasing portion 2604*a* (first projection), and is provided at a position different from that of the first restriction releasing portion 2604*a* in the circumferential direction of the imaginary circle VC (part (c) of FIG. 100). Further, the first restriction releasing portion 2604*a* and the second restriction releasing portion 2604*b* overlap each other when viewed in the radial direction r of the imaginary circle VC (part (b) of FIG. 100**).

As shown in part (a) of FIG. 100, the first restriction releasing portion **2604*a* includes a second slope 2604*a*2 (second downward surface, second downward guide surface, second force applying surface) and a third slope 2604*a*3 (upward surface, an upward guide surface), and an abutment surface 2604*a*5. The second restriction releasing portion 2604*b* includes a first slope 2604*b*1 (first downward surface, first downward surface, first force applying surface) and an abutment surface 2604*b*5. The first restriction releasing portion 2604*a* does not include a slope corresponding to the first slope 2604*b*1, and the second restriction releasing portion 2604*b* does not include a slope corresponding to the second slope 2604*a*2 and the third slope 2604*a*3**.

As shown in part (a) of FIG. 65, part (b) of FIG. 65 and FIG. 67, the first slope **2604*b*1 of the second restriction releasing portion 2604*b* applies the force, while guiding the first guided surface 214*e*1 of the releasing member 214. By this as viewed in the direction of the rotational axis A, the releasing member 214 is rotated in the rotational direction D to a position where the second guided surface 214*e*2 and the third guided surface 214*e*3 of the releasing member 214 are exposed through the cover 210**.

On the other hand, as shown in part (c) of FIG. 65, the second slope **2604*a*2 of the first restriction releasing portion 2604*a* rotates the releasing member 214 to the position where, the rise restricted surface 214*c* does not overlap the rise restricting surface 210*e* of the cover 210 as viewed in the direction of the rotational axis A. In addition, as shown in part (a) of FIG. 66, the third slope 2604*a*3 of the first restriction releasing portion 2604 guides the releasing member 214 so that the releasing member 214** moves upward while being rotated in the rotational direction E.

As described above, it is possible to employ a structure of a projecting portion in which the functions of the first restriction releasing portion **2604*a* and the second restriction releasing portion 2604*b*** are separated.

Modified Example 7

Although the toner pack 220 of Embodiment 2 includes the pack side shutter 203, it may have a structure not including the pack side shutter 203.

A method of supplying toner to the image forming apparatus by using the toner pack 220 not provided with the pack side shutter 203 will be described.

Figure 101:
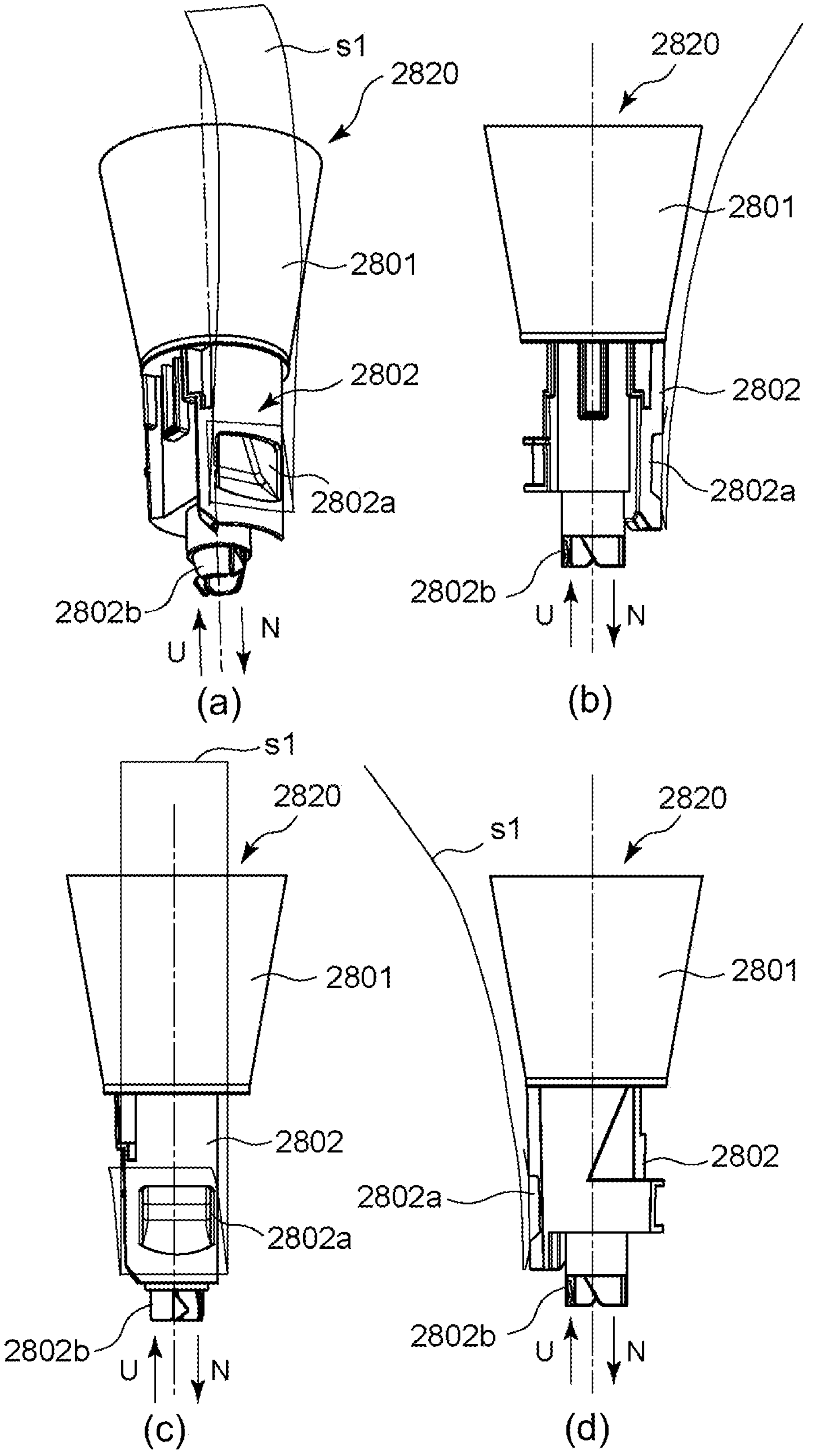
FIG. 101 is a perspective view, a front view, a side view, and a rear view of the toner pack according to a Modified Example 7 of Embodiment 2.

Part (a) of FIG. 101 is a perspective view of a toner pack 2820 not provided with the pack-side shutter. Part (b) of FIG. 101, part (c) of FIG. 101 and part (d) of FIG. 101 are a left side view, a front view, and a right side view of the toner pack 220 without the pack side shutter 203, respectively. A nozzle 2802 is provided with a discharge opening **2802*a* (opening, nozzle opening) and a projecting portion 2802*b*. An accommodating portion 2801 and a nozzle 2802 are shown in a simplified manner in shape for the sake of better illustration, but are exactly the same as those in Embodiment 2. Instead of including the pack-side shutter, a sealing member s1 seals the discharge opening 2802*a* of the nozzle 2802. One end of the sealing member s1 extends to above the accommodating portion 2801**.

Figure 102:
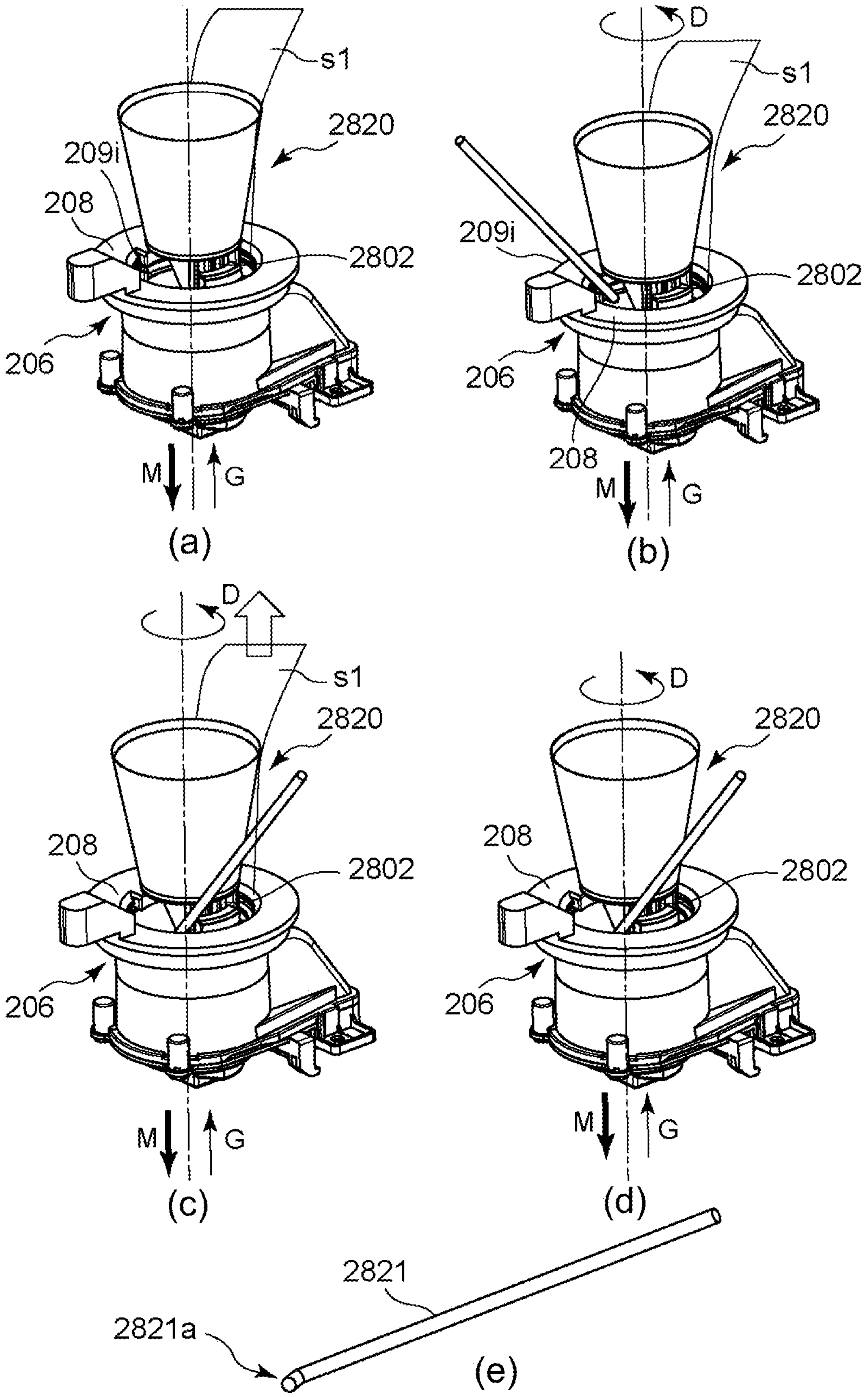
FIG. 102 is a perspective view of a toner pack and a mounting portion, and a perspective view of a rod used for opening a shutter on the apparatus-side, according to Modified Example 7 of Embodiment 2.

Part (a) of FIG. 102 is a perspective view of the toner pack 2820 and the mounting portion 206 in a state in which the toner pack 2820 including no pack-side shutter is mounted on the mounting portion 206. Part (d) of FIG. 102 shows a rod 2821 to be used to open the apparatus-side shutter 209. Part (b) of FIGS. 102 and 102 (*c*) are perspective views illustrating the state before and after the user opens the apparatus-side shutter 209 using the rod 2821, respectively. Part (d) of FIG. 102 is a perspective view of the toner pack 220 and the mounting portion 206 in the state of part (c) of FIG. 102 after the sealing member s1 is pulled out.

In the case of the toner pack 2820 without the pack side shutter, the apparatus-side shutter 209 cannot be opened even if the operating lever 208 is operated as described above. Therefore, by mounting the toner pack 2820 on the mounting portion 206, the rotation restriction of the apparatus-side shutter 209 of the rotation restricting mechanism 212 is first released by the projecting portion **2802*b* (part (a) of FIG. 102). Thereafter, the rod 2821 is inserted into the gap between the hole portion of the mounting portion 206 and the nozzle 2802, and the free end bending portion 2821*a* of the rod is engaged with the shutter projection 209*i* on the apparatus-side (part (b) of FIG. 102). Next, the rod 2821 is moved in the rotational direction D so as to rotate the apparatus-side shutter 209 from the closed position (part (b) of FIG. 102) to the open position (part (c) of FIG. 102). Then, the sealing member s1 is pulled out upward to unseal the discharge opening 2802*a* of the nozzle 2802. When the accommodating portion 2801 is compressed by the user in this state, the toner is discharged through the discharge opening 2802*a* of the nozzle 2802 and is supplied into the toner accommodating chamber 36 of the developer container 32 through the apparatus-side opening 217*a* of the second frame 217**.

As described above, the toner pack 220 may not have the shutter 203 on the pack side.

Embodiment 3

Next, referring to FIGS. 103 to 111, Embodiment 3 will be described in the following. In this embodiment, the third slope of the restriction releasing portion is perpendicular to the rotational axis A, as compared with Embodiment 2. In addition, the projecting portion 202*b* in Embodiment 2 is structured to move along the rotational axis A. The same points as in the above-described embodiments will be omitted. In particular, of the elements disclosed in this embodiment, those corresponding to the members described in Embodiment 2 are assigned the same names as those of the members of Embodiment 2, and only the points different from those of Embodiment 2 will be described.

(Toner Pack Structure)

Figure 103:
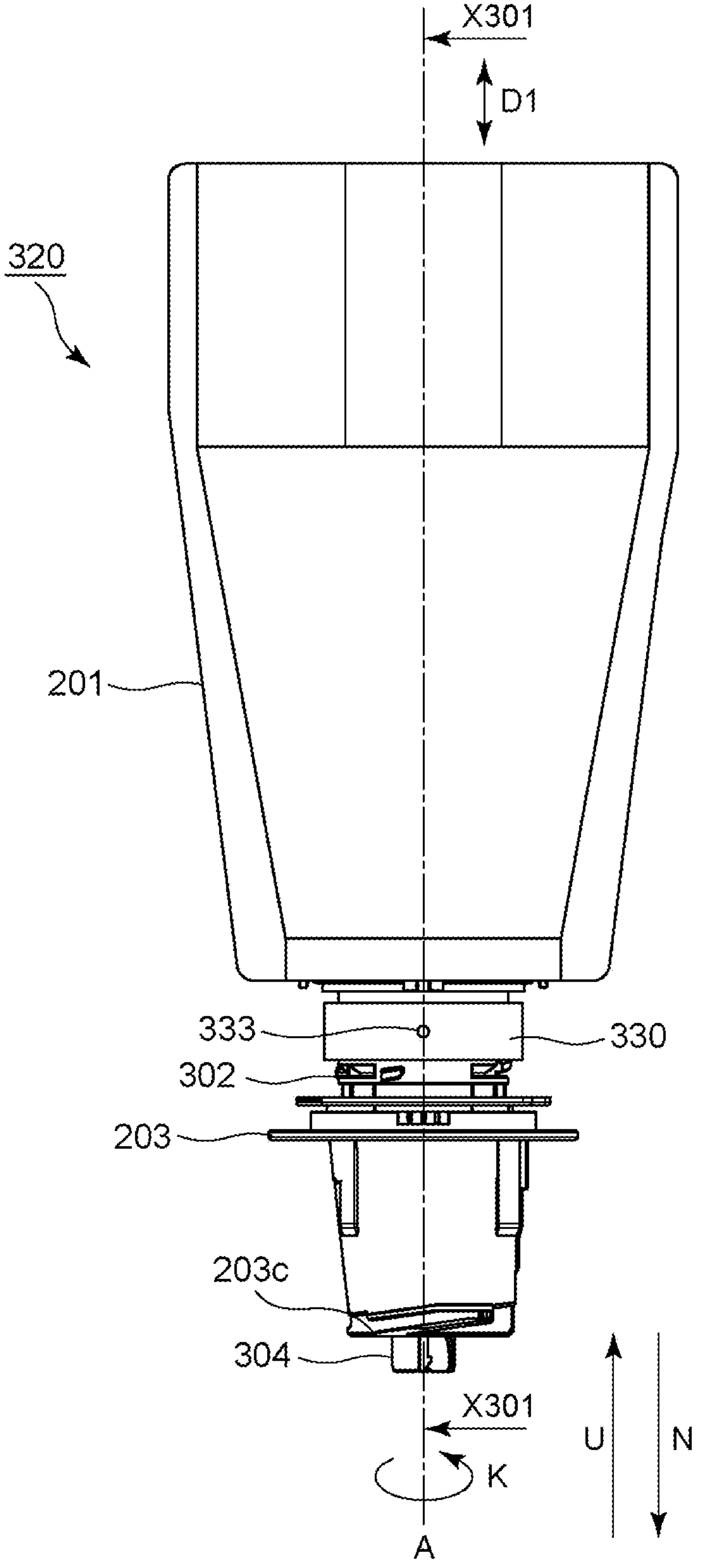
FIG. 103 is an illustration showing an entire toner pack according to Embodiment 3.
Figure 104:
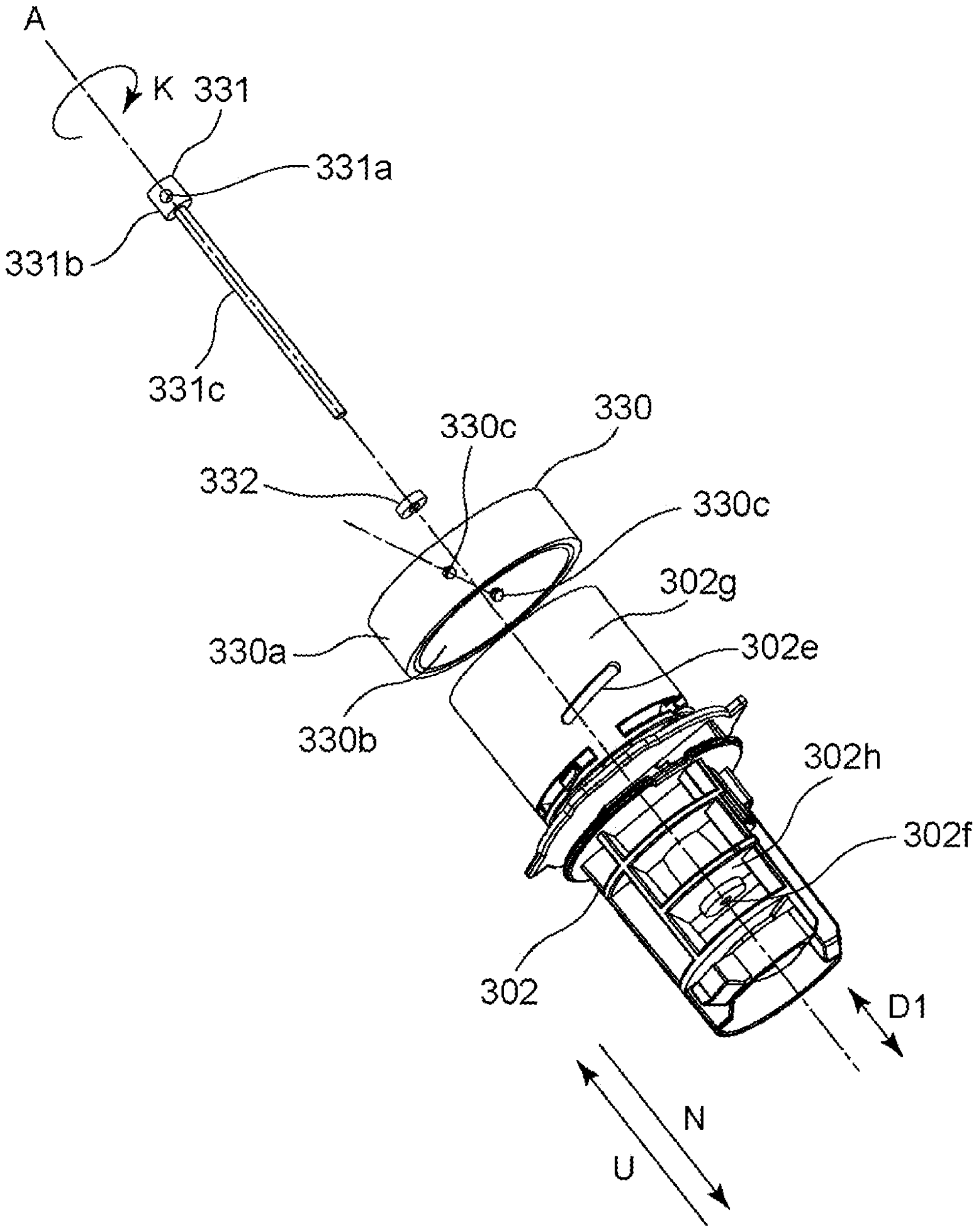
FIG. 104 is an exploded perspective view of a nozzle and the portions assembled to the nozzle in Embodiment 3.
Figure 105:
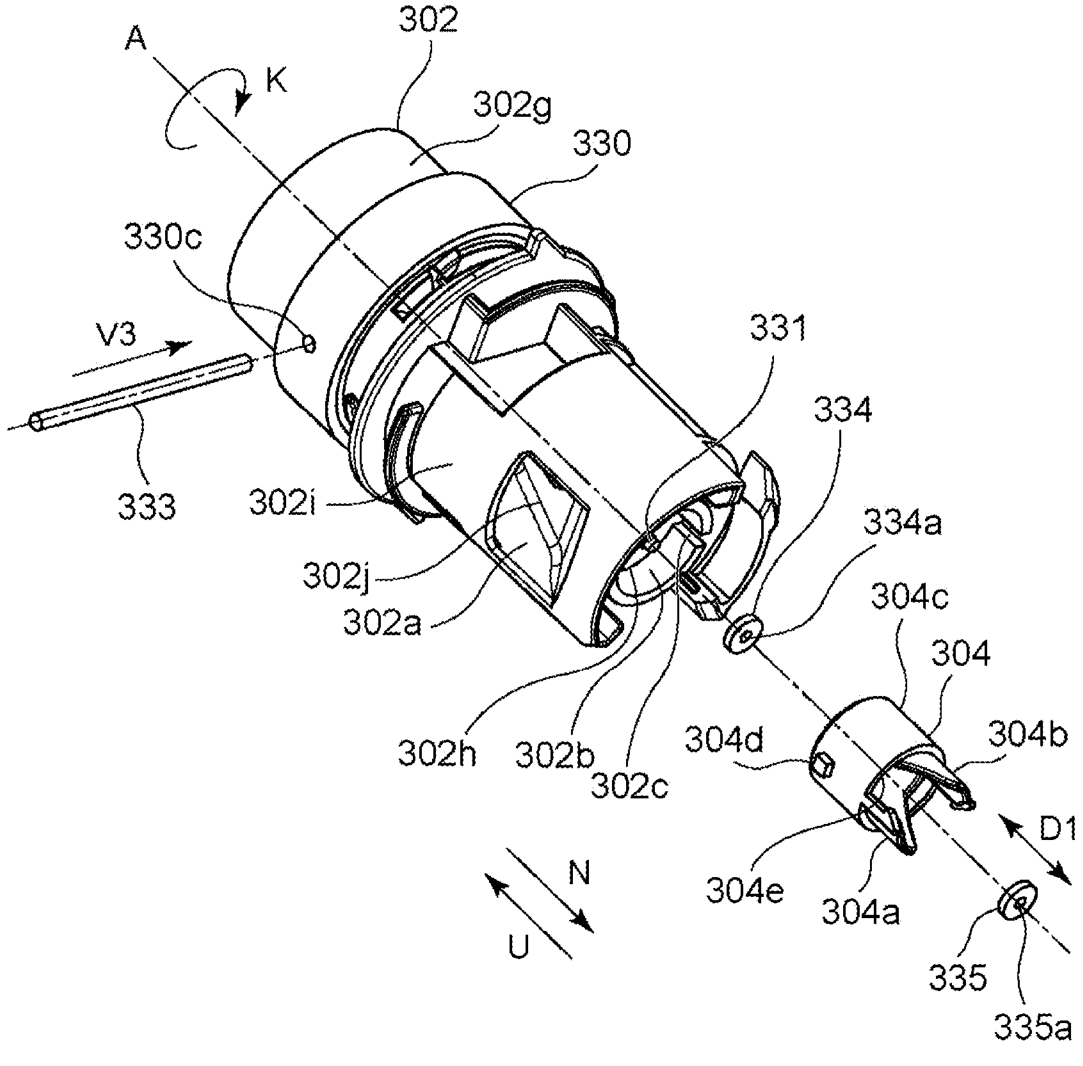
FIG. 105 is an exploded perspective view of the nozzle and the portions assembled to the nozzle in Embodiment 3.
Figure 106:
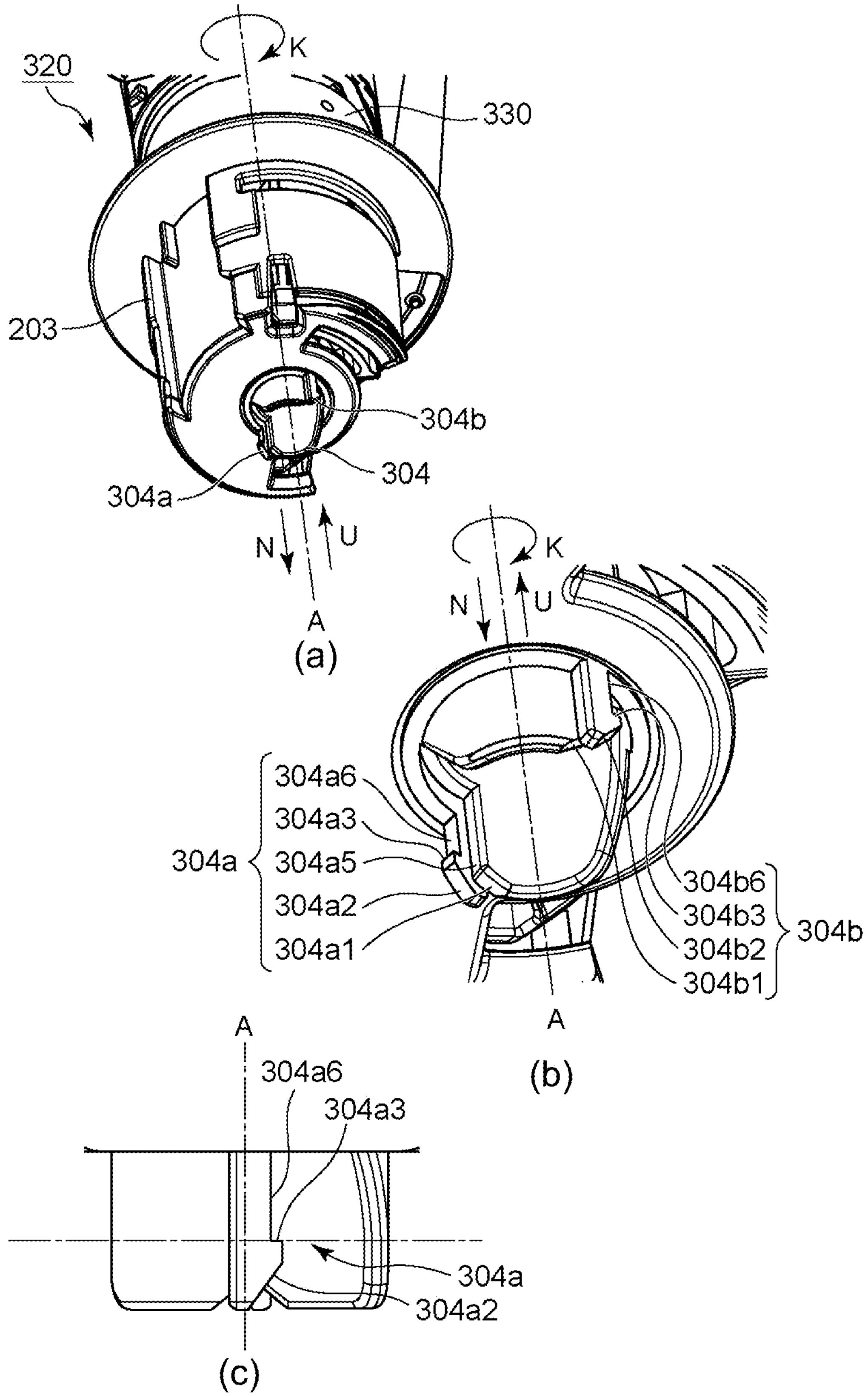
FIG. 106 is an illustration showing a detailed shape of the restriction releasing member in Embodiment 3.
Figure 107:
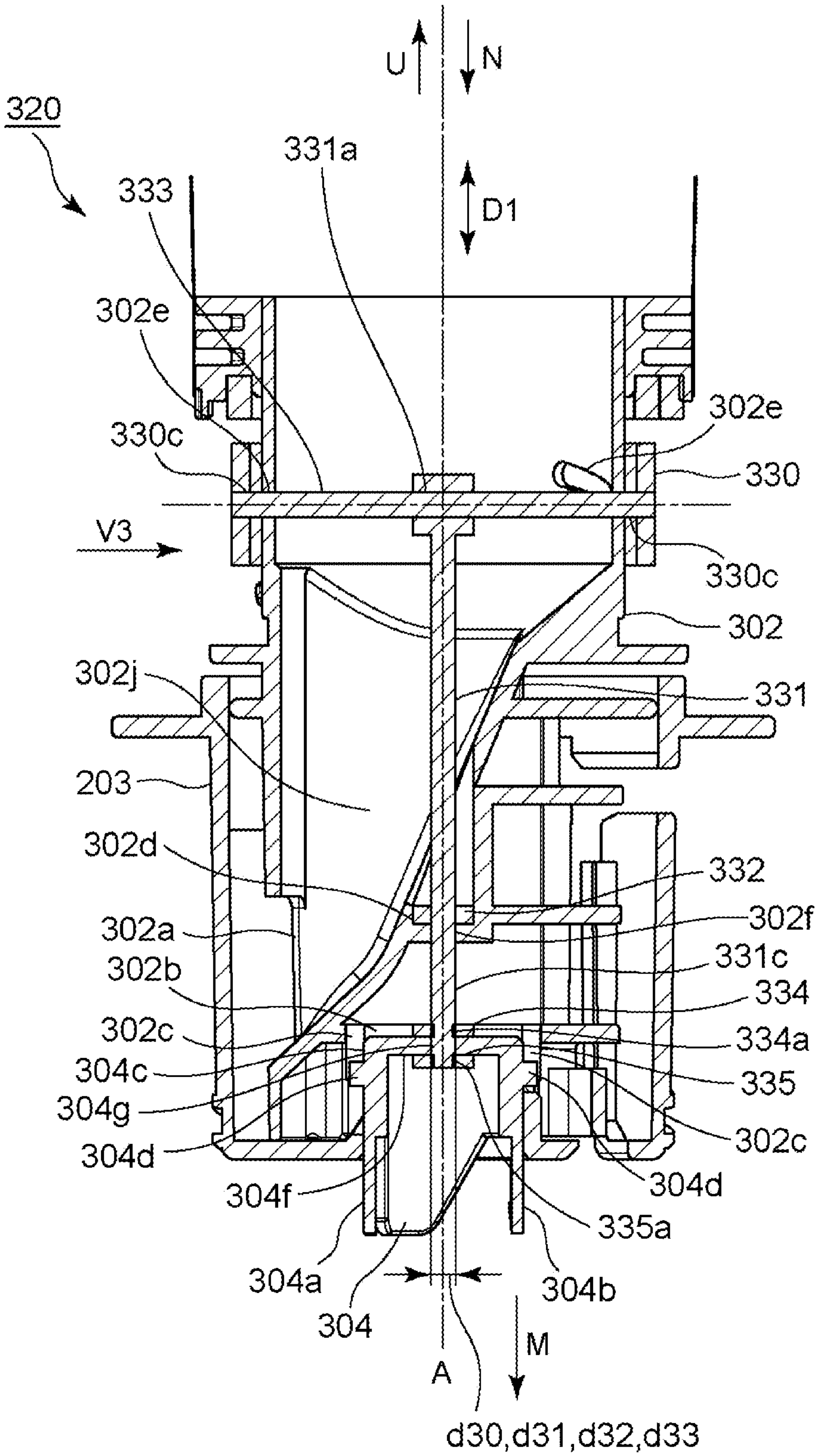
FIG. 107 is a sectional view of the toner pack according to Embodiment 3.

Referring to FIGS. 103 to 107, the overall structure of the toner pack will first be described. FIG. 103 is an illustration of an appearance of the toner pack 320. FIG. 104 is an exploded perspective view of the nozzle 302 and the portions assembled to the nozzle 302, and shows the parts assembled from the side of the first end portion (accommodation portion side) in the first direction D1. FIG. 105 is an exploded perspective view of the nozzle 302 and the portions assembled to the nozzle 302, and shows the parts assembled from the opposite side of the first end portion side (accommodation portion side) of the first direction D1. FIG. 106 is a perspective view illustrating detailed shape of the restriction releasing member 304. FIG. 107 is a sectional view of the toner pack 320 taken along a line X301-X301 shown in FIG. 103, that is, along the pin 333 at the time when the restriction releasing member 304 which will be described hereinafter projects in a direction of the arrow N.

As shown in FIG. 103, the toner pack 320 in this embodiment comprises, a nozzle 302 (discharging portion), a restriction releasing member 304, and an operating member 330, in addition to the accommodating portion 201 and the pack side shutter 203 which have the same shapes as those of Embodiment 2. Further, although the details will be described hereinafter, in order to operate the restriction releasing member 304 when the operating member 330 is operated, a shaft member 331, a shaft seal 332 (see FIG. 104), a pin 333, a shaft ring 334, and a shaft ring 335 (see FIG. 105). Hereinafter, these portions will be described in detail. In the following description, unless otherwise specified the toner pack 320 is oriented in a predetermined direction in which at least a part of the nozzle 302 is below the accommodating portion 201 and in which the rotational axis A faces the direction of gravity.

As shown in FIG. 104, the nozzle 302 has a substantially cylindrical shape centered on the rotational axis A. A hole portion 302*e* (guide groove) is provided in the cylinder 302*g* (guide portion) on the side (see FIG. 103) to be assembled with the accommodating portion 201 of the nozzle 302. The hole portion 302*e* has an elongated hole shape extended in such a direction as goes up (upward) in the direction of the arrow U (upward) of the rotational axis A direction as goes in the rotational direction K. Further, a pair of hole portions 302*e* are provided so as to provide 180-degree rotational symmetric arrangement about the rotational axis A of the nozzle 302.

As shown in FIG. 105, the nozzle 302 is provided with a cylindrical surface 302*i* (side surface) on the arrow N direction (downward) side of the cylinder 302*g*. An opening 302*a* (discharge opening) facing in the radial direction of the rotational axis A is provided in the cylindrical surface 302*i*. In addition, a passage 302*j* is provided as a space that passes through the inside of the nozzle 302 and is connected to the opening 302*a*. Further, an end surface 302*h* is on the arrow N direction (downward) side of the nozzle 302, is provided with a cylindrical support portion 302*b* projecting in the arrow N direction (downward). Furthermore, the cylindrical support portion 302*b* is provided with a pair of cut-away portions 302*c* so as to provide 180-degree rotational symmetric arrangement about the rotational axis A. As shown in FIG. 107, a cylindrical groove 302*d* centered on the rotational axis A is provided on a passage 302*j* of the nozzle 302. A hole portion 302*f* centered on the rotational axis A is provided on the end surface of the cylindrical groove 302*d* on the arrow N direction (downward) side.

As shown in FIG. 105, the restriction releasing member 304 has a substantially cylindrical shape centered on the rotational axis A. A restriction releasing member 304 is provided with a pair of projections 304*d* projecting in the radial direction of the rotational axis A from the cylindrical portion 304*c*. The pair of projections 304*d* are positioned so as to provide 180-degree rotationally symmetric arrangement with respect to the rotational axis A. The restriction releasing member 304 includes a first restriction releasing portion 304*a* (first projection) and a second restriction releasing portion 304*b* (second projection) projecting in the arrow N direction (downward) from the end portion 304*e* on the arrow N direction (downward) side. The first restriction releasing portion 304*a* and the second restriction releasing portion 304*b* are arranged so as to be 180-degree rotatable member symmetric arrangement with respect to the rotational axis A. Of the first restriction releasing portion 304*a* and the second restriction releasing portion 304*b* the one on the side closer to the opening 302*a* in the rotational direction K of the rotational axis A in a state in which the restriction releasing member 304 which will be described hereinafter is assembled to the nozzle 302 is referred to as the first restriction releasing portion 304*a*. As shown in part (a) of FIG. 106 and part (b) of FIG. 106, the first restriction releasing portion 304*a* comprises a first slope 304*a*1 (first inner engaging surface, first downward surface, first downward guide surface, first force applying surface, first push surface), second slope 304*a*2 (first outer engaging surface, second downward surface, second downward guide surface, second force applying surface, second push surface), flat surface 304*a*3 (second engagement surface, upward surface, upward engaging surface, upward push surface, upward force applying surface), a first abutment surface 304*a*5, and a second abutment surface 304*a*6. The first slope 304*a*1, the second slope 304*a*2, and the first abutment surface 304*a*5 have the same structures as the first slope 204*a*1, the second slope 204*a*2, and the abutment surface 204*a*5 in Embodiment 2, respectively, and therefore, the description thereof is omitted. As shown in part (c) of FIG. 106, the flat surface 304*a*3 is perpendicular to the rotational axis A. That is, when the toner pack 320 is oriented in a predetermined direction, the flat surface 304*a*3 extends in the horizontal direction perpendicular to the direction of gravity. The flat surface 304*a*3 is placed on the arrow U direction side (upward) of least a part of the second slope 304*a*2. The second abutment surface 304*a*6 is placed on the upstream side of the flat surface 304*a*3 in the rotational direction K, extends in the arrow U direction (upward), and faces the downstream side in the rotational direction K. Here, as described above, the second restriction releasing portion 304*b* has a shape which is 180-degree rotationally symmetric relative to the first restriction releasing portion 304*a* with respect to the rotational axis A, and therefore the description thereof is omitted. As shown in FIG. 107, the restriction releasing member 304 is provided with an end portion 304*f* at the end on the arrow U direction (upward direction) side. The end portion 304*f* is provided with a hole portion 304*g* centered on the rotational axis A.

As shown in FIG. 104, the operating member 330 has a substantially cylindrical shape centered on the rotational axis A. A substantially cylindrical sealing member 330*b* is provided inside the cylindrical portion 330*a* of the operating member 330. An elastic member such as urethane foam is used for the sealing member 330*b*. The operating member 330 is provided with a pair of hole portions 330*c* penetrating the cylindrical portion 330*a* and the sealing member 330*b* on the symmetric positions about the rotational axis A. The straight line connecting the centers of the pair of hole portions 330*c* is substantially perpendicular to the rotational axis A.

The shaft member 331 has an elongated cylindrical shape provided coaxially with the rotational axis A, and comprises a shaft portion 331*b* and a small diameter shaft portion 331*c* having a radius smaller than that of the shaft portion 331*b*. In addition, the small diameter shaft portion 331*c* is placed on a more downstream side in the N direction (lower side) than the shaft portion 331*b*. The shaft portion 331*b* is provided with a through hole 331*a* substantially perpendicular to the rotational axis A.

The shaft seal 332 has a substantially cylindrical shape coaxial with the rotational axis A, and comprises an elastic member such as urethane foam.

As shown in FIG. 105, the pin 333 has a substantially elongated cylindrical shape.

The shaft ring 334 and the shaft ring 335 have substantially disk shapes centered on the rotational axis A, and provided with holes 334*a* and 335*a* in the central portions thereof, respectively.

(Assembling of Toner Pack)

Next, referring to FIGS. 104, 105, and 107, the assembly of the toner pack 320 according to this embodiment will be described.

First, as shown in FIG. 104, the operating member 330, the shaft seal 332, and the shaft member 331 are assembled to the nozzle 302 in this order from the upstream side in the arrow N direction. The operating member 330 is inserted into the cylinder 302*g* of the nozzle 302 until the hole portion 330*c* becomes coincident with the hole portion 302*e*. At this time, the sealing member 330*b* of the operating member 330 is brought into close contact with the hole portion 302*e* so as to cover the hole portion 302*e*. As shown in FIG. 107, the shaft seal 332 is assembled to the cylindrical groove 302*d* of the nozzle 302. For the shaft member 331, the small diameter shaft portion 331*c* is inserted into the shaft seal 332 and into the hole portion 302*f* of the nozzle 302. The small diameter shaft portion 331*c* and the hole portion 302*f* are supported so as to be slidable in the rotational direction K and in the rotational axis A direction.

Next, as shown in FIG. 105, the pin 333 is assembled to the operating member 330 and the nozzle 302 in the direction of an arrow V3, and then the shaft ring 334, the restriction releasing member 304, and the shaft ring 335 are mounted to the shaft member 331 in the direction of arrow U (upward). The pin 333 is inserted from one hole portion 330*c* of the operating member 330, and as shown in FIG. 107, and it is inserted in the order of, one hole portion 330*c*, one hole portion 302*e*, through hole 331*a*, the other hole portion 302*e*, and the other hole portion 330*c*. The pin 333 is supported slidable relative to the pair of hole portions 302*e* and the through hole 331*a*. The pin 333 and the pair of hole portions 330*c* are fixed in the direction of arrow V3 by adhesion or clamping. The shaft ring 334 is fitted on the small diameter shaft portion 331*c* at the hole 334*a*, and is fixed at a position away from the free end of the small diameter shaft portion 331*c* in the arrow N direction (downward) by the amount of the thickness of the shaft ring 335 plus the end portion 304*f* of the restriction releasing member 304. For the shaft member 331, the shaft diameter d30 in the region fixed to the shaft ring 334 is selected slightly larger than the diameter d31 of the hole 334*a* of the shaft ring 334 so that the shaft ring 334 can be press-fitted. The restriction releasing member 304 is fitted on the small diameter shaft portion 331*c* at the hole portion 304*g* until it abuts to the shaft ring 334, and the hole portion 304*g* and the small diameter shaft portion 331*c* are slidable relative to each other. Further, the restriction releasing member 304 is mounted to the nozzle 302 so that the cylindrical portion 304*c* is inserted into the cylindrical support portion 302*b* and the projection 304*d* is inserted into the cut-away portion 302*c*. By the engagement between the projection 304*d* of the restriction releasing member 304 and the cut-away portion 302*c*, the restriction releasing member 304 is constrained from moving around the rotational axis A relative to the nozzle 302. Therefore, the restriction releasing member 304 is supported movably only in the direction of the rotational axis A relative to the nozzle 302. The shaft ring 335 is fitted on the small diameter shaft portion 331*c* at the hole 335*a* until it abuts to the end portion 304*f* of the restriction releasing member 304, and it is fixed to the small diameter shaft portion 331*c*. The shaft diameter d30 of the region fixed to the shaft ring 334 of the shaft member 331 is selected to be slightly larger than the diameter d31 of the hole 334*a* of the shaft ring 334 so that it can be press-fitted with the shaft ring 334. Further, the shaft diameter d32 of the region, fixed to the shaft ring 335, of the shaft member 331 is selected to be slightly larger than the diameter d33 of the hole 335*a* of the shaft ring 335 so that it can be press-fitted with the shaft ring 335.

Thereafter, the assembling of the toner pack 320 is completed by assembling the pack side shutter 203 or the like to the nozzle 302.

(Operation of Toner Pack)

Figure 108:
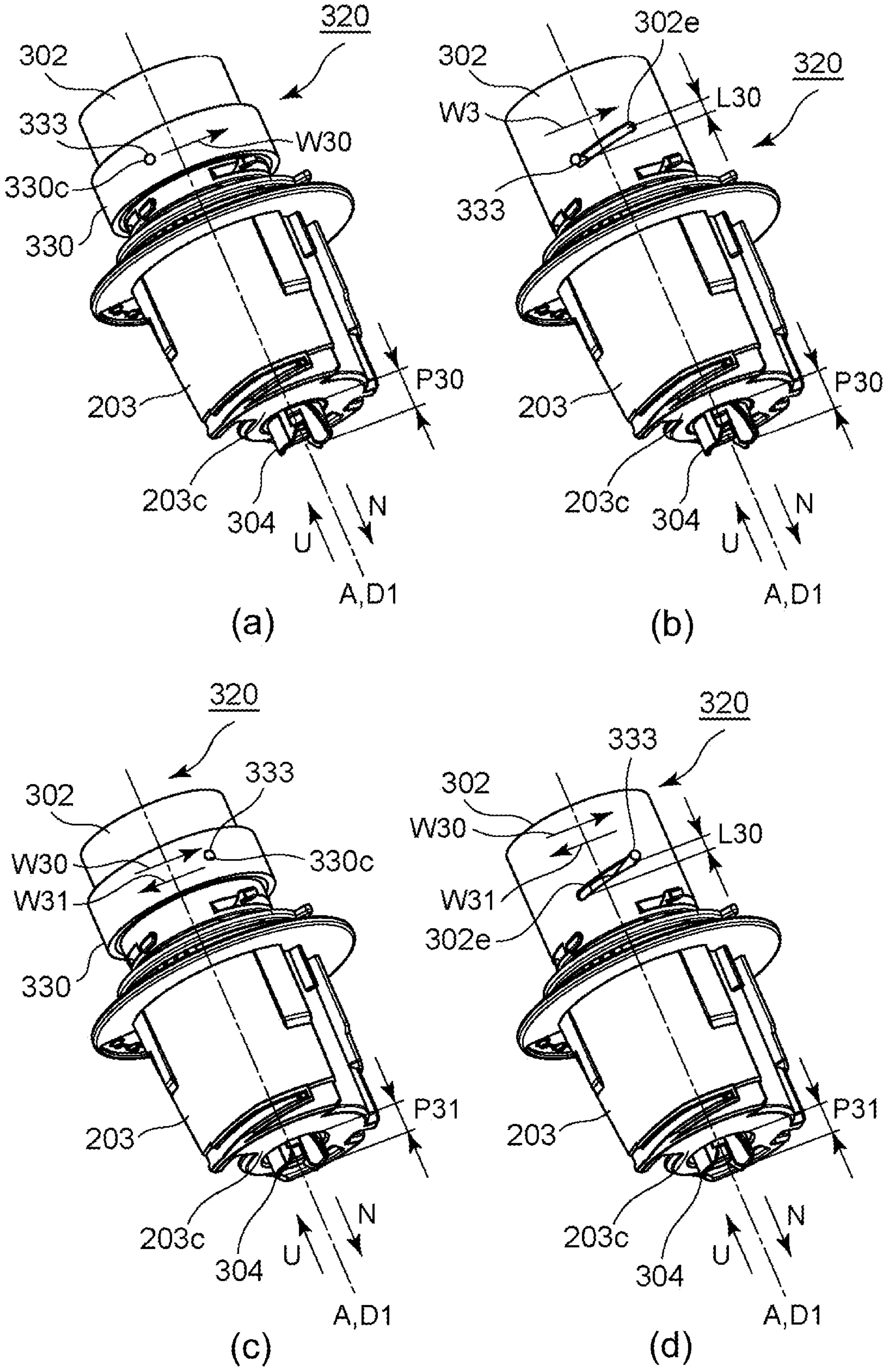
FIG. 108 is an illustration showing a process of operating the toner pack in Embodiment 3.
Figure 109:
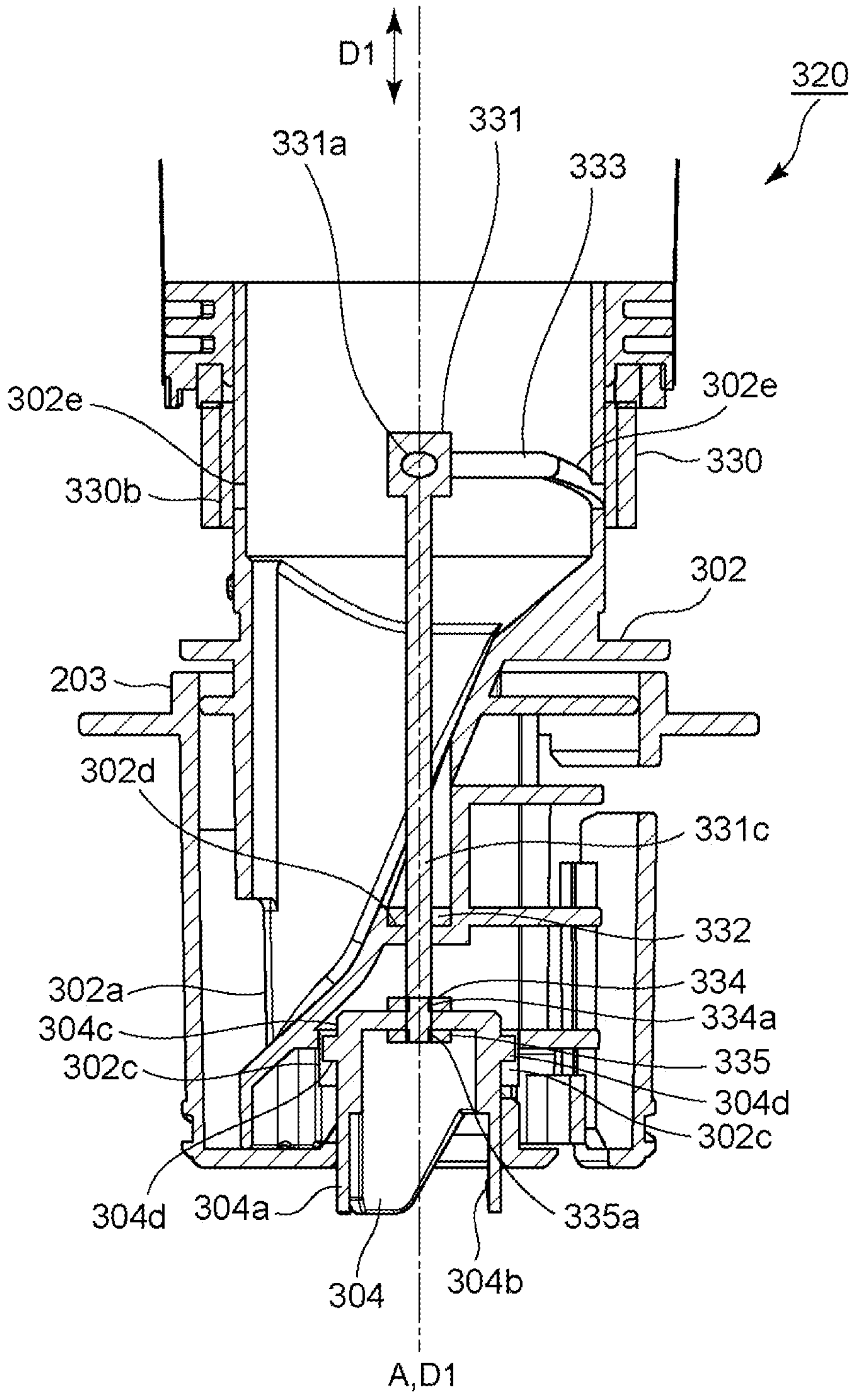
FIG. 109 is a sectional view of the toner pack according to Embodiment 3.

Next, referring to FIGS. 107 to 109, the operation of the toner pack 320 when the operating member 330 is operated will be described. FIG. 108 is a perspective view of components placed downstream, in the N direction (downward) of the arrow N, of the accommodating portion 201. Part (a) of FIG. 108 and part (b) of FIG. 108 show a state in which the pin 333 is at the lower end of the hole portion 302*e* in the arrow N direction (downward). Part (a) of FIG. 108 shows a state in which the operating member 330 is at the shown position, and part (b) of FIG. 108 shows a state in which the operating member 330 is not shown. Part (c) of FIG. 108 and part (d) of FIG. 108 show a state in which the pin 333 is placed at the upper end of the hole portion 302*e* in the arrow U direction (upward direction). Part (c) of FIG. 108 shows a state in which the operating member 330 is at the shown position, and part (d) of FIG. 108 shows a state in which the operating member 330 is not shown. FIG. 109 is a sectional view of the toner pack 320 in a state in which the pin 333 is at the upper end of the hole portion 302*e* in the arrow U direction (upward direction). Further, FIG. 109 is the sectional view taken along the same line as in FIG. 107 (see FIGS. 103 and X320-X320).

As shown in part (a) of FIG. 108, a case where the operating member 330 is rotated in the direction of an arrow W30 will be described. The pin 333 is fixed to the hole portion 330*c* of the operating member 330, and therefore, when the operating member 330 is rotated in the direction of the arrow W30, the pin 333 also rotates in the direction of the arrow W30. At this time, the pin 333 rotates along the shape of the hole portion 302*e* of the nozzle 302 as shown in part (b) of FIG. 108, so that the pin 333 moves in the direction of the arrow U (upward). At this time, the operating member 330 also moves in interrelation with the movement of the pin 333 in the arrow U direction (upward). Further, as shown in FIG. 107, since the pin 333 is inserted into the through hole 331*a*, the shaft member 331 rises in interrelation with the pin 333. Further, since the restriction releasing member 304 is fixed to the shaft member 331 in the rotational axis A direction by way of the shaft ring 335, it moves in interrelation with the shaft member. Therefore, when the operating member 330 is rotated in the direction of the arrow W30 from the state shown in part (a) of FIG. 108 and part (b) of FIG. 108, and the restriction releasing member 304 is moved by the arrow U direction in interrelation with the movement of the pin 333 in the direction of the arrow U, with the result of the state shown in part (c) of FIG. 108 and part (d) of FIG. 108. Here, the amount of projection of the restriction releasing member 304 from the pack-side shutter 203 in a state where the restriction releasing member 304 is placed at the lower position as in part (a) of FIG. 108 and part (b) of FIG. 108 is referred to as P30. Further, in the direction of the rotational axis A, a distance which the pin 333 moves in the direction of the arrow U by the operation of the operating member 330 is referred to as the distance L30.

When the operating member 330 is rotated from the state of part (a) of FIG. 108 to the state of part (c) of FIG. 108 in the W30 direction, the pin 333 moves to the upper end of the hole portion 302*e* as shown in part (d) of FIG. 108. Since the pin 333 moves in the arrow U direction (upward) by the distance L30, the restriction releasing member 304 also moves in the arrow U direction (upward) by L30 in interrelation therewith (projection amount P30 of the restriction releasing member 304 is reduced by the distance L30 to become the projection amount P31). In addition, as shown in FIG. 109, the structure is such that even after the operating member 330 is moved in the direction of the arrow U (upward), the sealing member 330*b* covers the entire hole portion 302*e* and is in close contact with the operating member 330.

(Mounting and Dismounting of Toner Pack)

Figure 110:
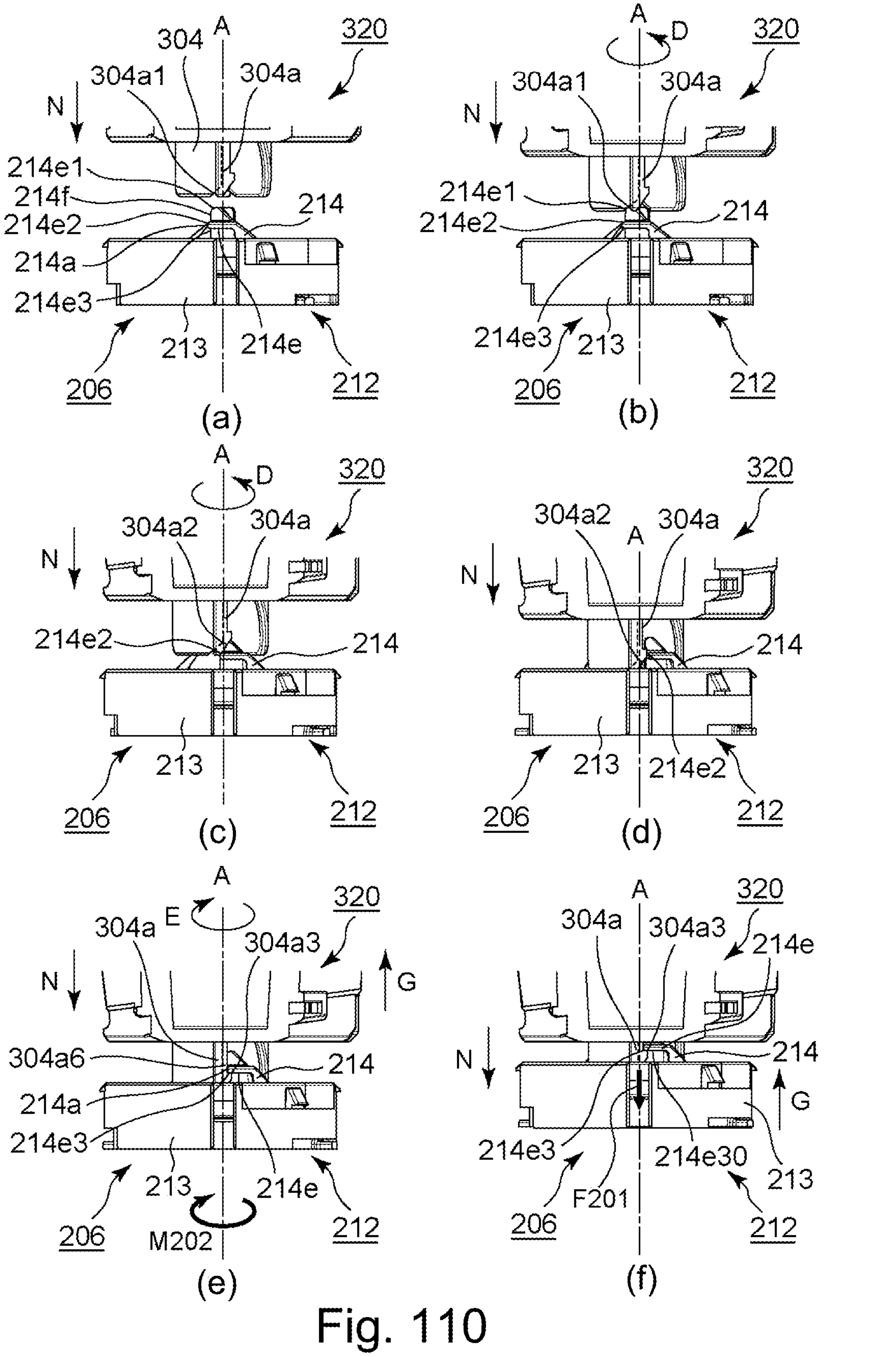
FIG. 110 is illustrations showing a process in which the rotation restriction of the shutter on the apparatus-side by the rotation restriction mechanism of the mounting portion is released by mounting the toner pack according to Embodiment 3.
Figure 111:
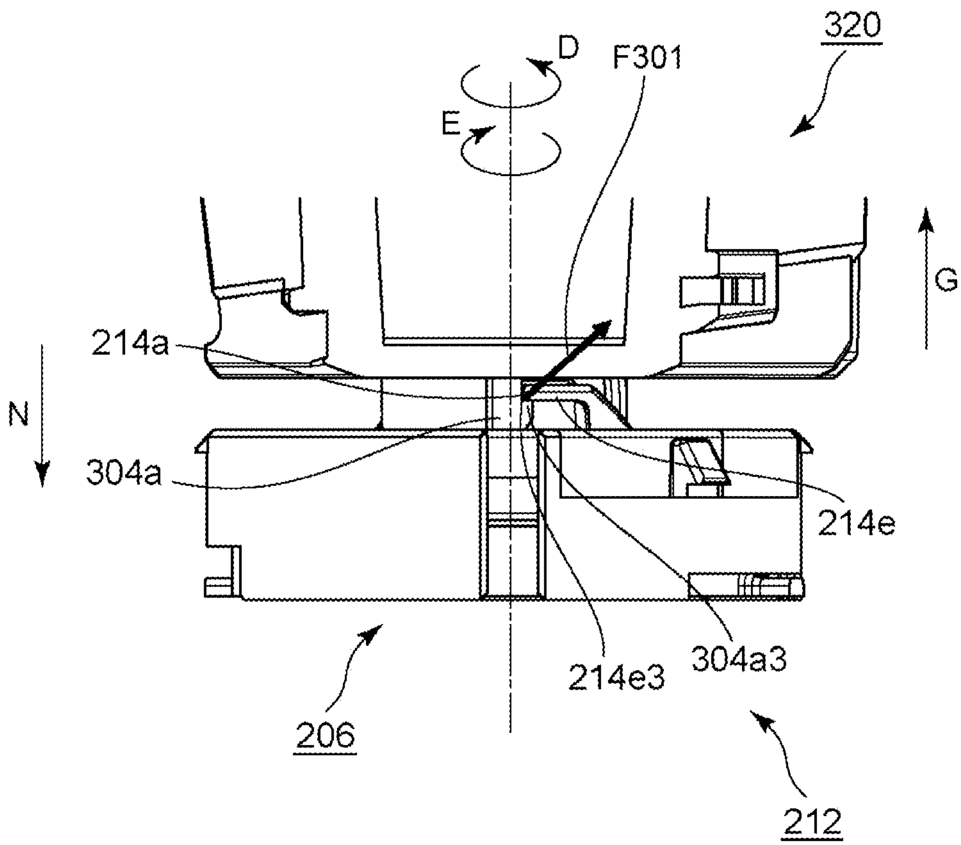
FIG. 111 is an illustration showing a process in which the rotation restriction of the shutter on the apparatus-side by the rotation restriction mechanism of the mounting portion is released by mounting the toner pack in Embodiment 3.

Next, referring to FIGS. 110 and 111, mounting/dismounting of the toner pack 320 to/from the mounting portion 206 will be described. As for the mounting/dismounting operation, only the operation different from that of Embodiment 2 will be described. FIG. 110 is a sectional view illustrating a process in which the restriction releasing member 304 releases the rotation restricting mechanism 212 when the toner pack 320 is mounted to the mounting portion 206. For the sake of better illustration, the rotation restricting mechanism 212 is shown only by the restricting member 213 and the releasing member 214. The states of part (a) of FIG. 110 to part (f) of FIG. 110 will be described hereinafter. FIG. 111 is a sectional view illustrating a state when the toner pack 320 is being removed from the mounting portion 206.

A mechanism for releasing the rotation restricting mechanism 212 of the mounting portion 206 by mounting the toner pack 320 on the mounting portion 206 will be described. This mechanism has the same operation up to the first step of Embodiment 2. Part (a) of FIG. 110 shows a state before the first restriction releasing portion 304*a* and the releasing claw 214*e* of the releasing member 214 come into contact with each other. When the toner pack 320 is moved in the direction of arrow N from this state, the first slope 304*a*1 of the first restriction releasing portion 304*a* and the first guided surface 214*e*1 of the releasing claw 214*e* come into contact with each other as shown in part (b) of FIG. 110. It will be in the state of When the toner pack 320 is further moved in the direction of the arrow N from this position, the first guided surface 214*e*1 receives the force while being guided by the first slope 304*a*1, so that the releasing member 214 is rotated in the rotational direction D. The releasing member 214 is rotated in the rotational direction D until the first guided surface 214*e*1 passes the downstream (in the rotational direction D) end of the first slope 304*a*1. When the toner pack 320 is further moved in the direction of arrow N from this position, as shown in part (c) of FIG. 110, the second slope 304*a*2 of the first restriction releasing portion 304*a* and the second guided surface 214*e*2 of the releasing claw 214*e* are brought into contact with each other. When the toner pack 320 is further moved in the direction of the arrow N from this position, the second guided surface 214*e*2 receives the force while being guided by the second slope 304*a*2 as shown in part (d) of FIG. 110, so that the releasing member 214 is rotated in the direction D. The releasing member 214 is rotated in the rotational direction D until the second guided surface 214*e*2 passes the downstream (in the rotational direction D) end of the second slope 304*a*2. The steps up to this point are the same as in Embodiment 2. Since the portion related to the mechanics by the releasing spring 216 (not shown) and so on is the same as that of Embodiment 2, the description thereof is omitted.

When the toner pack 320 is further moved in the direction of arrow N after the first step, the flat surface 304*a*3 passes the third guided surface 214*e*3 of the releasing claw 214*e* in the direction of arrow N. At this time, as shown in part (e) of FIG. 110, the releasing claw 214*e* is rotated in the rotational direction E by the moment M202 (urging force) generated by the releasing spring 216 (see FIG. 50). Then, the contact surface 214*a* of the releasing claw 214*e* abuts to the second abutment surface 304*a*6 of the first restriction releasing portion 304*a*. The mounting of the toner pack 320 on the mounting portion 206 in the direction of the arrow N is completed. In this state, the restricting member 213 is not moved in the arrow G direction (upward) together with the releasing member 214, so that the rotation restriction by the rotation restricting mechanism 212 of the apparatus-side shutter 209 is not released. Therefore, it is necessary to move the releasing member 214 in the arrow G direction. After the mounting of the toner pack 320 on the mounting portion 206 in the direction of arrow N is completed, the operating member 330 is manually rotated in the direction of arrow W30 as shown in FIG. 108. By doing so, as described above, the restriction releasing member 304 moves in the direction of arrow U (upward). That is, the first restriction releasing portion 304*a* of the restriction releasing member 304 also moves in the direction of the arrow U (upward). By this, as shown in part (f) of FIG. 110, the end surface 214*e*30 in the arrow N direction side of the releasing claw 214*e* is pushed and moved by, the flat surface 304*a*3 of the first restriction releasing portion 304*a* in the arrow G direction (upward). Therefore, the restricting member 213 can be moved in the arrow G direction (upward) together with the releasing member 214, so that the rotation restriction by the rotation restricting mechanism 212 of the apparatus-side shutter 209 can be released. That is, the flat surface 304*a*3 of the first restriction releasing portion 304*a* has a function of pushing (force applying) the surface 214*e*30 of the releasing claw 214*e* so that the releasing member 214 moves upward. The first restriction releasing portion 304*a* has a function of a hook for hooking the releasing claw 214*e* and lifting the releasing member 214 upward.

With the above-described operations, the toner pack 320 becomes in the mounting complete state. The flat surface 304*a*3, which is a surface substantially perpendicular to the rotational axis A, is capable of maintaining the releasing member 214 on the arrow G direction side against the urging force F201 by the restricting spring 215 (see FIG. 49) and the force in the arrow N direction such as gravity.

Finally, the removal of the toner pack 320 from the mounting portion 206 will be described. As shown in FIG. 111, the toner pack 320 is removed by moving the toner pack 320 in the direction of arrow G. At this time, since the releasing claw 214*e* is engaged with the flat surface 304*a*3 of the first restriction releasing portion 304*a*, interference occurs when the toner pack 320 is removed. When the toner pack 320 is moved in the direction of the arrow G by applying a larger force from this position, partial deformation occurs in the first restriction releasing portion 304*a* and the releasing claw 214*e*. Due to the partial deformation, the contact surface of the releasing claw 214*e* with the flat surface 304*a*3 is inclined in the direction of arrow G (upward) toward the downstream side in the rotational direction E. By the inclination of the contact surface of the releasing claw 214*e*, a release force F301 is produced for the third guided surface 214*e*3. Then, the releasing member 214 is rotated in the direction of arrow D by the release force F301, and the contact surface 214*a* passes by the end portion of the flat surface 304*a*3 on the rotational direction D side. The releasing claw 214*e* and the flat surface 304*a*3 are disengaged from each other, and therefore, the toner pack 320 becomes movable in the direction of arrow G (upward), so that the toner pack 320 can be removed from the mounting portion 206.

As described above, in the toner pack in this embodiment, the surface of the restriction releasing portion facing the first end side (accommodation portion side) in the first direction D1 is a surface substantially perpendicular to the rotational axis A. Also in this case, the rotation restriction by the rotation restricting mechanism 212 can be released by providing a structure for moving the restriction releasing portion upward.

Modified Example 1

Figure 112:
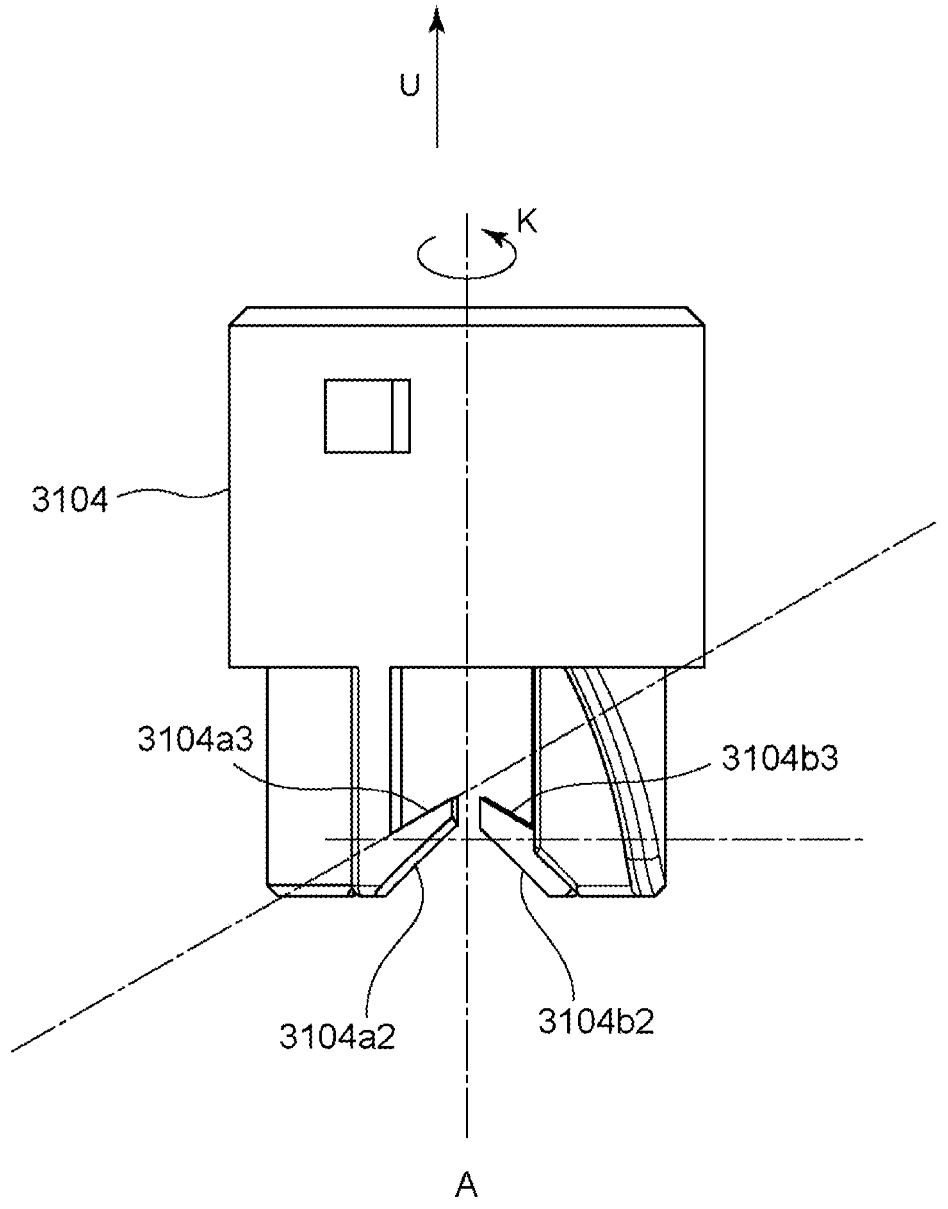
FIG. 112 is an illustration showing a detailed shape of the restriction releasing member according to Modified Example 1 of Embodiment 3.

In this embodiment, the flat surface 304*a*3 is structured to be substantially perpendicular to the rotational axis A, but as shown in FIG. 112, the surface 304*a*3 may have a structure of an inclined surface 3104*a*3 inclined with respect to the rotational axis A.

The inclined surface 3104*a*3 (second engaging surface, upward engaging surface, upward engaging surface, upward push surface, upward force applying surface) of the restriction releasing member 3104 is a surface extending so as to goes up in the arrow U direction (upward) as goes in the rotational direction K (first rotational direction) about the rotational axis A (central axis), and at least a part of the inclined surface 3104*a*3 is located on the arrow U direction side (upward) of at least a part of the second slope 304*a*2. In the this modified example, the same structure as that of the basic embodiment of this modified example is used except for the point that the flat surface 304*a*3 of the basic embodiment is replaced with the inclined surface 3104*a*3, and therefore other description will be omitted. Further, in the modified example as well, the rotation restriction by the rotation restricting mechanism 212 can be released as in the basic embodiment of this modified example.

Modified Example 2

In this embodiment, the first slope 304*a*1 and the second slope 304*a*2 of the first restriction releasing portion 304*a* are different slopes, and the second restriction releasing portion 304*b* has the same structure. However, as in Modified Example 3 of Embodiment 2, the two slopes may have smoothly continuous surfaces as in the restriction releasing member 3204 of the toner pack 3220 shown in FIG. 113.

Figure 113:
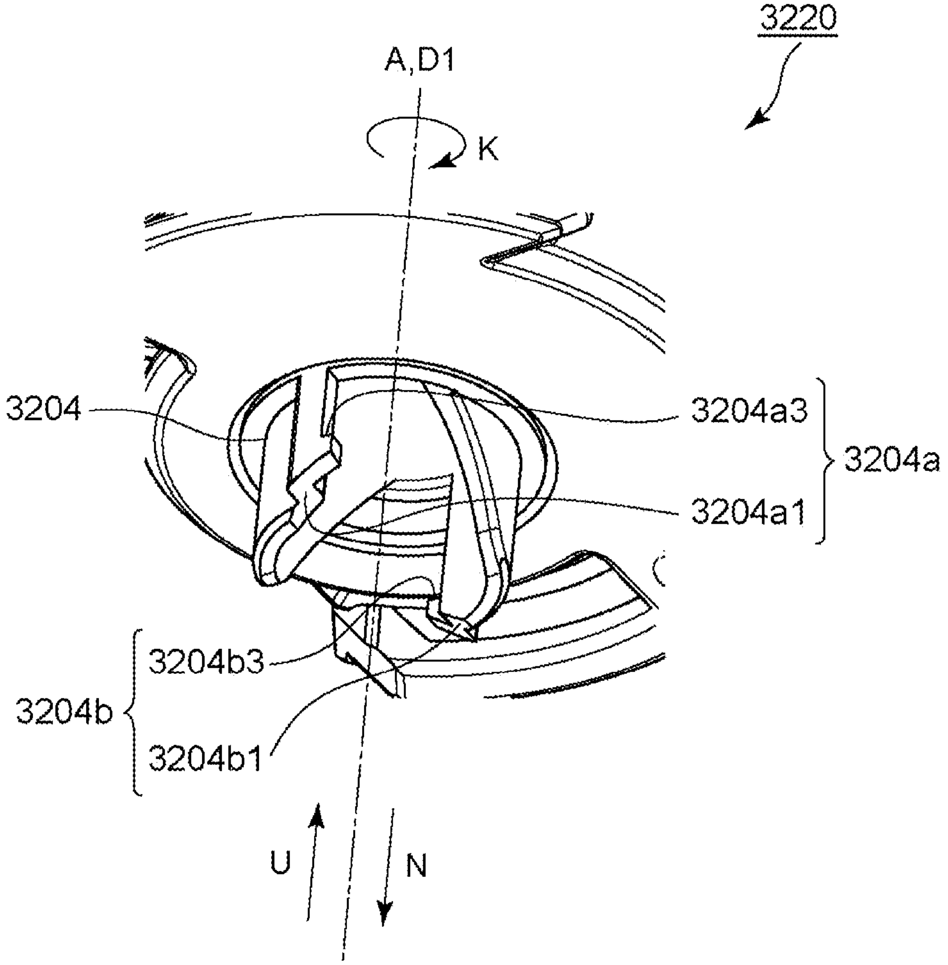
FIG. 113 is an illustration showing a detailed shape of the restriction releasing member in Modified Example 2 of Embodiment 3.

As shown in FIG. 113, the restriction releasing member 3204 includes a first restriction releasing portion 3204*a* (first projection) and a second restriction releasing portion 3204*b* (second projection) which are symmetric with each other with respect to the rotational axis A (central axis). The first restriction releasing portion 3204*a* is provided with a first slope 3204*a*1, and the first slope 3204*a*1 is structured in the same manner as the first slope 2304*a*1 of Modified Example 3 of Embodiment 2. In addition, the first restriction releasing portion 3204*a* is provided with a flat surface 3204*a*3 (second engaging surface, upward engaging surface, upward engaging surface, upward push surface), and the flat surface 3204*a*3 is structured in the same manner as the flat surface 304*a*3 of the basic embodiment of this modified example. Similarly, the second restriction releasing portion 3204*b* is also provided with a first slope 3204*b*1 and a flat surface 3204*b*3.

Also in this case, the rotation restriction of the apparatus-side shutter 209 by the rotation restricting mechanism 212 can be released.

Embodiment 4

Next, referring to FIGS. 114 to 126, Embodiment 4 will be described in the following. In this embodiment, the structure of the discharge opening is different from that in Embodiment 2. In above-described Embodiment 2, the discharge opening faces the outside of the radial direction r of the imaginary circle VC centered on the rotational axis A, whereas in this embodiment, the discharge opening faces in the direction of the rotational axis A. The nozzle of this embodiment is provided with a movable passage including a discharge opening facing in the direction of the rotational axis A. The movable passage is structured to be movable between a first position stored in the nozzle and a second position projecting from the nozzle. The same points as in the above-described embodiments will be omitted. In particular, of the elements disclosed in this embodiment, those corresponding to the members described in Embodiment 2 are assigned the same names as those of the members in Embodiment 2, and only the points different from those of Embodiment 2 will be described.

(Toner Pack Structure)

Figure 114:
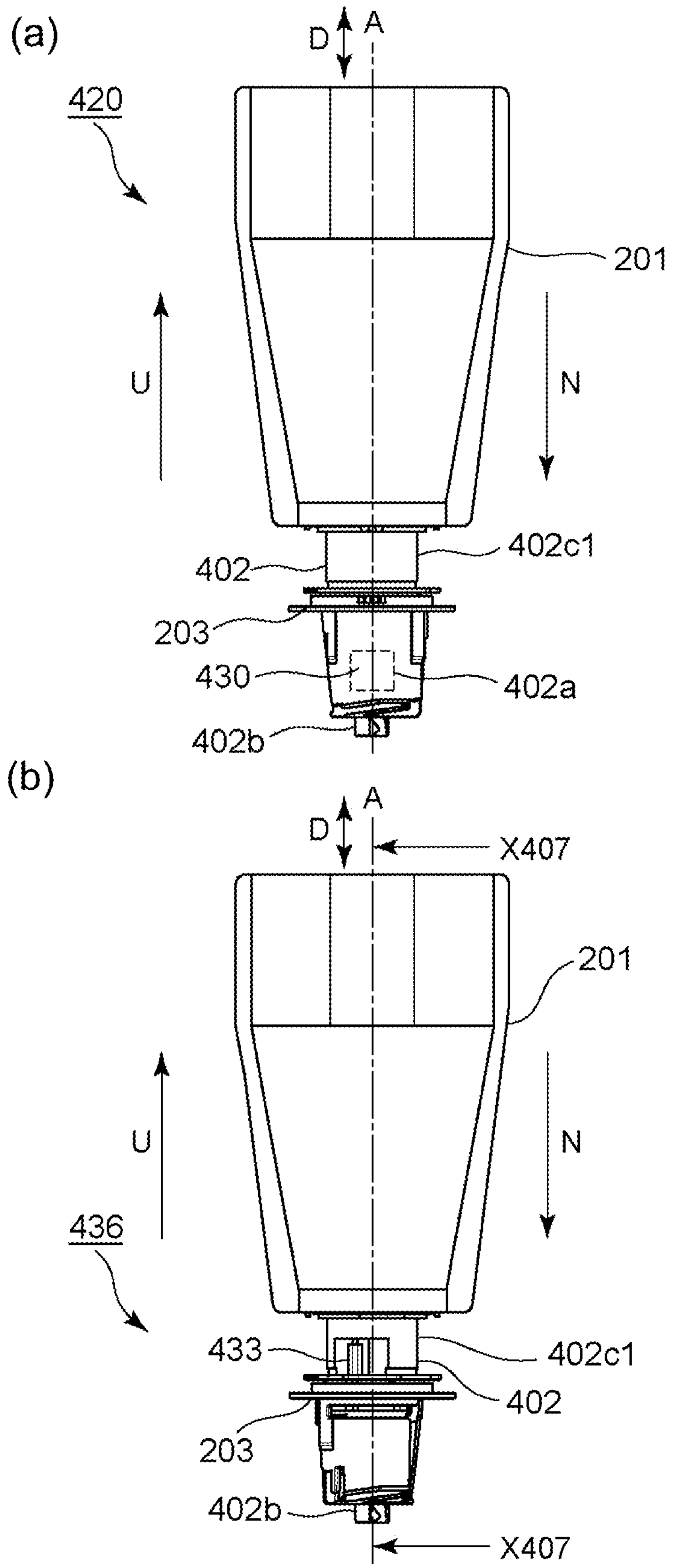
FIG. 114 is an illustration showing an entire toner pack according to Embodiment 4.
Figure 115:
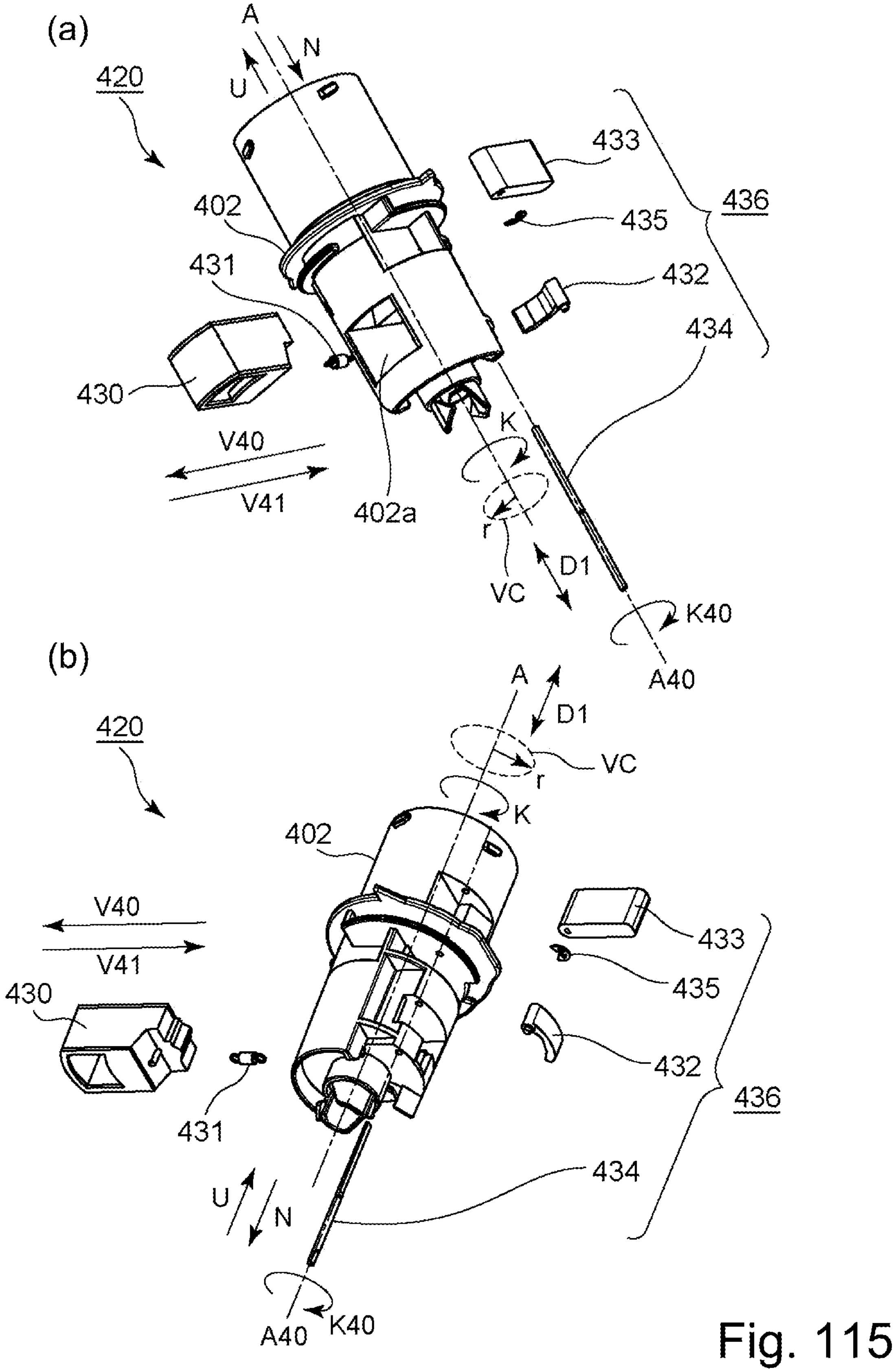
FIG. 115 is an exploded perspective view of a nozzle and the portions assembled to the nozzle in Embodiment 4.
Figure 116:
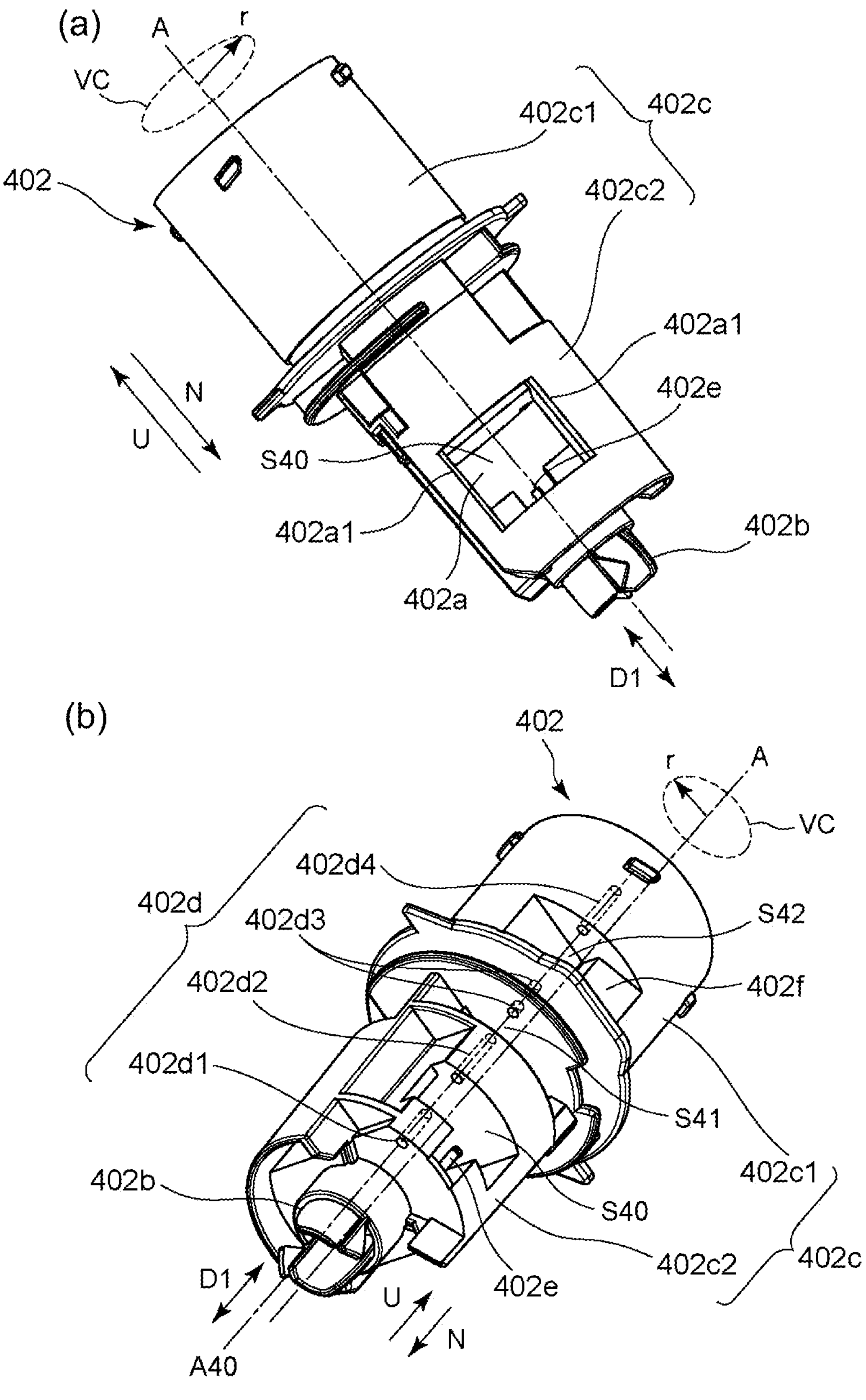
FIG. 116 is a perspective view of the nozzle in Embodiment 4.
Figure 117:
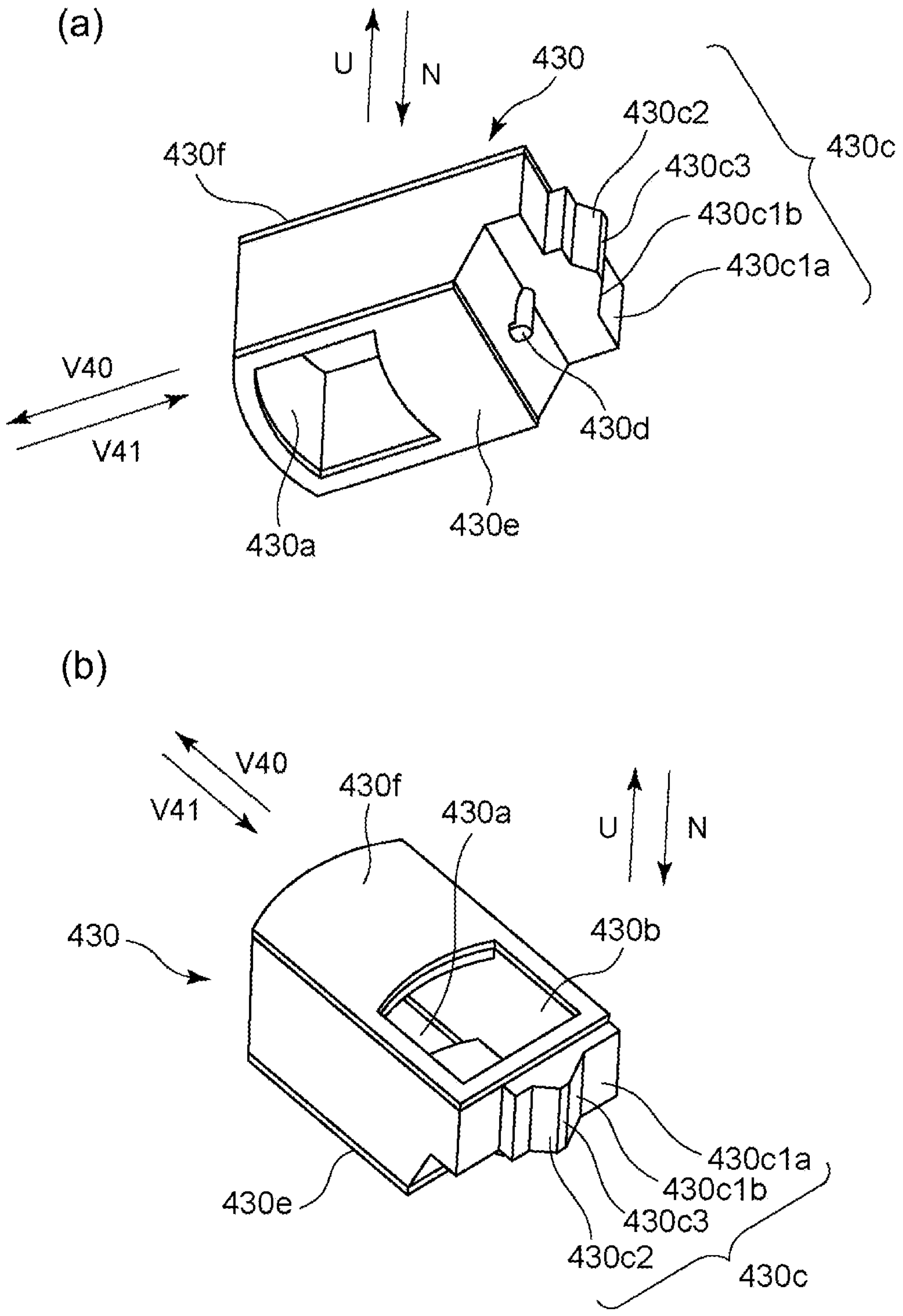
FIG. 117 is a perspective view of a movement path in Embodiment 4.
Figure 118:
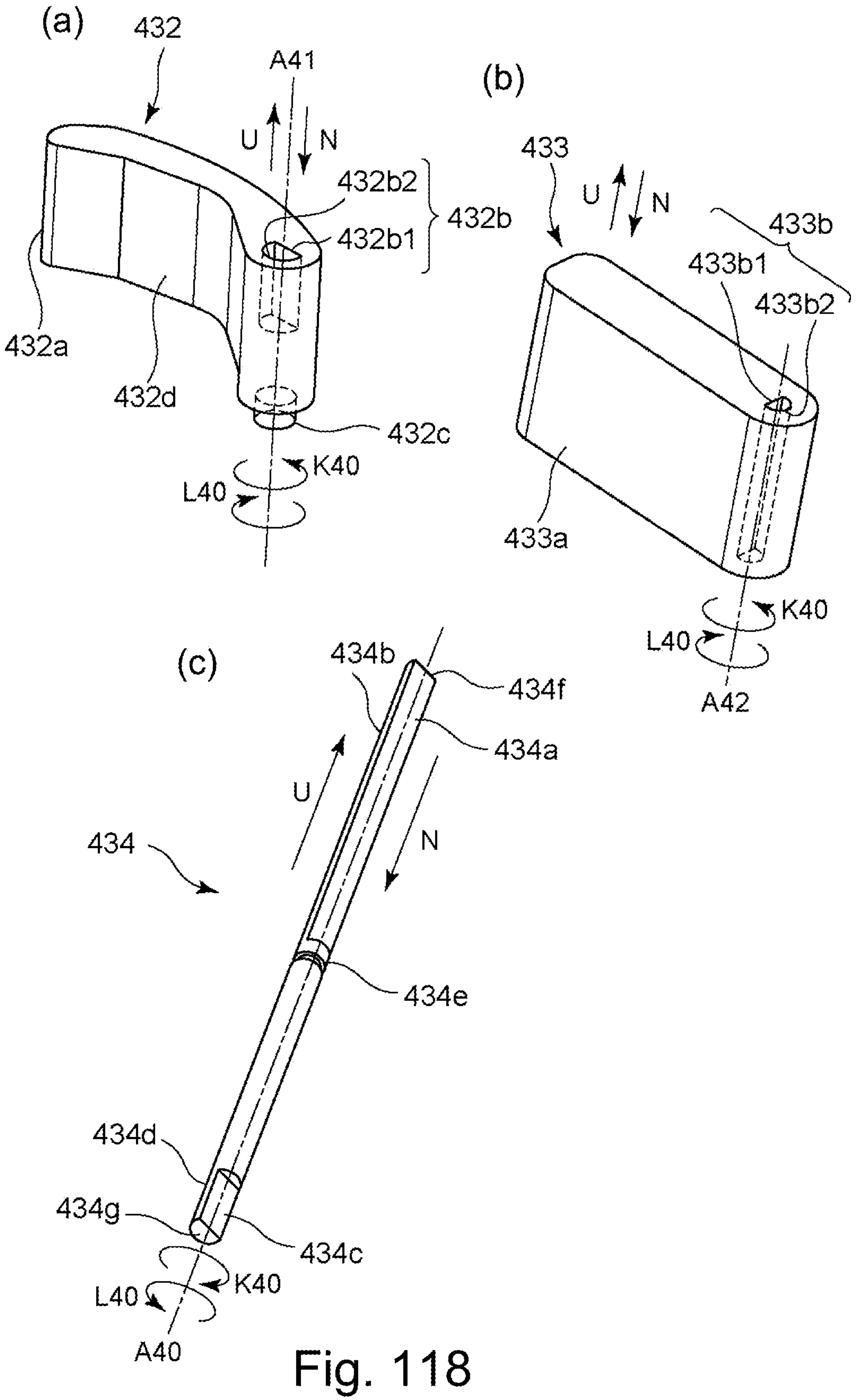
FIG. 118 is a perspective view of a cam member, an operating member, and a shaft member in Embodiment 4.

Referring to FIGS. 114 and 115 to 118, the structure of the toner pack in this embodiment will be described. FIG. 114 shows the appearance of the toner pack 420, and is a view as seen in a direction perpendicular to the first direction D1, part (a) of FIG. 114 is a view as seen from the opening 402*a* side of the nozzle 402, and part (b) of FIG. 114 is a view as seen from the side opposite to the opening 402*a*. FIG. 115 is an exploded perspective view of the toner pack 420, and is a view as seen from the second end side (nozzle side) of the first direction D1, part (a) of FIG. 115 is a view as seen from the opening 402*a* side of the nozzle 402, and part (b) of FIG. 115 is a view as seen from the side opposite to the opening 402*a*. The accommodating portion 201 and the pack-side shutter 203 are not shown. FIG. 116 is an illustration of details of the nozzle 402. FIG. 117 is an illustration of details of a movable passage 430. Part (a) of FIG. 118 is a detailed illustration of a cam member 432, part (b) of FIG. 118 is a detailed illustration of an operating member 433, and part (c) of FIG. 118 is a details illustration of a shaft member 434.

As shown in part (a) of FIG. 114, the toner pack 420 in this embodiment includes, an accommodating portion 201, a pack side shutter 203, a nozzle 402, a movable passage 430, which have the same shapes of the corresponding elements of embodiment 2, respectively, and as shown in 114 (*b*), it comprises an operation mechanism 436 including an operating member 433 exposed to the outside.

As shown in part (a) of FIG. 115 and part (b) of FIG. 115, the nozzle 402 is provided with a movable passage 430, a tension spring 431, and an operation mechanism 436. In this embodiment, the nozzle 402, the movable passage 430, the tension spring 431, and the operation mechanism 436 constitute the discharge portion. In addition, the operation mechanism 436 comprises a cam member 432, an operating member 433, a shaft member 434, and an E-shaped retaining ring 435. The operation mechanism 436 is provided on the rotational axis A40 which is parallel to the rotational axis A (central axis) at a different position. The rotational direction K40 about the rotational axis A40 is a clockwise direction as viewed from the side (nozzle side) of the second end portion of the first direction D1. Further, as to the moving direction of the movable passage 430 relative to the nozzle 402, the direction toward the outside in the radial direction r of the imaginary circle VC centered on the rotational axis A is an arrow V40 direction (projecting direction), the direction toward the inside of the radial direction r is an arrow V41 direction (retracting direction). The direction of the arrow V40 and the direction of the arrow V41 are parallel to the opening direction of the opening 402*a* of the nozzle 402.

The detailed shapes of various members will be described.

As shown in FIG. 116, the nozzle 402 (accepting member) has a generally cylindrical shape having a cylindrical portion 402*c* centered on the rotational axis A, and includes an opening 402*a* (second opening), a sealing member 402*a*1, a spring hooking portion 402*e*, a hole portion 402*d*, and a projecting portion 402*b*. The nozzle 402 has a function of receiving the toner of the accommodating portion 201.

As shown in part (a) of FIG. 116, the cylindrical portion 402*c* has the accommodating portion side cylindrical portion 402*c*1 on the arrow U direction side (upper side) of the pack side shutter 203 in a state where the pack side shutter 203 is assembled (See FIG. 114). In addition, such a portion of the cylindrical portion 402*c* as is on the downstream side, in the N direction (downward), of the accommodating portion side cylindrical portion 402*c*1 is referred to as the opening side cylindrical portion 402*c*2.

The opening 402*a* is provided on the side surface of the opening side cylindrical portion 402*c*2 extending in the direction of the rotational axis A, and faces the outside in the radial direction r of the imaginary circle VC centered on the rotational axis A. The opening 402*a* is structured to be in fluid communication with the inside of the accommodating portion 201 in a state in which the nozzle 402 is coupled to the accommodating portion 201. The opening 402*a* is provided with seal members 402*a*1 at opposite ends in a direction perpendicular to the rotational axis A as viewed from the opening 402*a*.

The spring hooking portion 402*e* is on the opposite side of the opening 402*a* in the radial direction r of the imaginary circle VC centered on the rotational axis A, and is provided in a first space S40 which will be described hereinafter. Further, the spring hooking portion 402*e* is a projection projecting in the direction of the arrow U (upward).

As shown in part (b) of FIG. 116, the hole portion 402*d* is provided around the rotational axis A40. The hole portion 402*d* is provided as a first hole portion 402*d*1, a second hole portion 402*d*2, a third hole portion 402*d*3, and a fourth hole portion 402*d*4, in this order from the side (nozzle side) of the second end portion in the first direction D1. Further, in the direction of the rotational axis A40, the space sandwiched between the first hole portion 402*d*1 and the second hole portion 402*d*2 is referred to as a first space S40, and the space sandwiched between the second hole portion 402*d*2 and the third hole portion 402*d*3 is referred to as a second space S41, and the space sandwiched between the third hole portion 402*d*3 and the fourth hole portion 402*d*4 is referred to as a third space S42.

The first space S40 is provided on the opening side cylindrical portion 402*c*2 and penetrates to the opening 402*a*. The third space S42 is provided on the cylindrical portion 402*c*1 on the accommodating portion side. The second space S41 may be provided in either the opening side cylindrical portion 402*c*2 or the accommodating portion side cylindrical portion 402*c*1, but it is preferable to provide the second space S41 in the opening side cylindrical portion 402*c*2 from the standpoint of downsizing. In addition, the third space S42 is provided with an abutment surface 402*f*.

The projecting portion 402*b* has the same shape as the projecting portion 202*b* of the nozzle 202 of Embodiment 2, and therefore, detailed description thereof will be omitted.

As shown in FIG. 117, the movable passage 430 (discharge member) has a hollow substantially rectangular parallelepiped shape, and includes a downward opening 430*a* (discharge opening, first opening), an upward opening 430*b*, a pushed portion 430*c*, and a spring hooking portion 430*d*, a lower seal member 430*e*, and an upper seal member 430*f*.

As shown in part (a) of FIG. 117, the downward opening 430*a* is an opening provided on the arrow N direction (downward) side and the arrow V40 direction (projecting direction) side. Further, a lower seal member 430*e* is provided on the surface provided with the downward opening 430*a* so as to surround the downward opening 430*a*.

As shown in part (b) of FIG. 117, the upward opening 430*b* is an opening provided on the arrow U direction (upward) side and the arrow V41 direction (retracting direction) side, and communicates with the downward opening 430*a*. Further, an upper seal member 430*f* is provided on the surface provided with the upward opening 430*b* so as to surround the upward opening 430*b*.

The pushed portion 430*c* comprises a first flat pushed surface 430*c*1*a*, a first pushed slope 430*c*1*b*, a second pushed surface 430*c*2, and a projecting surface 430*c*3. The projecting surface 430*c*3 is a surface projecting in the arrow V41 (retracting direction) of the pushed portion 430*c*. In the state in which the toner pack 420 which will be described hereinafter is assembled, the surface remote from the rotational axis A40 with the projecting surface 430*c*3 as a boundary is the first flat pushed surface 430*c*1*a* and the first pushed slope 430*c*1*b*, and the near side is the second pushed surface 430*c*2 (see part (c) of FIG. 122). Further, of the first flat pushed surface 430*c*1*a* and the first pushed slope 430*c*1*b*, the surface connected with the projecting surface 430*c*3 is the first pushed slope 430*c*1*b*.

As shown in part (a) of FIG. 117, the spring hooking portion 430*d* is provided on the arrow V41 direction (retracting direction) side, and is a projection projecting in the direction of arrow N (downward).

As shown in part (a) of FIG. 118, the cam member 432 includes an arm portion 432*d* and has a generally arc shape as viewed in the rotational axis A41 direction. A substantially semi-cylindrical push portion 432*a* is provided at one end of the arm portion 432*d*, and a hole portion 432*b* and a shaft portion 432*c* are provided at the other end.

The hole portion 432*b* is a hole directed in the direction of the arrow N (downward) with the rotational axis A41 as the center, and comprises a flat locking surface 432*b*1 and a support surface 432*b*2 in the form of a circumferential surface.

The shaft portion 432*c* is a substantially cylindrical shaft centered on the rotational axis A41, and projects in the direction of the arrow N (downward).

As shown in part (b) of FIG. 118, the operating member 433 has a substantially flat plate shape including an arm portion 433*a*. On one end side of the arm portion 433*a* in the longitudinal direction, a hole portion 433*b* is provided with the rotational axis A42 as the center and penetrating the arm portion 433*a*. The hole portion 433*b* comprises a flat locking surface 433*b*1 and an arc-shaped support surface 433*b*2.

As shown in part (c) of FIG. 118, the shaft member 434 has a substantially cylindrical shape centered on the rotational axis A40. The shaft member 434 is provided with a flat locking surface 434*a* and a substantially semi-cylindrical support surface 434*b* on the arrow U direction side (upper side), along the rotational axis A40 (D-cut shape). Further, the shaft member 434 is provided with a flat locking surface 434*c* and a substantially semi-cylindrical support surface 434*d* on the direction (downward) side of the arrow N, along the rotational axis A40 (D-cut shape). A groove portion 434*e* is provided on the arrow N direction of side with respect to the locking surface 434*a*. Further, the end portion of the shaft member 434 on the arrow U direction (upper) side is an upper end 434*f*, and the end portion on the arrow N direction (lower) side is a lower end 434*g*.

(Assembly of Toner Pack)

Next, referring to FIGS. 119, 120 and 121, the assembly of the toner pack 420 according to this embodiment will be described.

Figure 119:
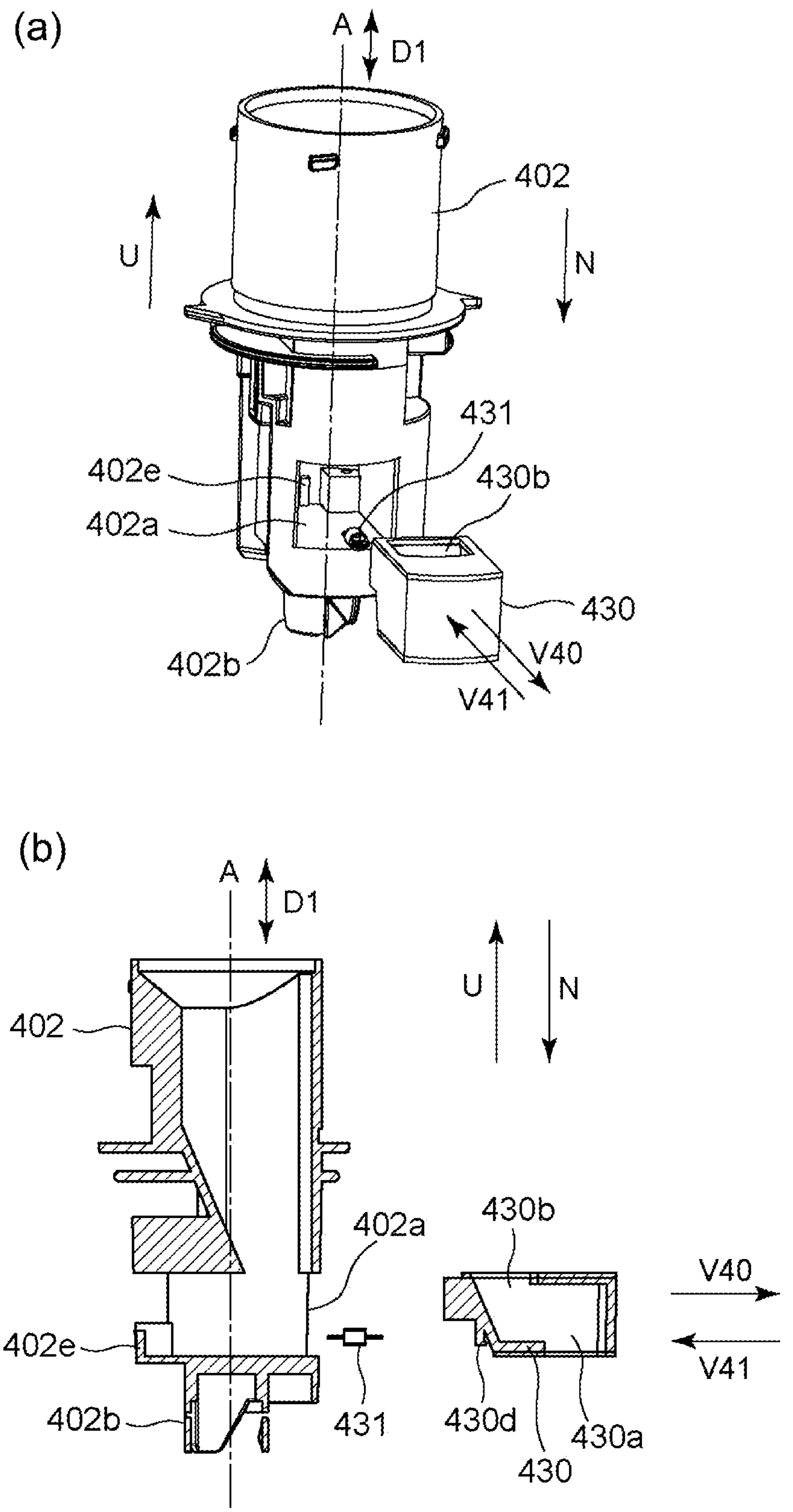
FIG. 119 is an illustration showing the assembly of the movement path and the tension spring to the nozzle in Embodiment 4.

FIG. 119 illustrates the assembling of the movable passage 430 to the nozzle 402 and the tension spring 431, part (a) of FIG. 119 is a perspective view, and part (b) of FIG. 119 is a sectional view taken along a line X407-X407 in part (b) of FIG. 114.

Figure 120:
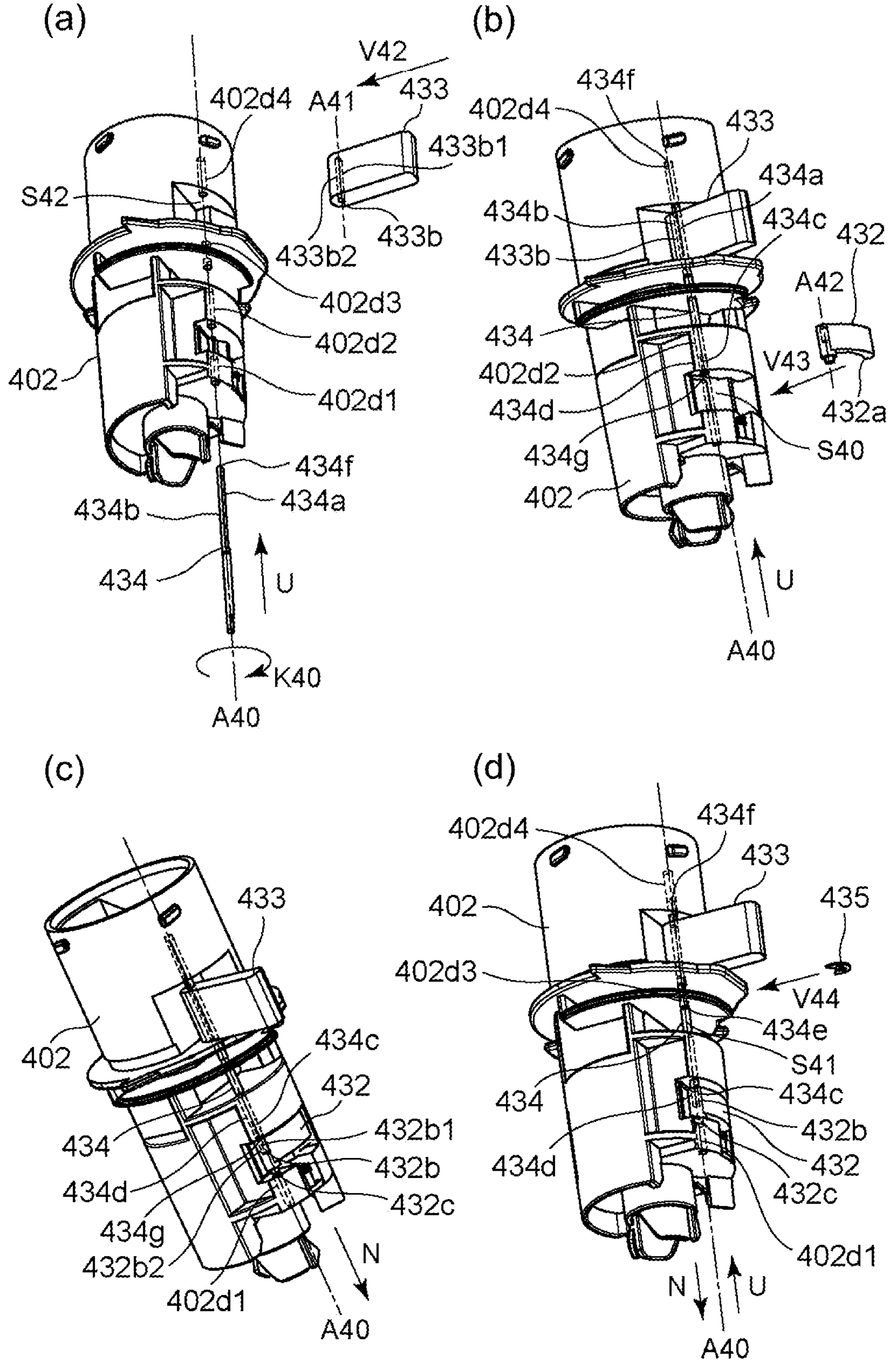

FIG. 120 is an illustration of the assembly of the operation mechanism 436 (cam member 432, operating member 433, shaft member 434, E-type retaining ring 435) to the nozzle 402. The states of part (a) of FIG. 120 to part (d) of FIG. 120 will be described as appropriate. FIG. 121 is a perspective view of the toner pack 420, and is a view as seen from the second end side (nozzle side) in the first direction D1. Further, part (a) of FIG. 121 is a view as seen from the opening 402*a* side of the nozzle 402, and part (b) of FIG. 121 is a view as seen from the side opposite to the opening 402*a*. The accommodating portion 201 and the pack-side shutter 203 are not shown.

First, as shown in part (a) of FIG. 119, the tension spring 431 and the movable passage 430 are assembled to the nozzle 402. The movable passage 430 is inserted into the opening 402*a* of the nozzle 402 in the arrow V41 direction (retracting direction) with such an attitude that the downward opening 430*a* faces in the arrow N direction (downward) and is on the arrow V40 (projecting direction) side. The arrow V40 direction and the arrow V41 direction are directions perpendicular to the rotational axis A or the radial directions r. At this time, one end of the tension spring 431 is in a state of being hooked on the spring hooking portion 430*d* of the movable passage 430 shown in part (b) of FIG. 119. After the movable passage 430 is inserted into the opening 402*a* of the nozzle 402, the other end of the tension spring 431 is hooked on the spring hooking portion 402*e* of the nozzle 402, so that the assembly of the movable passage 430 is completed.

Next, as shown in part (a) of FIG. 120, the operating member 433 and the shaft member 434 are assembled to the nozzle 402. The operating member 433 is inserted into the third space S42 of the nozzle 402 in the direction of an arrow V42 until the rotational axis A41 is aligned with the rotational axis A40. Thereafter, the shaft member 434 is inserted into the first hole portion 402*d*1 relative to the nozzle 402 from the upper end 434*f* side in the direction of the arrow U. Then, the upper end 434*f* of the shaft member 434 passes through the second hole portion 402*d*2 and the third hole portion 402*d*3 of the nozzle 402 in order, and thereafter is inserted into the hole portion 433*b* of the operating member 433 in the arrow U direction. At this time, It is inserted such that the locking surface 434*a* of the shaft member 434 and the locking surface 433*b*1 of the operating member 433 are engaged with each other and such that the support surface 434*b* of the shaft member 434 and the support surface 433*b*2 of the operating member 433 are engaged with each other. By the engagement between the locking surface 434*a* of the shaft member 434 and the locking surface 433*b*1 of the operating member 433, the operating member 433 and the shaft member 434 can be integrally rotated around the rotational axis A40.

Then, when the shaft member 434 is further inserted in the arrow U direction (upward) relative to the nozzle 402, the upper end 434*f* is in the fourth hole portion 402*d*4 and the lower end 434*g* is in the second hole portion 402*d*2 as shown in part (b) of FIG. 120.

Next, the cam member 432 is assembled to the nozzle 402 from this state. The cam member 432 is inserted into the first space S40 of the nozzle 402 in the direction of an arrow V43 until the rotational axis A42 is aligned with the rotational axis A40. As described above, since the lower end 434*g* of the shaft member 434 is inserted until it penetrates into the second hole portion 402*d*2 of the nozzle 402, the shaft member 434 does not exist in the first space S40 of the nozzle 402. By this, the cam member 432 can be inserted into the first space S40 of the nozzle 402 without interfering with the shaft member 434. Then, as shown in part (c) of FIG. 120, the cam member 432 is in the first space S40 of the nozzle 402.

Next, as shown in part (c) of FIG. 120, the cam member 432 is engaged with the nozzle 402, and the shaft member 434 is engaged with the cam member 432. The shaft portion 432*c* of the cam member 432 is inserted into the first hole portion 402*d*1 in the N direction (downward) of the arrow relative to the nozzle 402. At this time, the shaft portion 432*c* of the cam member 432 is rotatably supported around the rotational axis A40 relative to the first hole portion 402*d*1 of the nozzle 402. In addition, the shaft member 434 is inserted into the hole portion 432*b* of the cam member 432 in the arrow N direction (downward). At this time, the locking surface 434*c* of the shaft member 434 and the locking surface 432*b*1 of the cam member 432 are engaged with each other, and the support surface 434*d* of the shaft member 434 and the support surface 432*b*2 of the cam member 432 are engaged with each other. By The engagement between the locking surface 434*c* of the shaft member 434 and the locking surface 432*b*1 of the cam member 432, the cam member 432 and the shaft member 434 can be integrally rotated around the rotational axis A40. Further, in the direction (downward) of the arrow N, the cam member 432 is constrained from moving relative to the nozzle 402, and the shaft member 434 is constrained from moving relative to the cam member 432. Therefore, the shaft member 434 is in a state where the movement thereof is restricted relative to the nozzle 402 in the direction (downward) of the arrow N.

Finally, as shown in part (d) of FIG. 120, the E-shaped retaining ring 435 is assembled to the shaft member 434. The groove portion 434*e* of the shaft member 434 is provided so as to be close to the third hole portion 402*d*3 in the second space S41 of the nozzle 402. By engaging the E-shaped retaining ring 435 with the groove portion 434*e* of the shaft member 434, the movement of the shaft member 434 relative to the nozzle 402 in the arrow U direction is restricted.

Figure 121:
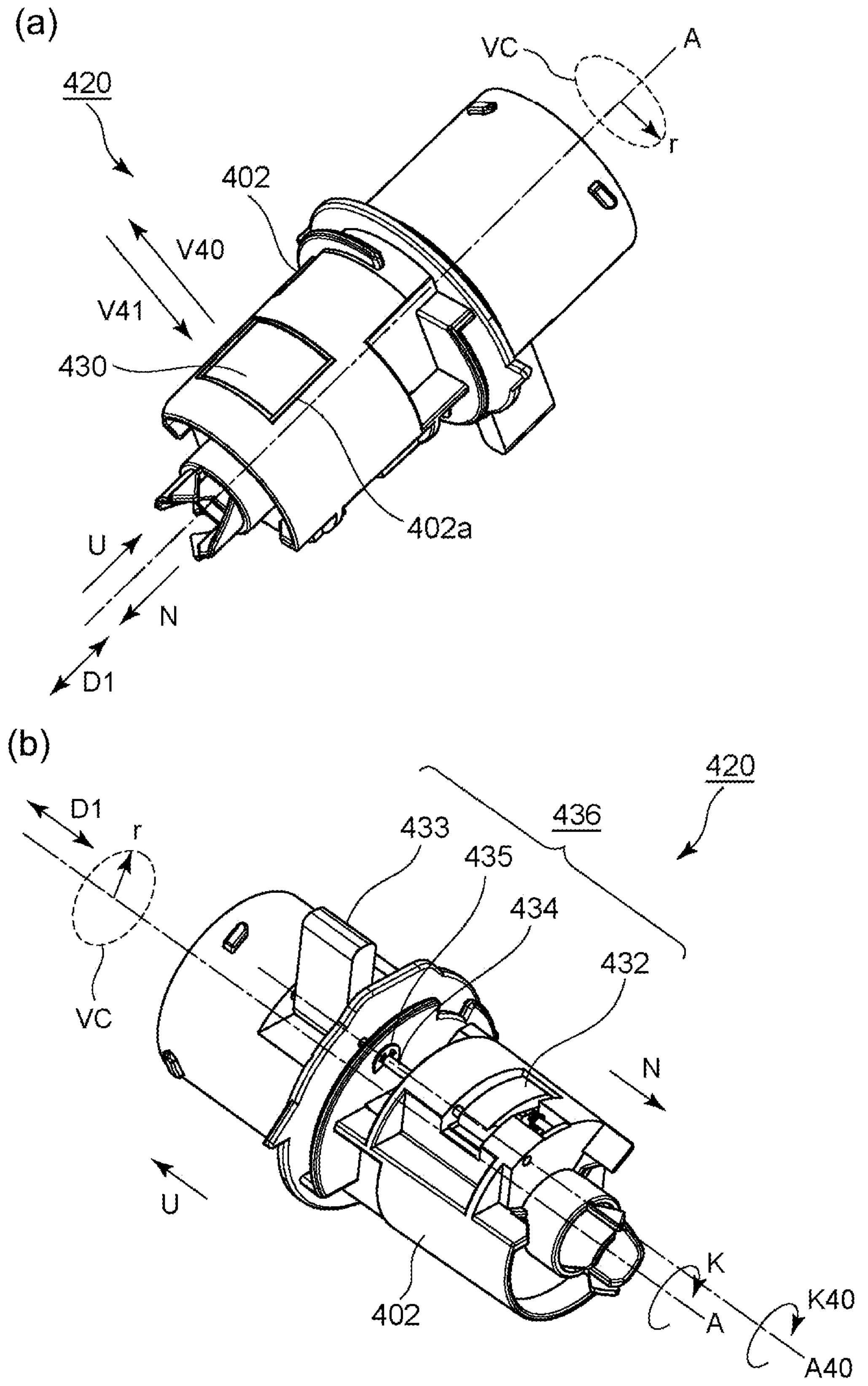

Through the above-described assembling operations, as shown in FIG. 121, the movable passage 430, the tension spring 431, and the operation mechanism 436 are assembled to the nozzle 402, the cam member 432 and the operating member 433 can rotate integrally with the shaft member 434 around the rotational axis A40, as described above, and therefore, when the operating member 433 is rotated in the rotational direction K40, the cam member 432 also rotates in the direction K40.

Thereafter, the assembly of the toner pack 420 is completed by assembling the accommodating portion 201 and the pack side shutter 203 to the nozzle 402.

(Operation of Toner Pack)

Next, referring to FIGS. 122 and 123, the operation of the toner pack 420 when the operating member 433 is operated will be described.

Figure 122:
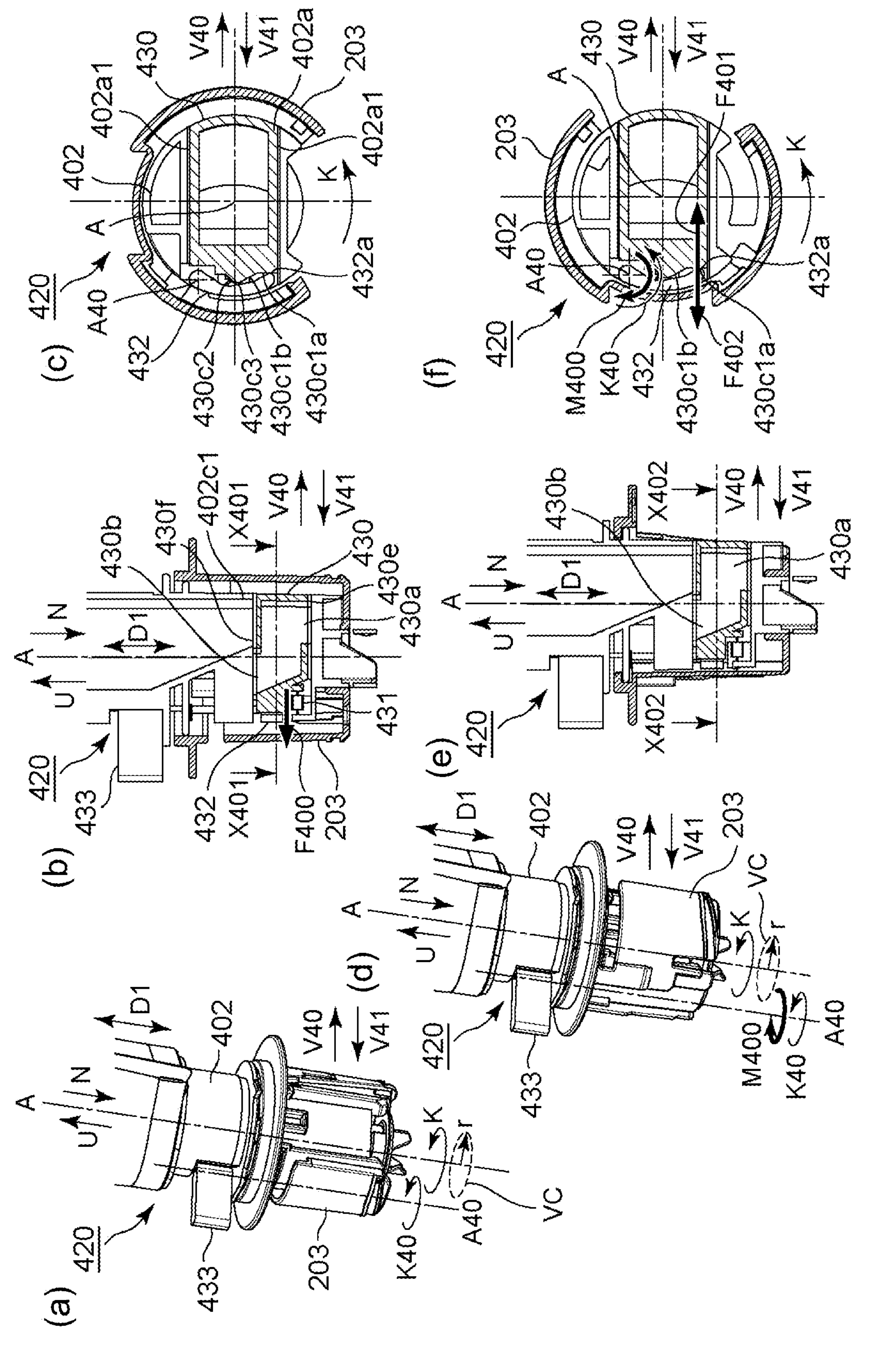

FIG. 122 shows a state in which the movable passage 430 is in the second position stored in the nozzle 402, and part (a) thereof to part (c) thereof show a state in which the pack-side shutter 203 is in the closed position (d), and part (d) thereof to (f) thereof show a state in which the pack side shutter 203 is in the open position. Further, in FIG. 122, part (a) and part (d) are perspective views, Part (b) and part (e) are sectional views taken along a line X407-X407 of part (b) of FIG. 114 in the respective states, and part (c) the cross-section of view taken along a line X401-X401 of b) of part (b) of FIG. 122, and part (f) is a cross-sectional view taken along a line X402-X402 of part (e) of this Figure.

Figure 123:
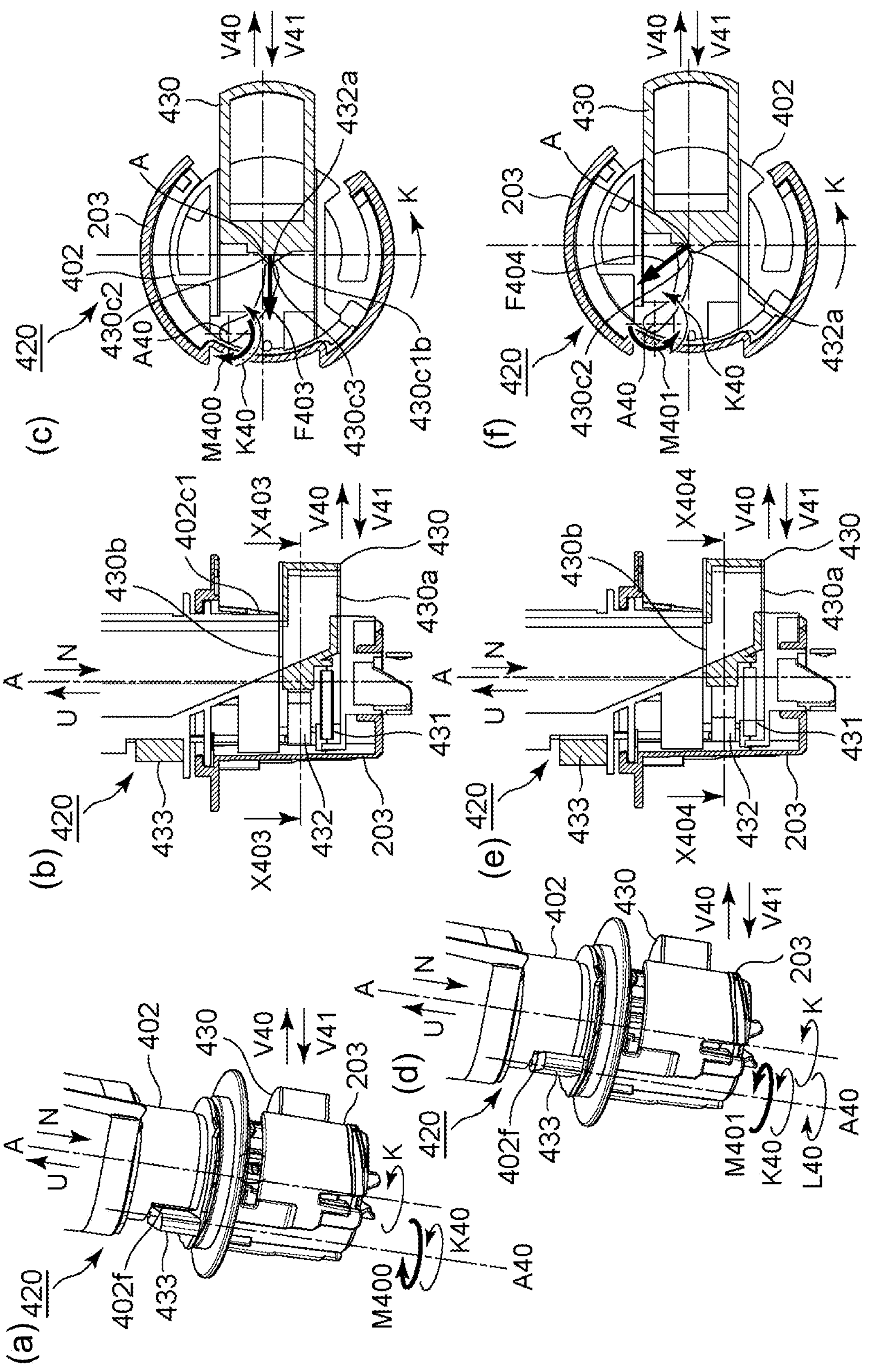

FIG. 123 shows the operation of the movable passage 430 by operating the operating member 433, and part (a) of this Figure to (c) thereof shows the state in which where the movable passage 430 is in the position projecting most from the nozzle 402 (the most projecting position), and parts (d) to (f) of these Figure shows a state in which the movable passage 430 is in the first position projecting from the nozzle 402. Further, in FIG. 123, parts (a) and (d) of this Figure are perspective views, parts (b) and (e) are sectional views taken along a line X407-X407 of part (b) of FIG. 114 in the respective states, part (c) is a cross-sectional view taken along a line X403-X403 of part (b) of this Figure, and part (f) is a cross-section taken along a line X404-X404 of part (e) of this Figure.

Further, in FIGS. 122 and 123, the cut surfaces of the pack-side shutter 203 and the movable passage 430 are shaded for better illustration.

The description will first be made as to a state in which the pack-side shutter 203 shown in part (a) of FIG. 122 is in the closed position, and the movable passage 430 is in the second position (retracting position). The operating member 433 projects outward from the nozzle 402 in the radial direction r of the imaginary circle VC centered on the rotational axis A. This makes it easier for the user to operate the operating member 433.

Further, as shown in part (b) of FIG. 122, the movable passage 430 receives a force F400 imparted by the tension spring 431 in the direction of arrow V41 (retracting direction) relative to the nozzle. The force F400 maintains the movable passage 430 in a second position housed in the nozzle 402. In addition, in the state of being in the second position, the downward opening 430*a* of the movable passage 430 is closed in the arrow N direction (downward), and the upward opening 430*b* is closed in the arrow U direction (upward). In this embodiment, the upward opening 430*b* of the movable passage 430 is closed with respect to the accommodating portion 201 (see FIG. 114) on the arrow U direction (upward) side of the nozzle 402, but it may be open.

Further, as shown in part (c) of FIG. 122, the movable passage 430 overlaps with the pack side shutter 203 in the rotational axis A direction, and also overlaps with the rotational direction K. In other words, the movable passage 430 overlaps with the pack side shutter 203 as viewed in the radial direction r. That is, the movable passage 430 is hidden by the pack-side shutter 203, thereby preventing the user from touching the movable passage 430. Further, the outflow of the toner, to the outside, which has entered the inside of the nozzle 402 from the accommodating portion 201 is prevented by the upper seal member 430*f* (see part (b) of FIG. 122) provided in the movable passage 430. And, the cam member 432 is in contact with the first flat pushed surface 430*c*1*a* of the movable passage 430.

When the pack-side shutter 203 is rotated in the rotational direction K from this position to the open position, the state as shown in part (d) of FIG. 122 is provided. Further, as shown in part (e) of FIG. 122 and part (f) of FIG. 122, the movable passage 430 is exposed from the pack side shutter 203 and becomes able to move in the arrow V40 direction (projecting direction).

That is, when the pack side shutter 203 is in the open position, the movable passage 430 is as follows. The movable passage 430 projects from the opening 402*a* of the nozzle 402 in the direction of the arrow V40, and is movable between a first position where the downward opening 430*a* is exposed to the outside of the toner pack 420 and a second position retracted from the first position in the direction of the arrow V41.

As shown in part (f) of FIG. 122, in order to move the movable passage 430 in the arrow V40 direction (projecting direction), a force is applied to the operating member 433 to rotate in the rotational direction K40. Since the cam member 432 rotates integrally with the operating member 433, the push portion 432*a* of the cam member 432 applies a force F401 to the first pushed surface 430*c*1*a* of the movable passage 430 in the arrow V40 direction (projecting direction). By the force F401, the movable passage 430 moves in the arrow V40 (projecting direction) against the force F402 in the arrow V41 direction (retracting direction) produced by the tension spring 431 (see part (b) of FIG. 122). At this time, the user carries out of this operation while feeling the load of the moment M400 in the direction opposite to the rotational direction K40 by the force F402.

Then, when the cam member 432 is further rotated in the rotational direction K40, the push portion 432*a* of the cam member 432 pushes the first flat pushed surface 430*c*1*a* and the first pushed slope 430*c*1*b* of the movable passage 430 in this order, and as shown in part (c) of FIG. 123, it comes into contact with the projecting surface 430*c*3 of the movable passage 430. At this time, the movable passage 430 is at the position most projecting from the nozzle 402 (most projecting position). Also at this time, the user carries out the operation while feeling the load of the moment M400 in the direction opposite to the rotational direction K40 by the force F403 produced by the tension spring 431.

In the state where the movable passage 430 is in the most projecting position, the downward opening 430*a* of the movable passage 430 is projected from the opening side cylindrical portion 402*c*2 of the nozzle 402 in the arrow V40 direction (projecting direction), as shown in part (b) of FIG. 123, and it becomes opened in the direction (downward) of the arrow N. The upward opening 430*b* of the movable passage 430 is opened with respect to the accommodating portion 201 (see FIG. 114) on the arrow U direction side (above) of the nozzle 402.

When the operating member 433 is further rotated in the rotational direction K40 from this position, the push portion 432*a* of the cam member 432 abuts on the second pushed surface 430*c*2 of the movable passage 430 as shown in part (f) of FIG. 123. In this state, the tension spring 431 (see part (e) of FIG. 123) causes the second pushed surface 430*c*2 of the movable passage 430 to apply a force F404 to the cam member 432. At this time, the position and direction of the second pushed surface 430*c*2 of the movable passage 430 are set so that the moment M401 produced in the cam member 432 by the force F404 is in the same direction as the rotational direction K40. The cam member 432 is rotated in the rotational direction K40 by the moment M401. The operating member 433 rotated in the rotational direction K40 together with the cam member 432 abuts on the abutment surface 402*f* of the nozzle 402, and the rotation is stopped (restricted). That is, the rotation, integral with the operating member 433, of the cam member 432 in the rotational direction K40 is also stopped (restricted). Therefore, the movable passage 430 is constrained from moving in the arrow V41 direction (retracting direction) by the cam member 432 which is at rest (restricted) as described above. By this, the operation of the operating member 433 is completed. The position of the movable passage 430 at this time is the second position (projecting position).

When the movable passage 430 moves from the most projecting position to the first position, the movable passage 430 moves slightly in the V41 direction (evacuation direction), but the amount of movement is so small that the opening 430*a* of the movable passage 430 remains open in the direction of the arrow N (downward). Similarly, the upward opening 430*b* of the movable passage 430 remains open to the accommodating portion 201 (see FIG. 114) placed in the downstream side on the arrow U direction side of (above) the nozzle 402.

Further, as described above, when the user operates the operating member 433 in the rotational direction K40 the user carries out the operation while feeling the moment M400 in the direction opposite to the rotational direction K40 (see part (d) of FIG. 122 and part (a) of FIG. 123), during the movable passage 430 being between the second position and the most projecting position. Thereafter, when the movable passage 430 is positioned at the second position, the movement is switched to the moment M401 in the rotational direction K40 opposite to the moment M400 (see part (d) of FIG. 123), and therefore, the user recognizes the load reduction. Then, the user can recognize the completion of the operation of the operating member 433 by recognizing the load reduction.

When the user returns the movable passage 430 from the second position to the first position, the operation reverse to the above-described operation is be performed. As shown in part (d) of FIG. 123, the operating member 433 may be rotated in the rotational direction L40, which is the direction opposite to the rotational direction K40.

The foregoing is the operation of the toner pack 420.

(Mounting and Dismounting of Toner Pack)

Figure 124:
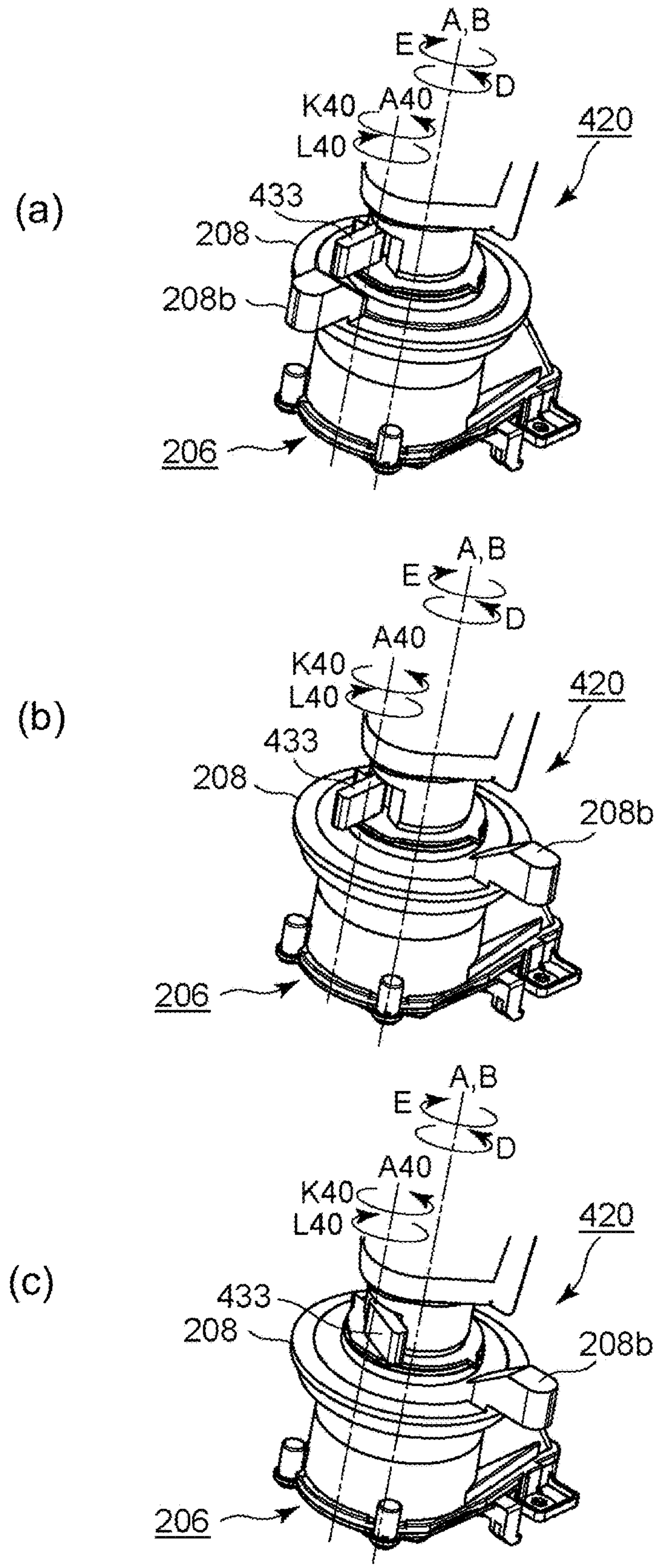
Figure 125:
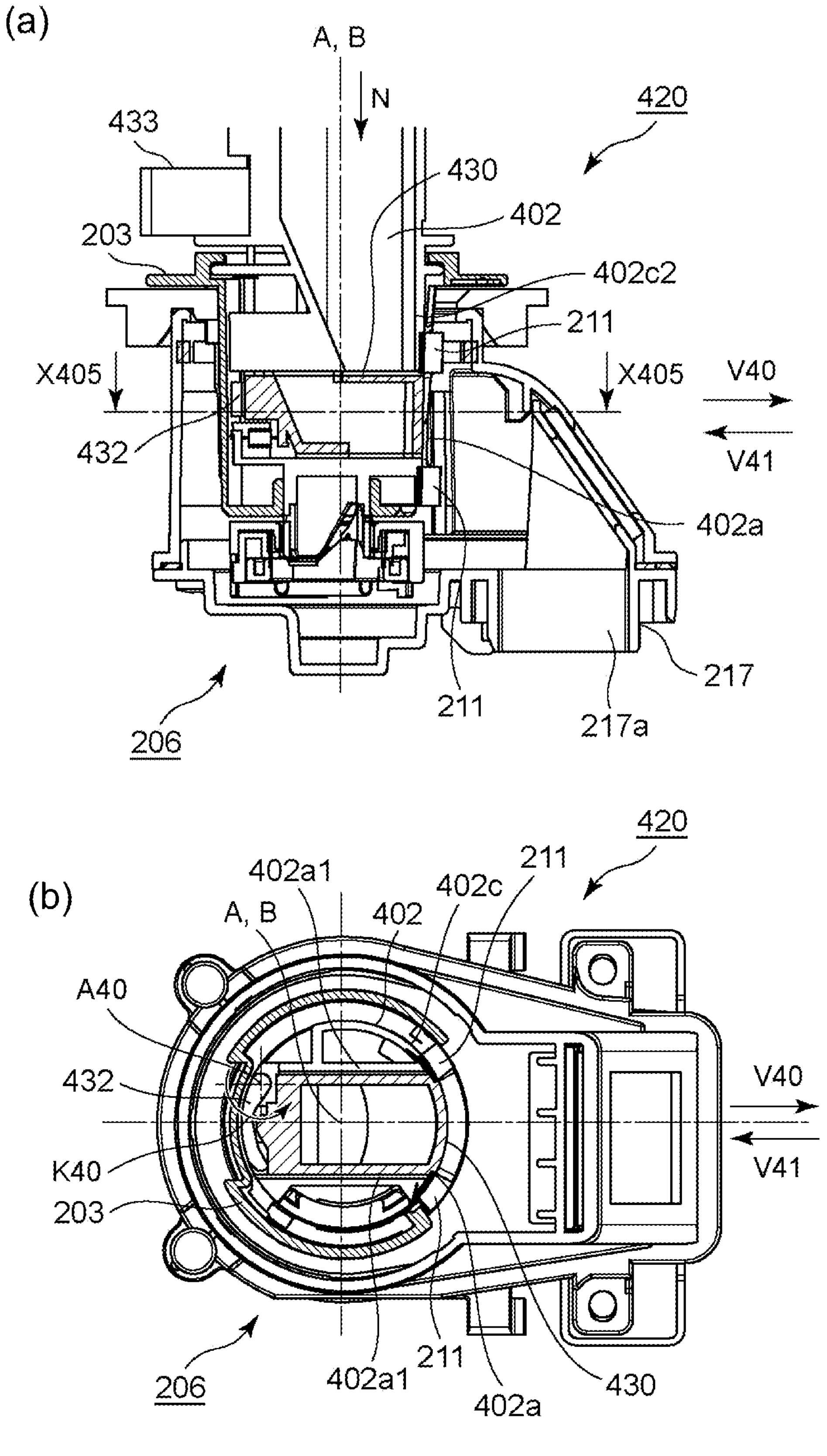
Figure 126:
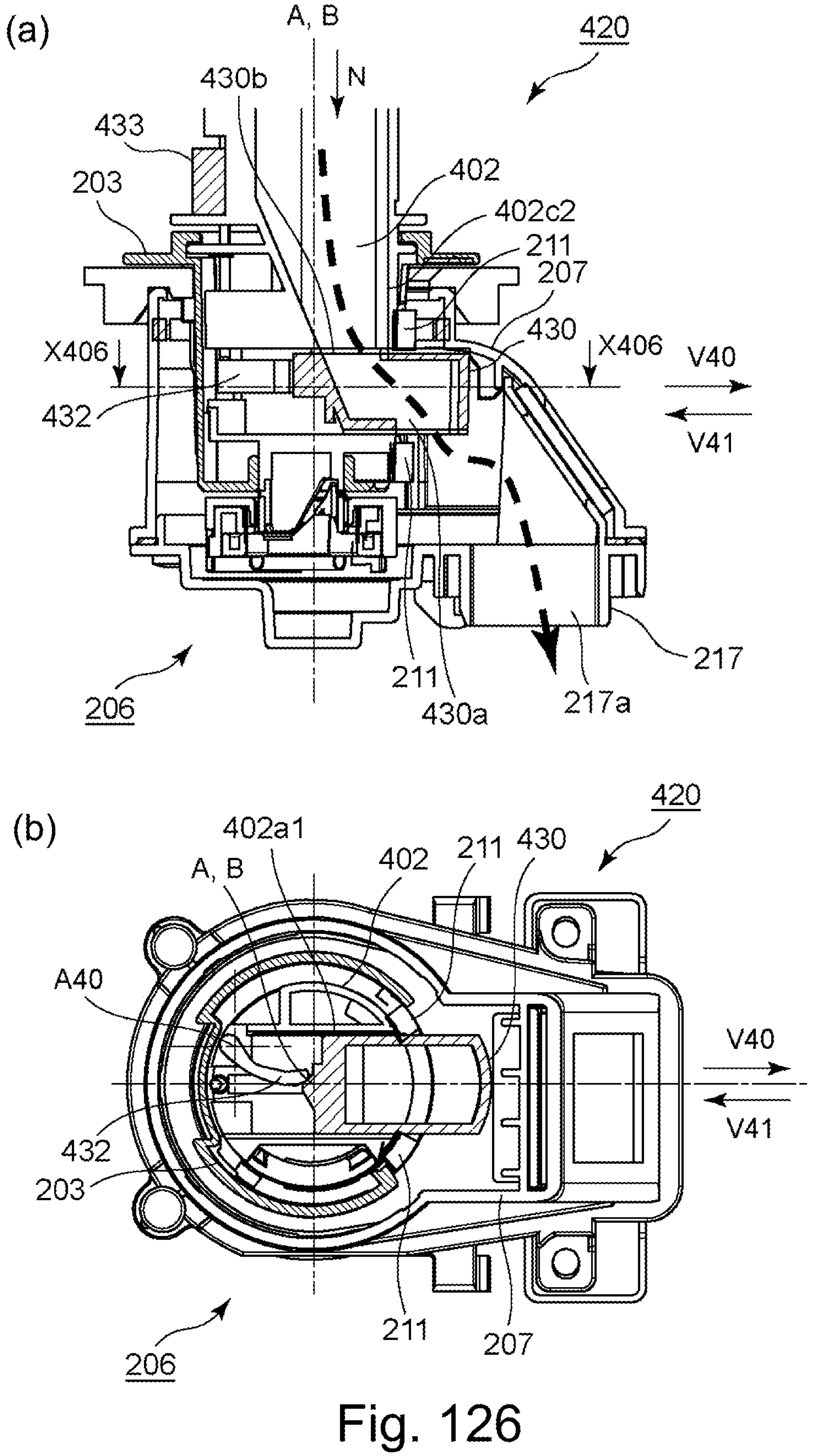

Referring to FIGS. 124 to 126 the operation of mounting and dismounting the toner pack 420 to and from the mounting portion 206 will be described. The operation of inserting and removing the toner pack 420 relative to the mounting portion 206 is the same as that of Embodiment 2, the description thereof will be omitted.

FIG. 124 shows a process of inserting the toner pack 420 into the mounting portion 206 and operating the operating lever 208 and the operating member 433. In FIG. 124, part (a) shows a state in which the operating lever 208 is in the closed position, part (b) shows a state in which the operating lever 208 is in the open position, and part (c) shows a state in which the operating member 433 is further operated to place the movable passage 430 in the second position.

FIG. 125 is a sectional view in a state in which the toner pack 420 is mounted on the mounting portion 206 and the operating lever 208 is in the open position, and part (a) of FIG. 125 is a sectional view taken along the rotational axis A and the arrow V40 (projection direction), and part (b) of FIG. 125 is a cross-section taken along a line X405-X405 of part (a) of FIG. 125.

FIG. 126 is a sectional view when the operating member 433 is operated to move the movable passage 430 to the second position, part (a) of this Figure is a sectional view taken along the rotational axis A and the arrow V40 (projecting direction), and part (b) is a cross-section taken along a line X406-X406 of part (a).

In FIGS. 125 and 126, the cut surfaces of the pack side shutter 203 and the movable passage 430 is shaded.

In the mounting operation of the toner pack 420 on the mounting portion 206, after inserting the toner pack 420 into the mounting portion 206, the operating lever 208 is first rotated in the rotational direction D as shown in FIG. 124, and then the operating member 433 is rotated in the direction of an arrow K40.

First, when the operating lever 208 is rotated in the rotational direction D after being inserted into the mounting portion 206 of the toner pack 420, the state shown in FIG. 125 is provided. In this state, as shown in part (a) of FIG. 125, the movable passage 430 is in the second position. At this time, the downward opening 430*a* of the movable passage 430 is closed in the direction of the arrow N (downward) with respect to the opening side cylindrical portion 402*c*2 of the nozzle 402, the toner in the accommodating portion 201 (see FIG. 114) cannot reach the apparatus-side opening 217*a* of the second frame 217 through the nozzle 402.

Further, as shown in part (a) of FIG. 125 and part (b) of FIG. 125, the apparatus-side seal 211 covers the periphery of the opening 402*a* of the nozzle 402.

Next, when the operating member 433 is operated and the movable passage 430 is moved to the second position, the state shown in FIG. 126 is provided.

In this state, as shown in part (a) of FIG. 126, the downward opening 430*a* of the movable passage 430 projects from the opening side cylindrical portion 402*c*2 of the nozzle 402 in the arrow V40 direction (projecting direction) and is opened in the arrow N direction (downward). Then, the movable passage 430 enters the inside of the first frame 207 of the mounting portion 206, and the downward opening 430*a* of the movable passage 430 is placed inside the first frame 207.

By this, the toner in the accommodating portion 201 (see FIG. 114) can reach the apparatus-side opening 217*a* of the second frame 217 by way of the nozzle 402 and the movable passage 430, as indicated by the thick dotted arrow in the Figure. Further, as shown in part (a) of FIG. 126 and part (b) of FIG. 126, the apparatus-side seal 211 covers the periphery of the opening 402*a* of the nozzle 402 and the periphery of the movable passage 430 to prevent toner scattering.

This completes the mounting operation of the toner pack 420 on the mounting portion 206.

The removal of the toner pack 420 from the mounting portion 206 is performed in the reverse process of mounting the toner pack 420 on the mounting portion 206. That is, the operating member 433 is rotated in the rotational direction L40 from the state of part (c) of FIG. 124, and then the operating lever 208 is rotated in the rotational direction E from the state of part (b) of FIG. 124. The detailed operation of the movable passage 430 and the like at this time is merely the opposite of the mounting of the toner pack 420 on the mounting portion 206, and the description thereof will be omitted.

As described above, in the toner pack 420 of this embodiment, the nozzle 402 is provided with the movable passage 430, and the movable passage 430 movable between the first position stored in the nozzle 402 and the projecting second position.

By this, when the movable passage 430 is in the first position, the pack-side shutter 203 not only closes the opening 402*a* of the nozzle 402, but also closes the downward opening 430*a* of the movable passage 430. This makes it possible to more reliably prevent the toner from leaking out from the nozzle 402 of the toner pack 420 to the outside.

Further, when the toner is replenished from the toner pack 420 to the toner accommodating chamber 36 of the developer container 32, the toner can be discharged from a relatively deeper position of the mounting portion 206. This makes it possible to more reliably prevent toner from scattering out during replenishment.

Embodiment 5

Next, referring to FIGS. 127 to 141, another structure will be described. The same points as those of the above-described embodiments and modified examples will be omitted. In particular, of the elements disclosed in this embodiment, those corresponding to the members described in the above-described embodiments are assigned the same names as those in the above-described embodiment, and only the points different from those in the above-mentioned embodiment will be described.

Figure 127:
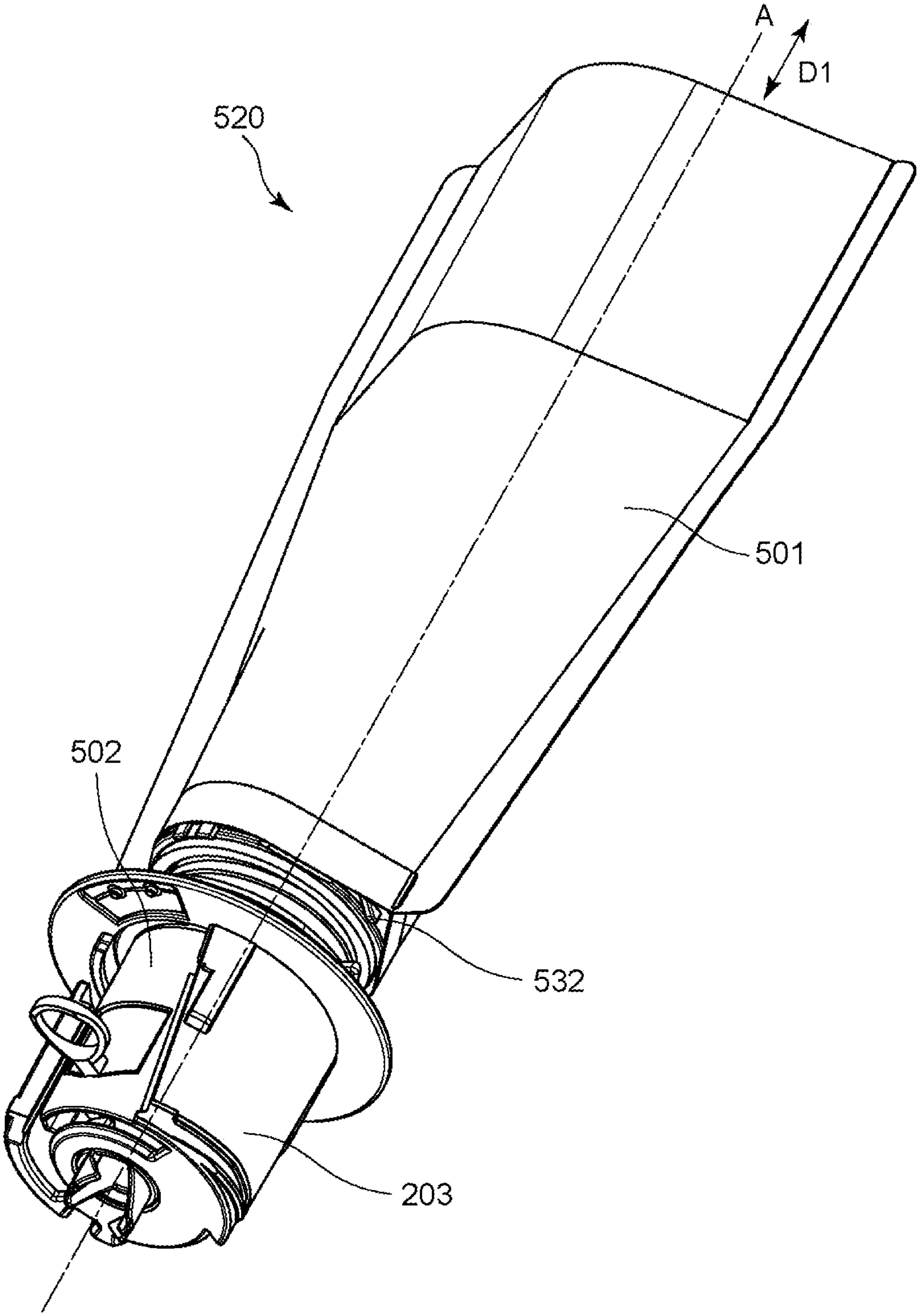
Figure 128:
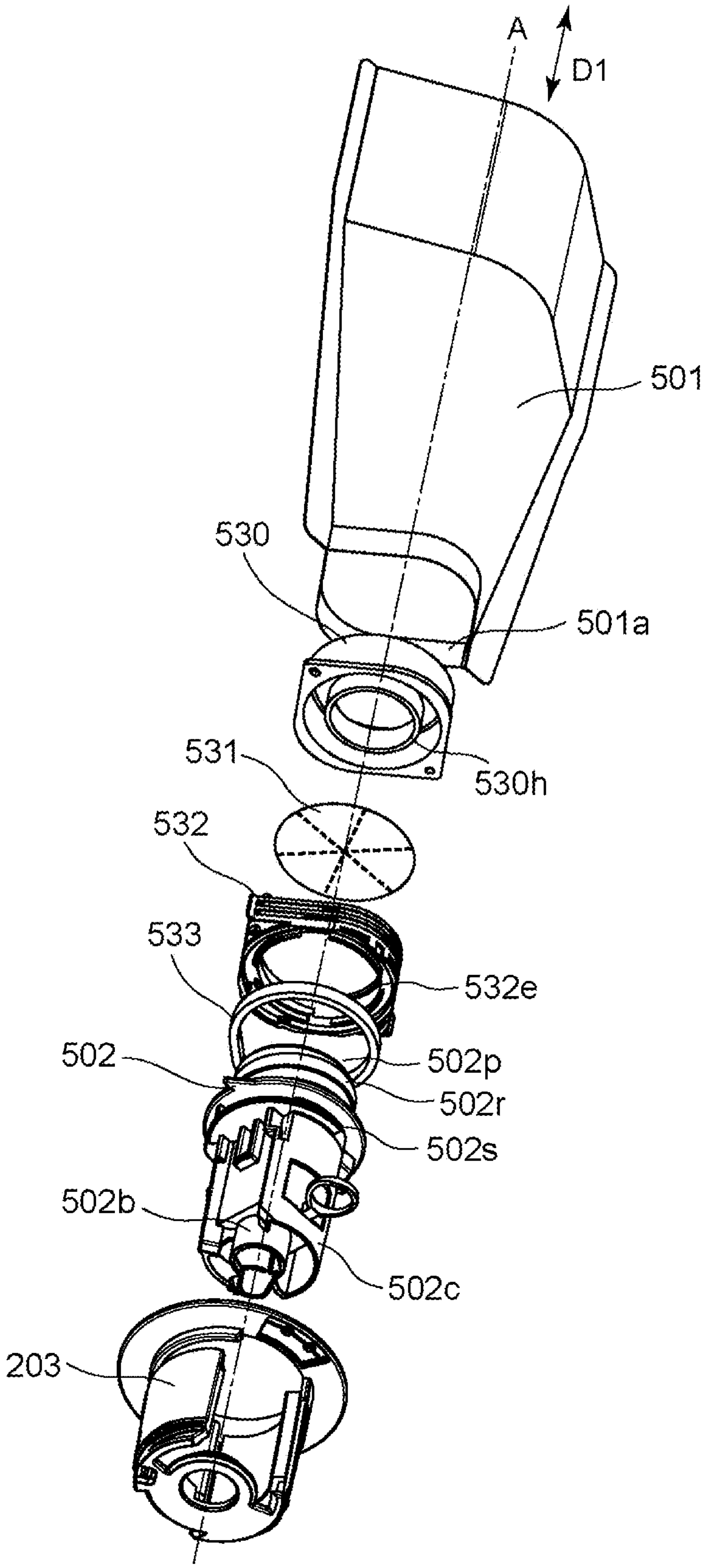
Figure 129:
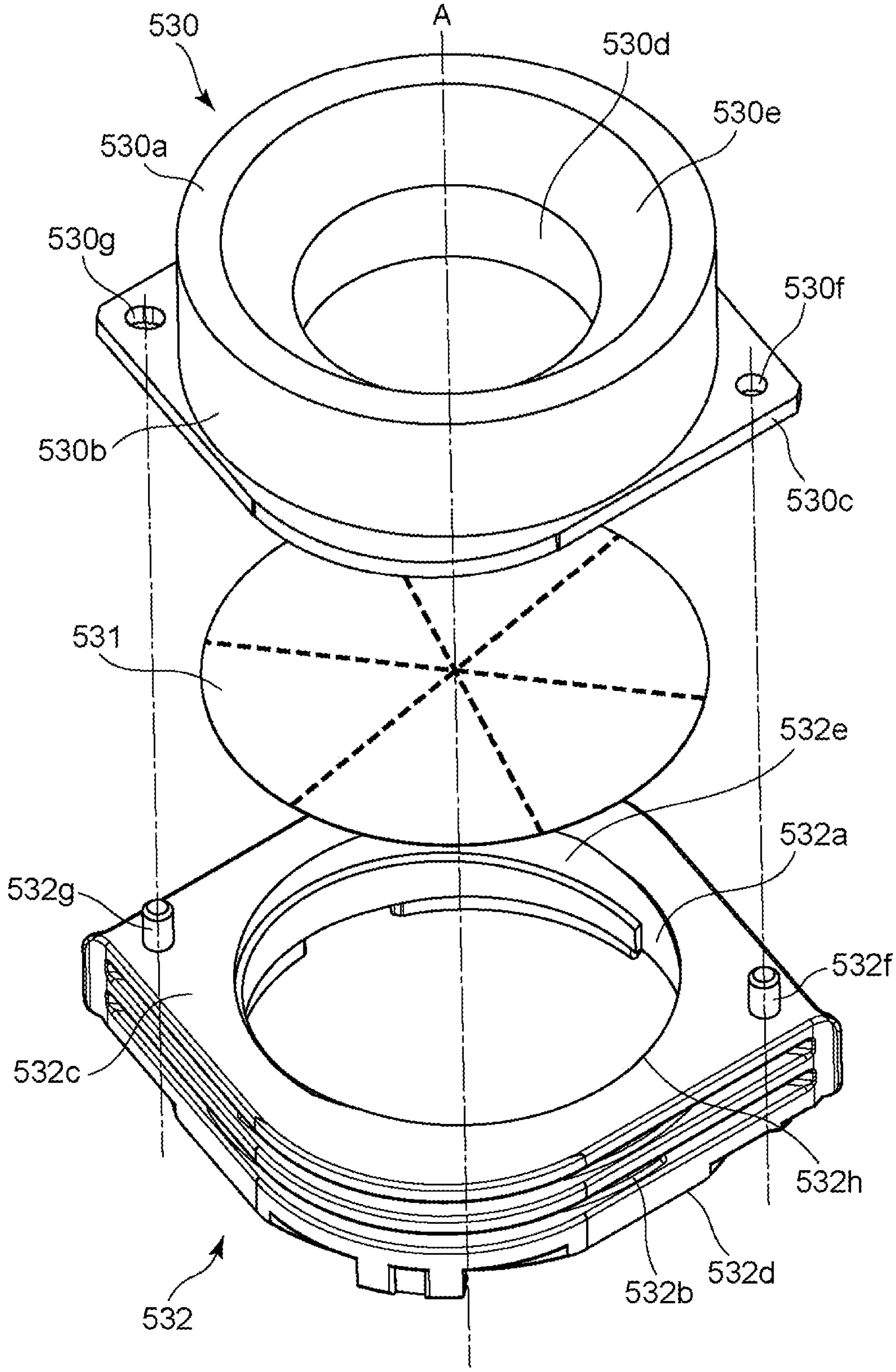
Figure 130:
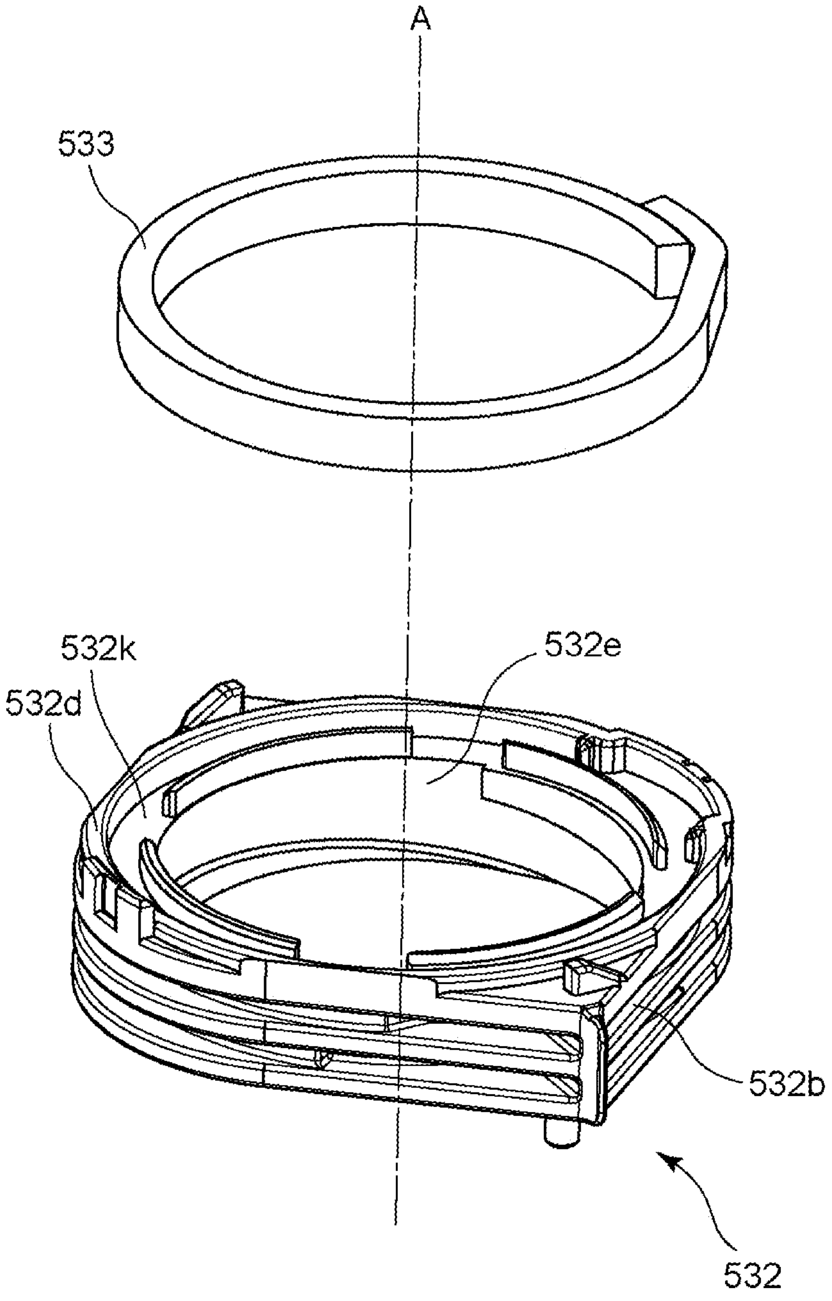

Referring to FIGS. 127, 128, 129 and 130, the structure of the toner pack 520 will be described. FIG. 127 is a perspective view of the toner pack 520 having the structure of this embodiment. FIG. 128 is an exploded perspective view of the toner pack 520. FIG. 129 is a partially exploded perspective view as seen from the opposite direction of the exploded perspective view of FIG. 128. FIG. 130 is a partially exploded perspective view as seen from the opposite direction of the exploded perspective view of FIG. 129.

As shown in FIGS. 127 and 128, the toner pack 520 includes an accommodating portion 501 (first accommodating portion) for accommodating toner, a seal support member 530, a toner seal 531, a connection ring 532, a nozzle 502, and a pack side shutter 203.

As shown in FIG. 128, in the first direction D1, the accommodating portion 501 is provided at the first end portion, and on the second end portion side opposite to the first end portion in the first direction D1, the seal supporting member 530, the toner seal 531, the connection ring 532, the nozzle 502, and the pack-side shutter 203 are provided. As in Embodiment 2, the accommodating portion 501 includes a pouch formed by pouch processing of a flexible polypropylene sheet. The accommodating portion 501 is not limited to the pouch, and may be a resin bottle or a container made of paper or vinyl.

As shown in FIGS. 128 and 129, the seal support member 530 has a generally cylindrical shape centered on the rotational axis A (central axis), and includes an end surface 530*a* an outer cylindrical portion 530*b* in this order from the first end side in the first direction D1, and a mounting surface 530*c* on the side opposite to the end surface 530*a*. The mounting surface 530*c* is provided on the outside of the outer cylindrical portion 530*b* and has a flat plate shape perpendicular to the rotational axis A. On the mounting surface 530*c*, a through hole 530*f* having an axis parallel to the rotational axis A and an oblong hole 530*g* are provided at positions substantially symmetric with respect to the rotational axis A.

Further, the inner cylinder 530*d* is arranged inside the outer cylindrical portion 530*b*. The end surface 530*a* and the inner cylinder 530*d* are connected by a connection surface 530*e*. The connection surface 530*e* is an inclined surface that is inclined so as to be away from the rotational axis A as goes toward the first end side in the first direction D1 with the rotational axis A as the center. In addition, in the first direction D1 of the inner cylinder 530*d*, an end surface 530*h* is provided on the second end side (see FIG. 128). The end surface 530*h* is a flat surface substantially perpendicular to the rotational axis A, and is placed slightly on the first end side in the first direction D1 with respect to the mounting surface 530*c*.

The connection ring 532 has a substantially cylindrical shape centered on the rotational axis A, and includes an inner peripheral surface 532*a*, an outer peripheral portion 532*b*, an end surface 532*c* placed on the first end side in the first direction D1*a* second end side end surface 532*d* placed on the second end side in the first direction D1. In addition, a thread groove portion 532*e* is provided at the inner peripheral surface 532*a* of the connection ring 532.

Further, on the end surface 532*c*, bosses 532*f* and 532*g* having axes parallel to the rotational axis A are provided at substantially symmetric positions about the rotational axis A so as to project toward the first end side in the first direction D1.

An opening 532*h* is provided on the first end side, in the first direction D1, of the inner peripheral surface 532*a*.

A toner seal 531 is mounted closely to the end surface 532*c* so as to seal the opening 532*h* by adhesion or the like. In addition, the seal support member 530 is mounted to the connection ring 532 substantially coaxially from the first end side in the first direction D1. The through hole 530*f* and the oblong hole 530*g* of the seal support member 530 are engaged with the boss 532*f* and 532*g* of the connection ring 532, respectively, and the mounting surface 530*c* of the seal support member 530 is mounted by adhesion or the like on the end surface 532*c* with the toner seal 531 sandwiched therein.

Further, the opening 501*a* (see FIG. 128) of the accommodating portion 501 is connected to the outer peripheral portion 532*b* of the connection ring 532 without a gap by adhesion or the like. In this manner, the toner inside the accommodating portion 501 is sealed by the connection ring 532 and the toner seal 531.

Further, as shown in FIG. 130, the second end side end surface 532*d* of the connection ring 532 in the first direction D1 is provided with a recess 532*k* recessed toward the first end side in the first direction D1. The recess portion 532*k* is recessed in a circumferential shape and is arranged substantially coaxially with the rotational axis A. A ring seal 533, of an elastic member having a substantially cylindrical shape, is mounted to the recess 532*k* so as to be fitted from the second end side in the first direction D1, and is fixed to the connection ring 532 by adhesion or the like.

Further, the nozzle 502 is connected to the second end side in the first direction D1 of the connection ring 532.

Figure 131:
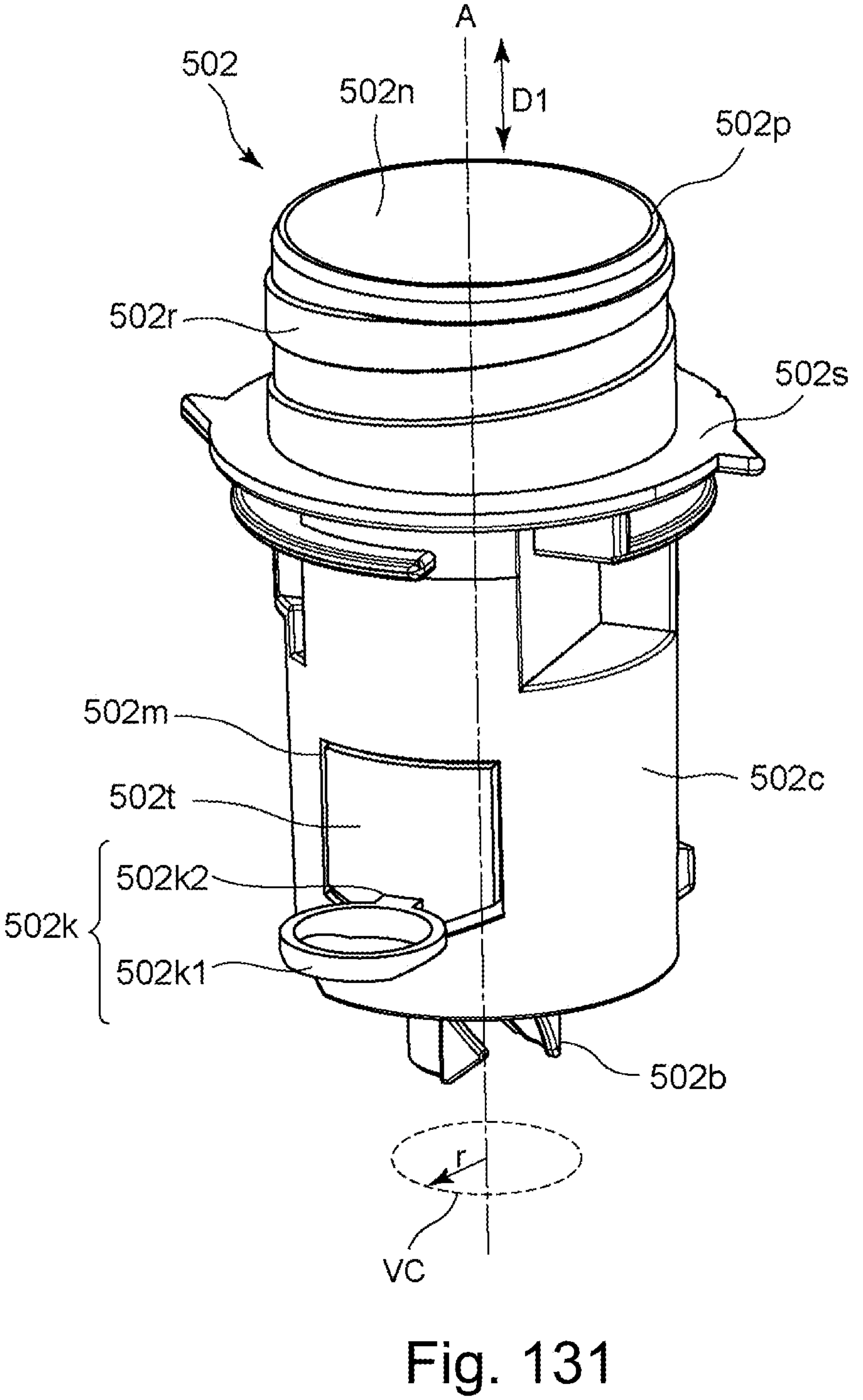

Referring to FIG. 131, the shape of the nozzle 502 will be described. FIG. 131 is a perspective view of the nozzle 502. As shown in FIG. 131, the nozzle 502 has a substantially cylindrical shape centered on the rotational axis A, and includes an end surface 502*p*, a thread ridge portion 502*r*, a disk portion 502*s*, a side surface 502*c* and a projecting portion 502*b*, in this order from the first end portion side in the first direction D1.

The thread ridge portion 502*r* of the nozzle 502 has a shape which is capable of meshing engagement with the thread groove portion 532*e* provided on the inner peripheral surface 532*a* of the connection ring 532, and the nozzle 502 and the connection ring 532 are connected by the threading therebetween. The disk portion 502*s* has a disk shape of a generally flat plate substantially coaxial with the rotational axis A, and has an outer diameter larger than that of the thread ridge portion 502*r*.

Further, the pack side shutter 203 is mounted to the nozzle 502.

The pack-side shutter 203 has the same shape as that of Embodiment 2, and therefore, the description thereof will be omitted.

Further, the connection method of the pack side shutter 203 and the nozzle 502 has the same structure as that of Embodiment 2, and therefore, the description thereof will be omitted.

Next, referring to FIGS. 131 and 132, the shape of the nozzle 502 will be described in detail.

Part (a) of FIG. 132 is a sectional view of the nozzle 502 taken along a line X501-X501 of a side view part (c) of FIG. 132. Part (b) of FIG. 132 is a detailed view of a DT portion of part (a) of FIG. 132. Part (c) of FIG. 132 is a side view of the toner pack 520 showing the position of the line along which the sectional view of part (a) of FIG. 132 is taken.

As shown in FIG. 131 and part (a) of FIG. 132, when the toner pack 520 is in fresh and unused state, the nozzle 502 having this structure does not have anything that corresponds to the discharge opening (discharge opening 202*a* of Embodiment 2). At a position corresponding to the discharge opening of the side surface 502*c* of the nozzle 502, a pull tab 502*k* projecting outward in the radial direction r of the imaginary circle VC centered on the rotational axis A is mounted. Therefore, the recess 502*n* is provided inside the nozzle 502 similarly to the passage through which the toner of Embodiment 2 passes, but it is not fluid communication with the side surface 502*c* of the nozzle 502. Here, the pull tab 502*k* is integrally formed with the nozzle 502. That is, the pull tab 502*k* is connected to the side surface 502*c* of the nozzle 502. The pull tab 502*k* has a substantially cylindrical shape, and the cylindrical axis is substantially parallel to the rotational axis A. The pull tab 502*k* has a cylindrical portion 502*k*1 and a connecting portion 502*k*2. The connecting portion 502*k*2 has a substantially plate-like shape which connects the side surface 502*c* of the nozzle 502 and the pull tab 502*k* with each other. Further, the side surface 502*c* is provided with a recess 502*m* which surrounds the connecting portion 502*k*2 and is recessed inward from the side surface 502*c*.

As shown in part (b) of FIG. 132, the recess 502*n* is provided on the rotational axis A side of the recess 502*m* with a wall portion 502*t* interposed therebetween. The wall portion 502*t* is a partially thin due to the provision of the recess 502*m* of the side surface 502*c*.

(User Operation)

Next, referring to FIGS. 133, 134, and 135, the user's operation will be described.

FIG. 133 is a schematic perspective view illustrating a first operation of the user. FIG. 134 is a side view illustrating a second operation of the user. FIG. 135 is a side view illustrating a third operation of the user.

FIG. 136 is a sectional view taken along a line X501-X501 shown in part (c) of FIG. 132 of FIG. 135.

As shown in FIG. 133, the user pulls the pull tab 502*k* in the direction of an arrow V50. Then, the thin wall portion formed by the recess 502*m* breaks from the portion close to the connecting portion 502*k*2, and the wall portion 502*t* is separated from the nozzle 502 along the shape of the recess 502*m*. In this manner, as shown in part (a) of FIG. 134, a discharge opening 502*a* in fluid communication with the recess 502*n* inside the nozzle 502 is formed on the side surface 502*c*. That is, the discharge opening 502*a* of the nozzle 502 is structured to be formed by breaking the wall portion 502*t* which is a part of the side surface 502*c* extending in the direction of the rotational axis A of the nozzle 502 and separating it from the nozzle 502.

At this time, as described above, the toner stored in the accommodating portion 501 is sealed by the connection ring 532 and the toner seal 531 so that the toner does not flow out through the discharge opening 502*a*.

Next, as shown in part (b) of FIG. 134, the user rotates the pack-side shutter 203 relative to the nozzle 502 in the direction of the arrow L, and by this operation, the discharge opening 502*a* is sealed by the pack-side seal 205.

Next, as shown in FIG. 135, the user rotates the connection ring 532 with respect to the nozzle 502 in the direction of the arrow L. The connection ring 532 performs relative movement in the direction of the arrow N along the thread groove portion 532*e* provided on the inner peripheral surface 532*a* substantially coaxial with the nozzle 502, while rotating in the direction of arrow L as shown in part (a) of FIG. 135, part (b) of FIG. 135 to part (c) of FIG. 135. The connection ring 532 moves until the second end side end surface 532*d* and the disk portion 502*s* of the nozzle 502 abut to each other (part (c) of FIG. 135).

At this time, as shown in part (c) of FIG. 136 and part (d) of FIG. 136, the end surface 502*p* of the nozzle 502 contacts the toner seal 531 while rotating relatively thereto, and breaks through the toner seal 531, so that the toner sealing state is broken.

Referring to FIGS. 136 and 137, the state of the above-described toner seal 531 will be described. Part (a) of FIG. 137 shows a state before the toner seal 531 is torn, and part (b) of FIG. 137 shows a state after the toner seal 531 is torn.

As shown in part (a) of FIG. 137, the toner seal 531 is provided with a precut portion 531*a* in advance. The precut portion 531*a* is formed radially around the rotational axis A.

As shown in part (d) of FIG. 136, the end surface 502*p* of the nozzle 502 abuts to the toner seal 531, which is thereby torn along the precut portion 531*a*. As shown in part (d) of FIG. 136 and part (b) of FIG. 137, the torn toner seal 531 is deformed so as to be folded between the outer cylindrical portion 530*b* and the inner cylinder 530*d* of the seal support member 530. In this manner, the toner seal 531 arranged so as to seal the opening 532$h$ (part (b) of FIG. 136) of the connection ring 532 is removed, and the toner seal by the toner seal 531 is released.

Thus, the toner sealing state by the toner seal 531 is released, the toner of the toner pack 520 flows into the nozzle 502, and is sealed by the pack side seal 205 described above.

Further, at this time, as shown in part (d) of FIG. 136, the ring seal 533 adhered to the connection ring 532 is compressed between the recess 532$k$ of the connection ring 532 and the disk portion 502$s$ of the nozzle 502 in the first direction D1. In this manner, the toner is sealed between the connection ring 532 and the nozzle 502.

Thereafter, the user mounts the toner pack 520 on the mounting portion 206 of the image forming apparatus 1 by the same operation as in Embodiment 2. Further, the operating lever 208 is rotated in the direction of arrow D, and the attachment to the image forming apparatus 1 is completed. The structure is the same as that of Embodiment 2, and therefore, the details will be omitted. In this manner, the toner of the accommodating portion 501 is replenished into the toner accommodating chamber 36 of the developer container 32 through the discharge opening 502$a$ of the nozzle 502 as in Embodiment 2.

After the toner is replenished, the discharge opening 502$a$ is resealed by rotating the operating lever 208 in the direction of arrow E, and the toner pack 520 is permitted to be removed from the apparatus main assembly as in Embodiment 2. The structure is the same as that of Embodiment 2, and therefore, the description thereof will be omitted.

In the foregoing description, the toner sealed state is released by breaking the toner seal 531. On the other hand, the toner sealing state may be released by the user manually pulling out the toner seal to the outside.

Referring to FIGS. 138, 139, 140, and 141 this structure will be described in detail.

FIG. 138 is an external view of a toner pack 5120 in which the toner seal is pulled out to the outside by the user. FIG. 139 is an exploded perspective view illustrating the mounting of the toner seal of the toner pack 5120. FIG. 140 is a partially exploded perspective view as seen in the direction opposite to that of the perspective view of FIG. 139. FIG. 141 is sectional views of the toner pack 5120.

As shown in FIG. 138, the toner pack 5120 is provided with a toner seal 534 and a pull tab 535 on the nozzle portion in the above-described structure.

The toner seal 534 has a thin film-like band shape, and is arranged substantially perpendicular to the rotational axis A. Further, the toner seal 534 is fixed to the first nozzle portion 5102, which will be described hereinafter, by adhesion or the like. Further, a pull tab 535 is connected by adhesion or the like to the toner seal 534 at the side opposite from the connecting portion relative to the first nozzle portion 5102. The pull tab 535 has a hollow substantially cylindrical shape and has an axis substantially perpendicular to the toner seal 534.

As shown in FIG. 139, in the nozzle of this structure, a second nozzle portion 537, a seal cap 536, and a first nozzle portion 5102 are arranged in this order from the first end portion side in the first direction D1.

The second nozzle portion 537 has a generally hollow cylindrical shape, and is arranged substantially coaxially with the rotational axis A. The second nozzle portion 537 includes a first end side end surface 537$e$, a first cylindrical portion 537$b$ placed substantially coaxially with the rotational axis A, a second cylindrical portion 537$c$ placed substantially coaxially with the rotational axis A and having a larger outer diameter than the first cylindrical portion, and a second end side end surface 537$d$, in the order named from the first end side in the first direction D1.

Further, as shown in FIG. 140, the second end side end surface 537$d$ is provided with a recess 537$a$ recessed toward the first end side in the first direction D1, a cylindrical recess 537$f$, and an oval cylindrical recess 537$g$. The seal cap 536 is fitted into the recess 537$a$ from the second end side in the first direction D1.

The seal cap 536 has a substantially flat plate shape and is placed perpendicular to the rotational axis A. The seal cap 536 has a base portion 536$a$ on the first end side in the first direction D1, and is provided with a plurality of fin portions 536$b$ projecting toward the second end side in the first direction D1 which is the opposite side. The fin portions 536$b$ have a generally flat plate shape extending substantially parallel to the rotational axis A, and are arranged at equal intervals toward the outside in the radial direction r of the imaginary circle VC centered on the rotational axis A. The seal cap 536 is made of an elastic material such as an elastomer, and in particular, the plurality of fin portions 536$b$ are structured to be freely bent in the radial direction r of the imaginary circle VC centered on the rotational axis A.

As shown in FIG. 139, the first nozzle portion 5102 has a generally cylindrical shape and is placed substantially coaxially with the rotational axis A. The first nozzle portion 5102 is provided with a first end side end surface 5102$d$, a side surface 5102$c$ perpendicular to the rotational axis A, and a projecting portion 5102$b$, in this order from the first end side in the first direction D1. The side surface 5102$c$ and the projecting portion 5102$b$ have the same structures as the above-mentioned side surface 502$c$ and the projecting portion 502$b$, respectively, and therefore, the description thereof will be omitted.

The first end side end surface 5102$d$ is provided with an opening 5102$a$ leading to a passage through which the toner of Embodiment 2 passes. In addition, on the end side surface 5102$d$ is provided with, two bosses 5102$f$ and 5102$g$ projecting toward the first end side in the first direction D1 at positions substantially symmetrically with respect to the rotational axis A.

As shown in FIG. 139, a toner seal 534 is fixed on the first end side end surface 5102$d$ so as to cover the opening 5102$a$ by adhesive or the like. The toner seal 534 is bonded so as to cover the opening 5102$a$, and then folded back so as to overlap the bonded portion.

Thereafter, the second nozzle portion 537 is mounted, coaxially with the rotational axis A, to the first end surface 5102$d$ from the first end side in the first direction D1, with the seal cap 536 mounted. At this time, positioning is effected by carrying out the mounting so that the two bosses 5102$f$ and 5102$g$ of the first nozzle portion 5102 fit into the cylindrical recess 537$f$ and the oval cylindrical recess 537$g$ of the second nozzle portion 537, respectively. The second nozzle portion 537 is mounted to the first nozzle portion 5102 by adhesive or the like, and the seal cap 536 is mounted in the manner as if the plurality of fin portions 536$b$ trample the folded toner seal 534. In this manner, the toner seal is effected so that the seal cap 536 fills the space between the first nozzle portion 5102, the second nozzle portion 537, and the toner seal 534.

As shown in part (a) of FIG. 141, when the user pulls out the pull tab 535 toward the outside in the radial direction r of the imaginary circle VC centered on the rotational axis A, the toner seal 534 is dismounted from the first nozzle portion 5102 is removed from the toner pack 5120 and separated from the toner pack 5120. At this time, as shown in part (b)

of FIG. 141, the plurality of fin portions 536*b* of the seal cap 536 press the toner seal 534 in the first direction D1, and after the toner seal 534 is pulled out, the plurality of fin portions 536*b* abuts against the first end side end surface 5102*d* of the first nozzle portion 5102, so that the toner is sealed between the first nozzle portion 5102 and the second nozzle portion 537.

With the above-described structure, the toner seal is released by the user pulling out the toner seal 534 to the outside.

Further, in the above-described plurality of structures, the use is made with the toner seals 531 and 534 has been described, it is also possible to employ a structure in which the toner seals 531 and 534 are not provided, and instead the instruction manual or the like tells that the pull tab 502*k* of the nozzle 502 is to be pulled out by the user with the second end side of the first direction D1 being made upward in advance that the is peeled off.

Embodiment 6

Next, referring to FIGS. 142 to 147, Embodiment 6 will be described below. In this embodiment, as compared with Embodiment 3, the second restriction releasing portion is movable relative to the first restriction releasing portion between a first position where the first slope and the second slope aligned with each other, and a second position where it is rotated about the rotational axis A. The description on the same points as in the above-described embodiment will be omitted. In particular, of the elements disclosed in this embodiment, those corresponding to the members described in Embodiments 2 and 3 are assigned the same names as those of the members of Embodiments 2 and 3, and only the points different from these Embodiments will be described.

(Toner Pack Structure)

Referring to FIGS. 142 to 144, a toner pack 620 in this embodiment will be described. FIG. 142 is an illustration of the entire toner pack 620 according to this embodiment. FIG. 143 is an exploded perspective view of a restriction releasing mechanism 604, and is a view as seen from the second end side (nozzle side) in the first direction D1. FIG. 144 is a detailed illustration of a shape and an assembly method of the restriction releasing mechanism 604 (projecting portion). Part (a) of FIG. 144 shows a method of assembling the second restriction releasing member 604B to the first restriction releasing member 604A, and part (b) of FIG. 144 shows the assembly method of the fixing pin 630 to the first restriction releasing member 604A and the second restriction releasing member 604B.

As shown in FIG. 142, in the toner pack 620 of this embodiment, in addition to the toner accommodating portion 201, the nozzle 302, and the pack side shutter 203, a restriction releasing mechanism 604 partially projecting in the arrow N direction (downward) from the end surface 203*c* of the pack side shutter 203 is provided.

Next, referring to FIGS. 143 and 144, the restriction releasing mechanism 604 will be described.

As shown in FIG. 143, the restriction releasing mechanism 604 comprises a first restriction releasing member 604A, a second restriction releasing member 604B, and a fixing pin 630.

The first restriction releasing member 604A has a generally cylindrical shape including a cylindrical portion 604Ac centered on the rotational axis A (central axis). At the end of the cylindrical portion 604Ac in the arrow U direction (upward direction), a substantially disk-shaped end portion 604Af projecting in the radial direction r of the imaginary circle VC centered on the rotational axis A is provided. A pair of projections 604Ae projecting in the arrow N direction (downward) is provided at the end in the imaginary circle VC centered on the rotational axis A of the end portion 604Af in the radial direction r. The projection 604Ae has a shape which is 180-degree rotationally symmetric with respect to the rotational axis A. In addition, a proper gap 604Ai is provided between the cylindrical portion 604Ac and the projection 604Ae in the radial direction r of the imaginary circle VC centered on the rotational axis A so that the second restriction releasing member 604B which will be described hereinafter can be assembled up to the end portion 604Af (see FIG. 145). Further, as shown in part (a) of FIG. 144, the end portion 604Af is provided with a hole portion 604Ah centered on the rotational axis A. The cylindrical portion 604Ac is provided with a pair of oblong holes 604Ad formed along the rotational direction K, and the pair of oblong holes 604Ad have symmetric shapes with respect to the rotational axis A. The semicircular round holes at both ends in the longitudinal direction of the oblong hole 604Ad each includes, a round hole portion 604Ad1 in the upstream side in the rotational direction K, a round hole portion 604Ad3 in the downstream side in the rotational direction K, and an oblong hole portion 604Ad2 connecting between the round hole portion 604Ad1 and the round hole portion 604Ad3. A straight line connecting the center of one round hole portion 604Ad1 and the center of the other round hole portion 604Ad1 and a straight line connecting the center of one round hole portion 604Ad3 and the other round hole portion 604Ad3 pass the rotational axis A orthogonally. Further, the diameters of the round holes 604Ad1 and 604Ad3 are selected to be slightly larger than the diameter of the fixing pin 630. Further, the width of the oblong hole portion 604Ad2 in the rotational axis A direction is selected to be slightly smaller than the diameter of the fixing pin 630. The reason for this will be described when the operation of the restriction releasing mechanism 604 is explained. Referring the end portion of the cylindrical portion 604Ac on the arrow N direction (downward) side as the end portion 604Ag, a first restriction releasing portion 604Aa and a first restriction releasing portion 604Ab constituting a pair and projecting from the end portion 604Ag in the arrow N direction (downward). The first restriction releasing portion 604Aa and 604Ab have shapes which is 180-degree rotationally symmetric with respect to the rotational axis A. Further, of the first restriction releasing portion 604Aa and the first restriction releasing portion 604Ab constituting the pair, the one closer to the opening 302*a* of the nozzle 302 is the first restriction releasing portion 604Aa, in a state where the restriction releasing mechanism 604 which will be described hereinafter is assembled to the nozzle 302. The first restriction releasing portion 604Aa comprises a first slope 604Aa1 (first inner engaging surface, first downward surface, first downward guide surface, first force applying surface, first push surface) and a first abutment surface 604Aa2. The first slope 604Aa1 and the first abutment surface 604Aa2 have the same shapes as the first slope 304*a*1 and the first abutment surface 304*a*5 of the first restriction releasing portion 304*a* of Embodiment 3 (see FIG. 106), respectively, and therefore, the description thereof will be omitted. Further, the first restriction releasing portion 604Ab has a shape which is 180 degree rotationally symmetric with the first restriction releasing portion 604Aa with respect to the rotational axis A as described above, and therefore, the description of the detailed shape is omitted. The first restriction releasing portion 604Ab does not necessarily have to be 180-degree rotationally symmetric with the first restriction releasing portion 604Aa with respect to the rotational axis A. The first restriction releasing portion 604Ab is preferably rotationally symmetric with the first restriction releasing portion 604Aa at 150 degrees or more and 210 degrees or less with respect to the rotational axis A.

The second restriction releasing member 604B has a generally cylindrical shape including a cylindrical portion 604Bc centered on the rotational axis A. An inner diameter portion of the cylindrical portion 604Bc thereof is an inner peripheral surface 604Bg, an end of the cylindrical portion 604Bc on the arrow N direction (lower) side is an end portion 604Bf, an end on the arrow U direction (upper) side is an end portion 604Be. The cylindrical portion 604Bc is provided with a pair of hole portions 604Bd which are 180-degree rotationally symmetric with respect to the rotational axis A. A straight line connecting the centers of the pair of hole portions 604Bd passes through the rotational axis A substantially orthogonally. The cylindrical portion 604Bc is provided with a pair of second restriction releasing portions 604Ba and 604Bb projecting from the end portion 604Bf in the direction (downward) of the arrow N. The pair of second restriction releasing portion 604Ba and second restriction releasing portion 604Bb have shapes of 180 degree rotational symmetry about the rotational axis A. In addition, of the second restriction releasing portion 604Ba and the second restriction releasing portion 604Bb, the one closer to the opening 302*a* of the nozzle 302 is the second restriction releasing portion 604Ba, in a state that the restriction releasing mechanism 604 which will be described hereinafter is assembled to the nozzle 302. The second restriction releasing portion 604Ba comprises a second slope 604Ba1 (first outer engagement surface, second downward surface, second downward guide surface, second force application surface, second push surface), a flat surface 604Ba2 (second engagement surface, an upward surface, an upward engaging surface, an upward push surface, an upward force applying surface), and a second abutment surface 604Ba3 (contacted surface). The second slope 604Ba1, the flat surface 604Ba2, and the second abutment surface 604Ba3 have the same shapes as the second slope 304*a*2, the flat surface 304*a*3, and the second abutment surface 304*a*6 in Embodiment 3 (see FIG. 106), and therefore, the detailed description will be omitted. In addition, the second restriction releasing portion 604Bb has a shape which is 180-degree rotationally symmetric with the second restriction releasing portion 604Ba with respect to the rotational axis A as described above, and therefore, the description of the detailed shape is omitted. The second restriction releasing portion 604Bb does not necessarily have to be 180-degree rotationally symmetric with the second restriction releasing portion 604Ba with respect to the rotational axis A. The second restriction releasing portion 604Bb is preferably 150 degrees or more and 210 degrees or less rotationally symmetric with the second restriction releasing portion 604Ba with respect to the rotational axis A.

As shown in FIG. 143, the fixing pin 630 has an elongated substantially cylindrical shape centered on the axis B60.

(Assembling of Toner Pack)

Referring to FIGS. 144 and 145, the assembling of the toner pack 620 according to this embodiment will be described. FIG. 145 is a sectional view of the toner pack 620 after the assembling, taken along a line X601-X601 shown in FIG. 142 and along the pin 310 with the rotational axis A as the center.

The assembly other than the restriction releasing mechanism 604 is the same as in Embodiments 2 and 3, and therefore, the description thereof will be omitted.

First, as shown in part (a) of FIG. 144, the second restriction releasing member 604B is telescoped on the first restriction releasing member 604A in the arrow U direction (upward) so that the inner peripheral surface 604Bg is relatively inserted into the cylindrical portion 604 Ac. The inner peripheral surface 604Bg of the second restriction releasing member 604B and the cylindrical portion 604Ac of the first restriction releasing member 604A are supported slidably relative to each other. As described above, since the gap 604Ai (see FIG. 145) is provided between the projection 604Ae of the first restriction releasing member 604A and the cylindrical portion 604Ac, the end portion 604Be of the second restriction releasing member 604B can be inserted until it comes into contact with the end portion 604Af of the first restriction releasing member 604A.

Next, referring to part (b) of FIG. 144, the assembly of the fixing pin 630 to the first restriction releasing member 604A and to the second restriction releasing member 604B will be described. Prior to the assembling of the fixing pin 630, the center of the hole portion 604Bd of the second restriction releasing member 604B and the center of the round hole portion 604Ad1 of the oblong hole 604Ad of the first restriction releasing member 604A are aligned with each other. From this state, the fixing pin 630 is inserted in the direction of an arrow V60 through one of the hole portions 604Bd of the second restriction releasing member 604B, one of the round holes 604Ad1 of the first restriction releasing member 604A, the other round hole 604Ad1, and the other hole portion 604Bd of the second restriction releasing member 604B, in this order. The fixing pin 630 is fixed to the hole portion 604Bd of the second restriction releasing member 604B by means such as adhesion, clamping, or press fitting. By this, the assembly of the restriction releasing mechanism 604 is completed.

Next, referring to FIG. 145, the assembly of the restriction releasing mechanism 604 on the nozzle 302 will be described. The restriction releasing mechanism 604 is assembled to the nozzle 302 in the direction of the arrow U (upward), and the cylindrical portion 604Ac is supported by the cylindrical support portion 302*b*. In addition, a pair of projections 604Ae of the first restriction releasing member 604A are inserted into a pair of cut-away portions 302*c* of the nozzle 302. By the engagement between the projection 604Ae of the first restriction releasing member 604A and the cut-away portion 302*c*, the movement of the first restriction releasing member 604A relative to the nozzle 302 around the rotational axis A is restricted. Therefore, the first restriction releasing member 604A is movably supported only in the direction of the rotational axis A relative to the nozzle 302. Further, when the first restriction releasing member 604A is inserted into the nozzle 302 in the direction of the arrow U (upward), the small diameter shaft portion 331*c* of the shaft member 331 is inserted into the hole portion 604Ah of the first restriction releasing member 604A, and the end portion 604Af abuts on the shaft ring 334.

Similarly to Embodiment 3, the shaft ring 335 is telescoped over the small diameter shaft portion 331*c* to a position where the hole 335*a* abuts against the end portion 604Aj of the first restriction releasing member 604A, and is fixed to the small diameter shaft portion 331*c* of the shaft member 331. Through the above-described process, the assembly of the restriction releasing mechanism 604 to the nozzle 302 is completed.

(Operation of Restriction Releasing Mechanism)

Next, referring to FIGS. 146 and 147, the operation of the restriction releasing mechanism will be described. FIG. 146 is an illustration of the operation of the restriction releasing mechanism 604 in this embodiment. Part (a) of FIG. 146 shows a first position (aligned position) in which the second restriction releasing member 604B is such that the first slope 604Aa1 of the first restriction releasing member 604A and the second slope 604Ba1 of the second restriction releasing member 604B are aligned with each other. Part (b) of FIG. 146 shows a state in which the second restriction releasing member 604B is in the second position (non-aligned position) which is the position rotated in the rotational direction K from the first position. FIG. 147 is a detailed view of the toner pack 620 as viewed from the side (nozzle side) of the second end portion in the first direction D1, and part (a) thereof shows a state in which the second restriction releasing member 604B is in the first position, and part (b) shows a state in which the second restriction releasing member 604B is in the second position.

First, as shown in part (a) of FIG. 146, when the second restriction releasing member 604B is in the first position, the center of the hole portion 604Bd of the second restriction is coincident with the center of the center of the round hole portion 604Ad1 of the oblong hole 604Ad of the first restriction releasing member 604A, by way of the fixing pin 630. In this state, as shown in part (a) of FIG. 147, the first restriction releasing portion 604Aa and the second restriction releasing portion 604Ba is such that the first slope 604Aa1 and the second slope 604Ba1 are aligned with each other both in the rotational direction K about the rotational axis A and in the direction of the rotational axis A. That is, the first slope 604Aa1 and the second slope 604Ba1 are at the same position in the circumferential direction of the imaginary circle VC.

In order to move the second restriction releasing member 604B to the second position from this state (first position), the user rotates the second restriction releasing member 604B relative to the first restriction releasing member 604A in the rotational direction K about the rotational axis A. In interrelation with this, the fixing pin 630 (see FIG. 146) are fixed by the hole portion 604Bd of the second restriction releasing member 604B at both ends thereof rotates in the rotational direction K about the rotational axis A. The fixing pin 630 passes from the round hole portion 604Ad1 upstream side (in the rotational direction K) of the oblong hole 604Ad of the first restriction releasing member 604A, through the oblong hole portion 604Ad2, to the downstream side round hole portion 604Ad3 in the rotational direction K. By this, the second restriction releasing member 604B rotates in the rotational direction K by the amount of rotation of the fixing pin 630, and moves to the second position as shown in part (b) of FIG. 146. At this time, the center of the hole portion 604Bd of the second restriction releasing member 604B is coincident with the center of the round hole portion 604Ad3 of the oblong hole 604Ad of the first restriction releasing member 604A by way of the fixing pin 630. That is, the first slope 604Aa1 and the second slope 604Ba1 are at different positions in the circumferential direction of the imaginary circle VC.

Here, in the direction of the rotational axis A, a width of the oblong hole portion 604Ad2 of the oblong hole 604Ad is slightly smaller than the diameter of the fixing pin 630. In addition, the diameters of the round holes 604Ad1 and 604Ad3 are slightly larger than the diameter of the fixing pin 630. By this, when the fixing pin 630 is placed at the round hole portions 604Ad1 and 604Ad3, it cannot move to the oblong hole portion 604Ad2 unless a certain force is applied. Therefore, when the second restriction releasing member 604B is in the first position or the second position, the position is prevented from changing at an unintended timing, and therefore, the user can apply the force to change the position at a user's own timing. Further, when the fixing pin 630 moves, the resistance is different between the long hole portion 604Ad2 of the oblong hole 604Ad and the round hole portions 604Ad1 and 604Ad3, so that the applied force changes. When the user's hand operating (rotating) the second restriction releasing member 604B feels this change in force, the user can recognizes that the operation of the second restriction releasing member 604B is completed.

When the second restriction releasing member 604B is located at the second position, as shown in part (b) of FIG. 147, the first restriction releasing portion 604Aa and the second restriction releasing portion 604Ba are such that the first slope 604Aa1 and the second slope 604Ba1 are at different positions in the rotational direction about the rotational axis A and in the direction of the rotational axis A. The positional relationship at this time between the first restriction releasing portion 604Aa and the second restriction releasing portion 604Ba is set to be the same as that of the first restriction releasing portion 304*a* of Embodiment 3 (see FIG. 106).

In order to move the second restriction releasing member 604B from the second position to the first position in this state, the second restriction releasing member 604B is rotated in the direction of arrow L about the rotational axis A relative to the first restriction releasing member 604A. By this, the second restriction releasing member 604B moves from the second position to the first position through reverse process of the movement from the first position to the second position.

(Mounting and Dismounting of Toner Pack)

Next, mounting and dismounting of the toner pack 620 to and from the mounting portion 206 will be described. When mounting the toner pack 620 on the mounting portion 206, the second restriction releasing member 604B shown in part (b) of FIG. 147 is moved to the second position in advance before mounting. As described above, when the second restriction releasing member 604B is in the second position, the relationship between the first restriction releasing portion 604Aa of the first restriction releasing member 604A and the second restriction releasing portion 604Ba of the second restriction releasing member 604B is the same as that of the first restriction releasing portion 304*a* of Embodiment 3. Therefore, the mounting and dismounting operations of the toner pack 620 to and from the mounting portion 206 is the same as the operations of mounting and dismounting of the toner pack 320 to and from the mounting portion 206 of Embodiment 3. Therefore, the description thereof will be omitted.

Embodiment 7

Next, referring to FIGS. 148 to 161, Embodiment 7 will be described in the following. In this embodiment, the structure of the restriction releasing member is different from that in Embodiment 3. The same points as in the above-described embodiment will be omitted. In particular, of the elements disclosed in this embodiment, those corresponding to the members described in Embodiments 2 and 3 are assigned the same names as the members of Embodiments 2 and 3, and only the points different from Embodiments 2 and 3 will be described.

(Toner Pack Structure)

Referring to FIGS. 148 to 151, the toner pack 720 in this embodiment will be described. FIG. 148 is an illustration of the entire toner pack 720 in this embodiment. FIG. 149 is an exploded perspective view of a restriction releasing mechanism 704. Part (a) of FIG. 149 is a view as seen from a second end side (nozzle side) in a first direction D1, and part (b) of FIG. 149 is a view as seen from a first end side (accommodation portion side) in the first direction D1. FIG. 150 is a detailed view of a first restriction releasing member 704A and a second restriction releasing member 704B. Part (a) of FIG. 150 shows the first restriction releasing member 704A, and part (b) of FIG. 150 shows the second restriction releasing member 704B. FIG. 151 is a sectional view of the toner pack 720 after assembly, taken along a line X701-X701 shown in FIG. 148 and along a pin 310 with the rotational axis A as the center.

As shown in FIG. 148, in the toner pack 720 of this embodiment includes a restriction releasing mechanism 704 (projection portion) which partially projects in the direction (downward) of the arrow N from the end surface 203*c* of the pack-side shutter 203, in addition to the accommodating portion 201 for accommodating the toner, the nozzle 302, and the pack-side shutter 203.

Next, referring to FIG. 149, the restriction releasing mechanism 704 will be described. The restriction releasing mechanism 704 comprises a first restriction releasing member 704A (first projection member), a second restriction releasing member 704B (second projection member), an initialization spring 730, and an advancing/retracting member 731 (moving member).

The first restriction releasing member 704A has a generally cylindrical shape including a cylindrical portion 704Af centered on the rotational axis A (central axis). The end portion of the cylindrical portion 704Af on the arrow N direction (lower) side is referred to as an end portion 704Ag, and the inner peripheral surface of the cylindrical portion 704Af is referred to as an inner peripheral surface 704Ae (first inner peripheral surface). The inner peripheral surface 704Ae is a surface extending in the direction of the rotational axis A with the rotational axis A as the center. The cylindrical portion 704Af is provided with a pair of first restriction releasing portions 704Aa and 704Ab projecting from the end portion 704Ag in the direction of the arrow N (downward). Further, the cylindrical portion 704Af is provided with a pair of cut-away portions 704Ac and 704Ad (first guide groove, first slit). The first restriction releasing portion 704Ab and the cut-away portion 704Ad have 180-degree symmetric shapes of the first restriction releasing portion 704Aa and the cut-away portion 704Ac, respectively with respect to the rotational axis A. In addition, in a state in which the restriction releasing mechanism 704 which will be described hereinafter is assembled to the nozzle 302, the one of the first restriction releasing portion 704Aa and 704Ab that is closer to the opening 302*a* of the nozzle 302 in the circumferential direction of the imaginary circle VC is the first restriction releasing portion 704Aa. Similarly, of the cut-away portions 704Ac and 704Ad constituting the pair, the one closer to the opening 302*a* of the nozzle 302 in the circumferential direction of the imaginary circle VC is referred to as the cut-away portion 704Ac. Next, referring to part (a) of FIG. 150, the detailed shapes of the first restriction releasing portion 704Aa and the cut-away portion 704Ac will be described. A first restriction releasing surface 704Aa1 (downstream end surface) substantially parallel to the rotational axis A is provided on the end surface, on the downstream side in the rotational direction K, of the first restriction releasing portion 704Aa. That is, the first restriction release surface 704*a*1 (first inner engaging surface, first force applying surface, first push surface) extends in the direction of the rotational axis A and faces downstream in the rotational direction K (first rotational direction). The cut-away portion 704Ac is formed by an entrance portion 704Ac1, an inclined portion 704Ac2, and a straight portion 704Ac3. The entrance portion 704Ac1 is a cut-away portion formed in the direction of the arrow U (upward), and is provided on the end portion 704Ag on the downstream side in the rotational direction K from the first restriction releasing surface 704Aa1. The inclined portion 704Ac2 is a cut-away portion formed, on the upstream side in the rotational direction K, in the direction of the arrow U (upward), and is provided connected with the entrance portion 704Ac1. The straight portion 704Ac3 is a cut-away portion formed substantially parallel to the rotational axis A in the direction of the arrow U (upward), and is provided connected with the inclined portion 704Ac2. A width of the cut-away portion 704Ac is slightly larger than the diameter of the pin 731*b* of the advancing/retracting member 731, which will be described hereinafter, and the pin 731*b* is selected to be able to path therethrough. The first restriction releasing portion 704Ab and the cut-away portion 704Ad have 180-degree symmetric shapes of the first restriction releasing portion 704Aa and the cut-away portion 704Ac as described above with respect to the rotational axis A, and therefore, the description thereof is omitted. In this embodiment, the cut-away portion 704Ac is provided so that the entrance portion 704Ac1 is on the downstream side of the first restriction releasing surface 704Aa1 in the rotational direction K, but this structure is not limiting to the present invention. The cut-away portion 704Ac may be provided at any position in the rotational direction K as long as it does not hinder the formation of the first restriction releasing portion 704Aa and the second restriction releasing portion 704Ba of the second restriction releasing member 704B which will be described hereinafter.

As shown in FIG. 149, the second restriction releasing member 704B has a generally cylindrical shape including a cylindrical portion 704Bc centered on the rotational axis A. An end of the cylindrical portion 704Bc on the (lower) side in the arrow N is referred to as an end portion 704Bh, and an inner peripheral surface of the cylindrical portion 704Bc is referred to as an inner peripheral surface 704Be (second inner peripheral surface). The inner peripheral surface 704Be is a surface extending in the direction of the rotational axis A with the rotational axis A as the center. An end portion 704Bf is on the arrow U direction (upper side) side of the cylindrical portion 704Bc. The end portion 704Bf is provided with a hole portion 704Bg centered on the rotational axis A. The cylindrical portion 704Bc is provided with a pair of projections 704Bd projecting in the radial direction r of the imaginary circle VC centered on the rotational axis A. In addition, the pair of projections 704Bd are provided so as to have shapes 180-degree symmetric with respect to the rotational axis A. The cylindrical portion 704Bc is provided with a pair of second restriction releasing portions 704Ba (first projections) and second restriction releasing portions 704Bb (second projections) projecting from the end portion 704Bh in the direction of the arrow N (downward). Further, the cylindrical portion 704Bc is provided with a pair of cut-away portions 704Bi (see FIG. 150) and 704Bj (second guide groove, second slit). The second restriction releasing portion 704Bb and the cut-away portion 704Bj have shapes 180 degree symmetric about the rotational axis A with respect to the second restriction releasing portion 704Ba and the cut-away portion 704Bi, respectively. Further, in a state where the restriction releasing mechanism 704 which will be described hereinafter is assembled to the nozzle 302, of the second restriction releasing portions 704Ba and 704Bb constituting the pair, the second restriction releasing portion 704Ba is closer to the opening 302*a* of the nozzle 302 in the circumferential direction of the imaginary circle VC. Similarly, of the pair of cut-away portions 704Bi and 704Bj, the cut-away portion 704Bi is closer to the opening 302*a* of the nozzle 302 in the circumferential direction of the imaginary circle VC.

Next, referring to part (b) of FIG. 150, the detailed shapes of the second restriction releasing portion 704Ba and the cut-away portion 704Bi will be described. The second restriction releasing portion 704Ba comprises a second slope 704Ba1, a flat surface 704Ba2, and an abutment surface 704Ba3. The second slope 704Ba1 (second outer engaging surface, second downward guide surface, second downward surface), flat surface 704Ba2 (second engaging surface, upward surface, upward engaging surface, upward push surface), abutment surface 704Ba3 (contacted surface) have the shapes similar to those of the second slope 304*a*2, the flat surface 304*a*3, and the second abutment surface 304*a*6 (see FIG. 106), respectively in Embodiment 3, and therefore, the detailed description thereof will be omitted. The cut-away portion 704Bi is formed substantially parallel to the rotational axis A in the direction of the arrow U (upward), and is provided on the end portion 704Bh on the downstream side, in the rotational direction K, of the second restriction releasing portion 704Ba. The cut-away portion part 704Bi has a function of determining the phase in the rotational direction K with the first restriction releasing portion 704Aa which will be described hereinafter, and therefore, it is determined by the position of the cut-away portion 704Ac of the first restriction releasing portion 704Aa. In addition, the surface of the end portion 704Bf of second restriction releasing member 704B on the arrow N direction (lower side) side is provided with a support cylinder 704Bk centered on the rotational axis A (see FIG. 151).

As shown in FIG. 149, the initialization spring 730 is a compression coil spring having a central axis aligned with the rotational axis A.

The advancing/retracting member 731 is a generally disk-shaped member including a disk portion 731*c* centered on the rotational axis A and a pair of pins 731*b*. An end surface of the disk portion 731*c* in the arrow N direction (downward) is provided as a pushed surface 731*a*. The pair of pins 731*b* are provided so as to project from the outer peripheral surface of the disk portion 731*c* in the radial direction r of the imaginary circle VC centered on the rotational axis A. The pair of pins 731*b* are arranged 180 degrees symmetrically with respect to the rotational axis A. A support cylinder 731*d* is provided at an end of the disk portion 731*c* in the arrow U direction (upward direction).

(Assembly of Toner Pack)

Referring to FIGS. 149 and 151, the assembling of the toner pack 720 according to this embodiment will be described. The assembling except for the restriction releasing mechanism 704 is similar to that of Embodiments 2 and 3, and therefore, the description thereof will be omitted.

As shown in part (a) of FIG. 149, for the assembling of the restriction releasing mechanism 704, the second restriction releasing member 704B, the shaft ring 335, the first restriction releasing member 704A, the initialization spring 730, and the advancing/retracting member 731 are assembled to the nozzle 302 assembled up to the shaft ring 334, in this order in the direction of arrow U (upward). The assembly order of the first restriction releasing member 704A and the initialization spring 730 may be interchanged.

As shown in FIG. 151, the second restriction releasing member 704B is telescoped on the small diameter shaft portion 331*c* of the shaft member 331 at the, the hole portion 704Bg until it abuts to the shaft ring 334, and the hole portion 704Bg and the small diameter shaft portion 331*c* are slidable relative to each other. In addition, for the second restriction releasing member 704B, the cylindrical portion 704Bc is telescoped on the cylindrical support portion 302*b*, and the projection 704Bd is inserted into the cut-away portion 302*c* of the nozzle 302 (see FIG. 149). By the engagement between the projection 704Bd of the second restriction releasing member 704B and the cut-away portion 302*c* of the nozzle 302, the movement of the second restriction releasing member 704B relative to the nozzle 302 around the rotational axis A is restricted. Therefore, the second restriction releasing member 704B is supported movably only in the direction of the rotational axis A relative to the nozzle 302.

The shaft ring 335 is telescoped on the small diameter shaft portion 331*c* at the hole 335*a* until it abuts to the end portion 704Bf of the second restriction releasing member 704B with respect to the small diameter shaft portion 331*c*, and is fixed to the small diameter shaft portion 331*c*.

The first restriction releasing member 704A is inserted into the second restriction releasing member 704B so that the cylindrical portion 704Af is rotationally supported by the inner peripheral surface 704Be. In other words, the first restriction releasing member 704A is provided rotatably about the rotational axis A inside the inner peripheral surface 704Be of the second restriction releasing member 704B in the radial direction r. In addition, the first restriction releasing member 704A is inserted until it abuts to the end portion 704Bf of the second restriction releasing member 704B. And, a retaining portion (not shown) is provided on the inner peripheral surface 704Be of the second restriction releasing member 704B so as to project inward in the radial direction r of the imaginary circle VC centered on the rotational axis A. By engagement between the retaining portion and the first restriction releasing member 704A, the movement of the first restriction releasing member 704A in the rotational axis A direction is restricted. Therefore, the first restriction releasing member 704A is supported so as to be movable (rotatable) only about the rotational axis A relative to the second restriction releasing member 704B.

The initialization spring 730 is fixed to the support cylinder 704Bk of the second restriction releasing member 704B by press fitting or the like.

The advancing/retracting member 731 is inserted into the first restriction releasing member 704A so that the disk portion 731*c* is slidably supported by the inner peripheral surface 704Ae. In other words, the advancing/retracting member 731 is provided so as to be movable in the direction of the rotational axis A inside the inner peripheral surface 704Ae of the first restriction releasing member 704A in the radial direction r. At this time, the pin 731*b* of the advancing/retracting member 731 shown in FIG. 149 is inserted into the entrance portions 704Ac1, 704Ad1 of the cut-away portions 704Ac, 704Ad of the first restriction releasing member 704A and into the cut-away portions 704Bi, 704Bj of the second restriction releasing member 704B (Figure See 150). By this, the position of the first restriction releasing member 704A relative to the second restriction releasing member 704B is restricted in the rotational direction K by the pin 731*b* of the advancing/retracting member 731. In addition, by engaging the pin 731*b* with the cut-away portion 704Bi, the advancing/retracting member 731 is restricted in the rotation around the rotational axis A relative to the second restriction releasing member 704B. Therefore, the advancing/retracting member 731 is supported movably only in the direction of the rotational axis A relative to the second restriction releasing member 704B.

Finally, the advancing/retracting member 731 is fixed by fixing the support cylinder 731*d* to the end portion of the initialization spring 730 by press fitting, adhesion or the like. The restriction releasing mechanism 704 is assembled by the above process. The initialization spring 730 urges the advancing/retracting member 731 in the direction away from the accommodating portion 201 in the direction of the rotational axis A.

(Operation of Restriction Releasing Mechanism)

Next, referring to FIG. 152, the operation of the restriction releasing mechanism 704 will be described. FIG. 152 is a perspective view illustrating the operation of the restriction releasing mechanism 704. Part (a) of FIG. 152 shows a state in which the advancing/retracting member 731 has moved in the direction of arrow N (downward) relative to the first restriction releasing member 704A, and the pin 731*b* is in the entrance portion 704Ac1. Part (b) of FIG. 152 shows a state in which the pin 731*b* of the advancing/retracting member 731 is in contact with the inclined portion 704Ac2 of the first restriction releasing member 704A. Part (c) of FIG. 152 shows a state in which the advancing/retracting member 731 has moved in the direction of the arrow U (upward) relative to the first restriction releasing member 704A, and the pin 731*b* is in the straight portion 704Ac3.

As shown in part (a) of FIG. 152, when the advancing/retracting member 731 is placed in arrow N direction side of (below) the first restriction releasing member 704A, the pin 731*b* of the advancing/retracting member 731 is placed in the entrance portion 704Ac1 of the first restriction releasing member 704A. When a force F700 in the arrow U direction (upward) is applied to the pushed surface 731*a* of the advancing/retracting member 731, the advancing/retracting member 731 is moved in the arrow U direction (upward) against the spring force of the initialization spring 730 (see FIG. 151) due to the force F700. The arrow U direction is the direction in which the advancing/retracting member 731 approaches the accommodating portion 201. At this time, since the pin 731*b* is restricted in the movement in the rotational direction K by the cut-away portion 704Bi of the second restriction releasing member 704B, the advancing/retracting member 731 moves only in the arrow U direction (upward).

When the advancing/retracting member 731 receives the force F700 in the arrow U direction (upward) and continues to move further in the arrow U direction (upward), the pin 731*b* abuts on the inclined portion 704Ac2 of the first restriction releasing member 704A, and the resultant state is shown in part (b) of FIG. 152. As described above, the inclined portion 704Ac2 is inclined toward the upstream side in the rotational direction K and the arrow U direction (upward). Therefore, the first restriction releasing member 704A receives a force F701 including a component downstream in the rotational direction K from the pin 731*b*. Since the movement of the first restriction releasing member 704A in the rotational axis A direction is restricted, the first restriction releasing member 704A is rotated in the rotational direction K (first rotational direction) by the force F701. That is, the first restriction releasing member 704A rotates in the rotational direction K relative to the second restriction releasing member 704B. In Interrelation with this, the first restriction releasing portion 704Aa of the first restriction releasing member 704A also rotates in the rotational direction K. That is, as the advancing/retracting member 731 moves in the direction of the arrow U (upward), the first restriction releasing portion 704Aa of the first restriction releasing member 704A rotates in the rotational direction K relative to the second restriction releasing member 704B. That is, the advancing/retracting member 731 is structured to rotate the first restriction releasing member 704A and the second restriction releasing member 704B in the rotational direction K by being moved in the arrow U direction (upward).

When the advancing/retracting member 731 receives the force F700 in the arrow U direction (upward) and is moved in the arrow U direction (upward), the first restriction releasing member 704A further rotates in the rotational direction K, and the phases of the pin 731*b* the and the straight portion 704Ac3 match are aligned. And, the pin 731*b* of the advancing/retracting member 731 becomes in a state of being inserted up to the straight portion 704Ac3 as shown in part (c) of FIG. 152. When the pin 731*b* of the advancing/retracting member 731 is inserted up to the straight portion 704Ac3, the first restriction releasing member 704A becomes in a state where the movement of the first restriction releasing member 704A relative to the second restriction releasing member 704B in the rotational direction K is restricted by the pin 731*b*.

When the force F700 on the pushed surface 731*a* of the advancing/retracting member 731 is released, the advancing/retracting member 731 moves in the arrow N direction (downward) by the force F702 from the initialization spring 730 (see FIG. 151). Then, through the reverse process of the movement of the advancing/retracting member 731 in the arrow U direction (upward), the advancing/retracting member 731 shown in part (a) of FIG. 152 becomes in the state of having been moved relative to the first restriction releasing member 704A and the arrow N direction (downward).

The foregoing is the operation of the restriction releasing mechanism 704.

(Mounting and Dismounting of Toner Pack)

Next, referring to FIG. 153, mounting/dismounting of the toner pack 720 to/from the mounting portion 206 will be described. As for the mounting operation of the toner pack 720, only the operations different from those of Embodiments 2 and 3 will be described. FIG. 153 is sectional views illustrating a process in which the restriction releasing mechanism 704 releases the rotation restricting mechanism 212 when the toner pack 720 is mounted to the mounting portion 206. Some portions are not shown for the sake of better illustration. Further, the states of part (a) of FIG. 153 to part (e) of FIG. 153 will be described hereinafter.

Part (a) of FIG. 153 shows a state in which the pushed surface 731*a* of the advancing/retracting member 731 is in contact with a free end portion 209*d*70 of the center boss 209*d* of the apparatus-side shutter 209. In this state, the pin 731*b* of the advancing/retracting member 731 is located at the entrance portion 704Ac1 of the first restriction releasing member 704A. At this time, the first restriction releasing surface 704Aa1 of the first restriction releasing member 704A is placed on the upstream side, in the rotational direction D, of the contact surface 214*f* of the releasing claw 214*e*. It is preferable that immediately before the pin 731*b* of the advancing/retracting member 731 enters the inclined portion 704Ac2 of the first restriction releasing member 704A, the first restriction releasing surface 704Aa1 is partly overlapped with the contact surface 214*f* of the releasing claw 214*e* is in the rotational axis A direction. Further, the second slope 704Ba1 of the second restriction releasing member 704B is placed on the downstream side of the second guided surface 214*e*2 of the releasing claw 214*e* in the rotational direction D. In the Figure, the neighborhood of the second slope 704Ba1 of the second restriction releasing member 704B and the neighborhood of the contact surface 214*f* of the releasing claw 214*e* appear to overlap, but there is a gap in the direction perpendicular to the sheet of the drawing (direction perpendicular to the rotational axis A), and therefore, the toner pack 720 can move in the N direction (downward) of the arrow without interfering.

When the toner pack 720 is further moved in the N direction (downward) of the arrow from this position, the pushed surface 731*a* of the advancing/retracting member 731 receives a force F703 from the free end portion 209*d*70 of the center boss 209*d*. By this, the advancing/retracting member 731 moves in the direction of arrow G (upward) relative to the first restriction releasing member 704A and the second restriction releasing member 704B. As described above, by the movement of the advancing/retracting member 731 in the arrow G direction (upward), the first restriction releasing member 704A is rotated in the rotational direction D (first rotational direction). By the rotation of the first restriction releasing member 704A, the first restriction releasing surface 704Aa1 abuts to the contact surface 214*f* of the releasing member 214, and a force F704 is applied to the releasing member 214. That is, the first restriction releasing surface 704Aa1 functions as a force applying surface. By the force F704, the releasing member 214 is rotated in the rotational direction D against the moment M202 provided by the releasing spring 216 (see FIG. 50). As the releasing member 214 rotates in the rotational direction D, the second guided surface 214*e*2 and the third guided surface 214*e*3 of the releasing claw 214*e* are exposed to the outside as shown in part (c) of FIG. 66.

When the toner pack 720 is further moved in the arrow N direction (downward) from this position, the rotation of the releasing member 214 in the rotational direction D provides the state in which the second slope 704Ba1 of the restriction releasing portion 704Ba and the second guided surface 214*e*2 of the releasing claw 214*e* are overlapped as viewed in the direction of the rotational axis A, as shown in part (b) of FIG. 153. That is, when the toner pack 720 is further moved in the direction of the arrow N (downward), the second slope 704Ba1 of the second restriction releasing portion 704Ba and the second guided surface 214*e*2 of the releasing claw 214*e* are brought into contact with each other. In addition, the pin 731*b* of the advancing/retracting member 731 at this time is inserted until it reaches the position of the straight portion 704Ac3 of the first restriction releasing member 704A. That is, even if the advancing/retracting member 731 moves in the arrow G direction (upward) relative to the first restriction releasing member 704A and the second restriction releasing member 704B by the force F703, the first restriction releasing member 704A does not rotate any more in the rotational direction D.

When the toner pack 720 is further moved in the direction (downward) of the arrow N from this position, the operation is the same as that of Embodiments 2 and 3, and therefore, detailed explanation is omitted, but the releasing member 214 is rotated in the rotational direction D by the contact between the second guided surface 214*e*2 and the second slope 704Ba1. The releasing member 214 rotates in the rotational direction D until the second guided surface 214*e*2 passes the downstream end of the second slope 704Ba1 in the rotational direction D, and the state shown in part (c) of FIG. 153 results. Even in this state, the pin 731*b* of the advancing/retracting member 731 is placed at the straight portion 704Ac3 of the first restriction releasing member 704A. Then, when the toner pack 720 is further moved in the arrow N direction (downward) from this position, the advancing/retracting member 731 is moved in the arrow G direction (upward) relative to the first restriction releasing member 704A and the second restriction releasing member 704B by the force F703. Further, the third guided surface 204*e*3 of the releasing claw 214*e* passes in the flat surface 704Ba2 of the second restriction releasing portion 704Ba in the direction of the arrow N. Since the similar operation is performed in Embodiment 3, detailed description thereof will be omitted, but the contact surface 214*a* of the releasing claw 214*e* abuts on the abutment surface 704Ba3 of the second restriction releasing portion 704Ba as shown in part (d) of FIG. 153. Thereafter, since the operation is similar to that of Embodiment 3, detailed description thereof will be omitted, but by operating the operating member 330 (see FIG. 149), the second restriction releasing member 704B is moved in the direction of the arrow G to move the claw 214*e* in the direction of arrow G. By this, as shown in part (e) of FIG. 153, the restricting member 213 is moved in the direction of arrow G (upward) together with the releasing member 214, and the rotation restriction by the rotation restricting mechanism 212 of the apparatus-side shutter 209 is released. With the foregoing, the toner pack 720 is in the mounted state.

The operation of dismounting the toner pack 720 from the mounting portion 206 is similar to that of Embodiment 3, the description thereof will be omitted.

In this embodiment, the flat surface 704Ba2 of the second restriction releasing portion 704Ba is structured as a surface substantially perpendicular to the rotational axis A, but the structure similar to that of the third slope 204*a*3 (see FIG. 65) of Embodiment 2 may be employed.

Modified Example 1

In this embodiment, the second slope 704Ba1 of the second restriction releasing portion 704Ba faces in the direction of the arrow N (downward), and extends such as to go in the arrow U direction (upward) as goes in the rotational direction K (first rotational direction) about the rotational axis A. However, the present invention is not limited to such a structure. In this modified example, the second slope has a surface perpendicular to the rotational axis A. Referring to FIGS. 154 and 155 this modified example will be described in the following.

Referring to FIG. 154, the first restriction releasing member 7104A and the second restriction releasing member 7104B in this modified example will be described. FIG. 154 is a detailed view of the first restriction releasing member 7104A and the second restriction releasing member 7104B, in which part (a) thereof represents the first restriction releasing member 7104A, and part (b) thereof represents the second restriction releasing member 7104B.

As shown in part (a) of FIG. 154, the first restriction releasing member 7104A is different from the first restriction releasing member 704A (see part (a) of FIG. 150) of this embodiment which is a base of this modified example, more particularly the shapes of pair of cut-away portion portions 7104Ac and 7104Ad (first guide groove, first slit) are different. The pair of cut-away portions 7104Ac and 7104Ad have symmetric shapes centered on the rotational axis A as in this embodiment, and therefore, only the cut-away portion 7104Ac will be described, and the description of the cut-away portion 7104Ad will be omitted.

The cut-away portion 7104Ac is formed by an entrance portion 7104Ac1, an inclined portion 7104Ac2, a straight portion 7104Ac3, and a step portion 7104Ac4.

The entrance portion 7104Ac1 is a cut-away portion extended in the direction of the arrow U (upward), and is provided on an end portion 7104Ag on a downstream side, in the rotational direction K, of a first restriction releasing surface 7104Aa1.

The inclined portion 7104Ac2 is a cut-away portion formed toward the upstream side in the rotational direction K and in the direction of the arrow U (upward), and is provided in connection with the entrance portion 7104Ac1.

The straight portion 7104Ac3 is a cut-away portion formed substantially parallel to the rotational axis A in the direction of the arrow U (upward), and is provided in connection with the inclined portion 704Ac2.

The step portion 7104Ac4 is a cut-away portion formed toward the downstream side in the rotational direction K, and is provided in connection with the straight portion 7104Ac3.

As shown in part (b) of FIG. 154, the second restriction releasing member 7104B is different from the second restriction releasing member 704B (see part (b) of FIG. 150) of the present embodiment which is a base of this modified example, and more particularly the shapes of pair of second restriction releasing portions 7104Ba and 7104Bb are different. The pair of second restriction releasing portions 7104Ba and 7104Bb have symmetric shapes centered on the rotational axis A as in the embodiment, and therefore, the second restriction releasing portion 7104Ba will be described, and the description of the second restriction releasing portion 7104Bb will be omitted.

The second restriction releasing portion 7104Ba comprises a downward surface 7104Ba1, a flat surface 7104Ba2 (upward surface, upward engaging surface, upward push surface), and an abutment surface 7104Ba3. The flat surface 7104Ba2 and the abutment surface 7104Ba3 of this modified example have the shapes similar to those of the flat surface 704Ba2 and the abutment surface 704Ba3 of the second restriction releasing member 704B (see part (b) of FIG. 150) of the embodiment. The downward surface 7104Ba1 is substantially perpendicular to the rotational axis A. The pair of cut-away portions 7104Bi and 7104Bj (second guide groove, second slit) of the second restriction releasing member 7104B are the same as the pair of cut-away portions 704Bi and 704Bj, and therefore, the description thereof will be omitted.

Next, referring to FIG. 155, the mounting of the toner pack 7120 on the mounting portion 206 in this modified example will be described. FIG. 155 is a sectional view illustrating a process of releasing the rotation restricting mechanism 212 when the toner pack 7120 is mounted to the mounting portion 206. Some portions are not shown for the sake of better illustration. Further, the states shown in part (a) of FIG. 153 to part (e) of FIG. 153 will be described hereinafter as appropriate.

Part (a) of FIG. 155 shows a state in which the toner pack 7120 is mounted on the mounting portion 206, and the pushed surface 731*a* of the advancing/retracting member 731 is in contact with the free end portion 209*d*70 of the center boss 209*d* of the apparatus-side shutter 209. In addition, in this state, the pin 731*b* of the advancing/retracting member 731 is at the entrance portion 7104Ac1 of the first restriction releasing member 7104A. At this time, the first restriction releasing surface 7104Aa1 of the first restriction releasing member 7104A is at a position upstream of the contact surface 214*f* of the releasing claw 214*e* in the rotational direction D. It is preferable that immediately before the pin 731*b* enters to the inclined portion 7104Ac2 of the first restriction releasing member 7104A, the contact surface 214*f* of the first restriction releasing surface 7104Aa1 and the releasing claw 214*e* partially overlap in the rotational axis A direction. Further, the downward surface 7104Ba1 of the second restriction releasing member 7104B is at a position on the downstream side, in the rotational direction D, of the second guided surface 214*e*2 of the releasing claw 214*e*.

When the toner pack 7120 is further moved in the arrow N direction (downward) from this position, the releasing member 214 rotates in the rotational direction D by the same operation as in the embodiment which is the base of this modified example. Then, when the second guided surface 214*e*2 of the releasing claw 214*e* rotates until it passes the downstream end portion, in the rotational direction D, of the downward surface 7104Ba1 of the second restriction releasing member 7104B, the state becomes as shown in part (b) of FIG. 155. In this state, the downward surface 7104Ba1 of the second restriction releasing member 7104B is on the upstream side of the second guided surface 214*e*2 of the releasing claw 214*e* in the rotational direction D. Further, the first restriction releasing surface 7104Aa1 of the first restriction releasing member 7104A is placed on the same side as or downstream side of the downward surface 7104Ba1 of the second restriction releasing member 7104B in the rotational direction D. At this time, the pin 731*b* is placed on the straight portion 7104Ac3 of the first restriction releasing member 7104A, and therefore, the rotation of the first restriction releasing member 7104A about the rotational axis A relative to the second restriction releasing member 7104B is restricted.

When the toner pack 7120 is further moved in the arrow N direction (downward) from this position, the flat surface 7104Ba2 of the second restriction releasing member 7104B passes the third guided surface 214*e*3 of the releasing claw 214*e* in the arrow N direction (downward). In addition, at this time, the pin 731*b* passes the straight portion 7104Ac3 of the first restriction releasing member 7104A in the direction of arrow G (upward) and moves to the step portion 7104Ac4. Since the step portion 7104Ac4 is a cut-away portion toward the downstream side in the rotational direction D, the first restriction releasing member 7104A becomes rotatable in the rotational direction E relative to the second restriction releasing member 7104B. The first restriction releasing surface 7104Aa1 of the first restriction releasing member 7104A is rotated in the rotational direction E by receiving the moment M202 provided by the releasing spring 216 (see FIG. 50) from the contact surface 214*f* of the releasing member 214. The releasing claw 214*e* also rotates in the rotational direction E, and therefore, the contact surface 214*a* of the releasing claw 214*e* becomes in contact with the abutment surface 7104Ba3 of the second restriction releasing member 7104B as shown in part (c) of FIG. 155.

Thereafter, the second restriction releasing member 7104B is moved in the arrow G direction, and the releasing claw 214*e* is moved in the arrow G direction by the same method as in this embodiment. By this, as shown in part (d) of FIG. 155, the restricting member 213 is moved in the direction of arrow G (upward) together with the releasing member 214, and the rotation restriction by the rotation restricting mechanism 212 of the apparatus-side shutter 209 is released. With the above-described operations, the mounting of the toner pack 7120 is completed.

The operation of removing the toner pack 7120 from the mounting portion 206 is the same as that of Embodiment 3, the description thereof will be omitted.

Modified Example 2

In, the restriction releasing mechanism 704 of this embodiment, the first restriction releasing member 704A and the advancing/retracting member 731 are separate members. However, the first restriction releasing member 704A and the advancing/retracting member 731 may be parts of one component. In such a case, the first restriction releasing member integrated with the advancing/retracting member is moved in the direction of the rotational axis A together with a rotation about the rotational axis A. Referring to FIGS. 156 to 158, such a structure will be described in the following as a next modified example.

Referring to FIG. 156, the restriction releasing mechanism 7204 in this modified example will be described. FIG. 156 is an exploded perspective view of the restriction releasing mechanism 7204.

The restriction releasing mechanism 7204 comprises a first restriction releasing member 7204A, a second restriction releasing member 7204B, and an initialization spring 730.

The first restriction releasing member 7204A has a substantially cylindrical shape including a cylindrical portion 7204Af centered on the rotational axis A (central axis). The cylindrical portion 7204Af is provided with a pair of pins 7204Ah projecting in the radial direction r of the imaginary circle VC centered on the rotational axis A and provided symmetrically with respect to the rotational axis A. The surface of the cylindrical portion 7204Af on the arrow N direction (downward) side is a pushed surface 7204Ai, and there are provided first restriction releasing portions 7204Aa and 7204Ab projecting from the pushed surface 7204Ai in the arrow N direction (downward). The first restriction releasing portion 7204Aa and 7204Ab have the same shapes as the first restriction releasing portion 704Aa and 704Ab, respectively of this embodiment which is a base of this modified example.

The second restriction releasing member 7204B is different from the second restriction releasing member 704B of this embodiment in the shapes of cut-away portions 7204Bi (guide grooves) constituting the pair. The pair of cut-away portions 7204Bi and 7204Bj have symmetric shapes with respect to the rotational axis A similarly to the embodiment, the cut-away portion 7204Bi will be described in this modified example, and the description of the cut-away portion 7204Bj will be omitted.

The cut-away portion 7204Bi comprises an entrance portion 7204Bi1, an inclined portion 7204Bi2, and a straight portion 7204Bi3. The entrance portion 7204Bi1 is a cut-away portion formed in the direction of the arrow U (upward), and is provided on the end portion 7204Bg on the downstream side, in the rotational direction K, of the abutment surface 7204Ba3 of the second restriction releasing portion 7204Ba. The inclined portion 7204Bi2 is a cut-away portion formed on the downstream side in the rotational direction K and in the direction of the arrow U (upward), and is provided in connection with the entrance portion 7204Bi1. The straight portion 7204Bi3 is a cut-away portion formed substantially parallel to the rotational axis A in the direction of the arrow U (upward), and is provided in connection with the inclined portion 7204Bi2.

Next, the assembling of the restriction releasing mechanism 7204 in this modified example will be described.

The initialization spring 730 is assembled in the direction of arrow U to the second restriction releasing member 7204B. At this time, the end portion of the initialization spring 730 is fixed to the cylindrical portion (see FIG. 151) of the second restriction releasing member 7204B, which is not shown, by adhesion or press fitting, as in the embodiment which is a base of this modified example.

The first restriction releasing member 7204A is assembled to the second restriction releasing member 7204B in the direction of arrow U. At this time, the cylindrical portion 7204Af of the first restriction releasing member 7204A is inserted to slide on the inner peripheral surface 7204Be of the second restriction releasing member 7204B, thus it is slidably supported. Further, the pin 7204Ah of the first restriction releasing member 7204A is inserted into the entrance portion 7204Bi1 of the second restriction releasing member 7204B. At this time, the end portion of the initialization spring 730 and the surface on the back side of the pushed surface 7204Ai of the first restriction releasing member 7204A in the direction of the rotational axis A are fixed by adhesive or the like. By this, the first restriction releasing member 7204A is supported by the second restriction releasing member 7204B without disengaging in the direction of the rotational axis A. The means by which the first restriction releasing member 7204A is supported by the second restriction releasing member 7204B may be replaced with a different structure. For example, a retaining portion may be provided which projects inward in the radial direction r of the imaginary circle VC centered on the rotational axis A from the inner peripheral surface 7204Be of the second restriction releasing member 7204B to be engaged with the first restriction releasing member 7204A. However, in such a case, it is necessary to provide the retaining portion at a position where the retaining portion does not interfere with the center boss 209*d* during the mounting operation of the toner pack 7220 which operation will be described hereinafter.

Next, referring to FIG. 157, the operation of the restriction releasing mechanism 7204 will be described. FIG. 157 is a perspective view illustrating the operation of the restriction releasing mechanism 7204. Part (a) of FIG. 157 shows a state in which the first restriction releasing member 7204A has moved in the arrow N direction (downward) relative to the second restriction releasing member 7204B, and part (b) of FIG. 157 shows a state in which the first restriction releasing member 7204A has moved in the arrow U direction (upward).

As shown in part (a) of FIG. 157, when the first restriction releasing member 7204A is placed on the arrow N direction side of (below) the second restriction releasing member 7204B, the pin 7204Ah is at the entrance portion 7204Bi1 the second restriction releasing member 7204B. When a force F720 in the arrow U direction (upward) is applied to the pushed surface 7204Ai in this state, the first restriction releasing member 7204A is moved in the direction of the arrow U (upward) by the force F720 against the spring force of the initialization spring 730 (not shown, see FIG. 156). When the first restriction releasing member 7204A is moved in the direction of the arrow U (upward), the pin 7204Ah comes into contact with the inclined portion 7204Bi2 of the second restriction releasing member 7204B. Since the inclined portion 7204Bi2 is inclined toward the downstream side (in the rotational direction K) and in the arrow U direction (upward) as described above, the first restriction releasing member 7204A rotates in the rotational direction K. The first restriction releasing member 7204A rotates in the rotational direction K while moving in the arrow U direction (upward), and therefore, the first restriction releasing portion 7204Aa also moves similarly. When the first restriction releasing member 7204A is further moved in the arrow U direction (upward) from this state, the pin 7204Ah is placed at the straight portion 7204Bi3, so that the rotation of the first restriction releasing member 7204A in the rotational direction K stops. When the first restriction releasing member 7204A is further moved in the arrow U direction (upward) from this state, as shown in FIG. 157, the result is that the first restriction releasing member 7204A has moved in the arrow U direction (upward) relative to the second restriction releasing member 7204B.

When the force F720 on the pushed surface 7204Ai of the first restriction releasing member 7204A is removed, the first restriction releasing member 7204A is subjected to the force F722 from the initialization spring 730 (not shown, see FIG. 156) to move in the arrow N direction (downward). Then, through the reverse process of the movement of the first restriction releasing member 7204A in the arrow U direction (upward), the first restriction releasing member 7204A shown in part (a) of FIG. 157 is moved in the N direction (downward) relative to the second restriction releasing member 7204B.

The foregoing is the operation of the restriction releasing mechanism 7204.

Next, referring to FIG. 158, the operation of mounting the toner pack 7220 on the mounting portion 206 in this modified example will be described. FIG. 158 is sectional views illustrating a process of releasing the rotation restricting mechanism 212 when the toner pack 7220 is mounted to the mounting portion 206. Some portions are not shown for the sake of better illustration. The states of part (a) of FIG. 158 to part (e) of FIG. 158 will be described hereinafter as appropriate.

Here, when the toner pack is mounted on the mounting portion, in the basic embodiment, the first restriction releasing member 704A is rotated by the cut-away portion 704Ac being acted on by the pin 731*b* of the advancing/retracting member 731. On the other hand, in this modified example, the first restriction releasing member 7204A is rotated by the pin 7204Ah acting on the cut-away portion 7204Bc of the second restriction releasing member 7204B. Other operations are the same as in this embodiment. Therefore, only the states shown in part (a) of FIG. 158 and part (e) of FIG. 158 will be described, and the detailed operation thereof will be omitted. Part (a) of FIG. 158 shows a state in which the toner pack 7220 is mounted on the mounting portion 206, and the pushed surface 7204Ai of the first restriction releasing member 7204A is brought into contact with the free end portion 209*d*70 of the center boss 209*d* of the apparatus-side shutter 209. In part (b) of FIG. 158, the releasing member 214 is rotated in the rotational direction D by the first restriction releasing member 7204A, and the second slope 7204Ba1 of the second restriction releasing portion 7204Ba and the second guided surface 214*e*2 of the releasing claw 214*e* are overlapped in the rotational direction D. Part (c) of FIG. 158 shows a state in which the second guided surface 214*e*2 of the releasing claw 214*e* is rotated in the rotational direction D until it passes the downstream end of the second slope 7204Ba1 of the second restriction releasing member 7204B in the rotational direction D. Part (d) of FIG. 158 shows a state in which the contact surface 214*a* of the releasing claw 214*e* is in contact with the abutment surface 7204Ba3 of the second restriction releasing portion 7204Ba. In part (e) of FIG. 158, the second restriction releasing member 7204B is moved in the arrow G direction, the restricting member 213 is moved in the arrow G direction (upward) together with the releasing member 214, and the restriction of the rotation of the apparatus-side shutter 209 by the rotation restricting mechanism 212 is released.

Modified Example 3

In the present embodiment, the first restriction releasing surface 704Aa1 of the first restriction releasing member 704A is structured to abut on the contact surface 214*f* of the releasing member 214. The first restriction releasing member may be brought into contact with another part of the releasing member 214. In such a case, a structure can be considered in which the first restriction releasing member abuts to the toner pack side end of the releasing member 214 or the releasing claw 214*e* as an example, referring to FIGS. 159 to 161 this structure will be described below as a modified example.

Referring to FIG. 159 a restriction releasing mechanism 7304 of this modified example will be described. FIG. 159 is an exploded perspective view of the restriction releasing mechanism 7304. The restriction releasing mechanism 7304 of this modified example has different structures in the first restriction releasing member 7304A and the second restriction releasing member 7304B of Modified Example 2 of this embodiment, and therefore, the different part thereof will be described.

The first restriction releasing member 7304A is different from the first restriction releasing member 7204A of Modified Example 2 of this embodiment in the shape of a pair of first restriction releasing portions 7304Aa and 7304Ab. Similarly to Modified Example 2 of this embodiment, the pair of first restriction releasing portions 7304Aa and 7304Ab have shapes symmetric with respect to the rotational axis A. Therefore, in this modified example, the first restriction releasing portion 7304Aa will be described, and the description of the first restriction releasing portion 7304Ab will be omitted.

The first restriction releasing portion 7304Aa projects from the pushed surface 7304Ai in the direction of the arrow N. A friction member 7304Aa1 is provided at the end on the arrow N direction (lower) side. A material such as silicon rubber is used for the friction member 7304Aa1.

The second restriction releasing member 7304B is different from the second restriction releasing member 7204B of Modified Example 2 of this embodiment in the shapes of the pair of cut-away portions 7304Bi and 7304Bj. The pair of cut-away portions 7304Bi and 7304Bj have symmetric shapes with respect to the rotational axis A as in Modified Example 2 of this embodiment, and therefore, the cut-away portion 7304Bi will be described in this modified example, and the description of the cut-away portion 7304Bj will be omitted.

The cut-away portion 7304Bi comprises an entrance portion 7304Bi1, an inclined portion 7304Bi2, and a straight portion 7304Bi3. The entrance portion 7304Bi1 and the inclined portion 7304Bi2 have structures similar to those of the entrance portions 7204Bi1 and the inclined portion 7204Bi2 of Modified Example 3 of this embodiment (see FIG. 156), and therefore, the description thereof will be omitted.

The straight portion 7304Bi3 is a cut-away portion formed substantially parallel to the rotational axis A in the direction of the arrow U (upward), and is provided in connection with the inclined portion 7304Bi2. Further, a width of the straight portion 7304Bi3 measured in the rotational direction K is selected to be larger than a width of the second slope 7304Ba1 of the second restriction releasing portion 7304Ba measured in the rotational direction K.

Next, referring to FIGS. 160 and 161, the operation of mounting the toner pack 7320 on the mounting portion 206 in this modified example will be described. FIG. 160 is a cross-sectional view illustrating a process of releasing the rotation restricting mechanism 212 when the toner pack 7320 is mounted to the mounting portion 206. Some portions are not shown for the sake of better illustration. The states of part (a) of FIG. 160 to part (e) of FIG. 160 will be described hereinafter as appropriate. FIG. 161 shows a position of a pin 7304Ah on the straight portion 7304Bi3 when the toner pack 7320 is mounted to the mounting portion 206.

Part (a) of FIG. 160 shows a state in which the toner pack 7320 is mounted on the mounting portion 206, and the releasing member 214 is in contact with the friction member 7304Aa1 of the first restriction releasing portion 7304Aa. An end of the releasing member 214 in contact with the friction member 7304Aa1 in the arrow G direction (upward direction) is referred to as a contact surface 214*e*70. At this time, the contact surface 214*e*70 of the releasing member 214 is in a state of entering the friction member 7304Aa1 of the first restriction releasing portion 7304Aa in the direction of arrow G (upward). By this, the first restriction releasing portion 7304Aa is in a state that a force F730 is applied to the contact surface 214*e*70 of the releasing member 214. The force of the initialization spring 730 (not shown, see FIG. 159) acts as the force F730. When the toner pack 7320 is further moved in the N direction (downward) of the arrow from this position, the first restriction releasing member 7304A moves relative to the second restriction releasing member 7304B in the direction of arrow G (upward) by the reaction force F732 from the contact surface 214*e*70 of the releasing member 214. Thus, the first restriction releasing portion 7304Aa is rotated in the rotational direction D by the action between the pin 7304Ah of the first restriction releasing member 7304A and the inclined portion 7304Bi2 of the second restriction releasing member 7304B. When the first restriction releasing portion 7304Aa rotates in the rotational direction D, a frictional force F731 due to the force F730 is produced on the contact surface 214*e*70 of the releasing member 214. The releasing member 214 is rotated in the rotational direction D by the frictional force F731. When the toner pack 7320 is further moved in the arrow N direction (downward) from this state, as shown in part (b) of FIG. 160, the second slope 7204Ba1 of the second restriction releasing portion 7204Ba and the second guided surface 214*e*2 of the releasing claw 214*e* are overlapped in the rotational direction D. In addition, the pin 7304Ah is at the straight portion 7304Bi3 of the second restriction releasing member 7304B. At this time, as shown in FIG. 161, the pin 7304Ah is in the position P70, and the downstream side thereof in the rotational direction D is not restricted by the straight portion 7304Bi3. As shown in part (b) of FIG. 160, when the toner pack 7320 is further moved in the arrow N direction (downward) from this state, the second slope 7304Ba1 of the second restriction releasing portion 7304Ba is brought into contact with the second guided surface 214*e*2 of the releasing claw 214*e* so that the releasing member 214 rotates in the rotational direction D. At this time, the first restriction releasing portion 7304Aa receives a frictional force F734 due to a reaction force F733 from the contact surface 214*e*70 of the releasing member 214. Since the pin 7304Ah is not restricted from rotating in the rotational direction D as described above, the first restriction releasing member 7304A rotates in the rotational direction D due to the frictional force F734.

When the toner pack 7320 is further moved in the direction of the arrow N (downward) from this state, as shown in part (c) of FIG. 160, the second guided surface 214*e*2 of the releasing claw 214*e* passes the downstream end of the second slope 7304Ba1 of the second restriction releasing portion 7304Ba in the rotational direction D. At this time, the pin 7304Ah is placed at the position P71 as shown in FIG. 161 and is not restricted to the downstream side in the rotational direction E by the straight portion 7304Bi3.

When the toner pack 7320 is further moved in the direction of the arrow N (downward) from this state, as shown in part (d) of FIG. 160, the third guided surface 214*e*3 of the releasing claw 214*e* passes a flat surface 7304Ba2 of the second restriction releasing portion 7304Ba in the direction of arrow G (upward). Thereafter, the releasing member 214 rotates in the rotational direction E until the contact surface 214*a* of the releasing claw 214*e* abuts to the abutment surface 7304Ba3 of the second restriction releasing member 7304B by the moment M202 provided by to the releasing spring 216 (not shown, see FIG. 50). At this time, the first restriction releasing portion 7304Aa receives a frictional force F736 due to the reaction force F735 from the contact surface 214*e*70 of the releasing member 214. Since the pin 7304Ah is not restricted from rotating in the rotational direction E as described above, the first restriction releasing member 7304A rotates in the rotational direction E by the frictional force F736. Then, as shown in FIG. 161, the pin 7304Ah moves to the position P72 on the downstream side, in the rotational direction E, of the position P71.

Thereafter, by moving the second restriction releasing member 7304B in the arrow G direction as in the basic embodiment of this modified example, the restricting member 213 is moved together with the releasing member 214 in the arrow G direction (upward), and as shown in part (d) of FIG. 160, the rotation restriction by the rotation restricting mechanism 212 of the apparatus-side shutter 209 is released.

The operation of removing the toner pack 7320 from the mounting portion 206 is the same as that of Embodiment 3, and therefore, the description thereof will be omitted.

Embodiment 8

Next, referring to FIGS. 162 to 175, Embodiment 8 will be described in the following. As compared with the restriction releasing portion of Embodiment 3, this embodiment is different in that the first slope and the second slope of the restriction releasing member are equidistant in the radial direction r of the imaginary circle VC centered on the rotational axis A. In addition, the second slope is movable between a first position the same as the radial position of the first slope in the radial direction r of the imaginary circle VC centered on the rotational axis A, and a second position radially outside the radial direction r relative to the first slope. The description of the same points as in the above-described embodiment will be omitted. In particular, of the elements disclosed in this embodiment, those corresponding to the members described in Embodiments 2 and 3 are assigned the same names as those of the members of Embodiments 2 and 3, and only the points different from Embodiment 3 will be described.

(Toner Pack Structure)

Referring to FIGS. 162 to 165, a toner pack 820 according to this embodiment will be described. FIG. 162 is an illustration showing the entire toner pack 820 in this embodiment. FIG. 163 is an exploded perspective view of a restriction releasing member 804 and a shaft ring 335 before being assembled to a nozzle 302, and is a view as seen from a second end side (nozzle side) in a first direction D1. FIG. 164 is illustrations showing a detailed shape of the restriction releasing member 804. Part (a) of FIG. 164 is a view as seen from an orthogonal direction of the first direction D1. Part (b) of FIG. 164 is a view as seen from a second end side (nozzle side) in the first direction D1. Part (c) of FIG. 164 is an enlarged perspective view illustrating the shape of a pushed surface **804*a*7 of the restriction releasing member 804. FIG. 165 is sectional views of the restriction releasing member 804. Part (a) of FIG. 165 is a sectional view taken along a line X802-X802 shown in part (b) of FIG. 164, which is a sectional view taken along the cutting line passing through the rotating axis A and the pushed surface 804*a*7 in the direction of the rotating axis A (central axis). Part (b) of FIG. 165 is a sectional view taken along a line X803-X803 shown in part (b) of FIG. 164, which is a sectional view taken along a cutting line passing through the pushed surface 804*a*7 in a direction perpendicular to the cutting line X802-X802**.

As shown in FIG. 162, the toner pack 820 in this embodiment comprises an accommodating portion 201 for accommodating toner, a nozzle 302, and a pack-side shutter 203, and in addition, a restriction releasing member 804 (projecting portion, protruding portion) partially projecting from an end surface **203*c* of the pack-side shutter 203** in an arrow N direction.

Next, referring to FIGS. 163 to 165, the restriction releasing member 804 will be described.

As shown in FIG. 163, the restriction releasing member 804 has a cylindrical shape centered on the rotational axis A and including a cylindrical portion **804*c*. A disk-shaped end portion 804*f* is provided at the end of the cylindrical portion 804*c* in the arrow U direction (upward direction) with the rotational axis A as the center. The end portion 804*f* is provided with a hole portion 804*g* centered on the rotational axis A. In addition, the cylindrical portion 804*c* is provided with a pair of projections 804*d* projecting outward in the radial direction r of the imaginary circle VC centered on the rotational axis A. The projections 804*d* constituting the pair have shapes which are 180-degree rotationally symmetric with respect to the rotational axis A. The end of the cylindrical portion 804*c* in the arrow N direction (downward) is referred to as an end portion 804*e*, then, the end portion 804*e* is provided with a pair of restriction releasing portions 804*a* (first projection) and 804*b* (second projection) projecting in the arrow N direction (downward). The pair of restriction releasing portions 804*a* and 804*b* have shapes which are 180-degree rotationally symmetric with respect to the rotational axis A. In addition, in the state where the restriction releasing member 804 which will be described hereinafter is assembled to the nozzle 302, such a restriction releasing portion of the pair of restriction releasing portions 804*a* and 804*b* as is closer to the opening 302*a* of the nozzle 302 in the circumferential direction of the imaginary circle VC is referred to as the restriction releasing portion 804*a***.

Next, referring to FIGS. 164 and 165, the detailed shapes of the pair of restriction releasing portions **804*a* and 804*b* will be described. However, since the paired restriction releasing portions 804*a* and 804*b* have shapes which are 180-degree rotationally symmetric with respect to the rotational axis A as described above, only the restriction releasing portion 804*a* will be described in detail, and the description of the restriction releasing portion 804*b*** will be omitted.

As shown in part (a) of FIG. 164, the restriction releasing portion **804*a* is divided into an upstream side portion and a downstream side portion in the rotational direction K by a slit 804*a*6 extending in the arrow N direction (downward) from the end portion 804*e*. An upstream portion in the rotational direction K is referred to as an upstream restriction releasing portion 804*a*9, and a portion downstream in the rotational direction K is referred to as a downstream restriction releasing portion 804*a*10**.

The upstream restriction releasing portion **804*a*9 comprises a first slope 804*a*1 (first downward surface, first downward guide surface, first downward force applying surface, first downward push surface) and a first abutment surface 804*a*12**.

The first slope **804*a*1 is provided on the downstream side in the rotational direction K of the upstream side restriction releasing portion 804*a*9 and at the end portion in the arrow N direction (downward). The first slope 804*a*1** is a surface extending so as to go in the arrow U direction (upward) as goes in the rotational direction K (first rotational direction) and is a surface facing the arrow N direction (downward).

The first abutment surface **804*a*12 is a surface parallel to the rotational axis A, and is provided at the downstream end portion of the first slope 804*a*1 in the rotational direction K. The first abutment surface 804*a*12** is a surface extending in the direction of the rotational axis A.

The downstream restriction releasing portion **804*a*10 comprises a second slope 804*a*2 (second downward surface, second downward guide surface, second force applying surface, second push surface), a flat surface 804*a*3 (upward surface, upward engaging surface, upward push surface, upward force applying surface), a second abutment surface 804*a*4, and a deformed portion 804*a*5, and in addition, the pushed surface 804*a*7 and a projection 804*a*8 shown in part (b) of FIG. 164**.

The second slope **804*a*2 is provided at the end of the downstream restriction releasing portion 804*a*10 in the direction of the arrow N (downward). The second slope 804*a*2 is a surface extending so as to go in the arrow U direction (upward) as goes in the rotational direction K, and is a surface facing the arrow N direction (downward). In addition, the second slope 804*a*2 and the first slope 804*a*1 are provided so as to be equidistant in the radial direction r (see part (b) of FIG. 164) of the imaginary circle VC centered on the rotational axis A. In other words, the second slope 804*a*2 and the first slope 804*a*1 is provided so as to be at the same position in the radial direction r (part (b) of FIG. 164). That is, the second slope 804*a*2 and the first slope 804*a*1 are provided in the same distant region in the radial direction r from the rotational axis A. Although the second slope 804*a*2 in this embodiment is shown in the Figure as being flush with the first slope 804*a*1, at lease a part of it may be off-set in the arrow N direction (downward) or the arrow U direction (upper side) with respect to the first slope 804*a*1**.

The flat surface **804*a*3 is a surface perpendicular to the rotational axis A and facing in the arrow U direction (upward). In addition, the flat surface 804*a*3 is placed on the arrow U direction side of (above) at least a part of the second slope 804*a*2**.

The second abutment surface **804*a*4 is on the upstream side of the flat surface 804*a*3 in the rotational direction K, extends in the arrow U direction (upward) from the flat surface 804*a*3 to the end portion 804*e***, and faces the downstream side in the rotational direction K.

The deformed portion **804*a*5 is a portion of the downstream side restriction releasing portion 804*a*10 from the end portion 804*e* to the flat surface 804*a*3** in the rotational axis A direction.

As shown in part (c) of FIG. 164, the pushed surface **804*a*7 is on the upstream side of at least a part of the second slope 804*a*2 in the rotational direction K and inside thereof in the radial direction r of the imaginary circle VC centered on the rotational axis. As shown in part (a) of FIG. 165, the pushed surface 804*a*7 extends so as to go inward in the radial direction r of the imaginary circle VC centered on the rotational axis A as goes in the arrow U direction (upward) and is inclined so as to go in the direction of arrow N (downward) as goes toward the downstream side in the rotational direction K, as shown in part (b) of FIG. 165**.

As shown in part (a) of FIG. 165, the projection 804*a*8 projects from the inner peripheral surface 804*a*1I inward in the radial direction r of the imaginary circle VC centered on the rotational axis A, and is provided on the deformed portion 804*a*5. In addition, the end surface of the projection 804*a*8 in the arrow N direction (lower surface) is a surface so as to go radially inward of the imaginary circle VC centered on the rotational axis A as goes in the direction of the arrow U (upward).

(Assembling of Toner Pack)

Next, referring to FIGS. 163 and 166, the assembling of the toner pack 820 in this embodiment will be described. FIG. 166 is a sectional view of the toner pack 820 taken along a line X801-X801 shown in FIG. 162, which is along the pin 310 with the rotational axis A as the center. The pack-side seal 205 (see FIG. 56) is not shown.

As shown in FIG. 163, in the toner pack 820, the shaft ring 334 is assembled to the shaft member 331 by the same assembling method as in Embodiment 3. Thereafter, the hole portion 804*g* of the restriction releasing member 804 is fitted on the small diameter shaft portion 331*c* of the shaft member 331 in the direction of the arrow U (upward). At this time, the cylindrical portion 804*c* of the restriction releasing member 804 is inserted into the cylindrical support portion 302*b* of the nozzle 302. In addition, the projection 804*d* of the restriction releasing member 804 is inserted into the cut-away portion 302*c* of the nozzle 302. By engaging the projection 804*d* of the restriction releasing member 804 with the cut-away portion 302*c*, the restriction releasing member 804 is restricted in the movement around the rotational axis A relative to the nozzle 302. Therefore, the restriction releasing member 804 is supported movably only in the direction of the rotational axis A relative to the nozzle 302. Thereafter, in the toner pack 820, the shaft ring 335 is assembled to the small diameter shaft portion 331*c* of the shaft member 331 by the same assembly method as in Embodiment 3.

Here, as shown in FIG. 166, the hole through which the restriction releasing member 804 of the end surface 203*c* of the pack side shutter 203 passes is referred to as the hole portion 203*c*80. At this time, in the radial direction r of the imaginary circle VC centered on the rotational axis A, a radius R81 of the hole portion 203*c*80 of the pack side shutter 203 is larger than a maximum radius R80 of the downstream side restriction releasing portion 804*a*10 of the restriction releasing member 804. This prevents interference when the second slope 804*a*2 of the restriction releasing member 804 moves from the first position to the second position outside in the radial direction r of the imaginary circle VC centered on the rotational axis A, as will be described hereinafter.

(Operation of Restriction Releasing Member)

Referring to part (b) of FIG. 164, the operation of the restriction releasing member 804 will be described.

In the initial state, the restriction releasing portion 804*a* is placed at the first position where the second slope 804*a*2 is equally distant with the first slope 804*a*1 in the radial direction r of the imaginary circle VC centered on the rotational axis A. From this state, the deformed portion 804*a*5 is deformed by applying a force in the radial direction r to the downstream restriction releasing portion 804*a*10. By this, as shown by the broken line in the Figure, the second slope 804*a*2 of the restriction releasing portion 804*a* moves to the second position outside the first slope 804*a*1 in the radial direction r. The details of the force applied to the restriction releasing portion 804*a* will be described in the description of mounting/dismounting the toner pack. That is, the second slope 804*a*2 is movable between the first position at the same position as the first slope 804*a*1 in the radial direction r and the second position outside the first slope 804*a*1 in the radial direction r. The second slope 804*a*2 is in the first position when the toner pack 820 is not mounted on the mounting portion 206.

When the force applied to the restriction releasing portion 804*a* is removed, the deformed portion 804*a*5 is restored the deformed state. Then, the second slope 804*a*2 shown by the solid line in the Figure moves to the first position which is equally distant, in the radial direction r, as the first slope 804*a*1.

(Mounting and Dismounting of Toner Pack)

Next, referring to FIGS. 167 to 172, mounting/dismounting of the toner pack 820 to/from the mounting portion 206 will be described. In the mounting/dismounting operation, only the operation different from that of Embodiment 3 will be described. FIGS. 167 to 172 show a process in which the restriction releasing member 804 releases the rotation restricting mechanism 212 when the toner pack 820 is mounted to the mounting portion 206. The pack-side shutter 203 is not shown for the sake of better illustration. The detailed states of FIGS. 167 to 172 will be appropriately described together with the description of the operation. Part (b) of FIG. 168 shows a sectional view taken along a line X804-X804 of part (a) of FIG. 168. Part (c) of FIG. 168 shows a sectional view taken along a line X809-X809 of part (b) of FIG. 168. Part (b) of FIG. 169 is a sectional view taken along a line X806-X806 of part (a) of FIG. 169, part (b) of FIG. 170 is a sectional view taken along a line of X805-X805 of part (a) of FIG. 170, and part (b) of FIG. 171 is a sectional view taken along a line an X808-X808 of part (a) of FIG. 171.

First, when the toner pack 820 is mounted on the mounting portion 206, the second slope 804*a*2 of the restriction releasing member 804 is in the first position in a situation that the restriction releasing member 804 is not in contact with the restriction releasing member 214 of the mounting portion 206. FIG. 167 shows a state in which the toner pack 820 is moved in the N direction (downward) of the arrow, and the first slope 804*a*1 of the restriction releasing portion 804*a* and the first guided surface 214*e*1 of the releasing claw 214*e* are in contact with each other. At this time, the slit 804*a*6 of the restriction releasing portion 804*a* is placed on the downstream side, in the rotational direction D, of the eave portion 210*n* of the cover 210. When the toner pack 820 is further moved in the direction of the arrow N from this stage, the releasing member 214 is rotated in the rotational direction D (first rotational direction) against the urging force of the releasing spring 216 (not shown) by the first guided surface 214*e*1 being pressed against the first slope 804*a*1, as in Embodiment 3.

Here, at least a part of the pushed surface 804*a*7 is placed at the position on the arrow U direction side (upper side) with respect to the first slope 804*a*1 and the second slope 804*a*2 (see part (a) of FIG. 165). In addition, there is a space S80 in the direction of the arrow N (downward) of the pushed surface 804*a*7 (see part (a) of FIG. 165). Further, the end portion of the releasing claw 214*e* in the arrow G direction (upward direction) and the downstream end portion in the rotational direction D are referred to as the push surface 214*e*80. When the toner pack 820 is further moved in the direction of the arrow N from this state, the first guided surface 214_e_1 of the releasing claw 214_e_ passes the downstream end in the rotational direction D of the first slope 804_a_1 of the restriction releasing portion 804_a_. Thereafter, the releasing claw 214_e_ enters the space S80 (see part (b) of FIG. 168). At this time, as shown in FIG. 168, the push surface 214_e_80 of the releasing claw 214_e_ and the pushed surface 804_a_7 of the downstream restriction releasing portion 804_a_10 are in contact with each other. In this state, since the releasing claw 214_e_ is not in contact with the first slope 804_a_1 and the second slope 804_a_2 of the restriction releasing portion 804_a_, it is not rotated any more in the rotational direction D. At this time, as in Embodiment 3, the releasing member 214 of the releasing claw 214_e_ is rotated in the rotational direction E by the urging force of the releasing spring 216 (not shown). Then, as the releasing member 214 rotates in the rotational direction E, the contact surface 214_f_ abuts to the first abutment surface 804_a_12 of the restriction releasing portion 804_a_ in the rotational direction E.

When the toner pack 820 is further moved in the direction of the arrow N from this state, the pushed surface 804_a_7 of the downstream restriction releasing portion 804_a_10 receives a force F800 perpendicular to the pushed surface 804_a_7 from the push surface 214_e_80 of the releasing claw 214_e_. At this time, as shown in part (b) of FIG. 168, the force F800 received by the pushed surface 804_a_7 from the push surface 214_e_80 of the releasing claw 214_e_ includes a component in the radial direction r of the imaginary circle VC centered on the rotational axis A. Therefore, the force F800 elastically deforms the downstream restriction releasing portion 804_a_10 in the direction toward the outside in the radial direction r. Further, as shown in part (c) of FIG. 168, the force F800 received by the pushed surface 804_a_7 of the downstream restriction releasing portion 804_a_10 from the push surface 214_e_80 of the releasing claw 214_e_ includes a rotational direction D component. On the other hand, a reaction force F801 produced on the push surface 214_e_80 of the releasing claw 214_e_ includes the rotational direction E component. The reaction force F801 causes the releasing claw 214_e_ to bring the contact surface 214_f_ into contact with the first abutment surface 804_a_12 of the restriction releasing portion 804_a_. Therefore, the releasing claw 214_e_ is in a state where the rotation is restricted in the rotational direction D.

When the toner pack 820 is further moved in the direction of arrow N from this position, the deformed portion 804_a_5 of the downstream restriction releasing portion 804_a_ 10 shown in part (b) of FIG. 168 is deformed toward the outside of the radial direction r by the force F800. By this, the second slope 804_a_2 of the downstream restriction releasing portion 804_a_10 moves from the first position to the second position.

When the toner pack 820 is further moved in the direction of the arrow N (downward) from this state, as shown in part (a) of FIG. 169, the second slope 804_a_2 of the downstream restriction releasing portion 804_a_10 moved to the second position and the second guided surface 214_e_2 of the releasing claw 214_e_ are brought into contact with each other. In this state, as shown in part (b) of FIG. 169, the inner peripheral surface 804_a_11 of the downstream restriction releasing portion 804_a_10 is in contact with the releasing claw 214_e_. This is because the contact point between the downstream restriction releasing portion 804_a_10 and the releasing claw 214_e_ moves from the pushed surface 804_a_7 to the inner peripheral surface 804_a_11 as the toner pack 820 moves in the direction of the arrow N (downward). By this, the downstream restriction releasing portion 804_a_10 receives the force F802 including the radial r component. The downstream side restriction releasing portion 804_a_10 maintains the deformation of the deformed portion 804_a_5 in the radial direction r by the force F802 from the releasing claw 214_e_. Therefore, the second slope 804_a_2 of the downstream restriction releasing portion 804_a_10 is maintained at the second position. Further, since the releasing claw 214_e_ is released from the contact between the push surface 214_e_80 and the pushed surface 804_a_7 of the downstream restriction releasing portion 804_a_10 (see part (c) of FIG. 168), the releasing claw 214_e_ can move in the rotational direction D.

When the toner pack 820 is further moved in the direction of the arrow N from the state of part (a) of FIG. 169, the releasing claw 214_e_ of the releasing member 214 is pressed to the second slope 804_a_2 of the downstream side restriction releasing portion 804_a_ 10, similarly to Embodiment 3. By the releasing claw 214_e_ being pressed, the releasing member 214 moves in the rotational direction D against the urging force of the releasing spring 216 (not shown). Then, as shown in part (a) of FIG. 170, the second guided surface 214_e_2 of the releasing claw 214_e_ passes the downstream end of the second slope 804_a_2 of the downstream side restriction releasing portion 804_a_10 in the rotational direction D. In addition, the releasing claw 214_e_ is completely on the downstream side, in the rotational direction D, of the downstream side restriction releasing portion 804_a_10. At this time, as shown in part (b) of FIG. 170, in the downstream side restriction releasing portion 804_a_10, the projection 804_a_8 provided on the inner peripheral surface 804_a_11 abuts on the center boss 209_d_ of the apparatus-side shutter 209 in the radial direction r. By this, even if the contact state between the inner peripheral surface 804_a_11 of the downstream restriction releasing portion 804_a_ 10 and the releasing claw 214_e_ (not shown) in the radial direction r is lost, the deformation of the downstream restriction releasing portion 804_a_10 is maintained. For this reason, the second slope 804_a_2 of the downstream restriction releasing portion 804_a_10 maintains the second position.

When the toner pack 820 is further moved in the arrow N direction from the state shown in part (a) of FIG. 170, the third guided surface 214_e_3 of the releasing claw 214_e_ passes the flat surface 804_a_3 of the downstream side restriction releasing portion 804_a_10 in the arrow N direction (downward). And, the releasing claw 214_e_ rotates in the rotational direction E (second rotational direction) by the moment M202 (urging force) produced by the releasing spring 216 (not shown). Then, as shown in part (a) of FIG. 171, the contact surface 214_a_ of the releasing claw 214_e_ is in contact with the second abutment surface 804_a_4 of the downstream restriction releasing portion 804_a_10. At this time, as shown in part (b) of FIG. 171, the projection 804_a_8 of the downstream side restriction releasing portion 804_a_10 maintains the contact state with the center boss 209_d_ of the apparatus-side shutter 209. By this, the deformed portion 804_a_5 of the downstream restriction releasing portion 804_a_10 is maintained in the radial direction r. Therefore, the second slope 804_a_2 of the downstream restriction releasing portion 804_a_10 maintains the second position. In addition, the flat surface 804_a_3 of the downstream restriction releasing portion 804_a_10 is also placed at the second position in the radial direction r. By this, the surface of the releasing claw 214_e_ connected to the downstream end of the third guided surface 214_e_3 in the rotational direction K is referred to as the lower surface 214_e_81 (see also part (a) of FIG. 171), and the flat surface 804_a_3 of the downstream restriction releasing portion 804_a_10 and the lower surface 214_e_81 become able to face each other.

Thereafter, the operation is the same as that of Embodiment 3, and therefore, detailed description thereof will be omitted, but by operating the operating member 330 (see FIG. 104), the restriction releasing member 804 is moved in the direction of the arrow G, and the releasing claw 214*e* is moved in the direction of arrow G. That is, the flat surface 804*a*3 of the downstream side restriction releasing portion 804*a*10 functions as a force applying surface for applying a force for lifting the releasing member 214 upward to the lower surface 214*e*81 of the releasing claw 214*e*. By this, as shown in FIG. 172, the restricting member 213 is moved in the direction of arrow G (upward) together with the releasing member 214, and the rotation restriction by the rotation restricting mechanism 212 of the apparatus-side shutter 209 is released. By the above-described operation, the toner pack 820 mounting is completed.

Further, the operation of removing the toner pack 820 from the mounting portion 206 is the same as that of Embodiment 3, and therefore, the description thereof will be omitted. When the removal of the toner pack 820 is completed, the downstream restriction releasing portion 804*a*10 is restored from the deformed state, and the second slope 804*a*2 is in a state of being moved to the first position.

Modified Example 1

In this embodiment, the upstream restriction releasing portions 804*a*9, 804*b*9 and the downstream restriction releasing portions 804*a*10, 804*b*10 of the restriction releasing member 804 are parts of one member and are separated by slits 804*a*6 and 804*b*6. However, the present invention is not limited to such an example, and the upstream side restriction releasing portion 804*a*9 and the downstream side restriction releasing portion 804*a*10, 804*b*10 may be separate members. In this case, a structure in which the downstream restriction releasing portion having the deformable portion is a separate portion can be considered as an example. Referring to FIG. 173, this structure will be described below as a modified example.

FIG. 173 is a perspective view of the restriction releasing member 8104 in this modified example, (a) thereof shows an assembled state, and (b) thereof shows a disassembled state. As shown in part (a) of FIG. 173, in the restriction releasing member 8104 in this modified example, a first restriction releasing member 8104Ba including a downstream side restriction releasing portion 8104Ba10 a second restriction releasing member 8104Bb including a downstream side restriction releasing portion 8104Bb10 are connected with a main assembly member 8104A including upstream restriction releasing portions 8104Aa9 and 8104Ab9. As shown in part (b) of FIG. 173, the first restriction releasing member 8104Ba is provided with an engaging portion 8104Ba20 on the arrow U direction side (thereabove). Similarly, the second restriction releasing member 8104Bb is provided with an engaging portion 8104Bb20 on the arrow U direction side (thereabove). The engaging portion 8104Ba20 of the first restriction releasing member 8104Ba and the engaging portion 8104Bb20 of the second restriction releasing member 8104Bb are engaged with the groove portion 8104Ac provided in the main assembly member 8104A and fixed by means such as adhesion or press fitting.

Here, the upstream side restriction releasing portion 8104Aa9 and the downstream side restriction releasing portion 8104Ba10, the upstream side restriction releasing portion 8104Ab9 and the downstream side restriction releasing portion 8104Bb10 are symmetric with respect to the rotational axis A (central axis). Therefore, the upstream side restriction releasing portion 8104Aa9 and the downstream side restriction releasing portion 8104Ba10 will be described, and the description of the upstream side restriction releasing portion 8104Ab9 and the downstream side restriction releasing portion 8104Bb10 will be omitted.

The upstream side restriction releasing portion 8104Aa9 has a first abutment surface 8104Aa12 as in this embodiment which is a base embodiment of this modified example. The other structures of the upstream side restriction releasing portion 8104Aa9 are the same as those in this embodiment, and therefore, the description thereof will be omitted.

The downstream side restriction releasing portion 8104Ba10 has a second slope 8104Ba2 and a deformed portion 8104Ba5 as in the base embodiment, and the second slope 8104Ba2 can be moved to the first position and the second position as in the base embodiment.

Further, in a state in which the second slope 8104Ba2 is in the first position, an end surface of the downstream side restriction releasing portion 8104Ba10 facing the first abutment surface 8104Aa12 of the upstream side restriction releasing portion 8104Aa9 in the rotational direction K is the end surface 8104Ba13. The other structures of the downstream side restriction releasing portion 8104Ba10 are the same as those in the base embodiment, and therefore, the description thereof will be omitted.

In a state where the second slope 8104Ba2 is in the first position, the first abutment surface 8104Aa12 and the end surface 8104Ba13 are in contact with each other. That is, there is no gap corresponding to the slit of the base embodiment.

The above-described structure is peculiar to this modified example, and other structures are the same as those of the above-described embodiment.

Therefore, the description of the operation of the second slope 8104Ba2 moving from the first position to the second position and the description of the mounting/dismounting of the toner pack 820 with the movement of the toner pack 820 in the arrow N direction are omitted.

In this modified example, materials different from that of the main assembly member 8104A can be applied to the first restriction releasing member 8104Ba and the second restriction releasing member 8104Bb as compared with the base embodiment. It is possible that a material having high rigidity is used for the main assembly member 8104A, and a material having toughness and having advantages for elastic deformation is used for the first restriction releasing member 8104Ba and the second restriction releasing member 8104Bb.

As compared with the base embodiment of this modified example, this modified example has no slit (gap) between the first restriction releasing member 8104Ba and the second restriction releasing member 8104Bb and the main assembly member 8104A in the rotational direction K. That is, in the state that the second slopes 8104Ba2 and 8104Bb2 in the first position, the first restriction releasing member 8104Ba and the second restriction releasing member 8104Bb are supported by the main assembly member 8104A.

Therefore, it is possible to reduce the risk of damage when an unexpected external force is applied to the first restriction releasing member 8104Ba and the second restriction releasing member 8104Bb inadvertently by the user. In addition, the free end positions of the first restriction releasing member 8104Ba and the second restriction releasing member 8104Bb, which are elongated in the rotational axis A direction, can be protected from being displaced, and therefore, the mounting operation is further stabilized.

As for the method of dividing each of the restriction releasing portions, the base embodiment and this modified example may be appropriately selected according to the processing technique to be used.

Modified Example 2

In the base embodiment, the upstream restriction releasing portion 804$a$9 and the downstream restriction releasing portion 804$a$10 of the restriction releasing member 804 are divided in the rotational direction K by the slit 804$a$6. However, the present invention is not limited to such an example, and at least parts of the upstream side restriction releasing portion 804$a$9 and of the downstream side restriction releasing portion 804$a$10 may overlap in the rotational direction K. Referring to FIG. 174, such a structure will be described in the following as an example of this modified example.

FIG. 174 is a view of a restriction releasing member in this modified example as viewed from a second end side (nozzle side) of a first direction D1, wherein part (a) shows a restriction releasing member 8204 and part (b) shows another structure of the restriction releasing member 82104.

Referring to part (a) of FIG. 174, the structure of the restriction releasing member 8204 will be described. In the restriction releasing member 8204, the first end portion 8204$a$13 on the downstream side in the rotational direction K of the upstream side restriction releasing portion 8204$a$9 and the second end portion 8204$a$14 on the upstream side in the rotational direction K of the downstream side restriction releasing portion 8204$a$10 overlap in the rotational direction K. In addition, the second end portion 8204$a$14 of the downstream side restriction releasing portion 8204$a$10 is outside the first end portion 8204$a$13 of the upstream side restriction releasing portion 8204$a$9 in the radial direction r of the imaginary circle VC centered on the rotational axis A (central axis). Further, the slit 8204$a$6 is inclined so as to go in the direction opposite to the radial direction r as goes in the rotational direction K. By this, the downstream side restriction releasing portion 8204$a$10 can be deformed in the radial direction r.

Referring to part (b) of FIG. 174, the structure of the restriction releasing member 82104 will be described. The restriction releasing member 82104 is provided with a first end portion 82104$a$13 on the downstream side, in the rotational direction K, of the upstream side restriction releasing portion 82104$a$9, and a first end portion 82104$a$15 on the upstream side, in the rotational direction K, of the downstream side restriction releasing portion 82104$a$10. In addition, the upstream side restriction releasing portion 82104$a$9 has a second end portion 82104$a$14 recessed toward the upstream side in the rotational direction K, on an outside of the first end portion 82104$a$13 in the radial direction r. Further, the downstream side restriction releasing portion 82104$a$10 has a second end portion 82104$a$16 projecting toward the upstream side in the rotational direction K, on an outside of the first end portion 82104$a$15 in the radial direction r.

The first end portion 82104$a$13 of the upstream side restriction releasing portion 82104$a$9 and the first end portion 82104$a$15 of the downstream side restriction releasing portion 82104$a$10 are opposed and are close to each other in the rotational direction K. In addition, the second end portion 82104$a$14 of the upstream side restriction releasing portion 82104$a$9 and the second end portion 82104$a$16 of the downstream side restriction releasing portion 82104$a$10 are opposed and are close to each other in the rotational direction K. By this, the upstream side restriction releasing portion 82104$a$9 and the downstream side restriction releasing portion 82104$a$10 are partially overlapped in the rotational direction K and in the radial direction r. Also in this structure, the downstream side restriction releasing portion 82104$a$10 can be deformed in the radial direction r.

In this modified example, similarly to Modified Example 1 of the base embodiment, if it is difficult to process the slit, the upstream side restriction releasing portion and the downstream side restriction releasing portion may be made as separate portions.

Modified Example 3

In Modified Example 2 of this base embodiment, the upstream side restriction releasing portions 8204$a$9 and 82104$a$9 and the downstream side restriction releasing portions 8204$a$10 and 82104$a$10 are partly overlapped in the radial direction r and the rotational direction K of the imaginary circle VC centered on the rotational axis A. The present invention is not limited to such an example, the upstream side restriction releasing portion 804$a$9 and the downstream side restriction releasing portion 804$a$10 may be structured to overlap the rotational direction K with respect to the direction of the rotational axis A (central axis). Referring to FIG. 175, the structure in this case will be described in the following as such a modified example.

FIG. 175 is an illustration of a restriction releasing member in this modified example, wherein part (a) shows a restriction releasing member 8304, part (b) show the a restriction releasing member 83104 having a different structure, and part (c) is an another different structure of the restriction releasing member 83204.

Referring to part (a) of FIG. 175, the structure of the restriction releasing member 8304 will be described. The slit 8304$a$6 (consisting of a gap of about 0.2 to 0.5) of the restriction releasing member 8304 goes in the rotational direction K as goes the in the direction of the arrow U (upward). By this, the upstream side restriction releasing portion 8304$a$9 and the downstream side restriction releasing portion 8304$a$10 are structured to overlap with each other in the rotational direction K.

Referring to part (b) of FIG. 175, the structure of the restriction releasing member 83104 will be described. The slit 83104$a$6 (consisting of a gap of about 0.2 to 0.5) of the restriction releasing member 83104 extends so as to go in the rotational direction K as goes in the direction of the arrow N (downward). By this, the upstream side restriction releasing portion 83104$a$9 and the downstream side restriction releasing portion 83104$a$10 are structured to overlap with each other in the rotational direction K.

Referring to part (c) of FIG. 175, the structure of the restriction releasing member 83204 will be described. The slit 83204$a$6 (consisting of a gap of about 0.2 to 0.5) of the restriction releasing member 83204 extends so as to snake upstream and downstream in the rotational direction K as goes in the direction of the arrow U (upward). By this, the upstream side restriction releasing portion 83204$a$9 and the downstream side restriction releasing portion 83204$a$10 are structured to overlap with each other in the rotational direction K.

In this modified example, as in Modified Example 1 of this embodiment, if it is difficult to process the slit, the upstream side restriction releasing portion and the downstream side restriction releasing portion may be made as separate portions.

Embodiment 9

Next, referring to FIGS. 176 to 182, another structure will be described. The same points as those of the above-described embodiments and modified examples will be omitted. In particular, of the elements disclosed in this embodiment, those corresponding to the above-mentioned members will be assigned the same names as the above-mentioned members, and only the points different from the above-mentioned members will be described.

In Embodiment 2, the structure of a toner pack in which a projection is provided on the nozzle has been described. In this modified example, a structure in which a projection is provided on a rotatable member which is rotatable relative to the nozzle, not on the nozzle, will be described. This will be described in the following.

Referring to FIGS. 176, 177, 178, and 179, the structure of a toner pack 920 will be described. FIG. 176 is a perspective view of the toner pack 920 having the structure of this embodiment. FIG. 177 is an exploded perspective view of the toner pack 920. FIG. 178 is an exploded perspective view of the nozzle of this embodiment, and part (a) of FIG. 178 and part (b) of FIG. 178 are exploded perspective views a seen in different directions. FIG. 179 is an exploded perspective view of the pack-side shutter of this embodiment, and part (a) of FIG. 179 and part (b) of FIG. 179 are exploded perspective views as seen in different directions.

As shown in FIGS. 176 and 177, the toner pack 920 comprises an accommodating portion 901 (first accommodating portion), a connecting ring 930, a shutter portion 903A (rotatable member), an opening seal 931, a first nozzle portion 902A, the second nozzle portion 902B, a shutter seal 922, and a projecting portion unit 903B, in this order from the first end side in the first direction D1. A shutter unit 903 assembled so that the shutter portion 903A and the projecting portion unit 903B are integrated with the nozzle 902 (discharge portion) including the first nozzle portion 902A and the second nozzle portion 902B which are assembled to be integral with each other, is rotatable around the rotational axis A (central axis).

The connecting ring 930 has a generally cylindrical shape coaxial with the rotational axis A, and the accommodating portion 901 is connected to the outer peripheral portion 930*b* with hermetical sealing. The shutter portion 903A is connected to the connecting ring 930 from the second end portion side in the first direction D1. The connecting ring 930 and the shutter portion 903A are integrally coupled.

As shown in FIG. 178, the shutter portion 903A has a generally cylindrical shape coaxial with the rotational axis A, and includes an end surface 903Aa, a cylindrical portion 903Ab, and an end surface 903Ac perpendicular to the rotational axis A and provided on the second end side in the first direction D1, in this order in the first direction D1 from the first end portion side. The shutter portion 903A is provided with a through hole 903Ad penetrating in the first direction D1. The through hole 903Ad has a sector shape centered on the rotational axis A, and the sector angle thereof V90 is at about 75°. A hollow flat plate-shaped opening seal 931 is mounted to the through hole 903Ad from the second end side in the first direction D1 by adhesion. The opening seal 931 is made of an elastic sponge or the like, and is provided so as to surround the sector-shaped through hole 903Ad.

The end surface 903Aa is provided with a cylindrical recess 903Ag which is substantially coaxial with the rotational axis A recessed toward the second end side in the first direction D1. A surface 903Ah is provided at the bottom portion of the recess 903Ag. The surface 903Ah is a surface inclined toward the second end portion side of the first direction D1 as goes toward the through hole 903Ad.

In addition, the end surface 903Ac is provided with two-sided recess portions 903Ae coaxial with the rotational axis A and recessed toward the first end portion in the first direction D1. A surface 903Af perpendicular to the rotational axis A is provided at the bottom portion of the recess 903Ae.

As shown in FIG. 179, the first nozzle portion 902A has a hollow cylindrical shape coaxial with the rotational axis A, and includes an end surface 902Aa and a first cylindrical portion 902Ah and a disk portion 902Ab having a diameter larger than that of the first cylindrical portion 902Ah and a second cylinder portion 902Ac having a diameter smaller than that of the disk portion 902Ab provided coaxially with the rotational axis A, in this order from the first end side in the first direction D1, and an end surface 902Af is provided on the second end side of the first direction D1. In addition, the first nozzle portion 902A is provided with a through hole 902Ae coaxial with the rotational axis A. Further, a through hole 902Ad, which is a sector-shaped through hole centered on the rotational axis A is provided. The end surface 902Aa is provided with a cylindrical recess 902Am coaxial with the rotational axis A and recessed toward the second end in the first direction D1, and a surface 902Ak perpendicular to the rotational axis A at the bottom portion of the recess 902Am. In addition, the end surface 902Af is provided with a D-cut recess 902Ag on the first end side in the first direction D1, and the bottom portion of the recess 902Ag is provided with a surface 902An perpendicular to the rotational axis A.

In the second nozzle portion 902B, a hollow outer cylindrical portion 902Ba and an inner cylindrical portion 902Bb which are coaxial with the rotational axis A are connected by an end surface 902Bc placed on the second end side in the first direction D1. On the outer surface of the outer cylindrical portion 902Ba, a recess 902Bj recessed inside in the radial direction r of the imaginary circle VC is provided. The recess 902Bj is structured to engage with the drive transmission portion 208*a* of the operating lever 208 and the driven transmission portion 209*e* of the apparatus-side shutter 209, when the toner pack 920 is mounted to the mounting portion 206.

The inner cylindrical portion 902Bb is provided with an end surface 902Be on the first end portion side in the first direction D1. The outer peripheral portion 902Bf of the end surface 902Be has a D-cut shape, is fitted into the recess 902Ag of the first nozzle portion 902A from the second end side in the first direction D1, and the end surface 902Be abuts to the surface 902An of the first nozzle portion 902A, and the second nozzle portion 902B is fixed to the first nozzle portion 902A by adhesive.

The end surface 902Be is provided with a recess 902Bd recessed toward the second end side in the first direction D1. In addition, the side surface portion 902Bh of the inner cylindrical portion 902Bb is provided with a discharge opening 902Bk which is in fluid communication with the recess 902Bd and is directed to the outside in the radial direction r of the imaginary circle VC centered on the rotational axis A. The recess 902Bd is a toner passage leading to the discharge opening 902Bk. A discharge seal 933 is mounted on the side surface portion 902Bh of the second nozzle portion 902B. The discharge seal 933 has a hollow flat plate shape, and is mounted by adhesive along the side surface portion 902Bh so that the through hole portion 933*a* surrounds the discharge opening 902Bk. The discharge seal 933 is made of an elastic sponge. The recess 902Bj of the outer cylindrical portion 902Ba is provided on the outer surface on the opposite side of the discharge opening 902Bk with the rotational axis A interposed therebetween.

The end surface 902Bc is provided with a first recess portion 902Bg having a cylindrical shape which is coaxial with the rotational axis A and which is recessed toward the first end portion in the first direction D1. In addition, a second recess portion 902Bp having a cylindrical recess shape which has a diameter smaller than that of the first recess portion 902Bg and which is coaxial with the rotational axis A, is provided on the first end side, in the first direction D1, of the first recess portion 902Bg. The first recess portion 902Bg and the second recess portion 902Bp are connected by a surface 902Bn which is a flat surface perpendicular to the rotational axis A. Further, the second nozzle portion 902B is provided with a through hole 902Bm penetrating in the first direction D1 coaxially with the rotational axis A.

As shown in FIG. 178, the projecting portion unit 903B has a cylindrical shape, and includes a shaft portion 903Ba, a first cylindrical portion 903Bb having a diameter larger than that of the shaft portion 903Ba, a second cylindrical portion 903Bc having a diameter larger than that of the first cylindrical portion 903Bb, and a cylindrical projecting portion 903Bg (projecting portion, engaging portion) which are coaxial with the rotational axis A, in this order from the first end side in the first direction D1. That is, in this embodiment, the projecting portion 903Bg is provided on the shutter unit 903 (shutter portion 903A), not on the nozzle 902.

The projecting portion 903Bg has the same shape as the projecting portion 202*b* of Embodiment 2 described above, and therefore, the description thereof will be omitted.

An end surface 903Bf and a two-way shaped two-sided cut portion 903Be are provided on the first end side of the shaft portion 903Ba on the first end side in the first direction D1. The second cylindrical portion 903Bc is provided with an end surface 903Bh perpendicular to the rotational axis A on the first end side in the first direction D1.

A hollow cylindrical shutter seal 922 is fitted on the outer periphery of the first cylindrical portion 903Bb from the first end portion side of the first direction D1. The shutter seal 922 is made of an elastic sponge. The inner diameter of the shutter seal 922 is slightly smaller than the outer diameter of the first cylindrical portion 903Bb, and therefore, the shutter seal 922 is mounted in close contact therewith, while expanding the inner diameter. Further, the shutter seal 922 is pushed toward the second end portion side in the first direction D1 and is abutted against the end surface 903Bh.

Here, as shown in FIG. 177, the first nozzle portion 902A and the second nozzle portion 902B are fixed by adhesive as described above. The shutter portion 903A and the projecting portion unit 903B are mounted, in the first direction D1, to the first nozzle portion 902A and the second nozzle portion 902B fixed to each other.

Specifically, the shaft portion 903Ba of the projecting portion unit 903B penetrates a through hole 902*m* (see FIG. 182) of the second nozzle portion 902B and the through hole 902Ae of the first nozzle portion 902A from the second end side in the first direction D1. Thereafter, the two-sided cut portion 903Be of the projecting portion unit 903B is fitted into the recess 903Ae of the shutter portion 903A, and the end surface 903Bf abuts to the surface 903Af (see FIG. 182) and is fixed by adhesive. In addition, at this time, the shutter seal 922 mounted on the projecting portion unit 903B is pushed into the first recess portion 902Bg of the second nozzle portion 902B from the second end side in the first direction D1 (see FIG. 182). Here, the outer diameter of the shutter seal 922 is slightly larger than the inner diameter of the first recess portion 902Bg of the second nozzle portion 902B, and the shutter seal 922 is closely mounted while being packed at the outer diameter portion. In addition, the shutter seal 922 is mounted so as to be abutted against the surface 902Bn of the second nozzle portion 902B and packed in the first direction D1.

Further, the opening seal 931 (see FIG. 178) mounted to the shutter portion 903A is compressed between in the first direction between the end surface 903Ac of the shutter portion 903A and the surface 902Ak of the first nozzle portion 902A (see FIG. 179), and therefore is mounted without gap.

(Mounting Operation)

Next, referring to FIGS. 180, 181 and 182, the mounting to the image forming apparatus 1 will be described in the following. The operation of the mounting portion 206 in the mounting is the same as that of Embodiment 2, and therefore, the description thereof will be omitted.

FIG. 180 is a top view and a side view illustrating a state in which the toner pack 920 is mounted on the mounting portion 206. Part (a) of FIG. 180 and part (b) of FIG. 180 are top views in a state in which the toner pack 920 is mounted and a state in which toner is replenished into the toner accommodating chamber 36 of the developer container 32, respectively. Part (c) of FIG. 180 and part (d) of FIG. 180 are side views in a state in which the toner pack 920 is mounted and a state in which toner is replenished into the toner accommodating chamber 36 of the developer container 32, respectively.

FIG. 181 and FIG. 182 are cross-sectional views showing each cross-section along the sectional line shown in FIG. 180.

Part (a) of FIG. 181, part (b) of FIG. 181, part (c) of FIG. 181, and part (d) of FIG. 181 are cross-sectional views taken along a line X901-X901, a cross-sectional view taken along a line X903-X903, a cross-sectional view taken along a line X902-X902, and a cross-sectional view taken along a line X904-X904 in FIG. 180, respectively. Part (a) of FIG. 182 and part (b) of FIG. 182 are a sectional view taken along a line X905-X905 and a sectional view taken along a line X906-X906 in FIG. 180.

As shown in FIG. 180, the toner pack 920 is mounted on the mounting portion 206 in the same manner as in Embodiment 2. At this time, as shown in part (c) of FIG. 181, the discharge seal 933 mounted to the second nozzle portion 902B is mounted while being packed by the cover 210 in the radial direction r of the imaginary circle VC.

At this time, as shown in part (a) of FIG. 181, the through hole 903Ad of the shutter portion 903A and the through hole 902Ad of the first nozzle portion 902A are placed at positions deviated from each other in the rotational direction about the rotational axis A. Here, as shown in part (a) of FIG. 182, an opening seal 931 is mounted to the second end side of the first direction D1 of the through hole 903Ad of the shutter portion 903A, and the toner in the through hole 903Ad prevented from leaking, by the shutter portion 903A, an opening seal 931 and a first nozzle portion 902A.

As shown in FIG. 181, after the toner pack 920 is mounted on the mounting portion 206, the user rotates the operating lever 208 in the arrow D direction as in Embodiment 2.

At this time, the first nozzle portion 902A and the second nozzle portion 902B rotate integrally with each other with the operating lever 208 in the same manner as the pack side shutter 203 of Embodiment 2. This is because the recess 902Bj of the second nozzle portion 902B of the nozzle 902 engages with the drive transmission portion 208*a* of the operating lever 208 and the driven transmission portion 209*e* of the apparatus-side shutter 209.

By the rotation of the first nozzle portion 902A and the second nozzle portion 902B, as shown in part (b) of FIG. 181, the through hole 903Ad of the shutter portion 903A and the through hole 902Ad of the first nozzle portion 902A become opposed. At this time, as shown in part (b) of FIG. 182, the toner of the toner pack 920 slides down the surface 903Ah, passes through the through hole 903Ad of the shutter portion 903A, passes through the inside of the opening seal 931, passes through the through hole 902Ad of the first nozzle portion 902A, and flows into the recess 902Bd of the second nozzle portion 902B.

At this time, as shown in part (b) of FIG. 182, an opening seal 931 is mounted to the second end side of the first direction D1 of the through hole 903Ad of the shutter portion 903A so as to surround the through hole 902Ad of the first nozzle portion 902A. Therefore, the toner flowing in from the through hole 903Ad of the shutter portion 903A is prevented from leaking, by the opening seal 931 and does not flow out to other than the through hole 902Ad.

Further, as shown in part (d) of FIG. 181, as the operating lever 208 rotates, the discharge seal 933 mounted to the second nozzle portion 902B also rotates and moves in the arrow D direction together with the second nozzle portion 902B, so that the discharge opening 902Bk moves to a position facing the receiving opening 209*a* of the apparatus-side shutter 209. At this time, the discharge seal 933 is in a state of being compressed to the receiving opening 209*a* in the radial direction r of the imaginary circle VC centered on the rotational axis A. Therefore, the discharge seal 933 seals between the discharge opening 902Bk of the second nozzle portion 902B and the receiving opening 209*a* of the apparatus-side shutter 209, and the toner is prevented from leaking thereby.

Further, as shown in part (d) of FIG. 182, even when toner flows through the slight gap between the through hole 902*m* of the second nozzle portion 902B and the shaft portion 903Ba of the projecting portion unit 903B along the shaft portion 903Ba toward the second end portion side, the toner does not flow out to the outside of 920 in the first direction D1, because the shutter seal 922 seals between the second nozzle portion 902B and the projecting portion unit 903B in a compressed state.

Thus, the toner in the accommodating portion 901 is replenished into the toner accommodating chamber 36 of the developer container 32 through the discharge opening 902Bk of the second nozzle portion 902B as in Embodiment 2.

In addition, after the toner replenishment is finished, the operating lever 208 is rotated in the direction of arrow E in the same manner as in Embodiment 2, by which the toner pack 920 becomes able to be removed from the main assembly of the apparatus, but it is the same as that described above, and therefore, the description thereof will be omitted.

As described foregoing, in the toner pack 920 of this embodiment, the projection 903Bg is provided on the shutter unit 903 which is structured to be rotatable relative to the nozzle 902.

In this embodiment, the opening seal 931 seals between the shutter portion 903A and the first nozzle portion 902A, but as described above, it is also possible to employ a structure in which the toner seal provided at the nozzle opening is broken or pulled out.

Further, in this embodiment, since the toner pack 920 does not seal the discharge opening 902Bk after finishing the toner replenishment, it is conceivable that the deposited toner may flow out from the discharge opening 902Bk.

Therefore, an adhesive seal (not shown) which closes the discharge opening 902Bk after use by the user may be mounted.

Embodiment 10

Next, referring to FIGS. 183 to 191, another structure will be described. The same points as those of the above-described embodiments and modified examples will be omitted. In particular, of the elements disclosed in this embodiment, those corresponding to the above-mentioned members will be assigned the same names as the above-mentioned members, and only the points different from the above-mentioned members will be described.

In the structure shown in Embodiment 2, the projecting portion 202*b* is provided at the nozzle 202, but it is also possible to provide the projection on the rotatable member which is rotatable relative to the accommodating portion 201 and the nozzle 202. Hereinafter, a structure in which a projecting portion is provided on the rotatable member will be described.

Referring to FIGS. 183, 184, 185, and 186, the structure of the toner pack 10020 will be described. FIG. 183 is a perspective view of a toner pack 10020 of this embodiment. FIG. 184 is an exploded perspective view of the toner pack 10020. FIG. 185 is exploded views of the nozzle of this embodiment, in which part (a) of FIG. 185 and part (b) of FIG. 185 are exploded perspective views as seen in different directions, part (c) of FIG. 185 is a side view, and part (d) of FIG. 185 is a sectional view taken along a line X1001-X1001 in part (c) of FIG. 185. FIG. 186 is an exploded perspective view of the pack-side shutter in this embodiment, and part (a) of FIG. 186 and part (b) of FIG. 186 are exploded perspective views as seen in different directions.

As shown in FIG. 184, the toner pack 10020 includes an accommodating portion 201 (first accommodating portion), a first nozzle portion 1002A, a second nozzle portion 1002B, a shutter 1003 and a screw 1030, in this order from the side of the first end portion in the first direction D1.

As shown in FIG. 185, the first nozzle portion 1002A has a cylindrical shape coaxial with the rotational axis A (central axis), and includes a first cylindrical portion 1002Aa a disk portion 1002Ab having a diameter larger than that of the first cylindrical portion 1002Aa, a second cylindrical portion 1002Ad having a diameter smaller than that of the disk portion 1002Ab (see part (d) of FIG. 185), in this order from the first end portion side in the first direction D1. Inside the second cylindrical portion 1002Ad, a through hole 1002Af coaxial with the rotational axis A is provided.

The disk portion 1002Ab is provided with a third cylindrical portion 1002Ac which projects toward the second end portion in the first direction D1 and has a diameter larger than that of the second cylindrical portion 1002Ad, coaxially with the rotational axis A. The third cylindrical portion 1002Ac projects beyond the second cylindrical portion 1002Ad toward the second end portion in the first direction D1.

In addition, the disk portion 1002Ab is provided with a fourth cylindrical portion 1002Ag, which projects toward the second end portion in the first direction D1 and has a diameter larger than that of the third cylindrical portion 1002Ac, coaxially with the rotational axis A.

A D-cut portion 1002Ak is provided on the first end portion side in the first direction D1 inside the third cylindrical portion 1002Ac. Inside the first cylindrical portion 1002Aa, a slope 1002Ah inclined toward the through hole 1002Af is provided so as to approach the rotational axis A toward the second end portion side in the first direction D1. In the first nozzle portion 1002A, the first cylindrical portion 1002Aa is integrally coupled with the accommodating portion 201 (see FIG. 184).

As shown in part (a) of FIG. 185 and part (b) of FIG. 185, in the second nozzle portion 1002B, the outer cylindrical portion 1002Ba and the inner cylindrical portion 1002Bb coaxial with the rotational axis A are connected at an end surface 1002Bc placed on the second end portion side in the first direction D1. The inner cylindrical portion 1002Bb has a cylindrical shape, and as shown in part (d) of FIG. 185, It is provided with a partition plate 1002Bn so as to partition the inside of the cylindrical portion perpendicular to the rotational axis A. Here, a cylindrical recess on the first end portion side in the first direction D1 partitioned by the partition plate 1002Bn is referred to as a recess 1002Bf, and a cylindrical recess on the second end portion is referred to as a recess 1002Bg. The outer peripheral surface 1002Bd of the inner cylindrical portion 1002Bb is provided with a discharge opening 1002Be (opening) which communicates with the recess 1002Bf. On the second end portals the of the partition plate 1002Bn in the first direction D1, a screw hole portion 1002Bh recessed toward the first end portion side in the first direction D1 is provided coaxially with the rotational axis A. A D-cut portion 1002Bk and an end surface 1002Bm are provided on the outer diameter portion on the first end portion side of the inner cylindrical portion 1002Bb in the first direction D1. On the outer surface of the outer cylindrical portion 1002Ba, a recess 1002Bj recessed inside in the radial direction r of the imaginary circle VC is provided. The recess 1002Bj is structured to engage the drive transmission portion 208*a* of the operating lever 208 and the driven transmission portion 209*e* of the apparatus-side shutter 209 when the toner pack 10020 is mounted to the mounting portion 206.

The D-cut portion 1002Bk of the second nozzle portion 1002B is fitted into the D-cut portion 1002Ak of the first nozzle portion 1002A from the second end portion side in the first direction D1. Then, in a state that the end surface 1002Bm abuts on the disk portion 1002Ab, the second nozzle portion 1002B is integrally bonded to the first nozzle portion 1002A by adhesive or the like.

As shown in part (a) of FIG. 186, the shutter 1003 has a cylindrical shape and includes, a cylindrical portion 1003*a* and a projecting portion 1003*b* (projection portion, engagement) in this order from the first end portion side in the first direction D1, coaxially with the rotational axis A. The projecting portion 1003*b* has the same shape as the projecting portion 202*b* of Embodiment 2, and therefore, the description thereof will be omitted. A through hole 1003*c* is provided coaxially with the rotational axis A in the cylindrical portion 1003*a*. A semi-cylindrical shutter portion 1003*d* (rotatable member) is provided coaxially with the rotational axis A on the outside of the cylindrical portion 1003*a*. The shutter portion 1003*d* of the shutter 1003 is rotatable relative to the second nozzle portion 1002B between an open position for opening the discharge opening 1002Be (opening) provided in the outer peripheral surface 1002Bd of the second nozzle portion 1002B and a shielding position for shielding the discharge opening 1002Be (opening). As shown in part (b) of FIG. 186, the shutter portion 1003*d* and the cylindrical portion 1003*a* are connected by an end surface 1003*e* placed on the second end portion side of the shutter portion 1003*d* in the first direction D1. The shutter portion 1003*d* is provided with a through hole 1003*f* which penetrates in the radial direction r of the imaginary circle VC centered on the rotational axis A.

The first discharge seal 1031 is mounted to the shutter portion 1003*d* of the shutter 1003 from the opposite side in the radial direction r. The first discharge seal 1031 has a flat plate shape having a through hole 1031*a*, and is formed of an elastic sponge or the like. The first discharge seal 1031 is mounted on the shutter 1003 by adhesive or the like so that the through hole 1031*a* surrounds the through hole 1003*f* on the outer peripheral surface side of the shutter portion 1003*d.*

In addition, a second discharge seal 1032 is mounted to the shutter portion 1003*d* from the side in the radial direction r. The second discharge seal 1032 has a flat plate shape including a through hole 1032*a*, and is formed of an elastic sponge or the like. The second discharge seal 1032 is mounted to the shutter 1003 on the inner peripheral surface side of the shutter portion 1003*d* by adhesive or the like so that the through hole 1032*a* surrounds the through hole 1003*f.* Further, as shown in part (b) of FIG. 186, two projections 1003*m* and 1003*n* projecting toward the radial direction r are provided on the second end portion side of the first direction D1 of the shutter portion 1003*d.*

Next, referring to FIG. 187, the mounting of the shutter 1003 will be described. Part (a) of FIG. 187 is a side view of the toner pack 10020, and part (b) of FIG. 187 is a sectional view taken along a line X1002-X1002 in part (a) of FIG. 187.

As shown in part (b) of FIG. 187, the shutter 1003 is coaxially mounted to the second nozzle portion 1002B from the second end portion side in the first direction D1 along the rotational axis A. At this time, the cylindrical portion 1003*a* of the shutter 1003 is inserted into the recess 1002Bg of the second nozzle portion 1002B. The shutter 1003 is inserted until the end surface 1003*h* on the side of the first end portion of the cylindrical portion 1003*a* in the first direction D1 abuts to the partition plate 1002Bn of the second nozzle portion 1002B. At the same time, the shutter 1003 is mounted to the second nozzle portion 1002B while packing the first discharge seal 1031 between the outer cylindrical portion 1002Ba of the second nozzle portion 1002B and the shutter portion 1003*d* of the shutter 1003. Similarly, the shutter 1003 is mounted to the second nozzle portion 1002B while packing the second discharge seal 1032 between the shutter portion 1003*d* of the shutter 1003 and the inner cylindrical portion 1002Bb of the second nozzle portion 1002B.

Thereafter, in the shutter 1003, the first end portion side of the shutter portion 1003*d* in the first direction D1 is fitted between the third cylindrical portion 1002Ac and the fourth cylindrical portion 1002Ag of the first nozzle portion 1002A. In this manner, the cylindrical portion 1003*a* engages with the recess 1002Bg, and the shutter portion 1003*d* engages with the third cylindrical portion 1002Ac and the fourth cylindrical portion 1002Ag, so that the shutter 1003 is supported so as to be rotatable about the rotational axis A relative to the second nozzle portion 1002B. That is, the shutter 1003 is a rotatable member which is rotatable about the rotational axis A relative to the first nozzle portion 1002A and the second nozzle portion 1002B, which are discharge portions.

Next, on the shutter 1003, a screw 1030 is threaded coaxially with the rotational axis A from the second end portion side in the first direction D1. As shown in part (b) of FIG. 187, the screw 1030 includes, the threaded portion 1030*b* and a disk portion 1030*a* having a diameter larger than that of the threaded portion 1030*b* coaxially with the rotational axis A, in this order from the first end portion side in the first direction D1. The screw 1030 penetrates the through hole 1003*f* of the shutter 1003 and is screwed into the screw hole portion 1002Bh of the second nozzle portion 1002B. The outer diameter of the threaded portion 1030*b* of the screw 1030 is smaller than the through hole 1003*f* of the shutter 1003 and does not come into contact with each other. In this manner, the shutter 1003 is supported so as to be sandwiched between the partition plate 1002Bn of the second nozzle portion 1002B and the disk portion 1030*a* of the screw 1030.

At this time, in the direction of the rotational axis A, the shutter 1003 is supported with a slight gap between the second nozzle portion 1002B and the screw 1030. In this manner, the shutter 1003 is supported so as to be rotatable relative to the second nozzle portion 1002B about the rotational axis A against the friction produced by the first discharge seal 1031 and the second discharge seal 1032.

With the above-described structure, as shown in part (b) of FIG. 187, the toner of the accommodating portion 201 slides down the slope 1002Ah of the first nozzle portion 1002A and flows into the recess 1002Bf by way of the through hole 1002Af. The discharge opening 1002Be leading to the recess 1002Bf is sealed by the second discharge seal 1032 mounted in the shutter portion 1003*d* of the shutter 1003. This is the case where the shutter 1003 is in the shielded position relative to the second nozzle portion 1002B.

Next, referring to FIGS. 188 to 191, mounting the toner pack 10020 on the image forming apparatus 1 will be described. FIGS. 188 and 189 are illustrations of a state in which the toner pack 10020 is mounted on the mounting portion 206. Part (a) of FIG. 188 is a top view, part (b) of FIG. 188 is a side view, part (c) of FIG. 188, parts (a) and (b) of FIG. 189 are sectional views taken along lines X1003-X1003, X1004-X1004 and X1005-X1005 in part (b) of FIG. 188, respectively. FIGS. 190 and 191 are illustrations of a state in which the toner of the toner pack 10020 is being supplied into the toner accommodating chamber 36 of the developer container 32. Part (a) of FIG. 190 is a top view, part (b) of FIG. 190 is a side view, and part (c) of FIG. 190 and FIG. 191 are sectional and cross-sectional views taken along lines X1006-X1006 and X1007-X1007 in part (b) of FIG. 190, respectively.

As shown in part (a) of FIG. 188 and part (a) of FIG. 190, the toner pack 10020 is mounted on the mounting portion 206 in the same manner as in Embodiment 2. At this time, as shown in part (b) of FIG. 189, the projections 1003*m* and 1003*n* of the shutter 1003 are mounted so as to sandwich the cover 210 on the apparatus-side in the rotational direction about the center of the rotational axis A. In this manner, the shutter 1003 is positioned relative to the mounting portion 206 in the rotational direction about the rotational axis A.

In addition, as shown in part (a) of FIG. 189, the discharge opening 1002Be of the second nozzle portion 1002B is sealed with the second discharge seal 1032 mounted on the shutter portion 1003*d* of the shutter 1003 as described above.

Next, as shown in part (a) of FIG. 190, when the user rotates the operating lever 208 in the rotational direction D the apparatus side shutter 209, the nozzle portion 1002B, the first nozzle portion 1002A, and the accommodating portion 201 rotate integrally with the operating lever 208 (see part (a) of FIG. 190), as shown in part (c) of FIG. 190 and FIG. 191. At this time, as described above, the shutter 1003 does not rotate relative to the mounting portion 206 because the shutter 1003 is positioned with respect to the cover 210 (see part (b) of FIG. 189) in the rotational direction centered on the rotational axis A. Even when the accommodating portion 201 is formed of a bag or the like, the second nozzle portion 1002B, the first nozzle portion 1002A, and the accommodating portion 201 are integrally rotated by rotating the operating lever 208, according to this embodiment, and therefore, it is easy to operate.

Therefore, as shown in FIG. 191, the second nozzle portion 1002B rotates relative to the shutter 1003 which does not move and rotate in the rotational direction D, and the discharge opening 1002Be becomes opposed to the through hole 1003*f* of the shutter 1003 in the radial direction r of the imaginary circle VC centered on the rotational axis A. This position is when the shutter 1003 is in the open position for the second nozzle portion 1002B.

At this time, between the second nozzle portion 1002B and the shutter 1003, and the second discharge seal 1032 surrounding the discharge opening 1002Be and the through hole 1003*f* is in the state of being compressed in the radial direction r and they are in close contact with each other. Similarly, the apparatus-side shutter 209 also rotates relative to the shutter 1003 in the rotational direction D, and the receiving opening 209*a* is placed to oppose the through hole 1003*f* of the shutter 1003 in the radial direction r. At this time, between the apparatus-side shutter 209 and the shutter 1003, are surrounded, and the first discharge seal 1031 surrounding the receiving opening 209*a* and the through hole 1003*f* is in a state of being compressed in the radial direction r and they are in close contact with each other.

Therefore, the toner discharged from the discharge opening 1002Be of the second nozzle portion 1002B is discharged to the receiving opening 209*a* of the apparatus-side shutter 209 through the through hole 1003*f* of the shutter 1003.

Thus, the toner in the accommodating portion 201 is replenished into the toner accommodating chamber 36 in the developer container 32 through the first nozzle portion 1002A, the second nozzle portion 1002B, the shutter 1003, and the apparatus-side shutter 209.

Further, after the toner is replenished, the operating lever 208 can be rotated in the direction of arrow E as in Embodiment 2, and the toner pack 10020 can be removed from the main assembly of the apparatus, and it is only the reverse of the above-described operations, and therefore, the description thereof is omitted.

Embodiment 11

Next, referring to FIGS. 192 to 195, the structure of the toner pack 1120 of this embodiment will be described. The same points as those of the above-described embodiments and modified examples will be omitted. In particular, of the elements disclosed in this embodiment, those corresponding to the members of Embodiment 2 will be assigned the same names as the members of Embodiment 2, and only the points different from the above-mentioned points will be described.

In the structure shown in Embodiment 2, the nozzle 202 of the toner pack 220 is integrally provided with the projecting portion 202*b*, but by making the nozzle as a movable separate portion, the toner pack 220 can be downsized. The structure in which the nozzle is provided as a movable separate component will be described in the following.

FIG. 192 is a perspective view illustrating a state in which a free end member 1132 of the toner pack 1120 of this embodiment is in a second attitude. FIG. 193 is a partially exploded perspective view of the toner pack 1120 according to this embodiment. In this embodiment, the toner pack 1120 has the same structure as that of Embodiment 2 except for the projecting portion of the nozzle and the shutter on the pack side. In this embodiment, as shown in FIG. 193, the projecting member 1130 is mounted to the nozzle 1102 from the second end side in the first direction D1.

Referring to FIGS. 193 and 194, the structure of the projecting member 1130 will be described. FIG. 194 is an exploded perspective view of the projecting member 1130 of this embodiment, and part (a) of FIG. 194 and part (b) of FIG. 194 are exploded perspective views as seen from different directions.

As shown in part (a) of FIG. 194, the projecting member 1130 comprises a fixed shaft 1131 and a free end member 1132, in this order from the first end side in the first direction D1. The structure is such that the free end member 1132 is movable between a second attitude in which the axis of a cylindrical portion 1132*a* intersects the rotational axis A (central axis) and a first attitude in which the axis of the cylindrical portion 1132*a* is substantially aligned with the rotational axis A. Details will be described hereinafter.

The fixed shaft 1131 has a shaft shape and is coaxial with the rotational axis A. The fixed shaft 1131 is provided with an end surface 1131*a* on the first end side in the first direction D1, and a shaft portion 1131*b* having a double sided flat shape. In addition, the fixed shaft 1131 is provided with a through hole 1131*c* perpendicular to the rotational axis A. A curved end surface 1131*d* coaxial with the through hole 1131*c* is provided on the second end side of the fixed shaft 1131 in the first direction D1. Further, a slit portion 1131*e* is provided on the second end side of the fixed shaft 1131 in the first direction D1 in parallel with the rotational axis A and perpendicular to the axis direction of the through hole 1131*c*. The end surface 1131*d* is provided with a plurality of projections (1131*f*, 1131*g*, 1131*h*) projecting in a direction away from the axis of the through hole 1131*c*. Here, the plurality of projections are symmetrically provided with the slit portion 1131*e* interposed therebetween, and therefore, The description will be made as to only one side thereof. The end surface 1131*d* is provided with a projection 1131*f* projecting in a direction away from the axis of the through hole 1131*c* and in a direction perpendicular to the rotational axis A. Further, the end surface 1131*d* is provided with projections 1131*g* and 1131*h* projecting in the direction away from the axis of the through hole 1131*c* and in the direction of the rotational axis A at intervals from each other.

The free end member 1132 has a cylindrical shape, and is provided in the direction perpendicular to the rotational axis A and the axial direction of the through hole 1131*c* of the fixed shaft 1131.

The free end member 1132 is provided so that the cylindrical portion 1132*a* and the projecting portion 1132*b* projecting from the cylindrical portion 1132*a* are coaxial with each other in the radial direction r of the imaginary circle VC centered on the rotational axis A. Here, the projecting portion 1132*b* has the same shape as the projecting portion 202*b* of the nozzle 202 of Embodiment 2, and therefore, the description thereof will be omitted.

From the cylindrical portion 1132*a*, a support plate portion 1132*c* (support portion) projecting in the axial direction of the cylindrical portion 1132*a* is provided. The support plate portion 1132*c* has a flat plate shape symmetric with respect to the axis of the cylindrical portion 1132*a*, and is provided in a direction perpendicular to the axis direction of the through hole 1131*c*. The support plate portion 1132*c* is provided with a through hole 1132*d* and a spherical projection 1132*e* in the radial direction r of the imaginary circle VC centered on the rotational axis A. The spherical projections 1132*e* are provided symmetrically at two positions with the support plate portion 1132*c* interposed therebetween.

As shown in FIG. 194, the support plate portion 1132*c* of the free end member 1132 is inserted into the slit portion 1131*e* of the fixed shaft 1131 in the direction perpendicular to the rotational axis A and the through hole 1131*c* (direction of arrow 11B). Further, a parallel pin 1133, which is a rod-shaped member, is coaxially inserted into the through hole 1132*d* of the support plate portion 1132*c* and the through hole 1131*c* of the fixed shaft 1131.

In this manner, the free end member 1132 is supported so as to be rotatable relative to the fixed shaft 1131 by way of the parallel pin 1133. In addition, at this time, the projection 1132*e* mounted on the support plate portion 1132*c* of the free end member 1132 is in contact with the projection 1131*f* of the fixed shaft 1131 and is constrained from rotating in the rotational direction 11A centered on the through hole 1131*c* (see part (b) of FIG. 195).

As shown in FIG. 193, in the fixed shaft 1131, the shaft portion 1131*b* is inserted into the hole 1102*a* which has the double sided flat in the rotational axis direction A and which is provided in the nozzle 1102 of the toner pack 1120, from the second end side of the first direction D1, until abutting to the end surface 1131*a*, and then it is fixed by adhesive or the like.

Next, referring to FIG. 195, the user's operation before use will be described.

FIG. 195 is a side view and a sectional view illustrating a user operation of the projecting member 1130.

Part (a) of FIG. 195 is a side view illustrating the projecting member 1130. Part (b) of FIG. 195 is a sectional view taken along a line X1101-X1101 in part (a) of FIG. 195, showing a state in which the free end member 1132 is in the second attitude. Part (c) of FIG. 195 shows a state in which the free end member 1132 has moved to the first attitude from the position of part (b) of FIG. 195.

As shown in part (b) of FIG. 195, before the user operation, the free end member 1132 (and the cylindrical portion 1132*a*) of the projecting member 1130 is provided on the fixed shaft 1131 so as to cross the rotational axis A.

At this time, as described above, the projection 1132*e* of the free end member 1132 contacts the projection 1131*f* of the fixed shaft 1131 in the rotational direction 11A centered on the through hole 1131*c*, so that the rotation in the rotational direction of the rotational direction 11A is restricted.

Next, the user rotates the free end member 1132 in the rotational direction 11A relative to the fixed shaft 1131. The projection 1132*e* of the free end member 1132 rides on the projection 1131*f* and rotates in the rotational direction 11A while expanding between the two projections 1131*f* away from each other (through hole 1131*c* axial direction). The user further rotates the free end member 1132, and the projection 1132*e* rides on the projection 1131*g* while expanding between the two projections 1131*g* in the direction away from each other (through hole 1131*c* axial direction) in the same manner as the projection 1131*f*, until the projection 1132*e* abuts against the projection 1131*h*, by which the rotation in the rotational direction 11A stops. At this time, the projection 1132*e* of the free end member 1132 is sandwiched between the projection 1131*g* and the projection 1131*h* of the fixed shaft 1131 in the rotational direction about the through hole 1131*c*, so that the free end member 1132 is fixedly supported coaxially with the rotational axis A.

Thereafter, the toner pack 1120 is mounted to the image forming apparatus 1.

In this modified example, the nozzle 202 of Embodiment 2 has the same structure as that of Embodiment 2 except that the nozzle 202 is replaced with the nozzle 1102 and the projecting member 1130, and other description thereof will be omitted.

As described in the foregoing, by making the free end member 1132 movable between the second attitude and the second attitude, and by making it possible to transport the toner pack 1129 the second attitude, the packing size of the toner pack 1120 can be reduced in the direction of the rotational axis A. When the toner pack 1120 is used, the user shifts the free end member 1132 to the first attitude, so that the rotation restricting mechanism 212 of the apparatus-side shutter 209 can be released with the mounting of the toner pack 1120 as in other embodiments.

Further, in this embodiment, the structure in which the free end member 1132 is one component has been described, but by employing the engaging means divided into two or more portions as separate movable portions, the outer shape is reduce, with the similar advantageous effect.

The structures of Embodiments 1 to 11 and the modified examples of each embodiment may be usable with combination with each other.

Finally, the typical structures disclosed in the present application are summarized in the following. The following, the elements may be accompanied by reference numerals and or characters signed to indicate the correspondence with the above-described embodiments. However, this correspondence is just an example for reference, and the elements in the following structure are not limited to the corresponding elements with the reference numerals and or characters in the above-described embodiments.

Structure Example A1

A toner container (100, 1050, 1051, 1052, 1060, 1070, 1080, 220, 2320, 23210, 2420, 2520, 2530, 520, 5120, 920, 10020, and 1120) comprising:

an accommodating portion (101, 1015, 10151, 201, 2401, 501, 901) configured to accommodate toner;

a discharge portion (102, 1025, 202, 2302, 23102, 2402A, 2502, 2503, 502, 5102, 902, 1002A, 1102) configured to be provided with an opening (102*a*, 202*a*, 2402Ag, 2502*k*2, 2503*k*2, 502*a*, 902Bk, 10020Be) for discharging the toner in the accommodating portion to an outside;

a rotatable member (103, 203, 903A, 1003) rotatable about a central axis (A) as a rotational axis relative to the discharge portion in a first rotational direction (K, D) and a second rotational direction (L, E) opposite to the first rotational direction; and a projection (102*b*, 1020*b*, 1021*b*, 1023*b*, 1024*b*, 1026*b*, 1027*b*, 1028*b*, 202*b*, 2302*b*, 23102*b*, 2402Bb, 2502*b*, 2503*b*, 502*b*, 5102*b*, 903Bg, 1003*b*, 1132*b*) provided below the opening of the discharge portion and having an inner peripheral surface facing inward in a radial direction (r) of an imaginary circle (VC) centered on the central axis, when the toner container is oriented in a predetermined direction in which the central axis extends in a direction of gravity and at least a part of the discharge portion is below the accommodating portion;

wherein the opening of the discharge portion is configured to face outward in the radial direction, and wherein when the toner container is oriented in the predetermined direction, the projection has an upward surface (104*a*2, 104*b*2, 1041*a*2, 1042*b*2, 1043*a*2, 1043*b*2, 1044*a*2, 1046*a*2, 1047*a*2, 1048*a*2, 204*a*3, 204*b*3, 2304*a*2, 2304*b*2, 23104*a*2, 23104*b*2, 2604*a*3) facing upward outside the inner peripheral surface and inside the opening of the discharge portion in the radial direction, and the upward surface extends so as to go up as goes in the second rotating direction.

Structure Example A2

A toner container according to Structure Example A1, wherein the upward surface is configured to be exposed to an outside of the toner container.

Structure Example A3

A toner container according to Structure Example A1 or A2, wherein when the toner container is oriented in the predetermined direction, a cavity is provided above the upward surface of the projection.

Structure Example A4

A toner container according to any one of Structure Examples A1-A3, wherein the projection has a downstream side end surface which extends upward along the central axis from a downstream end of the upward surface in the second rotational direction and which faces a downstream side in the first rotational direction, when the toner container is oriented in the predetermined direction.

Structure Example A5

A toner container according to any one of Structure Examples A1-A4, wherein the upward surface inclines with respect to the central axis by an angle not less than 30 degrees and not more than 60 degrees as the toner container is viewed in the radial direction in the state in which the toner container is oriented in the predetermined direction.

Structure Example A6

A toner container according to any one of Structure Examples A1-A5, wherein as the discharge portion is viewed in the direction of the central axis, the upward surface is provided closer to inner peripheral surface than to the opening, in the radial direction.

Structure Example A7

A toner container according to Structure Example A6, wherein as the discharge portion is viewed in the direction of the central axis, a distance from the inner peripheral surface to the upward surface is not more than 30% a distance from the inner peripheral surface to the opening.

Structure Example A8

A toner container according to any one of Structure Examples A1-A7, wherein when the toner container is oriented in the predetermined direction, the projection has a downward surface facing downward extending so as to go up as goes in the first rotational direction, and at least a part of the upward surface being above at least a part of the downward surface.

Structure Example A9

A toner container according to Structure Example A8, wherein the downward surface overlaps the upward surface, as viewed in the direction of the central axis.

Structure Example A10

A toner container according to Structure Example A8 or A9, wherein the projection has a connecting portion connecting a downstream end of the downward surface in the first rotational direction and an upstream end of the upward surface in the second rotational direction with each other.

Structure Example A11

A toner container according to any one of Structure Examples A8-A10, wherein the downward surface inclines with respect to the central axis by an angle not less than 30 degrees and not more than 60 degrees, as the toner container is viewed in the radial direction in a state in which the toner container is oriented in the predetermined direction.

Structure Example A12

A toner container according to any one of Structure Examples A8-A11, wherein the upward surface is longer than the downward surface, as the toner container is viewed in the radial direction in a state in which the toner container is oriented in the predetermined direction.

Structure Example A13

A toner container according to any one of Structure Examples A8-A12, wherein the projection includes a first projection and a second projection which is provided at a position different from a position at which the first portion is provided in a circumferential direction of the imaginary circle, wherein the upward surface and the downward surface are first upward surface and second downward surface, respectively, the first projection includes the first upward surface and the second downward surface, and the second projection includes a second upward surface and a fourth downward surface.

Structure Example A14

A toner container according to Structure Example A13, wherein the second upward surface and the fourth downward surface have 150-210 degree inclusive rotational symmetry shapes of the first upward surface and the second downward surface, respectively.

Structure Example A15

A toner container according to Structure Example A14, wherein the second upward surface and the fourth downward surface have 180 degree rotational symmetry shapes of the first upward surface and the second downward surface, respectively.

Structure Example A16

A toner container according to any one of Structure Examples A8-A12, wherein the projection includes a first projection and a second projection which is provided at a position different from a position at which the first projection is provided in a circumferential direction of the imaginary circle, the first projection includes the upward surface, and the second projection includes the downward surface.

Structure Example A17

A toner container according to Structure Example A16, wherein the second projection is provided at a position diametrically opposite to the first projection.

Structure Example A18

A toner container (220, 2420, 2520, 2530, 320, 520, 5120, 620, 820, 920, 10020, 1120) comprising:

an accommodating portion (201, 2401, 501, 901) configured to accommodate toner;

a discharge portion (202, 2402A, 2502, 2503, 302, 502, 5102, 902, 1002A, 1102) configured to be provided with an opening (202*a*, 2402Ag, 2502*k*2, 2503*k*2, 302*a*, 502*a*, 902Bk, 10020Be) for discharging the toner in the accommodating portion to an outside;

a rotatable member (203, 903A, 1003) rotatable about a central axis (A) as a rotational axis relative to the discharge portion in a first rotational direction (K, D) and a second rotational direction (L, E) opposite to the first rotational direction; and a projection (202*b*, 2402Bb, 2502*b*, 2503*b*, 304, 3104, 502*b*, 5102*b*, 604, 804, 8104, 8204, 8304, 903Bg, 1003*b*, 1132*b*) provided below the opening of the discharge portion and having an inner peripheral surface (202*b*1, 202*b*10, 804*a*11) facing inward in a radial direction of an imaginary circle centered on the central axis, when the toner container is oriented in a predetermined direction in which the central axis extends in a direction of gravity and at least a part of the discharge portion is below the accommodating portion, wherein the opening of the discharge portion faces in the radial direction, wherein when the toner container is oriented in the predetermined direction, the projection has a first downward surface (204*a*1, 304*a*1, 604Aa1, 804*a*1, 204*b*1, 304*b*1, 604Ab1, 804*b*1) and a second downward surface (204*a*2, 304*a*2, 604Ba1, 804*a*2, 204*b*2, 304*b*2, 604Bb1, 804*b*2) which face downward, and an upward surface (204*a*3, 204*b*3, 2604*a*3, 304*a*3, 304*b*3, 3104*a*3, 3104*b*3, 604Ba2, 604Bb2, 804*a*3) which faces upward, outside the inner peripheral surface and inside the opening of the discharge portion in the radial direction, the first downward surface and the second downward surface extend so as to go up as goes in the first rotational direction, and at least a part of the first downward surface is provided at a position which is closer to the central axis in the radial direction than the second downward surface is and which is different from a position at which the second downward surface is provided in a circumferential direction of the imaginary circle, and at least a part of the upward surface is above at least a part of the second downward surface.

Structure Example A19

A toner container according to Structure Example A18, wherein when the toner container is oriented in the predetermined direction, the upward surface extends so as to go up as goes in the second rotational direction.

Structure Example A20

A toner container according to Structure Example A19, wherein the upward surface inclines with respect to the central axis by an angle not less than 30 degrees and not more than 60 degrees, as the toner container is viewed in the radial direction in a state in which the toner container is oriented in the predetermined direction.

Structure Example A21

A toner container according to Structure Example A18, wherein the upward surface is a surface perpendicular to the central axis.

Structure Example A22

A toner container according to Structure Example A18, wherein when the toner container is oriented in the predetermined direction, the upward surface extends so as to go on as goes in the first rotational direction.

Structure Example A23

A toner container according to any one of Structure Examples A18-A22, wherein the upward surface is configured to be exposed to an outside of the toner container.

Structure Example A24

A toner container according to any one of Structure Examples A18-A23, wherein a cavity is provided above the upward surface of the projection, when the toner container is oriented in the predetermined direction.

Structure Example A25

A toner container according to any one of Structure Examples A18-A24, wherein the projection has a downstream side end surface which extends upward along the central axis from a downstream end of the upward surface in the second rotational direction and which faces a downstream side in the first rotational direction, when the toner container is oriented in the predetermined direction.

Structure Example A26

A toner container according to any one of Structure Examples A18-A25, wherein the second downward surface overlaps the upward surface as viewed in the direction of the central axis.

Structure Example A27

A toner container according to any one of Structure Examples A18-A26, wherein the projection has a connecting portion connecting a downstream end of the second downward surface in the first rotational direction and an upstream end of the upward surface in the second rotational direction with each other.

Structure Example A28

A toner container according to any one of Structure Examples A18-A27, wherein upward surface and the second downward surface are provided at positions closer to the inner peripheral surface than to the opening in the radial direction.

Structure Example A29

A toner container according to Structure Example A28, wherein a distance from the inner peripheral surface to the upward surface and a distance from the inner peripheral surface to the second downward surface are not more than 30% a distance from the inner peripheral surface to the opening.

Structure Example A30

A toner container according to any one of Structure Examples A18-A29, wherein the second downward surface is movable relative to the first downward surface between an alignment position in which the second downward surface is aligned with the first downward surface in the circumferential direction, and a non-alignment position in which it is not aligned with the first downward surface in the circumferential direction.

Structure Example A31

A toner container according to any one of Structure Examples A18-A29, wherein the second downward surface is movable relative to the first downward surface between an alignment position in which the second downward surface is aligned with the first downward surface in the radial direction and a non-alignment position in which it is not aligned with the first downward surface in the radial direction.

Structure Example A32

A toner container according to any one of Structure Examples A18-A31, wherein the projection includes a first projection and a second projection which is provided at a position different from a position at which the first projection is provided in the circumferential direction, wherein the upward surface is a first upward surface, the first projection includes the first upward surface, the first downward surface and the second downward surface, the second projection includes a second upward surface, a third downward surface and a fourth downward surface, wherein when the toner container is oriented in the predetermined direction, the third downward surface and the fourth downward surface extend so as to go as goes in the first rotational direction, and at least a part of the third downward surface is in the position which is closer the fourth downward surface in the circumferential direction to the central axis than the fourth downward surface in the radial direction and which is different from a position of the fourth downward surface in the circumferential direction, and at least a part of the second upward surface is above at least a part of the fourth downward surface.

Structure Example A33

A toner container according to Structure Example A32, wherein for the first projection, a part of the first downward surface is upstream of the second downward surface in the first rotational direction, and wherein for the second projection, a part of the third downward surface is upstream of the fourth downward surface in the first rotational direction.

Structure Example A34

A toner container according to any one of Structure Examples A18-A31, wherein when the upward surface is a first upward surface, the projection has a third downward surface, a fourth downward surface and a second upward surface having 150-210 degree inclusive rotational symmetry shapes, about the central axis, of the first downward surface, the second downward surface and the first upward surface, respectively.

Structure Example A35

A toner container according to any one of Structure Examples A18-A31, wherein when the upward surface is a first upward surface, the projection has a third downward surface, a fourth downward surface and a second upward surface having 180 degree rotational symmetry shapes, about the central axis, of the first downward surface, the second downward surface and the first upward surface, respectively.

Structure Example A36

A toner container according to any one of Structure Examples A18-A31, wherein the projection includes a first projection and a second projection which is provided at a position different from a position at which the first projection is provided in the circumferential direction, wherein the first projection has the upward surface and the second downward surface, and the second projection has the first downward surface.

Structure Example A37

A toner container according to Structure Example A36, wherein the second projection is provided at a position diametrically opposite to the first projection.

Structure Example A38

A toner container according to any one of Structure Examples A18-A37, wherein the first downward surface inclines with respect to the central axis by an angle not less than 30 degrees and not more than 60 degrees, as the toner container is viewed in the radial direction in a state in which the toner container is oriented in the predetermined direction.

Structure Example A39

A toner container according to any one of Structure Examples A18-A38, wherein the second downward surface inclines with respect to the central axis by an angle not less than 30 degrees and not more than 60 degrees, as the toner container is viewed in the radial direction in a state in which the toner container is oriented in the predetermined direction.

Structure Example A40

A toner container according to any one of Structure Examples A18-A39, wherein the second downward surface is longer than the first downward surface, as the toner container is viewed in the radial direction in a state in which the toner container is oriented in the predetermined direction.

Structure Example A41

A toner container according to any one of Structure Examples A18-A40, wherein the upward surface is longer than the first downward surface, as the toner container is viewed in the radial direction in a state in which the toner container is oriented in the predetermined direction.

Structure Example A42

A toner container according to any one of Structure Examples A18-A41, wherein the upward surface is longer than the second downward surface, as the toner container is viewed in the radial direction in a state in which the toner container is oriented in the predetermined direction.

Structure Example A43

A toner container (220, 2320, 23210, 2420, 2520, 2530, 320, 3220, 520, 5120, 620, 820, 920, 10020, 1120) comprising:

an accommodating portion (201, 2401, 501, 901) configured to accommodate toner;

a discharge portion (202*a*, 2402Ag, 2502*k*2, 2503*k*2, 302*a*, 502*a*, 902Bk, 10020Be) provided with an opening for discharging the toner in the accommodating portion to an outside;

a rotation member (203, 903A, 1003) rotatable about a central axis as a rotational axis relative to the discharge portion in a first rotational direction and a second rotational direction which is opposed to the first rotational direction, a projection (202*b*, 2302*b*, 23102*b*, 2402Bb, 2502*b*, 2503*b*, 304, 3104, 3204, 502*b*, 5102*b*, 604, 804, 8104, 8204, 8304, 903Bg, 1003*b*, 1132*b*) provided below the opening of the discharge portion and having inner peripheral surface (202*b*1, 202*b*10, 804*a*11) the facing inward in a radial direction of an imaginary circle centered on the central axis, when the toner container is oriented in a predetermined direction in which the central axis extends in a direction of gravity and at least a part of the discharge portion is below the accommodating portion, wherein the opening of the discharge portion is configured to face outward in the radial direction, wherein when the toner container is oriented in the predetermined direction, the projection includes a downward surface (204*a*1, 204*a*2, 204*b*1, 204*b*2, 2304*a*1, 2304*b*1, 23104*a*1, 23104*b*1, 2604*b*1, 2604*a*2, 304*a*1, 304*a*2, 304*b*1, 304*b*2, 3104*a*2, 3104*b*2, 3204*a*1, 3204*b*1, 604Aa1, 604Ba1, 604Ab1, 604Bb1, 804*a*1, 804*a*2, 804*b*1, 804*b*2) facing downward, and an upward surface (204*a*3, 204*b*3, 2304*a*2, 2304*b*2, 23104*a*2, 23104*b*2, 2604*a*3, 304*a*3, 304*b*3, 3104*a*3, 3104*b*3, 3204*a*3, 3204*b*3, 604Ba2, 604Bb2, 804*a*3) facing upward in the radial direction, outside the inner peripheral surface and inside the opening of the discharge portion in the radial direction, when the toner container is oriented in the predetermined direction, the downward surface extends so as to go up as goes in the first rotational direction, an inner edge line (**2304*a*4, 2304*b*4, 23104*a*4, 23104*b*4) of the downward surface on a side closer to the central axis in the radial direction includes an inner upstream edge line (2304*a*4U, 2304*b*4U, 23104*a*4U, 23104*b*4**U) provided on an upstream side in the first rotational direction and an inner downstream edge line provided on a downstream side of the inside upstream edge line in the first rotational direction, the inner downstream edge line is more remote from the central axis in the radial direction than the inner upstream edge line, and at least a part of the upward surface is above at least a part of the downward surface.

Structure Example A44

A toner container according to Structure Example A43, wherein the inner upstream edge line and the inner edge line defines a first arcuation and a second arcuation centered on the central axis, respectively, the second arcuation having a radius larger than that of the first arcuation, and wherein the inner edge line includes an inner middle edge line which extends in the radial direction between the first arcuation and the second arcuation to connect between the first arcuation and the second arcuation.

Structure Example A45

A toner container according to Structure Example A43, wherein the inner upstream edge line and the inner downstream edge line are smoothly continues with each other.

Structure Example A46

A toner container according to any one of Structure Examples A43-A45, wherein an outer edge line of the downward surface on a side more remote from the central axis in the radial direction includes an outer upstream edge line on an upstream side in the first rotational direction the first rotational direction and an outer downstream edge line on a downstream side of the outer upstream edge line in the first rotational direction, wherein the outer downstream edge line is more remote from the central axis in the radial direction than the outer upstream edge line.

Structure Example A47

A toner container according to any one of Structure Examples A43-A46, wherein when the toner container is oriented in the predetermined direction, the upward surface extends so as to go up as goes in the second rotational direction.

Structure Example A48

A toner container according to Structure Example A47, wherein the upward surface inclines with respect to the central axis by an angle not less than 30 degrees and not more than 60 degrees, as the toner container is viewed in the radial direction in a state in which the toner container is oriented in the predetermined direction.

Structure Example A49

A toner container according to any one of Structure Examples A43-A46, wherein the upward surface is perpendicular to the central axis.

Structure Example A50

A toner container according to any one of Structure Examples A43-A46, wherein when the toner container is oriented in the predetermined direction, the upward surface extends so as to go up as goes in the first rotational direction.

Structure Example A51

A toner container according to any one of Structure Examples A43-A50, wherein the upward surface is configured to be exposed to an outside of the toner container.

Structure Example A52

A toner container according to any one of Structure Examples A43-A51, wherein a cavity is provided above the upward surface of the projection, when the toner container is oriented in the predetermined direction.

Structure Example A53

A toner container according to any one of Structure Examples A43-A52, wherein the projection has a downstream side end surface which extends upward along the central axis from a downstream end of the upward surface in the second rotational direction and which faces a downstream side in the first rotational direction, when the toner container is oriented in the predetermined direction.

Structure Example A54

A toner container according to any one of Structure Examples A43-A53, wherein a region of the downward surface corresponding to the inner downstream edge line overlaps the upward surface as viewed in the direction of the central axis.

Structure Example A55

A toner container according to any one of Structure Examples A43-A54, wherein the projection includes a connecting portion connecting a downstream end of the downward surface in the first rotational direction and an upstream end of the upward surface in the second rotational direction with each other.

Structure Example A56

A toner container according to any one of Structure Examples A43-A55, wherein as the discharge portion is viewed in the direction of the central axis, the upward surface and the downward surface are in positions closer to the inner peripheral surface than to the opening in the radial direction.

Structure Example A57

A toner container according to any one of Structure Examples A43-A55, wherein as the discharge portion is viewed in the direction of the central axis, a distance from the inner peripheral surface to the upward surface and a distance from the inner peripheral surface to the downward surface are not more than 30% a distance from the inner peripheral surface to the opening.

Structure Example A58

A toner container according to any one of Structure Examples A43-A57, wherein the downward surface inclines with respect to the central axis by an angle not less than 30 degrees and not more than 60 degrees, as the toner container is viewed in the radial direction in a state in which the toner container is oriented in the predetermined direction.

Structure Example A59

A toner container according to any one of Structure Examples A1-A58, wherein the rotatable member is provided outside the discharge portion in the radial direction.

Structure Example A60

A toner container according to Structure Example A59, wherein the rotatable member is configured to rotate about the central axis between a close position for closing the opening and an open position for opening the opening.

Structure Example A61

A toner container according to Structure Example A60, wherein an outer surface of the rotation member extending in the direction of the central axis is provided with a rotation member opening for exposing the opening of the discharge portion to an outside of the toner container when the rotatable member is in the open position, and wherein an outer surface opposite from the rotatable member opening across the central axis is provided with a recess recessing inward in the radial direction.

Structure Example A62

A toner container according to Structure Example A61, wherein the projection is provided at a position closer to the central axis in the radial direction than to the recess, as the toner container is viewed in the direction of the central axis.

Structure Example A63

A toner container according to Structure Example A61 or A62, wherein the projection is inside a width of the rotation member opening in a direction perpendicular to the central axis, as viewed in the radial direction.

Structure Example A64

A toner container according to Structure Example A63, wherein the discharge portion has a first opposing surface and a second opposing surface at an outer surface extending in the direction of the central axis, the first opposing surface and the second opposing surface being opposed to each other with a gap therebetween, wherein the first opposing surface and the first opposing surface are exposed through the rotation member opening, when the rotation member is in the close position.

Structure Example A65

A toner container according to Structure Example A64, wherein the first opposing surface and the second opposing surface are parallel with each other, and wherein when a line parallel with the first opposing surface and passing through a center portion between the first opposing surface and the second opposing surface is a first imaginary line, and a line provided by rotating the first imaginary line about the central axis by 90 degree, the second imaginary line passes through the opening.

Structure Example A66

A toner container according to any one of Structure Examples A60-A65, wherein the rotation member is rotatable in the first rotational direction from the close position to the open position.

Structure Example A67

A toner container according to Structure Example A66, further comprising a seal for sealing between the rotation member and the discharge portion when the rotation member is in the close position.

Structure Example A68

A toner container according to any one of Structure Examples A1-A67, wherein the inner peripheral surface of the projection is centered on the central axis.

Structure Example A69

A toner container according to Structure Example A68, wherein the inner peripheral surface of the projection is cylindrical.

Structure Example A70

A toner container according to Structure Example A68, wherein the inner peripheral surface of the projection is constituted by a plurality of flat surfaces surrounding the central axis.

Structure Example A71

A toner container according to any one of Structure Examples A1-A70, wherein when the toner container is oriented in the predetermined direction, the projection is configured to project downward with respect to a lower surface of the toner container.

Structure Example A72

A toner container according to Structure Example A71, wherein when the toner container is oriented in the predetermined direction, the projection is capable of taking a projection position in which the projection projects downward with respect to the lower surface of the toner container, and a retracted position in which the projection is retracted so as not to project downward with respect to the lower surface.

Structure Example A73

A toner container according to Structure Example A71 or A72, wherein, when the toner container is oriented in the predetermined direction, the projection is provided on the lower surface of the discharge portion.

Structure Example A74

A toner container according to Structure Example A73, wherein the projection is projected downward through a hole provided in a bottom surface of the rotatable member.

Structure Example A75

A toner container according to Structure Example A71 or A72, further comprising a support member supporting the discharge portion, and wherein the projection is provided on the lower surface of the support member, when the toner container is oriented in the predetermined direction.

Structure Example A76

A toner container according to Structure Example A75, wherein the support member defines a space which is surrounded by a side surface extending in the direction of the central axis and which is provided with the discharge portion, and wherein the side surface of the support member is provided with a side surface opening configured to expose the opening of the discharge portion.

Structure Example A77

A toner container according to any one of Structure Examples A1-A71, wherein the projection is capable of transitioning with respect to the discharge portion between a first attitude in which the projection projects in the direction of the central axis and a second attitude in which the projection projects in a direction crossing the central axis.

Structure Example A78

A toner container according to any one of Structure Examples A1-A71, wherein the projection is supported by the discharge portion so as to be movable relative to the discharge portion in the direction of the central axis.

Structure Example A79

A toner container according to Structure Example A78, wherein a shaft member extending in the direction of the central axis, rotatable about the central axis relative to the discharge portion and movable in the direction of the central axis, wherein a guide portion configured to guide the shaft member so that the shaft member is moved in the direction of the central axis when the shaft member is rotated, and wherein the projection is supported by a lower end portion of the shaft member so as to move in the direction of the central axis together with the shaft member, when the toner container is oriented in the predetermined direction.

Structure Example A80

A toner container according to Structure Example A79, wherein in a state in which the toner container is oriented in the predetermined direction, the guide portion includes a guide groove which is a cylindrical member provided outside the shaft member in the radial direction and which extends so as to go up in the direction of the central axis as goes in a predetermined rotational direction of the shaft member in a peripheral surface around the central axis, the shaft member is provided with a projection projecting in the radial direction and engaged with the guide groove, and is configured such that the shaft member moves upward in the direction of the central axis while the projection of the shaft member is guided by the guide groove of the guide portion, when the shaft member is rotated in the predetermined rotational direction.

Structure Example A81

A toner container according to Structure Example A80, wherein an operating portion provided outside the shaft member in the radial direction so as to be rotatable with the shaft member, and wherein when the operating portion is rotated in the predetermined rotational direction about the central axis, the shaft member moves upward in the direction of the central axis while being rotated and guided by the guide portion so that the projection moves upward with the shaft member, in a state in which the toner container is oriented in the predetermined direction.

Structure Example A82

A toner container according to Structure Example A64 or A65, wherein as viewed in a direction perpendicular to the central axis, the projection is in a region between the first opposing surface and the second opposing surface in a direction along which the first opposing surface and the second opposing surface are arranged.

Structure Example A83

A toner container according to any one of Structure Examples A1-A71, wherein the discharge portion includes a pipe configured to pass the toner when the toner in the accommodating portion is discharged to an outside of the toner container, and the pipe is provided with a receiving opening for receiving the toner from the accommodating portion and an outlet for discharging the toner received through the receiving opening, wherein the opening is the outlet of the pipe.

Structure Example A84

A toner container according to Structure Example A83, wherein when the toner container is oriented in the predetermined direction, the receiving opening of the pipe includes a portion which faces upward and which extends so as to go in the radial direction as goes downward.

Structure Example A85

A toner container according to Structure Example A84, further comprising a pipe support member supporting the pipe, wherein when the toner container is oriented in the predetermined direction, the projection projects downward from a lower surface of the pipe support member.

Structure Example A86

A toner container according to any one of Structure Examples A83-A85, wherein the pipe is capable of transitioning to an attitude in which the outlet of the pipe faces downward.

Structure Example A87

A toner container according to any one of Structure Examples A1-A82, wherein the opening provided in an outer surface of the discharge portion extending along the central axis.

Structure Example A88

A toner container according to any one of Structure Examples A1-A82, wherein the opening of the discharge portion is provided by breaking a part of an outer surface of the discharge portion extending in the direction of the central axis.

Structure Example A89

A toner container according to Structure Example A87, wherein the discharge portion is provided with a pull-tab connected with a part of the outer surface, and
 wherein the part of the outer surface is separated from the discharge portion to provide the opening of the discharge portion by pulling the pull-tab.

Structure Example A90

A toner container (100, 1050, 1051, 1052, 1060, 1070, 1080, 220, 2320, 23210, 2420, 2520, 2530, 2820, 520, 5120, 920, 10020, 1120) comprising:
 an accommodating portion (101, 1015, 10151, 201, 2401, 2801, 501, 901) configured to accommodate toner;
 a discharge portion (102, 1025, 202, 2302, 23102, 2402A, 2502, 2503, 2802, 502, 5102, 902, 1002A, 1102) configured to be provided with an opening (102*a*, 202*a*, 2402Ag, 2502*k*2, 2503*k*2, 2802*a*, 502*a*, 902Bk, 10020Be) for discharging the toner in the accommodating portion to an outside;
 a projection (102*b*, 1020*b*, 1021*b*, 1023*b*, 1024*b*, 1026*b*, 1027*b*, 1028*b*, 202*b*, 2302*b*, 23102*b*, 2402Bb, 2502*b*, 2503*b*, 2802*b*, 502*b*, 5102*b*, 903Bg, 1003*b*, 1132*b*) which includes an inner peripheral surface (102*b*1, 202*b*1, 202*b*10) centered on the central axis and which is provided below the opening of the discharge portion and projects downward, when the toner container is oriented in a predetermined direction in which the central axis extends in a direction of gravity and at least a part of the discharge portion is below the accommodating portion,
 wherein the opening of the discharge portion is configured to face outward in a radial direction of an imaginary circle centered on the central axis, and
 wherein when the toner container is oriented in the predetermined direction,
 the projection has an upward surface (104*a*2, 104*b*2, 1041*a*2, 1042*b*2, 1043*a*2, 1043*b*2, 1044*a*2, 1046*a*2, 1047*a*2, 1048*a*2, 204*a*3, 204*b*3, 2304*a*2, 2304*b*2, 23104*a*2, 23104*b*2, 2604*a*3) facing upward outside the inner peripheral surface and inside the opening of the discharge portion in the radial direction, and
 when a circumferential direction of the imaginary circle is a first circumferential direction, and a circumferential direction opposite to the first circumferential direction is a second circumferential direction, the upward surface extends so as to go up as goes in the second circumferential direction.

Structure Example A91

A toner container according to Structure Example A90, wherein the upward surface is configured to be exposed to an outside of the toner container.

Structure Example A92

A toner container according to Structure Example A90 or A91, wherein when the toner container is oriented in the predetermined direction, a cavity is provided above the upward surface of the projection.

Structure Example A93

A toner container according to any one of Structure Examples A90-A92, wherein the projection has a downstream side end surface extending upward along the central axis from a downstream end of the upward surface in the second circumferential direction and facing downstream side in the first circumferential direction, when the toner container is oriented in the predetermined direction.

Structure Example A94

A toner container according to any one of Structure Examples A90-A93, wherein the upward surface inclines with respect to the central axis by an angle not less than 30 degrees and not more than 60 degrees as the toner container is viewed in the radial direction in the state in which the toner container is oriented in the predetermined direction.

Structure Example A95

A toner container according to any one of Structure Examples A90-A94, wherein as the discharge portion is viewed in the direction of the central axis, the upward surface is provided at a position closer to inner peripheral surface than to the opening, in the radial direction.

Structure Example A96

A toner container according to Structure Example A95, wherein as the discharge portion is viewed in the direction of the central axis, a distance from the inner peripheral surface to the upward surface is not more than 30% a distance from the inner peripheral surface to the opening.

Structure Example A97

A toner container according to any one of Structure Examples A90-A96, wherein when the toner container is oriented in the predetermined direction, the projection has a downward surface which faces downward and which extends so as to go up as goes in the first circumferential direction, and
 wherein at least a part of the upward surface is above at least a part of the downward surface.

Structure Example A98

A toner container according to Structure Example A97, wherein the downward surface overlaps the upward surface, as viewed in the direction of the central axis.

Structure Example A99

A toner container according to Structure Example A97 or A98, wherein the projection includes a connecting portion connecting a downstream end of the downward surface in the first circumferential direction and an upstream end of the upward surface in the second circumferential direction with each other.

Structure Example A100

A toner container according to any one of Structure Examples A97-A99, wherein the downward surface inclines with respect to the central axis by an angle not less than 30 degrees and not more than 60 degrees, as the toner container is viewed in the radial direction in a state in which the toner container is oriented in the predetermined direction.

Structure Example A101

A toner container according to any one of Structure Examples A97-A100, wherein the upward surface is longer than the downward surface, as the toner container is viewed in the radial direction in a state in which the toner container is oriented in the predetermined direction.

Structure Example A102

A toner container according to any one of Structure Examples A97-A101, wherein the projection includes a first projection and a second projection which is provided at a position different from a position at which the first position is provided in a circumferential direction of the imaginary circle, wherein the upward surface and the downward surface are first upward surface and second downward surface, respectively, the first projection includes the first upward surface and the second downward surface, and the second projection includes a second upward surface and a fourth downward surface.

Structure Example A103

A toner container according to Structure Example A102, wherein the second upward surface and the fourth downward surface have 150-210 degree inclusive rotation symmetry shapes of the first upward surface and second downward surface about the central axis, respectively.

Structure Example A104

A toner container according to Structure Example A103, wherein the second upward surface and the fourth downward surface have 180 degree rotation symmetry of the first upward surface and second downward surface about the central axis.

Structure Example A105

A toner container according to any one of Structure Examples A97-A101, wherein the projection includes a first projection and a second projection which is provided at a position different from a position at which the first projection is in the circumferential direction, wherein the first projection includes the upward surface, and wherein the second projection includes the downward surface.

Structure Example A106

A toner container according to Structure Example A105, wherein the second projection is provided at a position diametrically opposite to the first projection.

Structure Example A107

A toner container (220, 2420, 2520, 2530, 2820, 320, 520, 5120, 620, 820, 920, 10020, 1120) comprising:

an accommodating portion (201, 2401, 2801, 501, 901) configured to accommodate toner;

a discharge portion (202, 2402A, 2502, 2503, 2802, 302, 502, 5102, 902, 1002A, 1102) configured to be provided with an opening (202*a*, 2402Ag, 2502*k*2, 2503*k*2, 2802*a*, 302*a*, 502*a*, 902Bk, 10020Be) for discharging the toner in the accommodating portion to an outside;

a projection (202*b*, 2402Bb, 2502*b*, 2503*b*, 2802*b*, 304, 3104, 502*b*, 5102*b*, 604, 804, 8104, 8204, 8304, 903Bg, 1003*b*, 1132*b*) which includes an inner peripheral surface (202*b*1, 202*b*10, 804*a*11) centered on the central axis and which is provided below the opening of the discharge portion and projects downward, when the toner container is oriented in a predetermined direction in which the central axis extends in a direction of gravity and at least a part of the discharge portion is below the accommodating portion, wherein the opening of the discharge portion is configured to face outward in a radial direction of an imaginary circle centered on the central axis, wherein when the toner container is oriented in the predetermined direction, the projection has a first downward surface (204*a*1, 304*a*1, 604Aa1, 804*a*1, 204*b*1, 304*b*1, 604Ab1, 804*b*1), and a second downward surface (204*a*2, 304*a*2, 604Ba1, 804*a*2, 204*b*2, 304*b*2, 604Bb1, 804*b*2) which face downward, and an upward surface (204*a*3, 204*b*3, 2604*a*3, 304*a*3, 304*b*3, 3104*a*3, 3104*b*3, 604Ba2, 604Bb2, 804*a*3) which faces upward, outside the inner peripheral surface and inside the opening of the discharge portion in the radial direction, when the toner container is oriented in the predetermined direction, when a circumferential direction of the imaginary circle is a first circumferential direction, and a circumferential direction opposite to the first circumferential direction is a second circumferential direction, the first downward surface and the second downward surface extend so as to go up as go in the first circumferential direction, and at least a part of the first downward surface is at a position which is closer to the central axis in the radial direction than the second downward surface is and which is different from a position at which the second downward surface is provided in the circumferential direction, and at least a part of the upward surface is above at least a part of the second downward surface.

Structure Example A108

A toner container according to Structure Example A107, wherein when the toner container is oriented in the predetermined direction, the upward surface extends so as to go up as goes in the second circumferential direction.

Structure Example A109

A toner container according to Structure Example A107 or A108, wherein the upward surface inclines with respect to the central axis by an angle not less than 30 degrees and not more than 60 degrees as the toner container is viewed in the radial direction in the state in which the toner container is oriented in the predetermined direction.

Structure Example A110

A toner container according to Structure Example A107, wherein the upward surface is a surface perpendicular to the central axis.

Structure Example A111

A toner container according to Structure Example A107, wherein when the toner container is oriented in the predetermined direction, the upward surface extends so as to go up as goes in the first circumferential direction.

Structure Example A112

A toner container according to any one of Structure Examples A107-A111, wherein the upward surface is configured to be exposed to an outside of the toner container.

Structure Example A113

A toner container according to any one of Structure Examples A107-A112, wherein a cavity is provided above the upward surface of the projection, when the toner container is oriented in the predetermined direction.

Structure Example A114

A toner container according to any one of Structure Examples A107-A113, wherein the projection has a downstream side end surface extending upward along the central axis from a downstream end of the upward surface in the second circumferential direction and facing downstream side in the first circumferential direction, when the toner container is oriented in the predetermined direction.

Structure Example A115

A toner container according to any one of Structure Examples A107-A114, wherein the second downward surface overlaps the upward surface as viewed in the direction of the central axis.

Structure Example A116

A toner container according to any one of Structure Examples A107-A115, wherein the projection includes a connecting portion connecting a downstream end of the second downward surface in the first circumferential direction and an upstream end of the upward surface in the second circumferential direction with each other.

Structure Example A117

A toner container according to any one of Structure Examples A107-A116, wherein as the discharge portion is viewed in the direction of the central axis, the upward surface, the first downward surface and the second downward surface are provided at positions closer to the inner peripheral surface than to the opening in radial direction.

Structure Example A118

A toner container according to Structure Example A117, wherein as the discharge portion is viewed in the direction of the central axis, a distance from the inner peripheral surface to the upward surface, a distance from the inner peripheral surface to the first downward surface, and a distance from the inner peripheral surface to the second downward surface are not more than 30% a distance from the inner peripheral surface to the opening.

Structure Example A119

A toner container according to any one of Structure Examples A107-A118, wherein the second downward surface is movable relative to the first downward surface between an alignment position in which the second downward surface is aligned with the first downward surface in the circumferential direction, and a non-alignment position in which the second downward surface is not aligned with the first downward surface in the circumferential direction.

Structure Example A120

A toner container according to any one of Structure Examples A107-A118, wherein the second downward surface is movable relative to the first downward surface between an alignment position in which the second downward surface is aligned with the first downward surface in the radial direction and a non-alignment position in which the second downward surface is not aligned with the first downward surface.

Structure Example A121

A toner container according to any one of Structure Examples A107-A120, wherein the projection includes a first projection and a second projection which is provided at a position different from a position at which the first projection is provided in the circumferential direction, wherein the upward surface is a first upward surface, the first projection includes the first upward surface, the first downward surface and the second downward surface, the second projection includes a second upward surface, a third downward surface and a fourth downward surface, wherein when the toner container is oriented in the predetermined direction, the third downward surface and the fourth downward surface extend so as to go up as goes in the first circumferential direction, and at least a part of the third downward surface is at a position which is closer to the central axis in the radial direction than the fourth downward surface is and which is different from a position at which the fourth downward surface is provided in the circumferential direction, and at least a part of the second upward surface is above at least a part of the fourth downward surface.

Structure Example A122

A toner container according to Structure Example A121, wherein for the first projection, a part of the first downward surface of the first projection is upstream of the second downward surface in the first circumferential direction, and for the second projection, a part of the third downward surface of the second projection is upstream of the fourth downward surface in the first circumferential direction.

Structure Example A123

A toner container according to any one of Structure Examples A107-A120, wherein when the upward surface is a first upward surface, the projection has a third downward surface, a fourth downward surface and a second upward surface having 150-210 degree inclusive rotational symmetry shapes, about the central axis, of the first downward surface, the second downward surface and the first upward surface, respectively.

Structure Example A124

A toner container according to any one of Structure Examples A107-A120, wherein when the upward surface is a first upward surface, the projection has a third downward surface, a fourth downward surface and a second upward surface having 180 degree rotational symmetry shapes, about the central axis, of the first downward surface, the second downward surface and the first upward surface, respectively.

Structure Example A125

A toner container according to any one of Structure Examples A107-A120, wherein the projection includes a first projection and a second projection which is provided at a position different from a position at which the first projection is provided in the circumferential direction, wherein the first projection has the upward surface and the second downward surface, and the second projection has the first downward surface.

Structure Example A126

A toner container according to Structure Example A125, wherein the second projection is provided at a position diametrically opposite to the first projection.

Structure Example A127

A toner container according to any one of Structure Examples A107-A126, wherein the first downward surface inclines with respect to the central axis by an angle not less than 30 degrees and not more than 60 degrees, as the toner container is viewed in the radial direction in a state in which the toner container is oriented in the predetermined direction.

Structure Example A128

A toner container according to any one of Structure Examples A107-A127, wherein the second downward surface inclines with respect to the central axis by an angle not less than 30 degrees and not more than 60 degrees, as the toner container is viewed in the radial direction in a state in which the toner container is oriented in the predetermined direction.

Structure Example A129

A toner container according to any one of Structure Examples A107-A128, wherein the second downward surface is longer than the first downward surface, as the toner container is viewed in the radial direction in a state in which the toner container is oriented in the predetermined direction.

Structure Example A130

A toner container according to any one of Structure Examples A107-A129, wherein the upward surface is longer than the first downward surface, as the toner container is viewed in the radial direction in a state in which the toner container is oriented in the predetermined direction.

Structure Example A131

A toner container according to any one of Structure Examples A107-A130, wherein the upward surface is longer than the second downward surface, as the toner container is viewed in the radial direction in a state in which the toner container is oriented in the predetermined direction.

Structure Example A132

A toner container (220, 2320, 23210, 2420, 2520, 2530, 2820, 320, 3220, 520, 5120, 620, 820, 920, 10020, 1120) comprising:

an accommodating portion (201, 2401, 2801, 501, 901) configured to accommodate toner;

a discharge portion (202, 2302, 23102, 2402A, 2502, 2503, 2802, 302, 502, 5102, 902, 1002A, 1102) configured to be provided with an opening (202*a*, 2402Ag, 2502*k*2, 2503*k*2, 2802*a*, 302*a*, 502*a*, 902Bk, 10020Be) for discharging the toner in the accommodating portion to an outside;

a projection (202*b*, 2302*b*, 23102*b*, 2402Bb, 2502*b*, 2503*b*, 2802*b*, 304, 3104, 3204, 502*b*, 5102*b*, 604, 804, 8104, 8204, 8304, 903Bg, 1003*b*, 1132*b*) which includes an inner peripheral surface (202*b*1, 202*b*10, 804*a*11) centered on the central axis and which is provided below the opening of the discharge portion and projects downward, when the toner container is oriented in a predetermined direction in which the central axis extends in a direction of gravity and at least a part of the discharge portion is below the accommodating portion, wherein the opening of the discharge portion is configured to face outward in a radial direction of an imaginary circle centered on the central axis, and wherein when the toner container is oriented in the predetermined direction, the projection includes a downward surface (204*a*1, 204*a*2, 204*b*1, 204*b*2, 2304*a*1, 2304*b*1, 23104*a*1, 23104*b*1, 2604*b*1, 2604*a*2, 304*a*1, 304*a*2, 304*b*1, 304*b*2, 3104*a*2, 3104*b*2, 3204*a*1, 3204*b*1, 604Aa1, 604Ba1, 604Ab1, 604Bb1, 804*a*1, 804*a*2, 804*b*1, 804*b*2) facing downward and an upward surface (204*a*3, 204*b*3, 2304*a*2, 2304*b*2, 23104*a*2, 23104*b*2, 2604*a*3, 304*a*3, 304*b*3, 3104*a*3, 3104*b*3, 3204*a*3, 3204*b*3, 604Ba2, 604Bb2, 804*a*3) facing upward in the radial direction, outside the inner peripheral surface and inside the opening of the discharge portion in the radial, when the toner container is oriented in the predetermined direction, when a circumferential direction of the imaginary circle is a first circumferential direction, and a circumferential direction opposite to the first circumferential direction is a second circumferential direction, the downward surface extend so as to go up as goes in the first circumferential direction, an inner edge line (2304*a*4, 2304*b*4, 23104*a*4, 23104*b*4) of the downward surface on a side closer to the central axis in the radial direction includes an inner upstream edge line (2304*a*4U, 2304*b*4U, 23104*a*4U, 23104*b*4U) on an upstream side in the first circumferential direction, and an inner downstream edge line (2304*a*4D, 2304*b*4D, 23104*a*4D, 23104*b*4D) on a downstream side of the inner upstream edge line in the first circumferential direction, the inner downstream edge line is more remote from the central axis in the radial direction than the inner upstream edge line, and at least a part of the upward surface is above at least a part of the downward surface.

Structure Example A133

A toner container according to Structure Example A132, wherein the inner upstream edge line and the inner downstream edge line defines a first arcuation and a second arcuation which are centered on the central axis, respectively, the second arcuation having a radius larger than that of the first arcuation, and wherein the inner edge line includes an inner middle edge line which extends in the radial direction between the first arcuation and the second arcuation to connect between the first arcuation and the second arcuation.

Structure Example A134

A toner container according to Structure Example A133, wherein the inner upstream edge line and the inner downstream edge line are smoothly continues with each other.

Structure Example A135

A toner container according to any one of Structure Examples A132-A134, wherein an outer edge line of the downward surface on a side more remote from the central axis in the radial direction includes an outer upstream edge line on an upstream side, and an outer downstream edge line on a downstream side of the outer upstream edge line in the first circumferential direction, wherein the outer downstream edge line is more remote from the central axis in the radial direction than the outer upstream edge line.

Structure Example A136

A toner container according to any one of Structure Examples A132-A135, wherein when the toner container is oriented in the predetermined direction, the upward surface extends so as to go up as goes in the second circumferential direction.

Structure Example A137

A toner container according to Structure Example A136, wherein the upward surface inclines with respect to the central axis by an angle not less than 30 degrees and not more than 60 degrees, as the toner container is viewed in the radial direction in a state in which the toner container is oriented in the predetermined direction.

Structure Example A138

A toner container according to any one of Structure Examples A132-A135, wherein the upward surface is perpendicular to the central axis.

Structure Example A139

A toner container according to any one of Structure Examples A132-A135, wherein when the toner container is oriented in the predetermined direction, the upward surface extends so as to go up as goes in the first circumferential direction.

Structure Example A140

A toner container according to any one of Structure Examples A132-A139, wherein the upward surface is configured to be exposed to an outside of the toner container.

Structure Example A141

A toner container according to any one of Structure Examples A132-A140, wherein a cavity is provided above the upward surface of the projection, when the toner container is oriented in the predetermined direction.

Structure Example A142

A toner container according to any one of Structure Examples A132-A141, wherein the projection has a downstream side end surface extending upward along the central axis from a downstream end of the upward surface in the second circumferential direction and facing downstream side in the first circumferential direction, when the toner container is oriented in the predetermined direction.

Structure Example A143

A toner container according to any one of Structure Examples A132-A142, wherein a region of the downward surface corresponding to the inner downstream edge line overlaps the upward surface as viewed in the direction of the central axis.

Structure Example A144

A toner container according to any one of Structure Examples A132-A143, wherein the projection includes a connecting portion connecting a downstream end of the downward surface in the first circumferential direction and an upstream end of the upward surface in the second circumferential direction with each other.

Structure Example A145

A toner container according to any one of Structure Examples A132-A144, wherein as the discharge portion is viewed in the direction of the central axis, the upward surface and the downward surface are in positions closer to the inner peripheral surface than the opening in the radial direction.

Structure Example A146

A toner container according to Structure Example A145, wherein as the discharge portion is viewed in the direction of the central axis, a distance from the inner peripheral surface to the upward surface and a distance from the inner peripheral surface to the downward surface are not more than 30% a distance from the inner peripheral surface to the opening.

Structure Example A147

A toner container according to any one of Structure Examples A132-A146, wherein the downward surface inclines with respect to the central axis by an angle not less than 30 degrees and not more than 60 degrees, as the toner container is viewed in the radial direction in a state in which the toner container is oriented in the predetermined direction.

Structure Example A148

A toner container according to any one of Structure Examples A90-A132, wherein the inner peripheral surface of the projection is a cylindrical surface.

Structure Example A149

A toner container according to any one of Structure Examples A90-A132, wherein the inner peripheral surface of the projection is constituted by a plurality of flat surfaces surrounding the central axis.

Structure Example A150

A toner container according to any one of Structure Examples A90-A149, wherein the projection is configured to project downward with respect to a lower surface of the toner container, when the toner container is oriented in the predetermined direction.

Structure Example A151

A toner container according to Structure Example A150, wherein the projection is capable of taking a projection position in which the projection projects downward with respect to the lower surface of the toner container, and a retracted position in which the projection is retracted so as not to project with respect to the lower surface, when the toner container is oriented in the predetermined direction.

Structure Example A152

A toner container according to Structure Example A150 or A151, wherein the projection is provided on the lower surface of the discharge portion, when the toner container is oriented in the predetermined direction.

Structure Example A153

A toner container according to Structure Example A152, further comprising a rotatable member rotatable relative to the discharge portion in an outside of the discharge portion in the radial direction, wherein the projection projects downward through a hole provided in a bottom surface of the rotatable member, when the toner container is oriented in the predetermined direction.

Structure Example A154

A toner container according to Structure Example A150 or A151, further comprising a support member supporting the discharge portion, wherein the projection is provided on a lower surface of the support member, when the toner container is oriented in the predetermined direction.

Structure Example A155

A toner container according to Structure Example A154, wherein the support member defines a space which is surrounded by a side surface extending in the direction of the central axis and which is provided with the discharge portion, and.

the side surface of the support member is provided with a side surface opening configured to expose the opening of the discharge portion.

Structure Example A156

A toner container according to any one of Structure Examples A90-A150, wherein the projection is capable of transitioning with respect to the discharge portion between a first attitude in which it projects in the direction of the central axis and a second attitude in which it projects in a direction crossing the central axis.

Structure Example A157

A toner container according to any one of Structure Examples A90-A150, wherein the projection it supported by the discharge portion so as to be movable relative to the discharge portion in the direction of the central axis.

Structure Example A158

A toner container according to Structure Example A157, wherein a shaft member extending in the direction of the central axis, rotatable about the central axis relative to the discharge portion and movable in the direction of the central axis, and a guide portion for guiding the shaft member so that the shaft member moves in the direction of the central axis when the shaft member is rotated, and wherein the projection it supported by a lower end portion of the shaft member so as to move in the direction of the central axis together with the shaft member, when the toner container is oriented in the predetermined direction.

Structure Example A159

A toner container according to Structure Example A158, wherein in a state in which the toner container is oriented in the predetermined direction, wherein the guide portion includes a guide groove which is a cylindrical member provided outside the shaft member in the radial direction and which extends so as to go up in the direction of the central axis as goes in a predetermined rotational direction of the shaft member in a peripheral surface around the central axis, and wherein the shaft member is provided with a projection projecting in the radial direction and engaged with the guide groove, and is configured such that the shaft member moves upward in the direction of the central axis while the projection of the shaft member is guided by the guide groove of the guide portion, when the shaft member is rotated in the predetermined rotational direction.

Structure Example A160

A toner container according to Structure Example A159, further comprising an operating portion provided outside the shaft member in the radial direction so as to be rotatable with the shaft member, wherein when the operating portion is rotated in the predetermined rotational direction about the central axis, the shaft member moves upward in the direction of the central axis while being rotated and guided by the guide portion so that the projection moves upward with the shaft member, in a state in which the toner container is oriented in the predetermined direction.

Structure Example A161

A toner container according to any one of Structure Examples A90-A153, wherein the discharge portion has a first opposing surface and a second opposing surface at an outer surface extending in the direction of the central axis, the first opposing surface and the second opposing surface being opposed to each other with a gap therebetween, and the projection is between the first opposing surface and the second opposing surface in a direction in which the first opposing surface and the second opposing surface are arranged, as viewed in a direction perpendicular to the central axis.

Structure Example A162

A toner container according to Structure Example A161, wherein the first opposing surface and the second opposing surface are parallel with each other, and wherein when a line parallel with the first opposing surface and passing through a center portion between the first opposing surface and the second opposing surface is a first imaginary line, and a line provided by rotating the first imaginary line about the central axis by 90 degrees, the second imaginary line passes through the opening.

Structure Example A163

A toner container according to any one of Structure Examples A90-A150, wherein the discharge portion includes a pipe configured to pass the toner when the toner in the accommodating portion is discharged to an outside of the toner container, and the pipe is provided with a receiving opening for receiving the toner from the accommodating portion and an outlet for discharging the toner received through the receiving opening, wherein the opening is the outlet of the pipe.

Structure Example A164

A toner container according to Structure Example A163, wherein when the toner container is oriented in the predetermined direction, the receiving opening faces upward, and the pipe includes a portion extending so as to go in the radial direction as goes downward.

Structure Example A165

A toner container according to Structure Example A164, further comprising a pipe support member for supporting the pipe, and wherein when the toner container is oriented in the predetermined direction, the projection projects downward from a lower surface of the pipe support member.

Structure Example A166

A toner container according to any one of Structure Examples A163-A165, wherein the pipe is capable of transitioning to an attitude in which the outlet of the pipe faces downward.

Structure Example A167

A toner container according to any one of Structure Examples A90-A162, wherein the opening is provided at an outer surface of the discharge portion extending along the central axis.

Structure Example A168

A toner container according to any one of Structure Examples A90-A162, wherein the opening of the discharge portion is configured to be provided by a part of an outer surface of the discharge portion being broken, the part of the outer surface of the discharge portion extending in the direction of the central axis.

Structure Example A169

A toner container according to Structure Example A168, wherein the discharge portion is provided with a pull-tab connected with a part of the outer surface, and wherein the part of the outer surface is separated from the discharge portion to provide the opening of the discharge portion by the pull-tab being pulled.

Structure Example A170

A toner container (420) comprising:

an accommodating portion (201) configured to accommodate toner;

a discharge portion (402, 430) configured to be provided with an opening (430*a*) for discharging the toner in the accommodating portion to an outside;

a rotation member (203) rotatable about a central axis as a rotational axis relative to the discharge portion in a first rotational direction and a second rotational direction which is opposed to the first rotational direction; and a projection (402*b*) provided below the opening of the discharge portion and having inner peripheral surface (202*b*1) facing inward in a radial direction of an imaginary circle centered on the central axis, when the toner container is oriented in a predetermined direction in which the central axis extends in a direction of gravity and at least a part of the discharge portion is below the accommodating portion, wherein the opening of the discharge portion faces downward, and wherein when the toner container is oriented in the predetermined direction, the projection has an upward surface (204*a*3, 204*b*3) facing upward outside the inner peripheral surface in the radial direction, and the upward surface extends so as to go up as goes in the second rotating direction.

Structure Example A171

A toner container (420) comprising:

an accommodating portion (201) configured to accommodate toner:

a discharge portion (402, 430) configured to provide an opening (430*a*) for discharging the toner in the accommodating portion to an outside;

a rotation member (203) rotatable about a central axis as a rotational axis relative to the discharge portion in a first rotational direction and a second rotational direction which is opposed to the first rotational direction; and a projection (402*b*) provided below the opening of the discharge portion and having an inner peripheral surface (202*b*1) facing inward in a radial direction of an imaginary circle centered on the central axis, when the toner container is oriented in a predetermined direction in which the central axis extends in a direction of gravity and at least a part of the discharge portion is below the accommodating portion, wherein the opening of the discharge portion faces downward, wherein when the toner container is oriented in the predetermined direction, the projection has, outside the inner peripheral surface in the radial direction, a first downward surface (204*a*1, 204*b*1), a second downward surface (204*a*2, 204*b*2) which face downward, and an upward surface (204*a*3, 204*b*3) facing upward, and the first downward surface and the second downward surface extend so as to go up as goes in the first rotational direction, and at least a part of the first downward surface is provided at a position which is closer to the central axis in the radial direction than the second downward surface is and which is different from a position at which the second downward surface is provided in a circumferential direction of the imaginary circle, and at least a part of the upward surface is above at least a part of the second downward surface.

Structure Example A172

A toner container (420) comprising:

an accommodating portion (201) configured to accommodate toner;

a discharge portion (402, 430) configured to provide an opening (430*a*) for discharging the toner in the accommodating portion to an outside; and a projection (402*b*) which includes an inner peripheral surface (202*b*1) centered on the central axis, which is provided below the opening of the discharge portion, and which projects downward, when the toner container is oriented in a predetermined direction in which the central axis extends in a direction of gravity and at least a part of the discharge portion is below the accommodating portion, wherein the opening of the discharge portion faces downward, wherein when the toner container is oriented in the predetermined direction, the projection has an upward surface (204*a*3, 204*b*3) facing upward outside the inner peripheral surface in a radial direction of an imaginary circle centered on the central axis, and when a circumferential direction of the imaginary circle is a first circumferential direction, and a circumferential direction opposite to the first circumferential direction is a second circumferential direction, the upward surface extends so as to go up as goes in the second circumferential direction.

Structure Example A173

A toner container (420) comprising:

an accommodating portion (201) configured to accommodate toner;

a discharge portion (402, 430) configured to provide an opening (430*a*) for discharging the toner in the accommodating portion to an outside; and a projection (402*b*) which includes an inner peripheral surface (202*b*1) centered on the central axis and which is provided below the opening of the discharge portion and projects downward, when the toner container is oriented in a predetermined direction in which the central axis extends in a direction of gravity and at least a part of the discharge portion is below the accommodating portion, wherein the opening of the discharge portion faces downward, and wherein when the toner container is oriented in the predetermined direction, the projection has a first downward surface (204*a*1, 204*b*1), a second downward surface (204*a*2, 204*b*2), and an upward surface (204*a*3, 204*b*3) facing upward, outside the inner peripheral surface in a radial direction of an imaginary circle centered on the central axis, when the toner container is oriented in the predetermined direction, when a circumferential direction of the imaginary circle is a first circumferential direction, and a circumferential direction opposite to the first circumferential direction is a second circumferential direction, the first downward surface and the second downward surface extend so as to go up as go in the first circumferential direction, and at least a part of the first downward surface is at a position which is closer to the central axis in the radial direction than the second downward surface is and which is different from a position at which the second downward surface is provided in the circumferential direction, and at least a part of the upward surface is above at least a part of the second downward surface.

Structure Example A174

A toner container according to any one of Structure Examples A170-A173, wherein when the opening is a first opening, the discharge portion including a receiving member for receiving the toner from the accommodating portion, and a discharge member provided with the first opening through which the toner received from the receiving member is discharged to an outside of the toner container, the receiving member is provided with a second opening in a side surface extending in the direction of the central axis, and the discharge member is movable relative to the receiving member between a first position in which the discharge member projects in the radial direction through the second opening toward the receiving member, and the first opening is exposed to an outside of the toner container, and a second position retracted from the first position toward the central axis.

Structure Example A175

A toner container according to Structure Example A174, wherein the rotatable member is rotatable about the central axis between a close position for closing the second opening of the receiving member and an open position for opening the second opening of the receiving member, and wherein when the rotatable member is in the close position, the discharge member is in the second position, and movement of the discharge member to the first position is restricted by the rotatable member, and when the rotatable member is in the open position, the discharge member is movable between the first position and the second position.

Structure Example A176

A toner container (720, 7120, 7220, 7320) comprising:

an accommodating portion (201) configured to accommodate toner;

a discharge portion (302) configured to be provided with an opening (302*a*) for discharging the toner in the accommodating portion to an outside;

a rotation member (203) rotatable about a central axis as a rotational axis relative to the discharge portion in a first rotational direction and a second rotational direction which is opposed to the first rotational direction; and a projection (704, 7204, 7304) provided below the opening of the discharge portion and projecting downward, the projection having an inner peripheral surface (704Ae) facing a radial direction of an imaginary circle centered on the central axis, when the toner container is oriented in a predetermined direction in which the central axis extends in a direction of gravity and at least a part of the discharge portion is below the accommodating portion, wherein the opening of the discharge portion faces outward in the radial direction, wherein the projection includes a first projection member (704A, 7104A, 7204A, 7304A) and a second projection member (704B, 7104B, 7204B, 7304B), and the first projection member is rotatable relative to the second projection member about the central axis, wherein when the toner container is oriented in the predetermined direction, the first projection member has a downstream side end surface (704Aa1, 7104Aa1, 7104Ab1, 7204Aa1) which is a downstream side end surface in the first rotational direction, and the second projection member has an upward surface (704Ba2, 704Bb2, 7104Ba2, 7104Bb2, 7204Ba2, 7304Ba2) facing upward.

Structure Example A177

A toner container according to Structure Example A176, wherein the second projection member has a downward surface extending so as to go up as goes in the first rotational direction, the downward surface being outside the downstream side end surface in the radial direction, and wherein at least a part of the upward surface is above at least a part of the downward surface.

Structure Example A178

A toner container according to Structure Example A177, wherein the downstream side end surface of the first projection member is restricted by the second projection member so that it does not reach a downstream side of a downstream end, in the first rotational direction, of the downward surface of the second projection member.

Structure Example A179

A toner container according to Structure Example A178, wherein the second projection member has a downward surface extending so as to go up as goes in the first rotational direction, the downward surface being outside the downstream side end surface in the radial direction, and wherein at least a part of the upward surface is above at least a part of the downward surface.

Structure Example A180

A toner container according to Structure Example A179, wherein the downstream side end surface of the first projection member is restricted by the second projection member so that the downstream side end surface does not reach a downstream side of a downstream end, in the first rotational direction, of the downward surface of the second projection member.

Structure Example A181

A toner container according to any one of Structure Examples A176-A180, wherein the downstream side end surface of the first projection member is a surface parallel with the central axis.

Structure Example A182

A toner container according to any one of Structure Examples A176-A181, wherein the first projection member has a first inner peripheral surface extending in the direction of the central axis, and the second projection member has a second inner peripheral surface extending in the direction of the central axis and centered on the central axis, and wherein the first projection member is rotatable relative to the second projection member inside the second inner peripheral surface relative to the second inner peripheral surface of the second projection member in the radial direction.

Structure Example A183

A toner container according to Structure Example A182, further comprising a movable member movable relative to the first projection member in the direction of the central axis inside the first inner peripheral surface of the first projection member, the movement member is restricted in rotation relative to the second projection member about the central axis, and an urging member for urging the movable member away from the accommodating portion in the direction of the central axis, wherein the movable member is configured to rotate the first projection member relative to the second projection member in the first rotational direction by being moved toward the accommodating portion in the direction of the central axis.

Structure Example A184

A toner container according to Structure Example A182, further comprising an urging member for urging the first projection member relative to the second projection member in the direction of the central axis away from the accommodating portion, wherein the second projection member is provided with a guide groove, and wherein the first projection member is provided with an engaging portion for engagement with the guide groove of the second projection member, and movable relative to the second projection member in the direction of the central axis inside the second inner peripheral surface of the second projection member, and wherein the first projection member is configured to be rotated in the first rotational direction relative to the second projection member while the engaging portion of the first projection member is guided by the guide groove of the second projection member, by being moved in the direction of the central axis toward the accommodating portion.

Structure Example A185

A toner container (100, 1050, 1051, 1052, 1060, 1070, 1080, 220, 2320, 23210, 2420, 2520, 2530, 2820, 520, 5120, 920, 10020, 1120) comprising:

an accommodating portion (101, 1015, 10151, 201, 2401, 2801, 501, 901) configured to accommodate toner;

a discharge portion (102, 1025, 202, 2302, 23102, 2402A, 2502, 2503, 2802, 502, 5102, 902, 1002A, 1102) configured to be provided with an opening (102*a*, 202*a*, 2402Ag, 2502*k*2, 2503*k*2, 2802*a*, 502*a*, 902Bk, 10020Be) for discharging the toner in the accommodating portion to an outside, the discharge portion being aligned with the accommodating portion in the first direction (D1); and a projection (102*b*, 1020*b*, 1021*b*, 1023*b*, 1024*b*, 1026*b*, 1027*b*, 1028*b*, 202*b*, 2302*b*, 23102*b*, 2402Bb, 2502*b*, 2503*b*, 2802*b*, 502*b*, 5102*b*, 903Bg, 1003*b*, 1132*b*) provided below the opening of the discharge portion and projects downward, when the toner container is oriented in a predetermined direction in which the first direction is a direction of gravity and at least a part of the discharge portion is below the accommodating portion, wherein the opening of the discharge portion faces outward in a second direction perpendicular to the first direction, and wherein when the toner container is oriented in the predetermined direction, the projection has a downward guide surface (104*a*1, 104*b*1, 1041*b*1, 1042*a*1, 1043*a*1, 1043*b*1, 1044*a*1, 1046*a*1, 1047*a*1, 1048*a*1, 204*a*1, 204*a*2, 204*b*1, 204*b*2, 2304*a*1, 2304*b*1, 23104*a*1, 23104*b*1, 2604*b*1, 2604*a*2) facing downward, and an upward guide surface (104*a*2, 104*b*2, 1041*a*2, 1042*b*2, 1043*a*2, 1043*b*2, 1044*a*2, 1046*a*2, 1047*a*2, 1048*a*2, 204*a*3, 204*b*3, 2304*a*2, 2304*b*2, 23104*a*2, 23104*b*2, 2604*a*3) at least a part of which is above at least the downward guide surface and which faces upward, and at least a part of the upward guide surface is above at least a part of the downward guide surface.

Structure Example A186

A toner container according to Structure Example A185, wherein the downward guide surface is a push surface.

Structure Example A187

A toner container according to Structure Example A185 or A186, wherein the upward guide surface is configured to be exposed to an outside of the toner container.

Structure Example A188

A toner container according to any one of Structure Examples A185-A187, wherein when the toner container is oriented in the predetermined direction, a cavity is provided above the upward guide surface of the projection.

Structure Example A189

A toner container according to any one of Structure Examples A185-A188, wherein as the toner container the toner container oriented in the predetermined direction is viewed in a direction perpendicular to the first direction, the downward guide is configured to extend so as to go up as goes in the first horizontal direction of horizontal directions, and the upward guide surface is configured to extend so as to go up as goes in a second horizontal direction which is opposite to the first horizontal direction.

Structure Example A190

A toner container according to Structure Example A189, wherein when the toner container is oriented in the predetermined direction, the projection includes a connecting portion connecting a downstream end of the downward guide surface in the first horizontal direction and an upstream end of the upward guide surface in the second horizontal direction, with each other.

Structure Example A191

A toner container according to Structure Example A189 or A190, wherein when the toner container is oriented in the predetermined direction, the projection has a contacted surface which extend upward from a downstream end of the upward guide surface in the second horizontal direction along the first direction and which faces downward in the first horizontal direction.

Structure Example A192

A toner container according to any one of Structure Examples A189-A191, wherein the downward guide surface includes a first downward guide surface and a second downward guide surface which face downward, and wherein as the toner container is viewed in a direction perpendicular to the first direction, when the toner container is oriented in the predetermined direction, at least a part of the first downward guide surface is at a position different from a position at which the second downward guide is provided in the horizontal direction.

Structure Example A193

A toner container according to Structure Example A192, wherein when the toner container is oriented in the predetermined direction, the projection includes a connecting portion connecting a downstream end of the second downward guide surface in the first horizontal direction and an upstream end of the upward guide surface in the second horizontal direction with each other.

Structure Example A194

A toner container according to Structure Example A192 or A193, wherein as viewed in the first direction, the second downward guide surface overlaps the upward guide surface.

Structure Example A195

A toner container according to any one of Structure Examples A185-A194, wherein when the toner container is oriented in the predetermined direction, the projection is configured to project downward with respect to a lower surface of the toner container.

Structure Example A196

A toner container according to Structure Example A195, wherein when the toner container is oriented in the predetermined direction, the projection is capable of taking a projection position in which the projection projects downward with respect to the lower surface of the toner container, and a retracted position in which the projection is retracted so as not to project with respect to the lower surface.

Structure Example A197

A toner container according to Structure Example A195, wherein when the toner container is oriented in the predetermined direction, the projection is provided at a lower surface of the discharge portion.

Structure Example A198

A toner container according to Structure Example A195, further comprising a support member supporting the discharge portion, wherein the projection is provided on a lower surface of the support member, when the toner container is oriented in the predetermined direction.

Structure Example A199

A toner container according to Structure Example A198, wherein the support member includes a space surrounded by a side surface extending in the first direction and provided with the discharge portion, and wherein the side surface of the support member is provided with a side surface opening configured to expose the opening of the discharge portion.

Structure Example A200

A toner container according to any one of Structure Examples A185-A195, wherein the projection is capable of transitioning relative to the discharge portion between a first attitude in which the projection projects in the first direction and a second attitude in which the projection projects in a direction crossing the first direction.

Structure Example A201

A toner container according to any one of Structure Examples A185-A195, wherein the discharge portion includes a pipe configured to pass the toner when the toner in the accommodating portion is discharged to an outside of the toner container, and the pipe is provided with a receiving opening for receiving the toner from the accommodating portion and an outlet for discharging the toner received through the receiving opening, wherein the opening is the outlet of the pipe.

Structure Example A202

A toner container according to Structure Example A201, wherein when the toner container is oriented in the predetermined direction, the receiving opening faces upward, and the pipe includes a portion extending so as to go in the second direction as goes downward.

Structure Example A203

A toner container according to Structure Example A201 or A202, further comprising a pipe support member supporting the pipe, wherein when the toner container is oriented in the predetermined direction, the projection projects downward from a lower surface of the pipe support member.

Structure Example A204

A toner container according to any one of Structure Examples A201-A203, wherein the pipe is capable of transitioning to an attitude in which the outlet of the pipe faces downward.

Structure Example A205

A toner container according to any one of Structure Examples A185-A200, wherein the opening is provided in an outer surface of the discharge portion extending in the first direction.

Structure Example A206

A toner container according to any one of Structure Examples A185-A200, wherein the opening of the discharge portion is provided by a part of an outer surface of the discharge portion being broken, the part of the outer surface of the discharge portion extending in the first direction.

Structure Example A207

A toner container according to Structure Example A206, wherein the discharge portion is provided with a pull-tab connected with a part of the outer surface, and wherein the part of the outer surface is separated from the discharge portion to provide the opening of the discharge portion by the pull-tab being pulled.

Structure Example A208 a toner container according to any one of Structure Examples A185-A207, further comprising a rotatable member rotatable relative to the discharge portion about a central axis as a rotational axis extending in the first direction in a first rotational direction and a second rotational direction opposite to the first rotational direction.

Structure Example A209

A toner container according to Structure Example A208, wherein the projection includes a first projection and a second projection which is provided at the position different from a position at which the first projection is provided in a circumferential direction of an imaginary circle centered on the central axis, wherein the first projection has the upward guide surface and the downward guide surface, and wherein the second projection has a 150-210 degree inclusive rotation symmetry shape of the first projection about the central axis.

Structure Example A210

A toner container according to Structure Example A208, wherein the projection includes a first projection and a second projection which is provided at the position different from a position at which the first projection is provided in a circumferential direction of an imaginary circle centered on the central axis, wherein the first projection has the upward guide surface, wherein the second projection has the downward guide surface.

Structure Example A211

A toner container according to Structure Example A208, wherein the projection includes a first projection and a second projection which is provided at the position different from a position at which the first projection is provided in a circumferential direction of an imaginary circle having a center on the central axis, wherein the downward guide surface includes a first downward guide surface and a second downward guide surface which face downward, and wherein the upward guide surface is a first upward guide surface, the first projection has the first upward guide surface, the first downward guide surface and a second downward surface, the second projection has a second upward guide surface, a third downward guide surface and a fourth downward guide surface, and the second upward guide surface, the third downward guide surface and the fourth downward guide surface have shapes which are 150-210 degree inclusive rotation symmetry, about the central axis, of the first upward guide surface, the first downward guide surface and the second downward guide surface, respectively.

Structure Example A212

A toner container according to any one of Structure Examples A208-A211, wherein the rotatable member is provided outside the discharge portion in the radial direction of an imaginary circle centered on the central axis.

Structure Example A213

A toner container according to any one of Structure Examples A208-A212, wherein the rotatable member is configured to rotate about the central axis between a close position for closing the opening and an open position for opening the opening.

Structure Example A214

A toner container according to Structure Example A213, wherein an outer surface of the rotation member extending in the direction of the central axis is provided with a rotation member opening for exposing the opening of the discharge portion to an outside of the toner container when the rotatable member is in the open position, and wherein an outer surface in the surface opposite to the rotational member across the central axis is provided with the recess recessing inward in a radial direction of an imaginary circle centered on the central axis.

Structure Example A215

A toner container according to Structure Example A214, wherein the projection is at a position closer to the central axis in the radial direction than the recess is, as the toner container is viewed in the direction of the central axis.

Structure Example A216

A toner container according to Structure Example A213, wherein an outer surface of the rotation member extending in the direction of the central axis is provided with a rotation member opening for exposing the opening of the discharge portion to an outside of the toner container when the rotatable member is in the open position, and wherein as viewed in a radial direction of an imaginary circle centered on the central axis, the projection is in a width of the rotation member opening in a direction perpendicular to the central axis.

Structure Example A217

A toner container according to Structure Example A214, wherein the discharge portion has a first opposing surface and a second opposing surface at an outer surface thereof extending in the direction of the central axis, the first opposing surface and the second opposing surface being opposed to each other with a gap therebetween, wherein the first opposing surface and the first opposing surface are exposed through the rotation member opening, when the rotation member is in the close position.

Structure Example A218

A toner container according to Structure Example A217, wherein the first opposing surface and the second opposing surface are parallel with each other, and wherein when a line parallel with the first opposing surface and passing through a center portion between the first opposing surface and the second opposing surface is a first imaginary line, a second imaginary line which is a line provided by rotating the first imaginary line about the central axis by 90 degrees passes through the opening.

Structure Example A219

A toner container according to any one of Structure Examples A213-A218, wherein the rotation member is rotatable from the close position to the open position is the first rotational direction.

Structure Example A220

A toner container according to Structure Example A219, further comprising a seal for sealing between the rotation member and the discharge portion when the rotation member is in the close position.

Structure Example A221

A toner container according to any one of Structure Examples A185-A211, wherein the projection has an inner peripheral guide surface extending in the first direction about the central axis.

Structure Example A222

A toner container according to Structure Example A221, wherein the inner peripheral guide surface of the projection is a cylindrical surface.

Structure Example A223

A toner container according to Structure Example A221, wherein the inner peripheral guide surface of the projection includes a plurality of flat surfaces around the central axis.

Structure Example A224

A toner container (100, 1050, 1051, 1052, 1060, 1070, 1080, 220, 2320, 23210, 2420, 2520, 2530, 2820, 320, 3220, 520, 5120, 620, 720, 7220, 820, 920, 10020, 1120) comprising:

an accommodating portion (101, 1015, 10151, 201, 2401, 2801, 501, 901) configured to accommodate toner;

a discharge portion (102, 1025, 202, 2302, 23102, 2402A, 2502, 2503, 2802, 302, 502, 5102, 902, 1002A, 1102) configured to be provided with an opening (102*a*, 202*a*, 2402Ag, 2502*k*2, 2503*k*2, 2802*a*, 302*a*, 502*a*, 902Bk, 10020Be) for discharging the toner in the accommodating portion to an outside, the discharge portion being aligned with the accommodating portion in a first direction (D1); and a projection (102*b*, 1020*b*, 1021*b*, 1023*b*, 1024*b*, 1026*b*, 1027*b*, 1028*b*, 202*b*, 2302*b*, 23102*b*, 2402Bb, 2502*b*, 2503*b*, 2802*b*, 304, 3104, 3204, 502*b*, 5102*b*, 604, 704, 7204, 804, 8104, 8204, 8304, 903Bg, 1003*b*, 1132*b*) provided below the opening of the discharge portion and projecting downward, when the toner container is oriented in a predetermined direction in which the first direction is a direction of gravity and at least a part of the discharge portion is below the accommodating portion, wherein the opening of the discharge portion faces outward in a second direction perpendicular to the first direction, and wherein when the toner container is oriented in the predetermined direction, the projection has a downward guide surface) facing downward, an upward engagement surface (104*a*2, 104*b*2, 1041*a*2, 1042*b*2, 1043*a*2, 1043*b*2, 1044*a*2, 1046*a*2, 1047*a*2, 1048*a*2, 204*a*3, 204*b*3, 2304*a*2, 2304*b*2, 23104*a*2, 23104*b*2, 2604*a*3, 304*a*3, 304*b*3, 3104*a*3, 3104*b*3, 3204*a*3, 3204*b*3, 604Ba2, 604Bb2, 704Ba2, 704Bb2, 7204Ba2, 804*a*3) facing upward, wherein at least a part of the upward engagement surface is above at least a part of the downward guide surface, and at least a part of the upward engagement surface is above at least a part of the downward guide surface.

Structure Example A225

A toner container according to Structure Example A224, wherein the upward engagement surface is configured to be exposed to an outside of the toner container.

Structure Example A226

A toner container according to Structure Example A224 or A225, wherein a cavity is provided above the upward engaging surface of the projection when the toner container is oriented in the predetermined direction.

Structure Example A227

A toner container according to any one of Structure Examples A224-A226, wherein the downward guide surface is a push surface.

Structure Example A228

A toner container according to any one of Structure Examples A224-A227, wherein when the toner container is oriented in the predetermined direction, as the toner container is viewed in a direction perpendicular to the first direction, the downward guide surface extends so as to go up as goes in a first horizontal direction of the horizontal directions.

Structure Example A229

A toner container according to Structure Example A228, wherein when the toner container is oriented in the predetermined direction, the upward engagement surface is a surface parallel with the first horizontal direction.

Structure Example A230

A toner container according to Structure Example A228 or A229, wherein when the toner container is oriented in the predetermined direction, the upward engagement surface extends so as to go up as goes in the first horizontal direction.

Structure Example A231

A toner container according to any one of Structure Examples A228-A230, wherein when the toner container is oriented in the predetermined direction, the projection includes a connecting portion connecting a downstream end of the downward guide surface in the first horizontal direction and a downstream end of the upward engagement surface in the first horizontal direction, with each other.

Structure Example A232

A toner container according to any one of Structure Examples A228-A231, wherein when the toner container is oriented in the predetermined direction, the projection has a contacted surface extending upward in the first direction from an upstream end of the upward engagement surface in the first horizontal direction and facing a downstream side on the first horizontal direction.

Structure Example A233

A toner container according to any one of Structure Examples A228-A232, wherein the downward guide surface includes a first downward guide surface and a second downward guide surface which face downward, wherein as the toner container is viewed in a direction perpendicular to the first direction when the toner container is oriented in the predetermined direction, at least a part of the first downward guide surface is at a position different from a position at which the second downward guide surface is provided in the horizontal direction.

Structure Example A234

A toner container according to Structure Example A233, wherein when the toner container is oriented in the predetermined direction, the projection includes a connecting portion connecting a downstream end of the second downward guide surface in the first horizontal direction and a downstream end of the upward engagement surface in the first horizontal direction, with each other.

Structure Example A235

A toner container according to Structure Example A233 or A234, wherein as viewed in the first direction, the second downward guide surface overlaps the upward engagement surface.

Structure Example A236

A toner container according to any one of Structure Examples A224-A235, wherein when the toner container is oriented in the predetermined direction, the projection is configured to project downward with respect to a lower surface of the toner container.

Structure Example A237

A toner container according to any one of Structure Examples A224-A236, wherein the opening is provided in an outer surface of the discharge portion extending in the first direction.

Structure Example A238

A toner container according to any one of Structure Examples A224-A237, further comprising a rotatable member rotatable relative to the discharge portion about a central axis as a rotational axis extending in the first direction in a first rotational direction and a second rotational direction opposite to the first rotational direction.

Structure Example A239

A toner container according to Structure Example A238, wherein the projection includes a first projection and a second projection which is provided at the position different from a position at which the first projection is provided in a circumferential direction of an imaginary circle centered on the central axis, wherein the first projection has the upward engagement surface and the downward guide surface, and the second projection has a 150-210 degree inclusive rotation symmetry shape of the first projection about the central axis.

Structure Example A240

A toner container according to Structure Example A233 or A234, further comprising a rotatable member rotatable, relative to the discharge portion about a central axis as a rotational axis extending in the first direction, in a first rotational direction and a second rotational direction opposite to the first rotational direction, wherein the projection includes a first projection and a second projection which is provided at the position different from a position at which the first projection is provided in a circumferential direction of an imaginary circle centered on the central axis, and wherein the upward engagement surface is a first upward engagement surface, the first projection has the first upward engagement surface, the first downward guide surface and a second downward surface, the second projection has a second upward engagement surface, a third downward guide surface and a fourth downward guide surface, and the second upward engagement surface, the third downward guide surface and the fourth downward guide have shapes which are 150-210 degree rotational symmetric, about the central axis, of the first upward engagement surface, the first downward guide surface and the second downward guide surface.

Structure Example A241

A toner container according to any one of Structure Examples A224-A237, wherein the projection has an inner peripheral guide surface centered on a central axis extending in the first direction.

Structure Example A242

A toner container according to any one of Structure Examples A224-A240, wherein the projection is supported by the discharge portion so as to be movable in the first direction relative to the discharge portion.

Structure Example A243

A toner container according to Structure Example A78, further comprising a shaft member rotatable about the central axis relative to the discharge portion and movable in the direction of the central axis, and a guide configured to guide the shaft member so that the shaft member is moved in the direction of the central axis when the shaft member is rotated, wherein the projection is supported by a lower end portion of the shaft member so as to move in the direction of the central axis together with the shaft member, when the toner container is oriented in the predetermined direction.

Structure Example A244

A toner container according to Structure Example A243, wherein in a state in which the toner container is oriented in the predetermined direction, the guide is a cylindrical member provided outside of the shaft member in the radial direction and is provided with a guide groove which extends on a peripheral surface around the central axis so as to go up in the direction of the central axis as goes in a predetermined rotational direction of the shaft member, the shaft member is provided with a projection projecting in the radial direction and engaged with the guide groove, and when the shaft member is rotated in the predetermined rotational direction, the projection of the shaft member is guided by the guide groove of the guide so that the shaft member moves upward in the direction of the central axis.

Structure Example A245

A toner container according to Structure Example A244, further comprising an operating portion provided outside the shaft member in the radial direction so as to be rotatable with the shaft member, and wherein when the operating portion is rotated about the central axis in a state in which the toner container is oriented in the predetermined direction, the shaft member is rotated and is guided by the guide to move upward so that the projection is moved upward together with the shaft member.

Structure Example A246

A toner container (100, 1050, 1051, 1052, 1060, 1070, 1080, 220, 2320, 23210, 2420, 2520, 2530, 520, 5120, 920, 10020, 1120) mountable to and dismountable from a mounting portion (106, 206) of an image forming apparatus, the mounting portion including a rotatable guided member, the toner container comprising:

an accommodating portion (101, 1015, 10151, 201, 2401, 501, 901) configured to accommodate toner;

a discharge portion (102, 1025, 202, 2302, 23102, 2402A, 2502, 2503, 502, 5102, 902, 1002A, 1102) configured to be provided with an opening (102*a*, 202*a*, 2402Ag, 2502*k*2, 2503*k*2, 502*a*, 902Bk, 10020Be) for discharging the toner in the accommodating portion to an outside; a rotatable member (103, 203, 903A, 1003) rotatable in a first rotational direction relative to the discharge portion about a central axis as a rotational axis and a second rotational direction opposed to the first rotational direction; and a projection (102*b*, 1020*b*, 1021*b*, 1023*b*, 1024*b*, 1026*b*, 1027*b*, 1028*b*, 202*b*, 2302*b*, 23102*b*, 2402Bb, 2502*b*, 2503*b*, 502*b*, 5102*b*, 903Bg, 1003*b*, 1132*b*) provided below the opening of the discharge portion and having inner peripheral surface (102*b*1, 202*b*1, 202*b*10) facing inward in a radial direction of an imaginary circle centered on the central axis, when the toner container is oriented in a predetermined direction in which the central axis extends in a direction of gravity and at least a part of the discharge portion is below the accommodating portion, wherein the opening of the discharge portion is configured to face outward in the radial direction, and wherein when the toner container is oriented in the predetermined direction, the projection has a downward guide surface (104*a*1, 104*b*1, 1041*b*1, 1042*a*1, 1043*a*1, 1043*b*1, 1044*a*1, 1046*a*1, 1047*a*1, 1048*a*1, 204*a*1, 204*a*2, 204*b*1, 204*b*2, 2304*a*1, 2304*b*1, 23104*a*1, 23104*b*1, 2604*b*1, 2604*a*2) facing downward and an upward guide surface facing upward outside of the inner peripheral surface and inside of the opening of the discharge portion in the radial direction, and an upward guide surface (104*a*2, 104*b*2, 1041*a*2, 1042*b*2, 1043*a*2, 1043*b*2, 1044*a*2, 1046*a*2, 1047*a*2, 1048*a*2, 204*a*3, 204*b*3, 2304*a*2, 2304*b*2, 23104*a*2, 23104*b*2, 2604*a*3) facing upward, when the toner container is moved down in the direction of the central axis toward the mounting portion in a state in which the toner container is oriented in the predetermined direction, the downward guide is configured to guide the guided member so that the guided member is rotated about the central axis in the first rotational direction, and the upward guide surface is configured to guide the guided member so that the guided member is moved upward after the guided member is rotated in the first rotational direction by the downward surface.

Structure Example A247

A toner container according to Structure Example A246, wherein the rotatable member is provided outside the discharge portion in the radial direction.

Structure Example A248

A toner container according to any one of Structure Examples A246-A247, wherein the rotatable member is rotatable about the central axis between a close position for closing the opening and an open position for opening the opening, and wherein the rotatable member is provided with a rotatable member opening for exposing the opening of the discharge portion to an outside of the toner container when the rotatable member is in the open position.

Structure Example A249

A toner container according to Structure Example A248, wherein a rotational direction of the rotatable member from the close position toward the open position is the first rotational direction.

Structure Example A250

A toner container according to Structure Example A248 or A249, further comprising a seal for sealing between the rotatable member and the discharge portion when the rotatable member is in the close position.

Structure Example A251

A toner container according to any one of Structure Examples A248-A250, wherein the mounting portion includes a positioning portion projecting inward in the radial direction, and the discharge portion includes a positioned portion having a first opposing surface and a second opposing surface which extend in a direction perpendicular to the central axis on the outer surface extending in the direction of the central axis and which are opposed to each other with a gap therebetween, the positioned portion being configured to be engaged with the positioning portion in a state in which the toner container is mounted on the mounting portion, and wherein the positioned portion of the discharge portion is exposed through the rotatable member opening when the rotatable member is in the close position.

Structure Example A252

A toner container according to any one of Structure Examples A248-A251, wherein the image forming apparatus includes an apparatus side shutter of a cylindrical shape having an open upper part and rotatable about the central axis, the apparatus side shutter being provided with an apparatus side shutter opening in a side surface portion of the apparatus side shutter extending along the central axis, and a projection projecting inward in the radial direction in a region of the apparatus side shutter side surface portion opposed to the apparatus side shutter opening in the radial direction, and wherein in a state in which the toner container is mounted on the mounting portion, the rotatable member is provided, in a rotatable member side surface portion extending along the central axis, with the rotatable member opening which is in fluid communication with the apparatus side shutter opening in the radial direction, and a recess recessed inward in the radial direction and engageable with the projection of the apparatus side shutter.

Structure Example A253

A toner container according to Structure Example A252, wherein the guided member is disposed at a position closer to the central axis than the projection of the apparatus side shutter side surface portion of the apparatus side shutter in the radial direction, and wherein the projection is closer to the central axis in the radial direction than the recess of the rotatable member, as the toner container is viewed in the direction of the central axis.

Structure Example A254

A toner container according to Structure Example A252 or A253, wherein the guided member is below the apparatus side shutter opening of the apparatus side shutter in the direction of the central axis, and wherein the projection projects downward with respect to a lower the surface of the toner container, when the toner container is oriented in the predetermined direction.

Structure Example A255

A toner container according to any one of Structure Examples A246-A254, wherein the projection is configured to project downward from a bottom surface of the discharge portion, when the toner container is oriented in the predetermined direction, and wherein the projection projects downward beyond the bottom surface of the rotatable member through a hole provided in the bottom surface of the rotatable member.

Structure Example A256

A toner container (100, 1050, 1051, 1052, 1060, 1070, 1080, 220, 2320, 23210, 2420, 2520, 2530, 2820, 520, 5120, 920, 10020, 1120) mountable to and dismountable from a mounting portion (106, 206) of an image forming apparatus, the mounting portion including a rotatable guided member (114, 214), the toner container comprising:

an accommodating (101, 1015, 10151, 201, 2401, 2801, 501, 901) portion configured to accommodate toner;

a discharge portion (102, 1025, 202, 2302, 23102, 2402A, 2502, 2503, 2802, 502, 5102, 902, 1002A, 1102) configured to be provided with an opening (102*a*, 202*a*, 2402Ag, 2502*k*2, 2503*k*2, 2802*a*, 502*a*, 902Bk, 10020Be) for discharging the toner in the accommodating portion to an outside; and a projection (102*b*, 1020*b*, 1021*b*, 1023*b*, 1024*b*, 1026*b*, 1027*b*, 1028*b*, 202*b*, 2302*b*, 23102*b*, 2402Bb, 2502*b*, 2503*b*, 2802*b*, 502*b*, 5102*b*, 903Bg, 1003*b*, 1132*b*) which includes an inner peripheral surface (102*b*1, 202*b*1, 202*b*10) centered on the central axis, which is provided below the opening of the discharge portion, and which projects downward, when the toner container is oriented in a predetermined direction in which the central axis extends in a direction of gravity and at least a part of the discharge portion is below the accommodating portion, wherein the opening of the discharge portion is configured to face outward in a radial direction of an imaginary circle centered on the central axis, and wherein when the toner container is oriented in the predetermined direction, the projection has a downward guide surface (104*a*1, 104*b*1, 1041*b*1, 1042*a*1, 1043*a*1, 1043*b*1, 1044*a*1, 1046*a*1, 1047*a*1, 1048*a*1, 204*a*1, 204*a*2, 204*b*1, 204*b*2, 2304*a*1, 2304*b*1, 23104*a*1, 23104*b*1, 2604*b*1, 2604*a*2) facing downward and an upward guide surface facing upward outside of the inner peripheral surface and inside of the opening of the discharge portion in the radial direction, and an upward guide surface (104*a*2, 104*b*2, 1041*a*2, 1042*b*2, 1043*a*2, 1043*b*2, 1044*a*2, 1046*a*2, 1047*a*2, 1048*a*2, 204*a*3, 204*b*3, 2304*a*2, 2304*b*2, 23104*a*2, 23104*b*2, 2604*a*3) facing upward, when the toner container is moved down in the direction of the central axis toward the mounting portion in a state in which the toner container is oriented in the predetermined direction, the rotational direction of the guided member about the central axis is a first rotational direction, and the rotating direction opposite to the first rotational direction is a second rotational direction, the downward guide surface is configured to guide the guided member so that the guided member rotates in the first rotational direction, and the upward guide surface is configured to guide the guided member so that the guided member moves up after the guided member is rotated in the first rotational direction by the downward guide surface.

Structure Example A257

A toner container according to any one of Structure Examples A246-A256, wherein the downward guide surface is configured to contact a contacted portion of the guided member to push the guided member so as to rotate the guided member in the first rotational direction, when the toner container is moved down along the central axis toward the mounting portion in a state in which the toner container is oriented in the predetermined direction.

Structure Example A258

A toner container according to Structure Example A257, wherein the downward guide surface extends so as to go up as goes in the first rotational direction.

Structure Example A259

A toner container according to any one of Structure Examples A246-A258, wherein the upward guide surface is configured to guide the guided member so as to move the guided member up while it is rotated in the second rotational direction.

Structure Example A260

A toner container according to any one of Structure Examples A246-A258, wherein the image forming apparatus includes an urging member for urging the guided member in the direction in which the guided member rotates in the second rotational direction, wherein the upward guide surface is configured to guide the guided member so that the guided member is moved up while being rotated in the second rotational direction by an urging force of the urging member.

Structure Example A261

A toner container according to Structure Example A259 or A260, wherein the upward guide surface extends so as to go up as goes in the second rotational direction.

Structure Example A262

A toner container according to any one of Structure Examples A246-A261, wherein the guided member has a contact surface which is a downstream end surface in the second rotational direction, and wherein the projection includes a contacted surface configured to stop rotation of the guided member in the second rotational direction by contacting the contact surface of the guided member rotated in the second rotational direction while being guided by the upward guide surface.

Structure Example A263

A toner container according to Structure Example A262, wherein when the toner container is oriented in the predetermined direction, the contacted surface extends upward from a downstream end of the upward guide surface in the second rotational direction along the direction of the central axis and faces downstream side in the second rotational direction.

Structure Example A264

A toner container according to Structure Example A262 or A263, wherein when the toner container is oriented in the predetermined direction, a cavity is provided right above the upward guide surface of the projection, wherein a portion of the guided member provided with the contact surface is capable of entering the cavity, when the contact surface of the guided member contacts the contacted surface.

Structure Example A265

A toner container according to any one of Structure Examples A246-A264, comprising a connecting portion, wherein when the toner container is oriented in the predetermined direction, the connecting portion connects the downstream end of the downward guide surface in the first rotational direction and an upstream end of the upward guide surface in the second rotational direction with each other, the connecting portion being configured to guide the guided member so as to switch the rotational direction of the guided member from the first rotational direction to the second rotational direction.

Structure Example A266

A toner container according to any one of Structure Examples A246-A265, wherein the downward guide surface includes a first downward guide surface and a second downward guide surface which face downward, wherein when the toner container is moved down in the direction of the central axis toward the mounting portion in a state in which the toner container is oriented in the predetermined direction, the first downward guide surface guides the guided member so that the guided member is rotated in the first rotational direction, and the second downward guide surface guides the guided member so that the guided member further is rotated in the first rotational direction after the guided member is guided by the first downward guide surface to be rotated in the first rotational direction.

Structure Example A267

A toner container according to Structure Example A266, wherein the guided member includes a first contacted portion and a second contacted portion which is provided at a position more away from the central axis in the radial direction than the first contacted portion is, wherein the first downward guide surface is configured to push the first contacted portion to rotate the guided member in the first rotational direction by contacting the first contacted portion, wherein the second downward guide surface is configured to push the second contacted portion to further rotate the guided member in the first rotational direction by contacting the second contacted portion after the guided member is rotated by the first downward guide surface in the first rotational direction.

Structure Example A268

A toner container according to Structure Example A266 or A267, wherein at least a part of the first downward guide surface is provided at a position which is closer to the central axis in the radial direction than the second downward guide surface is and which is different from the second downward guide surface in a circumferential direction of the imaginary circle.

Structure Example A269

A toner container according to Structure Example A267, comprising a connecting portion, wherein when the toner container is oriented in the predetermined direction, the connecting portion connects a downstream end of the second downward guide surface in the first rotational direction and an upstream end of the upward guide surface in the second rotational direction with each other, the connecting portion being configured to guide the second contacted portion of the guided member so as to switch the rotational direction of the guided member from the first rotational direction to the second rotational direction.

Structure Example A270

A toner container according to any one of Structure Examples A246-A269, wherein the guided member includes a first engaging claw extending upward and a second engaging claw which extends upward and which is provided at a position different from a position at which the first engaging claw is provided in a circumferential direction of the imaginary circle, and wherein the projection includes a first projection configured to engage with the first engaging claw and a second projection configured to engage with the second engaging claw, when the toner container is moved down along the central axis relative to the image forming apparatus in a state in which the toner container is oriented in the predetermined direction, the first projection has the upward guide surface, the second projection has the downward guide surface, and the second projection has a 150-210 degree inclusive rotation symmetry shape of the first projection about the central axis.

Structure Example A271

A toner container according to any one of Structure Examples A266-A269, wherein the guided member includes a first engaging claw extending upward, and a second engaging claw which extends upward and which is provided at a position different from a position at which the first engaging claw is provided in a circumferential direction of the imaginary circle, wherein the projection includes a first projection configured to engage with the first engaging claw and a second projection configured to engage with the second engaging claw, when the toner container is moved down along the central axis relative to the image forming apparatus in a state in which the toner container is oriented in the predetermined direction, and wherein the upward guide surface is a first upward guide surface, the first projection has the first upward guide surface, the first downward guide surface and the second downward guide surface, the second projection has a second upward guide surface, a third downward guide surface and a fourth downward guide surface, and the second upward guide surface, the third downward guide surface and the fourth downward guide surface have shapes of 150-210 degree inclusive rotational symmetry, about the central axis, of the first upward guide surface, the first downward guide surface and the second downward surface, respectively.

Structure Example A272

A toner container according to Structure Example A271, wherein the second upward guide surface, the third downward guide surface and a fourth downward surface have shapes of 180 degree rotational symmetry, about the central axis, of the first upward guide surface, the first downward guide surface and the second downward surface, respectively.

Structure Example A273

A toner container according to any one of Structure Examples A246-A272, wherein the image forming apparatus includes a shaft portion extending upward along the central axis and supporting the guided member so as to be rotatable about the central axis, wherein the inner peripheral surface of the projection is configured to engage with the shaft portion when the toner container is moved down along the central axis relative to the image forming apparatus in a state in which the toner container is oriented in the predetermined direction.

Structure Example A274

A toner container according to Structure Example A273, wherein the inner peripheral surface of the projection is cylindrical.

Structure Example A275

A toner container according to Structure Example A273, wherein the inner peripheral surface of the projection is constituted by a plurality of flat surfaces surrounding the central axis.

Structure Example A276

A toner container according to any one of Structure Examples A246-A275, wherein as the discharge portion is viewed in the direction of the central axis, the downward guide surface and the upward guide surface are provided at positions closer to the inner peripheral surface in the radial direction than to the opening.

Structure Example A277

A toner container according to Structure Example A276, wherein as the discharge portion is viewed in the direction of the central axis, a distance from the inner peripheral surface to the upward guide surface and a distance from the inner peripheral surface to the upward guide surface are not more than 30% a distance from the inner peripheral surface to the opening.

Structure Example A278

An image forming system (1000) comprising a toner container (100, 1050, 1051, 1052, 1060, 1070, 1080, 220, 2320, 23210, 2420, 2520, 2530, 520, 5120, 920, 10020, 1120) and an image forming apparatus (1) to which the toner container is detachably mountable, wherein the image forming apparatus includes a mounting portion (106, 206) to which the toner container is detachably mountable and which is provided with a rotatable guided member (114, 214), and wherein the toner container includes, an accommodating portion (101, 1015, 10151, 201, 2401, 501, 901) configured to accommodate toner, a discharge portion (102, 1025, 202, 2302, 23102, 2402A, 2502, 2503, 502, 5102, 902, 1002A, 1102) configured to be provided with an opening (**102*a*, 202*a*, 2402Ag, 2502*k*2, 2503*k*2, 502*a*, 902Bk, 10020**Be) for discharging the toner in the accommodating portion to an outside;

a rotatable member (103, 203, 903A, 1003) rotatable relative to the discharge portion about a central axis as a rotational axis, in a first rotational direction about the central axis and a second rotational direction opposed to the first rotational direction, and a projection (**102*b*, 1020*b*, 1021*b*, 1023*b*, 1024*b*, 1026*b*, 1027*b*, 1028*b*, 202*b*, 2302*b*, 23102*b*, 2402Bb, 2502*b*, 2503*b*, 502*b*, 5102*b*, 903Bg, 1003*b*, 1132*b*) provided below the opening of the discharge portion and having inner peripheral surface (102*b*1, 202*b*1, 202*b*10) facing inward in a radial direction of an imaginary circle centered on the central axis, when the toner container is oriented in a predetermined direction in which the central axis extends in a direction of gravity and at least a part of the discharge portion is below the accommodating portion, wherein the opening of the discharge portion is configured to face outward in the radial direction, wherein when the toner container is oriented in the predetermined direction, the projection has a downward guide surface (104*a*1, 104*b*1, 1041*b*1, 1042*a*1, 1043*a*1, 1043*b*1, 1044*a*1, 1046*a*1, 1047*a*1, 1048*a*1, 204*a*1, 204*a*2, 204*b*1, 204*b*2, 2304*a*1, 2304*b*1, 23104*a*1, 23104*b*1, 2604*b*1, 2604*a*2) facing downward and an upward guide surface facing upward outside of the inner peripheral surface and inside of the opening of the discharge portion in the radial direction, and an upward guide surface (104*a*2, 104*b*2, 1041*a*2, 1042*b*2, 1043*a*2, 1043*b*2, 1044*a*2, 1046*a*2, 1047*a*2, 1048*a*2, 204*a*3, 204*b*3, 2304*a*2, 2304*b*2, 23104*a*2, 23104*b*2, 2604*a*3**) facing upward, when the toner container is moved down along the central axis toward the mounting portion in a state in which the toner container is oriented in the predetermined direction, the downward guide surface is configured to guide the guided member so that the guided member is rotated about the central axis in the first rotational direction, and the upward guide surface is configured to guide the guided member so that the guided member is moved up after the guided member is rotated in the first rotational direction by the downward guide surface.

Structure Example A279

An image forming system according to Structure Example A278, wherein the rotatable member is provided outside the discharge portion in the radial direction.

Structure Example A280

An image forming system according to Structure Example A278 or A279, wherein the rotatable member is configured to be rotatable about the central axis between a close position for closing the opening and an open position for opening the opening, the rotatable member being provided with a rotatable member opening for exposing the opening of the discharge portion to an outside of the toner container.

Structure Example A281

An image forming system according to Structure Example A280, wherein a rotational direction of the rotatable member from the close position toward the open position is the first rotational direction.

Structure Example A282

An image forming system according to Structure Example A280 or A281, further comprising a seal for sealing between the rotatable member and the discharge portion when the rotatable member is in the close position.

Structure Example A283

An image forming system according to Structure Example A281 or A282, wherein the mounting portion includes a positioning portion projecting inward in the radial direction, and the discharge portion includes a positioned portion having a first opposing surface and a second opposing surface which extend in a direction perpendicular to the central axis on the outer surface extending in the direction of the central axis and which are opposed to each other with a gap therebetween, the positioned portion being configured to be engaged with the positioning portion in a state in which the toner container is mounted on the mounting portion, positioned portion, and wherein the positioned portion of the discharge portion is exposed through the rotatable member opening when the rotatable member is in the close position.

Structure Example A284

An image forming system according to any one of Structure Examples A280-A283, wherein the image forming apparatus includes an apparatus side shutter of a cylindrical shape having an open upper part and rotatable about the central axis, the apparatus side shutter being provided with an apparatus side shutter opening in a side surface portion of the apparatus side shutter extending along the central axis, and a projection projecting inward in the radial direction in a region of the apparatus side shutter side surface portion opposed to the apparatus side shutter opening in the radial direction, and wherein in a state in which the toner container is mounted on the mounting portion, the rotatable member is provided, in a rotatable member side surface portion extending along the central axis, with the rotatable member opening which is in fluid communication with the apparatus side shutter opening in the radial direction, and a recess recessed inward in the radial direction and engageable with the projection of the apparatus side shutter.

Structure Example A285

An image forming system according to Structure Example A284, wherein the guided member is disposed at a position closer to the central axis than the projection of the apparatus side shutter side surface portion of the apparatus side shutter in the radial direction is, and wherein the projection is closer to the central axis in the radial direction than the recess of the rotatable member is, as in the toner container is viewed in the direction of the central axis.

Structure Example A286

An image forming system according to Structure Example A284 or A285, wherein the guided member is below the apparatus side shutter opening of the apparatus side shutter in the direction of the central axis, and wherein the projection projects downward with respect to a lower the surface of the toner container, when the toner container is oriented in the predetermined direction.

Structure Example A287

An image forming system according to Structure Example A286, wherein the projection is configured to project downward from a bottom surface of the discharge portion, when the toner container is oriented in the predetermined direction, and wherein the projection projects downward beyond the bottom surface of the rotatable member through a hole provided in the bottom surface of the rotatable member.

Structure Example A288

An image forming system (1000) comprising a toner container (100, 1050, 1051, 1052, 1060, 1070, 1080, 220, 2320, 23210, 2420, 2520, 2530, 2820, 520, 5120, 920, 10020, 1120), and an image forming apparatus (1) to which the toner container is mountable, wherein the toner container includes, an accommodating portion (101, 1015, 10151, 201, 2401, 2801, 501, 901) configured to accommodate toner, a discharge portion (102, 1025, 202, 2302, 23102, 2402A, 2502, 2503, 2802, 502, 5102, 902, 1002A, 1102) configured to be provided with an opening (102*a*, 202*a*, 2402Ag, 2502*k*2, 2503*k*2, 2802*a*, 502*a*, 902Bk, 10020Be) for discharging the toner in the accommodating portion to an outside, and a projection (102*b*, 1020*b*, 1021*b*, 1023*b*, 1024*b*, 1026*b*, 1027*b*, 1028*b*, 202*b*, 2302*b*, 23102*b*, 2402Bb, 2502*b*, 2503*b*, 2802*b*, 502*b*, 5102*b*, 903Bg, 1003*b*, 1132*b*) which includes an inner peripheral surface (102*b*1, 202*b*1, 202*b*10) centered on the central axis, which is provided below the opening of the discharge portion, and which projects downward, when the toner container is oriented in a predetermined direction in which the central axis extends in a direction of gravity and at least a part of the discharge portion is below the accommodating portion, wherein the discharge portion is configured to face outward in a radial direction of an imaginary circle centered on the central axis, and wherein when the toner container is oriented in the predetermined direction, the projection has a downward guide surface (104*a*1, 104*b*1, 1041*b*1, 1042*a*1, 1043*a*1, 1043*b*1, 1044*a*1, 1046*a*1, 1047*a*1, 1048*a*1, 204*a*1, 204*a*2, 204*b*1, 204*b*2, 2304*a*1, 2304*b*1, 23104*a*1, 23104*b*1, 2604*b*1, 2604*a*2) facing downward outside of the inner peripheral surface and inside of the opening of the discharge portion in the radial direction, and an upward guide surface (104*a*2, 104*b*2, 1041*a*2, 1042*b*2, 1043*a*2, 1043*b*2, 1044*a*2, 1046*a*2, 1047*a*2, 1048*a*2, 204*a*3, 204*b*3, 2304*a*2, 2304*b*2, 23104*a*2, 23104*b*2, 2604*a*3) facing upward, and wherein the image forming apparatus includes a mounting portion to which the toner container is mountable and which is provided with a rotatable guided member (114, 214), wherein when the toner container is moved down along the central axis toward the mounting portion in a state in which the toner container is oriented in the predetermined direction, the downward guide surface is configured to guide the guided member so that the guided member is rotated in the first rotational about the central axis, and the upward guide surface is configured to guide the guided member so that the guided member is moved up after the guided member is rotated in the first rotational direction by the downward guide surface.

Structure Example A289

An image forming system according to any one of Structure Examples A278-A288, wherein the downward guide surface is configured to contact a contacted portion of the guided member to push the guided member so as to rotate the guided member in the first rotational direction, when the toner container is moved down along the central axis toward the mounting portion in a state in which the toner container is oriented in the predetermined direction.

Structure Example A290

An image forming system according to Structure Example A289, wherein the downward guide surface extends so as to go up as goes in the first rotational direction.

Structure Example A291

An image forming system according to any one of Structure Examples A278-A290, wherein the upward guide surface is configured to guide the guided member so that the guided member is moved up while it is rotated in the second rotational direction.

Structure Example A292

An image forming system according to any one of Structure Examples A278-A290, wherein the image forming apparatus includes an urging member for urging the guided member in a direction of rotating the guided member in a second rotational direction opposite to the first rotational direction, and wherein the upward guide surface is configured to guide the guided member so that the guided member is moved up while being rotated in the second rotational direction by an urging force of the urging member.

Structure Example A293

An image forming system according to Structure Example A291 or A292, wherein the upward guide surface extends so as to go up as goes in the second rotational direction.

Structure Example A294

An image forming system according to any one of Structure Examples A278-A293, wherein the guided member has a contact surface which is a downstream end surface in the second rotational direction opposite to the first rotational direction, and wherein the projection includes a contacted surface configured to stop rotation of the guided member in the second rotational direction by contacting the contact surface of the guided member rotated in the second rotational direction while being guided by the upward guide surface.

Structure Example A295

An image forming system according to Structure Example A294, wherein when the toner container is oriented in the predetermined direction, the contacted surface extends upward from a downstream end of the upward guide surface in the second rotational direction along the direction of the central axis and faces downstream side in the second rotational direction.

Structure Example A296

An image forming system according to Structure Example A262 or A263, wherein when the toner container is oriented in the predetermined direction, a cavity is provided right above the upward guide surface of the projection, a portion of the guided member provided with the contact surface is capable of entering the cavity, when the contact surface of the guided member contacts the contacted surface.

Structure Example A297

An image forming system according to any one of Structure Examples A278-A296, comprising a connecting portion, wherein when the toner container is oriented in the predetermined direction, the connecting portion connects the downstream end of the downward guide surface in the first rotational direction and an upstream end of the upward guide surface in the second rotational direction opposite to the first rotational direction with each other, the connecting portion being configured to guide the guided member so as to switch the rotational direction of the guided member from the first rotational direction to the second rotational direction.

Structure Example A298

An image forming system according to any one of Structure Examples A278-A297, wherein the downward guide surface includes a first downward guide surface and a second downward guide surface which face downward, wherein when the toner container is moved down in the direction of the central axis toward the mounting portion in a state in which the toner container is oriented in the predetermined direction, the first downward guide surface guides the guided member so that the guided member is rotated in the first rotational direction, and the second downward guide surface guides the guided member so that the guided member is further rotated in the first rotational direction after the guided member is guided by the first downward guide surface to rotate in the first rotational direction.

Structure Example A299

An image forming system according to Structure Example A298, wherein the guided member includes a first contacted portion and a second contacted portion which is provided at a position more away from the central axis in the radial direction than the first contacted portion is, wherein the first downward guide surface is configured to push the first contacted portion to rotate the guided member in the first rotational direction by contacting the first contacted portion, and wherein the second downward guide surface is configured to push the second contacted portion to further rotate the guided member in the first rotational direction by contacting the second contacted portion after the guided member is rotated by the first downward guide surface in the first rotational direction.

Structure Example A300

An image forming system according to Structure Example A298 or A299, wherein at least a part of the first downward guide surface is configured to be provided at a position which is closer to the central axis in the radial direction than the second downward guide surface is and which is different from at a position at which the second downward guide surface is provided in a circumferential direction of the imaginary circle.

Structure Example A301

An image forming system according to Structure Example A299, comprising a connecting portion, wherein when the toner container is oriented in the predetermined direction, the connecting portion connects a downstream end of the second downward guide surface in the first rotational direction and an upstream end of the upward guide surface in the second rotational direction with each other, the connecting portion being configured to guide the second contacted portion of the guided member so as to switch the rotational direction of the guided member from the first rotational direction to the second rotational direction.

Structure Example A302

An image forming system according to any one of Structure Examples A278-A301, wherein the guided member includes a first engaging claw extending upward, and a second engaging claw which extends upward and is provided at a position different from a position at which the first engaging claw is provided in a circumferential direction of the imaginary circle, wherein the projection includes a first projection configured to engage with the first engaging claw, and a second projection configured to engage with the second engaging claw, when the toner container is moved down along the central axis relative to the image forming apparatus in a state in which the toner container is oriented in the predetermined direction, and wherein the first projection has the upward guide surface, and the second projection has the downward guide surface.

Structure Example A303

An image forming system according to any one of Structure Examples A298-A301, wherein the guided member includes a first engaging claw extending upward, and a second engaging claw which extends upward and is provided at a position different from a position at which the first engaging claw is provided in a circumferential direction of the imaginary circle, wherein the projection includes a first projection configured to engage with the first engaging claw, and a second projection configured to engage with the second engaging claw, when the toner container is moved down along the central axis relative to the image forming apparatus in a state in which the toner container is oriented in the predetermined direction, and wherein when the upward guide surface is a first upward guide surface, the first projection has the first upward guide surface, the first downward guide surface and a second downward surface, the second projection has a second upward guide surface, a third downward guide surface and a fourth downward guide surface, and the second upward guide surface, the third downward guide surface and the fourth downward guide surface have shapes of 150-210 degree inclusive rotational symmetry, about the central axis, of the first upward guide surface, the first downward guide surface and the second downward surface, respectively.

Structure Example A304

An image forming system according to Structure Example A303, wherein the second upward guide surface, the third downward guide surface and the fourth downward surface have shapes of 180 degree rotational symmetry, about the central axis, of the first upward guide surface, the first downward guide surface and the second downward surface, respectively.

Structure Example A305

An image forming system according to any one of Structure Examples A278-A304, wherein the image forming apparatus includes a shaft portion extending upward along the central axis and supporting the guided member so that the guided member is rotatable about the central axis, wherein the inner peripheral surface of the projection is configured to engage with the shaft portion when the toner container is moved down along the central axis relative to the image forming apparatus in a state in which the toner container is oriented in the predetermined direction.

Structure Example A306

An image forming system according to Structure Example A305, wherein the inner peripheral surface of the projection is cylindrical.

Structure Example A307

An image forming system according to Structure Example A305, wherein the inner peripheral surface of the projection is constituted by a plurality of flat surfaces surrounding the central axis.

Structure Example A308

An image forming system according to any one of Structure Examples A278-A307, wherein as the discharge portion is viewed in the direction of the central axis, the downward guide surface and the upward guide surface are provided at positions closer to the inner peripheral surface in the radial direction than the opening.

Structure Example A309

An image forming system according to Structure Example A308, wherein as the discharge portion is viewed in the direction of the central axis, a distance from the inner peripheral surface to the upward guide surface and a distance from the inner peripheral surface to the downward guide surface are not more than 30% a distance from the inner peripheral surface to the opening.

Structure Example A310

An attachment (1090*b*, 2102A, 21102A, 2230) for being mounted to an image forming apparatus, the attachment comprising:

a projection having an inner peripheral surface with a center thereof on a central axis and projecting in a direction of the central axis outside the inner peripheral surface in a radial direction of an imaginary circle having a center on the central axis;

wherein when the attachment is oriented in a predetermined direction in which the central axis extends in a direction of gravity and the projection projects downward, the projection has an upward surface, and when a circumferential direction of the imaginary circle is a first circumferential direction, and a direction opposite to the first circumferential direction is a second circumferential direction, the upward surface extends so as to go up as goes in the second circumferential direction.

Structure Example A311

An attachment (1090*b*, 2102A, 21102A, 2230) for being mounted to an image forming apparatus, the attachment comprising:

a projection member (2202); and a rotatable member (2203) rotatable about a central axis as a rotational axis relative to the projection member, wherein the projection member has an inner peripheral surface (2202*b*1) facing inward in a radial direction of an imaginary circle centered on the central axis and a projection (2202*b*) projecting in a direction of the central axis outside the inner peripheral surface in the radial direction, wherein when the attachment is oriented in a predetermined direction in which the central axis extends in a direction of gravity and the projection projects downward, the projection member is supported by the rotatable member so that the projection projects downward with respect to a lower surface of the rotatable member, the projection has an upward surface (2204*a*3), and wherein when a circumferential direction of the imaginary circle is a first circumferential direction, and a direction opposite to the first circumferential direction is a second circumferential direction, the upward surface extends so as to go up as goes in the second circumferential direction.

Structure Example A312

An attachment according to Structure Example A311, wherein the rotatable member is provided, in an outer surface extending in the direction of the central axis, with a rotatable member opening, and a recess recessed inward in the radial direction, and the recess is provided on a side opposite from the rotatable member opening across the central axis.

Structure Example A313

An attachment according to Structure Example A312, wherein as the attachment is viewed in the direction of the central axis, the projection is at a position closer to the central axis in the radial direction than to the recess.

Structure Example A314

An attachment according to Structure Example A312 or A313, wherein the projection is inside a width of the rotation member opening in a direction perpendicular to the central axis, as in viewed in the radial direction.

Structure Example A315

An attachment according to any one of Structure Examples A310-A314, wherein the upward surface is configured to be exposed to an outside of the attachment.

Structure Example A316

An attachment according to any one of Structure Examples A310-A315, wherein when the attachment is oriented in the predetermined direction, a cavity is provided above the upward surface of the projection.

Structure Example A317

An attachment according to any one of Structure Examples A310-A313, wherein when the attachment is oriented in the predetermined direction, the projection has a downstream side end surface which extends upward along the direction of the central axis from a downstream end of the upward surface in the second circumferential direction and which faces downstream side in the first circumferential direction.

Structure Example A318

An attachment according to any one of Structure Examples A310-A314, wherein when the attachment is viewed in the radial direction in a state in which the attachment is oriented in the predetermined direction, the upward surface inclines with respect to the central axis by an angle not less than 30 degrees and not more than 60 degrees.

Structure Example A319

An attachment according to any one of Structure Examples A310-A318, wherein when the attachment is oriented in the predetermined direction, the projection has a downward surface facing downward and extending so as to go up as goes in the first circumferential direction, and at least a part of the upward surface is above at least a part of the downward surface.

Structure Example A320

An attachment according to Structure Example A319, wherein the downward surface overlaps the upward surface, as viewed in the direction of the central axis.

Structure Example A321

An attachment according to Structure Example A319 or A320, wherein the projection includes a connecting portion connecting a downstream end of the downward surface in the first circumferential direction and an upstream end of the upward surface in the second circumferential direction with each other.

Structure Example A322

An attachment according to any one of Structure Examples A319-A321, wherein when the attachment is viewed in the radial direction in a state in which the attachment is oriented in the predetermined direction, the downward surface inclines with respect to the central axis by an angle not less than 30 degrees and not more than 60 degrees.

Structure Example A323

An attachment according to any one of Structure Examples A319-A322, wherein when the attachment is viewed in the radial direction in a state in which the attachment is oriented in the predetermined direction, the upward surface is longer than the downward surface.

Structure Example A324

An attachment according to any one of Structure Examples A319-A323, wherein the projection includes a first projection and a second projection which is provided at a position different from a position at which the first position is provided in a circumferential direction of the imaginary circle, wherein the upward surface and the downward surface are a first upward surface and a second downward surface, respectively, wherein the first projection includes the first upward surface and the second downward surface, and wherein the second projection includes a second upward surface and a fourth downward surface.

Structure Example A325

An attachment according to Structure Example A324, wherein the second upward surface and the fourth downward surface have 150-210 degree inclusive rotational symmetry shapes of the first upward surface and the second downward surface, respectively.

Structure Example A326

An attachment according to any one of Structure Examples A319-A323, wherein the projection includes a first projection and a second projection which is provided at a position different from a position at which the first projection is provided in the circumferential direction, wherein the first projection includes the upward surface, and wherein the second projection includes the downward surface.

Structure Example A327

An attachment (2102A, 21102A, 2230) for mounting to an image forming apparatus, the attachment comprising:

a projection (2102Ab, 21102Ab, 2202*b*) having an inner peripheral surface (2102Ab1, 21102Ab1, 2202*b*1) centered on a central axis and projecting in a direction of the central axis outside the inner peripheral surface in a radial direction of an imaginary circle centered on the central axis, wherein when the attachment is oriented in a predetermined direction in which the central axis extends in a direction of gravity and the projection projects downward, the projection has a first downward surface (2104*a*1, 21104*a*1, 2204*a*1) and a second downward surface (2104*a*2, 21104*a*2, 2204*a*2) which face downward, and an upward surface (2104*a*3, 21104*a*3, 2204*a*3) which faces upward, wherein when a circumferential direction of the imaginary circle is a first circumferential direction, and a circumferential direction opposite to the first circumferential direction is a second circumferential direction, the first downward surface and the second downward surface extend so as to go up as go in the first circumferential direction, and at least a part of the first downward surface is at a position which is closer to the central axis in the radial direction than the second downward surface is and which is different from a position at which the second downward surface is provided in the circumferential direction, and at least a part of the upward surface is above at least a part of the second downward surface.

Structure Example A328

An attachment (1090*b*, 2102A, 21102A, 2230) for being mounted to an image forming apparatus, the attachment comprising:

a projection member (2202); a rotatable member (2203) rotatable about a central axis as a rotational axis relative to the projection member, wherein the projection member has an inner peripheral surface (2202*b*1) facing inward in a radial direction of an imaginary circle centered on the central axis and a projection (2202*b*) projecting in the direction of the central axis outside the inner peripheral surface in the radial direction, wherein when the attachment is oriented in a predetermined direction in which the central axis extends in a direction of gravity and the projection projects downward, the projection member is supported by the rotatable member so that the projection projects downward with respect to a lower surface of the rotatable member, the projection has a first downward surface (2204*a*1) and a second downward surface (2204*a*2) which face downward, and an upward surface (2204*a*3) which faces upward, when a circumferential direction of the imaginary circle is a first circumferential direction, and a circumferential direction opposite to the first circumferential direction is a second circumferential direction, the first downward surface and the second downward surface extend so as to go up as go in the first circumferential direction, and at least a part of the first downward surface is at a position which is closer to the central axis in the radial direction than the second downward surface is and which is different from a position at which the second downward surface is provided in the circumferential direction, and at least a part of the upward surface is above at least a part of the second downward surface.

Structure Example A329

An attachment according to Structure Example A328, wherein the rotatable member is provided, in an outer surface extending in the direction of the central axis, with a rotatable member opening, and a recess recessed inward in the radial direction, and wherein the recess is provided on a side opposite from the rotatable member opening across the central axis.

Structure Example A330

An attachment according to Structure Example A329, wherein as the attachment is viewed in the direction of the central axis, the projection is at a position closer to the central axis in the radial direction than to the recess.

Structure Example A331

An attachment according to Structure Example A329 or A330, wherein the projection is inside a width of the rotatable member opening in a direction perpendicular to the central axis, as viewed in the radial direction.

Structure Example A332

An attachment according to any one of Structure Examples A327-A331, wherein when the attachment is oriented in the predetermined direction, the upward surface extends so as to go up as goes in the second circumferential direction.

Structure Example A333

An attachment according to Structure Example A332, wherein when the attachment is viewed in the radial direction in a state in which the attachment is oriented in the predetermined direction, the upward surface inclines with respect to the central axis by an angle not less than 30 degrees and not more than 60 degrees.

Structure Example A334

An attachment according to any one of Structure Examples A327-A333, wherein the upward surface is configured to be exposed to an outside of the attachment.

Structure Example A335

An attachment according to any one of Structure Examples A327-A334, wherein when the attachment is oriented in the predetermined direction, a cavity is provided above the upward surface of the projection.

Structure Example A336

An attachment according to any one of Structure Examples A327-A335, wherein when the attachment is oriented in the predetermined direction, the projection has a downstream side end surface which extends upward along the direction of the central axis from a downstream end of the upward surface in the second circumferential direction and which faces downstream side in the first circumferential direction.

Structure Example A337

An attachment according to any one of Structure Examples A327-A336, wherein the second downward surface overlaps the upward surface as viewed in the direction of the central axis.

Structure Example A338

An attachment according to any one of Structure Examples A327-A337, wherein the projection includes a connecting portion connecting a downstream end of the second downward surface in the first circumferential direction and an upstream end of the upward surface in the second circumferential direction with each other.

Structure Example A339

An attachment according to any one of Structure Examples A327-A338, wherein the projection includes a first projection and a second projection which is provided at a position different from a position at which the first projection is provided in the circumferential direction, wherein the upward surface is a first upward surface, wherein the first projection includes the first upward surface, the first downward surface and the second downward surface, wherein the second projection includes a second upward surface, a third downward surface and a fourth downward surface, wherein when the attachment is oriented in the predetermined direction, the third downward surface and the fourth downward surface extend so as to go up as goes in the first circumferential direction, and at least a part of the third downward surface is at a position which is closer to the central axis in the radial direction than the fourth downward surface is and which is different from a position at which the fourth downward surface is provided in the circumferential direction, and at least a part of the second upward surface is above at least a part of the fourth downward surface.

Structure Example A340

An attachment according to Structure Example A339, wherein for the first projection, a part of the first downward surface is upstream of the second downward surface in the first circumferential direction, and wherein for the second projection, a part of the third downward surface is upstream of the fourth downward surface in the first circumferential direction.

Structure Example A341

An attachment according to any one of Structure Examples A327-A338, wherein when the upward surface is a first upward surface, the projection has a third downward surface, a fourth downward surface and a second upward surface having 150-210 degree inclusive rotational symmetrical shapes, about the central axis, of the first downward surface, the second downward surface and the first upward surface, respectively.

Structure Example A342

An attachment according to any one of Structure Examples A327-A338, wherein when the upward surface is a first upward surface, the projection has a third downward surface, a fourth downward surface and a second upward surface having 180 degree rotational symmetrical shapes, about the central axis, of the first downward surface, the second downward surface and the first upward surface, respectively.

Structure Example A343

An attachment according to any one of Structure Examples A327-A338, wherein the projection includes a first projection and a second projection which is provided at a position different from a position at which the first projection is provided in the circumferential direction, wherein the first projection has the upward surface and the second downward surface, and wherein the second projection has the first downward surface.

Structure Example A344

An attachment according to Structure Example A343, wherein the second projection is provided at a position diametrically opposite to the first projection.

Structure Example A345

An attachment according to any one of Structure Examples A327-A344, wherein when the attachment is viewed in the radial direction in a state in which the attachment is oriented in the predetermined direction, the downward surface inclines with respect to the central axis by an angle not less than 30 degrees and not more than 60 degrees.

Structure Example A346

An attachment according to any one of Structure Examples A327-A345, wherein when the attachment is viewed in the radial direction in a state in which the attachment is oriented in the predetermined direction, the second downward surface inclines with respect to the central axis by an angle not less than 30 degrees and not more than 60 degrees.

Structure Example A347

An attachment according to any one of Structure Examples A327-A346, wherein when the attachment is viewed in the radial direction in a state in which the attachment is oriented in the predetermined direction, the second downward surface is longer than the first downward surface.

Structure Example A348

An attachment according to any one of Structure Examples A327-A347, wherein when the attachment is viewed in the radial direction in a state in which the attachment is oriented in the predetermined direction, the upward surface is longer than the first downward surface.

Structure Example A349

An attachment according to any one of Structure Examples A327-A348, wherein when the attachment is viewed in the radial direction in a state in which the attachment is oriented in the predetermined direction, the upward surface is longer than the second downward surface.

Structure Example A350

An attachment (1090*b*, 2102A, 21102A, 2230) for being mounting to an image forming apparatus, the attachment comprising:

a projection (2102Ab, 21102Ab, 2202*b*) having an inner peripheral surface (2102Ab1, 21102Ab1, 2202*b*1) centered on a central axis and projecting in a direction of the central axis outside the inner peripheral surface in a radial direction of an imaginary circle centered on the central axis;

wherein when the attachment is oriented in a predetermined direction in which the central axis extends in a direction of gravity and the projection projects downward, the projection has a downward guide surface (**1049*a*1, 2104*a*1, 2104*a*2, 21104*a*1, 21104*a*2, 2204*a*1, 2204*a*2) facing downward, and an upward guide surface (1049*a*2, 2104*a*3, 21104*a*3, 2204*a*3**) facing upward, at least a part of the upward guide surface being above at least a part of the downward guide surface.

Structure Example A351

An attachment (2230) for being mounted to an image forming apparatus, the attachment comprising:

a projection member (2202); a rotatable member (2203) rotatable about a central axis as a rotational axis relative to the projection member, wherein the projection member has an inner peripheral surface (**2202*b*1) facing inward in a radial direction of an imaginary circle centered on the central axis and a projection (2202*b*) projecting in the direction of the central axis outside the inner peripheral surface in the radial direction, and wherein when the attachment is oriented in a predetermined direction in which the central axis extends in a direction of gravity and the projection projects downward, the projection member is supported by the rotatable member so that the projection projects downward with respect to a lower surface of the rotatable member, the projection has a downward guide surface (2204*a*1, 2204*a*2) facing downward, and an upward guide surface (2204*a*3**) facing upward, at least a part of the upward guide surface being above at least a part of the downward guide.

Structure Example A352

An attachment according to Structure Example A351, wherein the rotatable member is provided, in an outer surface extending in the direction of the central axis, with a rotatable member opening, and a recess recessed inward in the radial direction, and wherein the recess is provided on a side opposite from the rotatable member opening across the central axis.

Structure Example A353

An attachment according to Structure Example A352, wherein as the attachment is viewed in the direction of the central axis, the projection is at a position closer to the central axis in the radial direction than to the recess.

Structure Example A354

An attachment according to Structure Example A352 or A353, wherein the projection is inside a width of the rotation member opening in a direction perpendicular to the central axis, as in viewed in the radial direction.

Structure Example A355

An attachment according to any one of Structure Examples A350-A354, wherein the downward guide surface is a push surface.

Structure Example A356

An attachment according to Structure Example A350 or A355, wherein the upward guide surface is configured to be exposed to an outside of the attachment.

Structure Example A357

An attachment according to any one of Structure Examples A350-A356, wherein when the attachment is oriented in the predetermined direction, a cavity is provided above the upward guide surface of the projection.

Structure Example A358

An attachment according to any one of Structure Examples A350-A357, wherein when the attachment is oriented in the predetermined direction, a circumferential direction of the imaginary circle is a first circumferential direction, and a circumferential direction opposed to the first circumferential direction is a second circumferential direction, the downward guide surface is configured to extend so as to go up as goes in the first circumferential direction, and the upward guide surface is configured to go up as goes in the second circumferential direction.

Structure Example A359

An attachment according to Structure Example A358, wherein when the attachment is oriented in the predetermined direction, the projection includes a connecting portion connecting a downstream end of the downward guide surface in the first circumferential direction and an upstream end of the upward guide surface in the second circumferential direction with each other.

Structure Example A360

An attachment according to Structure Example A358 or A359, wherein when the attachment is oriented in the predetermined direction, the projection has a contacted surface which extends upward in the direction of the central axis from the downstream end of the upward guide surface in the second circumferential direction and which faces a downstream side in the first circumferential direction.

Structure Example A361

An attachment according to any one of Structure Examples A358-A360, wherein the downward guide surface includes a first downward guide surface and a second downward guide surface which face downward, wherein when the attachment is oriented in the predetermined direction, at least a part of the first downward guide surface is provided at a position different from a position at which the second downward guide surface is provided in the circumferential direction of the imaginary circle.

Structure Example A362

An attachment according to Structure Example A361, wherein when the attachment is oriented in the predetermined direction, the projection includes a connecting portion connecting a downstream end of the second downward guide surface in the first circumferential direction and an upstream end of the upward guide surface in the second circumferential direction with each other.

Structure Example A363

An attachment according to Structure Example A361 or A362, wherein the second downward guide surface overlaps the upward guide surface, as is viewed in the direction of the central axis.

Structure Example A364

An attachment according to any one of Structure Examples A350-A363, wherein the projection includes a first projection and a second projection which is provided at a position different from a position at which the first position is provided in a circumferential direction of the imaginary circle, wherein the first projection has the upward guide surface and the downward guide surface, and wherein the second projection has a 150-210 degree inclusive rotation symmetry shape of the first projection about the central axis.

Structure Example A365

An attachment according to any one of Structure Examples A350-A363, wherein the projection includes a first projection and a second projection which is provided at a position different from a position at which the first position is provided in a circumferential direction of the imaginary circle, wherein the first projection has the upward guide surface, and wherein the second projection has the downward guide surface.

Structure Example A366

An attachment according to Structure Example A361, wherein the projection includes a first projection and a second projection which is provided at a position different from a position at which the first projection is provided in a circumferential direction of the imaginary circle, wherein the upward guide surface is a first upward guide surface, the first projection has the first upward guide surface, the first downward guide surface and a second downward surface, and the second projection has a second upward guide surface, a third downward guide surface and a fourth downward guide, and the second upward guide surface, the third downward guide surface and the fourth downward guide surface have shapes of 150-210 degree inclusive rotational symmetry, about the central axis, of the first upward guide surface, the first downward guide surface and the second downward surface, respectively.

Structure Example A367

An attachment (**1090*b*, 2102A, 21102A, 2230) mountable to a mounting portion (106, 206) of an image forming apparatus, the mounting portion including a rotatable guided member (114, 214**), the attachment comprising:

a projection (2102Ab, 21102Ab, **2202*b*) having an inner peripheral surface (2102Ab1, 21102Ab1, 2202*b*1**) centered on a central axis and projecting in a direction of the central axis outside the inner peripheral surface in a radial direction of an imaginary circle having a center on the central axis;

wherein when the attachment is oriented in a predetermined direction in which the central axis extends in a direction of gravity and the projection projects downward, the projection has a downward guide surface (**1049*a*1, 2104*a*1, 2104*a*2, 21104*a*1, 21104*a*2, 2204*a*1, 2204*a*2) facing downward, and an upward guide surface (1049*a*2, 2104*a*3, 21104*a*3, 2204*a*3**) facing upward, at least a part of the upward guide being above at least a part of the downward guide surface, wherein when the attachment is moved downward along the central axis in a state in which the attachment is oriented in the predetermined direction, the projection is configured such that the downward guide surface guides the guided member so that the guided member is rotated in a first rotational direction about the central axis, and such that the upward guide surface guides the guided member so that the guided member is moved upward after the guided member is rotated in the first rotational direction.

Structure Example A368

An attachment (2230) mountable to a mounting portion (106, 206) of an image forming apparatus, the mounting portion including a rotatable guided member (114, 214), the attachment comprising:

a projection member (2202); a rotatable member (2203) rotatable about a central axis as a rotational axis relative to the projection member, wherein the projection member has an inner peripheral surface (**2202*b*1) facing inward in a radial direction of an imaginary circle centered on the central axis and a projection (2202*b*) projecting in the direction of the central axis outside the inner peripheral surface in the radial direction, wherein when the attachment is oriented in a predetermined direction in which the central axis extends in a direction of gravity and the projection projects downward, the projection member is supported by the rotatable member so that the projection projects downward with respect to a lower surface of the rotatable member, the projection has a downward guide surface (2204*a*1, 2204*a*2) facing downward, and an upward guide surface (2204*a*3**) facing upward, at least a part of the upward guide surface being above at least a part of the downward guide surface, wherein when the attachment is moved downward along the central axis in a state in which the attachment is oriented in the predetermined direction, the projection is configured such that the downward guide surface guides the guided member so that the guided member is rotated in a first rotational direction about the central axis, and such that the upward guide surface guides the guided member so that the guided member is moved upward after the guided member is rotated in the first rotational direction.

Structure Example A369

An attachment according to Structure Example A368, wherein the image forming apparatus includes an apparatus side shutter of a cylindrical shape having an open upper part and rotatable about the central axis, the apparatus side shutter being provided with an apparatus side shutter opening in a side surface portion of the apparatus side shutter extending along the central axis, and a projection projecting inward in the radial direction in a region of the apparatus side shutter side surface portion opposed to the apparatus side shutter opening in the radial direction, wherein in a state in which the attachment is mounted on the mounting portion, the rotatable member is provided, in a rotatable member side surface portion extending along the central axis, with the rotatable member opening which is in fluid communication with the apparatus side shutter opening in the radial direction, and a recess recessed inward in the radial direction and engageable with the projection of the apparatus side shutter, Structure Example A370

An attachment according to Structure Example 369, wherein the guided member is disposed at a position closer to the central axis than the projection of the apparatus side shutter side surface portion of the apparatus side shutter is in the radial direction, and wherein as the attachment is viewed in the direction of the central axis, the projection is closer to the central axis in the radial direction than to the recess of the rotatable member.

Structure Example A371

An attachment according to any one of Structure Examples A367-A370, wherein the downward guide surface is configured to contact a contacted portion of the guided member to push the guided member so as to rotate the guided member in the first rotational direction, when the attachment is moved down along the central axis toward the mounting portion in a state in which the attachment is oriented in the predetermined direction.

Structure Example A372

An attachment according to Structure Example A371, wherein the downward guide surface extends so as to go up as goes in the first rotational direction.

Structure Example A373

An attachment according to any one of Structure Examples A368-A372, wherein the upward guide surface is configured to guide the guided member so that the guided member is moved up while it is rotated in the second rotational direction.

Structure Example A374

An attachment according to any one of Structure Examples A368-A372, wherein the image forming apparatus includes an urging member for urging the guided member in a direction of rotating the guided member in a second rotational direction opposite to the first rotational direction, and wherein the upward guide surface is configured to guide the guided member so that the guided member is moved up while being rotated in the second rotational direction by an urging force of the urging member.

Structure Example A375

An attachment according to Structure Example A373 or A374, wherein the upward guide surface extends so as to go up as goes in the second rotational direction.

Structure Example A376

An attachment according to Structure Example A367 or A368, wherein the guided member has a contact surface which is a downstream end surface in the second rotational direction opposite to the first rotational direction, and wherein the projection includes a contacted surface configured to stop rotation of the guided member in the second rotational direction by contacting the contact surface of the guided member rotated in the second rotational direction while being guided by the upward guide surface.

Structure Example A377

An attachment according to Structure Example A376, wherein when the attachment is oriented in the predetermined direction, the contacted surface extends upward from a downstream end of the upward guide surface in the second rotational direction along the direction of the central axis and faces downstream side in the second rotational direction.

Structure Example A378

An attachment according to Structure Example A376 or A377, wherein when the attachment is oriented in the predetermined direction, a cavity is provided right above the upward guide surface of the projection, wherein a portion of the guided member provided with the contact surface is capable of entering the cavity, when the contact surface of the guided member contacts the contacted surface.

Structure Example A379

An attachment according to Structure Example A367 or A368, comprising a connecting portion, wherein when the attachment is oriented in the predetermined direction, the connecting portion connects the downstream end of the downward guide surface in the first rotational direction and an upstream end of the upward guide surface in the second rotational direction opposite to the first rotational direction with each other, the connecting portion being configured to guide the guided member so as to switch the rotational direction of the guided member from the first rotational direction to the second rotational direction.

Structure Example A380

An attachment according to any one of Structure Examples A367-A379, wherein the downward guide surface includes a first downward guide surface and a second downward guide surface which face downward, wherein when the attachment is moved down in the direction of the central axis toward the mounting portion in a state in which the attachment is oriented in the predetermined direction, the first downward guide surface guides the guided member so that the guided member is rotated in the first rotational direction, and the second downward guide surface guides the guided member so that the guided member is further rotated in the first rotational direction after the guided member is guided by the first downward guide surface to be rotated in the first rotational direction.

Structure Example A381

An attachment according to Structure Example A380, wherein the guided member includes a first contacted portion, and a second contacted portion provided at a position more away from the central axis in the radial direction than the first contacted portion is, wherein the first downward guide surface is configured to push the first contacted portion to rotate the guided member in the first rotational direction by contacting the first contacted portion, wherein the second downward guide surface is configured to push the second contacted portion to further rotate the guided member in the first rotational direction by contacting the second contacted portion after the guided member is rotated by the first downward guide surface in the first rotational direction.

Structure Example A382

An attachment according to Structure Example A380 or A381, wherein at least a part of the first downward guide surface at a position which is closer to the central axis in the radial direction than the second downward guide surface is and which is different from a position at which the second downward guide surface is provided in a circumferential direction of the imaginary circle.

Structure Example A383

An attachment according to Structure Example A381, comprising a connecting portion, wherein when the attachment is oriented in the predetermined direction, the connecting portion connects a downstream end of the second downward guide surface in the first rotational direction and an upstream end of the upward guide surface in the second rotational direction opposite to the first rotational direction with each other, the connecting portion being configured to guide the second contacted portion of the guided member so as to switch the rotational direction of the guided member from the first rotational direction to the second rotational direction.

Structure Example A384

An attachment according to any one of Structure Examples A367-A383, wherein the guided member includes a first engaging claw extending upward, and a second engaging claw which extends upward and is provided at a position different from a position at which the first engaging claw is provided in a circumferential direction of the imaginary circle, wherein the projection includes a first projection configured to engage with the first engaging claw and a second projection configured to engage with the second engaging claw, when the attachment is moved down along the central axis relative to the image forming apparatus in a state in which the attachment is oriented in the predetermined direction, wherein the first projection has the upward guide surface, and wherein the second projection has the downward guide surface.

Structure Example A385

An attachment according to any one of Structure Examples A380-A383, wherein the guided member includes a first engaging claw extending upward, and a second engaging claw which extends upward and is provided at a position different from a position at which the first engaging claw is provided in a circumferential direction of the imaginary circle, wherein the projection includes a first projection configured to engage with the first engaging claw and a second projection configured to engage with the second engaging claw, when the attachment is moved down along the central axis relative to the image forming apparatus in a state in which the attachment is oriented in the predetermined direction, wherein when the upward guide surface is a first upward guide surface, the first projection has the first upward guide surface, the first downward guide surface and a second downward surface, the second projection has a second upward guide surface, a third downward guide surface and a fourth downward guide surface, and the second upward guide surface, the third downward guide surface and the fourth downward guide surface have shapes of 150-210 degree inclusive rotational symmetry, about the central axis, of the first upward guide surface, the first downward guide surface and the second downward surface, respectively.

Structure Example A386

An attachment according to Structure Example A385, wherein the second upward guide surface, the third downward guide surface and a fourth downward surface have shapes of 180 degree rotational symmetry, about the central axis, of the first upward guide surface, the first downward guide surface and the second downward surface, respectively.

Structure Example A387

An attachment according to any one of Structure Examples A367-A386, wherein the image forming apparatus includes a shaft portion extending upward along the central axis and supporting the guided member so as to be rotatable about the central axis, wherein the inner peripheral surface of the projection is configured to engage with the shaft portion when the attachment is moved down along the central axis relative to the image forming apparatus in a state in which the attachment is oriented in the predetermined direction.

Structure Example A388

An attachment according to Structure Example A387, wherein the inner peripheral surface of the projection is cylindrical.

Structure Example A389

An attachment according to Structure Example A387, wherein the inner peripheral surface of the projection is constituted by a plurality of flat surfaces surrounding the central axis.

Structure Example A390

A mounting kit comprising:
an accommodating portion configured to accommodate toner;
a discharge portion configured to be provided with an opening for discharging the toner in the accommodating portion to an outside, the discharge portion and the accommodating portion being arranged in a first direction, the mounting kit comprising;
a toner container configured such that the opening faces in a second direction crossing the first direction; and
an attachment according to any one of Structure Examples A313-A389.

Structure Example A391

A mounting kit according to Structure Example A390, wherein when the toner container is oriented in a predetermined direction in which at least a part of the discharge portion is below the accommodating portion and the first direction is a direction of gravity,
the attachment is configured to be attached to a bottom surface of the toner container.

Structure Example A392

A mounting kit according to Structure Example A390, wherein when the toner container is oriented in a predetermined direction in which at least a part of the discharge portion is below the accommodating portion and the first direction is a direction of gravity,
the bottom surface of the toner container is provided with a recess to receive a part of the attachment.

Structure Example A393

An image forming system (1000) comprising an image forming apparatus (1), an attachment (1090*b*, 2102A, 21102A, 2230) mountable to the image forming apparatus,
wherein the image forming apparatus includes a mounting portion (106, 206) to which the attachment is mountable, the mounting portion including a rotatable guided member (114, 214), and
wherein the attachment has an inner peripheral surface (2102Ab1, 21102Ab1, 2202*b*1) centered on the central axis, the attachment including a projection (2102Ab, 21102Ab, 2202*b*) projecting in a direction of the central axis outside of the inner peripheral surface in a radial direction of an imaginary circle centered on the central axis, and
wherein when the attachment is oriented in a predetermined direction in which the central axis extends in a direction of gravity and the projection projecting downward,
the projection has a downward guide surface (1049*a*1, 2104*a*1, 2104*a*2, 21104*a*1, 21104*a*2, 2204*a*1, 2204*a*2) facing downward, and an upward guide surface (1049*a*2, 2104*a*3, 21104*a*3, 2204*a*3) facing upward, at least a part of the upward guide surface being above at least a part of the downward guide surface,
wherein when the attachment is moved downward along the central axis toward the mounting portion in a state in which the attachment is oriented in the predetermined direction,
the downward guide surface is configured to guide the guided member so that the guided member is rotated in the first rotational about the central axis, and
the upward guide surface is configured to guide the guided member so that the guided member is moved up after the guided member is rotated in the first rotational direction by the downward guide surface.

Structure Example A394

An image forming system (1000) comprising an image forming apparatus (1), and an attachment (2230) mountable to the image forming apparatus,
wherein the image forming apparatus includes a mounting portion (106, 206) to which the attachment is mountable, the mounting portion including a rotatable guided member (114, 214), and
wherein the attachment includes a projection member (2202), a rotatable member (2203) rotatable about a central axis as a rotational axis relative to the projection member,
wherein the projection member has an inner peripheral surface (2202*b*1) facing inward in a radial direction of an imaginary circle centered on the central axis and a projection (2202*b*) projecting in the direction of the central axis outside the inner peripheral surface in the radial direction,
wherein when the attachment is oriented in a predetermined direction in which the central axis extends in a direction of gravity and the projection projects downward,
the projection member is supported by the rotatable member so that the projection projects downward with respect to a lower surface of the rotatable member,
the projection has a downward guide surface (1049*a*1, 2104*a*1, 2104*a*2, 21104*a*1, 21104*a*2, 2204*a*1, 2204*a*2) facing downward, and an upward guide surface (1049*a*2, 2104*a*3, 21104*a*3, 2204*a*3) facing upward, at least a part of the upward guide surface being above at least a part of the downward guide surface, and
wherein when the attachment is moved downward along the central axis in a state in which the attachment is oriented in the predetermined direction,
the projection is configured such that the downward guide surface guides the guided member so that the guided member is rotated in a first rotational direction about the central axis, and such that the upward guide surface guides the guided member so that the guided member is moved upward after the guided member is rotated in the first rotational direction.

Structure Example A395

An image forming system according to Structure Example A394, wherein the image forming apparatus includes an apparatus side shutter of a cylindrical shape having an open upper part and rotatable about the central axis, the apparatus side shutter being provided with an apparatus side shutter opening in a side surface portion of the apparatus side shutter extending along the central axis, and a projection projecting inward in the radial direction in a region of the apparatus side shutter side surface portion opposed to the apparatus side shutter opening in the radial direction, wherein in a state in which the attachment is mounted on the mounting portion, the rotatable member is provided, in a rotatable member side surface portion extending along the central axis, with the rotatable member opening which is in fluid communication with the apparatus side shutter opening in the radial direction, and a recess recessed inward in the radial direction and engageable with the projection of the apparatus side shutter.

Structure Example A396

An image forming system according to Structure Example A395, wherein the guided member is disposed at a position closer to the central axis than the projection of the apparatus side shutter side surface portion of the apparatus side shutter is in the radial direction, and wherein as the attachment is viewed in the direction of the central axis, the projection is closer to the central axis in the radial direction than to the recess of the rotatable member.

Structure Example A397

An image forming system according to any one of Structure Examples A393-A396, wherein the downward guide surface is configured to contact a contacted portion of the guided member to push the guided member so as to rotate the guided member in the first rotational direction, when the attachment is moved down along the central axis toward the mounting portion in a state in which the attachment is oriented in the predetermined direction.

Structure Example A398

An image forming system according to Structure Example A397, wherein the downward guide surface extends so as to go up as goes in the first rotational direction.

Structure Example A399

An image forming system according to any one of Structure Examples A393-A398, wherein the upward guide surface is configured to guide the guided member so that the guided member is moved up while it is rotated in the second rotational direction.

Structure Example A400

An image forming system according to any one of Structure Examples A393-A398, wherein the image forming apparatus includes an urging member for urging the guided member in a direction of rotating the guided member in a second rotational direction opposite to the first rotational direction, and wherein the upward guide surface is configured to guide the guided member so that the guided member is moved up while being rotated in the second rotational direction by an urging force of the urging member.

Structure Example A401

An image forming system according to Structure Example A399 or A400, wherein the upward guide surface extends so as to go up as goes in the second rotational direction.

Structure Example A402

An image forming system according to any one of Structure Examples A393-A401, wherein the guided member has a contact surface which is a downstream end surface in the second rotational direction opposite to the first rotational direction, and wherein the projection includes a contacted surface configured to stop rotation of the guided member in the second rotational direction by contacting the contact surface of the guided member rotated in the second rotational direction while being guided by the upward guide surface.

Structure Example A403

An image forming system according to Structure Example A402, wherein when the attachment is oriented in the predetermined direction, the contacted surface extends upward from a downstream end of the upward guide surface in the second rotational direction along the direction of the central axis and faces downstream side in the second rotational direction.

Structure Example A404

An image forming system according to Structure Example A402 or A403, wherein when the attachment is oriented in the predetermined direction, a cavity is provided right above the upward guide surface of the projection, wherein a portion of the guided member provided with the contact surface is capable of enter the cavity, when the contact surface of the guided member contacts the contacted surface.

Structure Example A405

An image forming system according to any one of Structure Examples A393-A404, comprising a connecting portion, wherein when the attachment is oriented in the predetermined direction, the connecting portion connects the downstream end of the downward guide surface in the first rotational direction and an upstream end of the upward guide surface in the second rotational direction opposite to the first rotational direction with each other, the connecting portion being configured to guide the guided member so as to switch the rotational direction of the guided member from the first rotational direction to the second rotational direction.

Structure Example A406

An image forming system according to any one of Structure Examples A393-A405, wherein the downward guide surface includes a first downward guide surface and a second downward guide surface which face downward, wherein when the attachment is moved down in the direction of the central axis toward the mounting portion in a state in which the attachment is oriented in the predetermined direction, the first downward guide surface guides the guided member so that the guided member is rotated in the first rotational direction, and the second downward guide surface guides the guided member so that the guided member further is rotated in the first rotational direction after the guided member is guided by the first downward guide surface to be rotated in the first rotational direction.

Structure Example A407

An image forming system according to Structure Example A406, wherein the guided member includes a first contacted portion and a second contacted portion which is provided at a position more away from the central axis in the radial direction than the first contacted portion is, wherein the first downward guide surface is configured to push the first contacted portion to rotate the guided member in the first rotational direction by contacting the first contacted portion, wherein the second downward guide surface is configured to push the second contacted portion to further rotate the guided member in the first rotational direction by contacting the second contacted portion after the guided member is rotated by the first downward guide surface in the first rotational direction.

Structure Example A408

An image forming system according to Structure Example A406 or A407, wherein at least a part of the first downward guide surface is provided at a position which is closer to the central axis in the radial direction than the second downward guide surface is and which is different from a position at which the second downward guide surface is provided in a circumferential direction of the imaginary circle.

Structure Example A409

An image forming system according to Structure Example A407, comprising a connecting portion, wherein when the attachment is oriented in the predetermined direction, the connecting portion connects a downstream end of the second downward guide surface in the first rotational direction and an upstream end of the upward guide surface in the second rotational direction opposite to the first rotational direction with each other, the connecting portion being configured to guide the second contacted portion of the guided member so as to switch the rotational direction of the guided member from the first rotational direction to the second rotational direction.

Structure Example A410

An image forming system according to any one of Structure Examples A393-A408, wherein the guided member includes a first engaging claw extending upward and a second engaging claw which extends upward which is provided at a position different, in a circumferential direction of the imaginary circle, from at a position at which the first engaging claw is provided, wherein the projection includes a first projection configured to engage with the first engaging claw and a second projection configured to engage with the second engaging claw, when the attachment is moved down along the central axis relative to the image forming apparatus in a state in which the attachment is oriented in the predetermined direction, wherein the first projection has the upward guide surface, wherein the second projection has the downward guide surface.

Structure Example A411

An image forming system according to any one of Structure Examples A406-A408, wherein the guided member includes a first engaging claw extending upward, and a second engaging claw which extends upward and is provided at a position different, in a circumferential direction of the imaginary circle, from a position at which the first engaging claw is provided, wherein the projection includes a first projection configured to engage with the first engaging claw and a second projection configured to engage with the second engaging claw, when the attachment is moved down along the central axis relative to the image forming apparatus in a state in which the attachment is oriented in the predetermined direction, wherein the upward guide surface is a first upward guide surface, the first projection has the first upward guide surface and the first downward guide surface and a second downward surface, the second projection has a second upward guide surface, a third downward guide surface and a fourth downward guide surface, and the second upward guide surface, the third downward guide surface and the fourth downward guide surface have shapes of 150-210 degree inclusive rotational symmetry, about the central axis, of the first upward guide surface, the first downward guide surface and the second downward surface, respectively.

Structure Example A412

An image forming system according to Structure Example A411, wherein the second upward guide surface, the third downward guide surface and a fourth downward surface have shapes of 180 degree rotational symmetry, about the central axis, of the first upward guide surface, the first downward guide surface and the second downward surface, respectively.

Structure Example A413

An image forming system according to any one of Structure Examples A393-A412, wherein the image forming apparatus includes a shaft portion extending upward along the central axis and supporting the guided member so as to be rotatable about the central axis, and wherein the inner peripheral surface of the projection is configured to engage with the shaft portion when the attachment is moved down along the central axis relative to the image forming apparatus in a state in which the attachment is oriented in the predetermined direction.

Structure Example A414

An image forming system according to Structure Example A413, wherein the inner peripheral surface of the projection is cylindrical.

Structure Example A415

An image forming system according to Structure Example A413, wherein the inner peripheral surface of the projection is constituted by a plurality of flat surfaces surrounding the central axis.

Structure Example A416

A method of use of an attachment (1090*b*, 2102A, 21102A, 2230) to be mounted to an image forming apparatus (1), wherein the image forming apparatus includes a main assembly accommodating portion (36) for accommodating toner, and a mounting portion (106, 206) for mounting the attachment, the mounting portion including, a frame (107, 117, 207, 217) provided with a frame opening (117*a*, 217*a*) in fluid communication with the main assembly accommodating portion, an apparatus side shutter (109, 209) provided with a rotation restricted portion (109*c*, 209*c*) and an apparatus side shutter (109*a*, 209*a*), the apparatus side shutter is rotatable about a rotational axis between a non-fluid-communication position in which the apparatus side shutter opening is not in fluid communication with the frame opening and a fluid communication position in which the apparatus side shutter opening is in fluid communication with the frame opening, a restricting member (113, 213) including a rotation restriction portion (113*c*, 213*c*) movable in a direction along the rotational axis between a restriction position in which the rotation restriction portion engages with the rotation restricted portion of the apparatus side shutter to restrict rotation of the apparatus side shutter from the non-fluid-communication position to the fluid communication position, and a release position which is above the restriction position and in which restriction against the rotation of the apparatus side shutter from non-fluid-communication position to the fluid communication position is released, a release member (114, 214) including a contacted portion (214*e*A, 214*e*B) and rotatable about the rotational axis in a first rotational direction and a second rotational direction opposite to the first rotational direction, the release member being movable upward with the restricting member so as to move the restricting member from the restriction position to the release position, and an urging member urging the release member in a direction of moving the release member in the second rotational direction, a rise restriction portion (110*e*, 210*e*) for restricting upward movement of the release member, wherein the attachment includes a projection (2102Ab, 21102Ab, 2202*b*) having an inner peripheral surface (2102Ab1, 21102Ab1, 2202*b*1) centered on a central axis, and a projection (2102Ab, 21102Ab, 2202*b*) projecting in a direction of the central axis outside the inner peripheral surface in a radial direction of an imaginary circle centered on the central axis, wherein when the attachment is oriented in a predetermined direction in which the central axis extends in a direction of gravity and the projection projects downward, the projection has a downward surface (1049*a*1, 2104*a*1, 2104*a*2, 21104*a*1, 21104*a*2, 2204*a*1, 2204*a*2) facing downward, and an upward surface (1049*a*2, 2104*a*3, 21104*a*3, 2204*a*3) facing upward, at lease a part of the upward surface being above at lease a part of the downward surface, the method comprising:

a first step of moving the attachment downward toward the mounting portion along the central axis in a state in which the attachment is oriented in the predetermined direction to bring the downward surface into contact with the contacted portion of the release member so as to rotate the release member in the first rotational direction against an urging force of the urging member to a rise restriction release region in which upward movement of the release member is not restricted by the rise restriction portion, and a second step of guiding, after the first step, the contacted portion of the release member by the upward surface so as to move the release member upward while being rotated in the second rotational direction by the urging force.

Structure Example A417

An using method according to Structure Example A416, wherein the apparatus side shutter includes a shaft portion centered on the rotational axis and extending upward along rotational axis, and the inner peripheral surface of the attachment is engaged with the shaft portion of the apparatus side shutter in the first step.

Structure Example A418

A method of use according to Structure Example A416 or A417, wherein the attachment includes a projection member having the projection, and a rotatable member rotatable relative to the projection member about the central axis, the rotatable member being provided with a recess recessed inward in the radial direction in a rotatable member side surface portion extending along rotational axis, wherein the apparatus side shutter includes a projection projecting inward in the radial direction on an inner peripheral surface of a side surface portion of the apparatus side shutter extending along the rotational axis, and wherein the first step includes engaging the recess of the rotatable member with the projection of the apparatus side shutter.

Structure Example A419

A method of use according to any one of Structure Examples A416-A418, further comprising a third step of mounting the toner container containing the toner to the mounting portion after the attachment is mounted on the mounting portion.

Structure Example A420

A method of releasing rotation restriction on a shutter of an image forming apparatus, wherein the image forming apparatus includes a main assembly accommodating portion (36) for accommodating toner, and a mounting portion (106, 206) for mounting a toner container (100, 1050, 1051, 1052, 1060, 1070, 1080, 1090, 220, 2120, 2220, 2320, 23210, 2420, 2520, 2530, 2820, 320, 3220, 520, 5120, 620, 720, 7120, 7220, 7320, 820, 920, 10020, 1120), wherein the mounting portion includes, a frame (107, 117, 207, 217) provided with a frame opening (117*a*, 217*a*) in fluid communication with the main assembly accommodating portion, a shutter (109, 209) provided with a rotation restricted portion (109*c*, 209*c*) and a shutter opening (109*a*, 209*a*) and rotatable about a rotational axis between a non-fluid-communication position in which the shutter opening is not in fluid communication with the frame opening and a fluid communication position in which the shutter opening is in fluid communication with the frame opening, a restricting member (113, 213) including a rotation restriction portion (113*c*, 213*c*) including a rotation restriction portion (113*c*, 213*c*) movable in a direction along the rotational axis between a restriction position in which the rotation restriction portion engages with the rotation restricted portion of the shutter to restrict rotation of the apparatus side shutter from the non-fluid-communication position to the fluid communication position, and a release position which is above the restriction position and in which restriction against the rotation of the apparatus side shutter from non-fluid-communication position to the fluid communication position is released, a release member (114, 214) rotatable about the rotational axis in a first rotational direction and a second rotational direction opposite to the first rotational direction, the release member being movable upward along the rotational axis with the restricting member so as to move the restricting member from the restriction position to the release position, an urging member (116, 216) urging the release member in a direction of moving the release member in the second rotational direction, a rise restriction portion (110*e*, 210*e*) for restricting upward movement of the release member, the method comprising:

a first step of rotating the release member in the first rotational direction against an urging force of the urging member to a rise restriction release region in which upward movement of the release member is not restricted by the rise restriction portion, and a second step of moving, after the first step, the release member upward so that the restricting member is moved together from the restriction position to the release position.

Structure Example A421

An image forming system (1000) comprising a toner container (100, 1050, 1051, 1052, 1060, 1070, 1080, 220, 2320, 23210, 2420, 2520, 2530, 2820, 420, 520, 5120, 920, 10020, 1120) and an image forming apparatus (1) to which the toner container is mountable, wherein the toner container includes, a first accommodating portion (101, 1015, 10151, 201, 2401, 2801, 501, 901) configured to accommodate toner, a discharge portion (102, 1025, 202, 2302, 23102, 2402A, 2502, 2503, 2802, 402, 430, 502, 5102, 902, 1002A, 1102) provided with an opening (102*a*, 202*a*, 2402Ag, 2502*k*2, 2503*k*2, 2802*a*, 430*a*, 502*a*, 902Bk, 10020Be) for discharging the toner in the first accommodating portion to an outside of the toner container, and wherein when the toner container is oriented in a predetermined direction in which the central axis extends in a direction of gravity and at least a part of the discharge portion is below the accommodating portion, the toner container further includes an inner peripheral surface (102*b*1, 202*b*1, 202*b*10) centered on a central axis, and a projection (102*b*, 1020*b*, 1021*b*, 1023*b*, 1024*b*, 1026*b*, 1027*b*, 1028*b*, 202*b*, 2302*b*, 23102*b*, 2402Bb, 2502*b*, 2503*b*, 2802*b*, 402*b*, 502*b*, 5102*b*, 903Bg, 1003*b*, 1132*b*) projecting downward below the opening of the discharge portion, the projection including an upward surface (104*a*2, 104*b*2, 1041*a*2, 1042*b*2, 1043*a*2, 1043*b*2, 1044*a*2, 1046*a*2, 1047*a*2, 1048*a*2, 204*a*3, 204*b*3, 2304*a*2, 2304*b*2, 23104*a*2, 23104*b*2, 2604*a*3) facing upward, and a downward surface (104*a*1, 104*b*1, 1041*b*1, 1042*a*1, 1043*a*1, 1043*b*1, 1044*a*1, 1046*a*1, 1047*a*1, 1048*a*1, 204*a*1, 204*a*2, 204*b*1, 204*b*2, 2304*a*1, 2304*b*1, 23104*a*1, 23104*b*1, 2604*b*1, 2604*a*2) facing downward, which are provided outside the inner peripheral surface and inside the opening of the discharge portion in a radial direction of an imaginary circle centered on the central axis, and wherein the image forming apparatus includes, a photosensitive drum (21), a developing roller (31) for supplying the toner to the photosensitive drum, a second accommodating portion (36) configured to accommodate the toner supplied from the toner container, a mounting portion (106, 206) to which the toner container is mountable, wherein the mounting portion includes, a frame (107, 117, 207, 217) provided with a frame opening (117*a*, 217*a*) in fluid communication with the second accommodating portion, an apparatus side shutter provided with a rotation restricted portion (109*c*, 209*c*) and an apparatus side shutter opening (109*a*, 209*a*) and rotatable about a rotational axis between a fluid communication position in which the apparatus side shutter opening is in fluid communication with the frame opening and a non-fluid-communication position in which the apparatus side shutter opening is not in fluid communication with the frame opening, the apparatus side shutter being further provided with a shaft portion (109*d*, 209*d*) centered on the rotational axis and extending in a direction of the rotational axis, a restricting member (113, 213) including a rotation restriction portion (113*c*, 213*c*) movable in a direction along the rotational axis between a restriction position in which the rotation restriction portion engages with the rotation restricted portion of the apparatus side shutter to restrict rotation of the apparatus side shutter from the non-fluid-communication position to the fluid communication position, and a release position which is above the restriction position and in which restriction against the rotation of the apparatus side shutter from non-fluid-communication position to the fluid communication position is released, a release member (114, 214) including a contacted portion (214*e*A, 214*e*B) and supported by the shaft portion of the apparatus side shutter so as to be rotatable about the rotational axis in a first rotational direction and a second rotational direction opposite to the first rotational direction, the release member being movable upward with the restricting member so as to move the restricting member from the restriction position to the release position, an urging member (116, 216) urging the release member in a direction of moving the release member in the second rotational direction, a rise restriction portion (110*e*, 210*e*) for restricting upward movement of the release member, wherein when the toner container is moved down toward the mounting portion in a state in which the toner container is oriented in the predetermined direction, the inner peripheral surface of the projection is engaged with the shaft portion of the apparatus side shutter, the release member is rotated in the first rotational direction against an urging force of the urging member to a rise restriction release region in which upward movement of the release member is not restricted by the rise restriction portion, and the upward surface guides the contacted portion of the release member so that after the release member is rotated in the first rotational direction by the downward surface, the release member is moved up while being rotated in the second rotational direction by the urging force, by which the restricting member is moved from the restriction position to the release position by the release member.

Structure Example A422

An image forming system according to Structure Example A421, wherein the downward surface includes a first downward surface and a second downward surface which is provided at a position more away from the rotational axis in the radial direction than the first downward surface is, wherein the contacted portion includes a first contacted portion and a second contacted portion which is provided at a position more away from the rotational axis in the radial direction than the first contacted portion is, wherein after the first downward surface contacts with the first contacted portion to rotate the release member in the first rotational direction against the urging force, the second downward surface contacts the second contacted portion to rotate the release member further in the first rotational direction, and thereafter, the upward surface guides the second contacted portion so that the release member is moved upward while being rotated in the second rotational direction by the urging force of the urging member.

Structure Example A423

An image forming system according to Structure Example A422, wherein the image forming apparatus includes a cover covering an upper part of the release member, the cover being provided with a cover opening in a top surface thereof, wherein as the mounting portion is viewed in a direction of the rotational axis in a state in which the toner container is not mounted on the mounting portion, the first contacted portion is exposed through the cover opening, and the second contacted portion is covered by the cover, wherein as the mounting portion is viewed in the direction of the central axis, the second contacted portion is exposed through the cover opening by the first downward surface contacting with the first contacted portion to rotate the release member in the first rotational direction, and wherein in a state in which the second contacted portion is exposed through the cover opening, the release member is further rotated in the first rotational direction by the second downward surface contacting with the second contacted portion.

Structure Example A424

An image forming system according to any one of Structure Examples A421-A423, wherein the toner container includes a rotatable member rotatable, about a central axis as a rotational axis relative to the discharge portion, in a first rotational direction and in a second rotational direction opposite to the first rotational direction, the rotatable member including a push portion, wherein the apparatus side shutter of the mounting portion is provided with a pushed portion engaged with the push portion when the toner container is mounted to the mounting portion, wherein when the rotatable member is rotated, the pushed portion of the apparatus side shutter is pushed by the push portion of the rotatable member to rotate the apparatus side shutter from the non-fluid-communication position to the fluid communication position.

Structure Example B1

A toner container mountable to and dismountable from an image forming apparatus, the image forming apparatus including a release member (114, 214) for releasing rotation restriction of an apparatus side shutter which is rotatable for fluid communication with a toner receiving opening (117*a*, 217*a*), the release member rotatable about a rotational axis in a first rotational direction and a second rotational direction opposite to the first rotational direction and movable upward, the toner container comprising:

an accommodating portion configured to accommodate toner (101, 1015, 10151, 201, 2401, 2801, 501, 901);

a discharge portion (102, 1025, 202, 2302, 23102, 2402A, 2502, 2503, 2802, 302, 502, 5102, 902, 1002A, 1102) configured to be provided with an opening (102*a*, 202*a*, 2402Ag, 2502*k*2, 2503*k*2, 2802*a*, 302*a*, 502*a*, 902Bk, 10020Be) for discharging the toner in the accommodating portion to the receiving opening; and an engaging portion (202*b*, 2302*b*, 23102*b*, 2402Bb, 2502*b*, 2503*b*, 2802*b*, 304, 3104, 3204, 502*b*, 5102*b*, 604, 804, 8104, 8204, 8304, 903Bg, 1003*b*, 1132*b*) having a first engagement surface and a second engagement surface, wherein the first engagement surface (104*a*1, 104*b*1, 1041*b*1, 1042*a*1, 1043*a*1, 1043*b*1, 1044*a*1, 1046*a*1, 1047*a*1, 1048*a*1, 204*a*1, 204*a*2, 204*b*1, 204*b*2, 2304*a*1, 2304*b*1, 23104*a*1, 23104*b*1, 2604*b*1, 2604*a*2) is configured to engage with an engaged portion (114*e*, 214*e*) of the release member so as to rotate the release member in the first rotational direction when the toner container is mounted to the image forming apparatus, and wherein the second engagement surface (104*a*2, 104*b*2, 1041*a*2, 1042*b*2, 1043*a*2, 1043*b*2, 1044*a*2, 1046*a*2, 1047*a*2, 1048*a*2, 204*a*3, 204*b*3, 2304*a*2, 2304*b*2, 23104*a*2, 23104*b*2, 2604*a*3, 304*a*3, 304*b*3, 3104*a*3, 3104*b*3, 3204*a*3, 3204*b*3, 604Ba2, 604Bb2, 704Ba2, 704Bb2, 7204Ba2, 804*a*3) is configured to engage with the engaged portion so as to move upward the release member after the release member is rotated in the first rotational direction by engagement of the release member with the first engagement surface, when the toner container is mounted to the image forming apparatus.

Structure Example B2

A toner container according to Structure Example B1, wherein when the toner container takes an attitude of being mounted to the image forming apparatus, the accommodating portion, the discharge portion and the engaging portion are arranged in this order in a mounting direction in which the toner container is mounted to the image forming apparatus.

Structure Example B3

A toner container according to Structure Example B1 or B2, wherein when the toner container takes an attitude of being mounted to the image forming apparatus, at least a part of the second engagement surface is above the first engagement surface.

Structure Example B4

A toner container according to any one of Structure Examples B1-B3, wherein when the toner container takes an attitude of being mounted to the image forming apparatus, the second engagement surface and the first engagement surface overlap with each other, as views in a mounting direction in which the toner container is mounted to the image forming apparatus.

Structure Example B5

A toner container according to any one of Structure Examples B1-B4, wherein the engaged portion includes a first engaged surface (214*e*2) facing upward and a second engaged surface (214*e*3) facing downward, wherein the first engagement surface and the second engagement surface are configured to engage with the first engaged surface and the second engaged surface, respectively.

Structure Example B6

A toner container according to any one of Structure Examples B1-B5, wherein when the toner container takes an attitude of being mounted to the image forming apparatus, wherein the second engagement surface faces upward.

Structure Example B7

A toner container according to Structure Example B6, wherein when the toner container takes an attitude of being mounted to the image forming apparatus, the second engagement surface extends so as to go up as goes in the second rotational direction.

Structure Example B8

A toner container according to Structure Example B6, wherein when the toner container takes an attitude of being mounted to the image forming apparatus, the second engagement surface is perpendicular to the rotational axis.

Structure Example B9

A toner container according to Structure Example B6, wherein when the toner container takes an attitude of being mounted to the image forming apparatus, the second engagement surface is an upward surface extending so as to go up as goes in the first rotational direction.

Structure Example B10

A toner container according to any one of Structure Examples B1-B9, wherein when the toner container takes an attitude of being mounted to the image forming apparatus, the first engagement surface is a surface facing downward.

Structure Example B11

A toner container according to Structure Example B10, wherein when the toner container takes an attitude of being mounted to the image forming apparatus, the first engagement surface is a downward surface extending so as to go up as goes in the first rotational direction.

Structure Example B12

A toner container according to any one of Structure Examples B1-B9, wherein the first engagement surface is a surface parallel with the rotational axis.

Structure Example B13

A toner container according to any one of Structure Examples B1-B12, wherein when the toner container takes an attitude of being mounted to the image forming apparatus, the toner container further comprises a downstream side end surface extending upward along the direction of rotational axis from a downstream end of the second engagement surface and facing downstream side in the second rotational direction.

Structure Example B14

A toner container according to any one of Structure Examples B1-B13, wherein the first engagement surface and the second engagement surface are exposed to an outside of the toner container.

Structure Example B15

A toner container according to any one of Structure Examples B1-B14, wherein the image forming apparatus includes a restricting member movable along the rotational axis between a restriction position for restricting rotation of the apparatus side shutter and a release position, above the restriction position, for releasing the rotation restriction of the apparatus side shutter, wherein the release member is configured to move upward with the restricting member so as to move the restricting member from the restriction position to the release position, and wherein the second engagement surface is configured to engage with the engaged portion so as to move upward the release member with the restricting member.

Structure Example B16

A toner container according to Structure Example B15, wherein the image forming apparatus includes a rise restriction portion for restricting upward movement of the release member, wherein the first engagement surface is configured to engage with the engaged portion so as to rotate the release member in the first rotational direction to a region in which at least upward movement of the release member is not restricted by the rise restriction portion, and wherein the second engagement surface is configured to engage with the engaged portion so that the release member is moved upward with the restricting member in the region.

Structure Example B17

A toner container according to Structure Example B7, wherein the image forming apparatus includes an urging member for urging the release member in a direction of rotating the release member in the second rotational direction, and wherein the second engagement surface is configured to guide the engaged portion so as to move the release member upward while the release member is being rotated in the second rotational direction by the urging force of the urging member.

Structure Example B18

A toner container according to Structure Example B13, wherein the image forming apparatus includes an urging member for urging the release member in a direction of rotating the release member in the second rotational direction, wherein the second engagement surface is configured to guide the engaged portion so as to move the release member upward while the release member is being rotated in the second rotational direction by an urging force of the urging member, wherein the release member has a contact surface which is a downstream side end surface in the second rotational direction, and wherein the downstream side end surface of the engaging portion is configured to stop rotation of the release member in the second rotational direction by engaging with the first engagement surface to come into contact with the contact surface of the release member rotated in the second rotational direction.

Structure Example B19

A toner container according to Structure Example B18, wherein the engaged portion of the release member includes a first engaged surface facing upward and a second engaged surface facing downward below the first engaged surface, and wherein the contact surface is provided between the first engaged surface and the second engaged surface.

Structure Example B20

A toner container according to Structure Example B18 or B19, comprising a cavity provided right above the second engagement surface, wherein a portion provided with the contact surface of the release member is capable of entering the cavity when the contact surface of the release member contacts the downstream side end surface, when the toner container takes an attitude of being mounted to the image forming apparatus.

Structure Example B21

A toner container according to any one of Structure Examples B1-B3, wherein when the toner container takes an attitude of being mounted to the image forming apparatus, the engaging portion is configured to be movable upward relative to the discharge portion, and when the engaging portion is moved upward relative to the discharge portion, the second engagement surface pushes the discharge portion from a lower side to move the release member upward.

Structure Example B22

A toner container according to any one of Structure Examples B10-B12, wherein the first engagement surface pushes the engaged portion of the release member to rotate the release member in the first rotational direction.

Structure Example B23

A toner container according to any one of Structure Examples B1-B22, wherein the engaged portion of the release member includes a first engaged portion and a second engaged portion which is provided at a position more away from the rotational axis in a radial direction of an imaginary circle centered on the rotational axis than the first engaged portion is, wherein the first engagement surface includes a first inner engagement surface and a first outer engagement surface which is provided at a position more away from the rotational axis in the radial direction than the first inner engagement surface is, wherein the first inner engagement surface is configured to engage with the first engaged portion of the release member so as to rotate the release member in the first rotational direction, and wherein the first outer engagement surface is configured to engage with the second engaged portion so as to further rotate the release member in the first rotational direction after the release member is rotated in the first rotational direction by the engagement with the first inner engagement surface.

Structure Example B24

A toner container according to Structure Example B23, wherein the image forming apparatus includes a cover covering an upper part of the release member, the cover being provided with a cover opening in a top surface thereof, wherein when the image forming apparatus without the toner container is viewed in a direction of the rotational axis, the cover is configured such that the first engaged portion is exposed through the cover opening, and the second engaged portion is not exposed, wherein when the toner container is mounted to the image forming apparatus, the second engaged portion is exposed through the cover opening as is viewed in the direction of the rotational axis by a rotation of the release member in the first rotational direction by an engagement between the first inner engagement surface and the first engaged portion, and in a state in which the second engaged portion is exposed through the cover opening, the release member is configured to be further rotated in the first rotational direction by engagement of the first outer engagement surface with the second engaged portion.

Structure Example B25

A toner container according to any one of Structure Examples B1-B5, wherein when the toner container takes an attitude of being mounted to the image forming apparatus,

- the first engagement surface is a downward surface extending so as to go up as goes in the first rotational direction,
- the second engagement surface is an upward surface extending so as to go up as goes in the second rotational direction, and
- the toner container further comprises a connecting portion connecting a downstream end of the first engagement surface in the first rotational direction and an upstream end of the second engagement surface in the second rotational direction, the connecting portion being configured to guide the engaged portion so that a rotational direction of the release member is switched from the first rotational direction to the second rotational direction.

Structure Example B26

A toner container according to any one of Structure Examples B1-B25, wherein when the toner container takes an attitude of being mounted to the image forming apparatus,

- the engaging portion is configured to project downward with respect to a lower surface of the toner container.

Structure Example C1

A toner container for accommodating toner, comprising:

- an accommodating portion for accommodating toner;
- a nozzle portion having an outer surface extending in a first direction, the outer surface being provided with a nozzle opening; and
- a rotatable member configured to be rotatable about a rotational axis extending in a direction along the first direction relative to the nozzle portion, the rotatable member being provided outside of the outer surface of the nozzle portion in the radial direction of an imaginary circle having a center on the rotational axis,
- wherein when the toner container is oriented such that at least a part of the nozzle portion is below the accommodating portion and the rotational axis extend in a direction of gravity, said toner container comprising a projected portion projecting downward beyond an end surface of the toner container which is below the nozzle opening, the projected portion having an upward surface configured to face upward and to extend so as to go down as goes in a rotational direction of the rotatable member.

Structure Example C2

A toner container according to Structure Example C1, wherein a cavity is provided above the upward surface of the projected portion.

Structure Example C3

A toner container according to Structure Example C1 or C2, wherein the projected portion is provided below the upward surface with a downward surface which faces downward and which extends so as to go up as goes in the rotational direction.

Structure Example C4

A toner container according to Structure Example C3, wherein as viewed in a direction of the rotational axis, the downward surface overlaps the upward surface.

Structure Example C5

A toner container according to Structure Example C3, wherein the downward surface is provided at a side opposite from the upward surface across the rotational axis in a radial direction.

Structure Example C6

A toner container according to any one of Structure Examples C1-C5, wherein the projected portion includes a cylindrical portion having a center on rotational axis, and the upward surface is provided at an outer peripheral surface in the radial direction of the cylindrical portion.

Structure Example C7

A toner container according to Structure Example C6, wherein a bottom surface of the cylindrical portion is provided with a hole having a center on the rotational axis and extending in the direction of the rotational axis.

Structure Example C8

A toner container according to any one of Structure Examples C1-C7, wherein the upward surface is a first upward surface,

- the projected portion has a second upward surface on a side opposite from that of the first upward surface across the rotational axis in a direction perpendicular to the rotational axis, and
- the second upward surface is configured to face upward and to extend so as to go down as goes in the rotational direction of the rotatable member.

Structure Example C9

A toner container according to any one of Structure Examples C1-C8, wherein the projected portion is configured to take a projecting position in which it is projected downward beyond the end surface and a retracted position in which is retracted so that the bottom surface of the projected portion is above the projecting position.

Structure Example C10

A toner container according to any one of Structure Examples C1-C8, wherein the upward surface is configured to be movable between an upward position in which it faces upward and extends so as to go down as goes in the rotational direction of the rotatable member, and a position in which a position of the upward surface is different from that in the upward position.

Structure Example C11

A toner container according to any one of Structure Examples C1-C8, wherein the rotatable member is configured to rotate while rubbing with the outer surface of the nozzle portion between a close position for closing the nozzle opening and an open position for opening the nozzle, and the upward surface extends so as to go down as the rotatable member goes from the close position toward the open position.

Structure Example C12

A toner container according to Structure Example C11, wherein the outer surface is a first outer surface, the rotatable member is provided with a rotatable member opening for exposing the nozzle opening when it is in the open position, the nozzle portion includes a nozzle recess having a second outer surface recessed beyond the first outer surface in the radial direction at a position different from that of the nozzle opening in the rotational direction, and at least a part of the nozzle recess is exposed through the rotatable member opening when the rotatable member is in the close position.

Structure Example C13

A toner container according to Structure Example C12, wherein the nozzle recess includes a first nozzle surface and a second nozzle surface arranged in a second direction with the second outer surface interposed therebetween in a cross-section perpendicular to the direction of the rotation axis, the first nozzle and the second nozzle extending in a direction crossing the second direction, and wherein a position of the upward surface of the projected portion is between a position of the first nozzle surface and the position of the second nozzle surface.

Structure Example C14

A toner container according to Structure Example C12 or C13, wherein the rotatable member provided with a rotatable member recess recessed from an outer surface of the rotatable member at a position opposite from the nozzle recess of the nozzle portion across the rotational axis.

Structure Example C15

A toner container for accommodating toner, comprising:

an accommodating portion for accommodating toner;

a nozzle portion having a first outer surface extending in a first direction, the first outer surface being provided with a nozzle opening;

a rotatable member configured to be rotatable relative to the nozzle portion about a rotational axis extending along the first direction, the rotatable member being provided outside of the first outer surface of the nozzle portion in a radial direction of an imaginary circle having a center on the rotational axis; and a projection, wherein when the toner container is oriented so that at least a portion of the nozzle portion is below the accommodating portion and the rotational axis extends in a vertical direction, the projected portion is configured to project downward beyond an end surface of the toner container which is below the nozzle opening, and, as viewed in a direction perpendicular to the rotation axis, the projected portion is configured to have an upward surface facing upward and extending so as to go down as goes in a predetermined direction perpendicular to the rotational axis, wherein the rotatable member is provided with a rotatable member opening and configured to be movable between a close position for closing the nozzle opening and an open position for opening the nozzle opening with the nozzle opening exposed through the rotatable member opening, wherein the nozzle portion is provided with a nozzle recess having a second outer surface recessed in the radial direction beyond the first outer surface at a position different from that of the nozzle opening in the rotational direction of the rotatable member, and wherein at least a part of the nozzle recess is exposed through the rotatable member opening when the rotatable member is in the close position.

Structure Example C16

A toner container according to Structure Example C15, wherein a cavity is provided above the upward surface of the projected portion.

Structure Example C17

A toner container according to Structure Example C15 or C16, wherein as viewed in a direction perpendicular to the rotational axis, the projected portion has a downward surface configured to face downward and to extend so as to go up as goes in the predetermined direction, below the upward surface.

Structure Example C18

A toner container according to Structure Example C17, wherein as viewed in a direction of the rotational axis, the downward surface overlaps the upward surface.

Structure Example C19

A toner container according to Structure Example C18, wherein the downward surface is provided at a side opposite from the upward surface across the rotational axis in a radial direction.

Structure Example C20

A toner container according to any one of Structure Examples C15-C19, wherein the upward surface is a first upward surface, the projected portion has a second upward surface on a side opposite from that of the first upward surface across the rotational axis in a direction perpendicular to the rotational axis, and the second upward surface is configured to face upward and to extend so as to go down as goes in the predetermined direction, as viewed in a direction perpendicular to the rotational axis.

Structure Example C21

A toner container according to any one of Structure Examples C15-C20, wherein the nozzle recess includes a first nozzle surface and a second nozzle surface arranged in a second direction with the second outer surface interposed therebetween in a cross-section perpendicular to the direction of the rotation axis, the first nozzle and the second nozzle extending in a direction crossing the second direction, a position of the upward surface of the projected portion is between a position of the first nozzle surface and the position of the second nozzle surface.

Structure Example C22

A toner container according to any one of Structure Examples C15-C21, wherein the rotatable member is provided with a rotatable member recess recessed from a rotatable member outer surface of the rotatable member on a side opposite from the nozzle recess of the nozzle portion across the rotational axis.

Structure Example C23

A toner container for accommodating toner, comprising: an accommodating portion for accommodating toner;

a nozzle portion having a first outer surface extending in a first direction, the first outer surface being provided with a nozzle opening;

a rotatable member configured to be rotatable relative to the nozzle portion about a rotational axis extending along the first direction, the rotatable member being provided outside of the first outer surface of the nozzle portion in a radial direction of an imaginary circle having a center on the rotational axis; and a projection, wherein when the toner container is oriented so that at least a portion of the nozzle portion is below the accommodating portion and the rotational axis extends in a vertical direction, the projected portion is configured to project downward beyond an end surface of the toner container which is below the nozzle opening, and, as viewed in a direction perpendicular to the rotation axis, the projected portion is configured to have an upward surface facing upward and extending so as to go down as goes in a predetermined direction perpendicular to the rotational axis, wherein the nozzle portion is provided with a nozzle recess having a second outer surface recessed in the radial direction beyond the first outer surface at a position different from that of the nozzle opening in the rotational direction of the rotatable member, wherein the nozzle recess includes a first nozzle surface and a second nozzle surface arranged in a second direction with the second outer surface interposed therebetween in a cross-section perpendicular to the direction of the rotation axis, the first nozzle and the second nozzle extending in a direction crossing the second direction, and wherein a position of the upward surface of the projected portion is between a position of the first nozzle surface and the position of the second nozzle surface.

Structure Example C24

A toner container according to Structure Example C23, wherein a cavity is provided above the upward surface of the projected portion.

Structure Example C25

A toner container according to Structure Example C23 or C24, wherein as viewed in a direction perpendicular to the rotational axis, the projected portion has a downward surface configured to face downward and to extend so as to go up as goes in the predetermined direction, below the upward surface.

Structure Example C26

A toner container according to Structure Example C25, wherein as viewed in a direction of the rotational axis, the downward surface overlaps the upward surface.

Structure Example C27

A toner container according to Structure Example C25, wherein the downward surface is provided at a side opposite from the upward surface across the rotational axis in a radial direction.

Structure Example C28

A toner container according to any one of Structure Examples C23-C26, wherein the upward surface is a first upward surface, wherein the projected portion has a second upward surface on a side opposite from that of the first upward surface across the rotational axis in a direction perpendicular to the rotational axis, and the second upward surface is configured to face upward and to extend so as to go down as goes in the predetermined direction, as viewed in a direction perpendicular to the rotational axis.

Structure Example C29

A toner container for accommodating toner, comprising: an accommodating portion for accommodating toner; and a nozzle portion having an outer surface extending in a first direction, the outer surface being provided with a nozzle opening;

wherein when the toner container is oriented such that at least a part of the nozzle portion is below the accommodating portion and the rotational axis extend in a direction of gravity, said toner container comprising a projected portion projecting downward beyond an end surface of the toner container which is below the nozzle opening, the projected portion having an upward surface configured to face upward and to extend so as to go down as goes in a predetermined direction perpendicular to the first direction, as is viewed in the direction perpendicular to the first direction, and wherein a ridge of the upward surface extends so as to go down as goes in the predetermined direction.

Structure Example C30

A toner container according to Structure Example C29, wherein the projected portion is configured to have a downward surface faces downward and which extends so as to go up as goes in the predetermined direction below the upward surface, and the downward surface extends such that the ridge of the downward surface goes up as goes in the predetermined direction.

Structure Example C31

An image forming system comprising a toner container and an image forming apparatus (1) to which the toner container is mountable, wherein the toner container includes,
a first accommodating portion for accommodating toner,
a nozzle portion having an outer surface extending downward,
a rotatable member rotatable relative to the nozzle portion about a rotational axis extending downward and provided outside the outer surface of the nozzle portion in a radial direction of an imaginary circle having a center on the rotational axis, the rotatable member including a push portion, and
a projected portion configured to project downward beyond an end surface of the toner container below the nozzle opening, the projected portion having an upward surface facing upward and extending so as to go down as goes in a direction of the rotatable member,
wherein the image forming apparatus includes,
a photosensitive drum,
a developing roller for supplying the toner to the photosensitive drum,
a second accommodating portion for accommodating the toner supplied from the toner container,
a mounting portion to which the toner container is mountable,
a frame provided with a frame opening in fluid communication with the second accommodating portion,
a shutter including a rotation restricted portion and a pushed portion and provided with a shutter opening, the shutter being rotatable about the rotational axis between a close position in which the shutter opening not in fluid communication with the frame opening and an open position in which the shutter is in fluid communication with the frame opening, and the pushed portion being configured to engage with the push portion of the rotatable member of the toner container,
a restricting member including a rotation restriction portion a movable in a direction of the rotational axis between a restriction position for restricting rotation of the shutter from the close position to the open position by engagement of the rotation restriction portion with the rotation restricted portion of the shutter and a release position for releasing rotation restriction from the movable to the open position of the shutter, the release position being above the restriction position,
a release member including an engaging portion extending upward and rotatable in a first rotational direction about the rotational axis and movable upward with the restricting member so that the restricting member moves from the restriction position to the release position, and
an urging member for urging the release member in a direction to rotate the release member in the first rotational direction,
wherein when the toner container is moved down toward the mounting portion,
after the engaging portion is rotated by contact with the projected portion of the toner container against an urging force of the urging member in a second rotational direction opposite to the first rotational direction, the release member is ridden on the upward surface by the urging force of the urging member and is moved up along the upward surface while being rotated in the first rotational direction, thus being moved from the restriction position to the release position, and
when the mounting of the toner container to the mounting portion is completed, the restricting member is in the release position, and by rotation of the rotatable member, the pushed portion of the shutter is pushed by the push portion of the rotatable member to rotate the shutter from the close position to the open position.

Structure Example C32

An image forming system according to Structure Example C31, wherein a cavity is provided above the upward surface of the projected portion.

Structure Example C33

An image forming system according to Structure Example C31 or C32, wherein the projected portion is provided below the upward surface with a downward surface which faces downward and which extends so as to go up as goes in the rotational direction.

Structure Example C34

An image forming system according to Structure Example C33, wherein as viewed in a direction of the rotational axis, the downward surface overlaps the upward surface.

Structure Example C35

An image forming system according to Structure Example C33, wherein the downward surface is provided at a side opposite from the upward surface across the rotational axis in a radial direction.

Structure Example C36

An image forming system according to any one of Structure Examples C31-C35, wherein the projected portion includes a cylindrical portion having a center on the rotational axis, and
the upward surface is provided on an outer peripheral surface in the radial direction of the cylindrical portion.

Structure Example C37

An image forming system according to Structure Example C36, wherein a bottom surface of the cylindrical portion is provided with a hole having a center on the rotational axis and extending in the direction of the rotational axis.

Structure Example C38

An image forming system according to any one of Structure Examples C31-C37, wherein the upward surface is a first upward surface,
wherein the projected portion has a second upward surface on a side opposite from that of the first upward surface across the rotational axis in a direction perpendicular to the rotational axis, and
wherein the second upward surface is configured to face upward and to extend so as to go down as goes in the rotational direction of the rotatable member.

Structure Example C39

An image forming system according to any one of Structure Examples C31-C38, wherein the projected portion is configured to take a projecting position in which it is projected downward beyond the end surface and a retracted position in which is retracted so that the bottom surface of the projected portion is above the projecting position.

Structure Example C40

An image forming system according to any one of Structure Examples C31-C38, wherein the upward surface is movable between a first position in which it extends so as to go down as goes in a rotational direction of the rotatable member and faces upward, and a second position in which upward surface faces in a direction different from that in the first position.

Structure Example C41

An image forming system according to any one of Structure Examples C31-C38, wherein the rotatable member is configured to rotate while rubbing with the outer surface of the nozzle portion between a close position for closing the nozzle opening and an open position for opening the nozzle, and wherein the upward surface extends so as to go down as the rotatable member goes from the close position toward the open position.

Structure Example C42

An image forming system according to Structure Example C41, wherein the outer surface is a first outer surface, wherein the rotatable member is provided with a rotatable member opening for exposing the nozzle opening when it is in the open position, wherein the nozzle portion includes a nozzle recess having a second outer surface recessed beyond the first outer surface in the radial direction at a position different from that of the nozzle opening in the rotational direction, and wherein at least a part of the nozzle recess is exposed through the rotatable member opening when the rotatable member is in the close position.

Structure Example C43

An image forming system according to Structure Example C42, wherein the nozzle recess includes a first nozzle surface and a second nozzle surface arranged in a second direction with the second outer surface interposed therebetween in a cross-section perpendicular to the direction of the rotation axis, the first nozzle and the second nozzle extending in a direction crossing the second direction, and wherein a position of the upward surface of the projected portion is between a position of the first nozzle surface and the position of the second nozzle surface.

Structure Example C44

An image forming system according to Structure Example C42 or C43, wherein the rotatable member provided with a rotatable member recess recessed from an outer surface of the rotatable member at a position opposite from the nozzle recess of the nozzle portion across the rotational axis.

Structure Example C45

An image forming system according to any one of Structure Examples C31-C44, wherein the urging member is there first urging member, and the image forming apparatus includes a second urging member for urging the restricting member in a direction of moving the restricting member from the release position to the restriction position.

Structure Example C46

A mounting kit for mounting to an image forming apparatus, the mounting kit comprising a toner container for accommodating toner, an attachment, wherein the toner container including, an accommodating portion for accommodating toner;

a nozzle portion having an outer surface extending in a first direction, the outer surface being provided with a nozzle opening;

a rotatable member configured to be rotatable about a rotational axis extending in a direction along the first direction relative to the nozzle portion, the rotatable member being provided outside of the outer surface of the nozzle portion in the radial direction of an imaginary circle having a center on the rotational axis, and wherein the attachment has a cylindrical shape with an outer peripheral surface having a center thereof on a central axis, and wherein when the attachment is oriented such that the central axis extends in a vertical direction, the attachment has an upward surface configured to extend so as to go down as goes in a circumferential direction of the outer peripheral surface and to face upward.

Structure Example C47

A mounting kit according to Structure Example C46, wherein the attachment has a downward surface configured to extend so as to go up as goes in the circumferential direction of the outer peripheral surface and to face downward.

Structure Example C48

A mounting kit according to Structure Example C46 or C47, wherein the attachment is configured to be mountable to the nozzle portion of the toner container.

Structure Example C49

An image forming system comprising an image forming apparatus and an attachment mountable to the image forming apparatus, wherein the image forming apparatus includes, a photosensitive drum, a developing roller (31) for supplying the toner to the photosensitive drum, an accommodating portion for accommodating toner to be supplied to the developing roller, a mounting portion to which the attachment is mountable, the mounting portion including, a frame provided with a frame opening in fluid communication with the accommodating portion, a shutter including a rotation restricted portion and provided with a shutter opening, the shutter being movable between a close position in which the shutter opening is not fluid communication with the frame opening, and an open position in which the shutter opening is in fluid communication with the frame opening, a restricting member including a rotation restriction portion a movable in a direction of the rotational axis between a restriction position for restricting rotation of the shutter from the close position to the open position by engagement of the rotation restriction portion with the rotation restricted portion of the shutter and a release position for releasing rotation restriction from the movable to the open position of the shutter, the release position being above the restriction position, and a release member including an engaging portion extending upward and rotatable in a first rotational direction about the rotational axis and movable upward with the restricting member so that the restricting member moves from the restriction position to the release position, and an urging member for urging the release member in a direction to rotate the release member in the first rotational direction, and wherein the attachment has a cylindrical shape with an outer peripheral surface having a center thereof on the central axis, wherein when the attachment is oriented such that central axis extends a vertical direction, the attachment has an upward surface configured to extend so as to go down as goes in a circumferential direction of the outer peripheral surface and to face upward, and wherein when the attachment moved down toward the mounting portion, after the engaging portion is rotated by contact with the attachment against an urging force of the urging member in a second rotational direction opposite to the first rotational direction, the release member is ridden on the upward surface of the attachment by the urging force of the urging member and is moved up along the upward surface while being rotated in the first rotational direction, thus being moved from the restriction position to the release position, and wherein when mounting of the attachment to the mounting portion, the restricting member is in the release position.

Structure Example C50

An image forming system according to Structure Example C49, further comprising a toner container including, an accommodating portion for accommodating toner, a nozzle portion having an outer surface extending in a first direction, the outer surface being provided with a nozzle opening, and a rotatable member including a push portion and configured to be rotatable relative to the nozzle portion about a rotational axis extending in the first direction, the rotatable member being provided outside an outer surface of the nozzle portion in a radial direction of an imaginary circle having a center on rotational axis, wherein the toner container being mountable to the mounting portion after the attachment is mounted to the mounting portion, wherein the shutter of the mounting portion includes a pushed portion engaged with the push portion when the toner container is mounted to the mounting portion, and wherein when the rotatable member of the toner container is rotated, the shutter is moved from the close position to the open position by the pushed portion of the shutter being pushed by the push portion of the rotatable member.

Structure Example C51

A rotation restriction releasing method for a shutter of an image forming apparatus to which a toner container is mountable, wherein the image forming apparatus including, a photosensitive drum, a developing roller for supplying the toner to the photosensitive drum, an accommodating portion for accommodating toner supplied from the toner container, and a mounting portion to which the toner container is mountable, the mounting portion including, a frame provided with a rise restriction portion and a frame opening in fluid communication with the accommodating portion, a shutter including a rotation restricted portion and provided with a shutter opening, the shutter being rotatable about a rotational axis between a close position in which the shutter opening is not in fluid communication with the frame opening, and an open position in which the shutter opening is in fully communication with the frame opening, a restricting member including a rotation restriction portion a movable in a direction of the rotational axis between a restriction position for restricting rotation of the shutter from the close position to the open position by engagement of the rotation restriction portion with the rotation restricted portion of the shutter and a release position for releasing rotation restriction from the movable to the open position of the shutter, the release position being above the restriction position, a release member including an engaging portion extending upward, and a rise restricted portion, the release member being rotatable about the rotational axis between a rise restriction position in which the rise restricted portion is locked by the rise restriction portion and the rise restricted portion is restricted in movement together with the restricting member so that the restricting member moves from the restriction position to the release position, and a rise restriction release position in which the rise restricted portion is not locked by the rise restriction portion and the rise restricted portion is movable together with the restricting member so that the restricting member moves from the restriction position to the release position, and an urging member for urging the release member in a direction of rotating the release member from the rise restriction release position to the rise restriction position, the method comprising:

a first step of rotating the release member against an urging force of the urging member from the rise restriction position to the rise restriction release position; and a second step of moving the release member together with the restricting member so that the restricting member moves from the restriction position to the release position, after the first step.

Structure Example D1

An image forming system comprising an image forming apparatus and a toner container mountable to the image forming apparatus, wherein the image forming apparatus including, an apparatus side shutter (109, 209) rotatable to be brought into fluid communication with a toner receiving opening (117*a*, 217*a*), and a release member (114, 214) for releasing rotation restriction for the apparatus side shutter, the release member rotatable about a rotational axis in a first rotational direction and a second rotational direction opposite to the first rotational direction and movable upward, and wherein the toner container including, an accommodating portion configured to accommodate toner (101, 1015, 10151, 201, 2401, 2801, 501, 901), a discharge portion (102, 1025, 202, 2302, 23102, 2402A, 2502, 2503, 2802, 302, 502, 5102, 902, 1002A, 1102) configured to provide an opening (102*a*, 202*a*, 2402Ag, 2502*k*2, 2503*k*2, 2802*a*, 302*a*, 502*a*, 902Dk, 10020De) for discharging the toner in the accommodating portion to the receiving opening; and an engaging portion (202D, 2302D, 23102D, 2402DD, 2502D, 2503D, 2802D, 304, 3104, 3204, 502D, 5102D, 604, 804, 8104, 8204, 8304, 903Dg, 1003D, 1132D) having a first engagement surface and a second engagement surface, wherein when the toner container is mounted to the image forming apparatus, the first engagement surface (104*a*1, 104D1, 1041D1, 1042*a*1, 1043*a*1, 1043D1, 1044*a*1, 1046*a*1, 1047*a*1, 1048*a*1, 204*a*1, 204*a*2, 204D1, 204D2, 2304*a*1, 2304D1, 23104*a*1, 23104D1, 2604D1, 2604*a*2) is engaged with an engaged portion (114*e*, 214*e*) of the release member so that the release member is rotated in the first rotational direction, and the second engagement surface (104*a*2, 104D2, 1041*a*2, 1042D2, 1043*a*2, 1043D2, 1044*a*2, 1046*a*2, 1047*a*2, 1048*a*2, 204*a*3, 204D3, 2304*a*2, 2304D2, 23104*a*2, 23104D2, 2604*a*3, 304*a*3, 304D3, 3104*a*3, 3104D3, 3204*a*3, 3204D3, 604Da2, 604DD2, 704Da2, 704DD2, 7204Da2, 804*a*3) is engaged with the engaged portion so that after the release member is rotated in the first rotational direction by engagement with the first engagement surface, the release member is moved upward.

Structure Example D2

An image forming system according to Structure Example D1, wherein when the toner container is mounted on the image forming apparatus, the accommodating portion, the discharge portion and the engaging portion of the toner container are arranged in this order in a mounting direction in which the container is mounted to the image forming apparatus.

Structure Example D3

An image forming system according to Structure Example D1 or D2, wherein when the toner container is mounted on the image forming apparatus, at least a part of the second engagement surface is above the first engagement surface.

Structure Example D4

An image forming system according to any one of Structure Examples D1-D3, wherein when the toner container is mounted on the image forming apparatus, and the second engagement surface and the first engagement surface overlap with each other, as views in a mounting direction in which the toner container is mounted to the image forming apparatus.

Structure Example D5

An image forming system according to any one of Structure Examples D1-D4, wherein the engaged portion of the release member has a first engaged surface (214*e*2) facing upward and a second engaged surface (214*e*3) facing downward, and wherein the first engagement surface and the second engagement surface are configured to engage with the first engaged surface and the second engaged surface, when the toner container is mounted to the image forming apparatus.

Structure Example D6

An image forming system according to any one of Structure Examples D1-D5, wherein when the toner container is mounted on the image forming apparatus, the second engagement surface faces upward.

Structure Example D7

An image forming system according to Structure Example D6, wherein when the toner container is mounted on the image forming apparatus, the second engagement surface extends so as to go up as goes in the second rotational direction.

Structure Example D8

An image forming system according to Structure Example D6, wherein when the toner container is mounted on the image forming apparatus, the second engagement surface is perpendicular to the rotational axis.

Structure Example D9

An image forming system according to Structure Example D6, wherein when the toner container is mounted on the image forming apparatus, the second engagement surface extends so as to go up as goes in the first rotational direction.

Structure Example D10

An image forming system according to any one of Structure Examples D1-D9, wherein when the toner container is mounted on the image forming apparatus, the first engagement surface faces downward.

Structure Example D11

An image forming system according to Structure Example D10, wherein when the toner container is mounted on the image forming apparatus, the first engagement surface is a downward surface extending so as to go up as goes in the first rotational direction.

Structure Example D12

An image forming system according to any one of Structure Examples D1-D9, wherein the first engagement surface is a surface parallel with the rotational axis.

Structure Example D13

An image forming system according to any one of Structure Examples D1-D12, wherein when the toner container is mounted on the image forming apparatus, the toner container further comprises a downstream side end surface extending upward along the direction of rotational axis from a downstream end of the second engagement surface and facing downstream side in the second rotational direction.

Structure Example D14

An image forming system according to any one of Structure Examples D1-D13, wherein the first engagement surface and the second engagement surface of the toner container are exposed to an outside of the toner container so as to be engageable with the engaged portion of the release member.

Structure Example D15

An image forming system according to any one of Structure Examples D1-D14, wherein the image forming apparatus includes a restricting member movable along the rotational axis between a restriction position for restricting rotation of the apparatus side shutter and a release position, above the restriction position, for releasing the rotation restriction on the apparatus side shutter, and wherein the release member is configured to move upward with the restricting member so as to move the restricting member from the restriction position to the release position, and wherein the second engagement surface is engaged with the engaged portion so that the release member moves upward together with the restricting member, when the toner container is mounted to the image forming apparatus.

Structure Example D16

An image forming system according to Structure Example D15, wherein the image forming apparatus includes a rise restriction portion for restricting upward movement of the release member, wherein when the toner container is mounted to the image forming apparatus, the first engagement surface is engaged with the engaged portion so that the release member is rotated in the first rotational direction two and the region in which at least upward movement of the release member is not restricted by the rise restriction portion, the second engagement surface is engaged with the engaged portion so that the release member is moved upward together with the restricting member.

Structure Example D17

An image forming system according to Structure Example D7, wherein the image forming apparatus includes an urging member for urging the release member in a direction of rotating the release member in the second rotational direction, and wherein when the toner container is mounted to the image forming apparatus, the second engagement surface guides the engaged portion so that the release member is moved upward by an urging force of the urging member, while being rotated in the second rotational direction.

Structure Example D18

An image forming system according to Structure Example D13, wherein the image forming apparatus includes an urging member for urging the release member in a direction of rotating the release member in the second rotational direction, and the second engagement surface guides the engaged portion when the toner container is mounted to the image forming apparatus, so that the release member is moved upward while being rotated in the second the rotational direction by the urging force of the urging member, wherein the release member has a contact surface which is a downstream side end surface in the second rotational direction, and wherein the downstream side end surface of the engaging portion is configured to stop rotation of the release member in the second rotational direction by engaging with the first engagement surface to come into contact with the contact surface of the release member rotated in the second rotational direction.

Structure Example D19

An image forming system according to Structure Example D18, wherein the engaged portion of the release member as a first engaged surface facing upward, and a second engaged surface facing downward below the first engaged surface, and the contact surface provided between the first engaged surface and the second engaged surface.

Structure Example D20

An image forming system according to Structure Example D18 or D19, wherein when the toner container is mounted on the image forming apparatus, a cavity is provided right above the second engagement surface, wherein when the contact surface of the release member is brought into contact with the downstream side and the surface, a portion of the release member which is provided with a contact surface enters the cavity.

Structure Example D21

An image forming system according to any one of Structure Examples D1-D3, wherein when the toner container is mounted on the image forming apparatus, the engaging portion is configured to be movable upward relative to the discharge portion, and when the engaging portion is moved upward relative to the discharge portion, the second engagement surface pushes the discharge portion from a lower side to move the release member upward.

Structure Example D22

An image forming system according to any one of Structure Examples D10-D12, wherein the first engagement surface pushes the engaged portion of the releasing member to rotate the releasing member in the first rotational direction.

Structure Example D23

An image forming system according to any one of Structure Examples D1-D22, wherein the engaged portion of the release member includes a first engaged portion and a second engaged portion which is provided at a position more away from the rotational axis in a radial direction of an imaginary circle having a center on the rotational axis than the first engaged portion, wherein the first engagement surface includes a first inner engagement surface and a first outer engagement surface which is provided at a position more away from the rotational axis in the radial direction than the first inner engagement surface, wherein when the toner container is mounted to the image forming apparatus, the first inner engagement surface is engaged with the first engaged portion of the release member so that the release member is rotated in the first rotational direction, and the first outer engagement surface is engaged with the second engaged portion so that after the release member is rotated in the first rotational direction through engagement with the engagement surface, the release member is further rotated in the first rotational direction.

Structure Example D24

An image forming system according to Structure Example D23, wherein the image forming apparatus includes a cover covering a part of the release member at an upper part, the cover being provided with a cover opening in a top surface thereof, when the image forming apparatus without the toner container is viewed in a direction of the rotational axis, the cover is configured such that the first engaged portion is exposed through the cover opening, and the second engaged portion is not exposed, when the toner container is mounted to the image forming apparatus, the first inner engagement surface is engaged with the first engaged portion to rotate the release member in the first rotational direction, the second engaged portion is exposed through the cover opening as is viewed in the direction of the rotational axis, and in a state in which the second engaged portion exposed through the cover opening, the release member is configured to be further rotated in the first rotational direction by engagement of the first outer engagement surface with the second engaged portion.

Structure Example D25

An image forming system according to any one of Structure Examples D1-D5, wherein when the toner container is mounted on the image forming apparatus, the first engagement surface is a downward surface extending so as to go up as goes in the first rotational direction, the second engagement surface is an upward surface extending so as to go up as goes in the second rotational direction, the toner container further comprises a connecting portion connecting a downstream end of the first engagement surface in the first rotational direction and an upstream end of the second engagement surface in the second rotational direction, the connecting portion being configured to guide the engaged portion so that a rotational direction of the release member is switched from the first rotational direction to the second rotational direction.

Structure Example D26

An image forming system according to any one of Structure Examples D1-D25, wherein when the toner container is mounted on the image forming apparatus, the engaging portion is configured to project downward with respect to a lower surface of the toner container.

INDUSTRIAL APPLICABILITY

According to the present invention, there is provided a toner container mountable to an image forming apparatus, and an image forming system.

The present invention is not limited to the above embodiments, and various modifications and modifications can be made without departing from the spirit and scope of the present invention.

Therefore, the following Structure Examples are attached to publicize the scope of the present invention.

This application Structure Examples priority on the basis of Japanese Patent Application Patent Application No. 2020-202977 filed on Dec. 7, 2020, and all of the contents thereof are incorporated herein.

The invention claimed is:

1. An attachment for being mounted to an image forming apparatus, the attachment comprising:

a projection having an inner peripheral surface centered on a central axis and projecting in a direction of the central axis outside the inner peripheral surface in a radial direction of an imaginary circle centered on the central axis, wherein, when the attachment is oriented in a predetermined direction in which the central axis extends in a direction of gravity and the projection projects downward, (i) the projection has a first downward surface facing downward, a second downward surface facing downward, and an upward surface facing upward, (ii) when a circumferential direction of the imaginary circle is a first circumferential direction, and a circumferential direction opposite to the first circumferential direction is a second circumferential direction, the first downward surface and the second downward surface extend upward in the first circumferential direction, and at least a part of the first downward surface is at a position which is closer to the central axis in the radial direction than the second downward surface is to the central axis and which is different from a position at which the second downward surface is provided in the circumferential direction, and (iii) at least a part of the upward surface is above at least a part of the second downward surface.

2. An attachment according to claim 1, wherein, when the attachment is oriented in the predetermined direction, the upward surface extends upward in the second circumferential direction.

3. An attachment according to claim 2, wherein, when the attachment is viewed in the radial direction in a state in which the attachment is oriented in the predetermined direction, the upward surface inclines with respect to the central axis by an angle not less than 30 degrees and not more than 60 degrees.

4. An attachment according to claim 1, wherein the upward surface is configured to be exposed to outside of the attachment.

5. An attachment according to claim 1, wherein, when the attachment is oriented in the predetermined direction, a cavity is provided above the upward surface of the projection.

6. An attachment according to claim 1, wherein, when the attachment is oriented in the predetermined direction, the projection has a downstream side end surface which extends upward along the direction of the central axis from a downstream end of the upward surface in the second circumferential direction and which faces a downstream side in the first circumferential direction.

7. An attachment according to claim 1, wherein the second downward surface overlaps the upward surface as viewed in the direction of the central axis.

8. An attachment according to claim 1, wherein the projection includes a connecting portion connecting a downstream end of the second downward surface in the first circumferential direction and an upstream end of the upward surface in the second circumferential direction.

9. An attachment according to claim 1, wherein the projection includes a first projection and a second projection that is provided at a position different from a position of the first projection in the circumferential direction, wherein the upward surface is a first upward surface, wherein the first projection includes the first upward surface, the first downward surface and the second downward surface, wherein the second projection includes a second upward surface, a third downward surface and a fourth downward surface, and wherein, when the attachment is oriented in the predetermined direction, (i) the third downward surface and the fourth downward surface extend upward in the first circumferential direction, and at least a part of the third downward surface is at a position which is closer to the central axis in the radial direction than the fourth downward surface is to the central axis and which is different from a position at which the fourth downward surface is provided in the circumferential direction, and (ii) at least a part of the second upward surface is above at least a part of the fourth downward surface.

10. An attachment according to claim 9, wherein, in the first projection, a part of the first downward surface is upstream of the second downward surface in the first circumferential direction, and wherein, in the second projection, a part of the third downward surface is upstream of the fourth downward surface in the first circumferential direction.

11. An attachment according to claim 1, wherein, when the upward surface is a first upward surface, the projection has a third downward surface, a fourth downward surface and a second upward surface having 150 degree to 210 degree rotationally symmetrical shapes, about the central axis, of the first downward surface, the second downward surface, and the first upward surface, respectively.

12. An attachment according to claim 1, wherein, when the upward surface is a first upward surface, the projection has a third downward surface, a fourth downward surface and a second upward surface having 180 degree rotational symmetrical shapes, about the central axis, of the first downward surface, the second downward surface, and the first upward surface, respectively.

13. An attachment according to claim 1, wherein the projection includes a first projection and a second projection that is provided at a position different from a position of the first projection in the circumferential direction, wherein the first projection includes the upward surface and the second downward surface, and wherein the second projection includes the first downward surface.

14. An attachment according to claim 13, wherein the second projection is provided at a position diametrically opposite to the first projection.

15. An attachment according to claim 1, wherein, when the attachment is viewed in the radial direction in a state in which the attachment is oriented in the predetermined direction, the first downward surface inclines with respect to the central axis by an angle not less than 30 degrees and not more than 60 degrees.

16. An attachment according to claim 1, wherein, when the attachment is viewed in the radial direction in a state in which the attachment is oriented in the predetermined direction, the second downward surface inclines with respect to the central axis by an angle not less than 30 degrees and not more than 60 degrees.

17. An attachment according to claim 1, wherein, when the attachment is viewed in the radial direction in a state in which the attachment is oriented in the predetermined direction, the second downward surface is longer than the first downward surface.

18. An attachment according to claim 1, wherein, when the attachment is viewed in the radial direction in a state in which the attachment is oriented in the predetermined direction, the upward surface is longer than the first downward surface.

19. An attachment according to claim 1, wherein, when the attachment is viewed in the radial direction in a state in which the attachment is oriented in the predetermined direction, the upward surface is longer than the second downward surface.

20. An attachment according to claim 1, further comprising a rotatable member rotatable about the central axis relative to the projection.

21. An attachment according to claim 20, wherein the rotatable member is provided, in an outer surface extending in the direction of the central axis, with a rotatable member opening and a recess recessed inward in the radial direction, and wherein the recess is provided on a side opposite from the rotatable member opening across the central axis.

22. An attachment according to claim 21, wherein, as viewed in the radial direction, the projection is inside a width of the rotatable member opening in a direction perpendicular to the central axis.

23. An attachment according to claim 21, wherein, as the attachment is viewed in the direction of the central axis, the projection is at a position closer to the central axis in the radial direction than the projection is to the recess.

* * * * *